US012620501B2

(12) United States Patent
Trojer et al.

(10) Patent No.: US 12,620,501 B2
(45) Date of Patent: May 5, 2026

(54) OFFSHORE AND MARINE VESSEL-BASED NUCLEAR REACTOR CONFIGURATION, DEPLOYMENT AND OPERATION

(71) Applicant: Energie propre Prodigy Ltee / Prodigy Clean Energy Ltd., West Montreal (CA)

(72) Inventors: Mathias Trojer, Brookline, MA (US); Justin Benjamin Lowrey, Newton, MA (US)

(73) Assignee: Energie propre Prodigy Ltee / Prodigy Clean Energy Ltd., Montreal (CA)

( * ) Notice: Subject to any disclaimer, the term of this patent is extended or adjusted under 35 U.S.C. 154(b) by 1193 days.

(21) Appl. No.: 17/028,669

(22) Filed: Sep. 22, 2020

(65) Prior Publication Data

US 2021/0098143 A1 Apr. 1, 2021

Related U.S. Application Data

(63) Continuation-in-part of application No. PCT/US2019/047228, filed on Aug. 20, 2019, and a (Continued)

(51) Int. Cl.

*G21D 1/00* (2006.01)
*B63B 35/44* (2006.01)

(52) U.S. Cl.

CPC ........ *G21D 1/00* (2013.01); *B63B 2035/4446* (2013.01)

(58) Field of Classification Search

CPC .... B63B 2035/4433; B63B 2035/4446; B63B 43/18; E02B 17/0017; E02B 17/0043;

(Continued)

(56) References Cited

U.S. PATENT DOCUMENTS 2,890,158 A * 6/1959 Ohlinger .................. G21C 1/00 376/454
2,995,900 A * 8/1961 Hunsucker .............. E02B 17/00 405/203

(Continued)

FOREIGN PATENT DOCUMENTS

CN 104036838 A * 9/2014
CN 203826014 U * 9/2014

(Continued)

OTHER PUBLICATIONS

International Preliminary Report on Patentability dated Mar. 4, 2021, for International Patent Application No. PCT/US2019/047228.

(Continued)

*Primary Examiner* — Jinney Kil
(74) *Attorney, Agent, or Firm* — KARCESKI IP LAW, PLLC

(57) ABSTRACT

An installation includes: a plurality of pilings securable to a bed under a surface of a body of water; a base structure disposed atop the plurality of pilings; and a module disposable on the base structure, wherein the module is positioned and securable on the base structure after being floated on the surface of the body of water over the base structure.

12 Claims, 222 Drawing Sheets

Related U.S. Application Data continuation-in-part of application No. PCT/US2019/023724, filed on Mar. 22, 2019.

(60) Provisional application No. 62/720,823, filed on Aug. 21, 2018, provisional application No. 62/720,831, filed on Aug. 21, 2018, provisional application No. 62/720,803, filed on Aug. 21, 2018, provisional application No. 62/646,614, filed on Mar. 22, 2018.

(58) Field of Classification Search

CPC ...... E02B 17/18; E02B 17/04; E02B 17/0836; E02B 17/08; E02B 2017/0043; G21D 1/00

USPC .......... 376/912; 405/203, 211; 114/264, 265, 114/266, 267, 45, 50

See application file for complete search history.

(56) References Cited

U.S. PATENT DOCUMENTS 3,740,957 A * 6/1973 McKenzie ............ B63B 35/003 114/230.1
4,302,291 A 11/1981 Severs et al.
4,456,404 A * 6/1984 Evans ................... E02B 17/021 405/209
4,839,137 A 6/1989 Tower et al.
4,919,882 A * 4/1990 Aul ........................ G21C 13/00 376/293
5,190,720 A 3/1993 Hunsbedt et al.
5,265,136 A 11/1993 Yamazaki et al.
6,795,518 B1 9/2004 Conway et al.
7,525,207 B2 4/2009 Clidaras et al.
8,867,691 B1 * 10/2014 Root ........................ G21D 1/00 376/277
9,093,182 B2 7/2015 Inatomi et al.
9,343,187 B2 5/2016 Ales et al.
2005/0139595 A1 6/2005 Pepin-Lehalleur et al.
2009/0256421 A1 * 10/2009 Chung ..................... G21D 1/00 307/11
2011/0002741 A1 * 1/2011 Nottingham .............. E02D 5/74 405/203
2011/0158370 A1 * 6/2011 Morgan .................. B63B 1/107 405/195.1
2015/0170770 A1 * 6/2015 Ganesan ................ G21C 11/04 376/210
2016/0027536 A1 1/2016 McClure et al.
2016/0203883 A1 7/2016 Richardson
2017/0159186 A1 6/2017 Burke et al.
2017/0175413 A1 6/2017 Curlander et al.
2019/0127939 A1 * 5/2019 Kjersem ............... E21B 15/003
2019/0139656 A1 * 5/2019 Ganesan ................... F41H 5/24
2019/0244719 A1 * 8/2019 Ganesan ................ G21C 11/04
2020/0199902 A1 * 6/2020 Marquez-Santoyo ... G21D 1/02
2020/0298945 A1 * 9/2020 Rau Andersen ........ E02D 27/52
2021/0082591 A1 * 3/2021 Cella ....................... B63B 75/00

FOREIGN PATENT DOCUMENTS

CN 203826016 U * 9/2014
EP 3194633 A1 7/2017
JP H10282283 A * 10/1998
JP H1138172 A * 2/1999
KR 101239670 B1 * 3/2013
KR 20150049049 A * 5/2015
KR 101711579 B1 3/2017
KR 101985448 B1 * 6/2019
RU 2608843 C1 1/2017
WO 2016085347 A1 6/2016
WO 2017168381 A1 10/2017
WO 2017204749 A1 11/2017

OTHER PUBLICATIONS

International Preliminary Report on Patentability dated Oct. 1, 2020, for International Patent Application No. PCT/US2019/023724.

International Search Report and Written Opinion dated Aug. 6, 2019, for International Patent Application No. PCT/US2019/023724.

International Search Report and Written Opinion dated Mar. 25, 2020, for International Patent Application No. PCT/US2019/047228.

Nuclear Energy Centers: Industrial and Agro-Industrial Complexes, Oak Ridge National Laboratory ORNL-4290, Nov. 1968.

* cited by examiner

800

1800

3100

6400

9400

THREAT RESPONSE MATRIX

| Threat Category | Response Authority for Specific Threat | |
|---|---|---|
| | Host Nation Military | PNP Security Team |
| Air | •Military aircraft<br>•Hijacked commercial aircraft<br>•Missiles | •Light drones<br>•Light planes, helicopters |
| Surface | •Military craft<br>•Large vessels (e.g., tankers) | •Non-military craft |
| Subsurface | •Large submarines | •Mini-subs. torpedoes, small marene drones<br>•Divers (boarding, explosives delivery) |
| Internal (sabotage, etc) | - | •All |
| Cyberattack | - | •All |

FIG. 141

OFFSHORE AND MARINE VESSEL-BASED NUCLEAR REACTOR CONFIGURATION, DEPLOYMENT AND OPERATION

CROSS-REFERENCE TO RELATED APPLICATIONS

This United States Patent Application is a Continuation-In-Part Patent Application that claims the benefit of and relies for priority on International PCT Patent Application No. PCT/US2019/023724, filed on Mar. 22, 2019, and on International PCT Patent Application No. PCT/US2019/047228, filed on Aug. 20, 2019. International PCT Patent Application No. PCT/US2019/023724, filed on Mar. 22, 2019, claims the benefit of and relies for priority on U.S. Provisional Patent Application Ser. No. 62/646,614, filed Mar. 22, 2018. International PCT Patent Application No. PCT/US2019/047228, filed on Aug. 20, 2019, claims the benefit of and relies for priority on U.S. Provisional Patent Application No. 62/720,803, filed on Aug. 21, 2018, and U.S. Provisional Patent Application No. 62/720,823, filed on Aug. 21, 2018, and U.S. Provisional Patent Application No. 62/720,831, filed on Aug. 21, 2018. The entire contents of all of aforementioned patent applications are incorporated herein by reference.

FIELD

The methods and systems disclosed herein relate to advancements in marine nuclear reactor configuration, deployment and operation.

BACKGROUND

Advances in nuclear reactor technology open opportunities for safe deployment of long-life compact nuclear reactors on or in association with vessels and other ocean-based structures to provide locally accessible, portable low-environmental impact electrical energy.

SUMMARY

Embodiments of a wide range of nuclear reactor-based power generation systems for marine use are disclosed herein. Examples include semi-permanent, non-self-propelled and stationary-deployed maritime vessels (Micro-MPS) suitable for international deployment. Such a vessel may house microreactors, as well as the necessary auxiliary power systems required to constitute a single-integrated, turnkey nuclear power generating station. No land-based facilities installed at the deployment site are required for electricity generation. The vessel can integrate different types of microreactors, including those designed specifically for civil power generation that may optionally use non-military enriched uranium for energy production, such as High Assay Low Enriched Uranium (HALEU). Microreactors can be bundled to generate electrical power ranging anywhere from 1 MWe to 100 MWe or more. Manufactured and outfitted with nuclear components in a controlled environment, such as a shipyard, the vessel can be either dry- or wet-towed to a deployment location. At the deployment location, the vessel can either be installed near shoreline or outside territorial waters (e.g., greater than 12 nmi from shoreline), as either a seafloor-supported structure, or one which is floating moored in place. Once commissioned, the Micro-MPS will generate electrical and thermal energy for offshore industrial purposes, or supply energy directly to land. The vessel is easily transportable and could be de-installed for redeployment to secondary sites at any point during its 40-60-year lifetime.

Other examples of the nuclear reactor-based marine energy power generation systems described herein include, without limitation, self-propelled maritime vessels powered by nuclear reactors, such as microreactors, (herein Micro-PV) capable of traveling within sovereign waters and international waters. Microreactors, as well as the necessary auxiliary power systems required, may be packaged into a proprietary cassette referred herein to as a Microreactor Cassette (MRC), that further enables efficient turnkey integration into the vessel. Different types of microreactor designs, including those developed specifically for civil power generation that may optionally use HALEU as a power source can be integrated, and multiple MRCs can be bundled to generate electrical power ranging anywhere from 1 MWe to 100 MWe or more. The microreactors supply baseload power, while optional low power output gas turbines (or other alternative fuel/engine types, based on customer requirements) integrated on board may serve as back-up, supplemental or substitute power. The vessel itself may be manufactured and outfitted with nuclear components in a controlled environment, such as at a shipyard, and once commissioned, the Micro-PV can be propelled by up to 100% nuclear power. During a voyage, the vessel may dock in sovereign territories to load or unload cargo or perform maintenance or refueling activities. In embodiments, a dock for loading or unloading cargo, performing maintenance or refueling activities may alternatively be disposed in international waters and may form a floating distribution center/transfer station and the like. One or more such hubs may be located proximal to specific regions so that smaller vessels could service the needs of the region through the floating station. In jurisdictions where the nuclear power system may be required to shut down in order to enter port, the onboard alternative power source will be used to power the vessel and maneuver it in and out of territorial jurisdictions. Once in international waters, the Micro-PV will be switched back to up to 100% nuclear power.

Yet other examples include a semi-permanent, non-self-propelled and stationary-deployed maritime vessel suitable for international deployment. The vessel may house Small Modular Reactors (SMR)s, as well as the necessary auxiliary power systems required to constitute a single-integrated, turnkey nuclear power generating station. No land-based facilities installed at the deployment site are required for electricity generation. The vessel can integrate different types of SMRs, including those designed for civil power generation that may optionally use non-military enriched uranium for energy production (e.g., HALEU and the like), and SMRs can be bundled to generate electrical power ranging anywhere from 30 MWe to 600 MWe. Manufactured and outfitted with nuclear components in a controlled environment, such as a shipyard, the vessel may be either dry- or wet-towed to a deployment location. At the deployment location, the vessel can either be installed near shoreline or outside territorial waters (e.g., greater than 12 nmi from shoreline), as either a seafloor-supported structure or one which is floating moored in place. Once commissioned, the SMR-MPS may generate electrical and thermal energy for offshore industrial purposes, or supply energy directly to land. The vessel is easily transportable and could be de-installed for redeployment to secondary sites, at any point during its nearly 60-year lifetime.

Disclosed herein are methods and systems of microreactor deployment including a microreactor cassette that includes a plurality of arrayed compartments, each of the plurality of arrayed compartments constructed to receive and securely anchor a modular microreactor enclosure. The microreactor cassette further may include a plurality of thermal channels disposed to facilitate thermal transfer from a modular microreactor enclosure in one of the arrayed compartments to a heat sink medium; the plurality of thermal channels disposed along at least one vertical surface of the modular microreactor enclosure, wherein the plurality of thermal channels are interconnected to provide redundancy. The microreactor cassette further may include a plurality of anti-proliferation containment layers disposed between the arrayed compartments, below a lowermost compartment, above an uppermost compartment, and along at least two vertical sides of the arrayed compartments. The microreactor cassette further may include an encapsulation layer disposed to encapsulate the plurality of arrayed compartments. The microreactor cassette further may include vessel compartment anchoring features disposed at least at each of an upper extent and a lower extent of the plurality of arrayed compartments. In embodiments, the heat sink medium is convective air. In embodiments, the heat sink medium is seawater. In embodiments, the heat sink medium is mechanically forced air. In embodiments, the thermal transfer channels may include a plurality of convection airflow channels disposed to facilitate convective airflow along the at least one vertical surface of the modular microreactor enclosure. In embodiments, the microreactor cassette further may include an HVAC system disposed in a first of the plurality of arrayed compartments, wherein the HVAC system facilitates thermal regulation of at least one modular microreactor disclosed in a second of the plurality of arrayed compartments. Yet further the microreactor cassette may include an electricity delivery system that facilitates connection among electricity output connectors for a plurality of microreactors disposed in the plurality of arrayed compartments and further connection to a vessel propulsion system. In embodiments, the modular microreactor enclosure may be a twenty-foot equivalent (TEU) cargo container.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the present disclosure.

Reference throughout the specification to “one embodiment” or “an embodiment” means that a particular feature, structure, or characteristic described in connection with an embodiment is included in at least one embodiment of the subject matter disclosed. Thus, the appearance of the phrases “in one embodiment” or “in an embodiment” in various places throughout the specification is not necessarily referring to the same embodiment.

Figure 1:
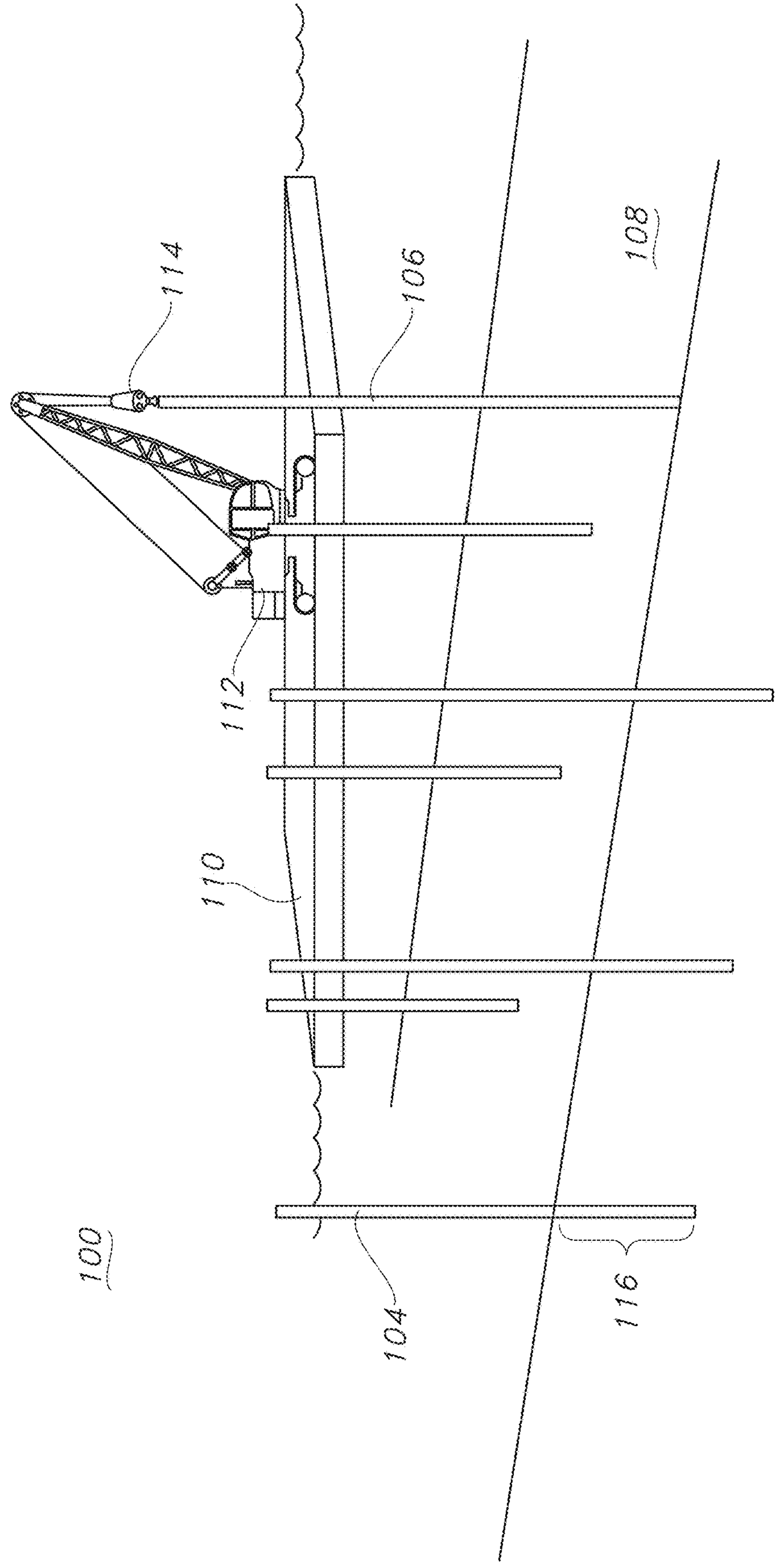
Figure 2:
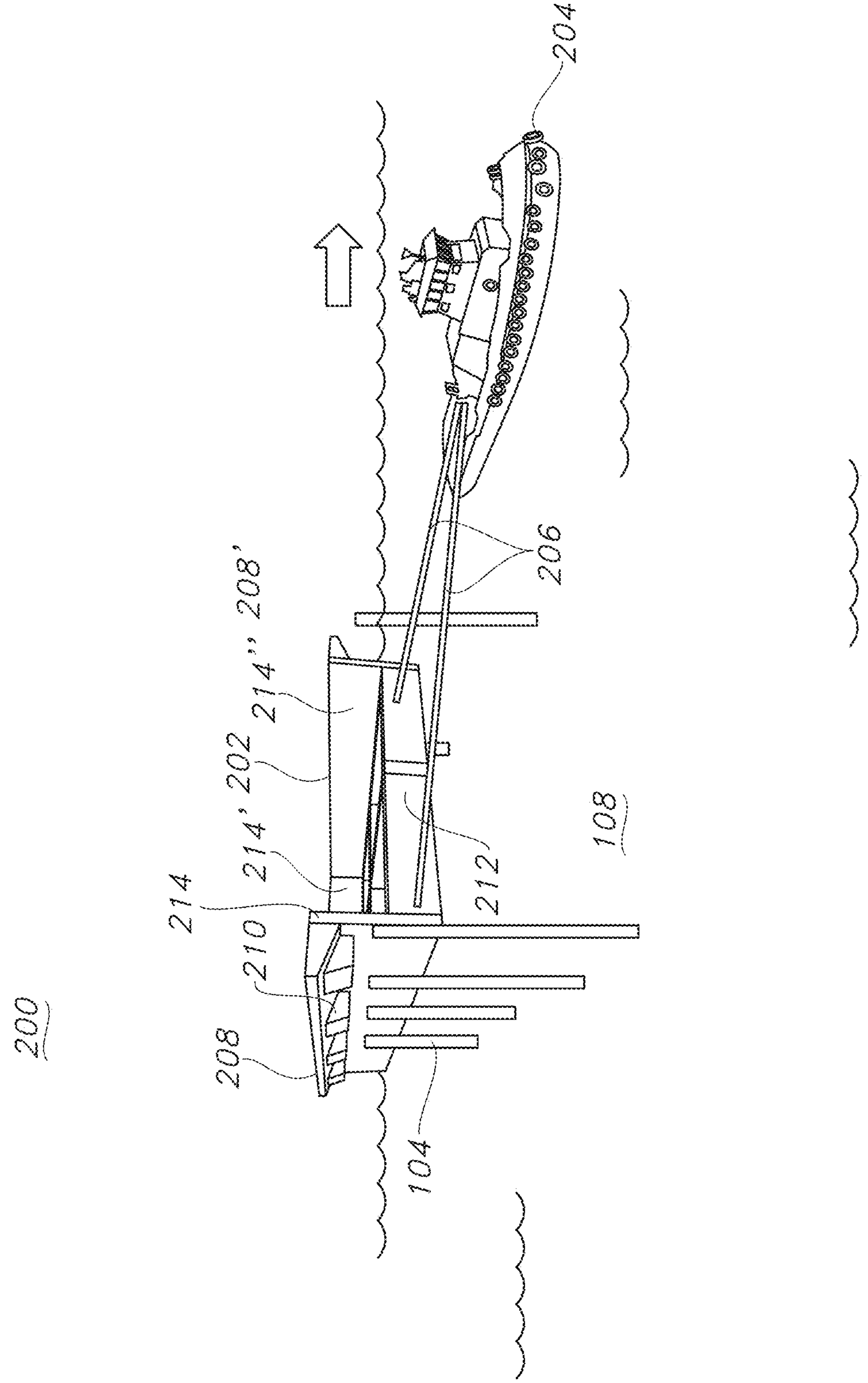
Figure 3:
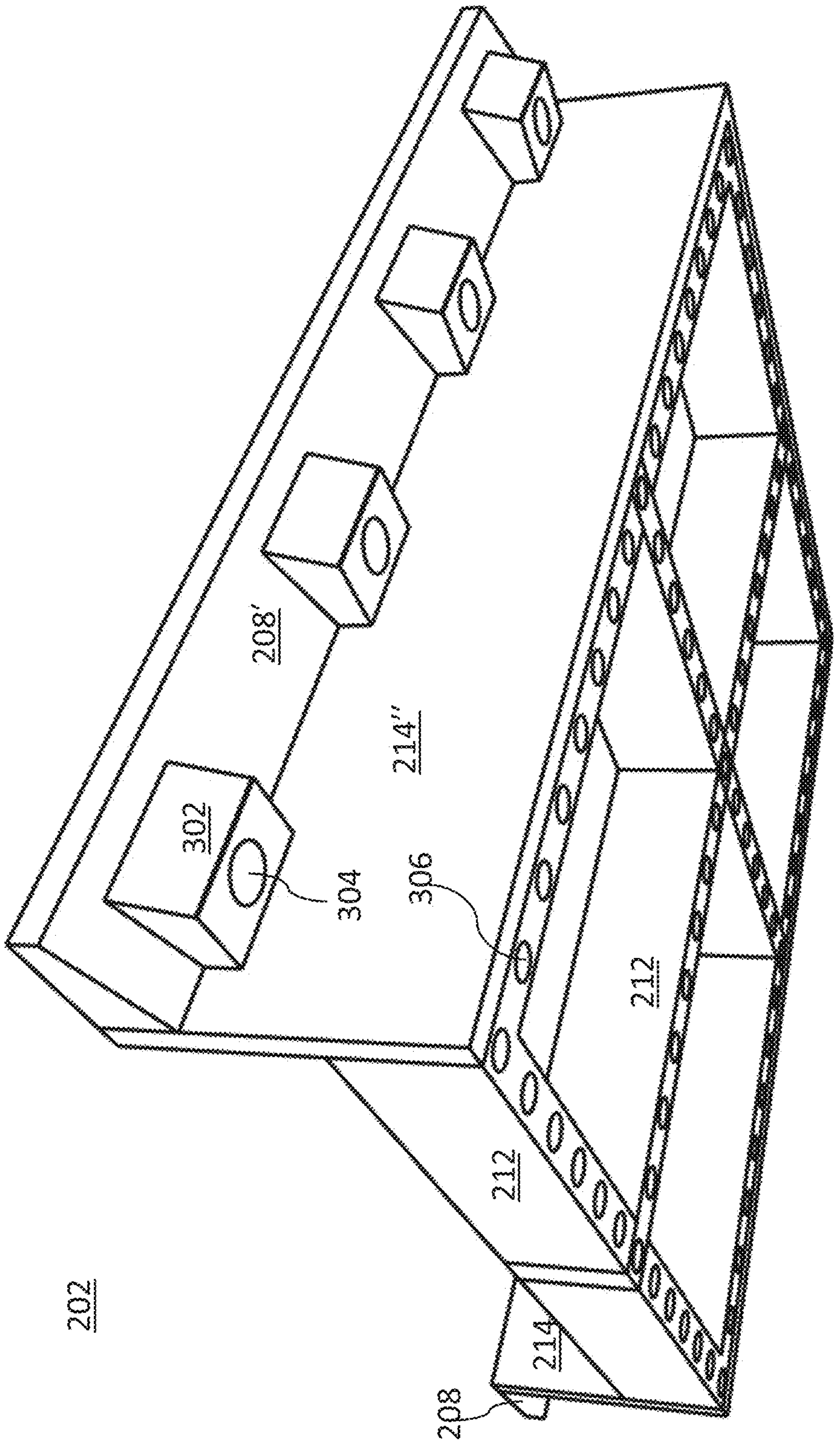
Figure 4:
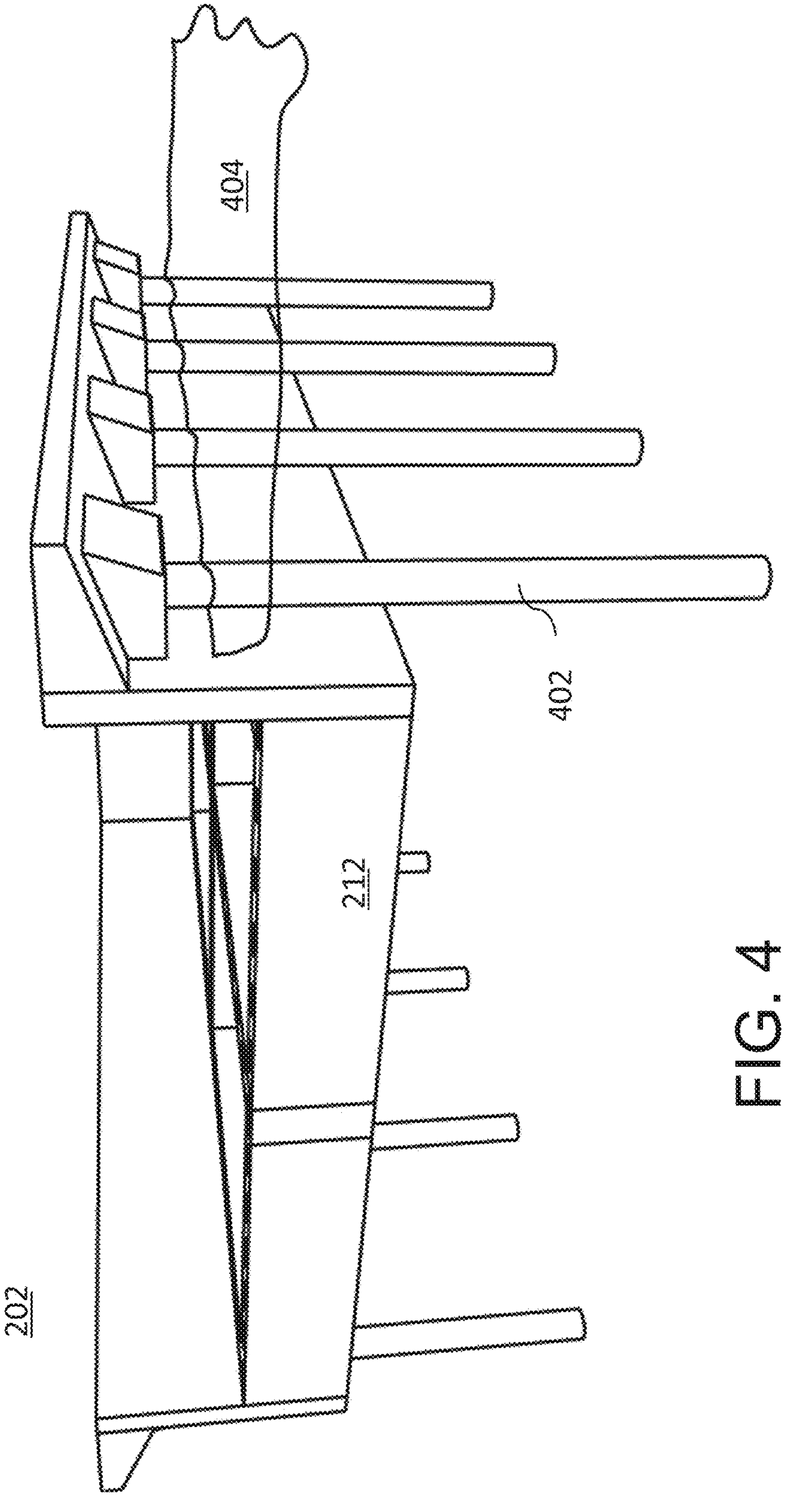
Figure 5:
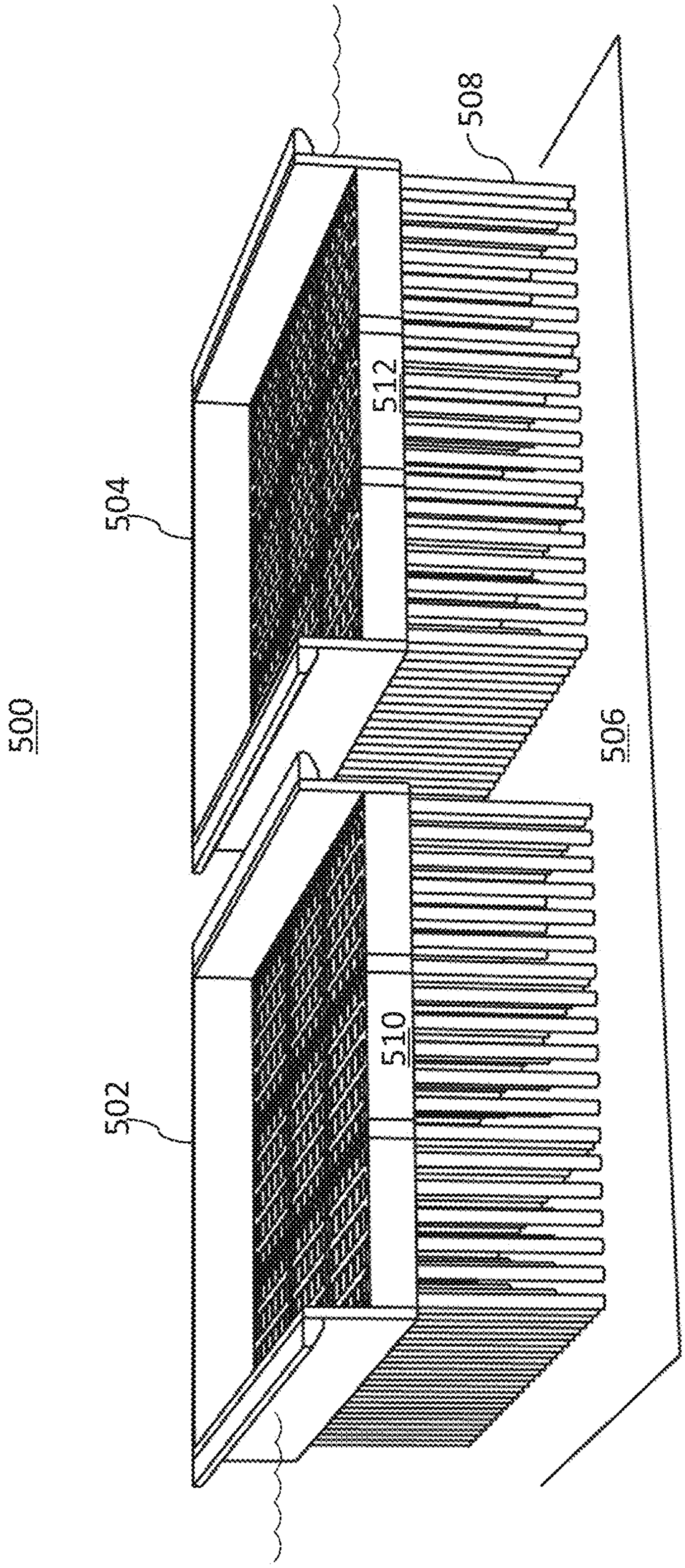
Figure 6:
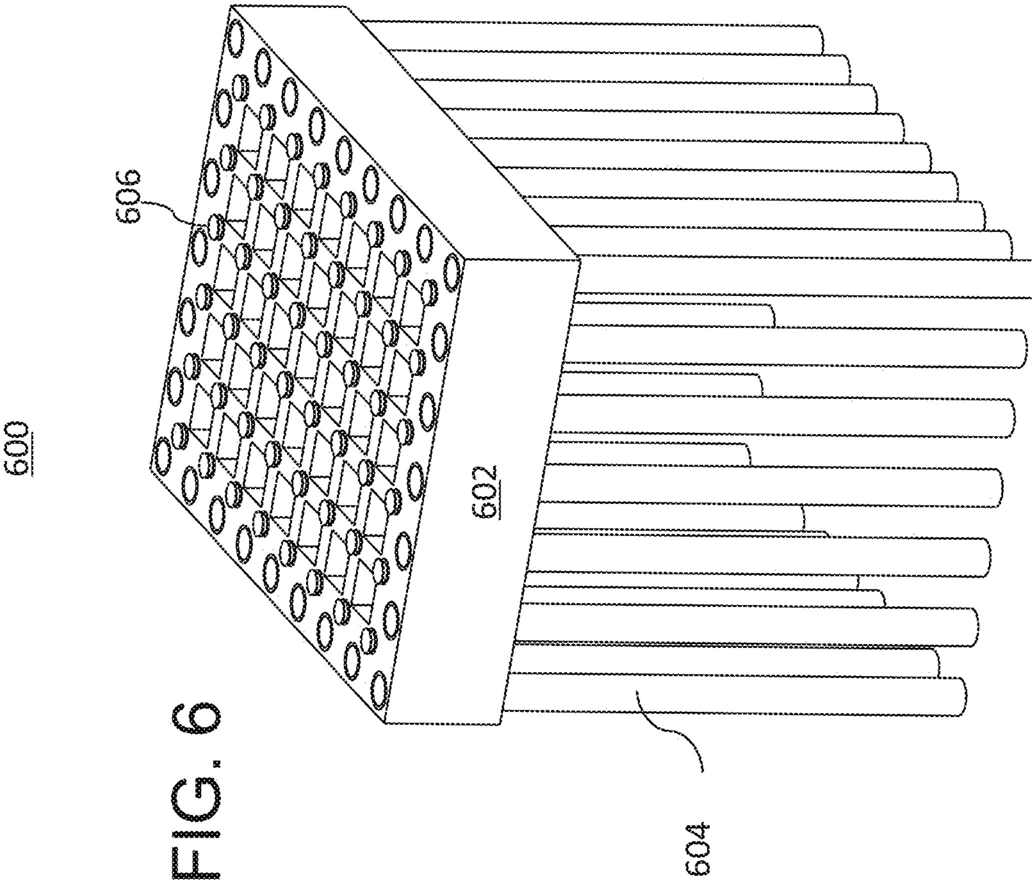
Figure 7:
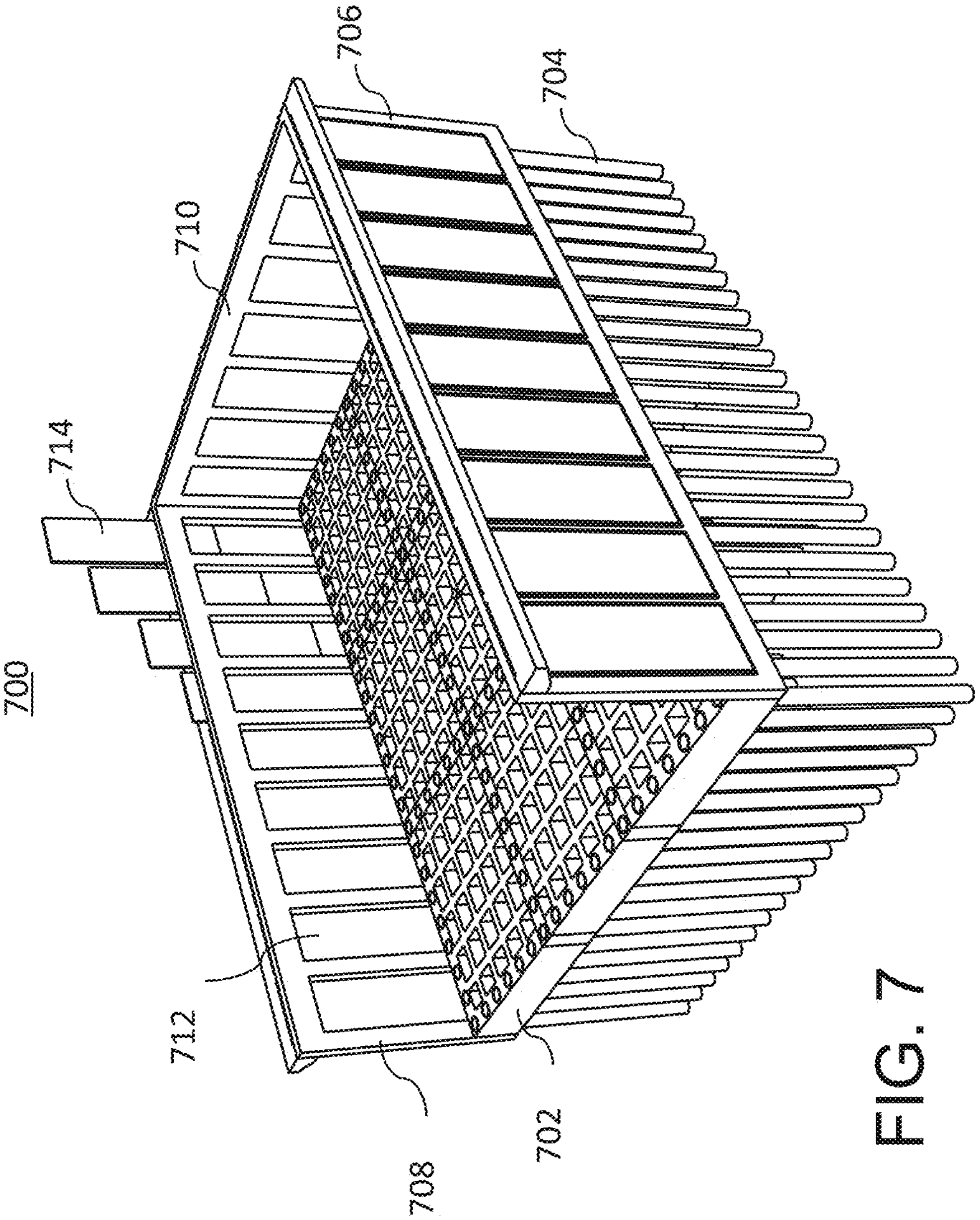
Figure 8A:
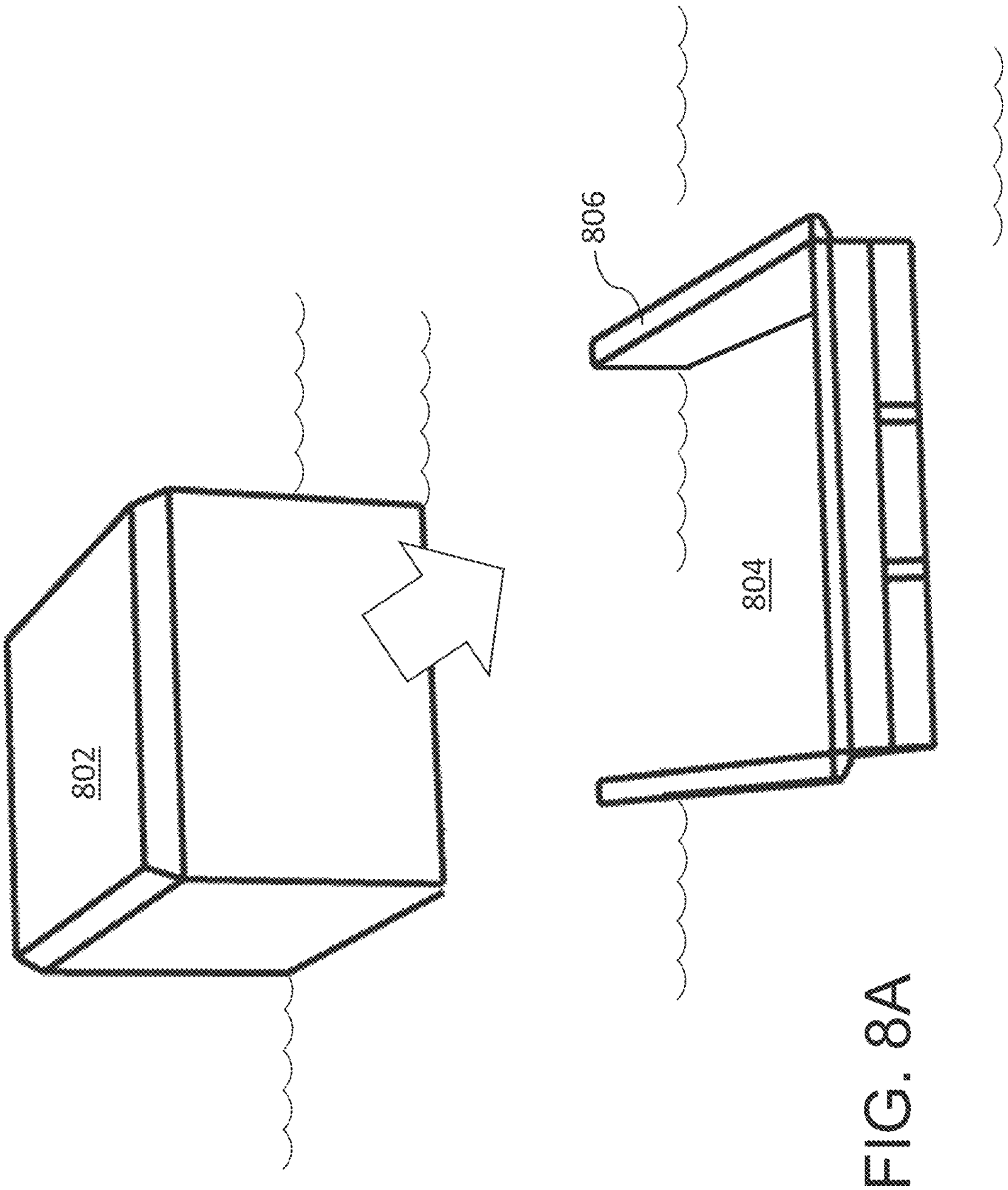
Figure 8B:
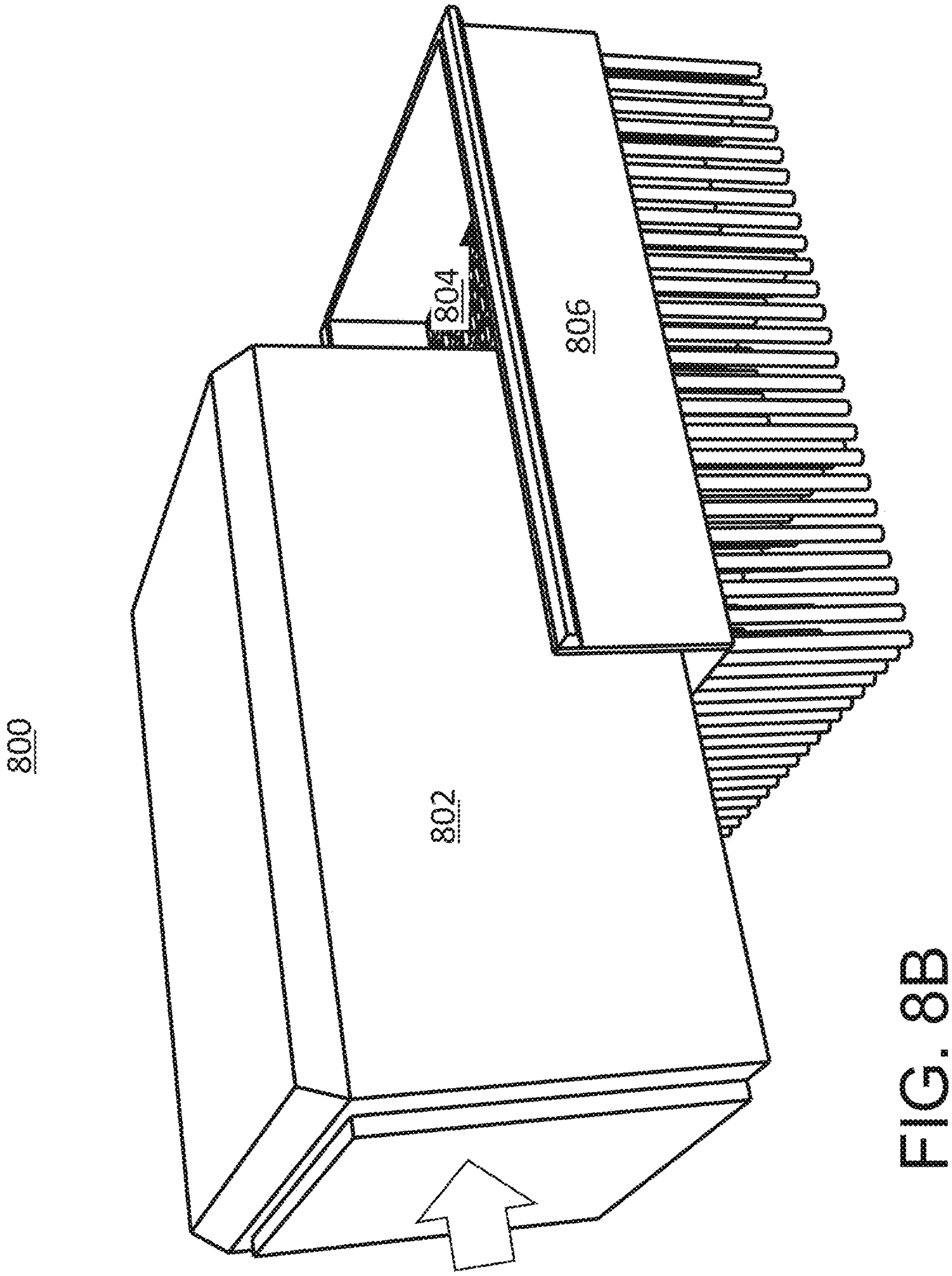
Figure 8C:
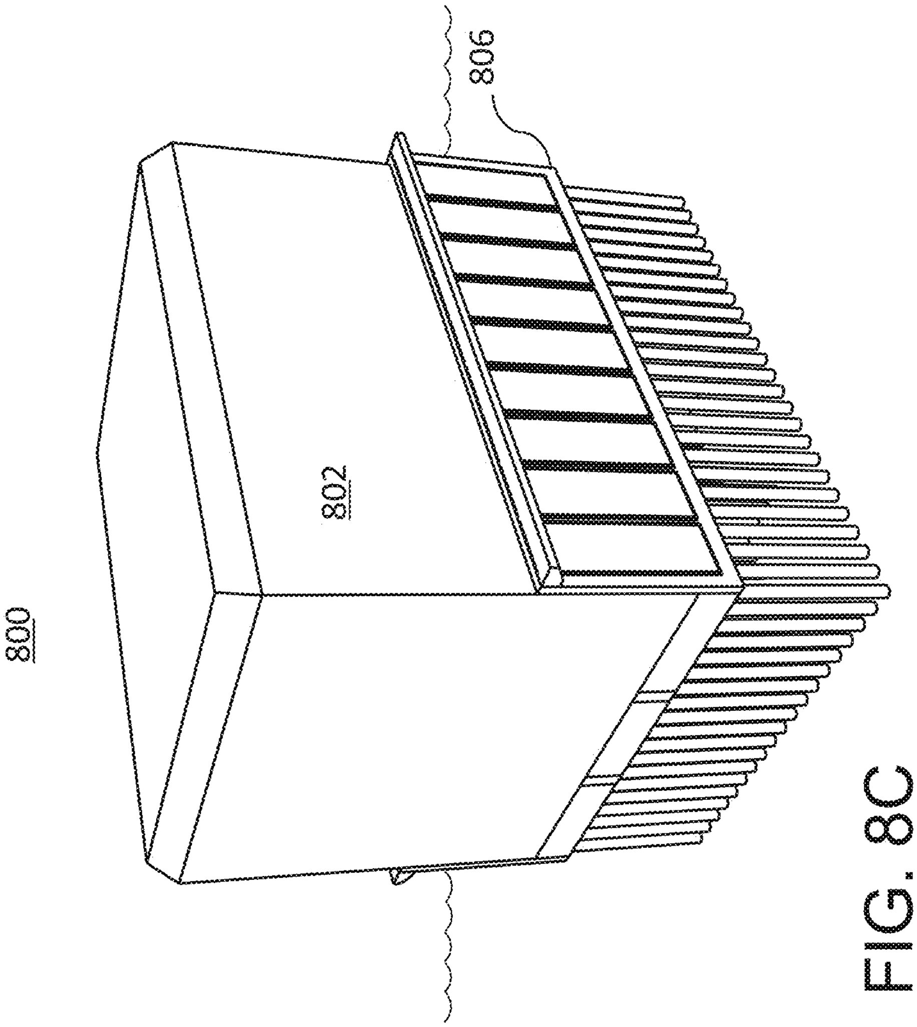
Figure 9:
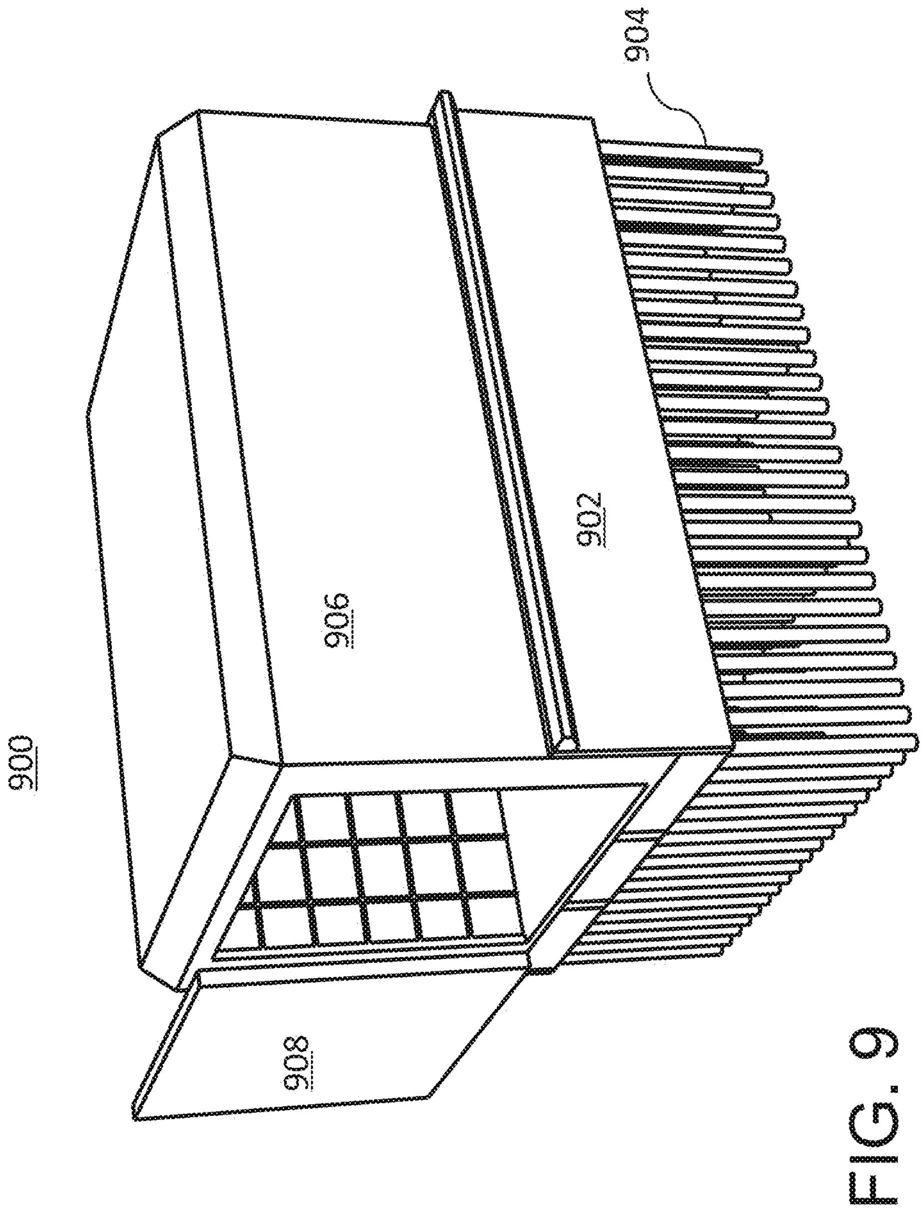
Figure 10:
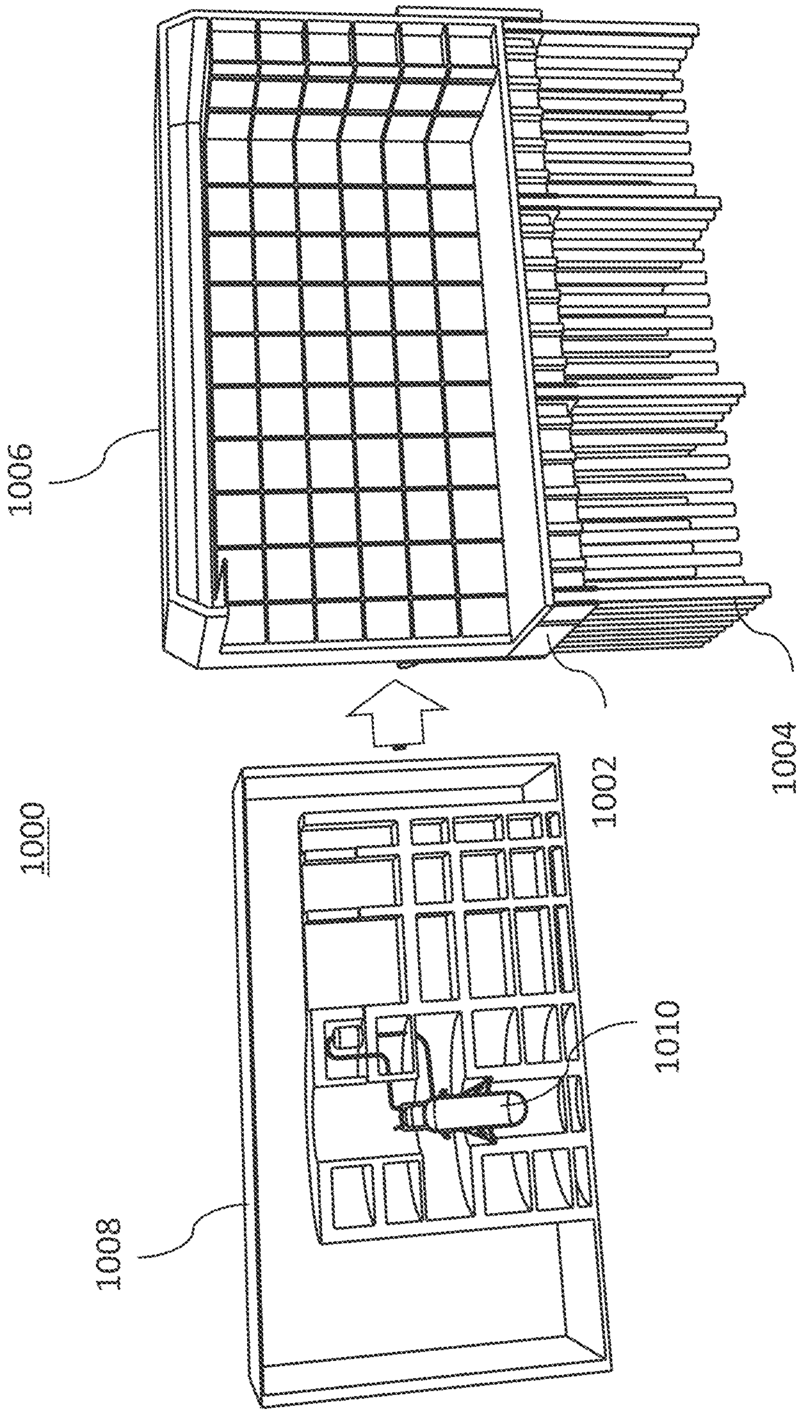
Figure 11:
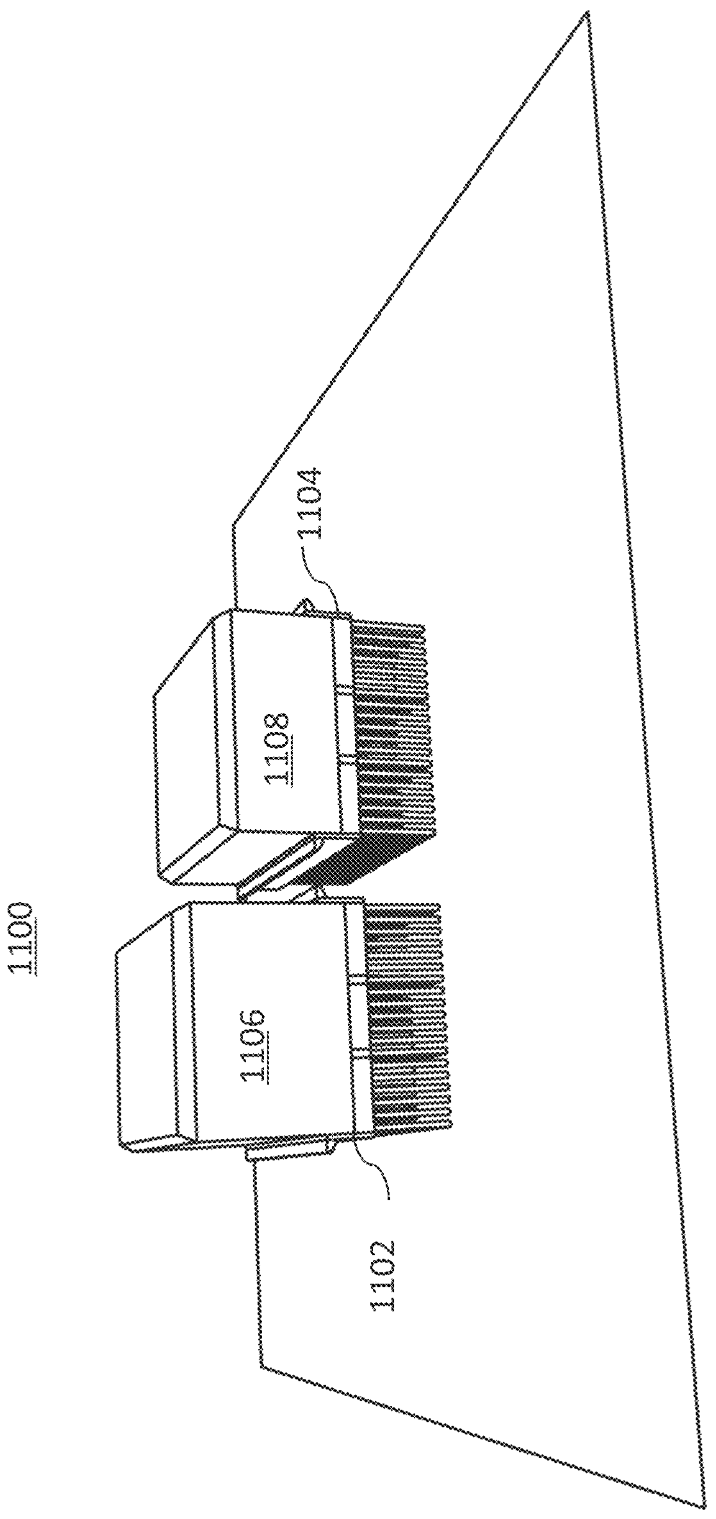
Figure 12:
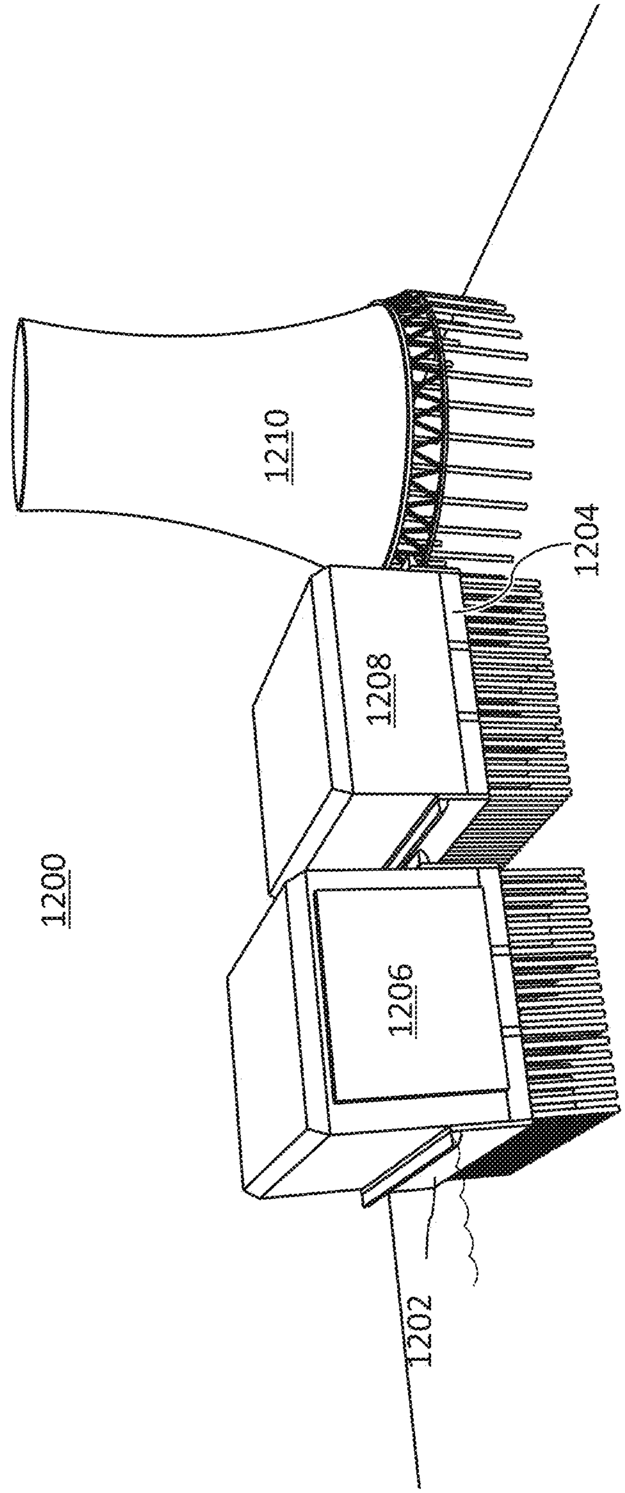
Figure 13:
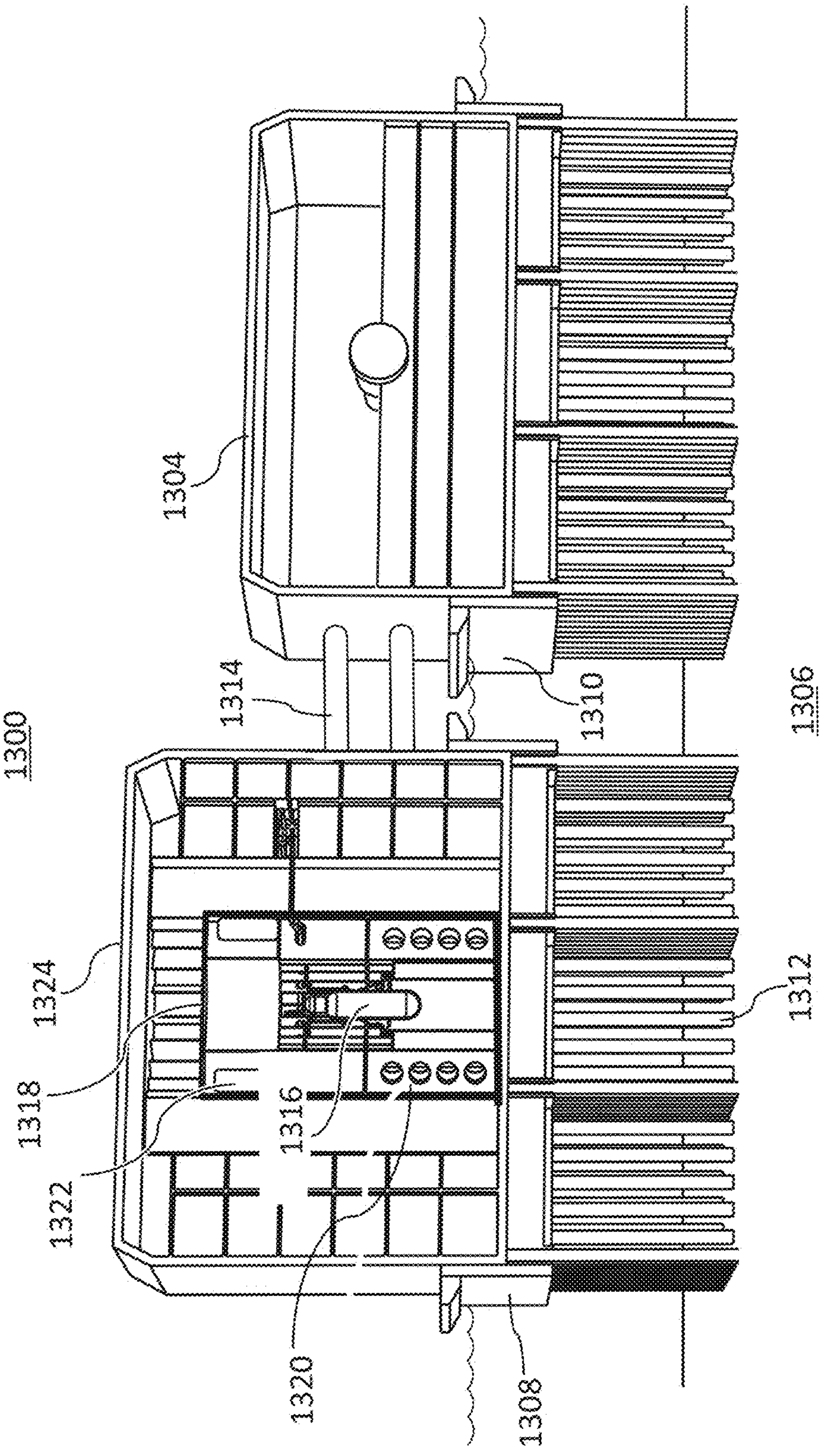
Figure 14:
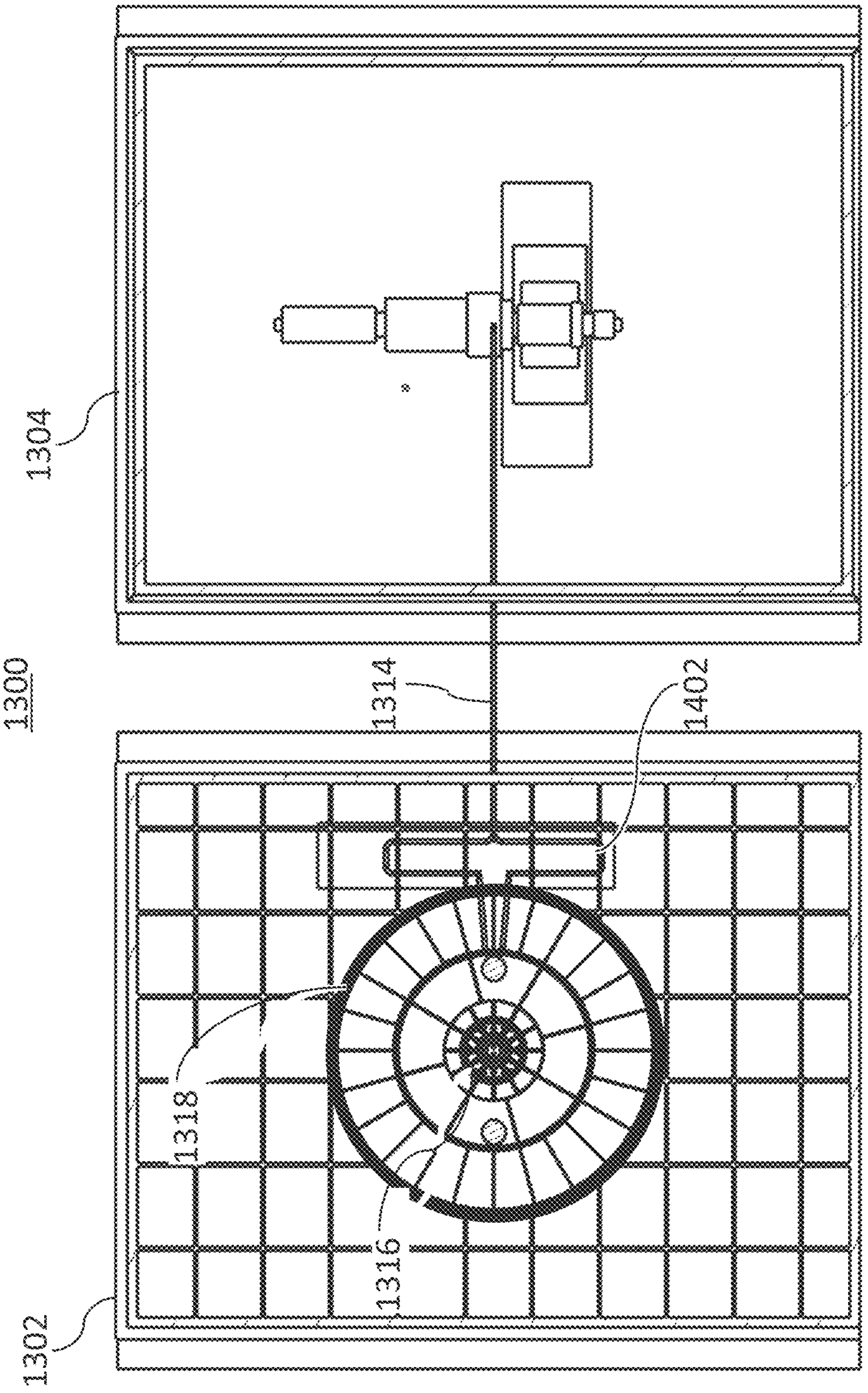
Figure 15:
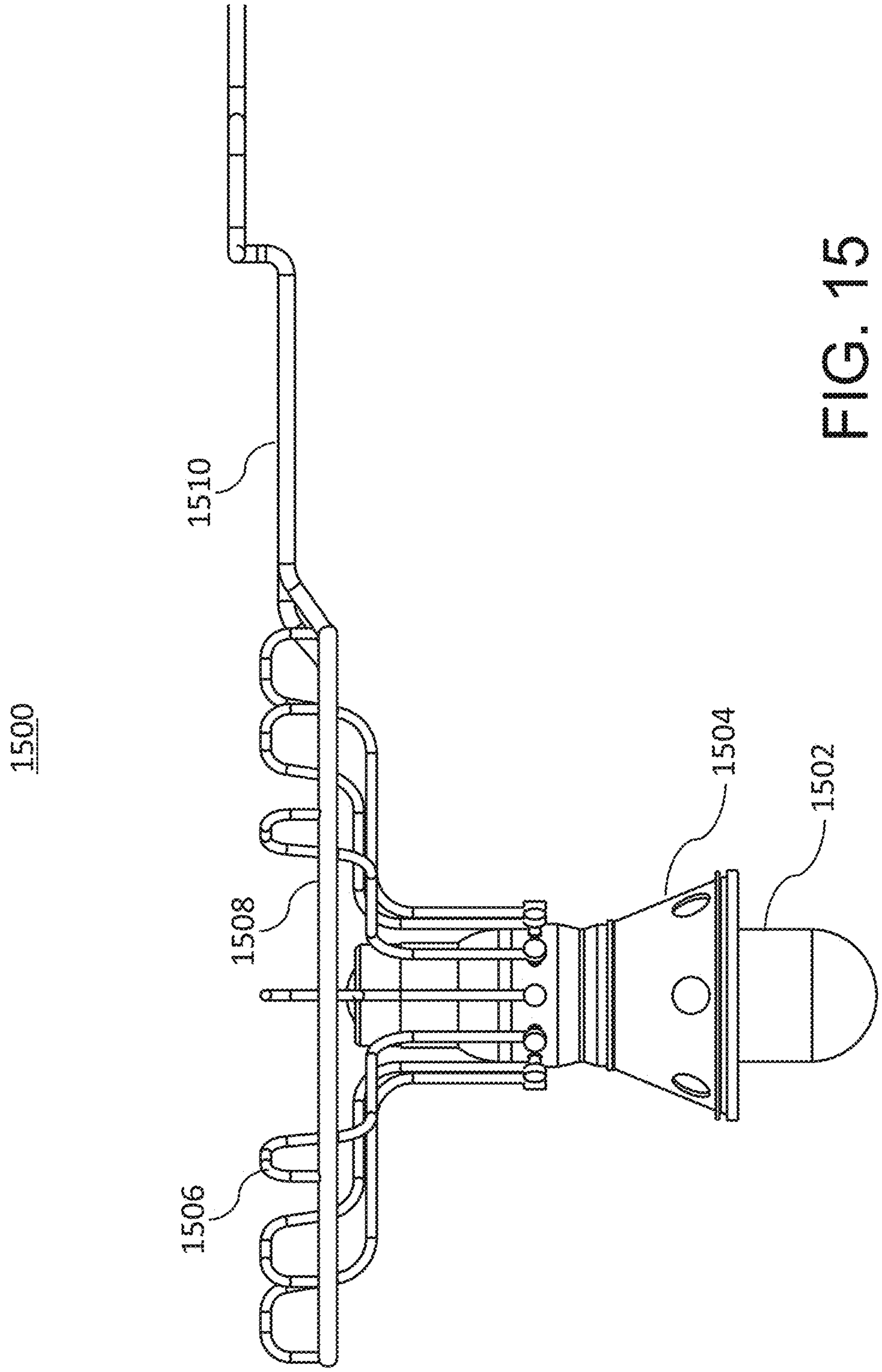
Figure 16:
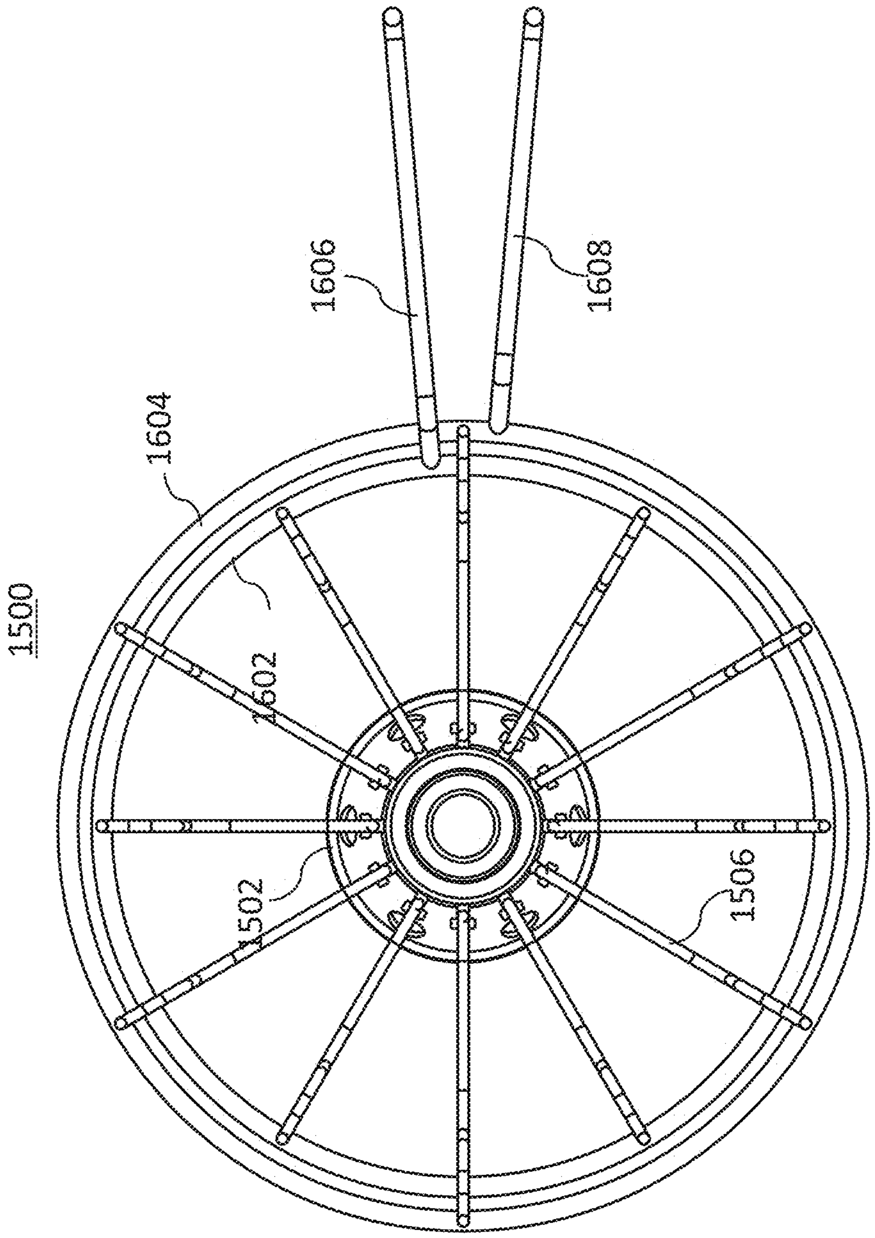
Figure 17:
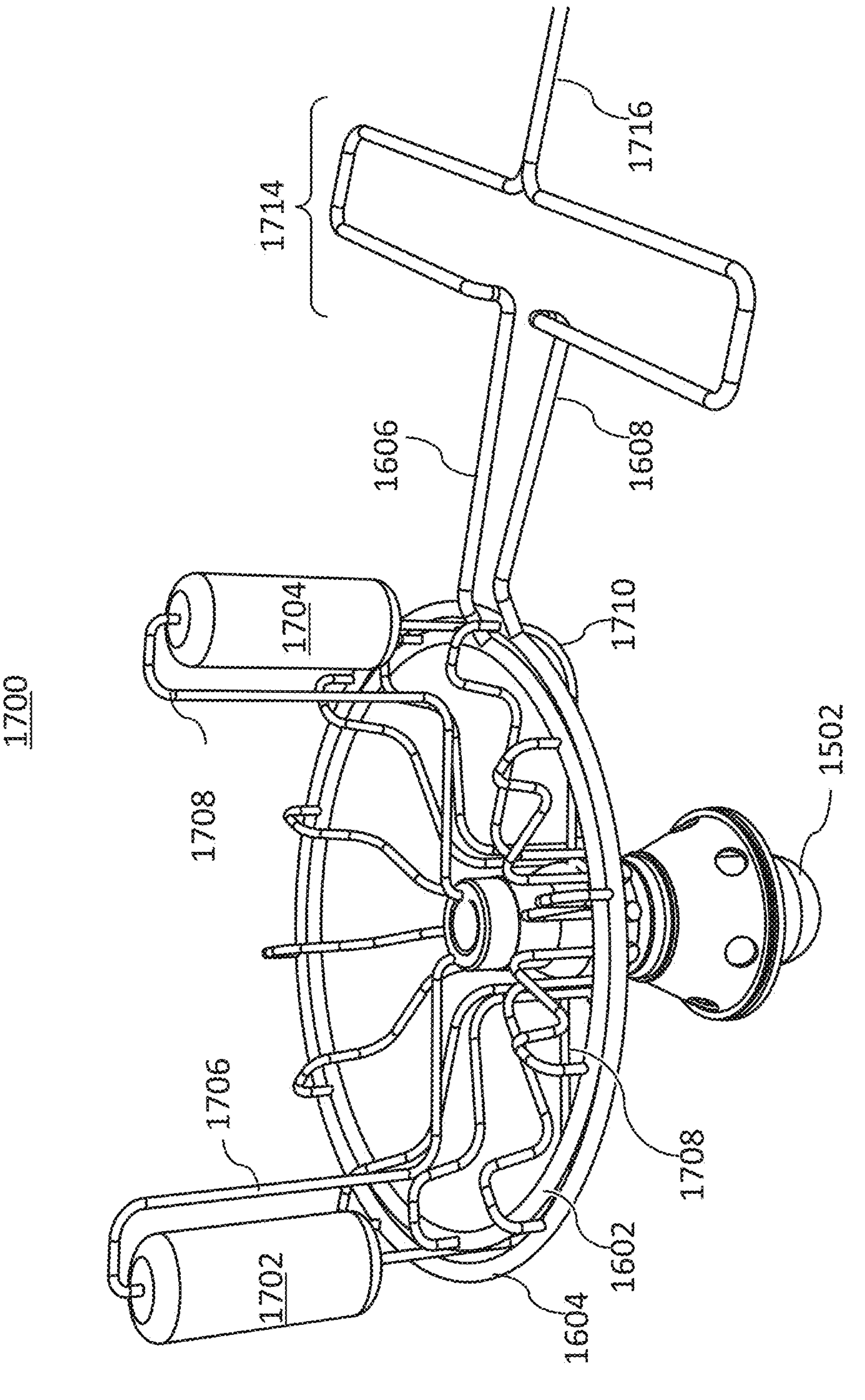
Figure 18:
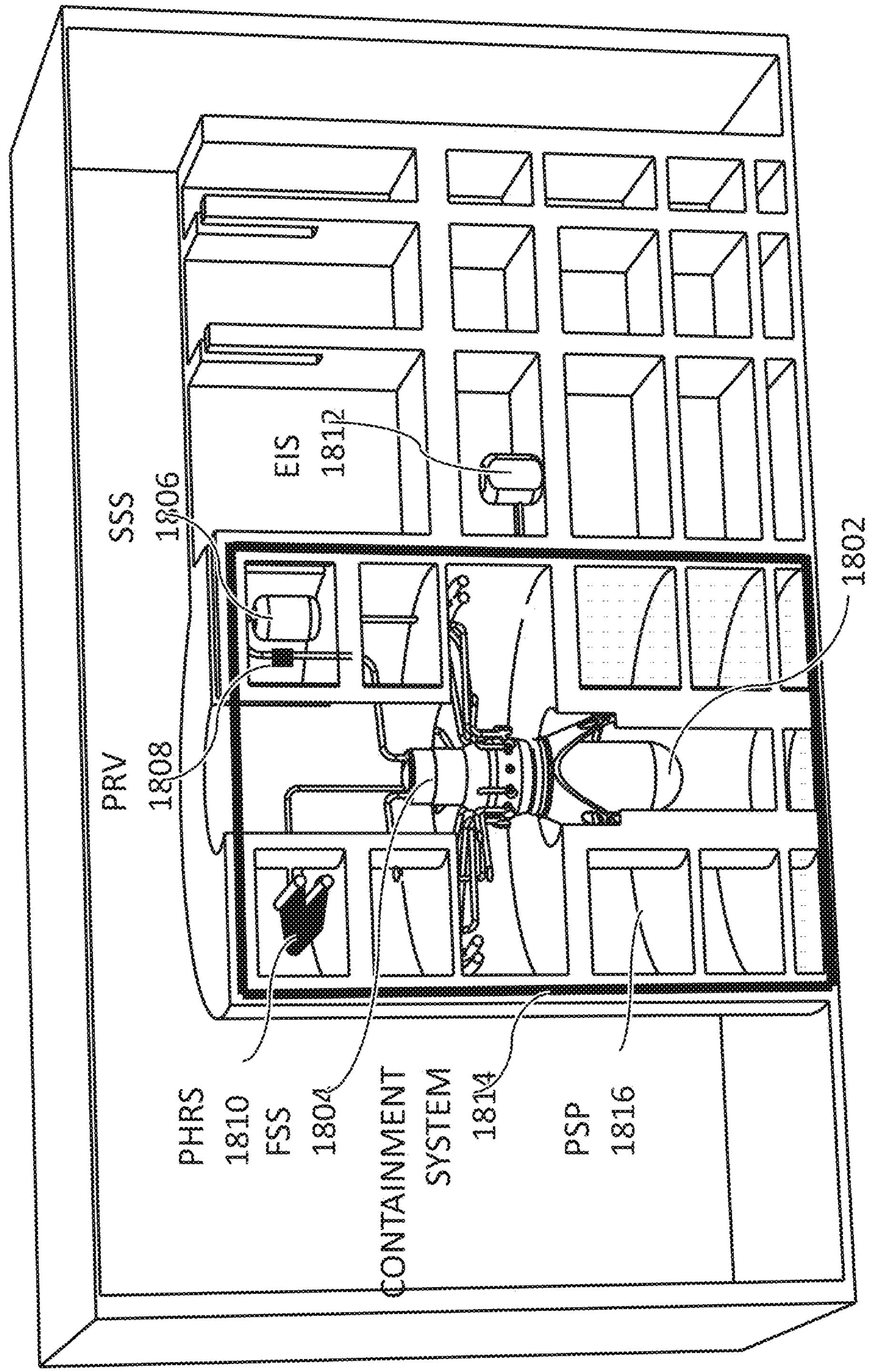
Figure 19:
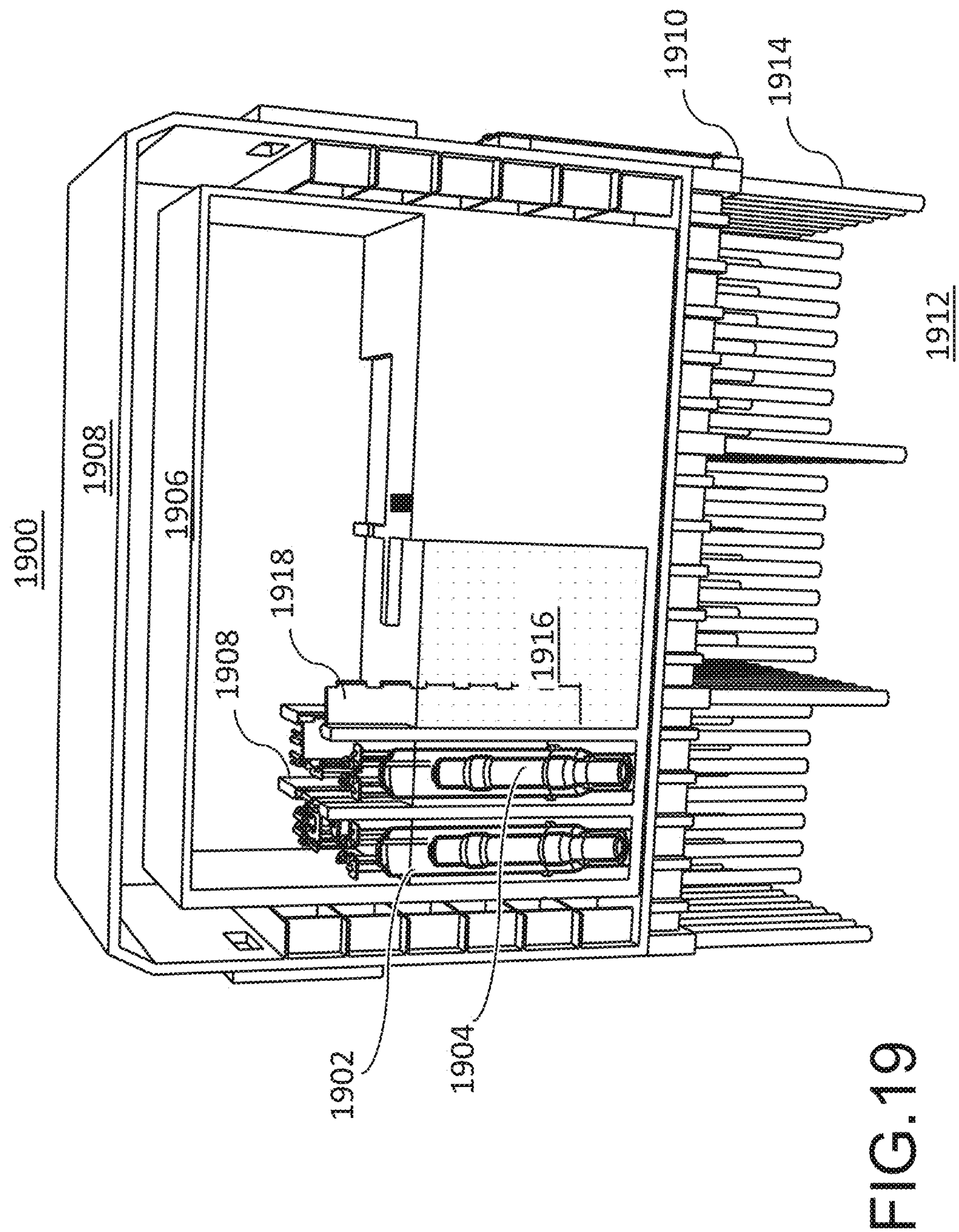
Figure 20:
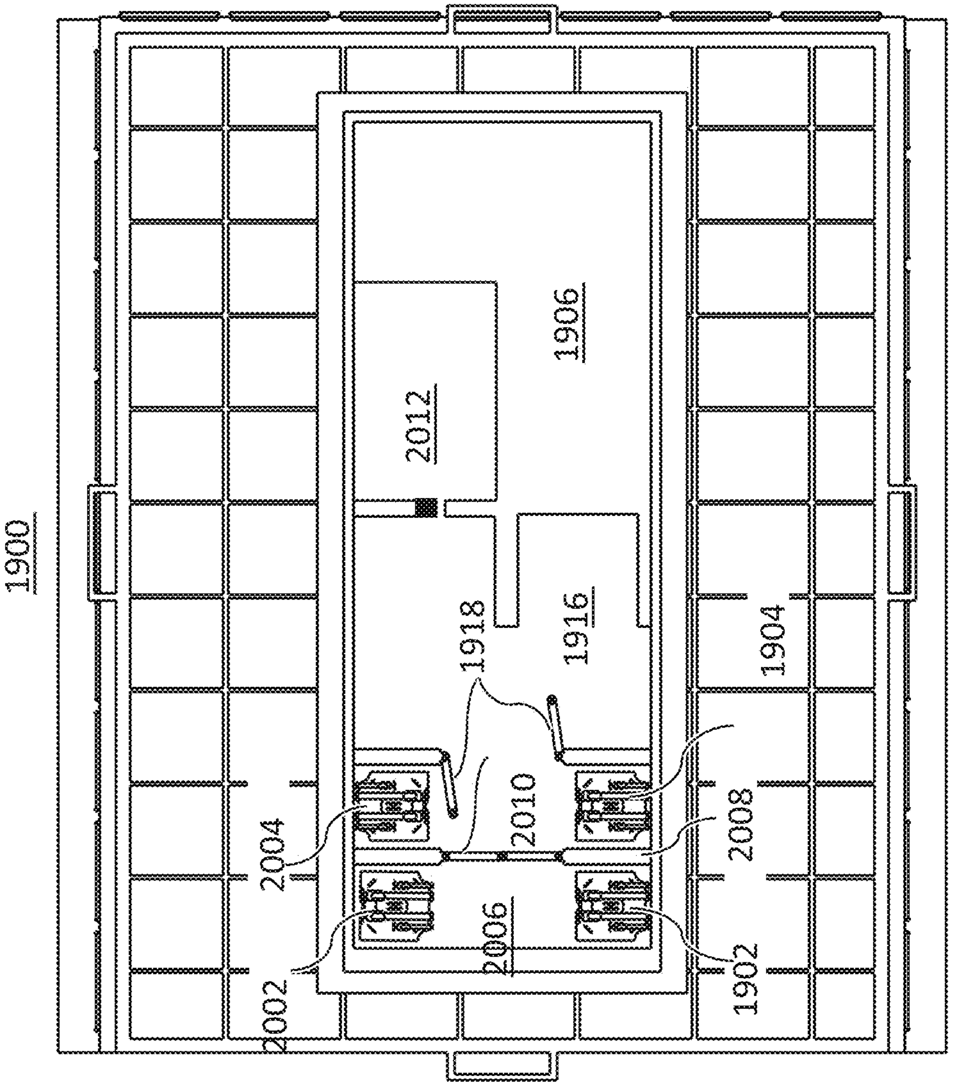
Figure 21:
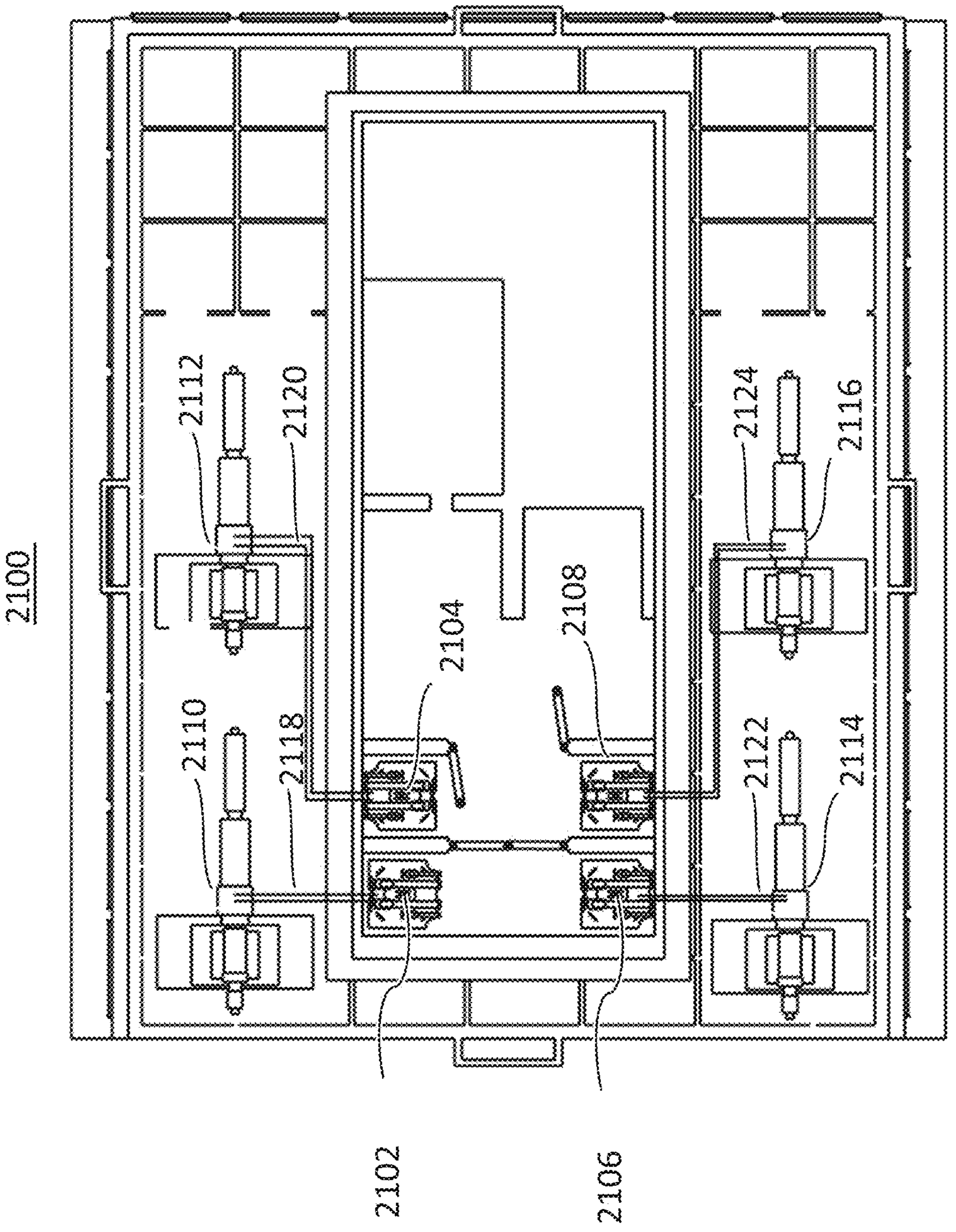
Figure 22A:
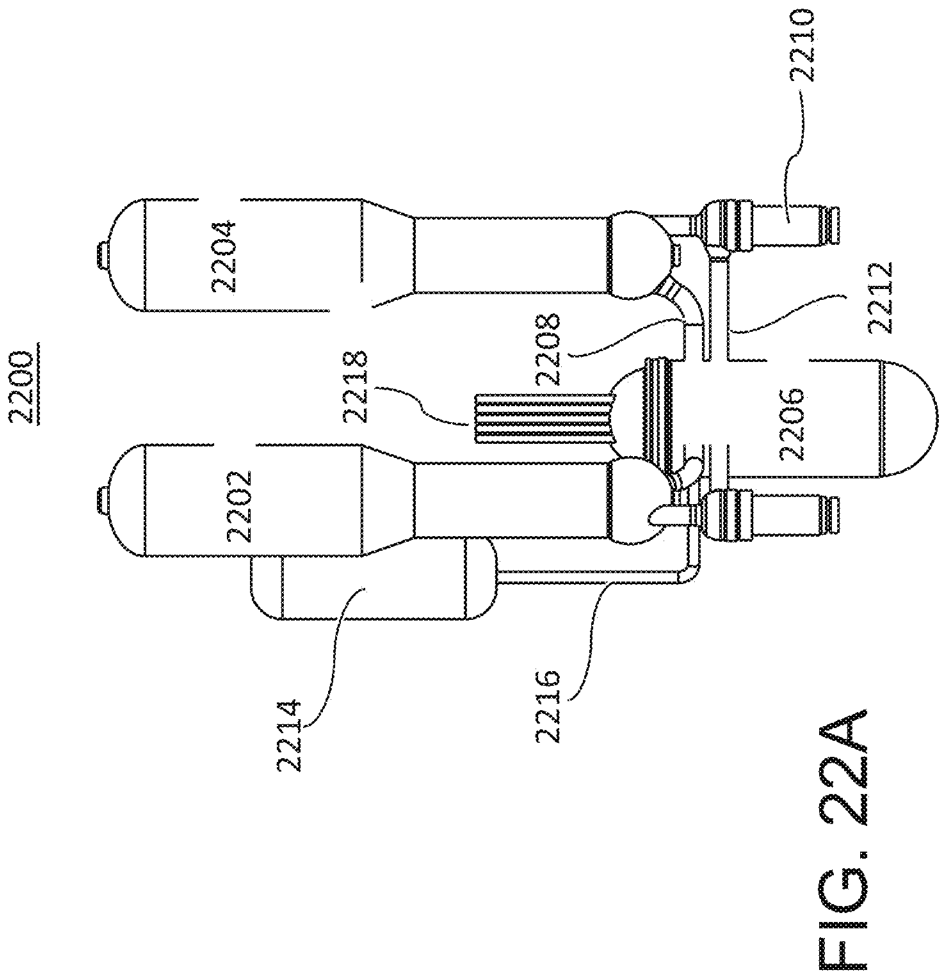
Figure 22B:
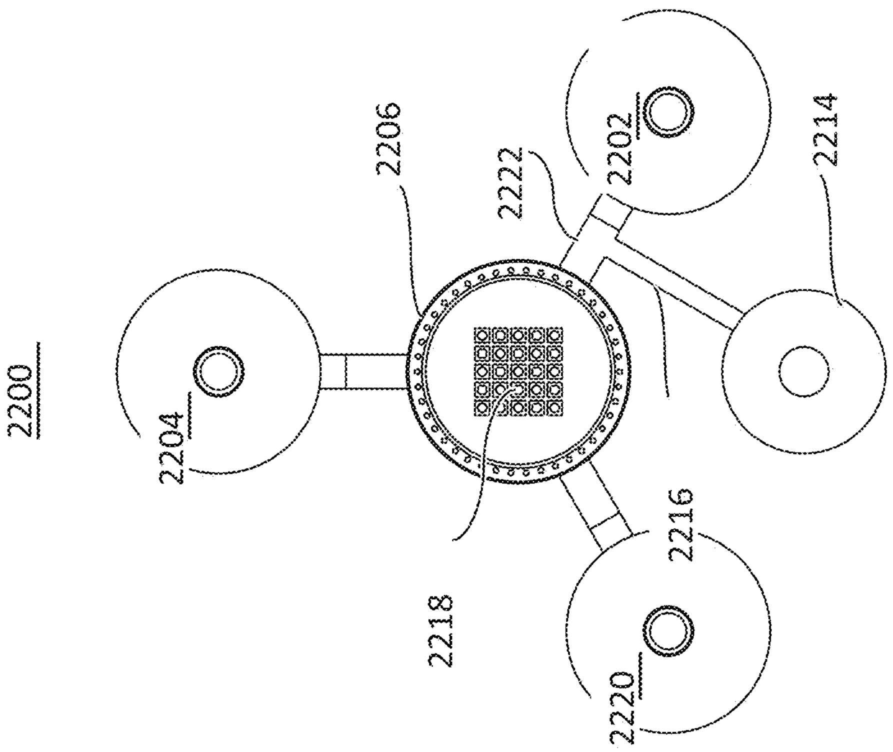
Figure 23:
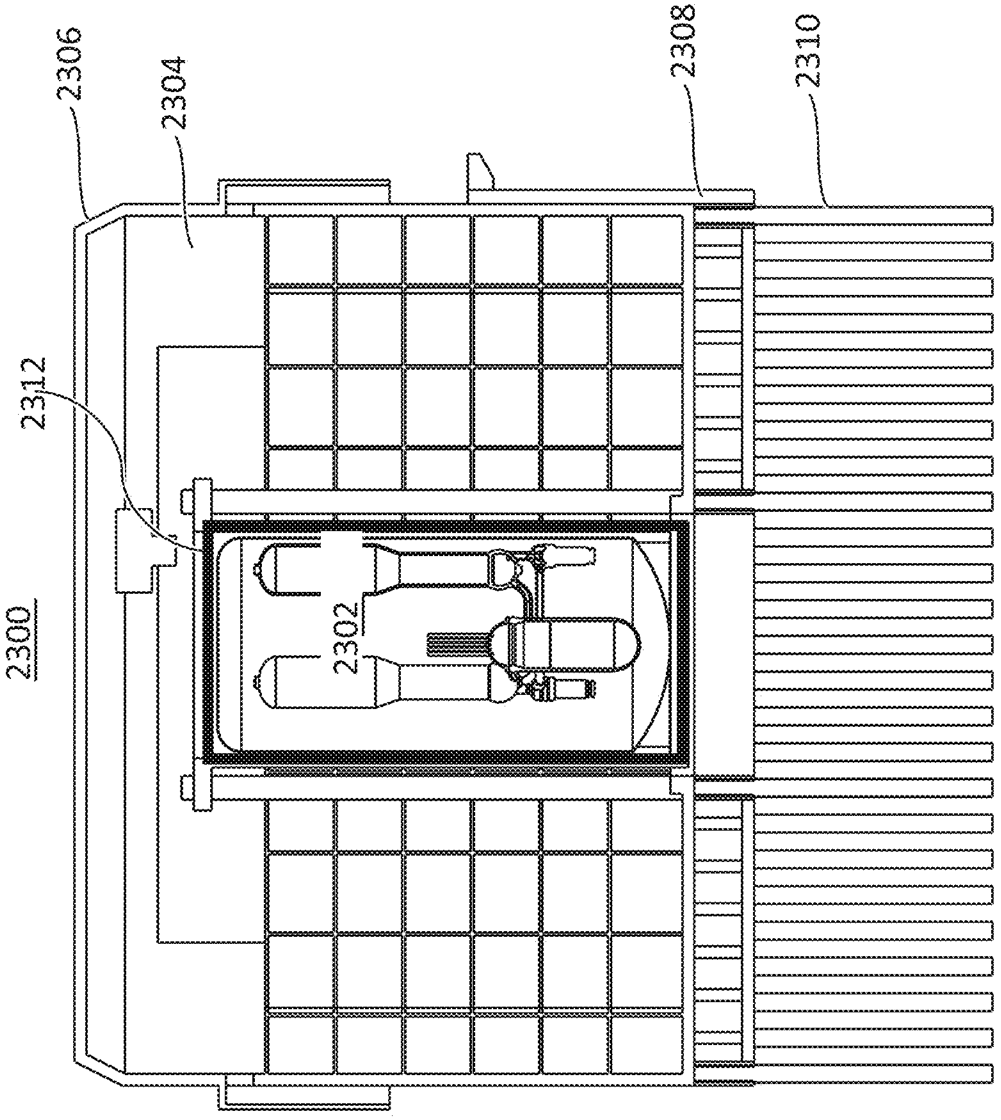
Figure 24:
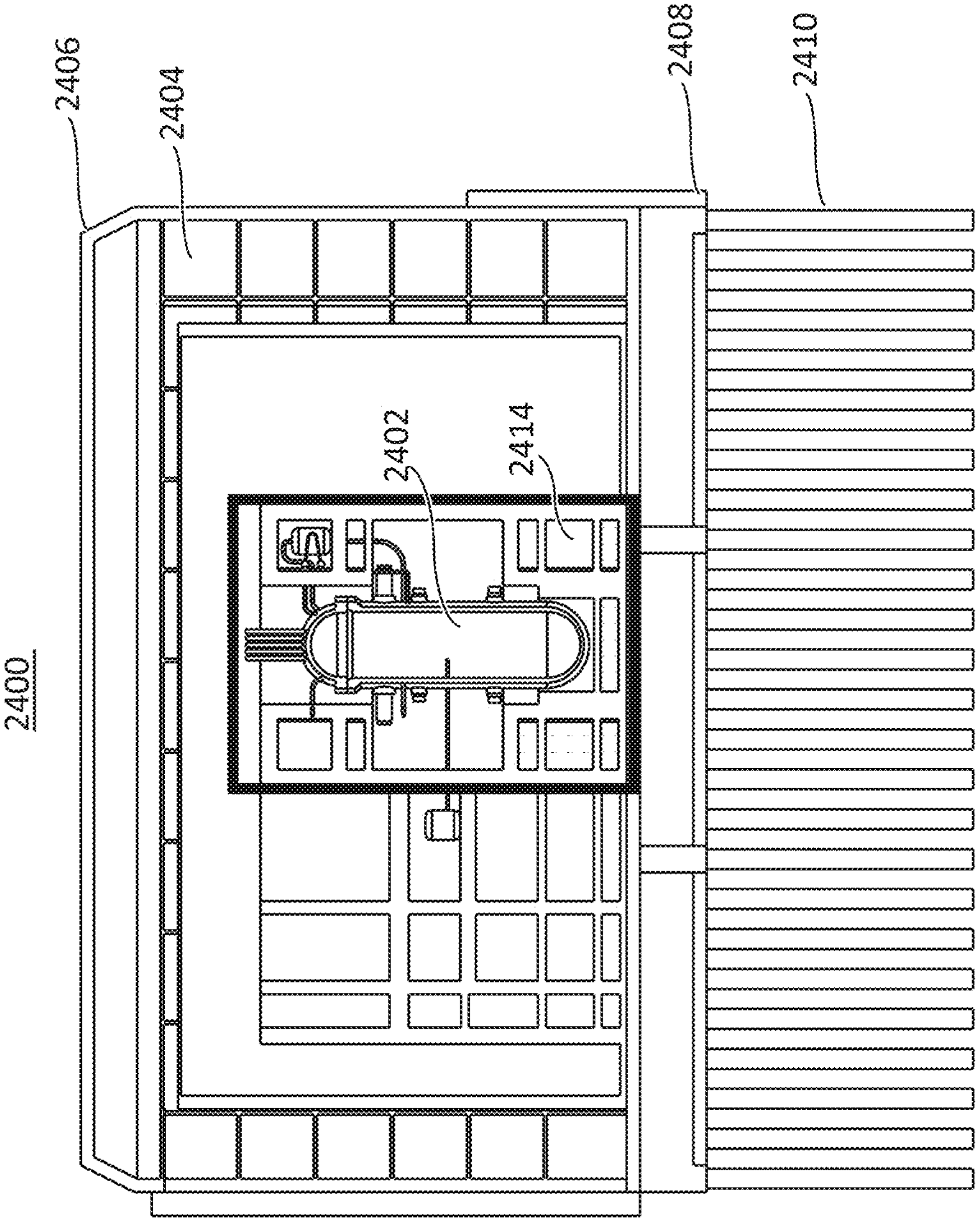
Figure 25:
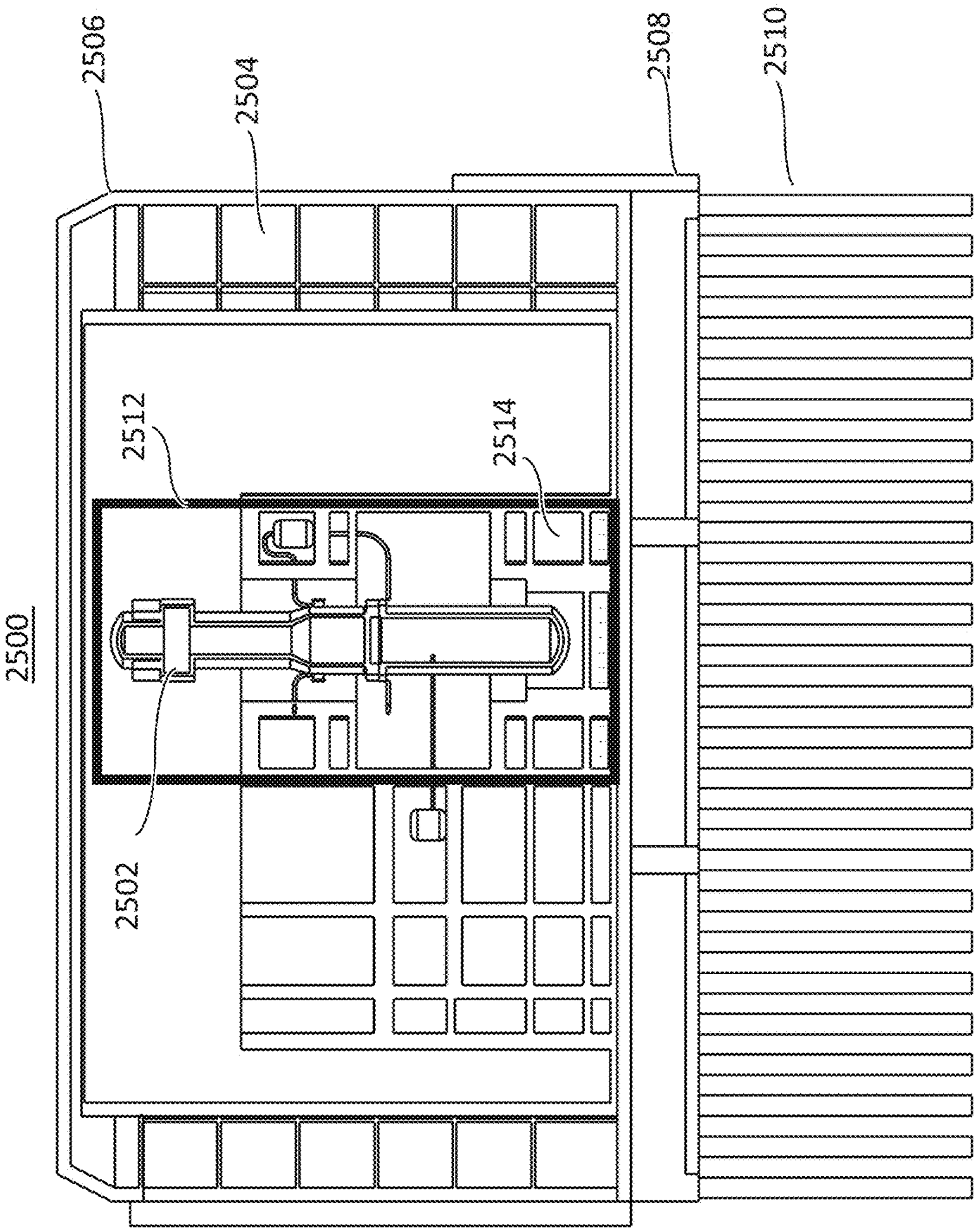
Figure 26:
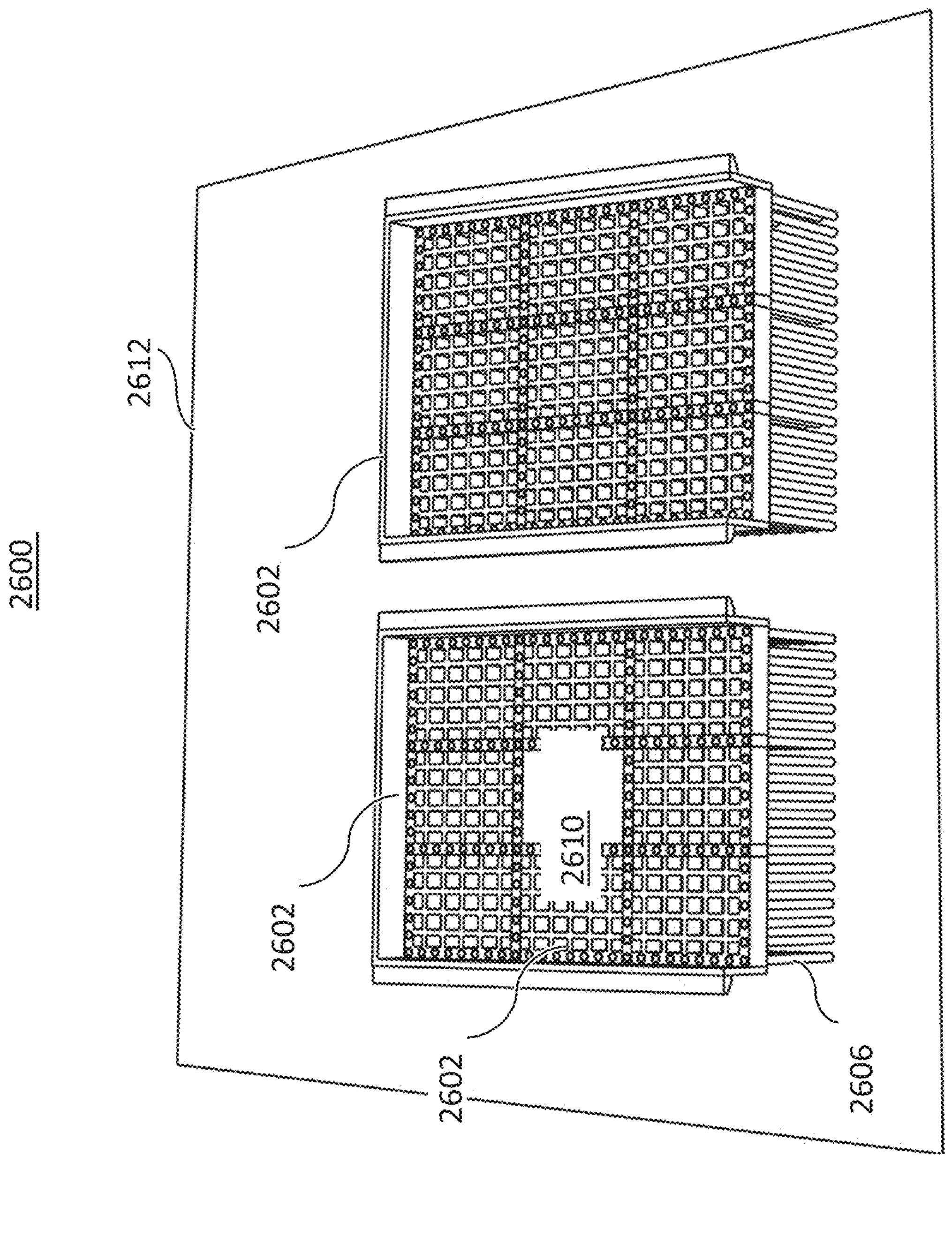
Figure 27A:
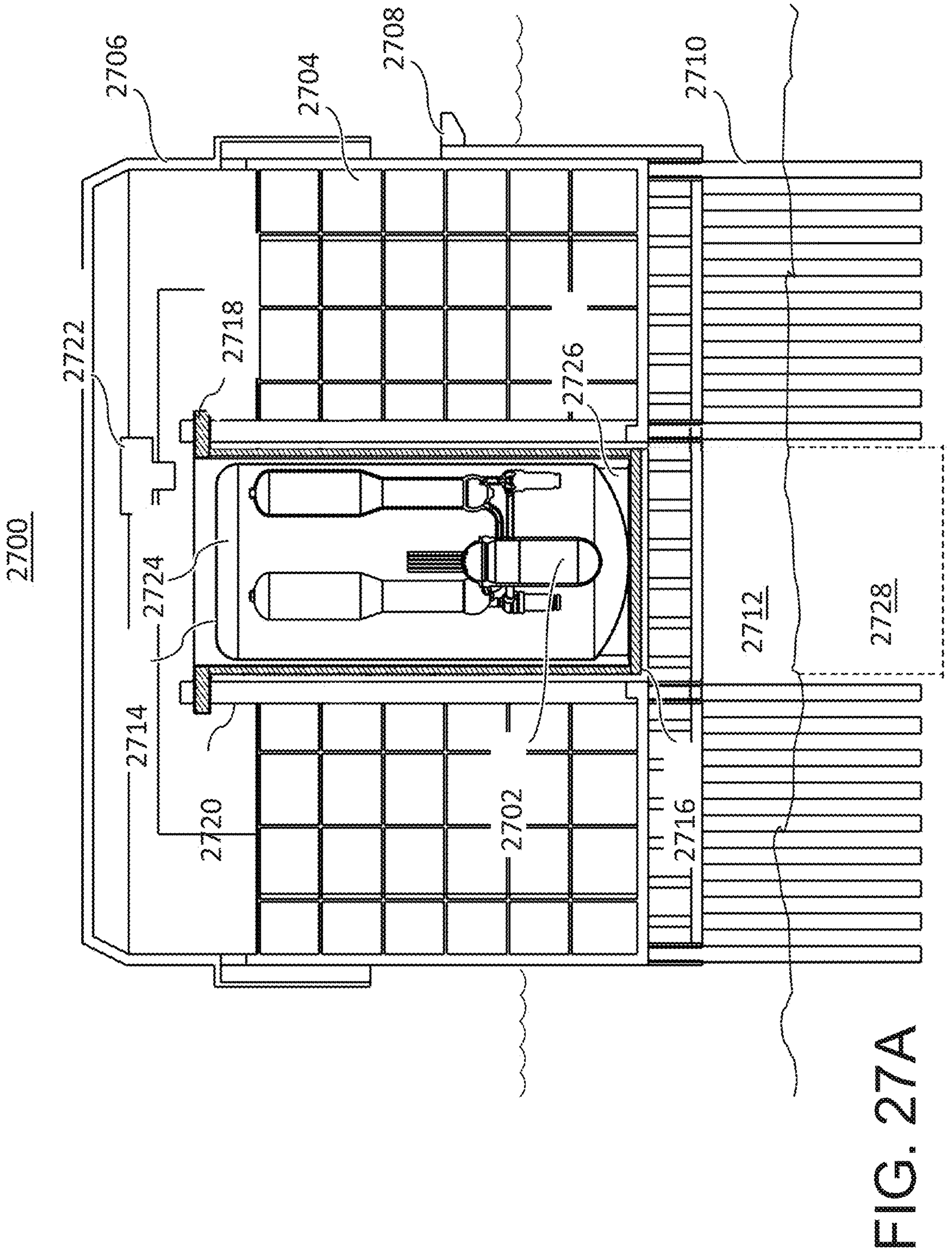
Figure 27B:
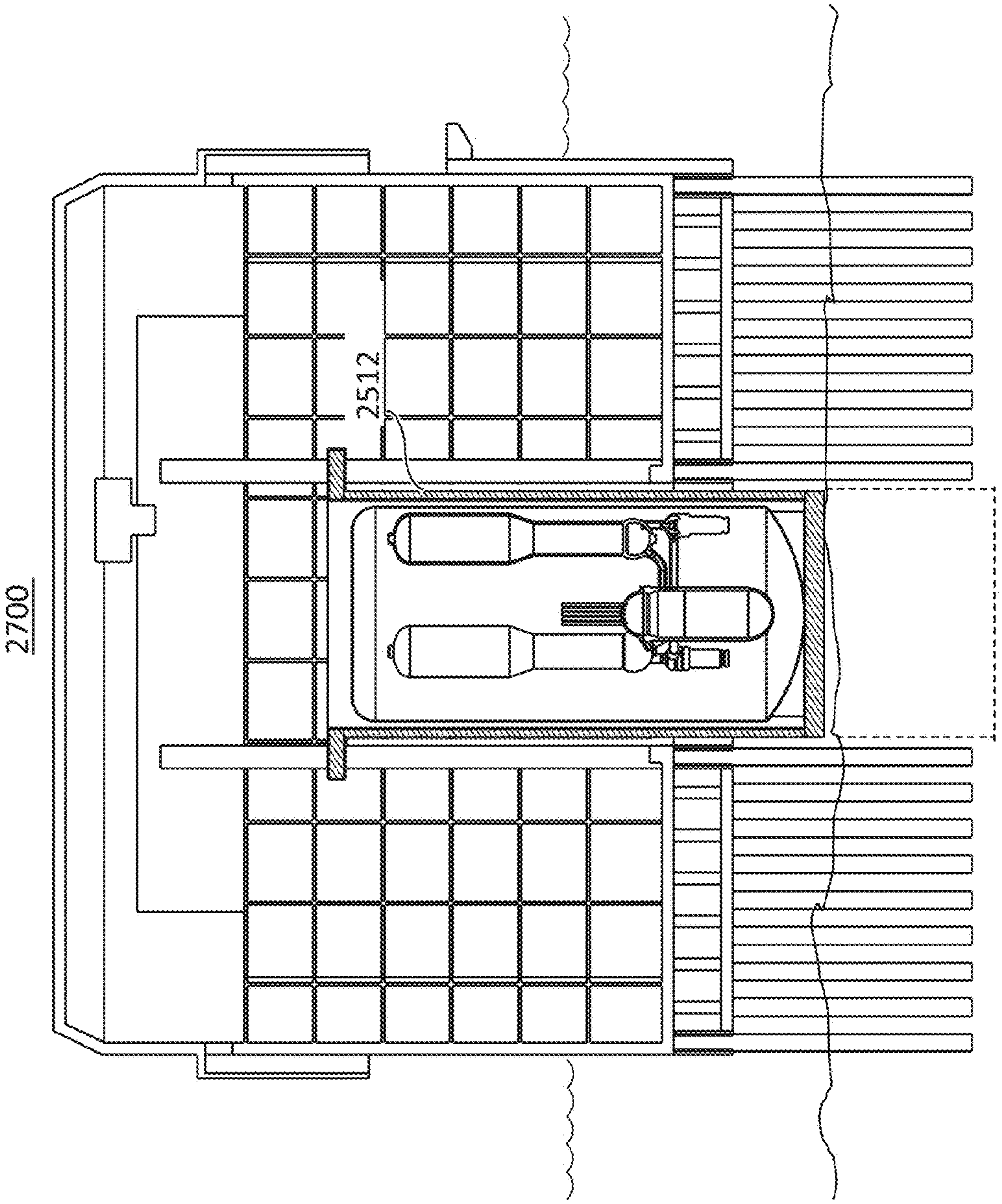
Figure 27C:
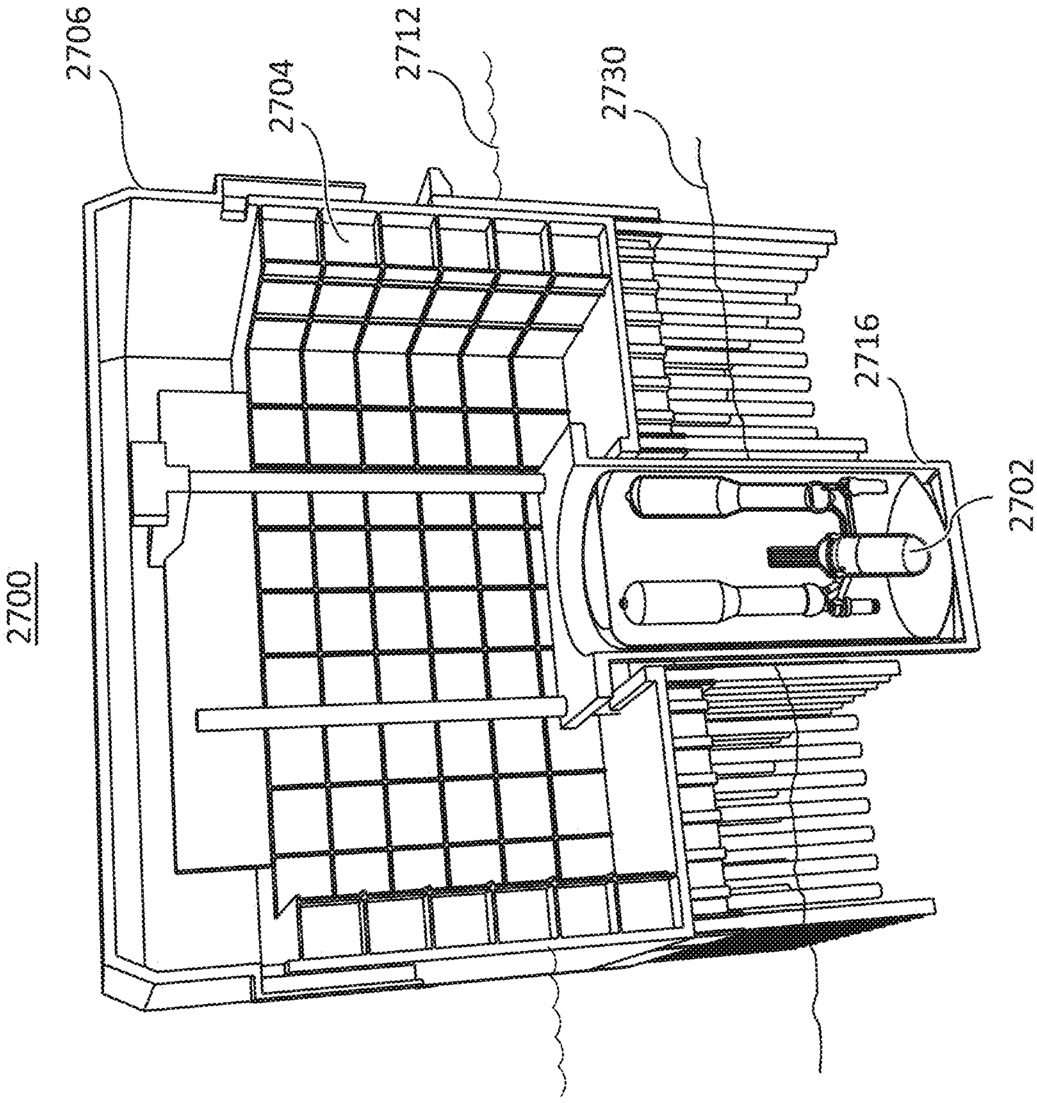
Figure 28:
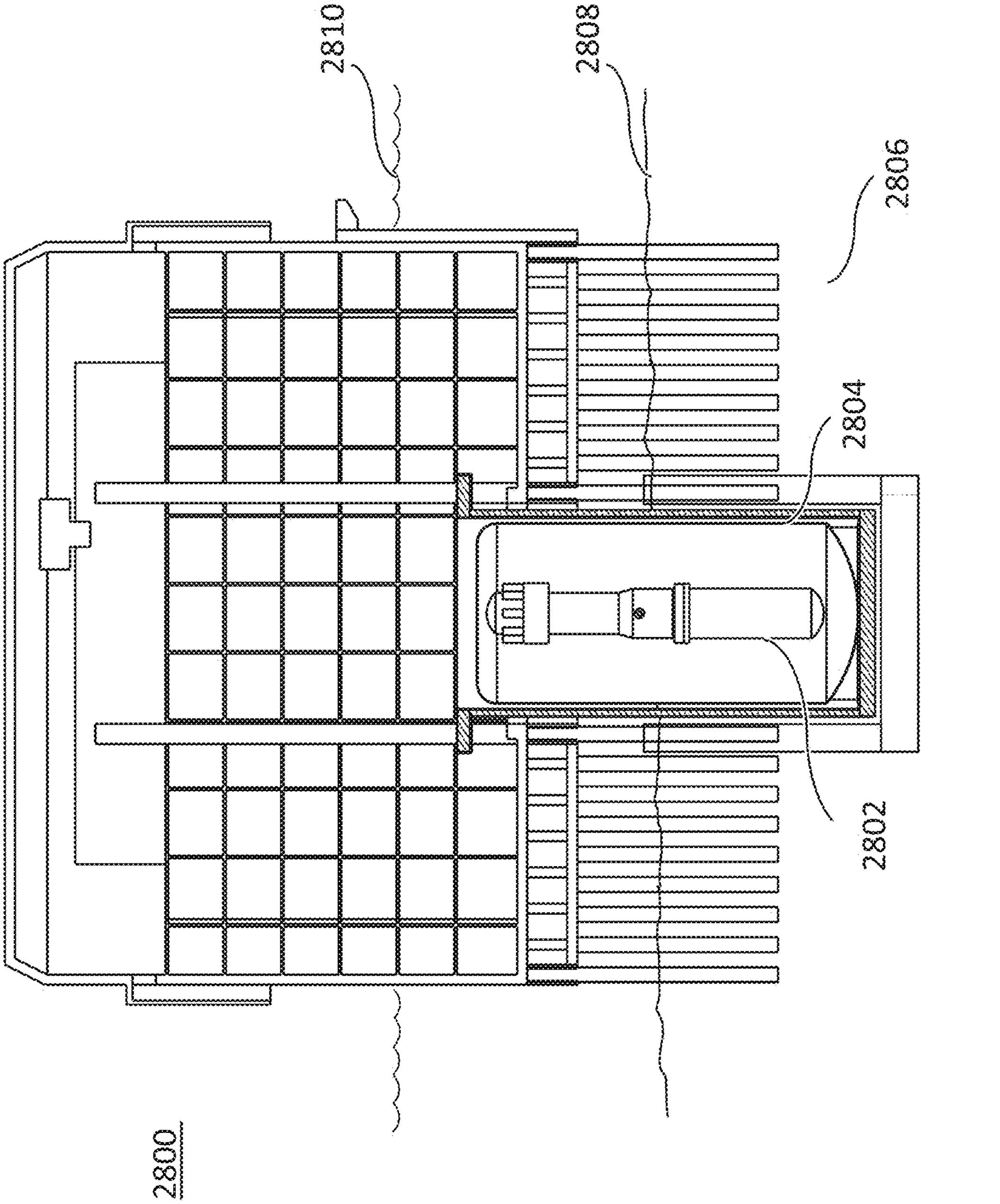
Figure 29:
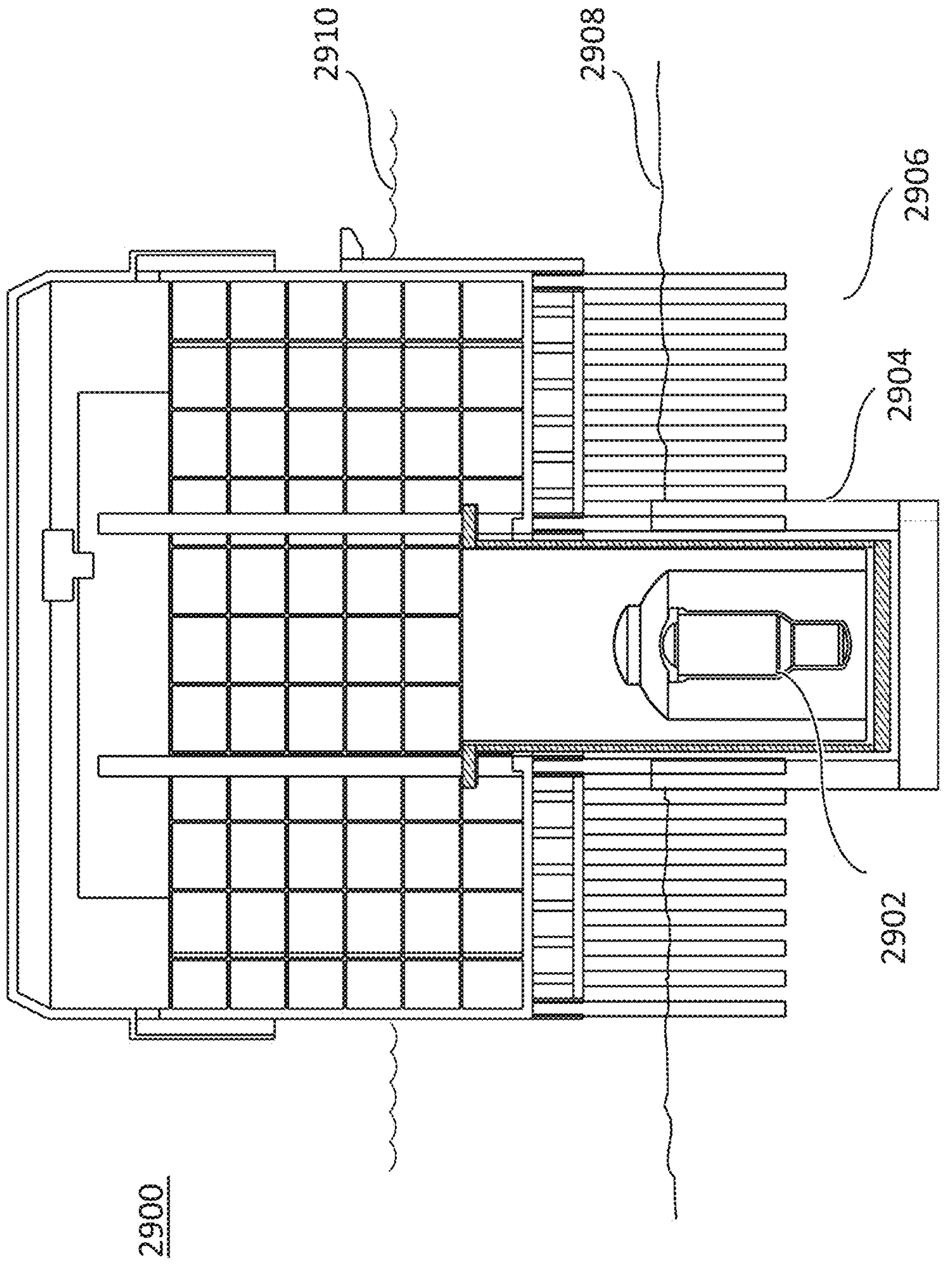
Figure 30:
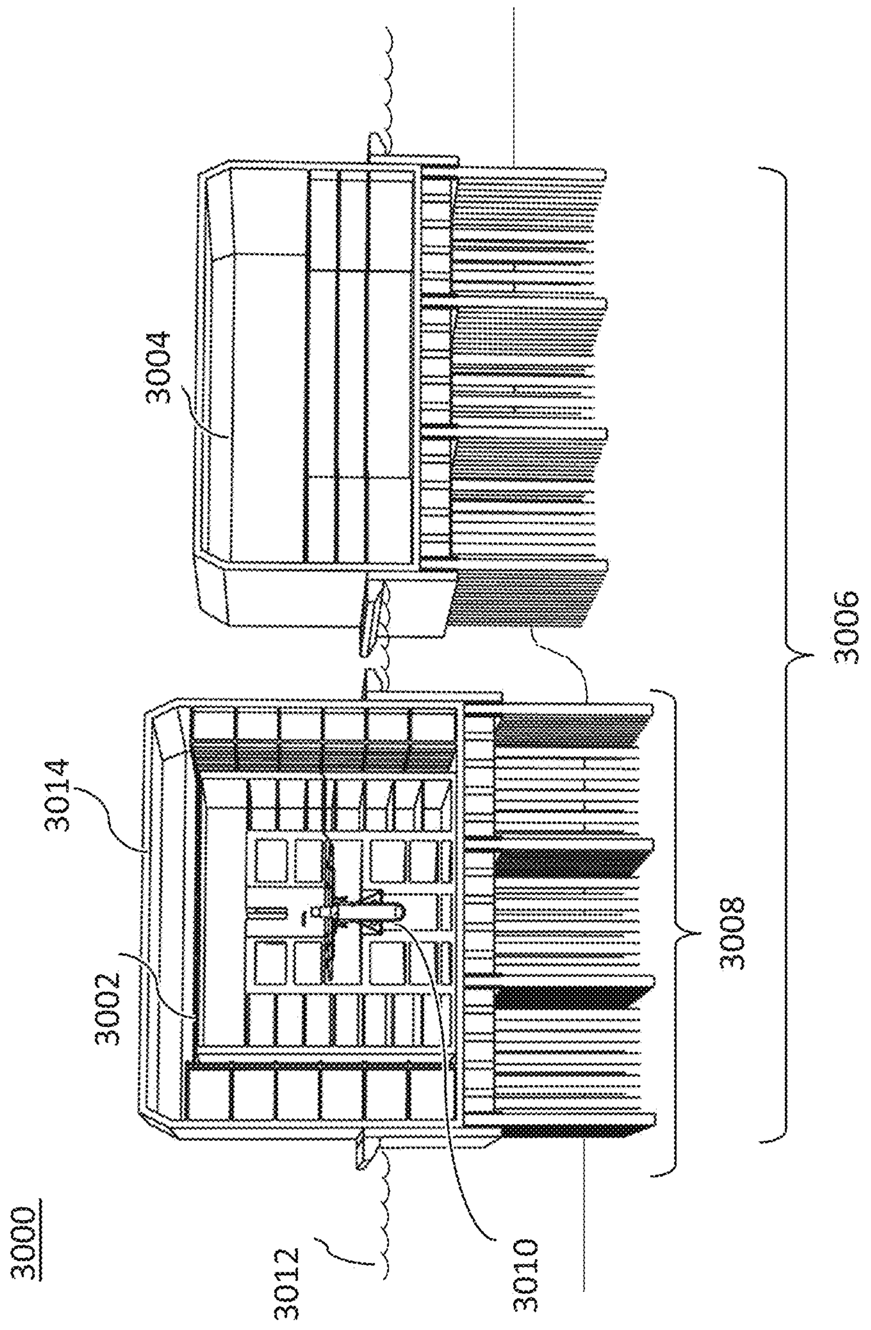
Figure 31:
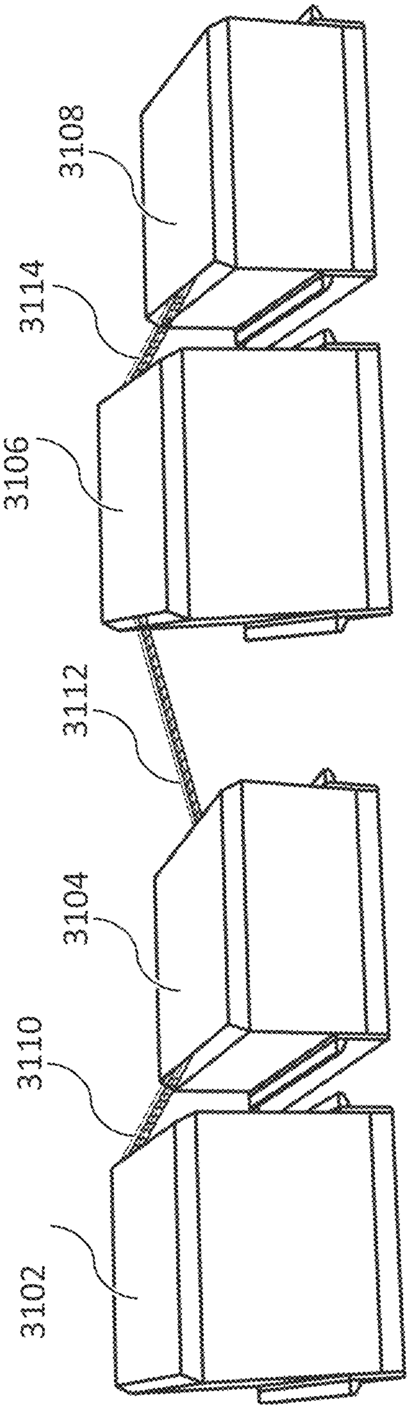
Figure 32:
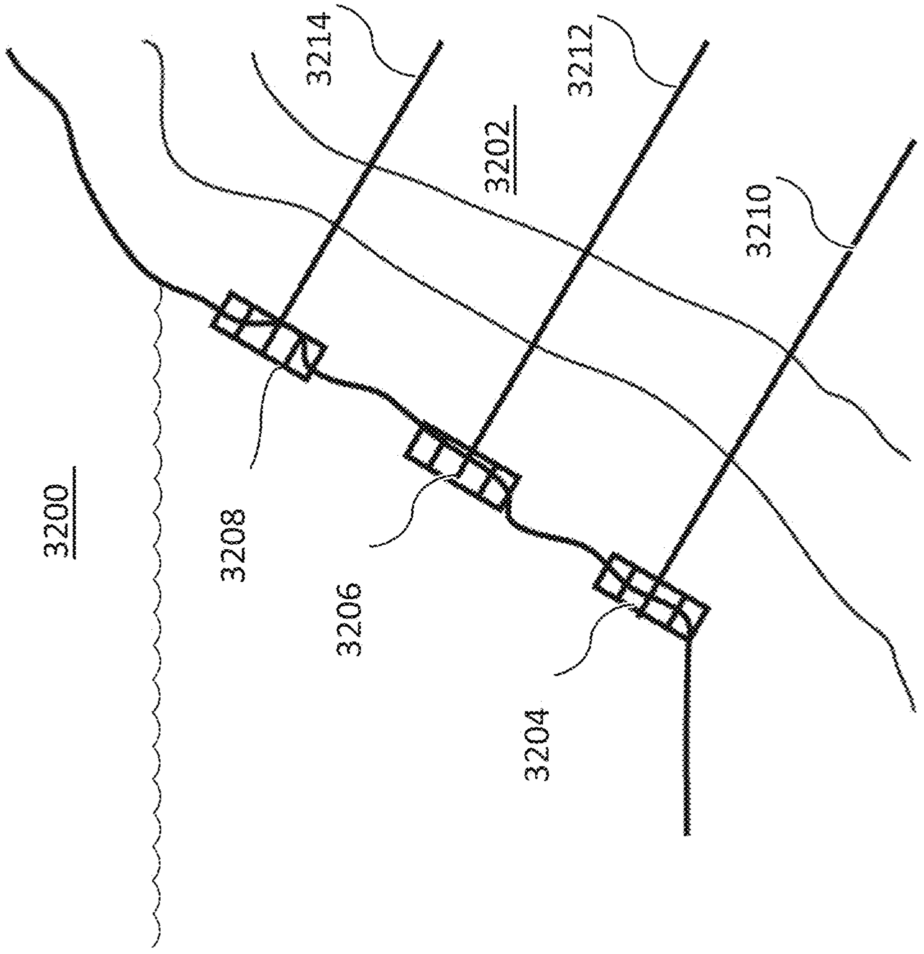
Figure 33:
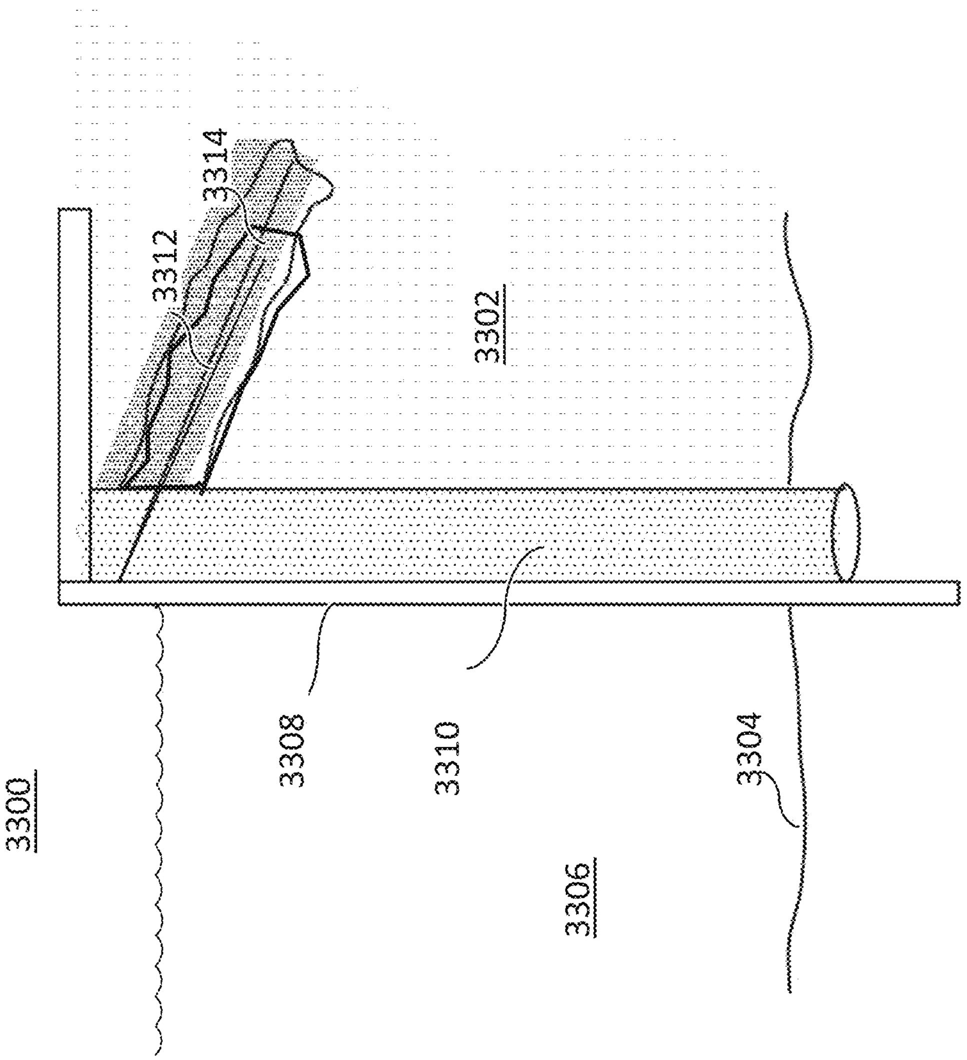
Figure 34:
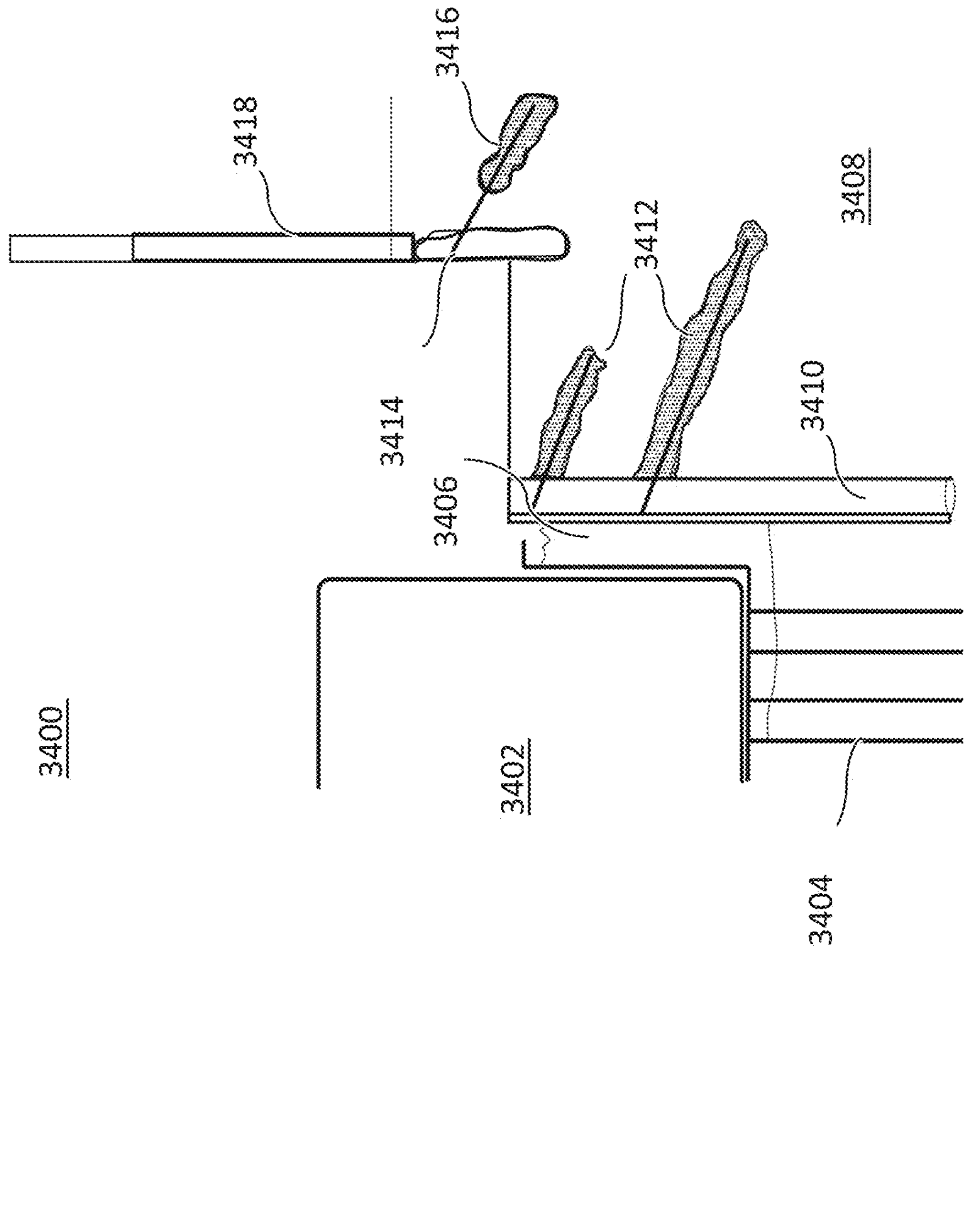
Figure 35:
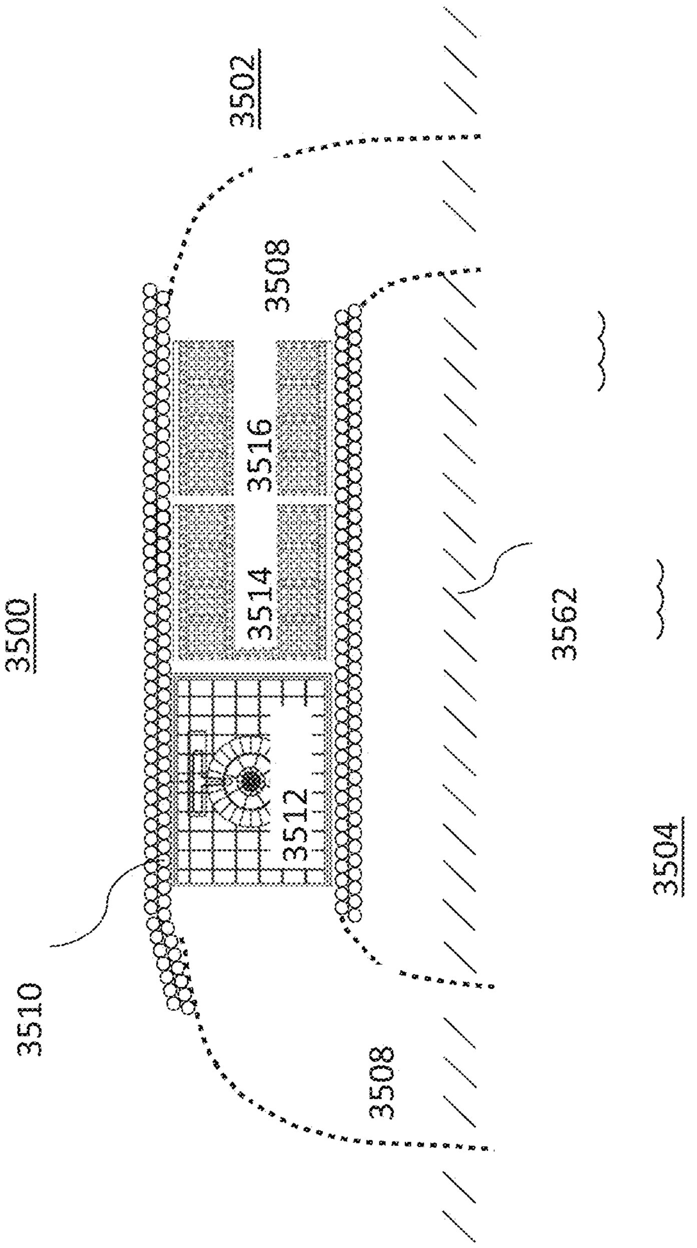
Figure 36A:
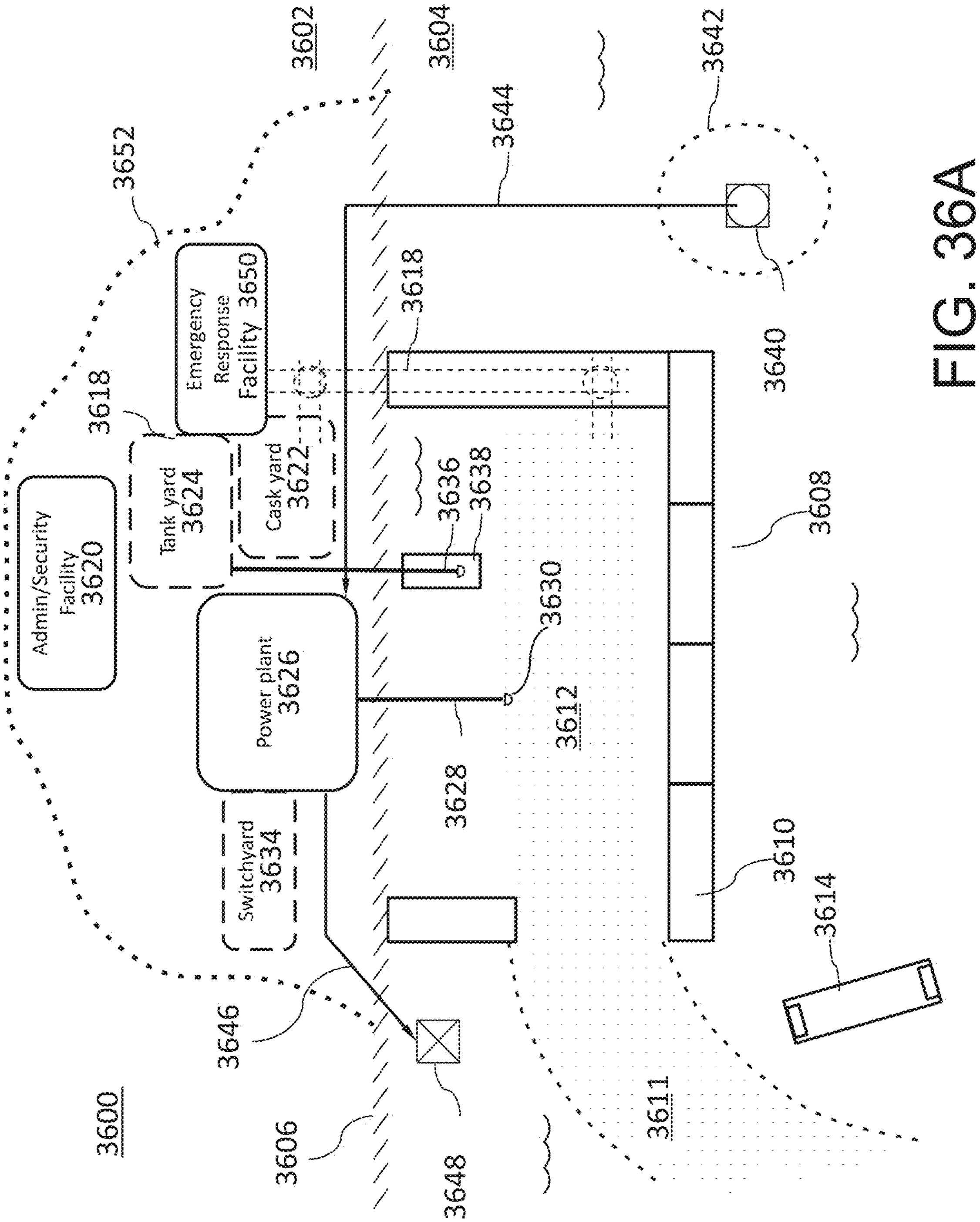
Figure 36B:
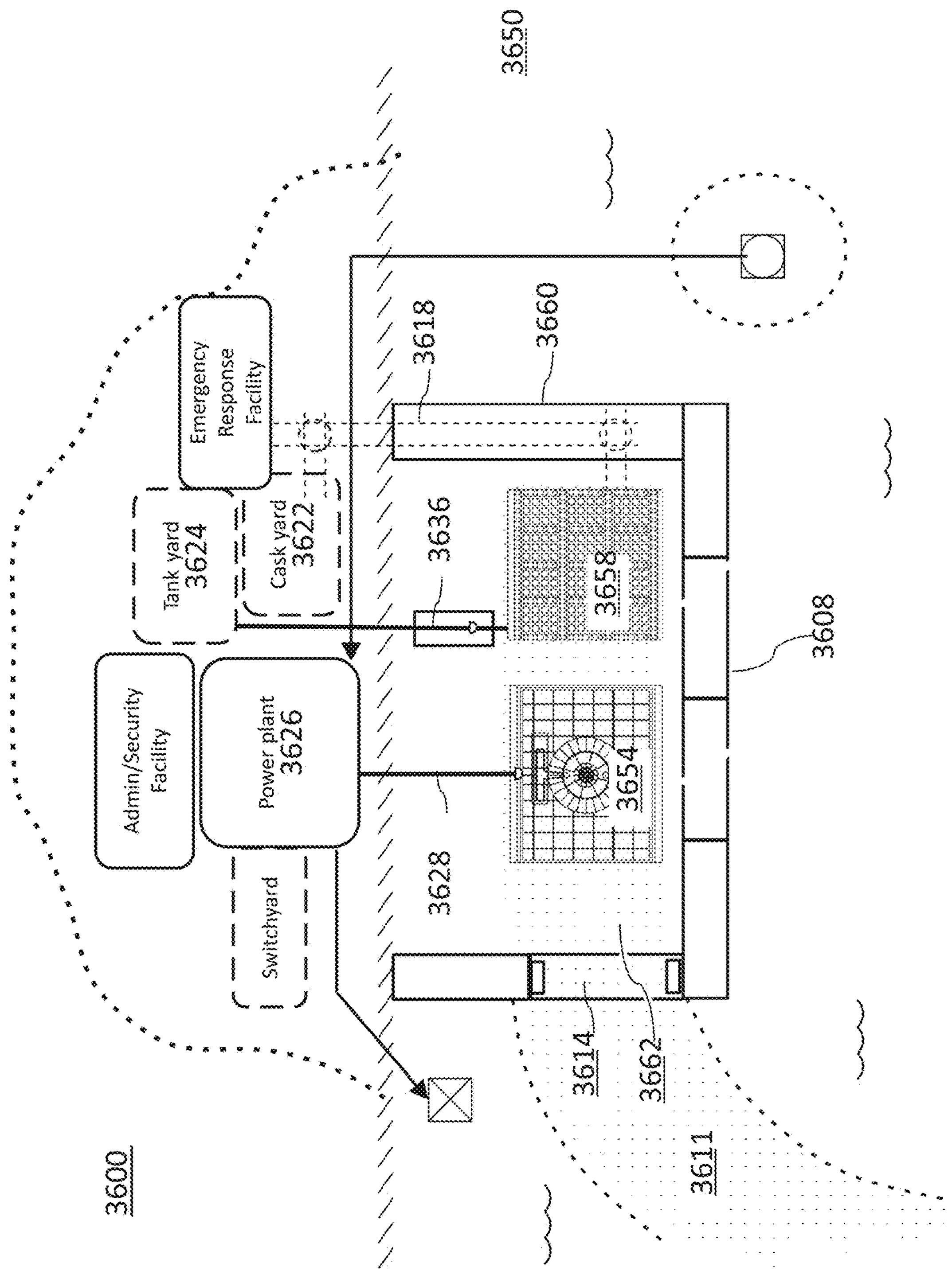
Figure 37A:
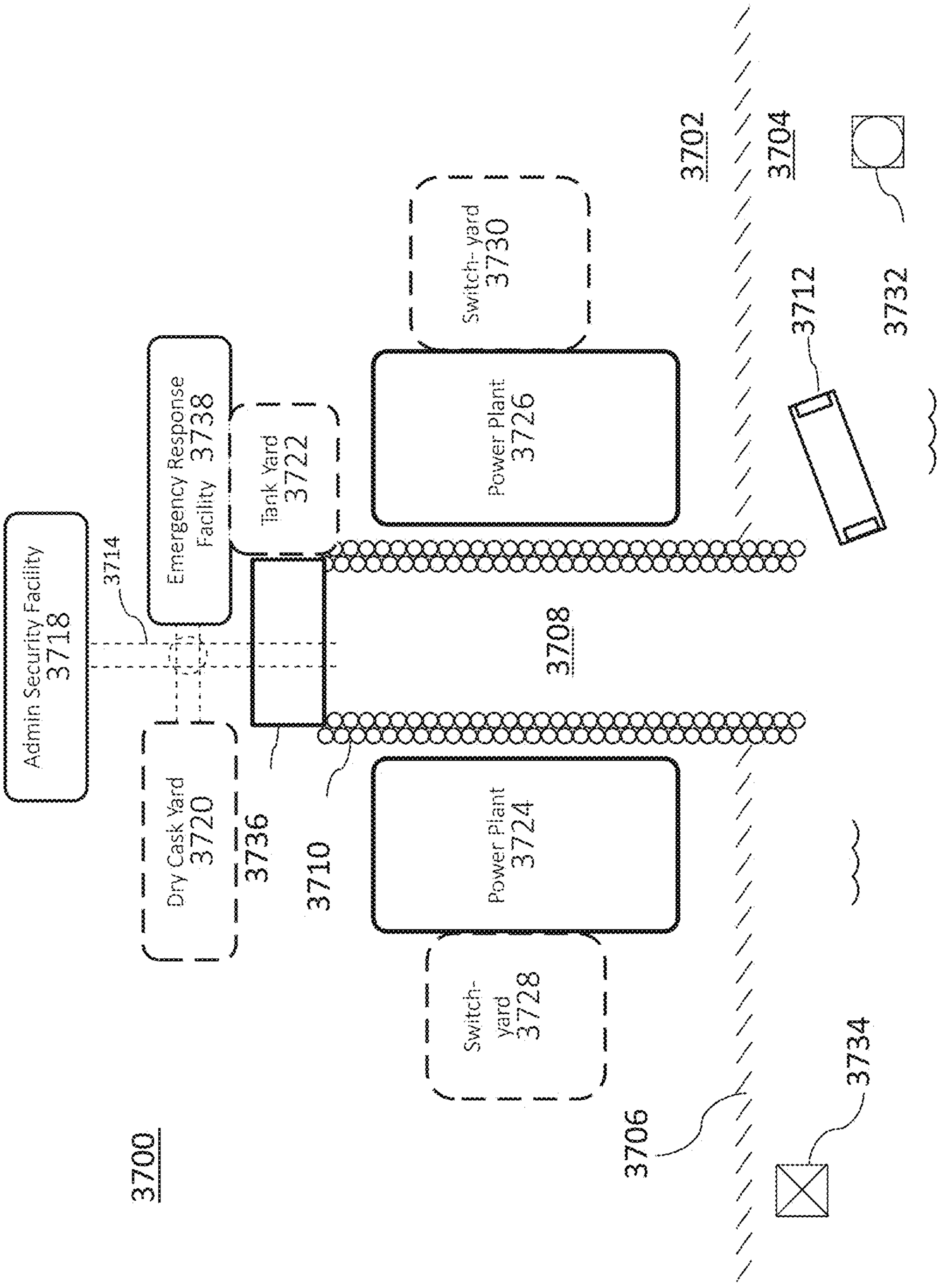
Figure 37B:
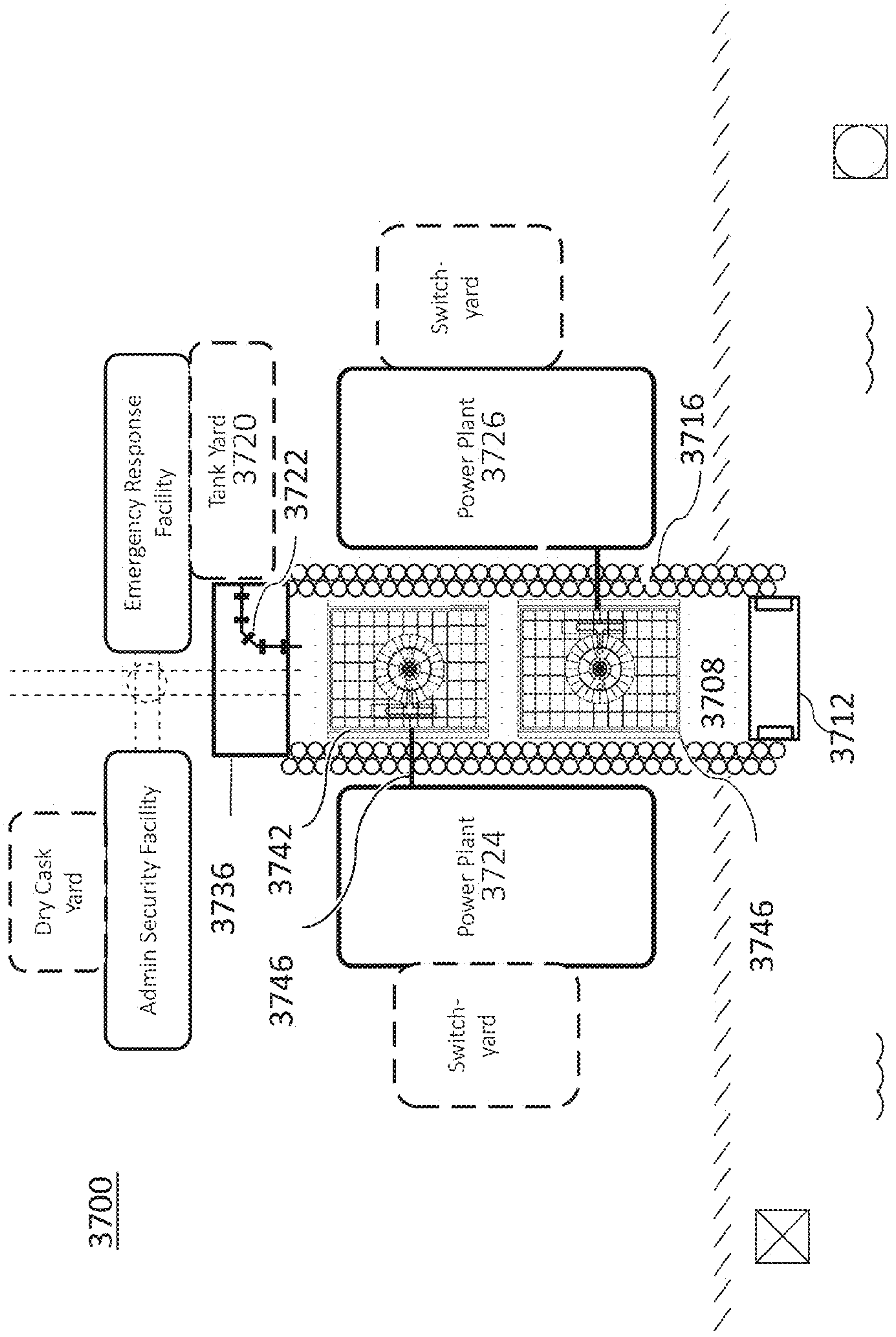
Figure 38:
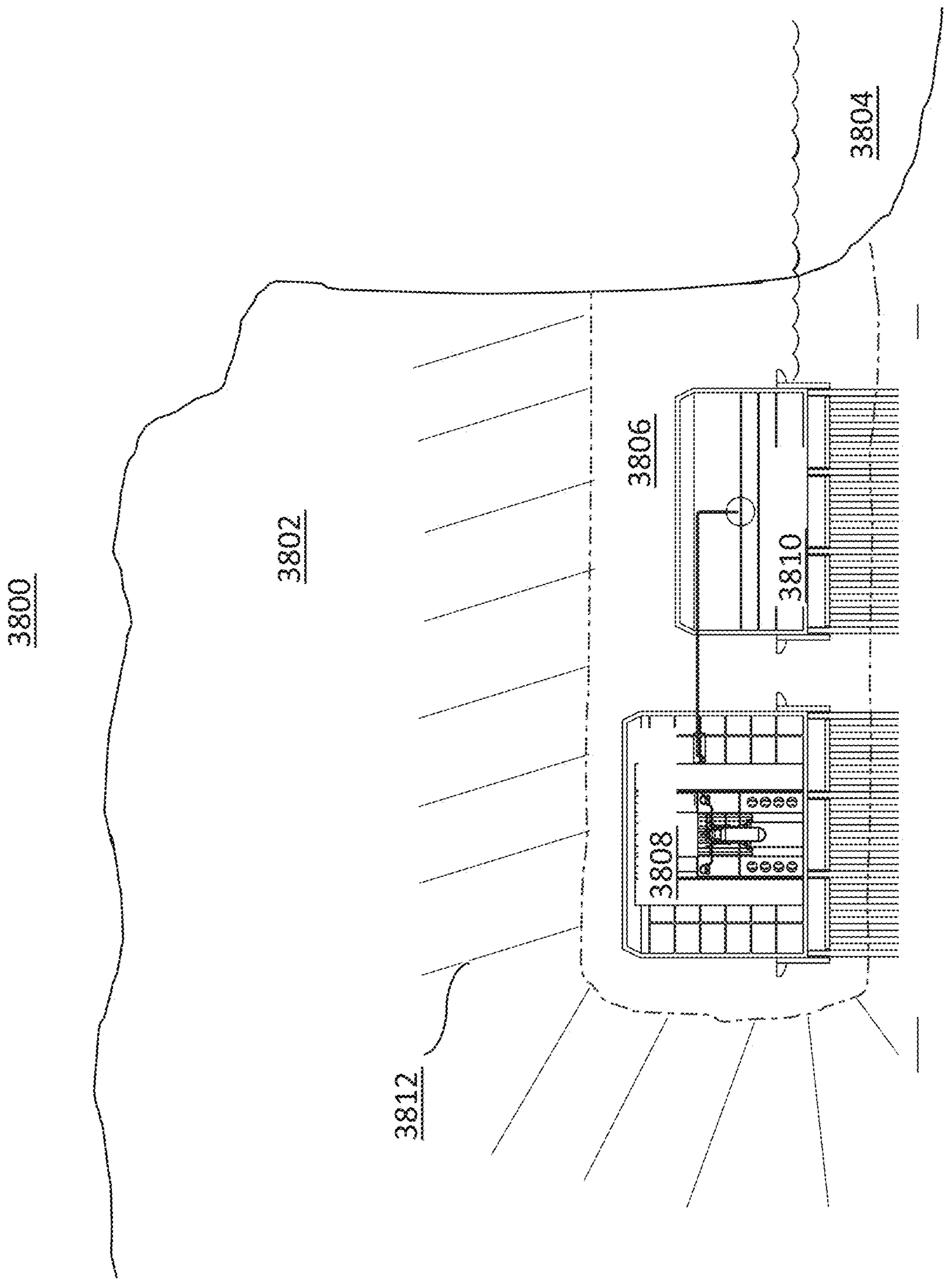
Figure 39:
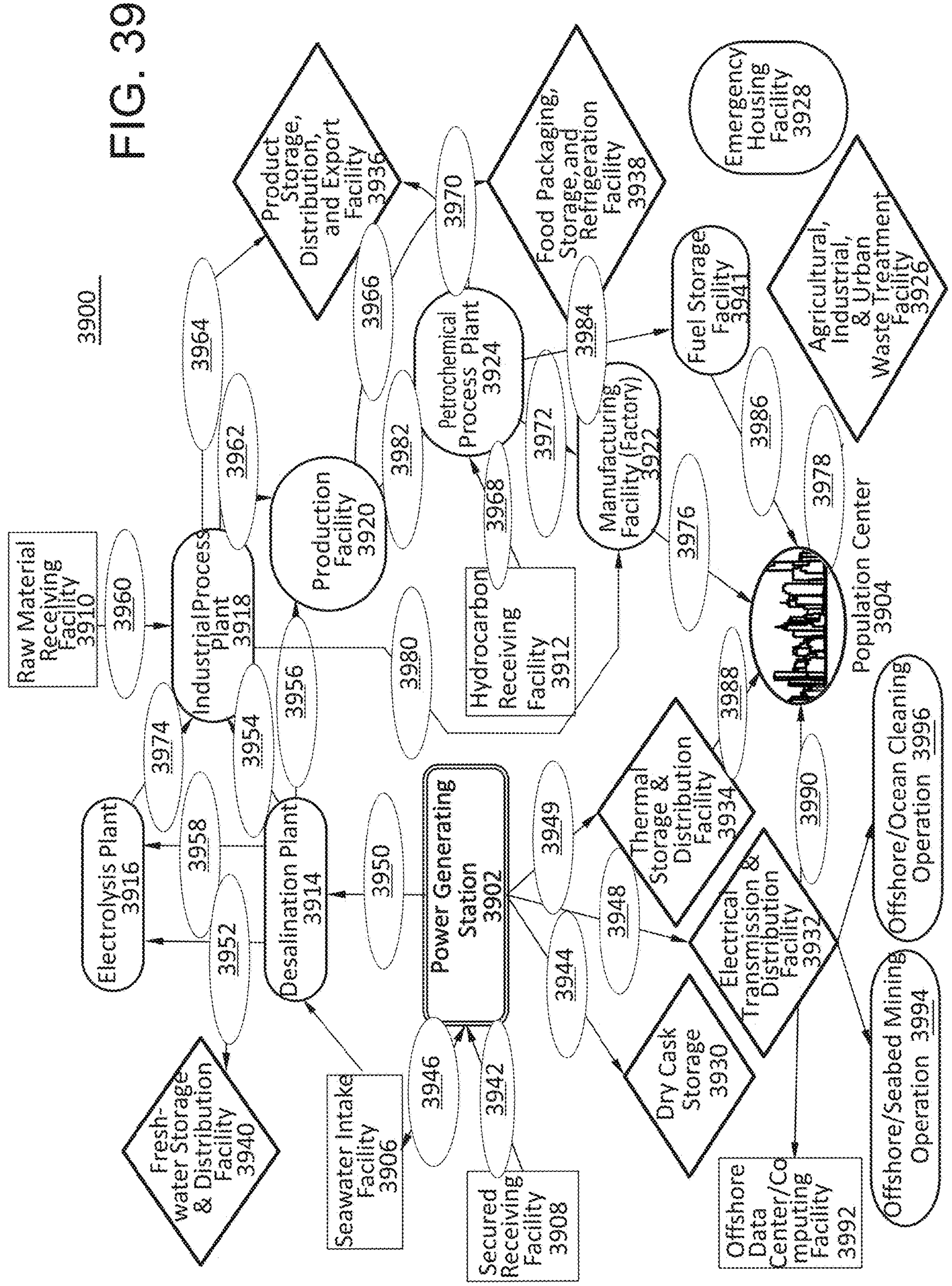
Figure 40:
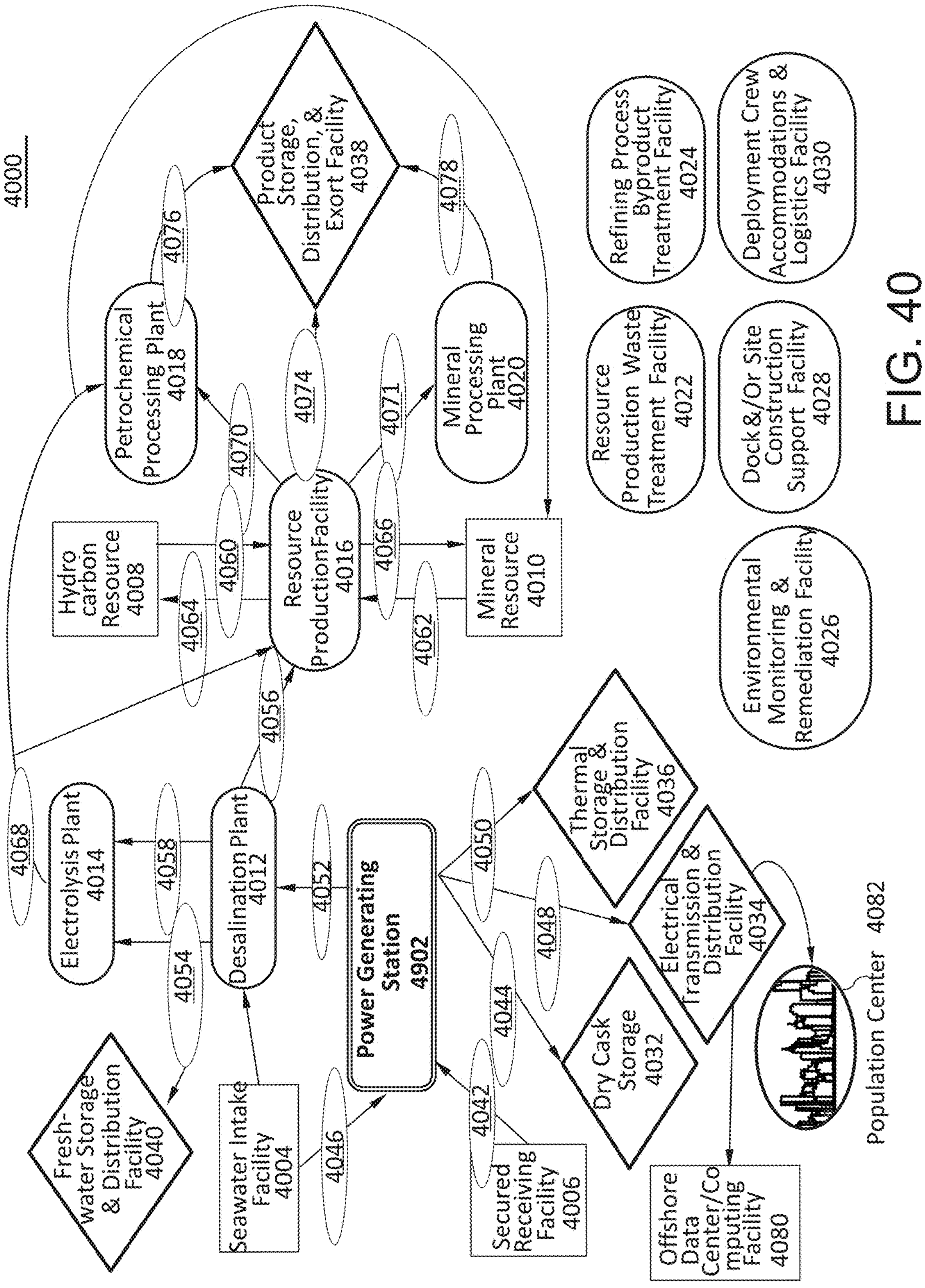
Figure 41:
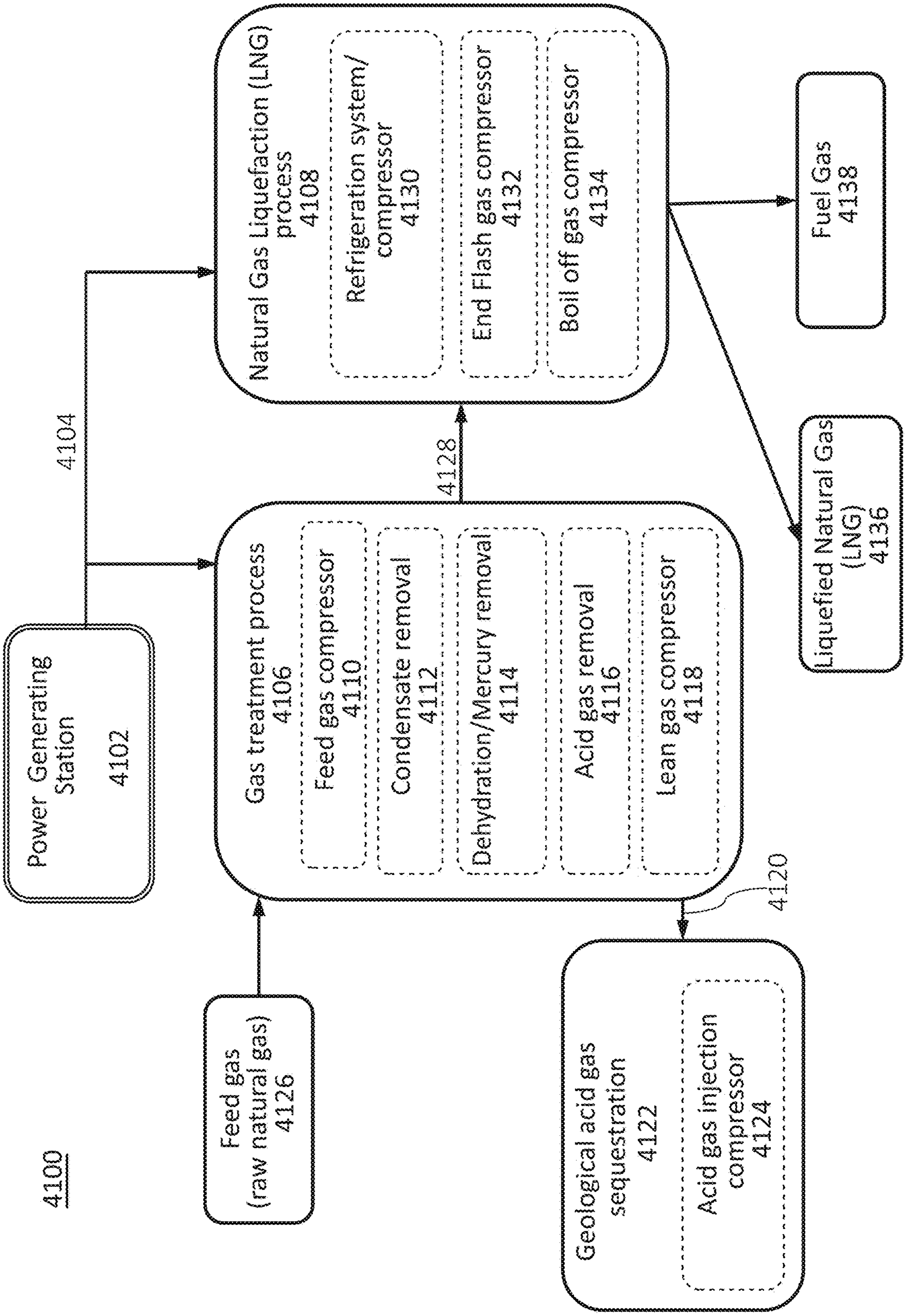
Figure 42:
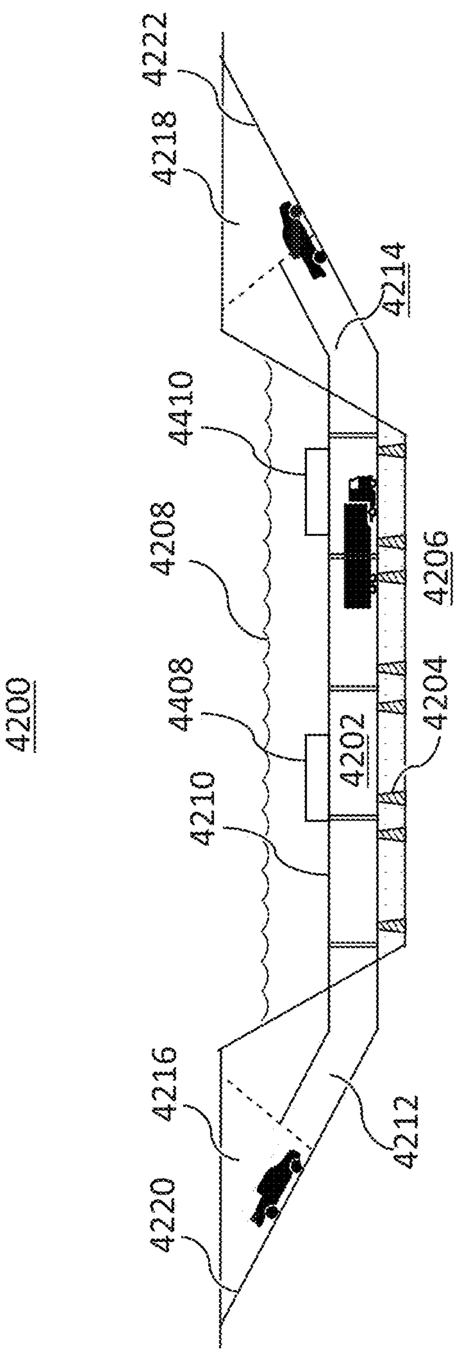
Figure 43:
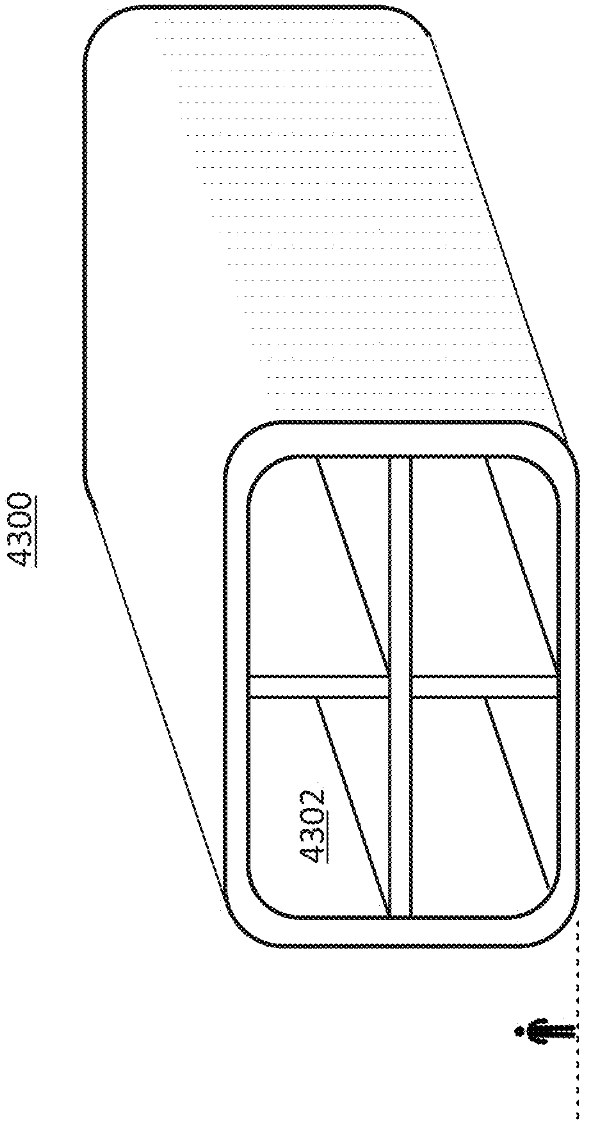
Figure 44A:
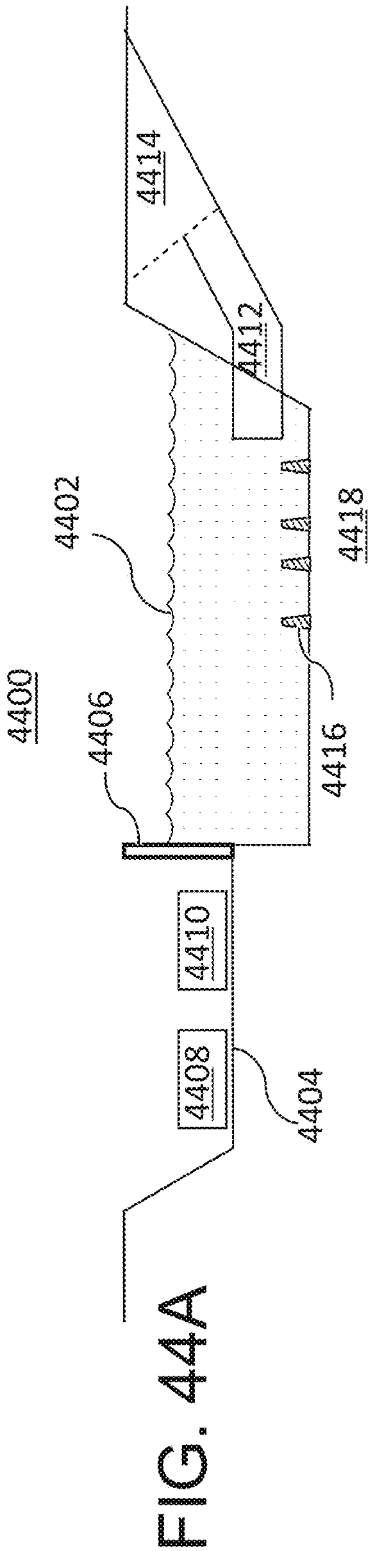
Figure 44B:
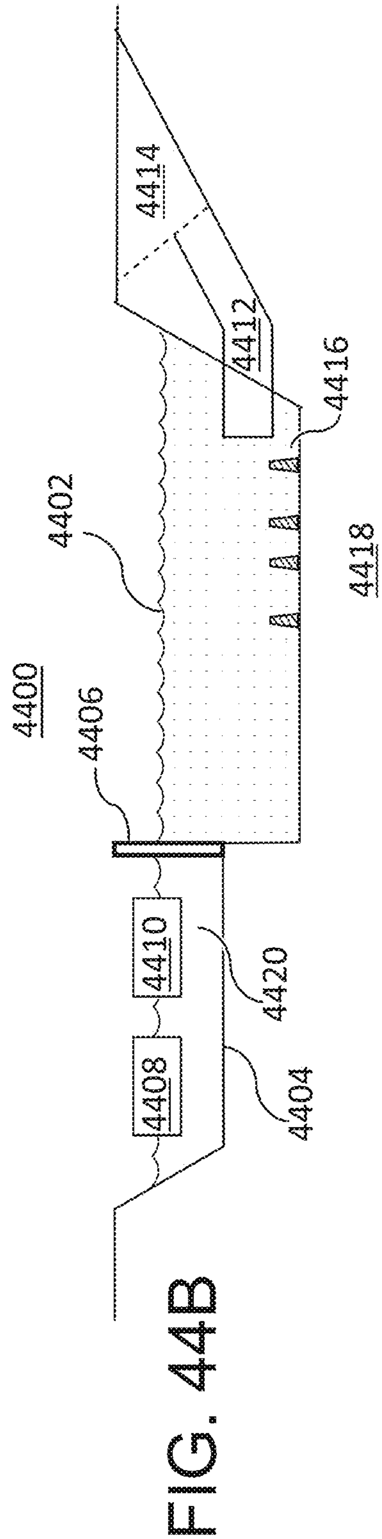
Figure 44C:
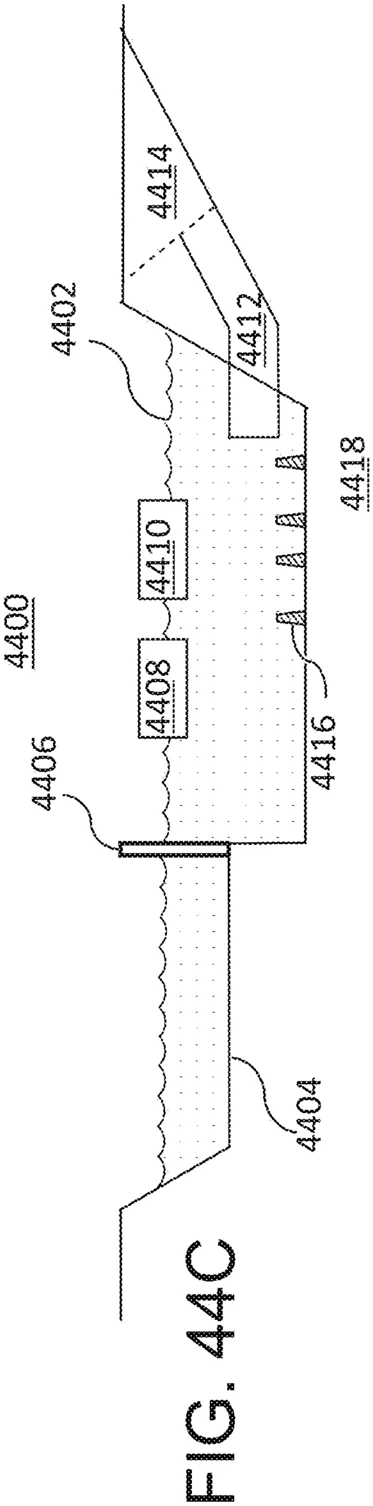
Figure 44D:
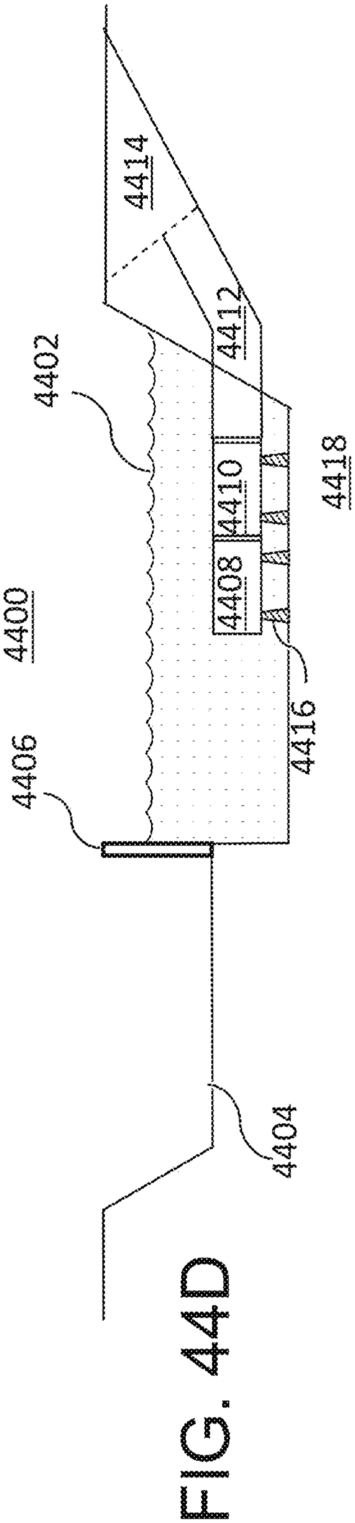
Figure 45:
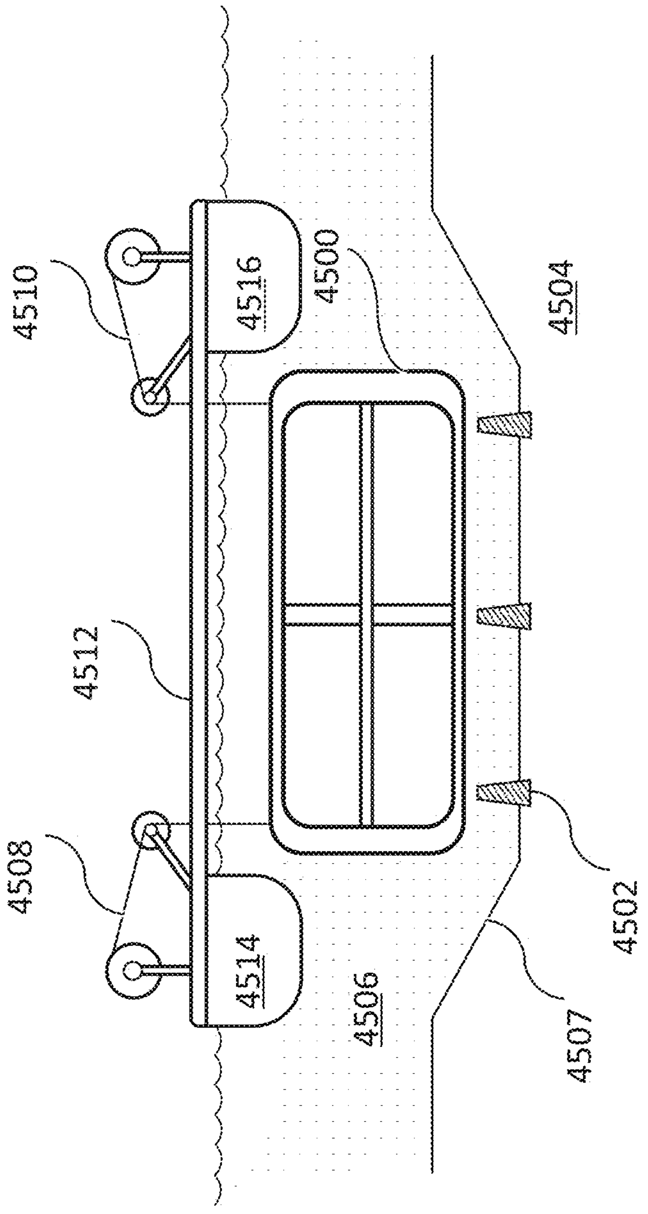
Figure 46:
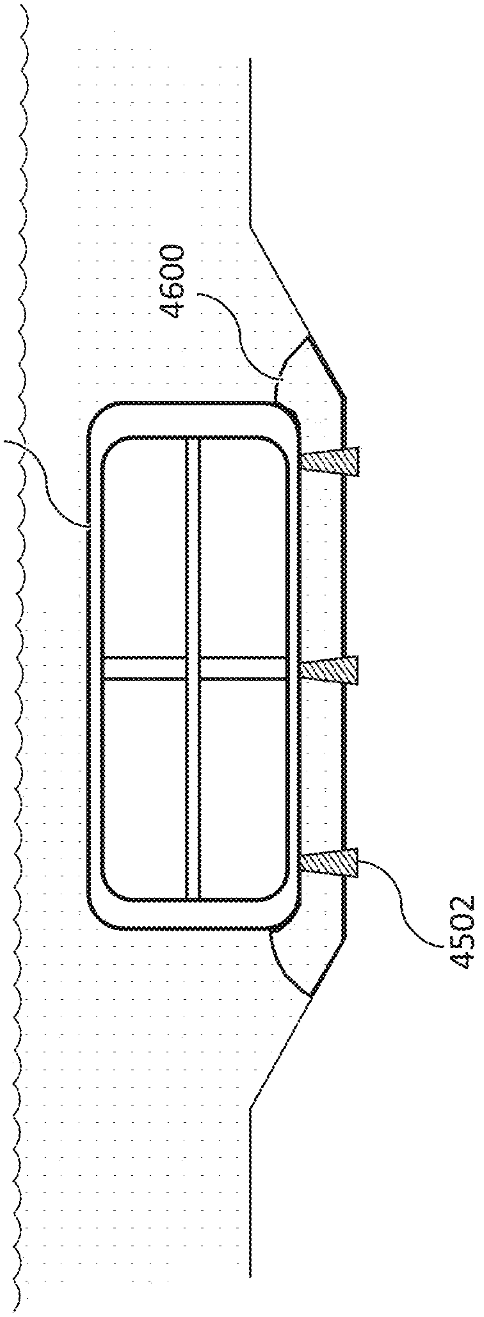
Figure 47:
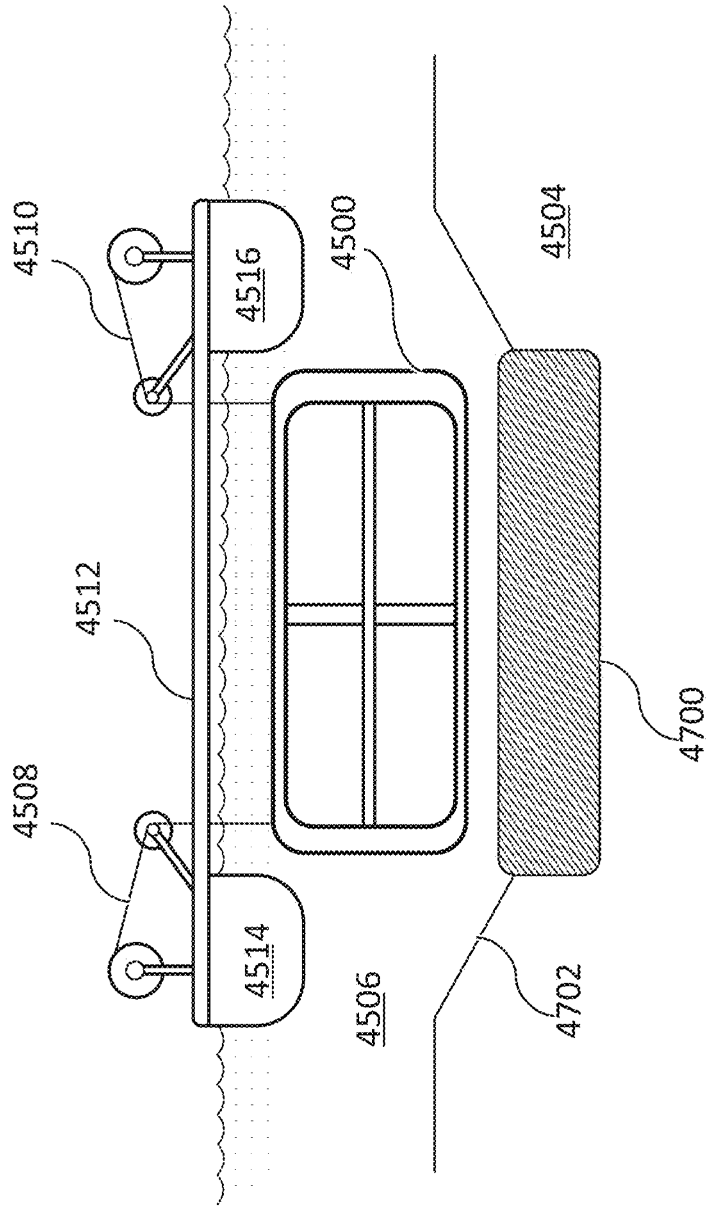
Figure 48A:
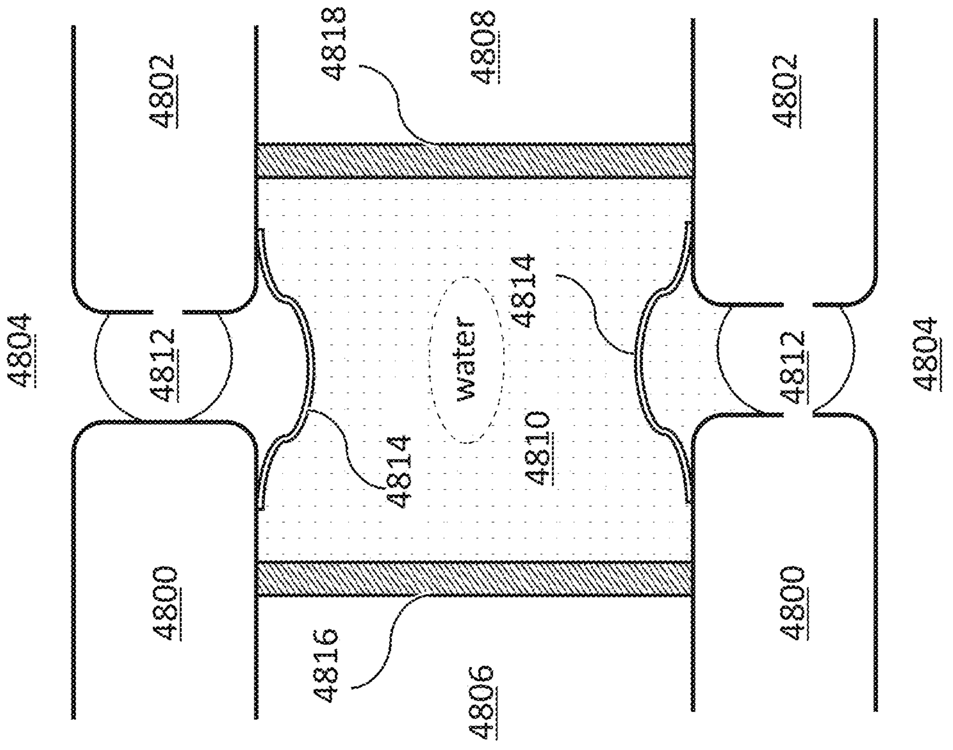
Figure 48B:
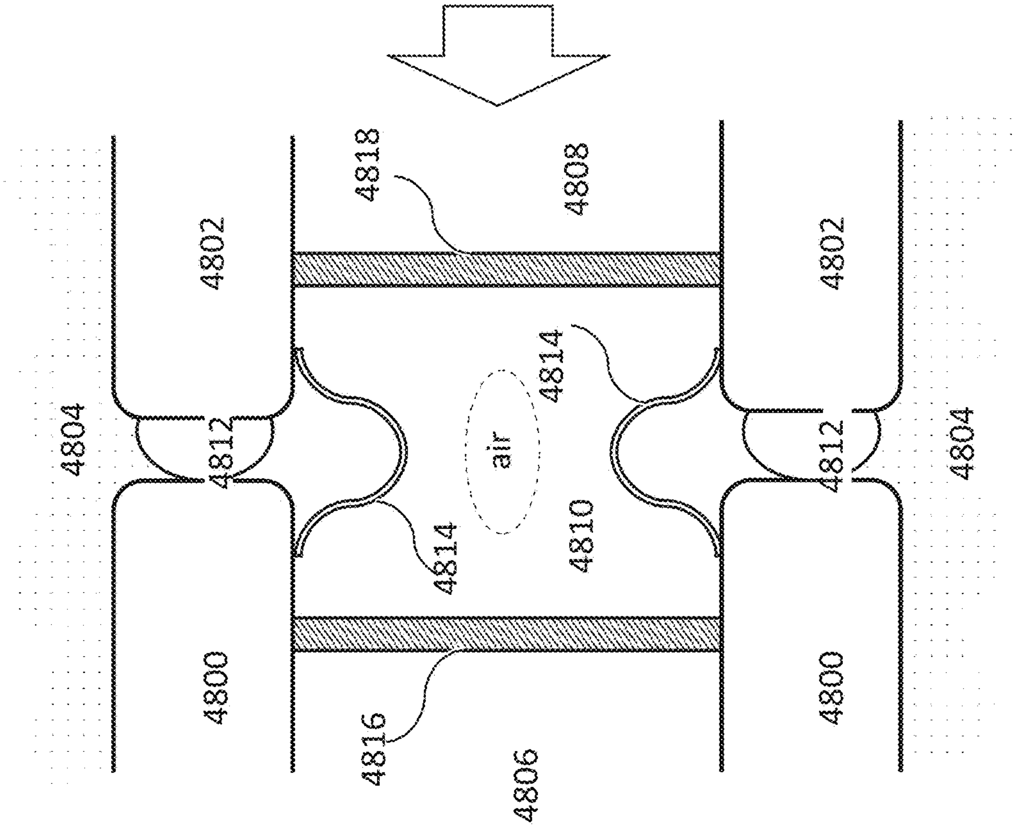
Figure 49:
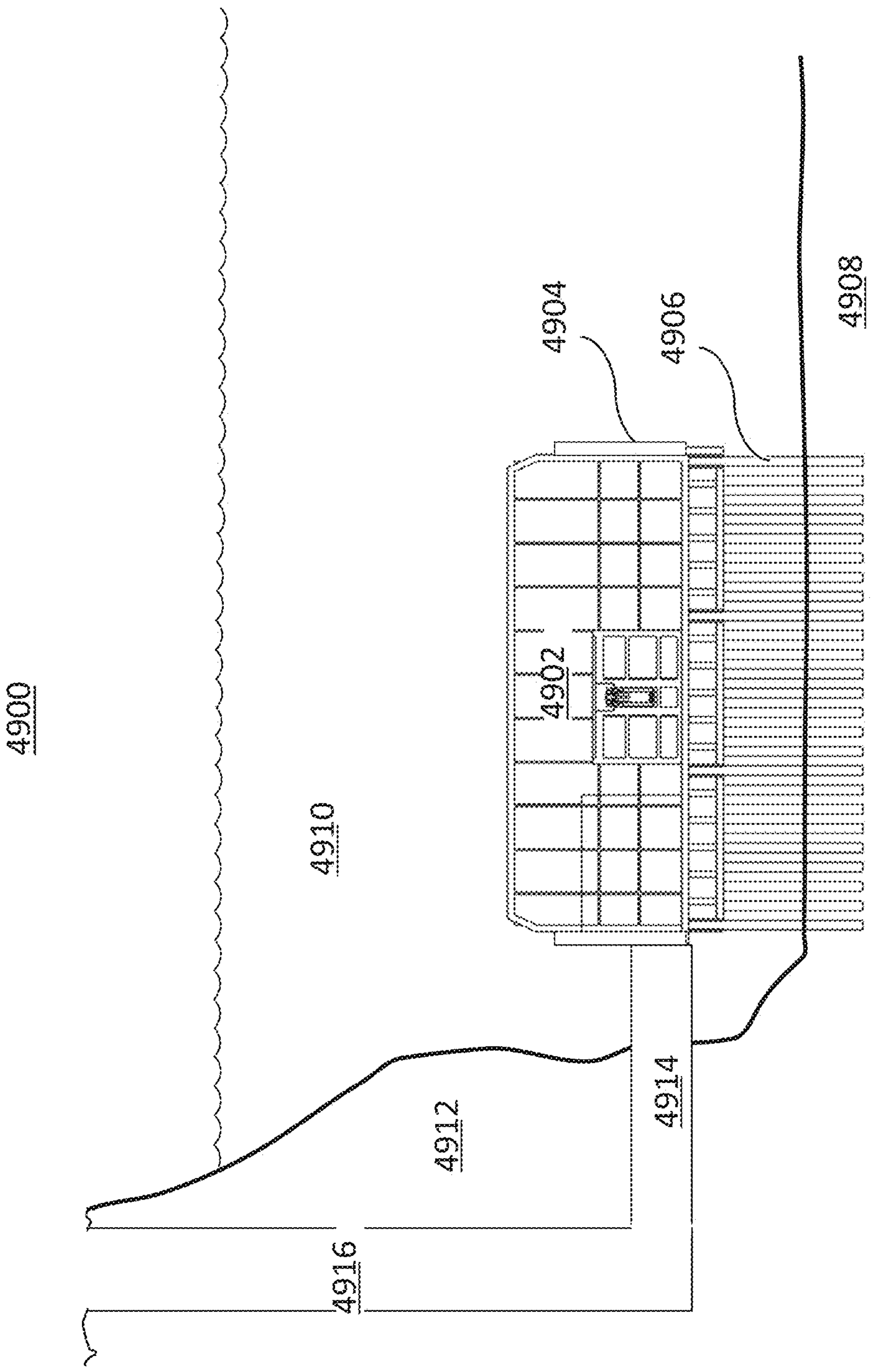
Figure 50A:
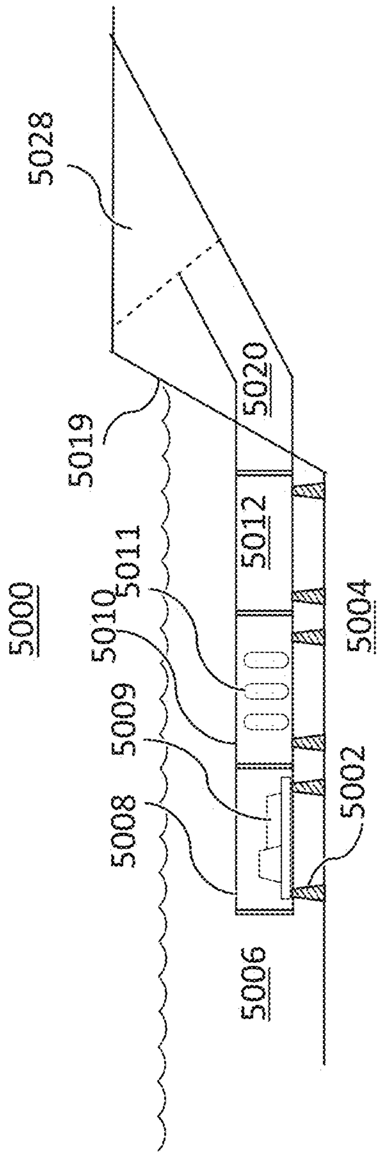
Figure 50B:
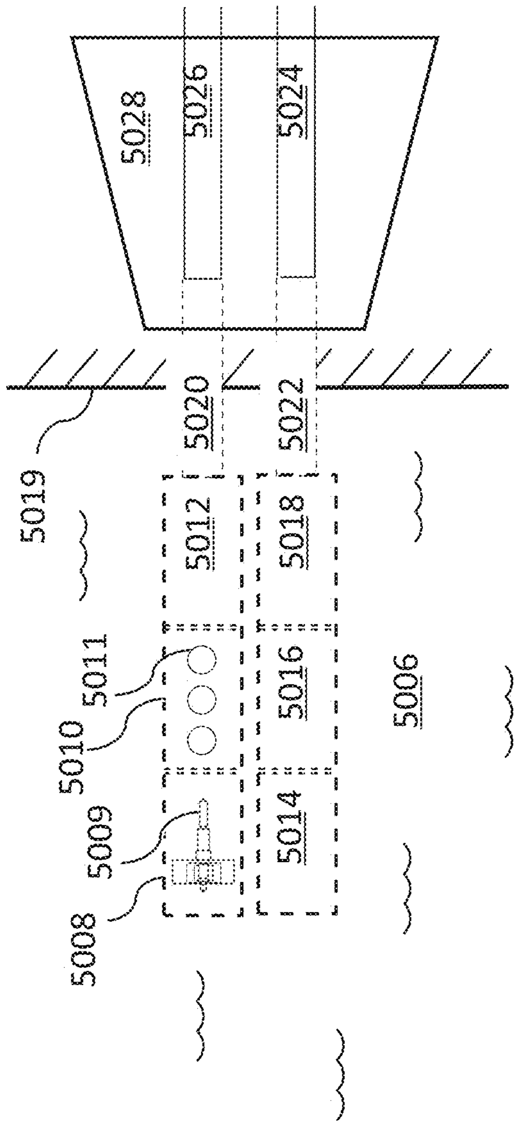
Figure 51A:
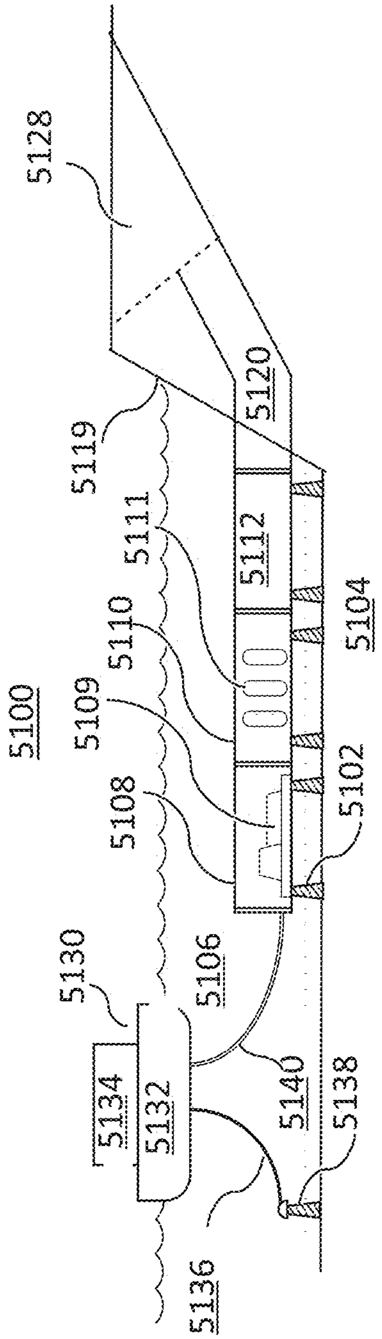
Figure 51B:
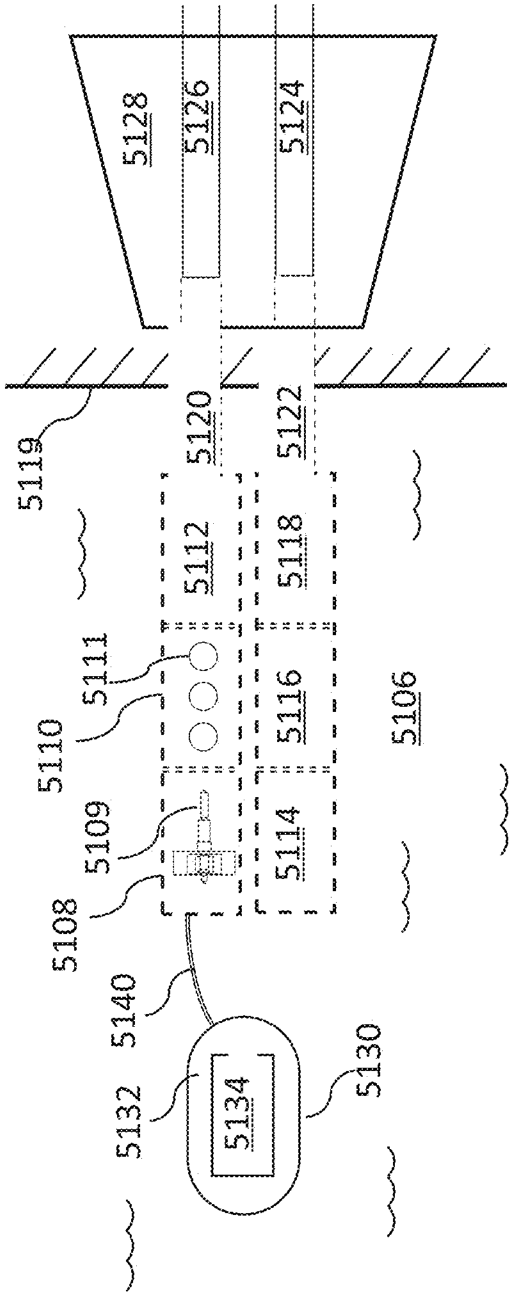
Figure 52A:
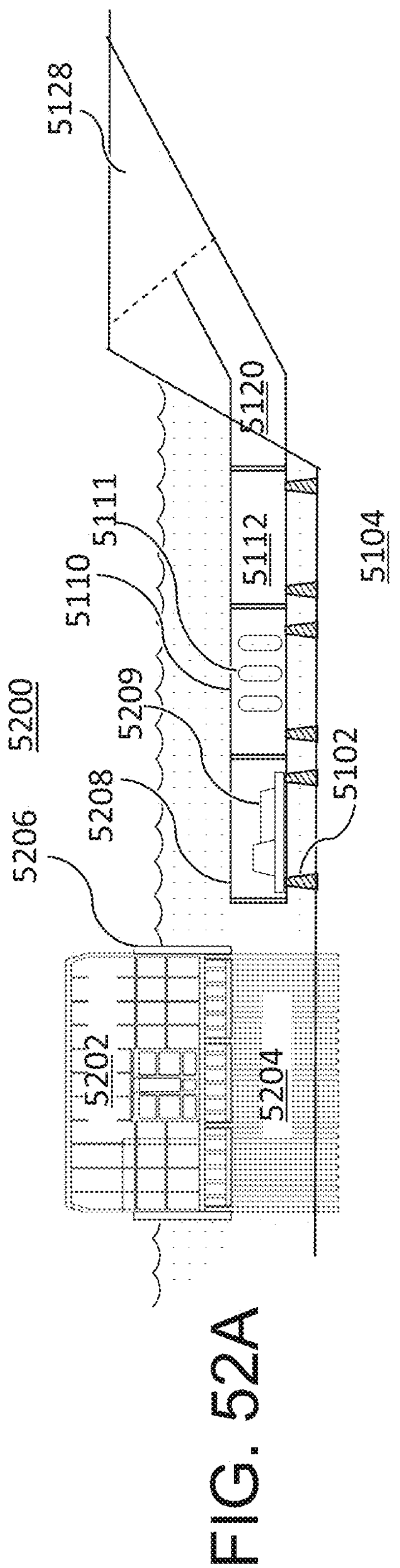
Figure 52B:
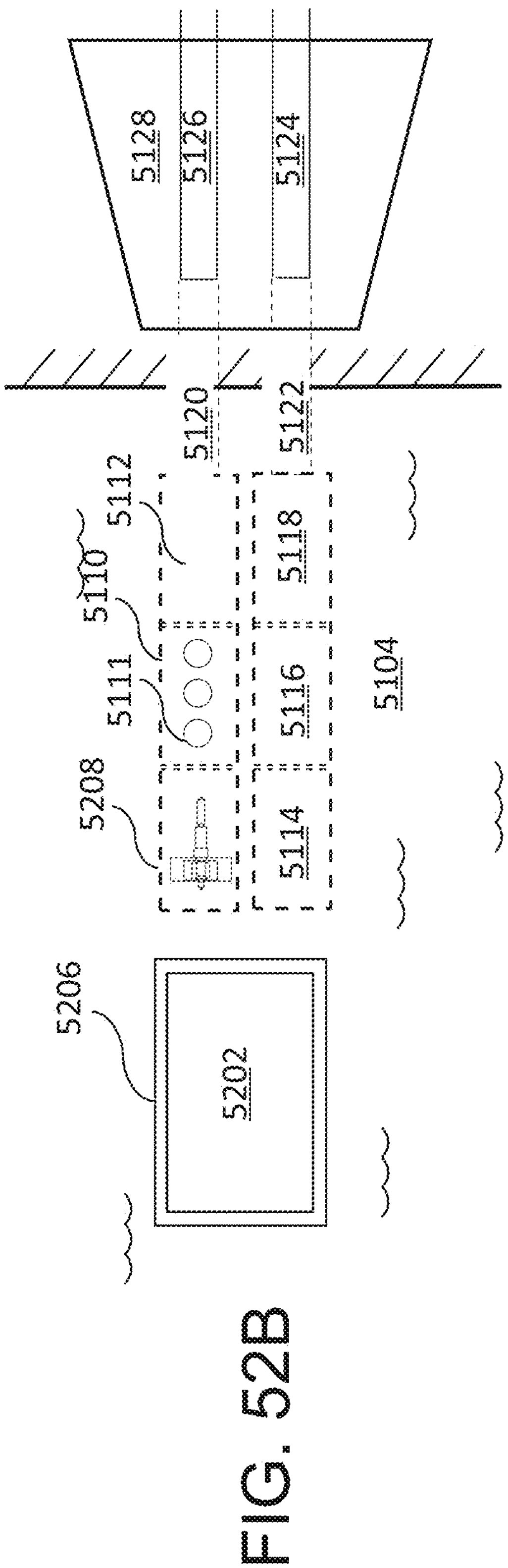
Figure 53A:
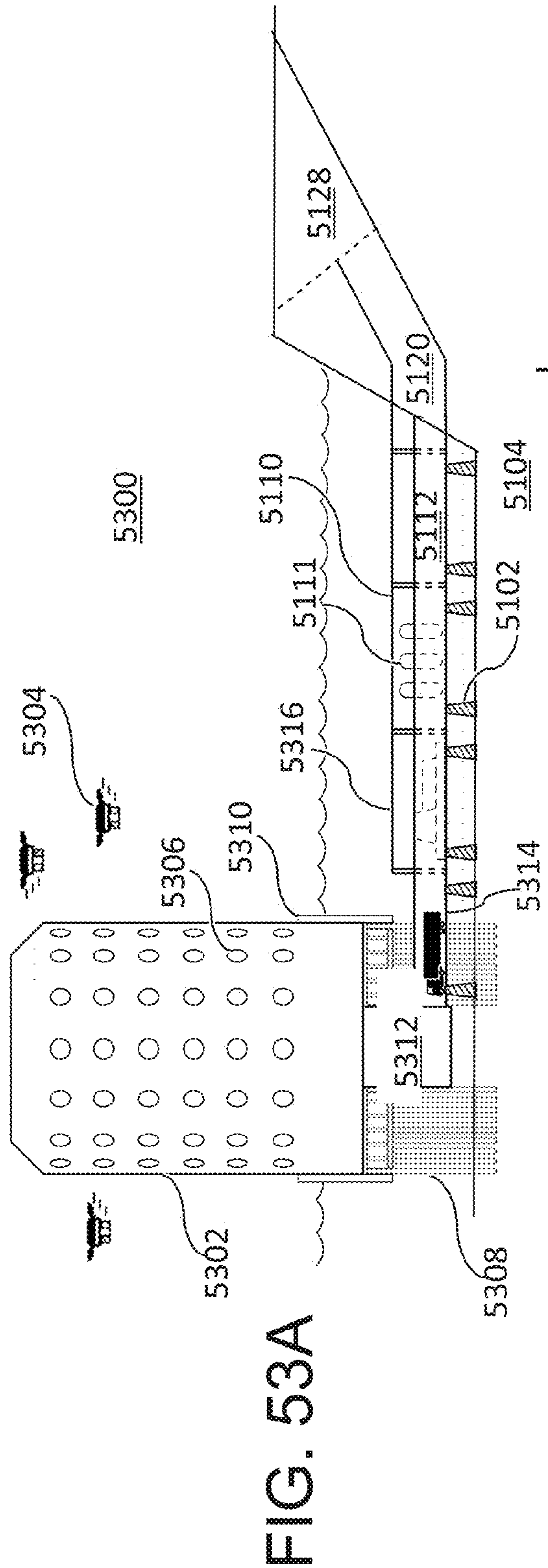
Figure 53B:
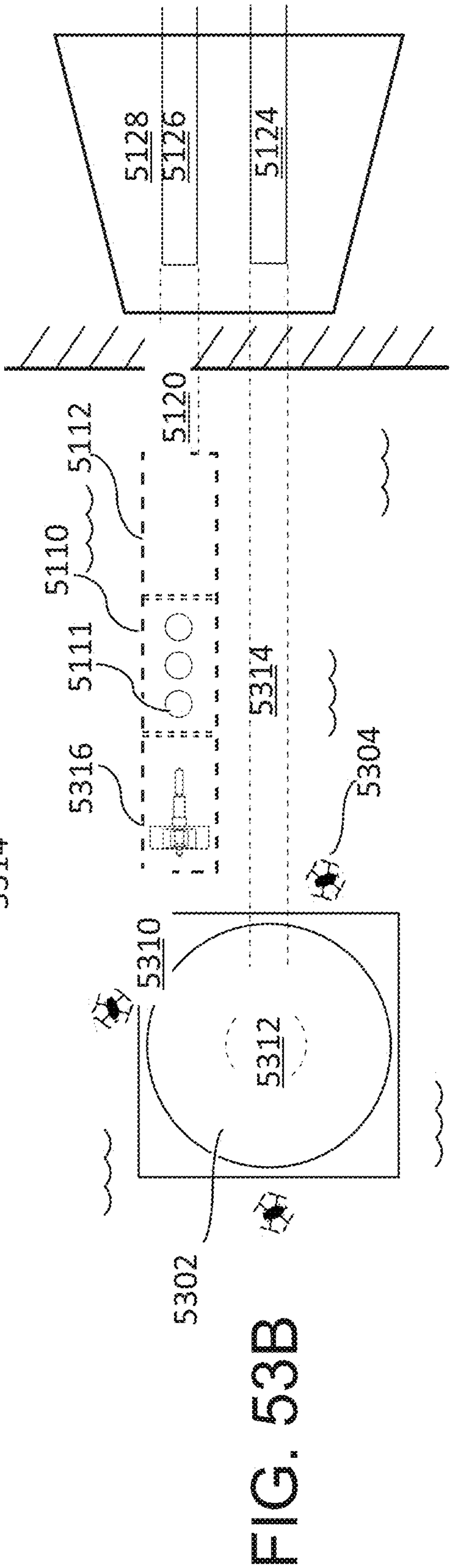
Figure 54:
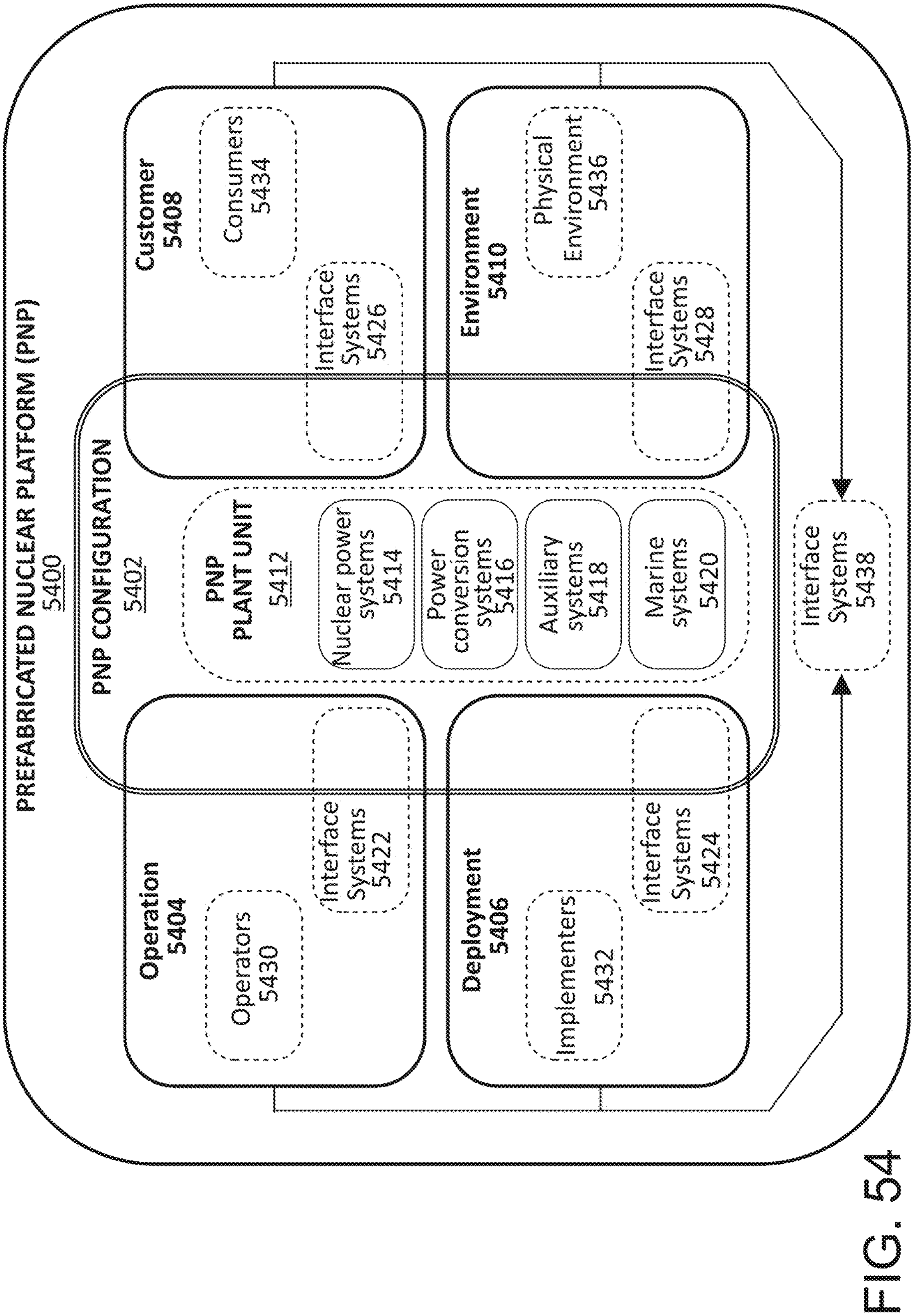
Figure 55:
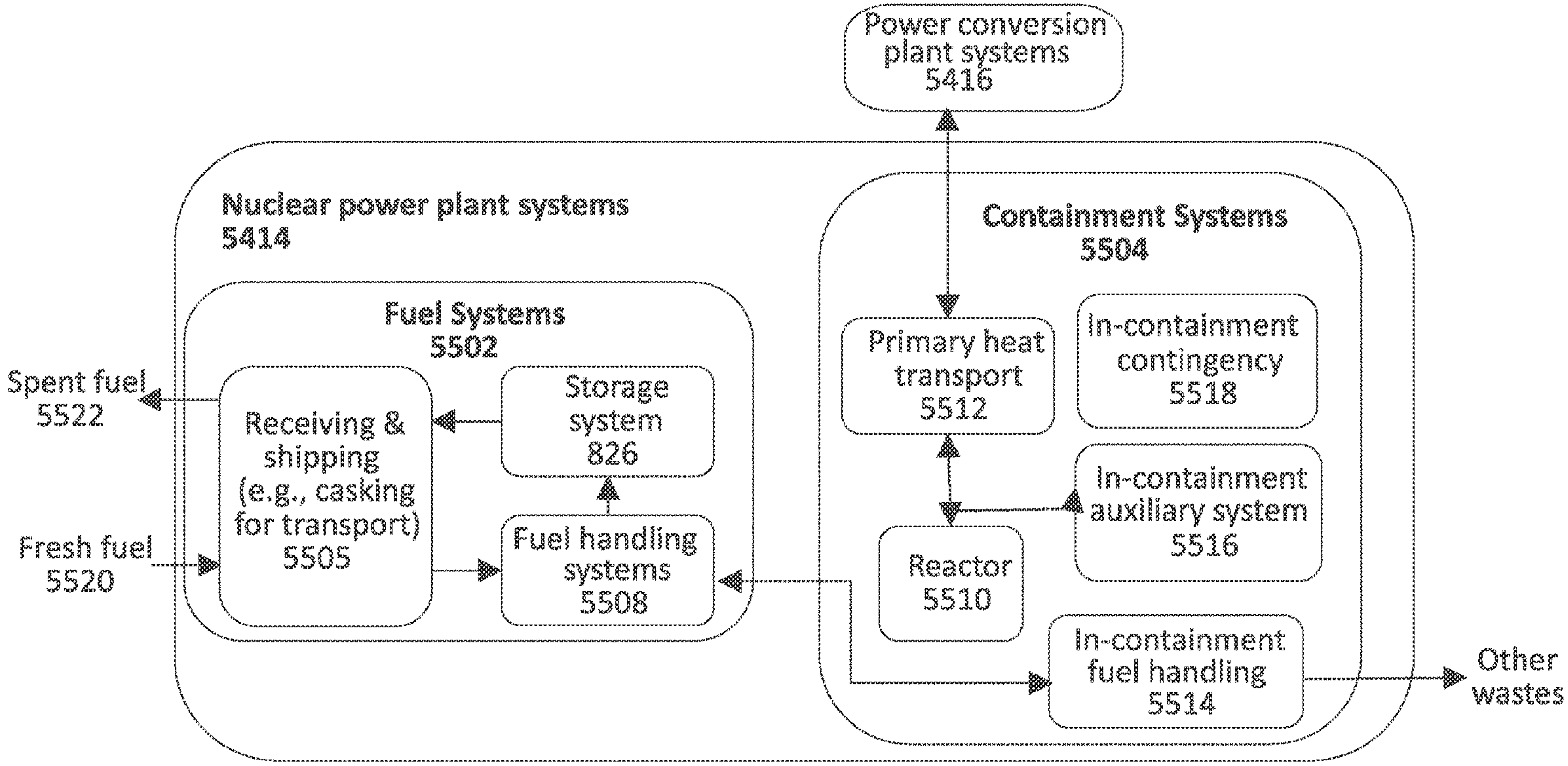
Figure 56:
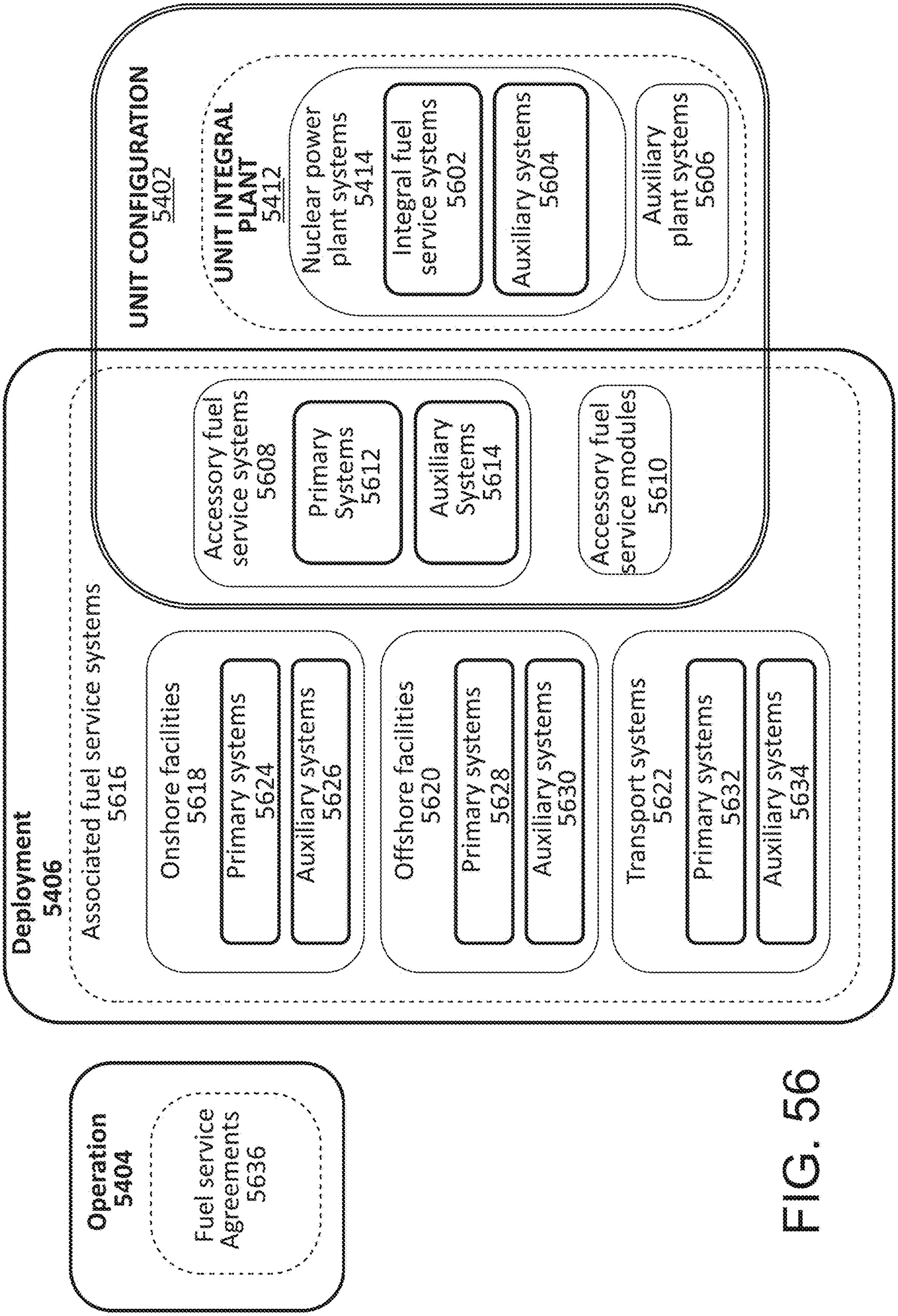
Figure 57:
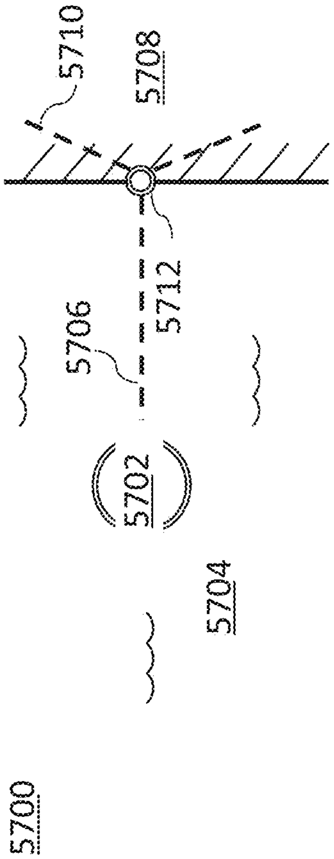
Figure 58:
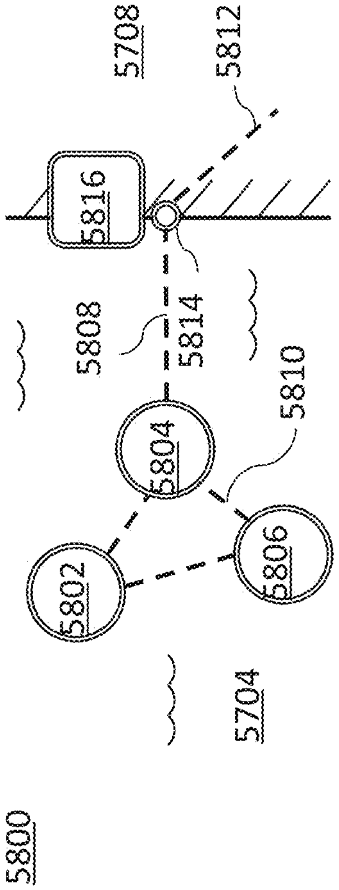
Figure 59:
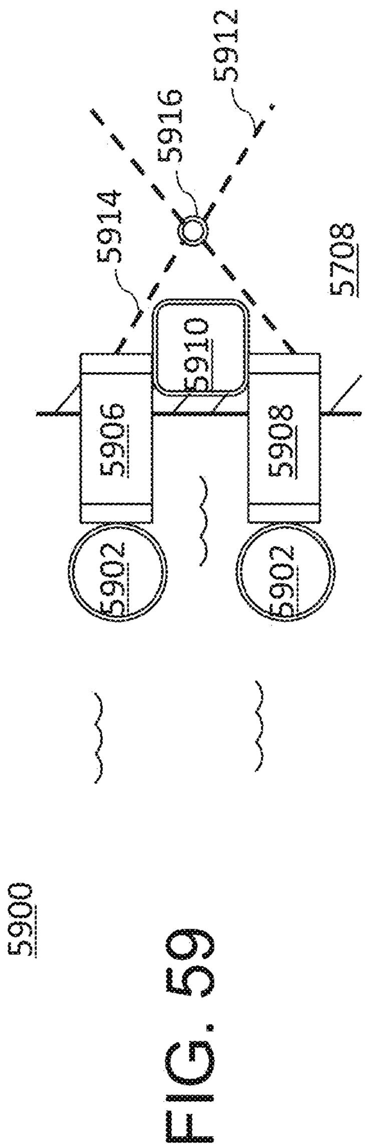
Figure 60:
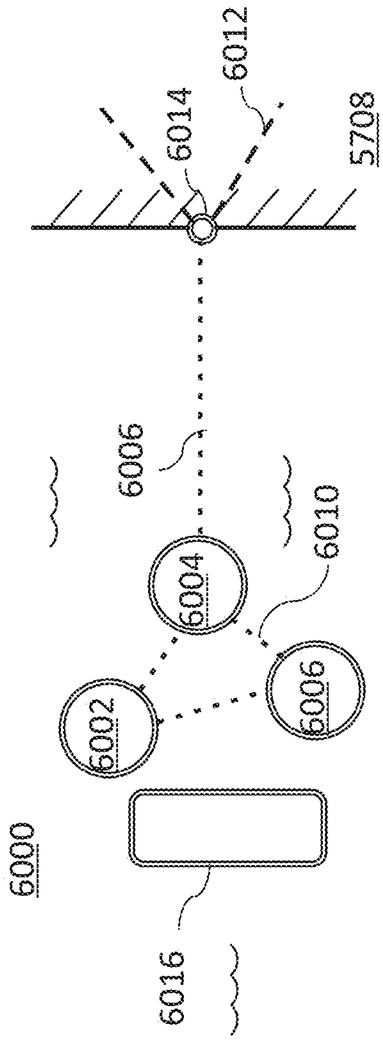
Figure 61A:
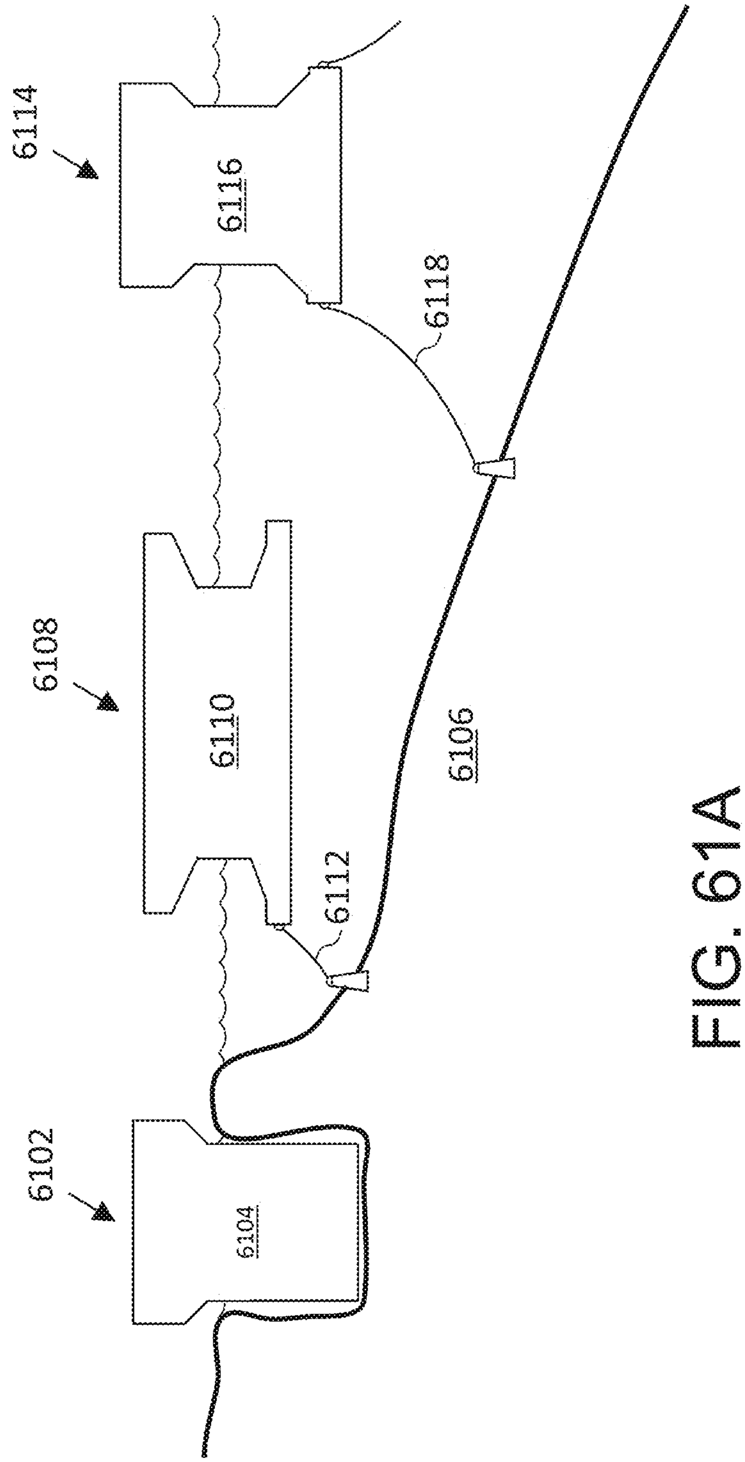
Figure 61B:
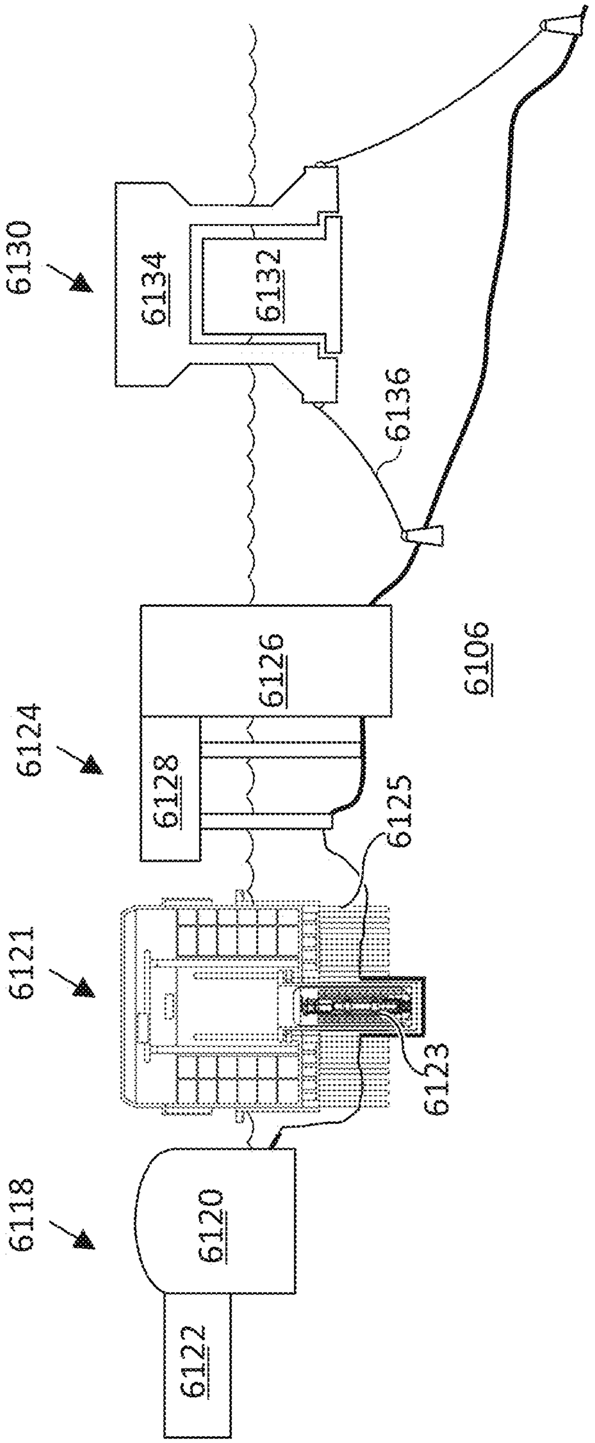
Figure 62:
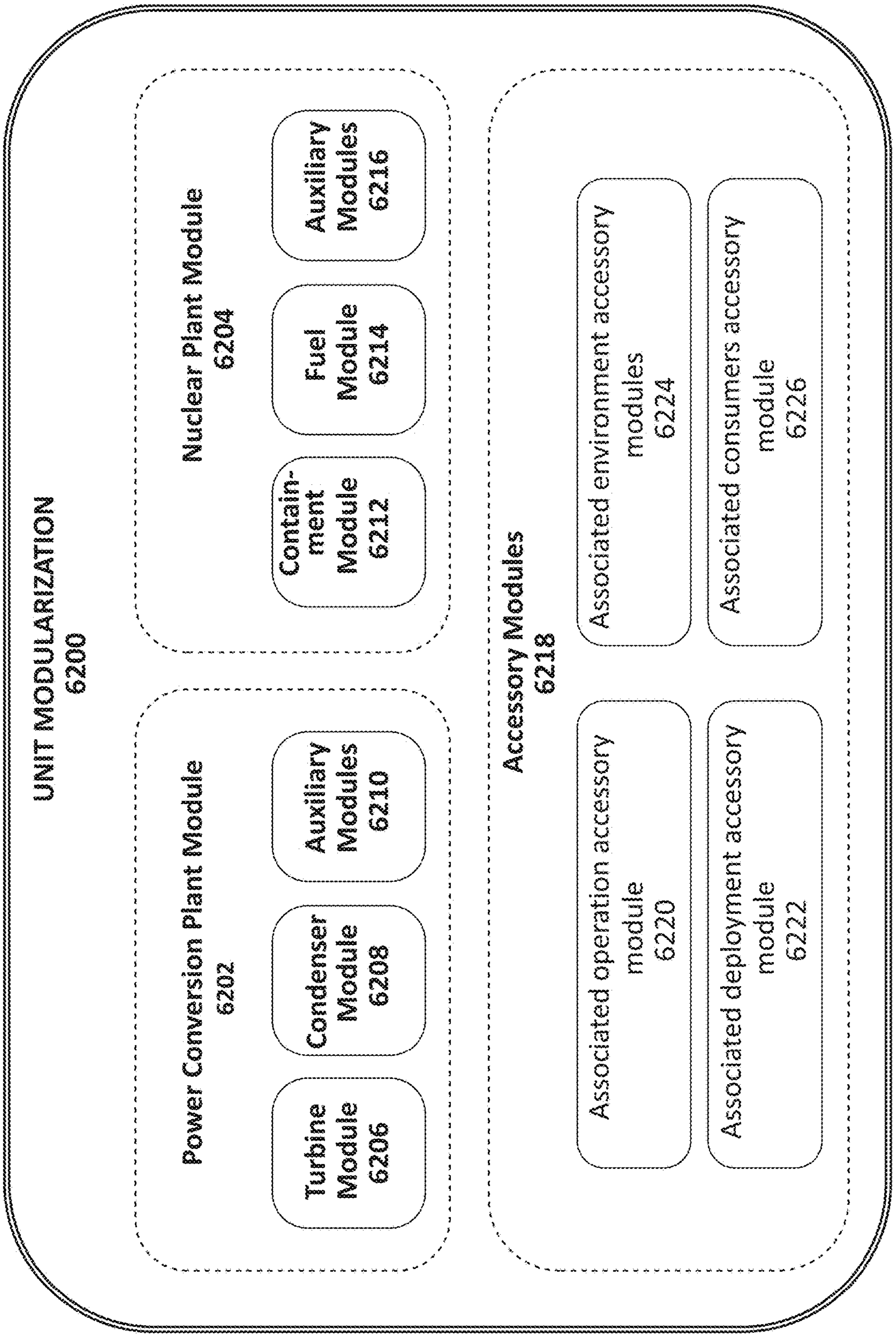
Figure 63:
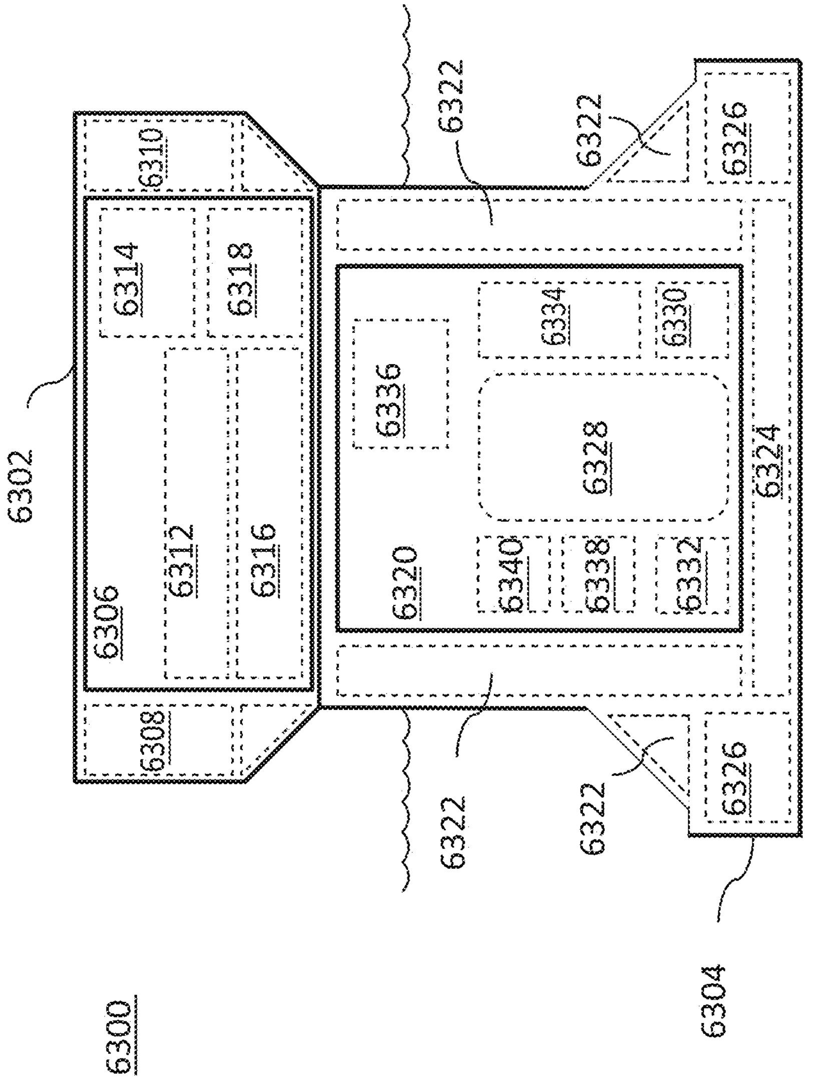
Figure 64:
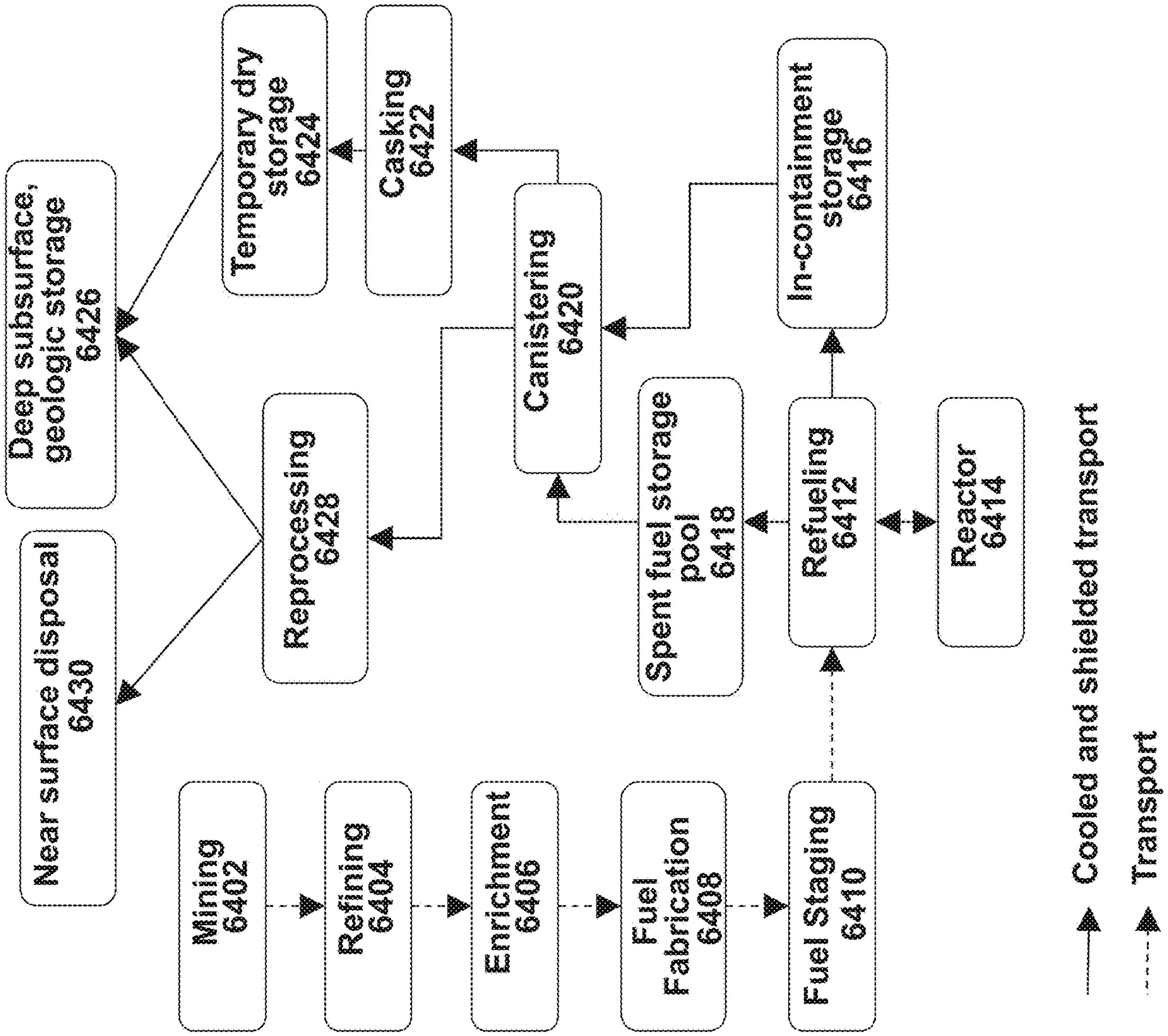
Figure 65:
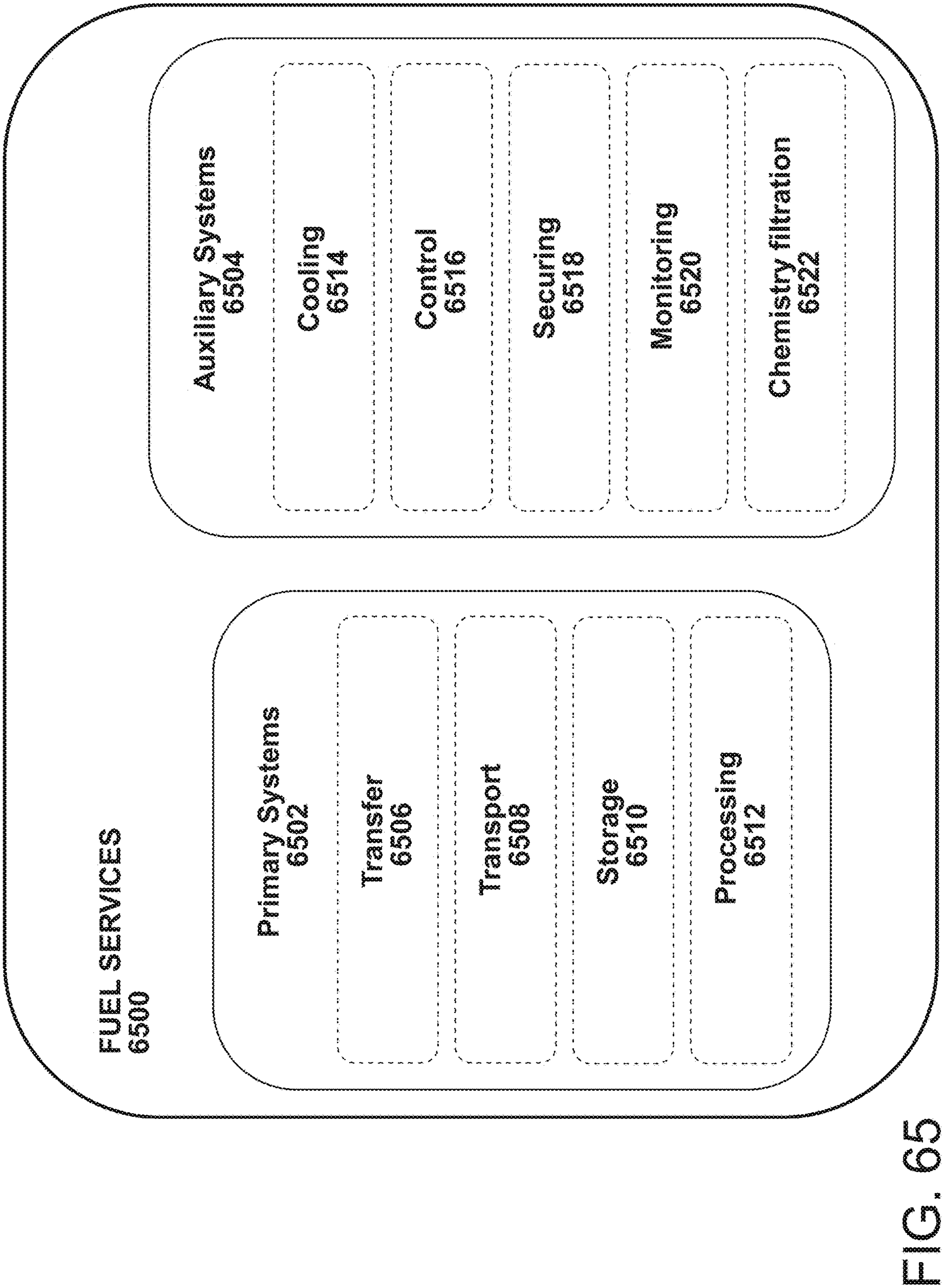
Figure 66:
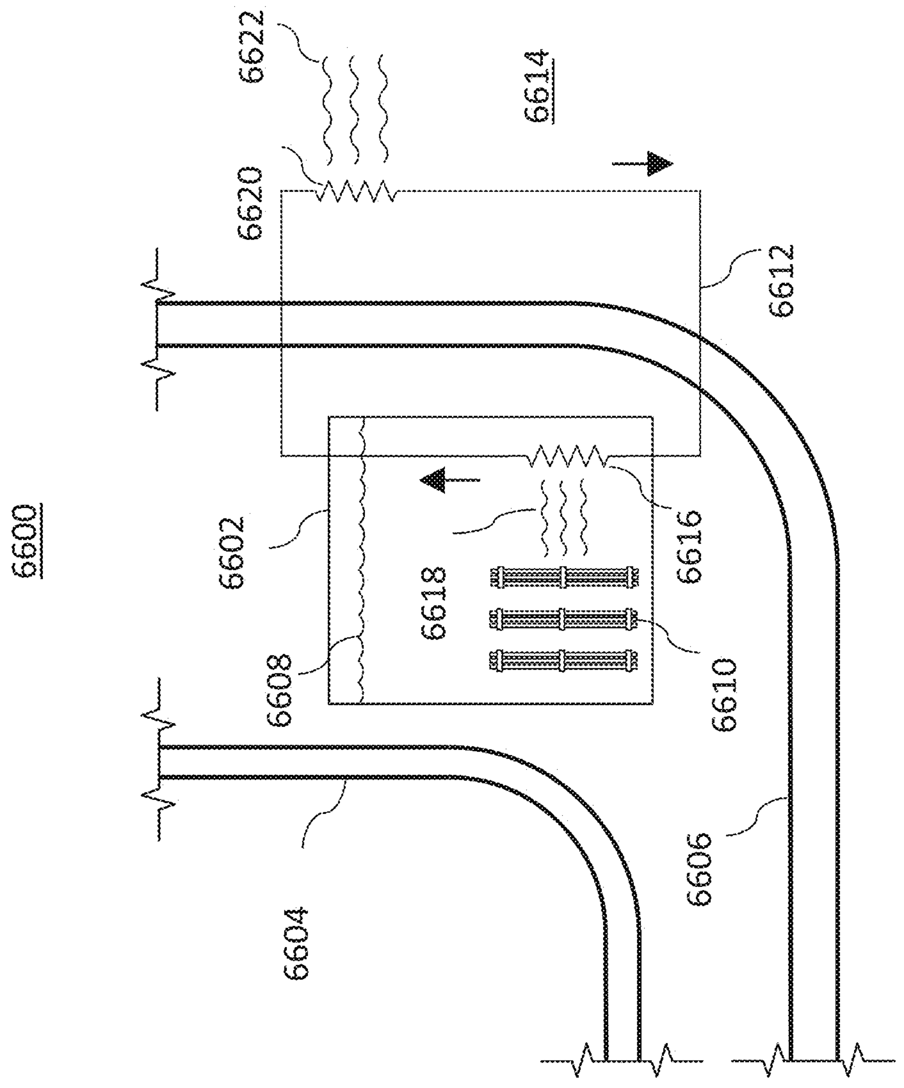
Figure 67:
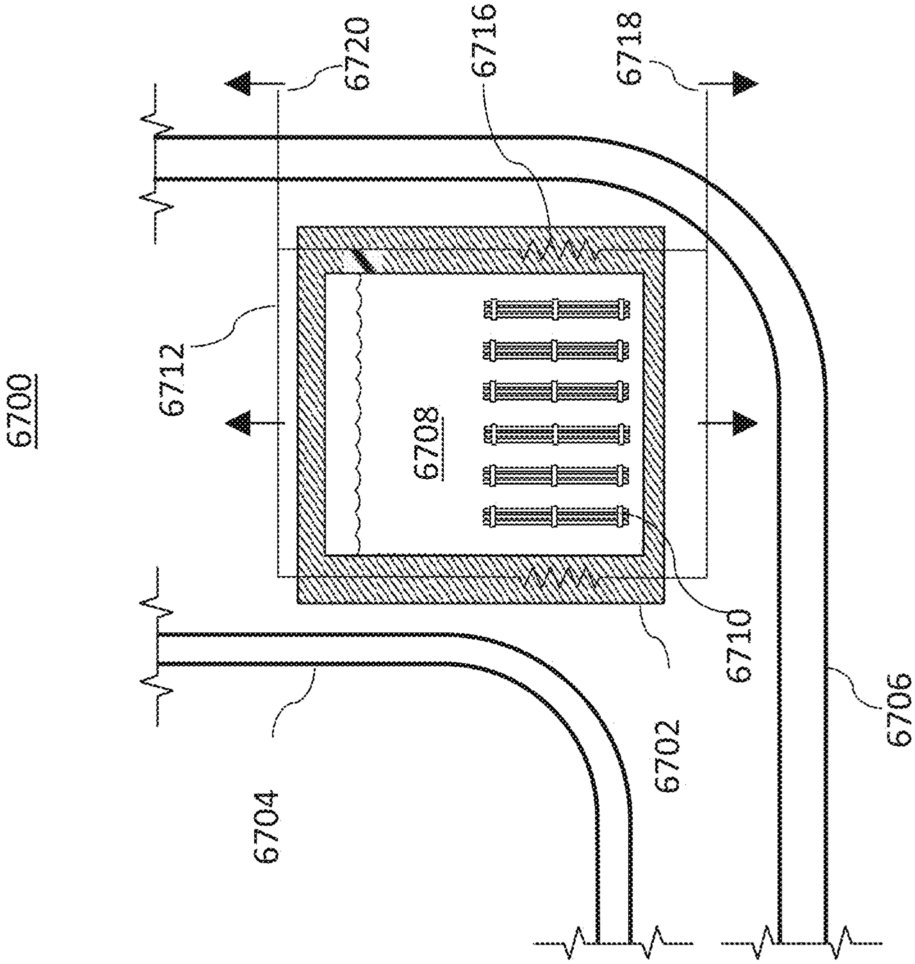
Figure 68:
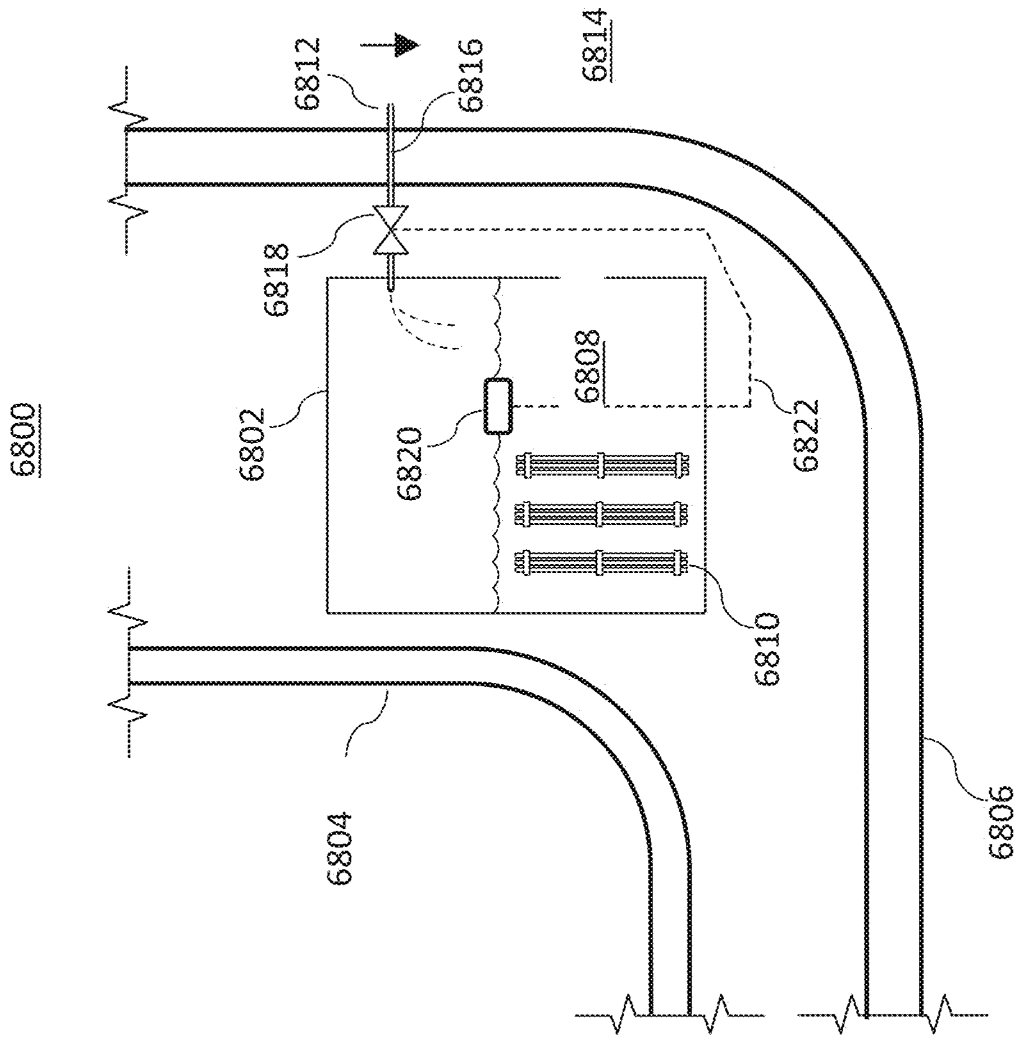
Figure 69:
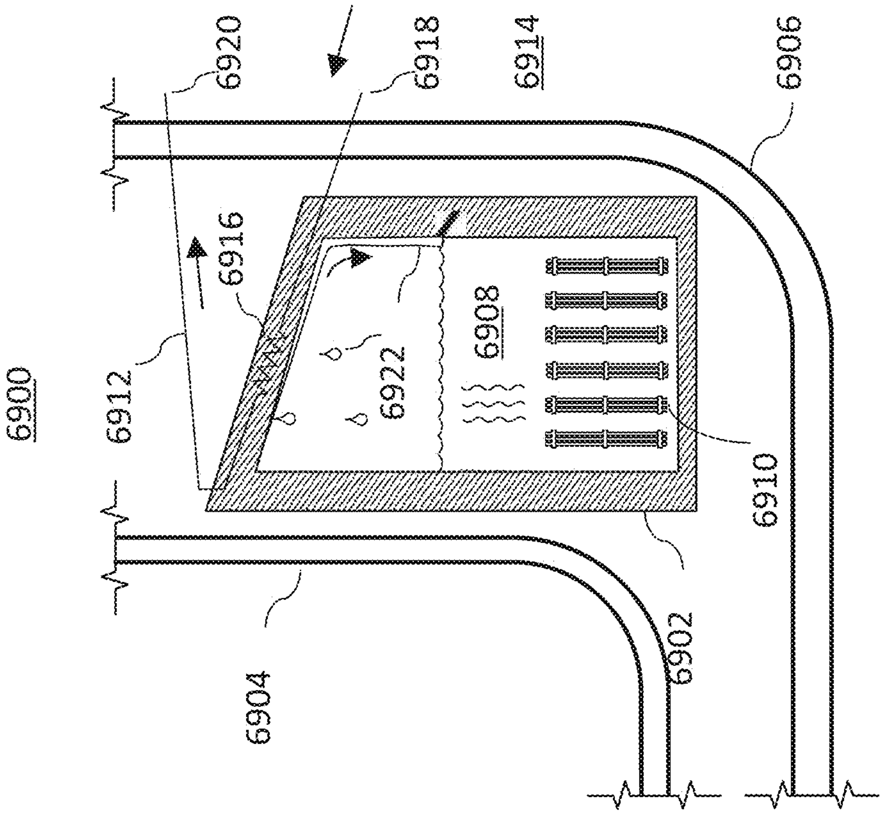
Figure 70A:
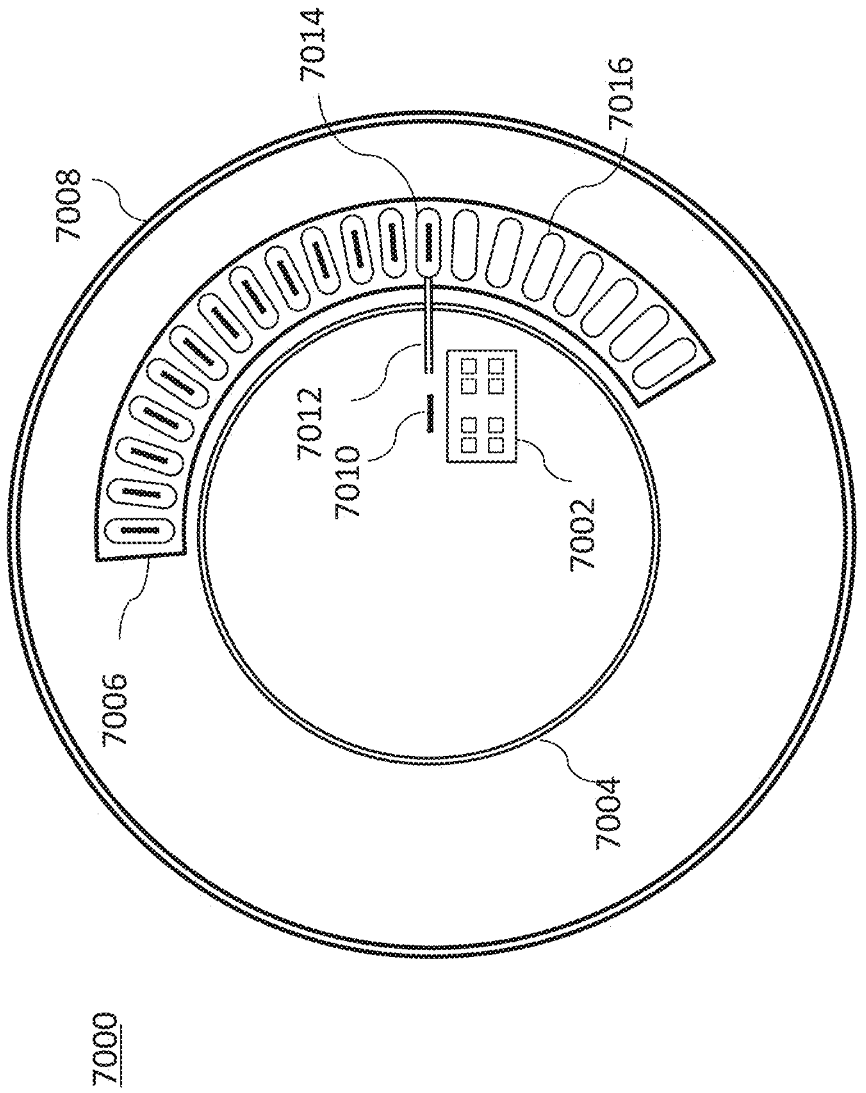
Figure 70B:
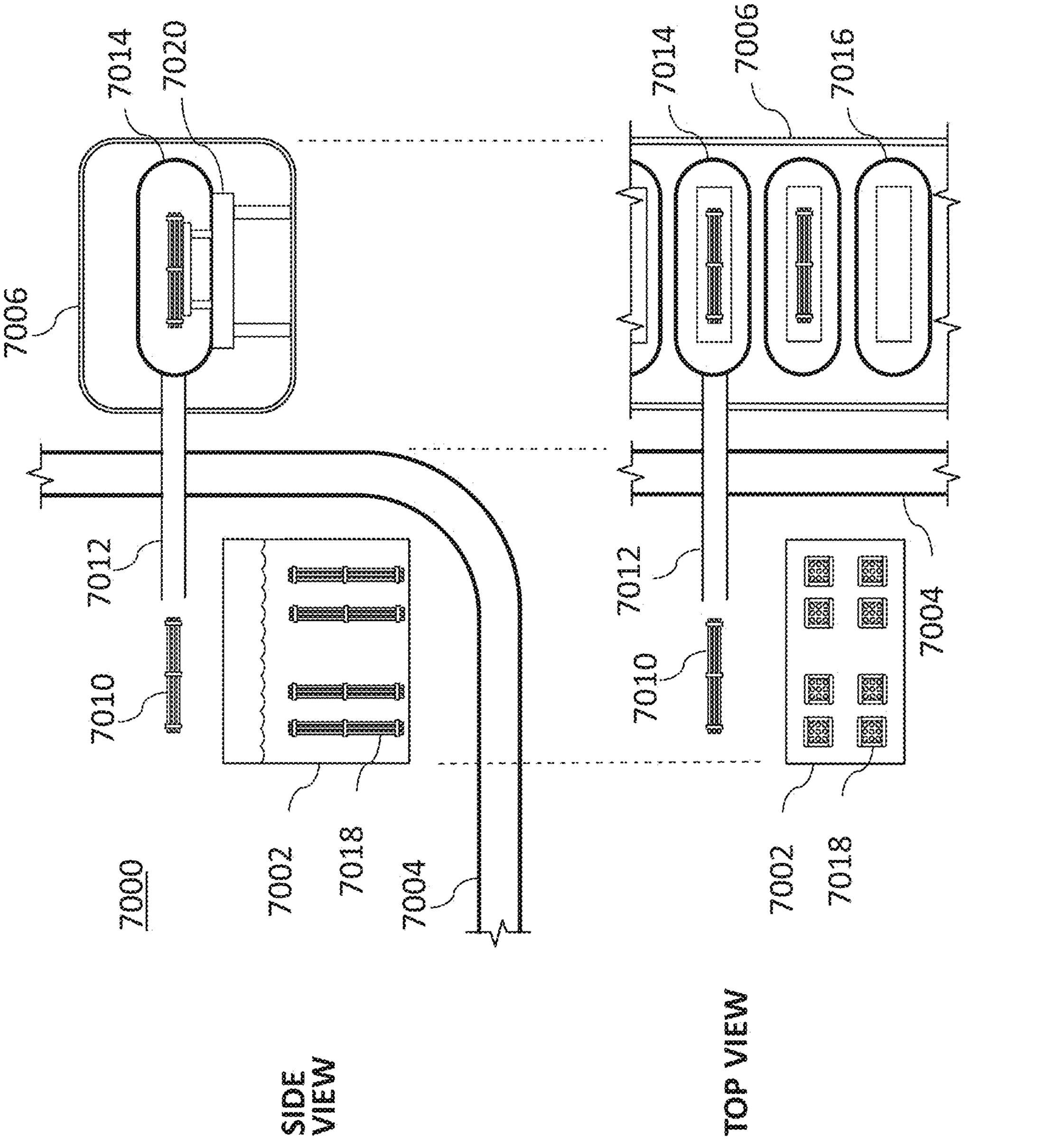
Figure 71A:
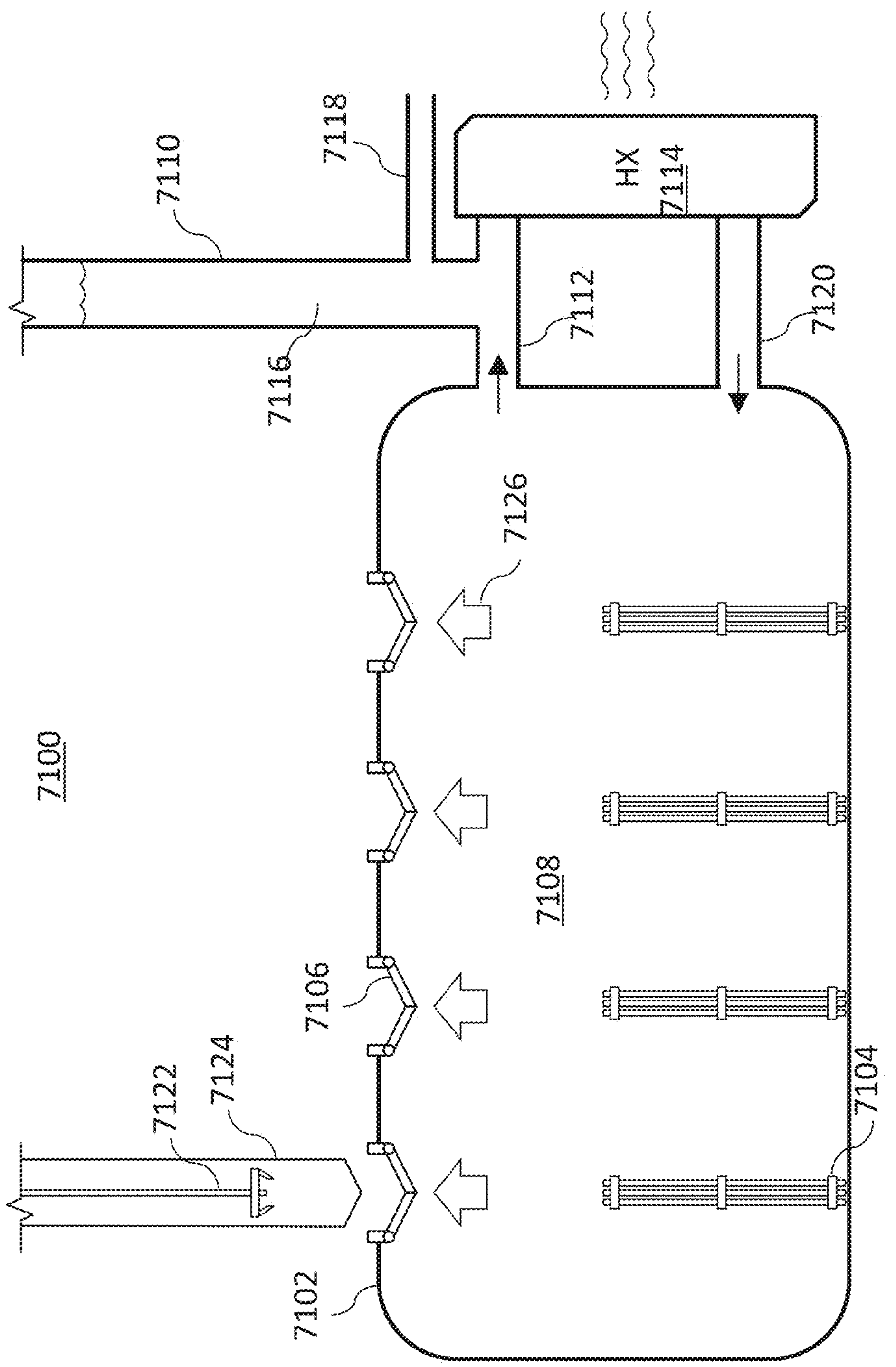
Figure 71B:
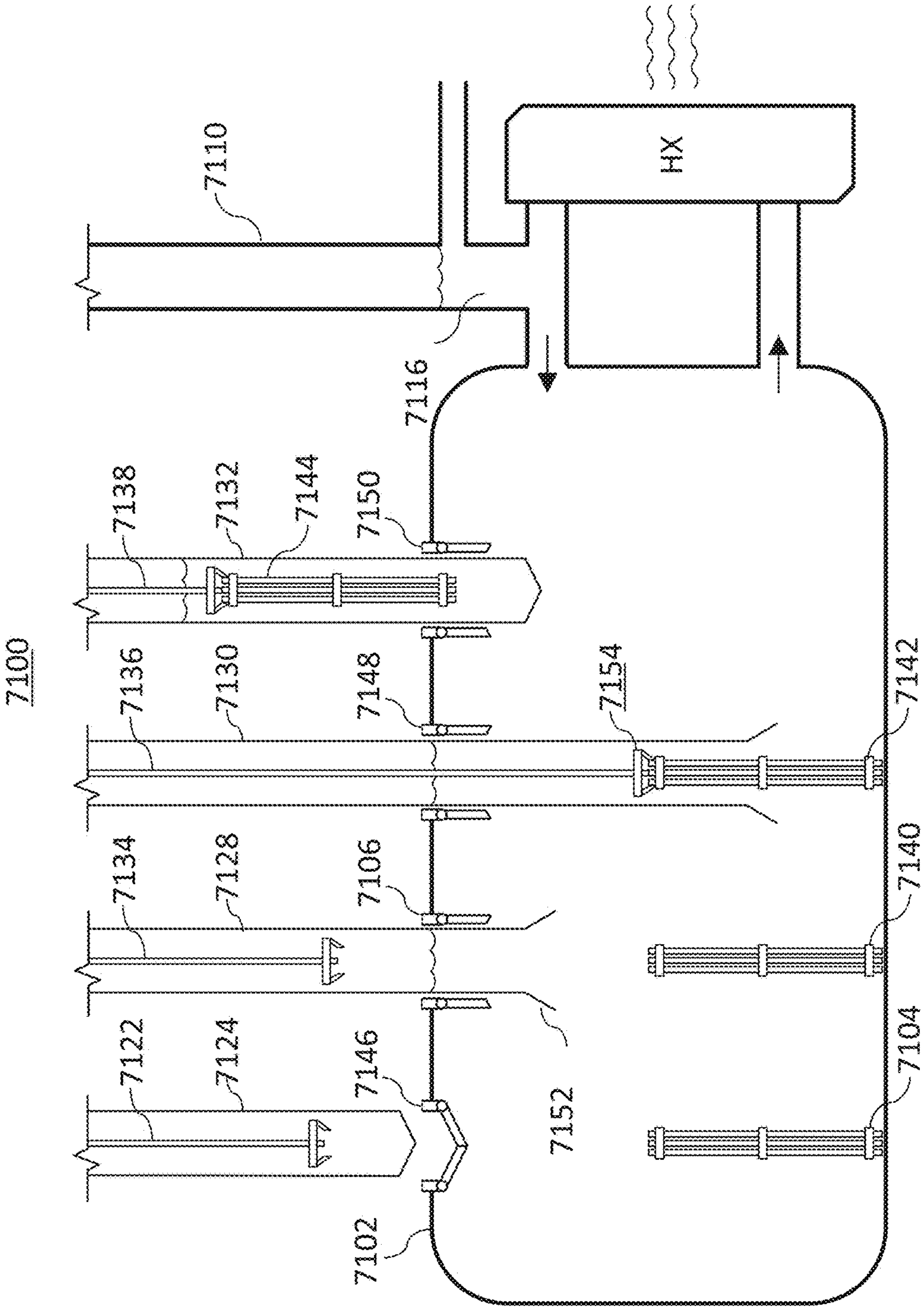
Figure 72A:
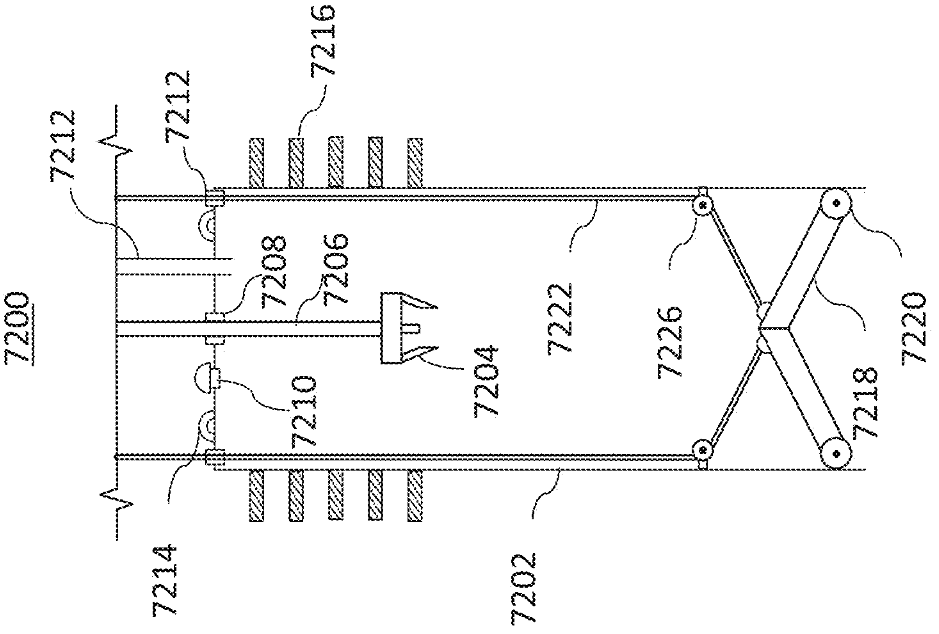
Figure 72B:
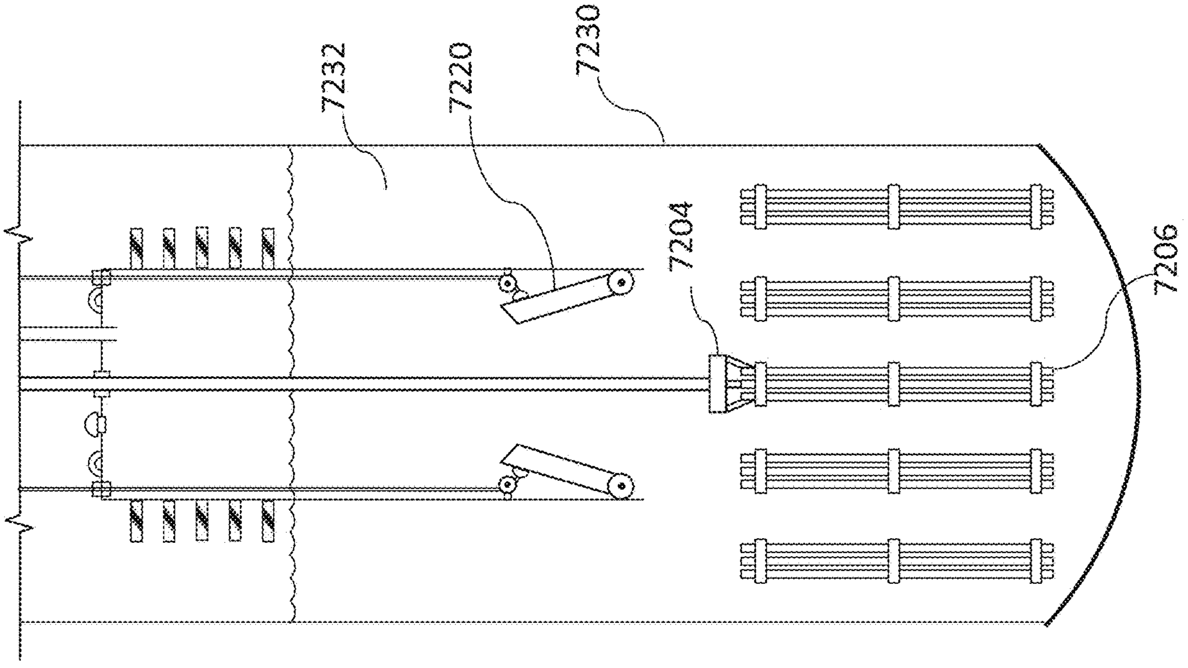
Figure 72C:
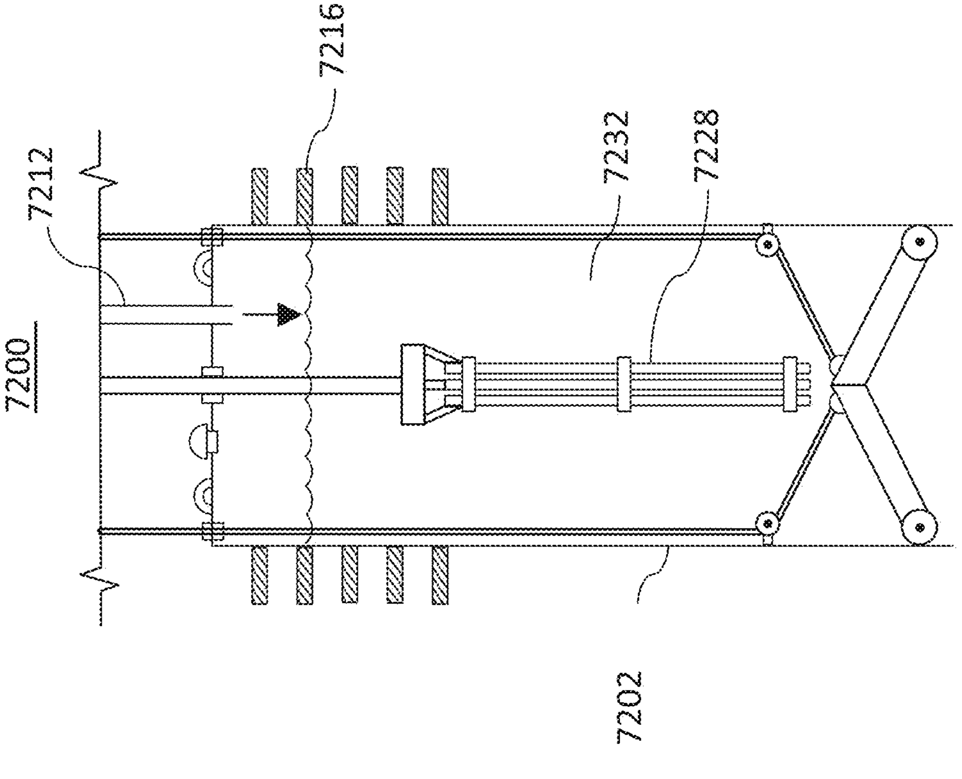
Figure 73:
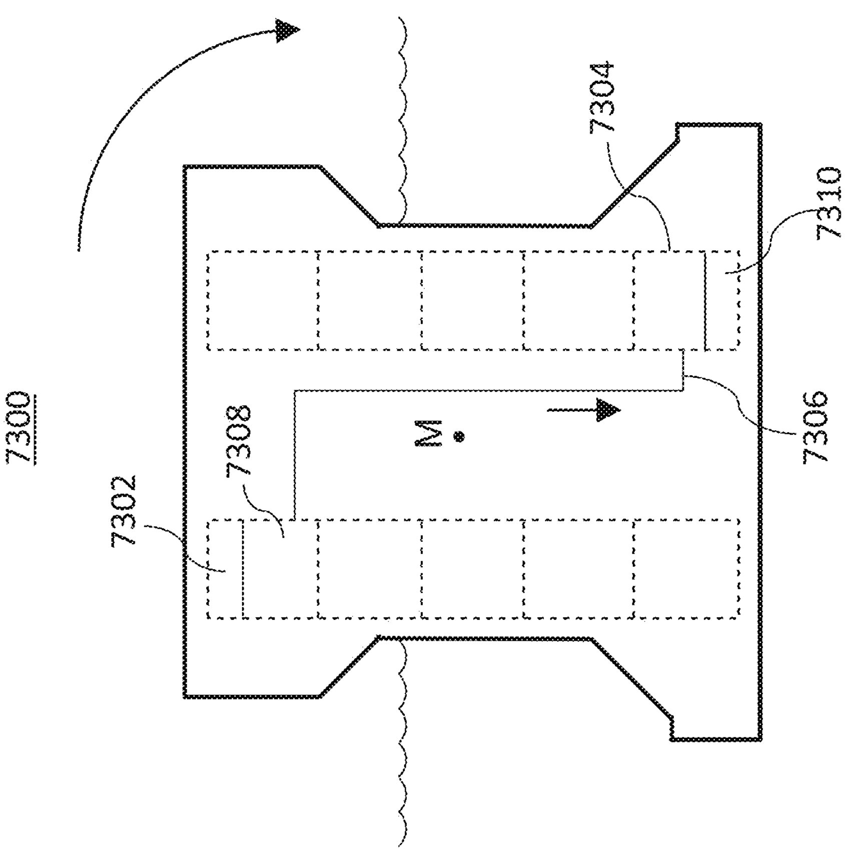
Figure 74:
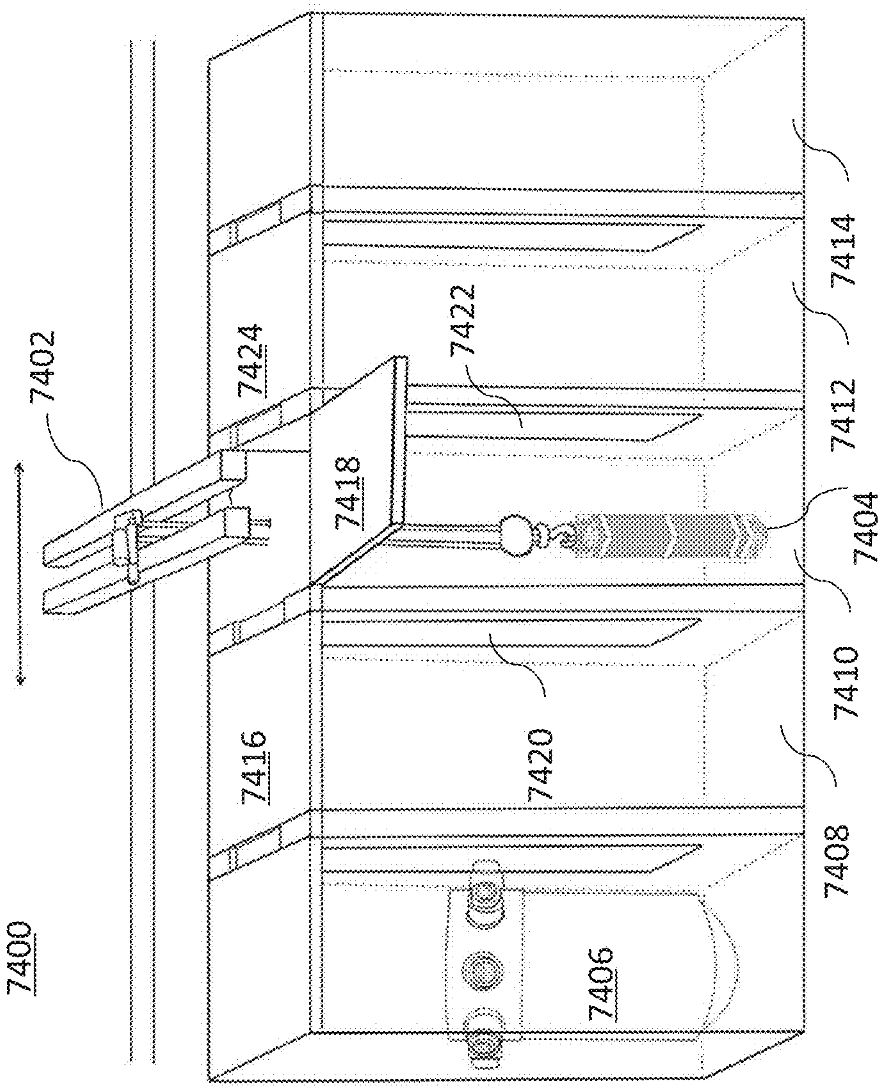
Figure 75:
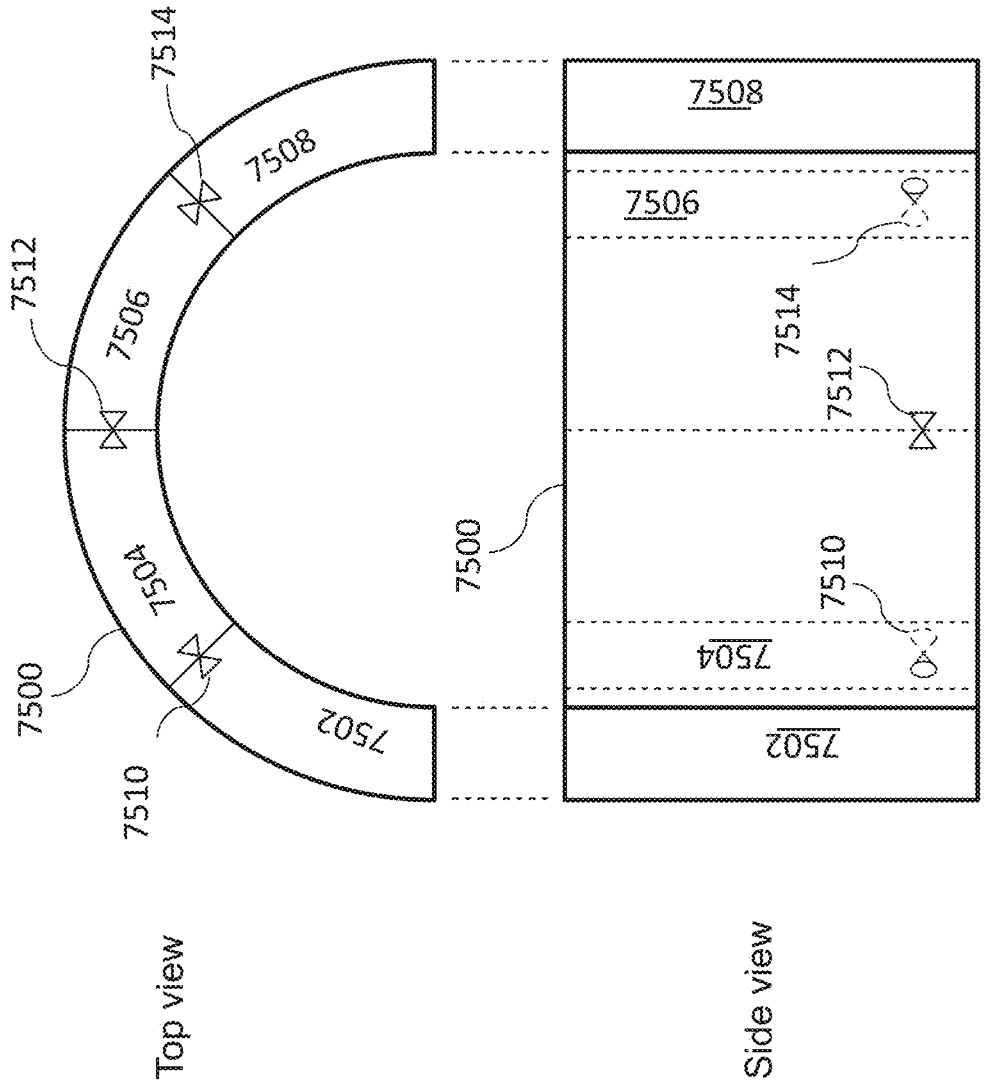
Figure 76A:
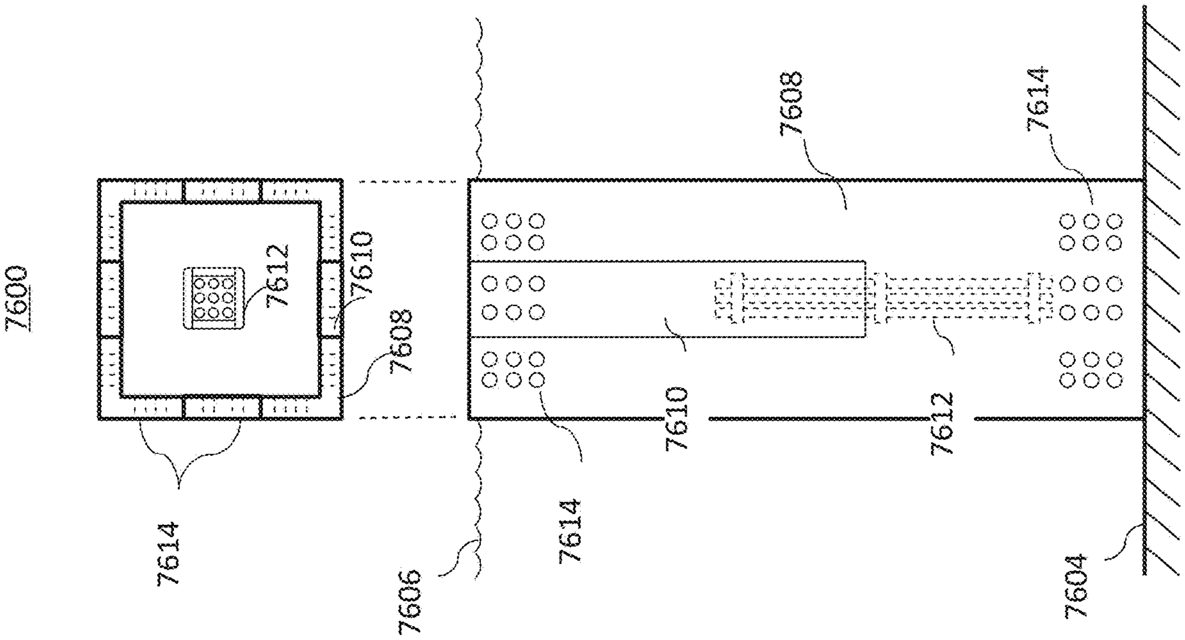
Figure 76B:
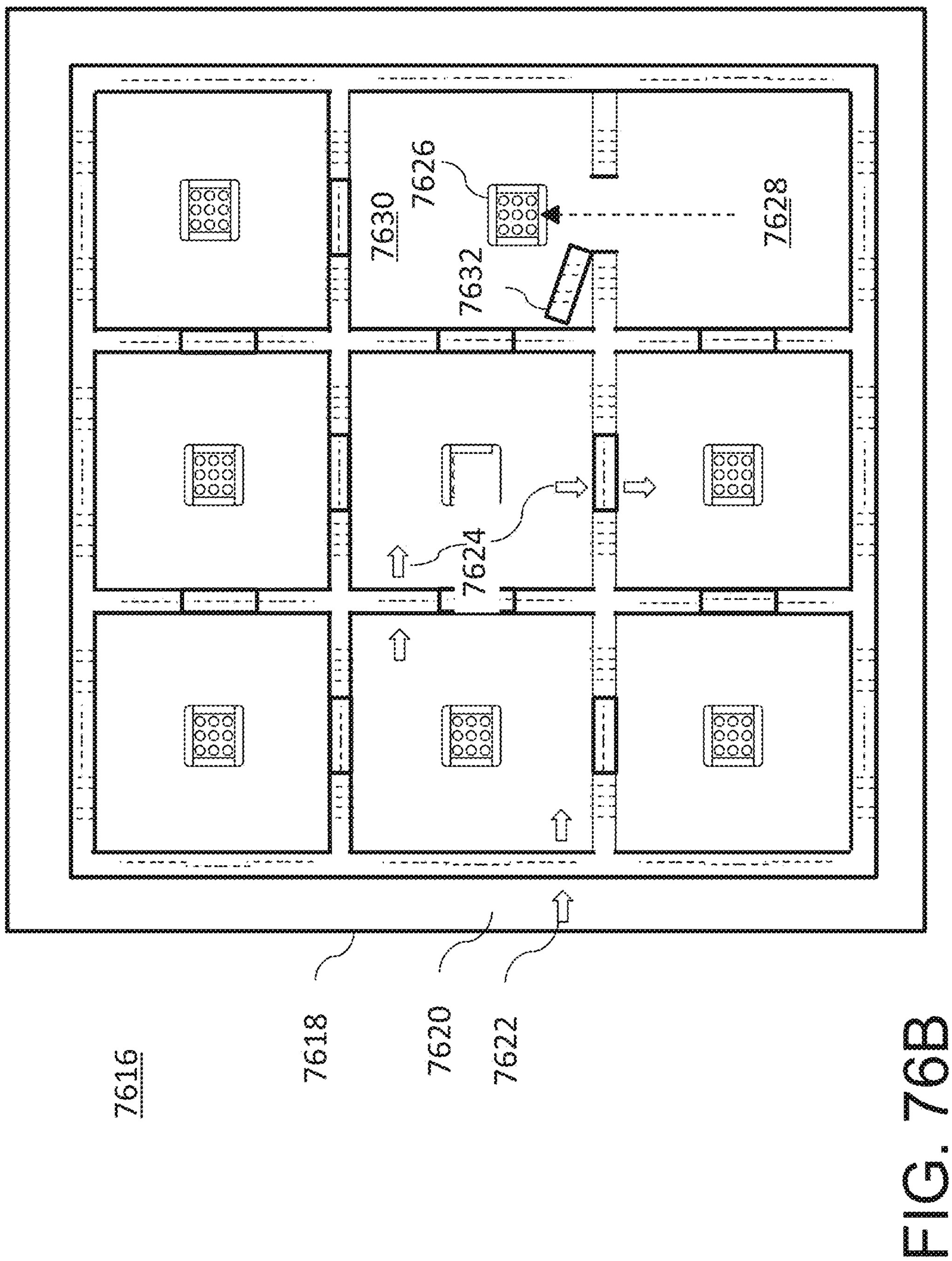
Figure 76C:
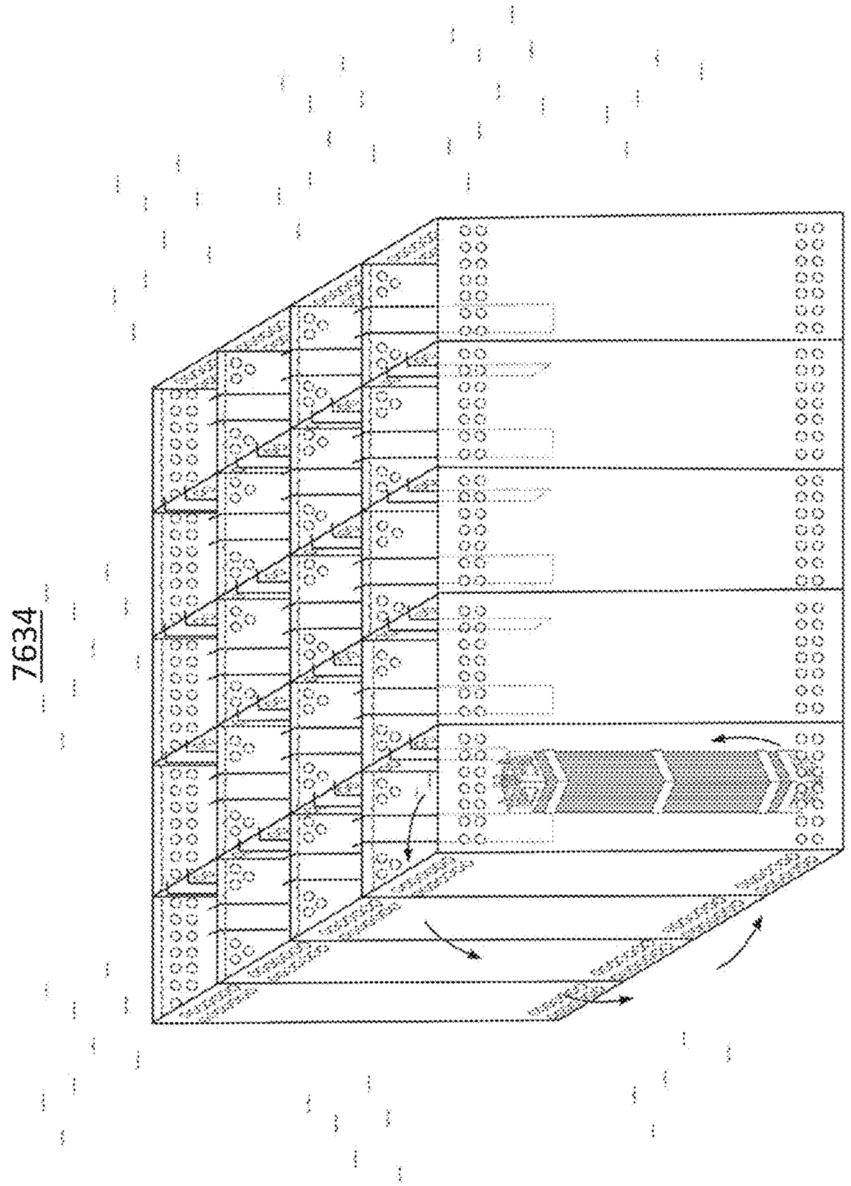
Figure 77:
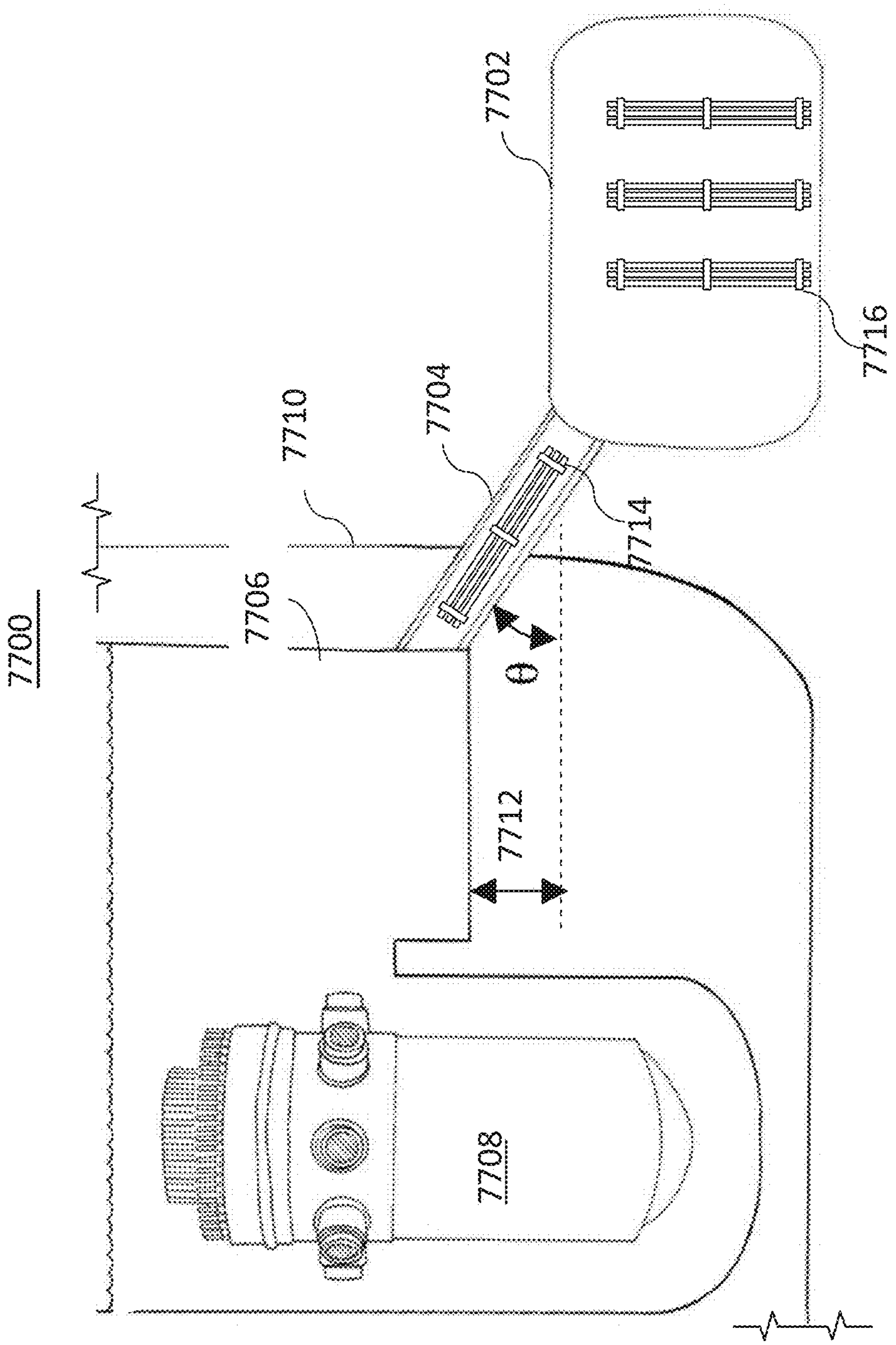
Figure 78A:
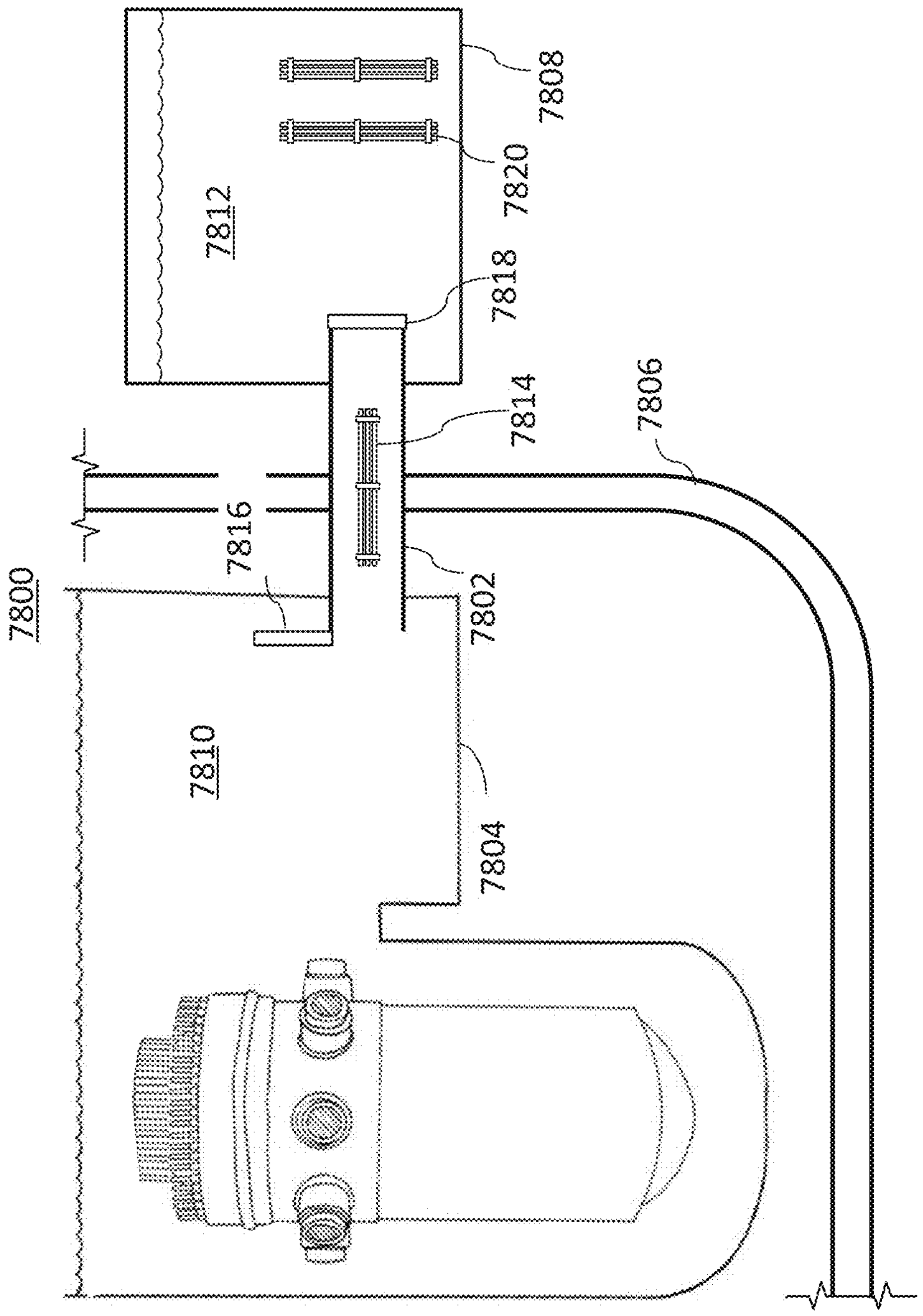
Figure 78B:
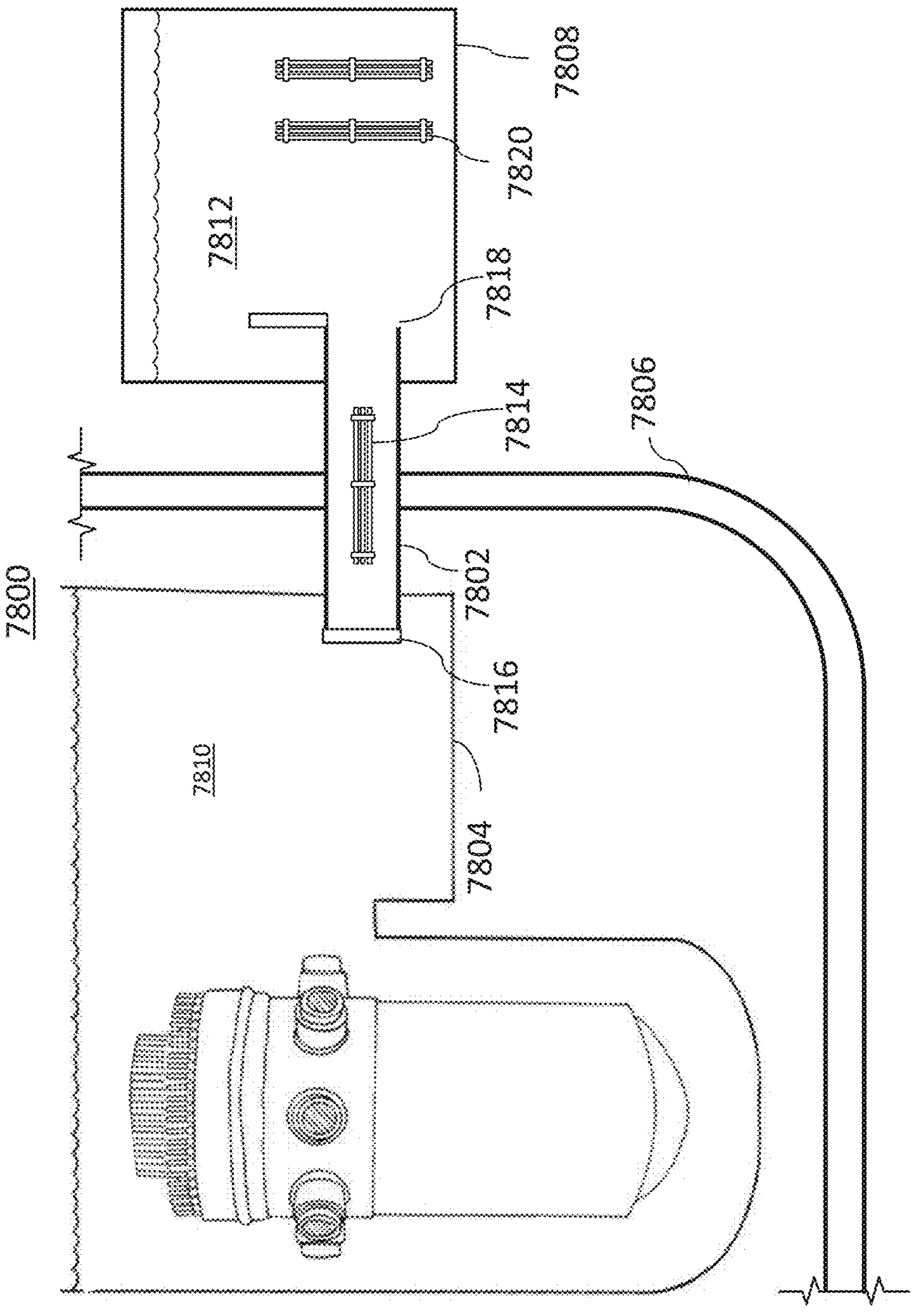
Figure 80:
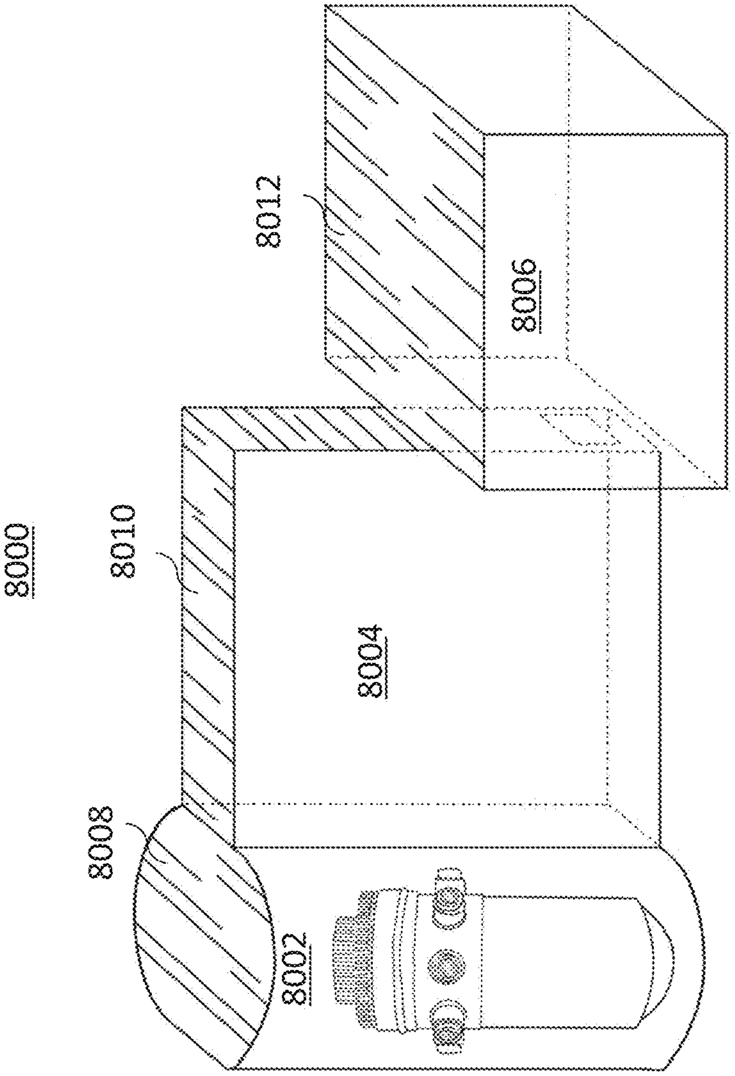
Figure 81:
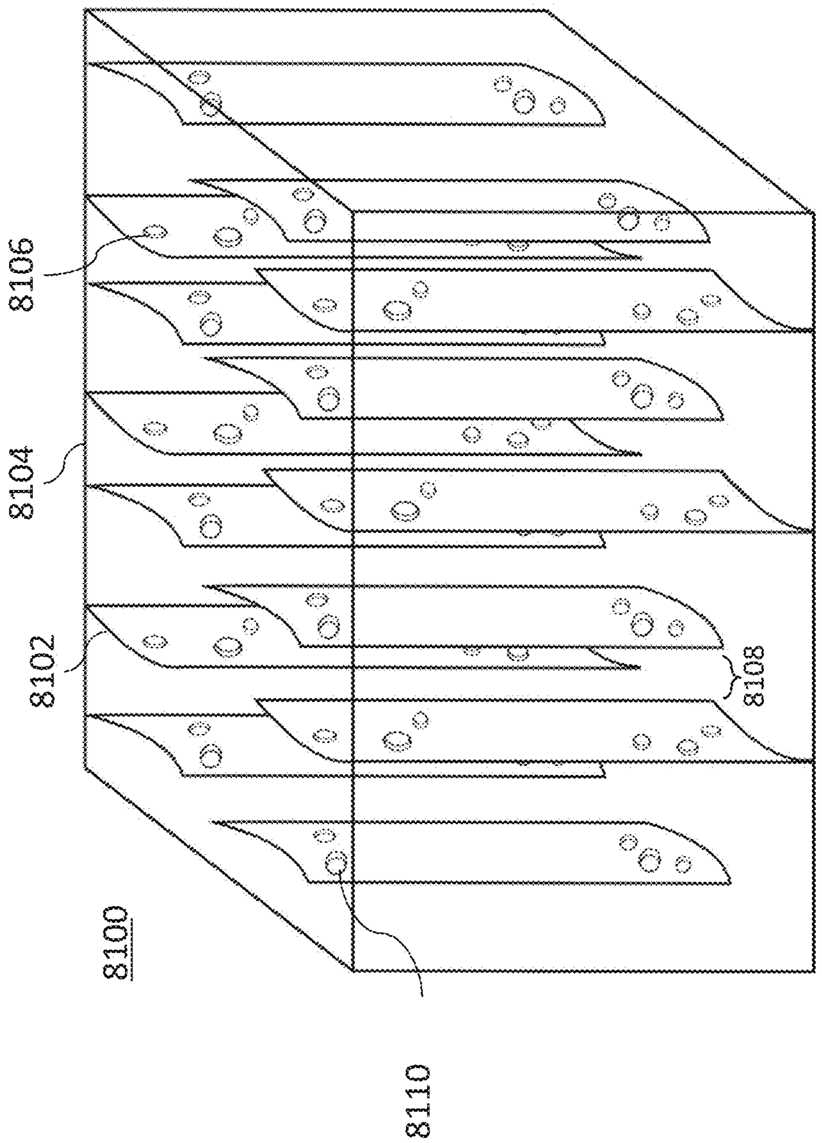
Figure 82:
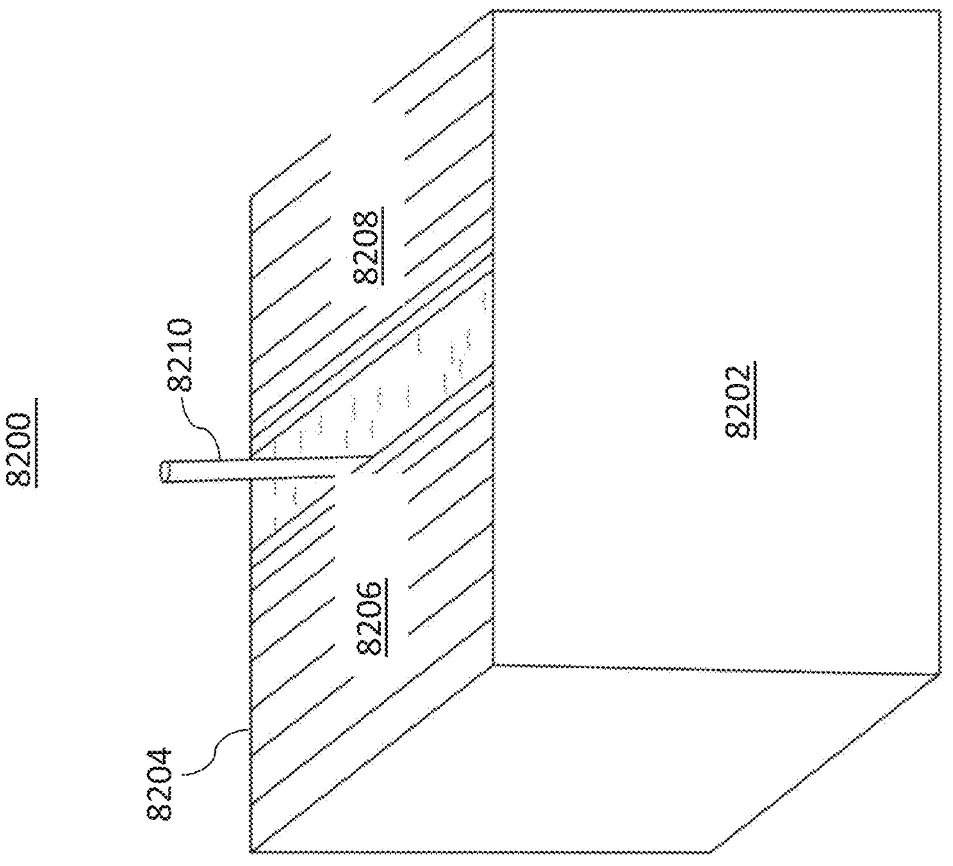
Figure 83:
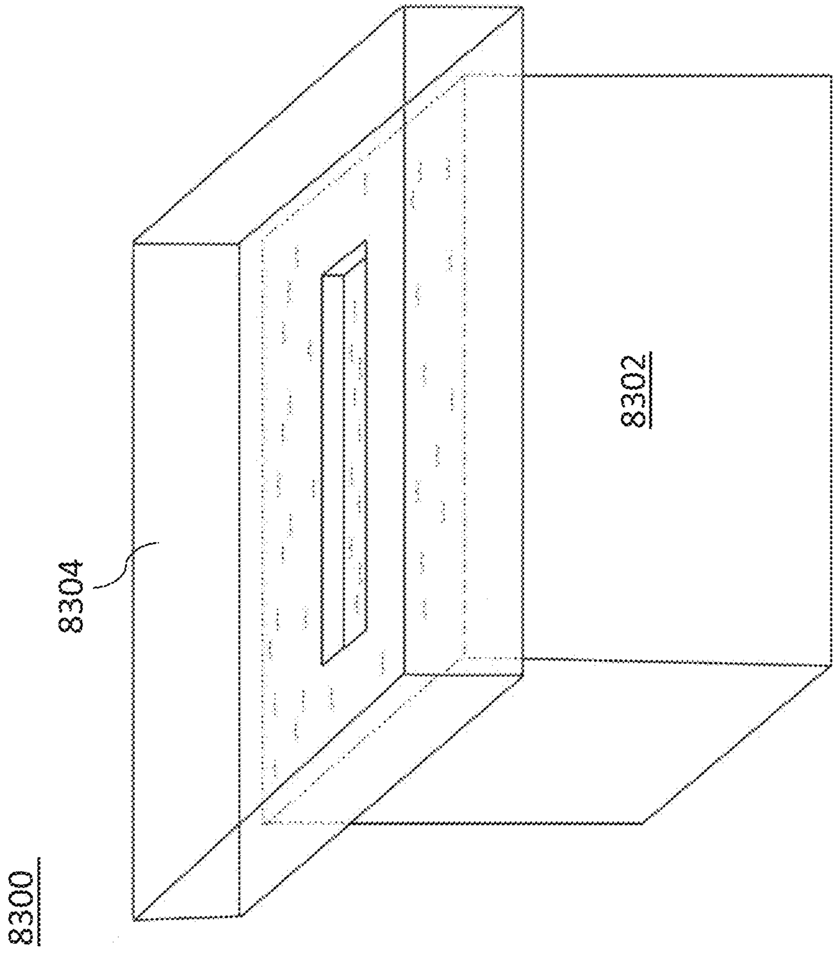
Figure 84:
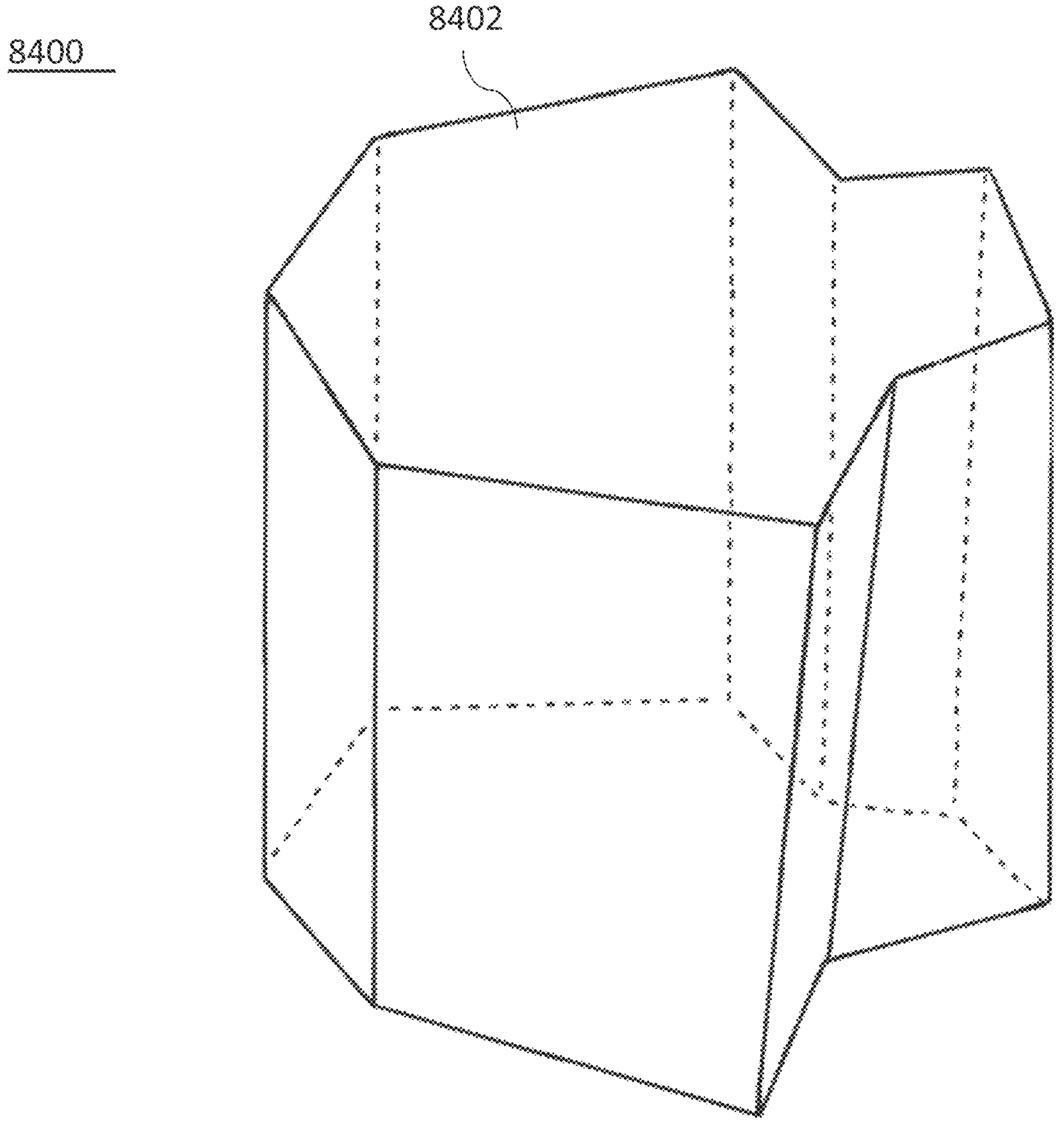
Figure 85:
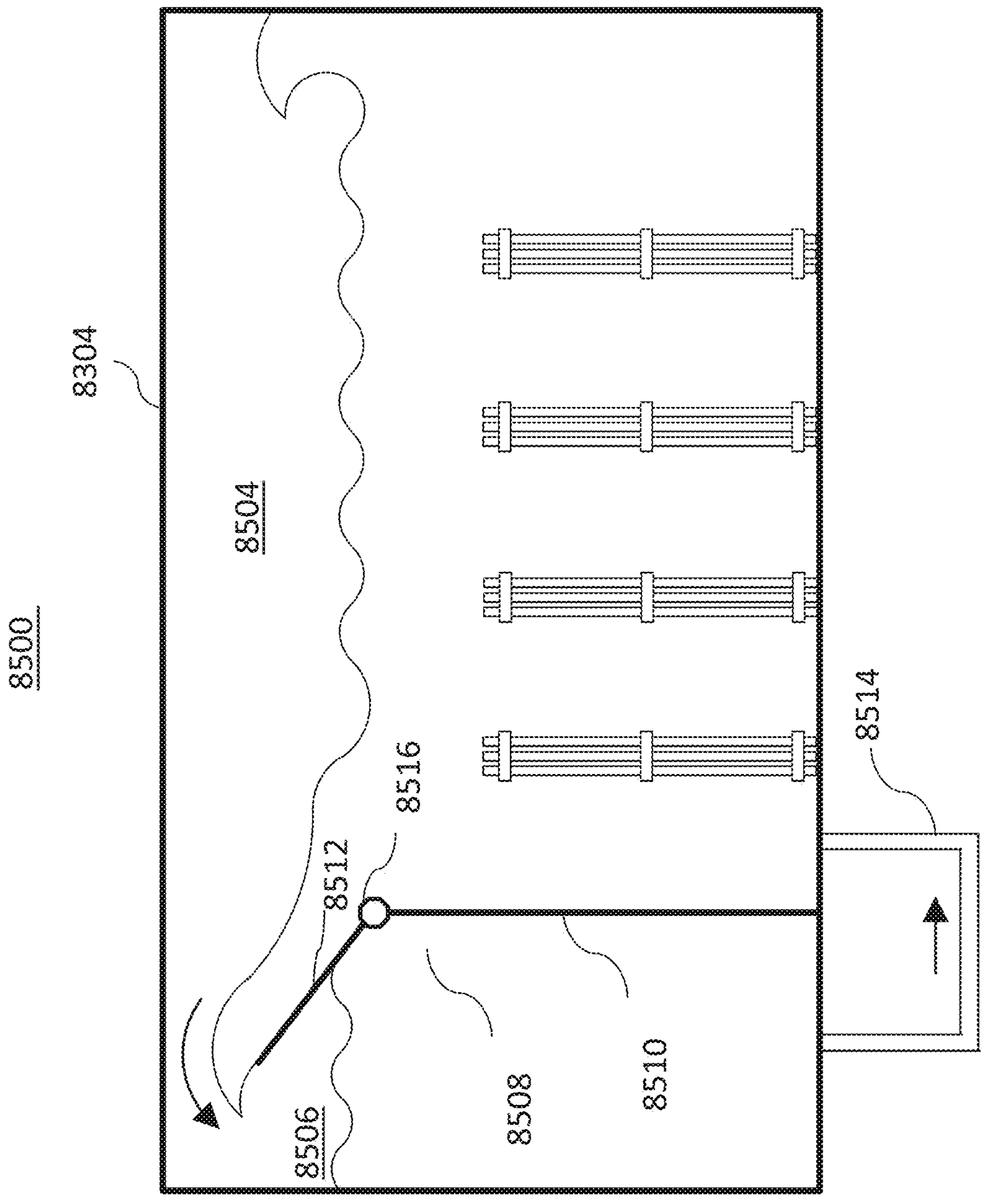
Figure 86A:
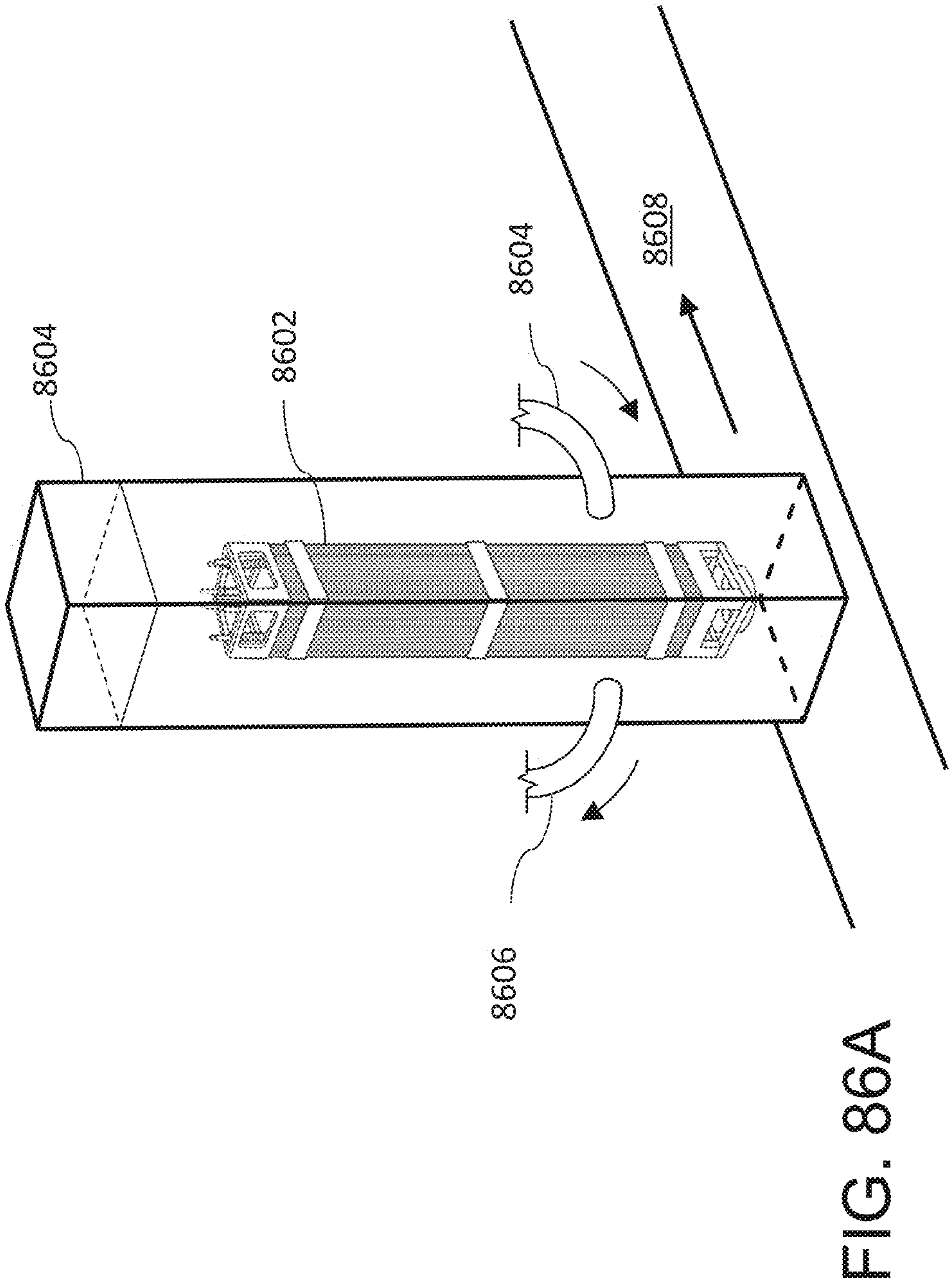
Figure 86B:
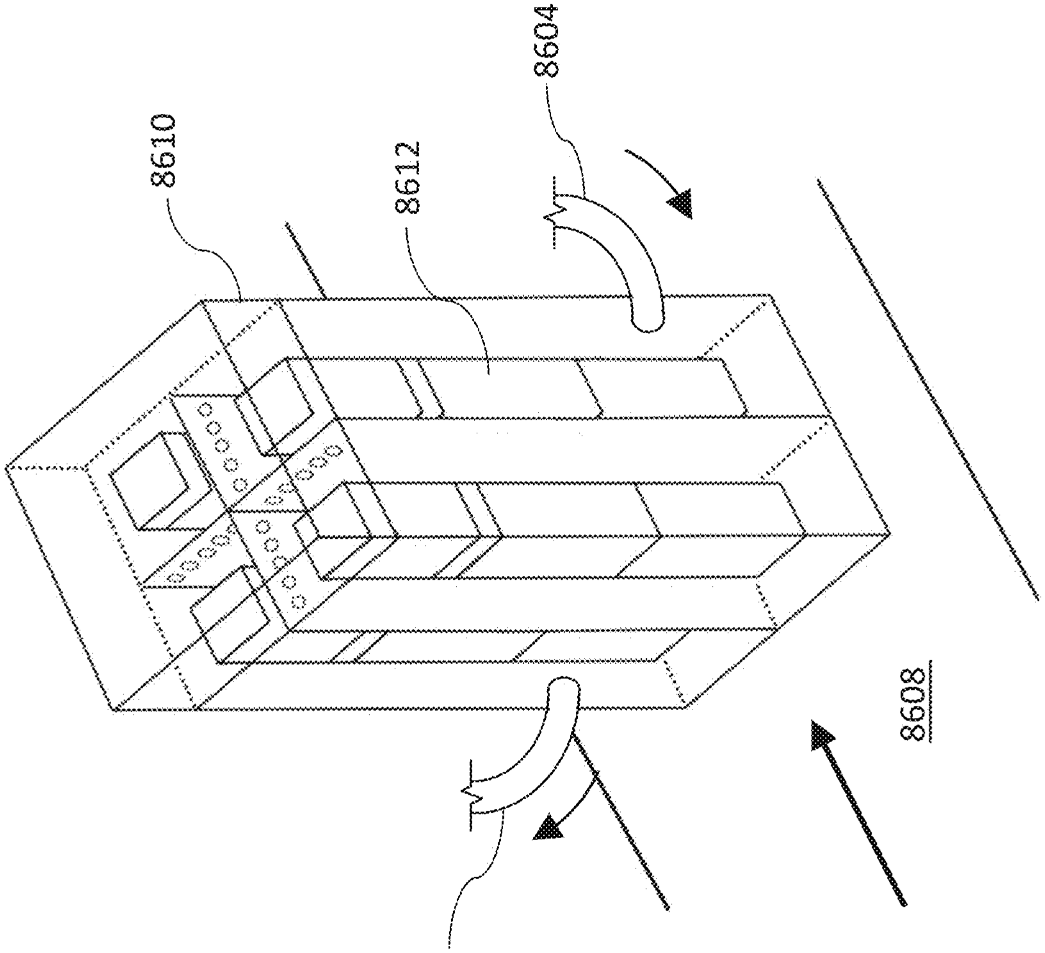
Figure 87:
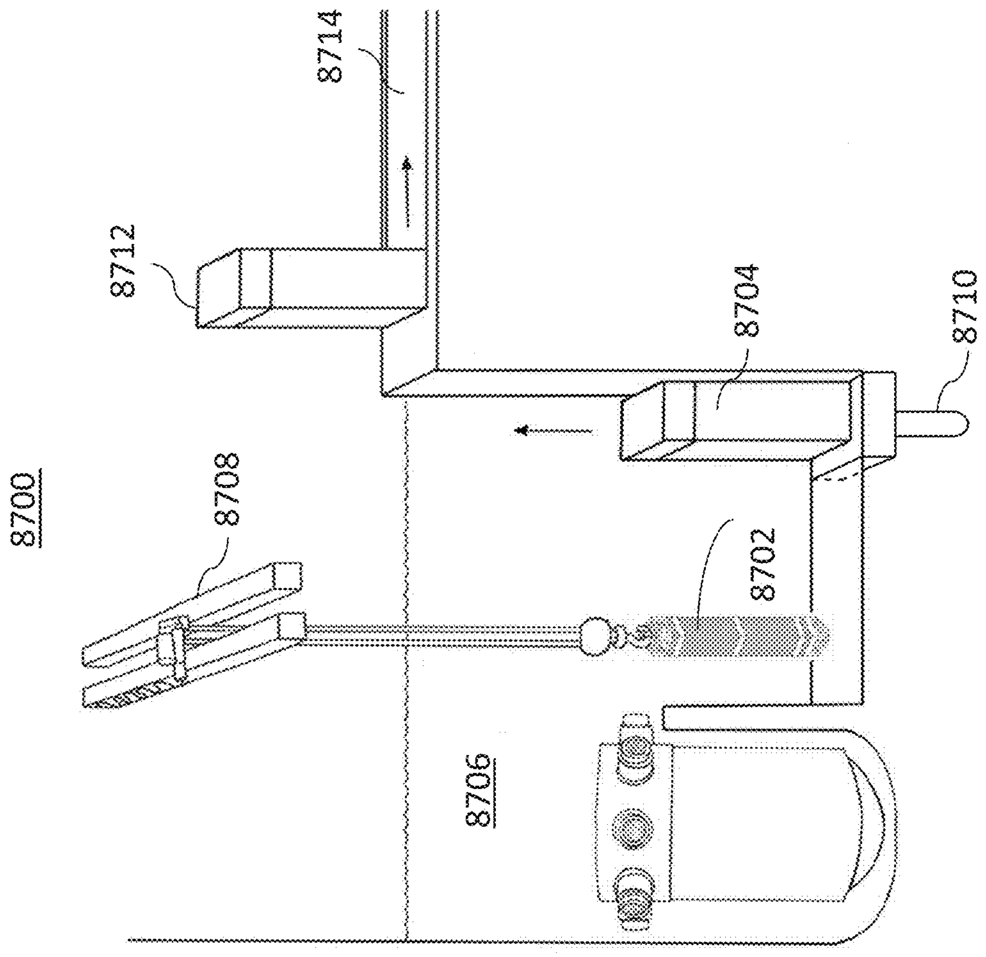
Figure 88:
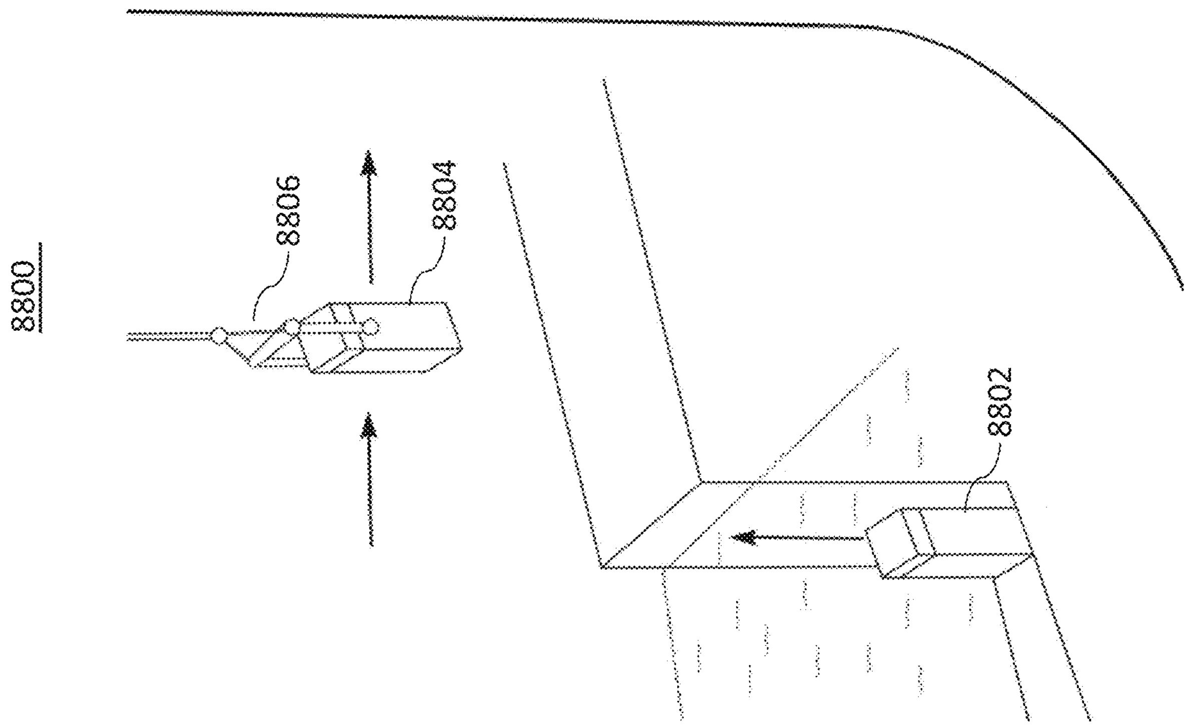
Figure 89:
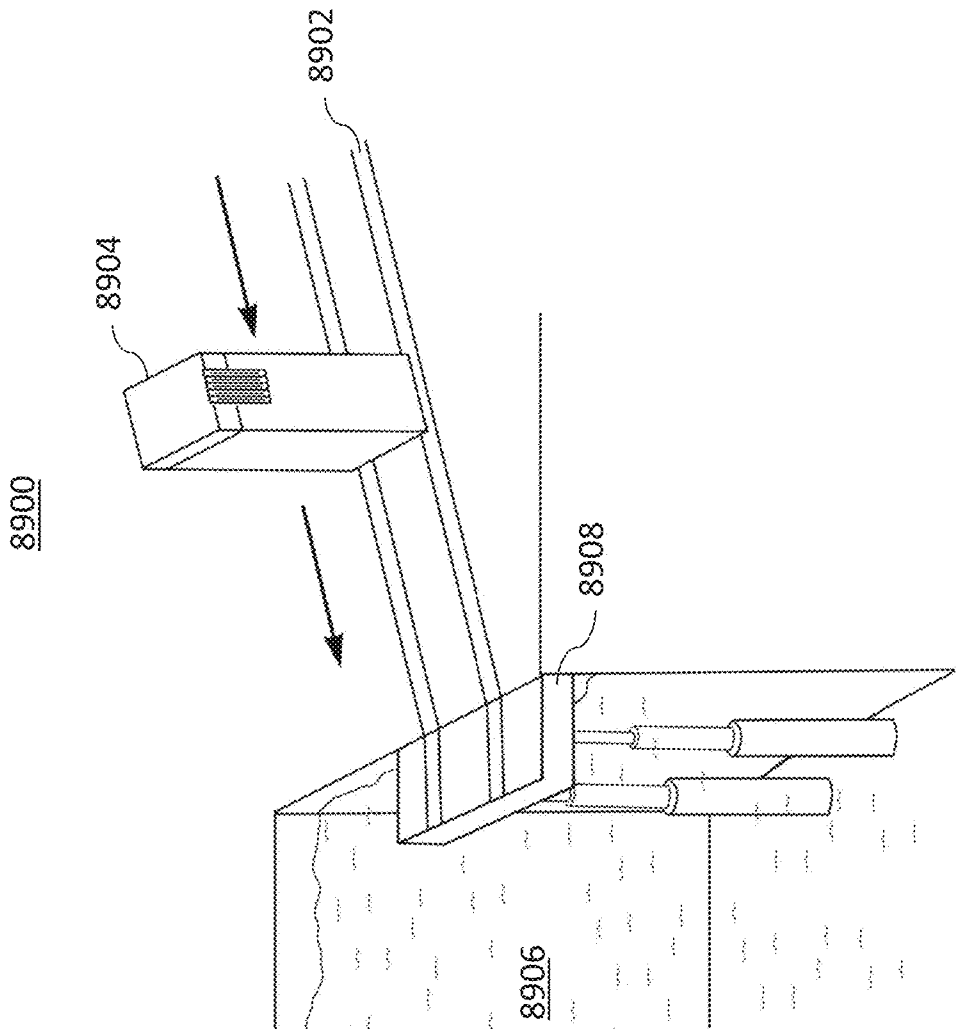
Figure 90:
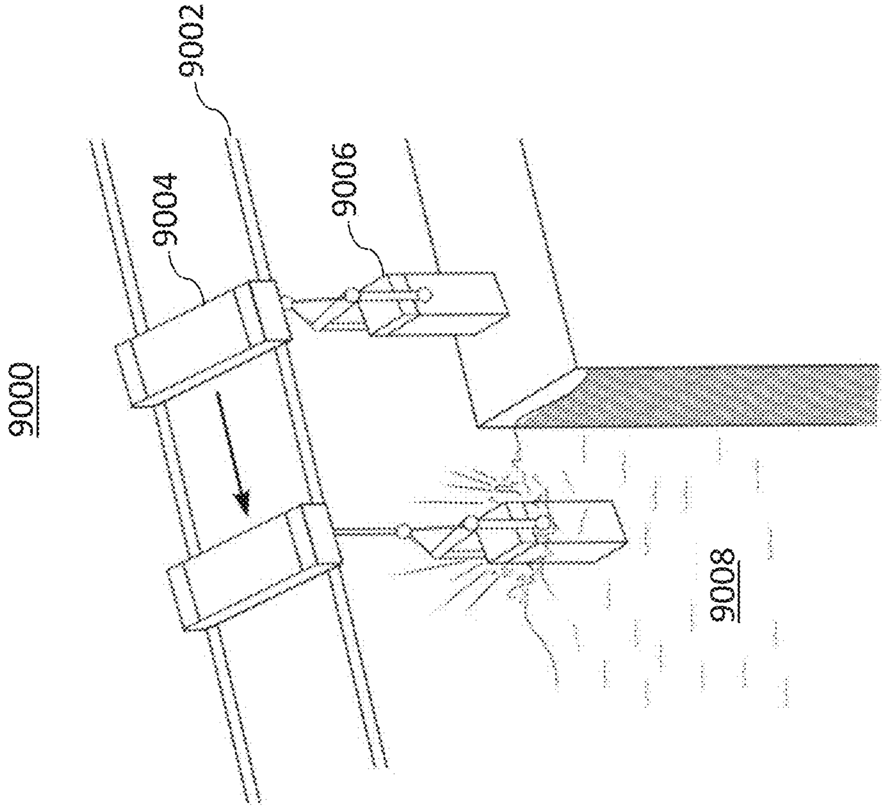
Figure 91:
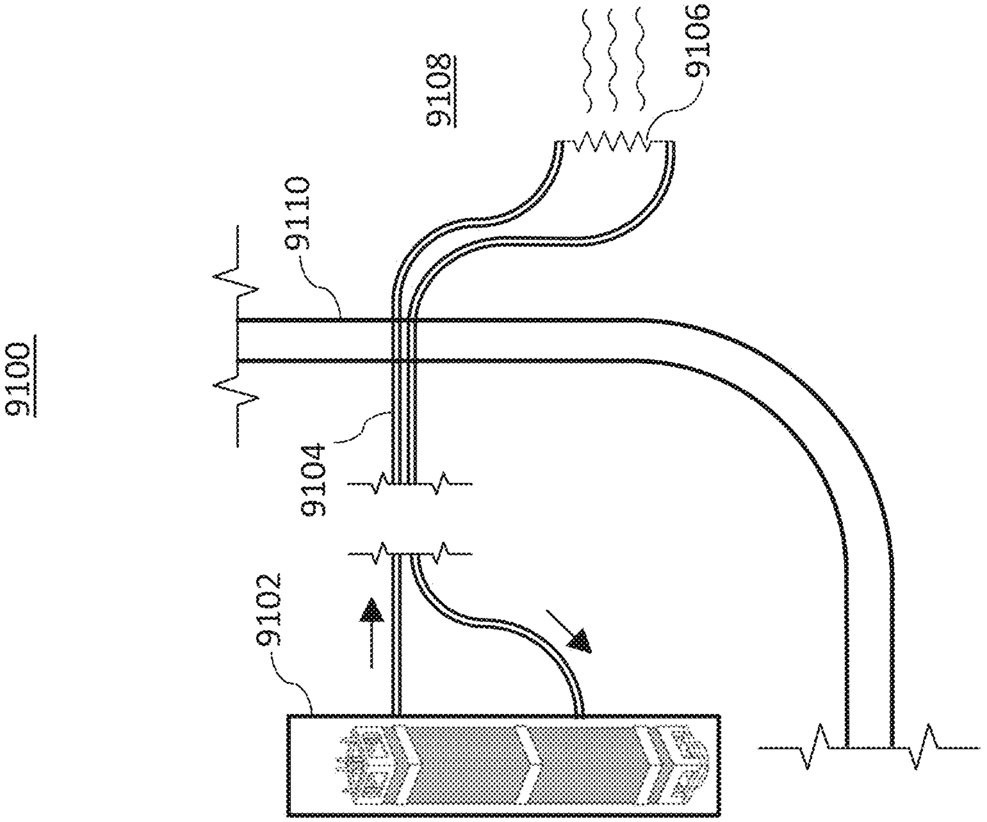
Figure 92:
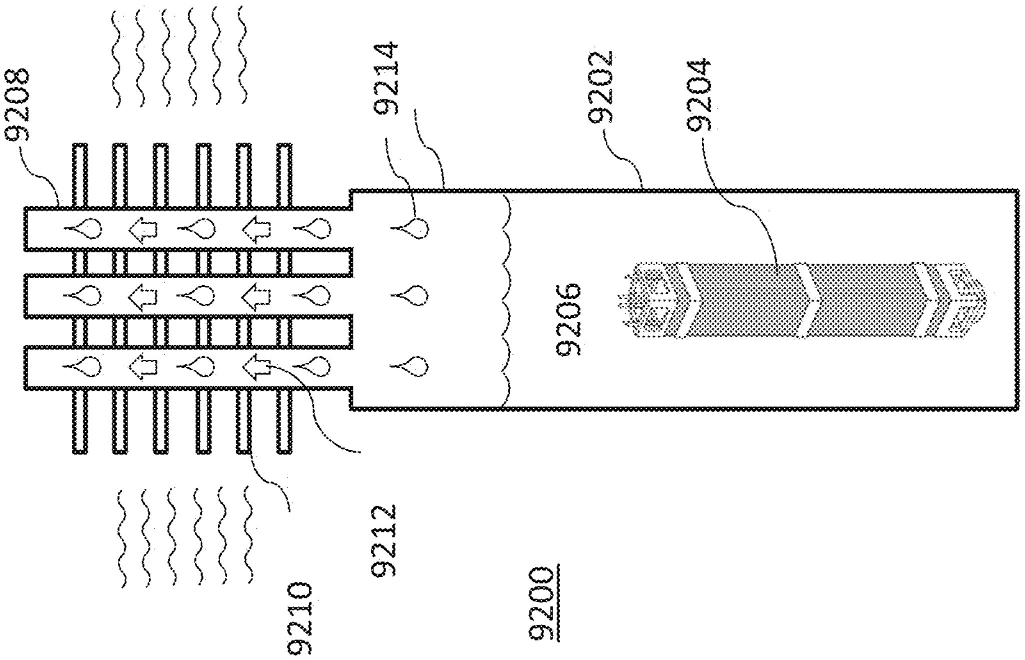
Figure 93:
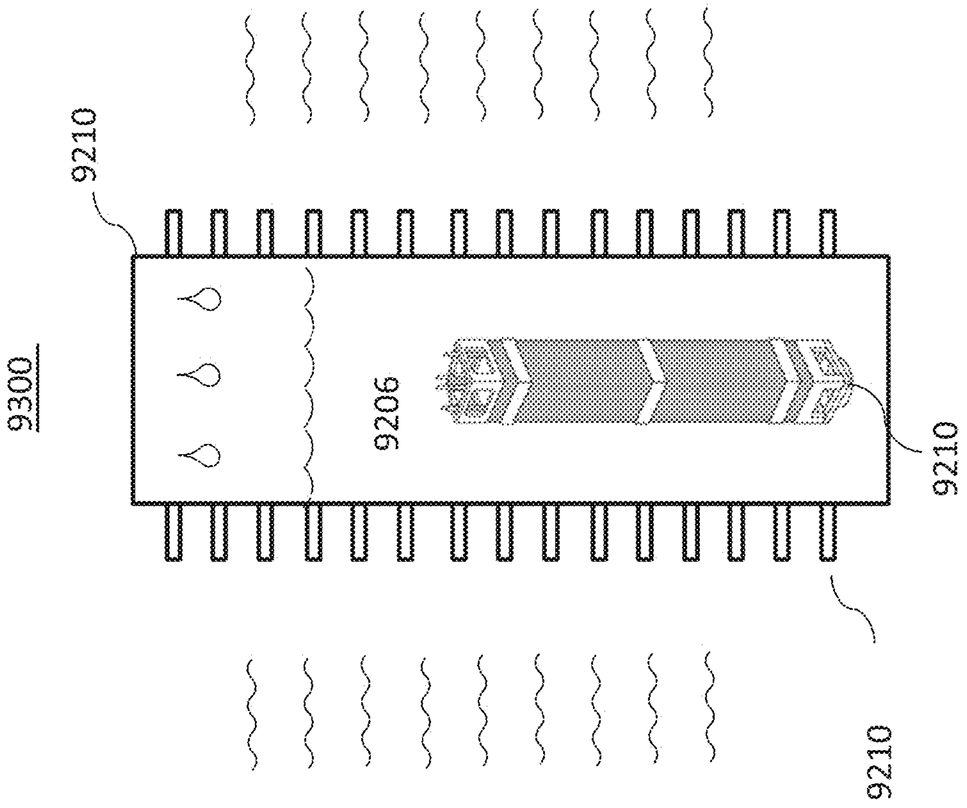
Figure 94:
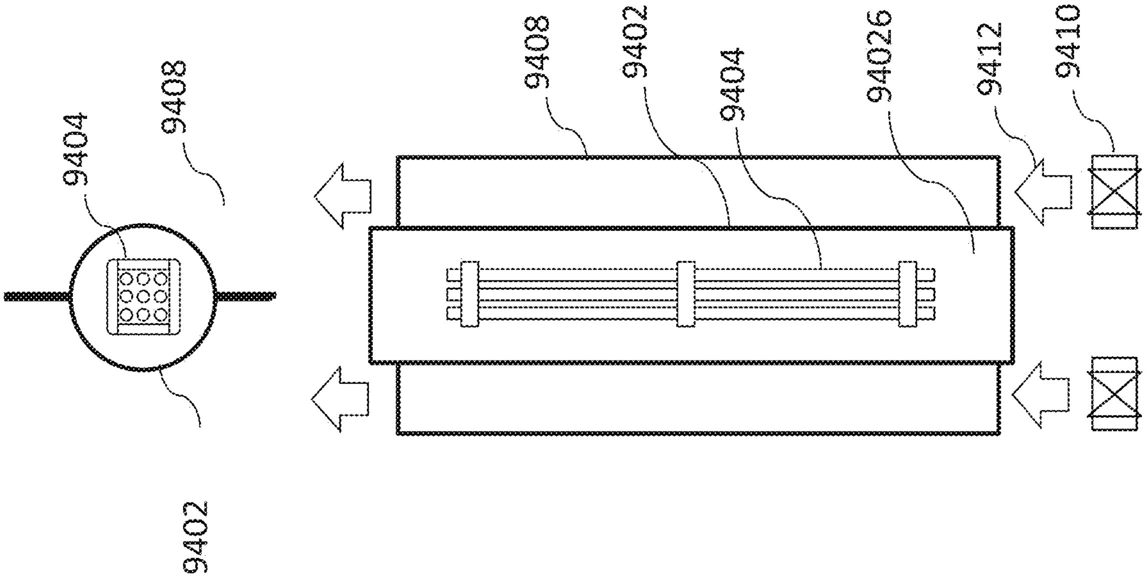
Figure 95:
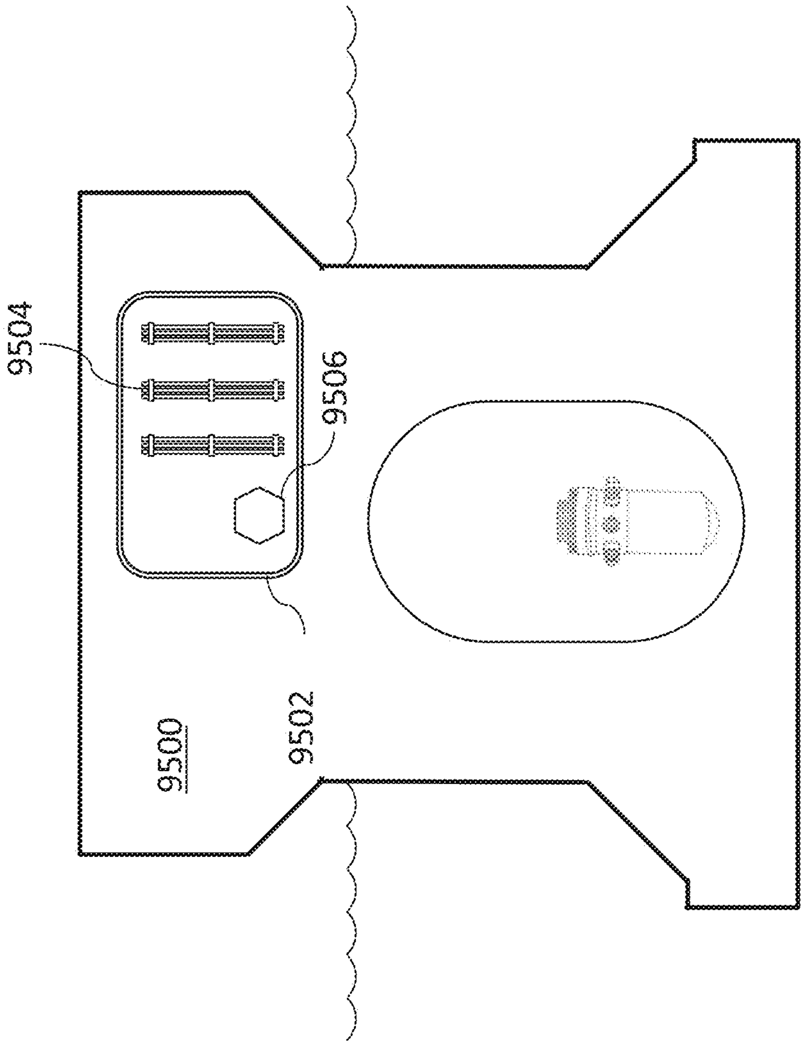
Figure 96:
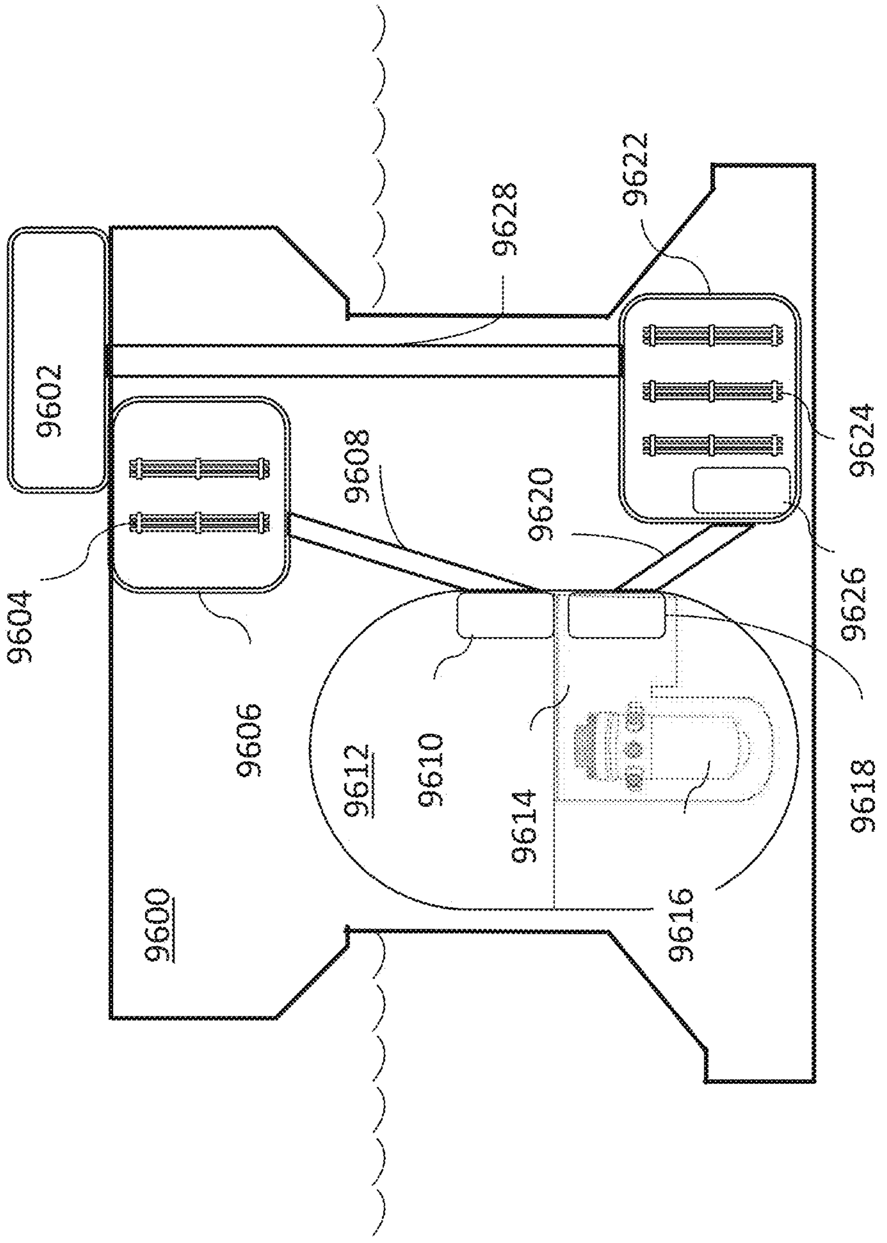
Figure 97:
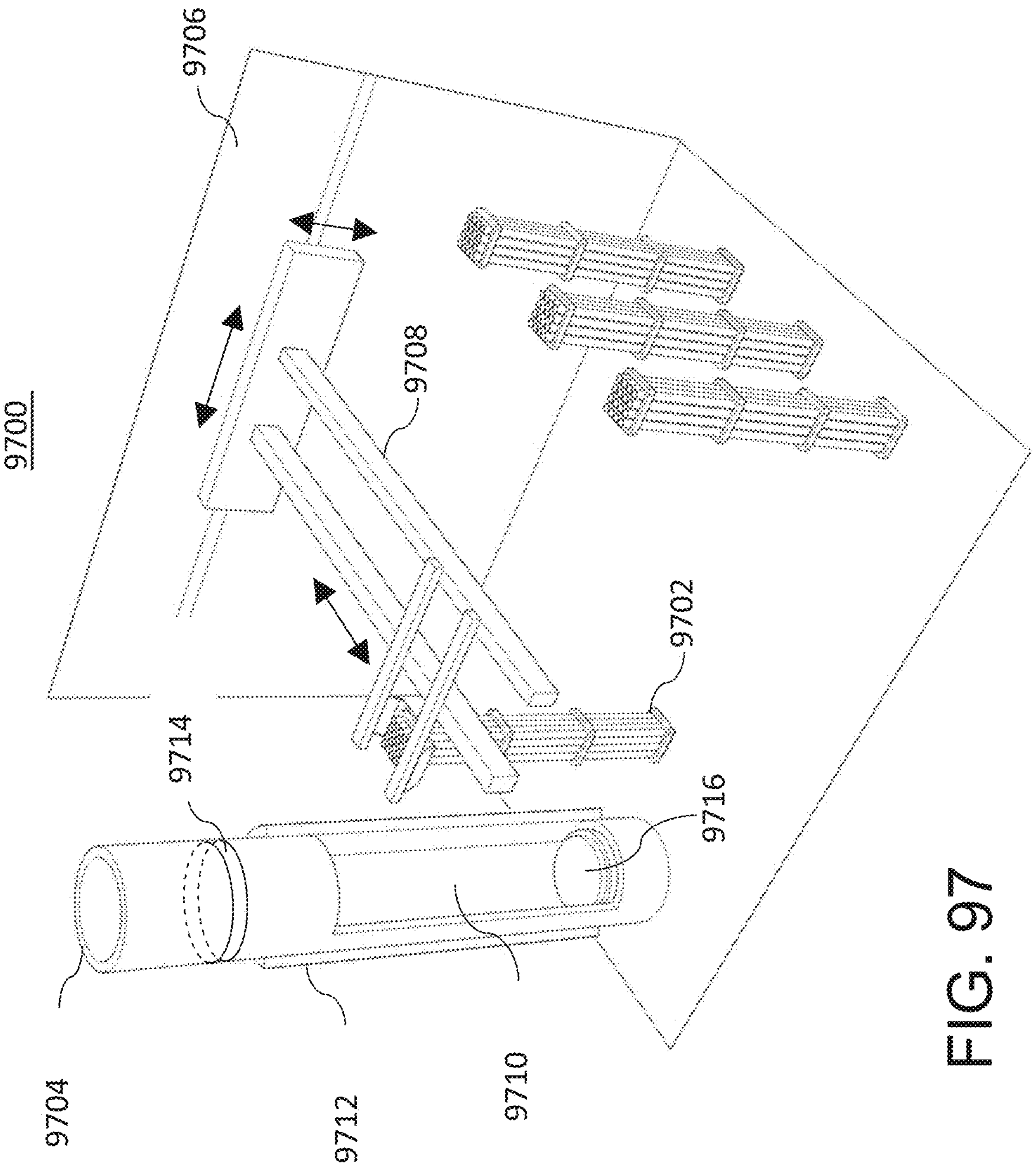
Figure 98:
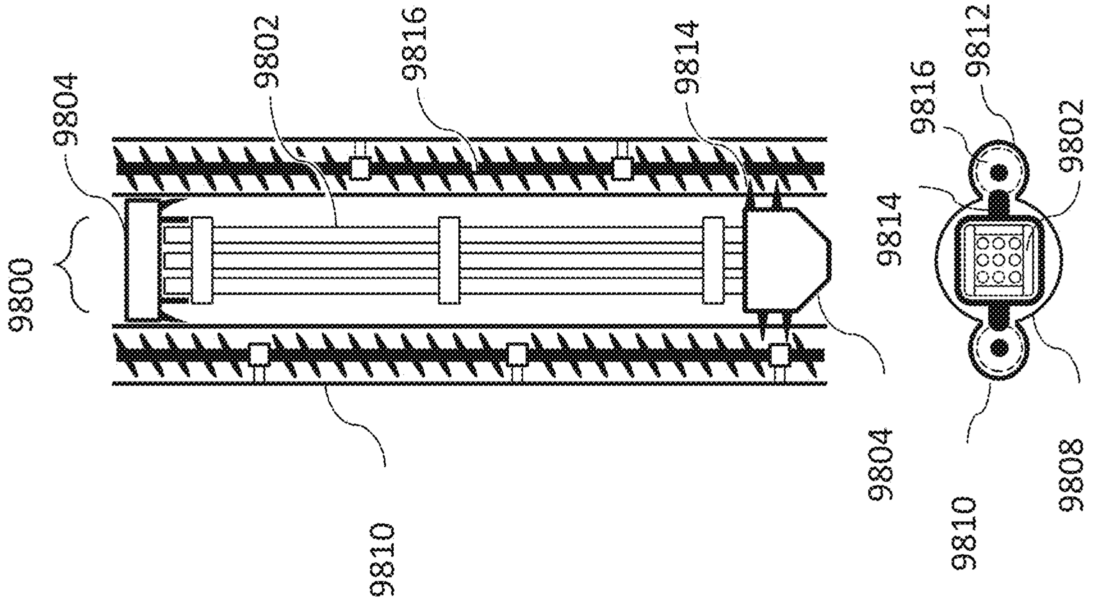
Figure 99:
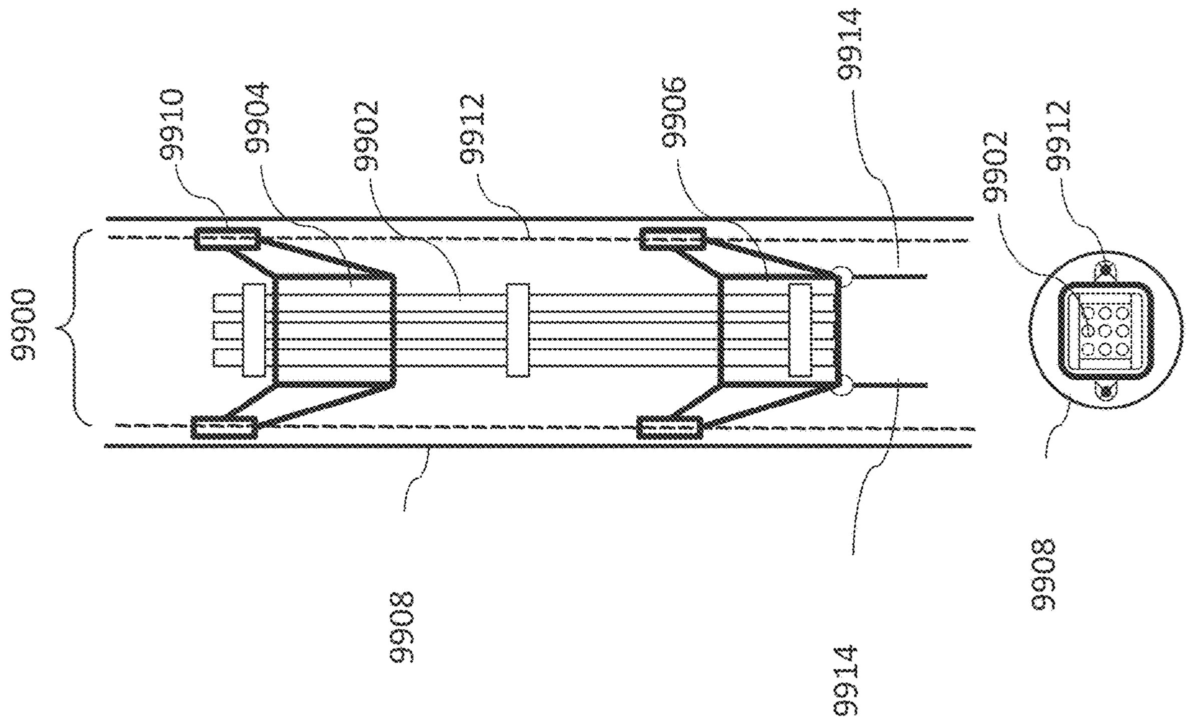
Figure 100:
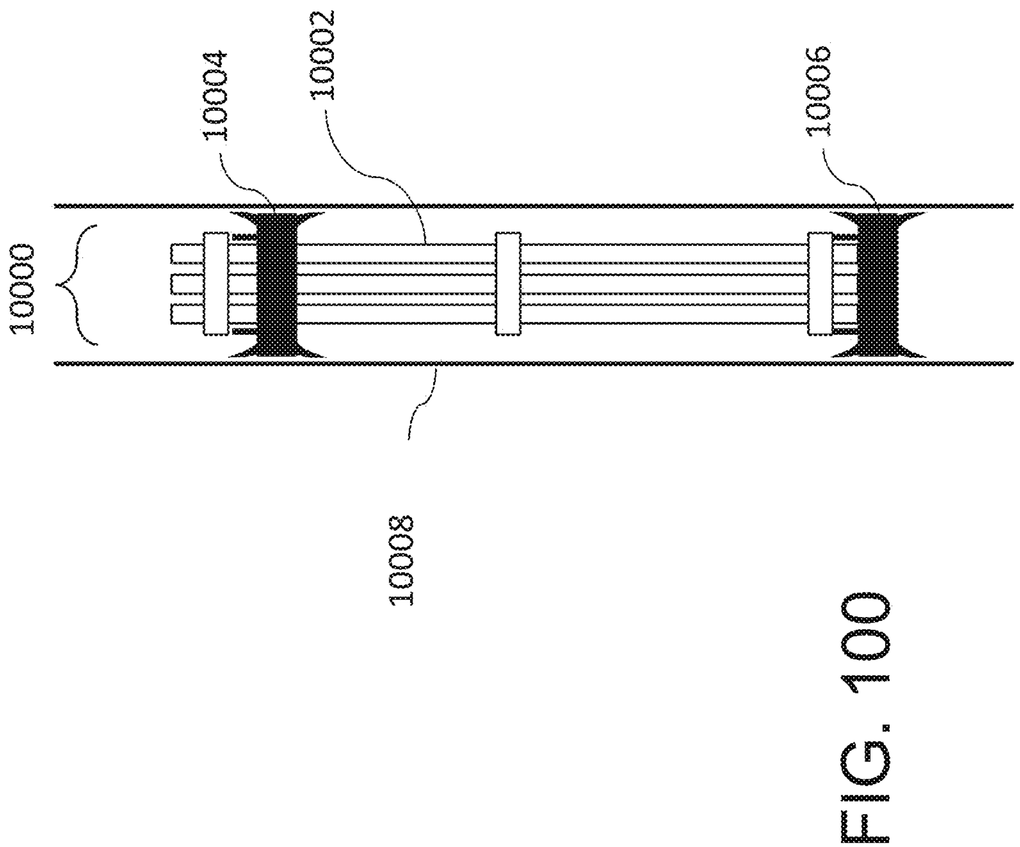
Figure 101:
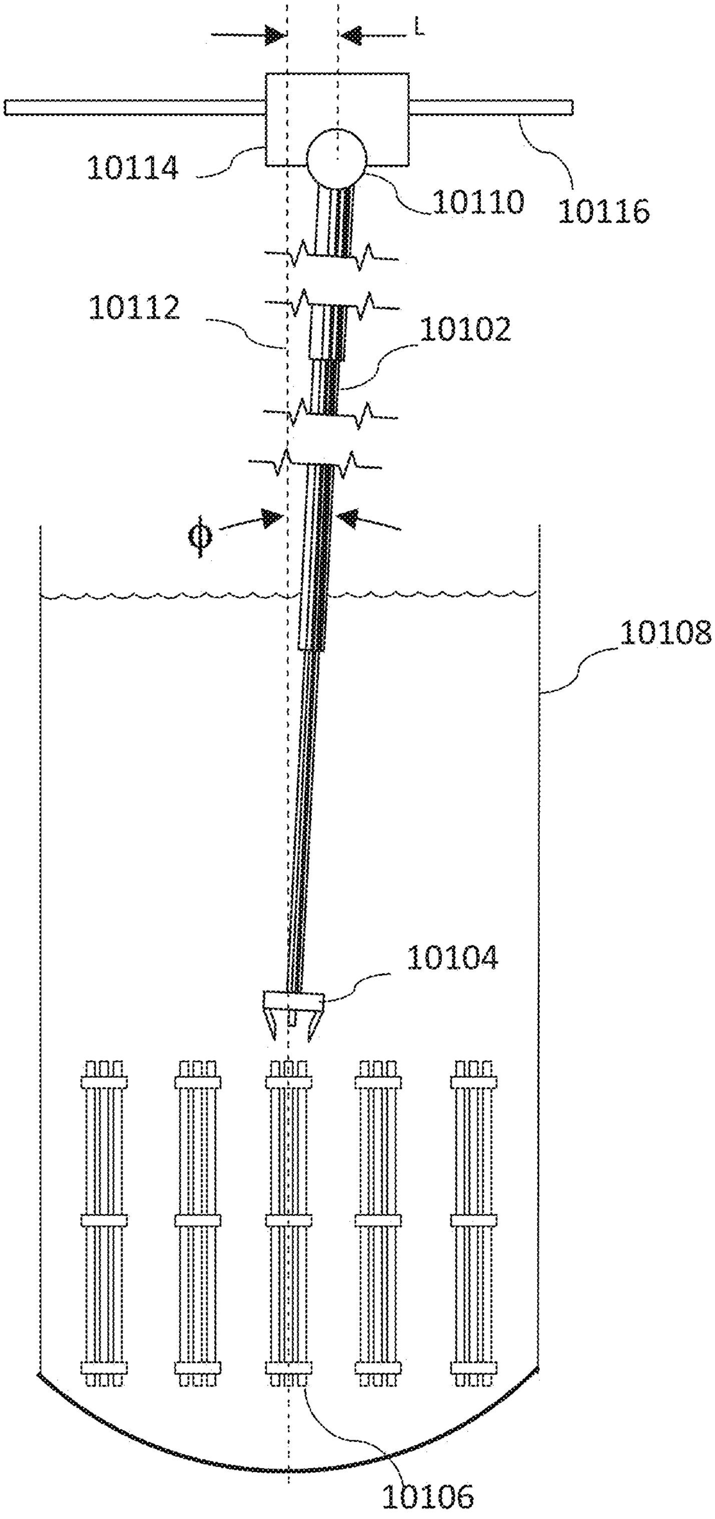
Figure 102:
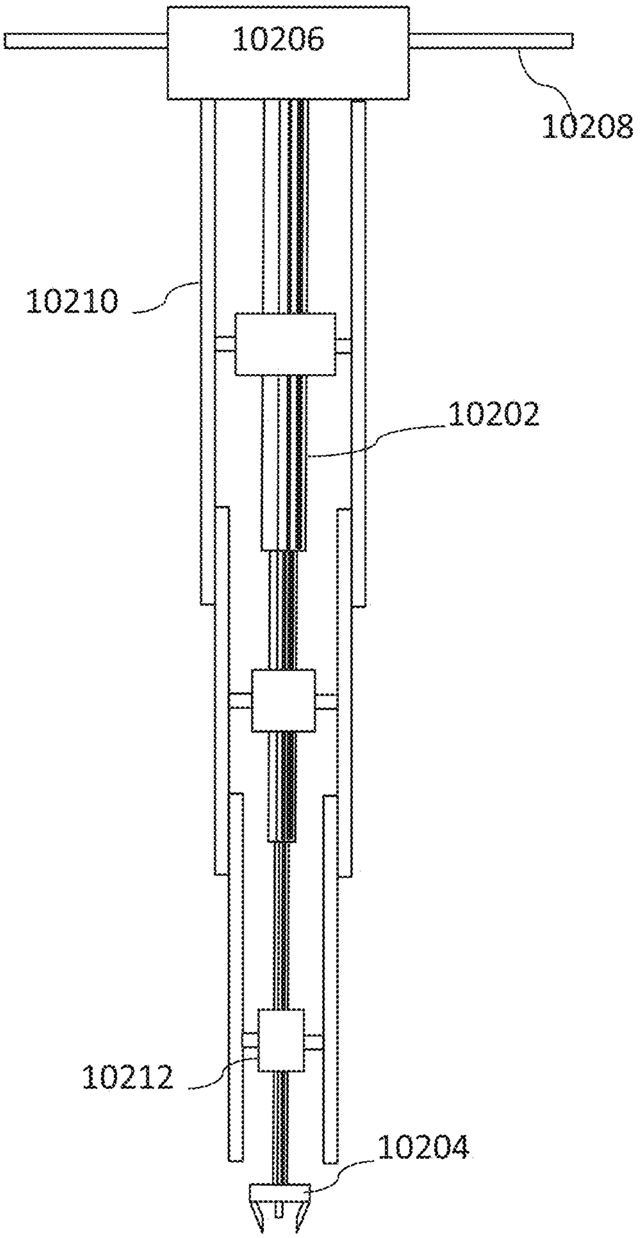
Figure 103:
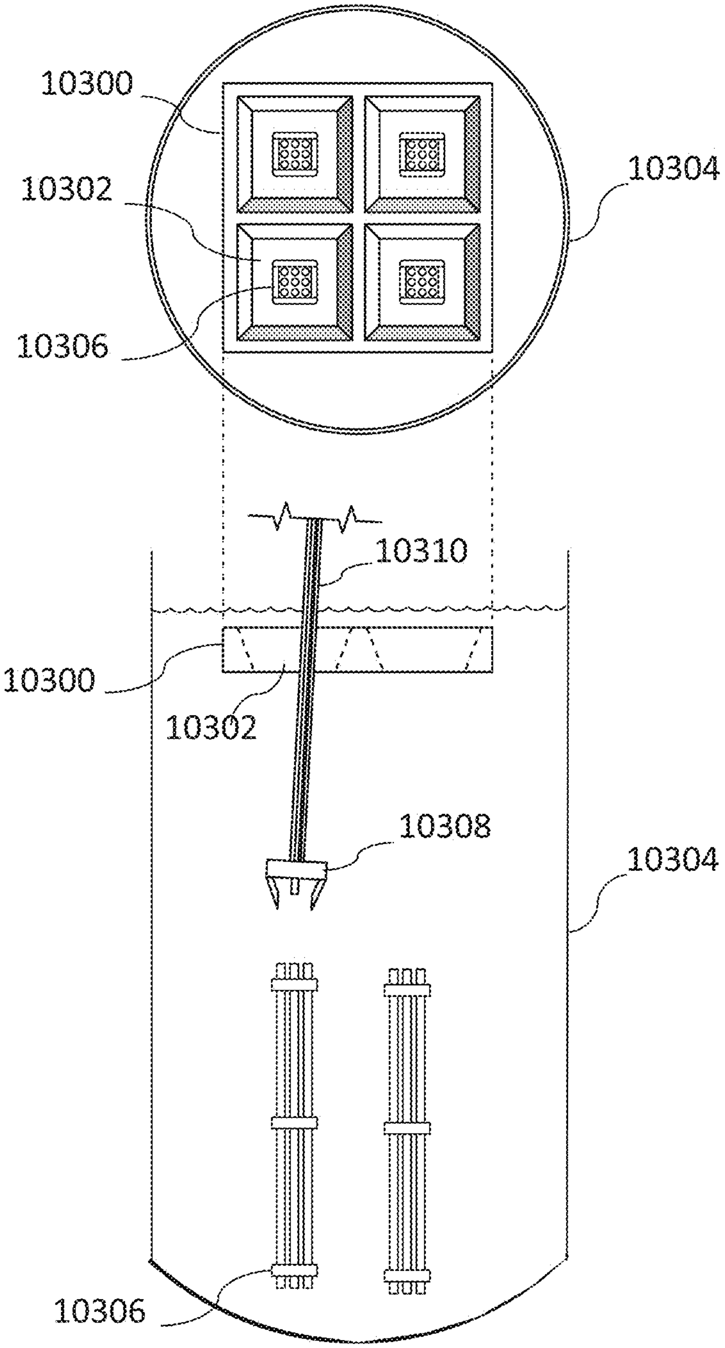
Figure 104A:
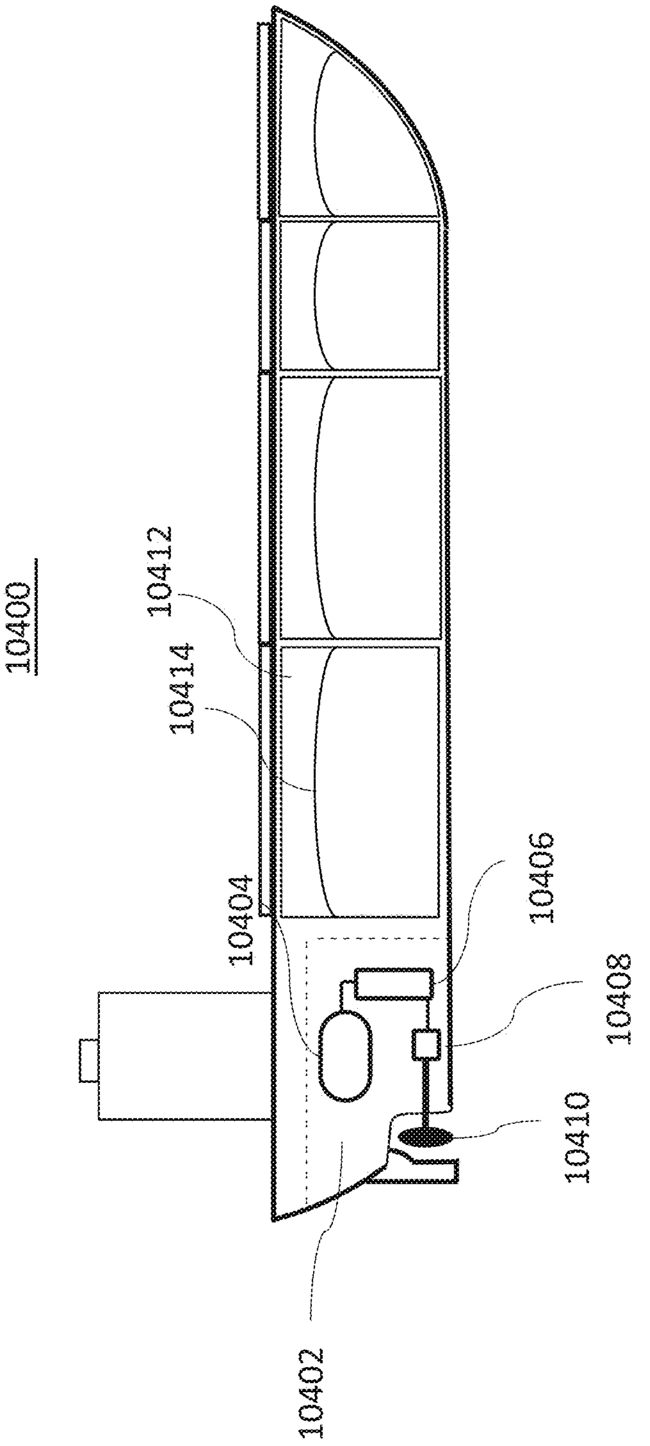
Figure 104B:
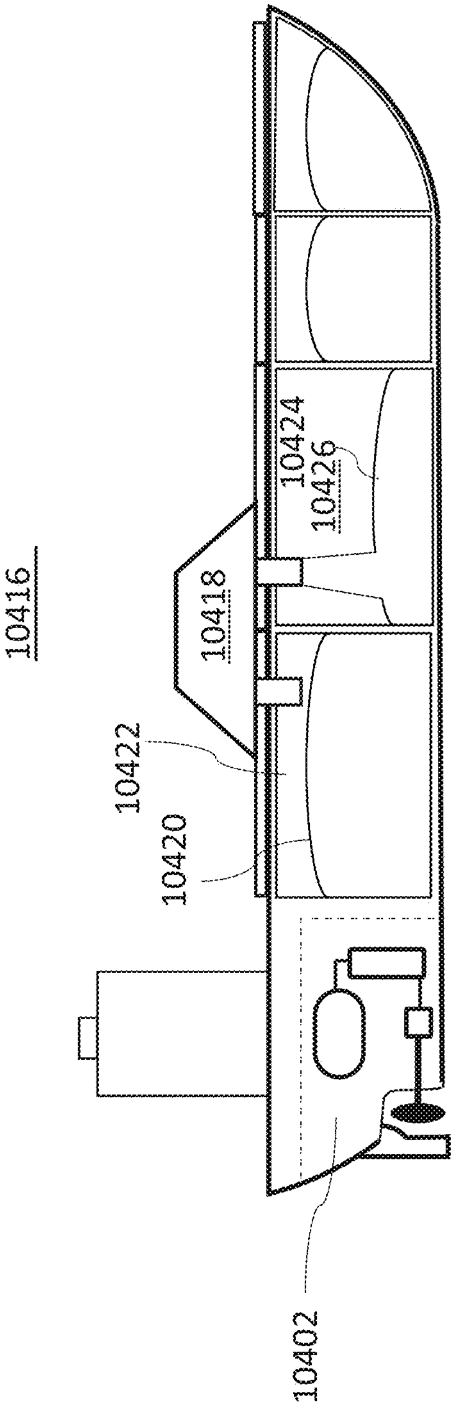
Figure 105:
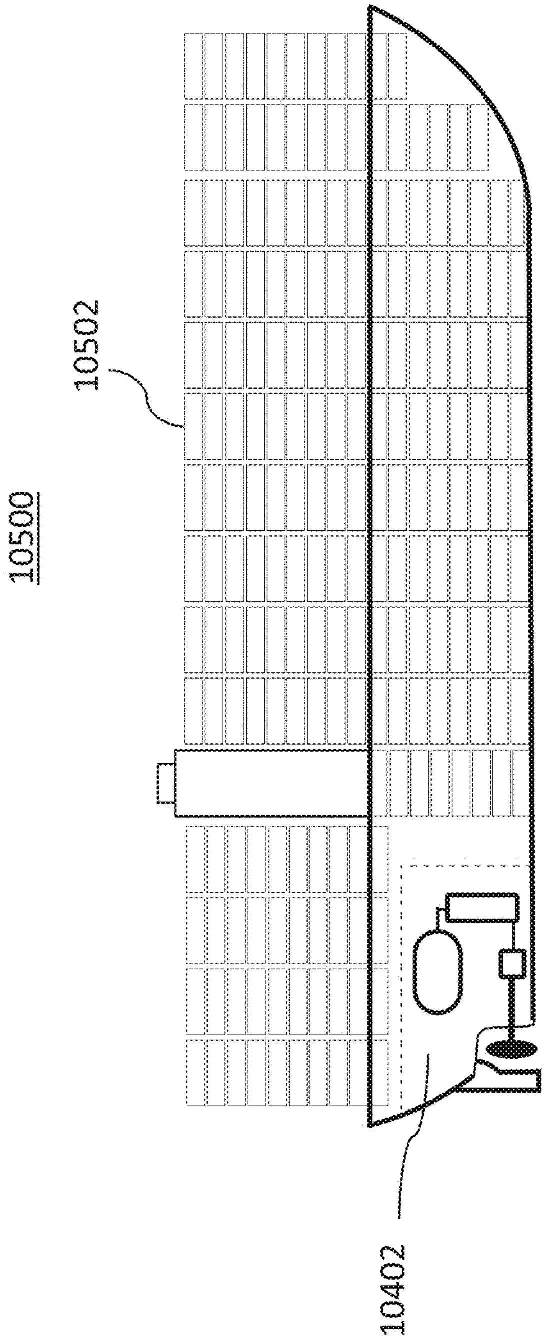
Figure 106:
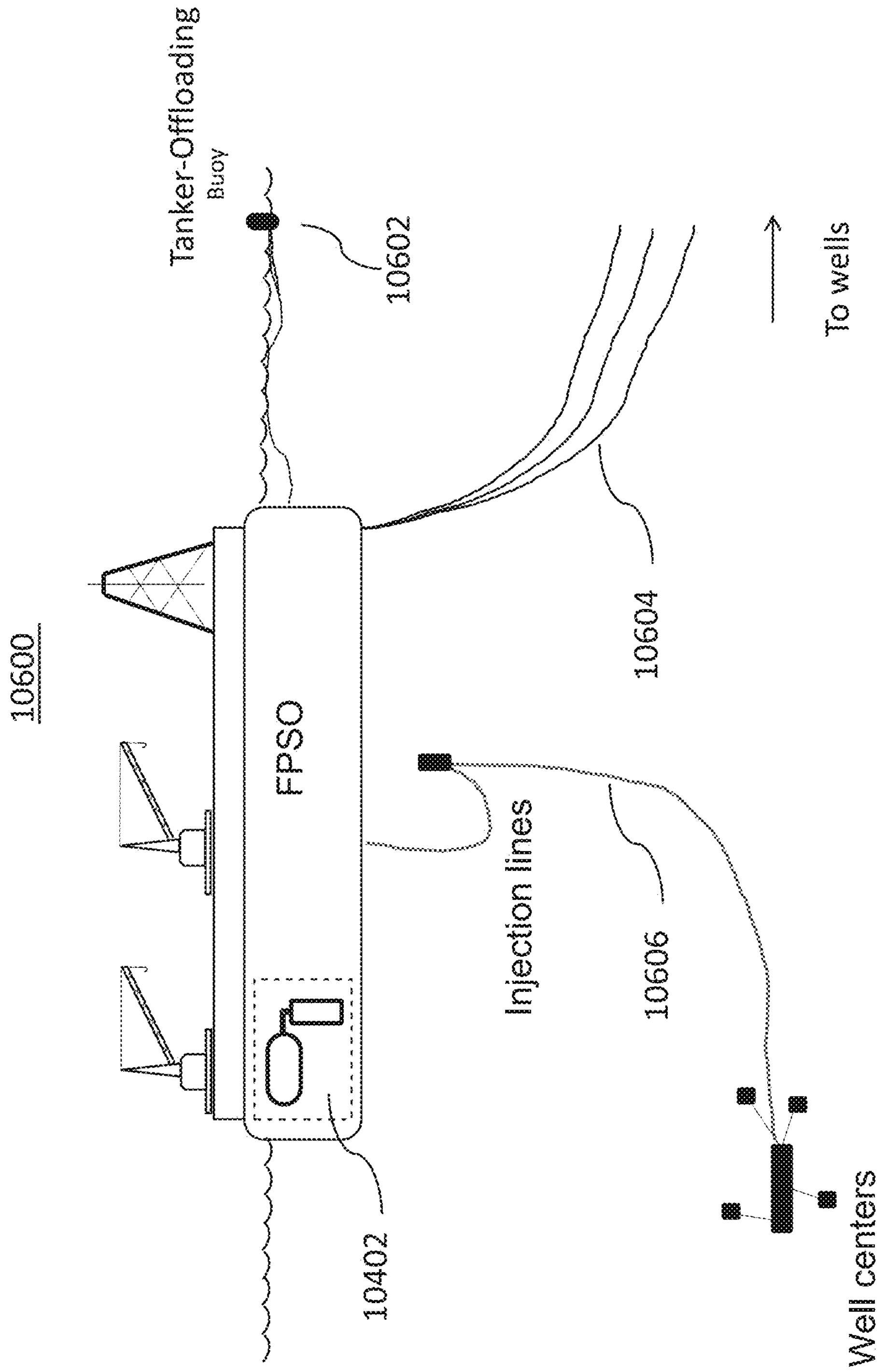
Figure 107:
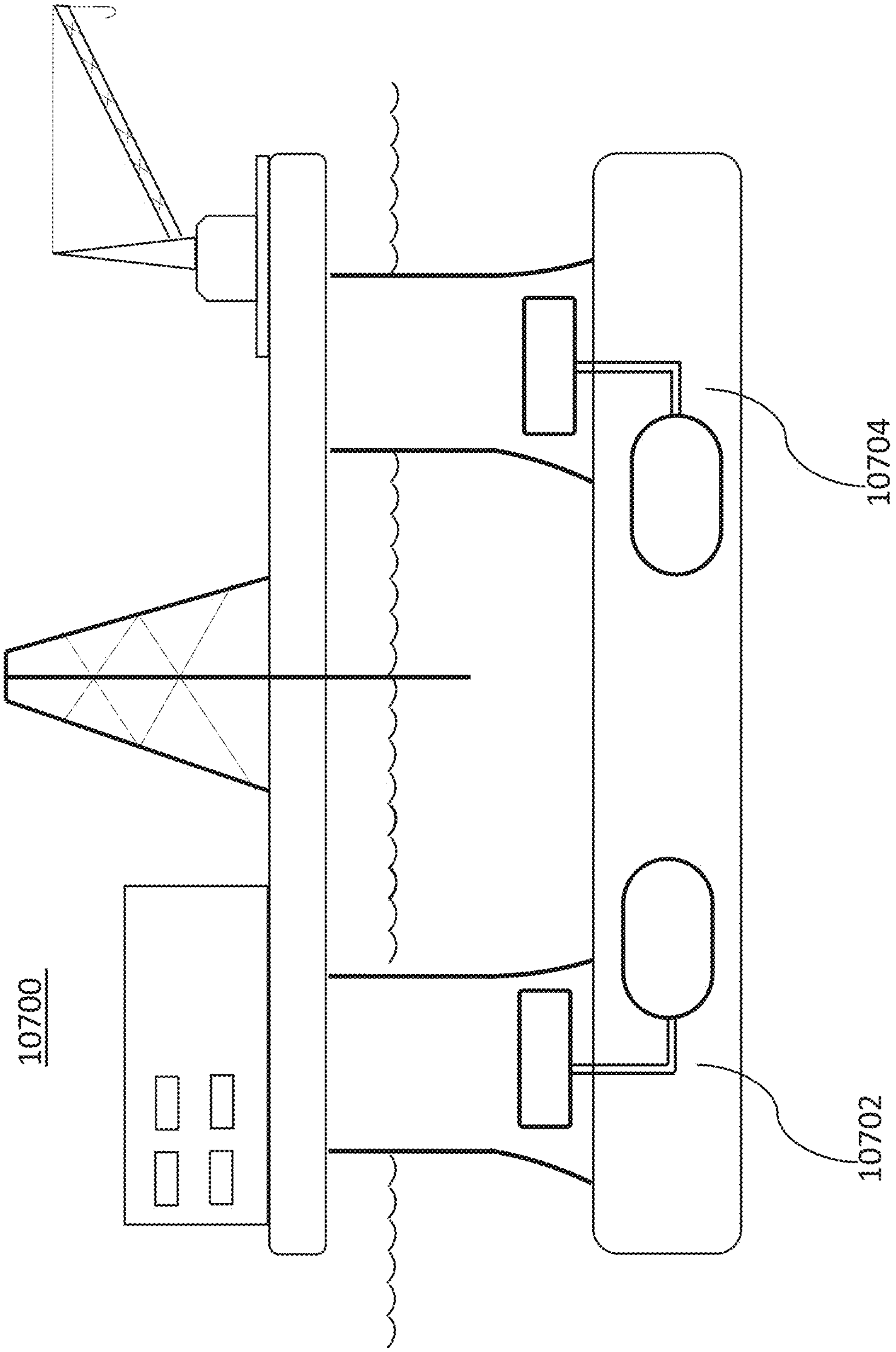
Figure 108:
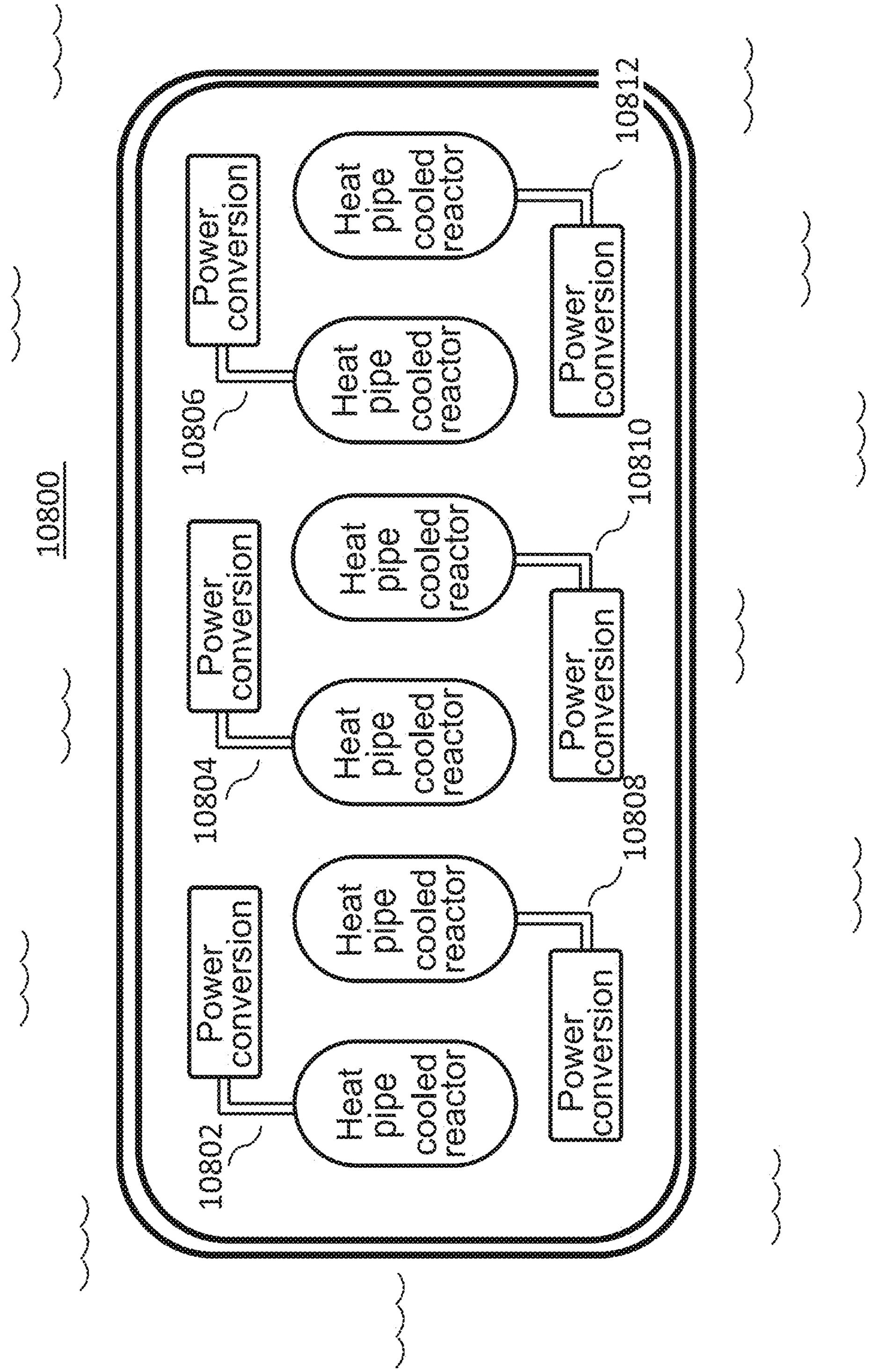
Figure 109:
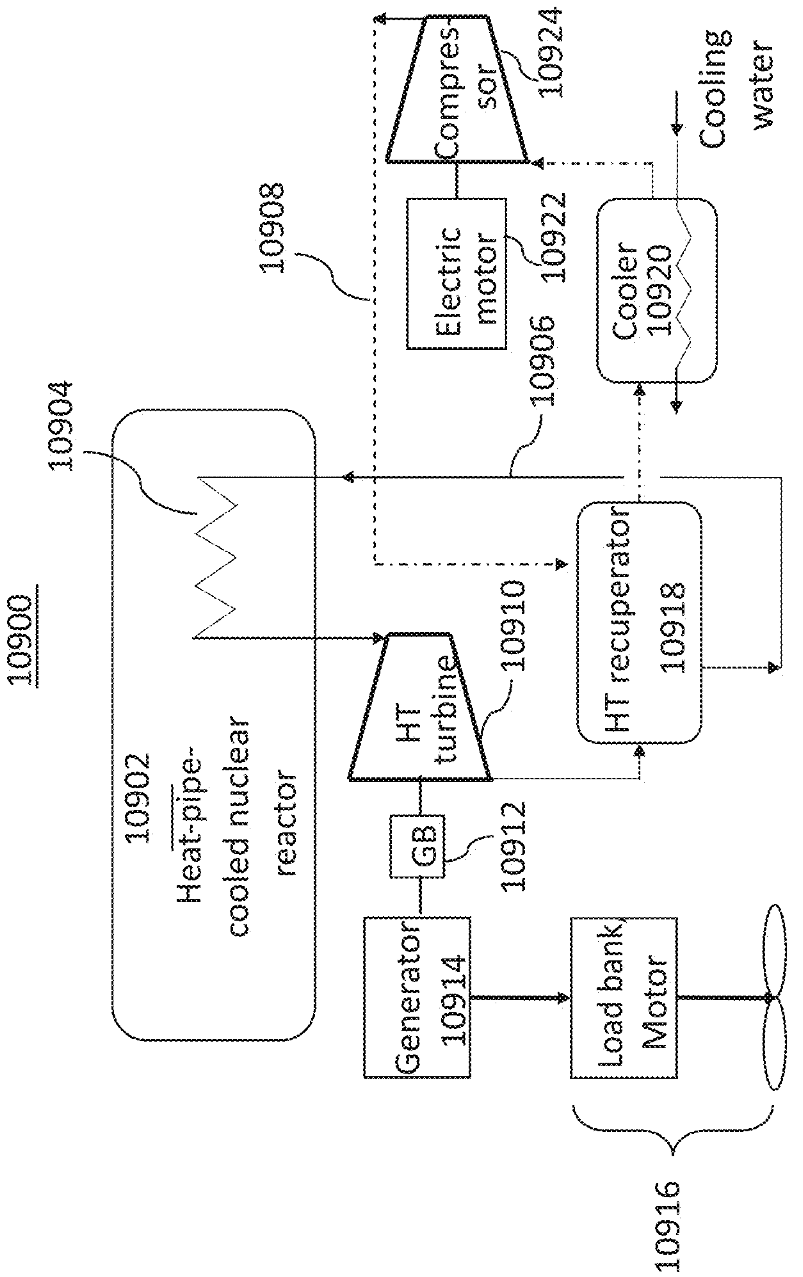
Figure 110A:
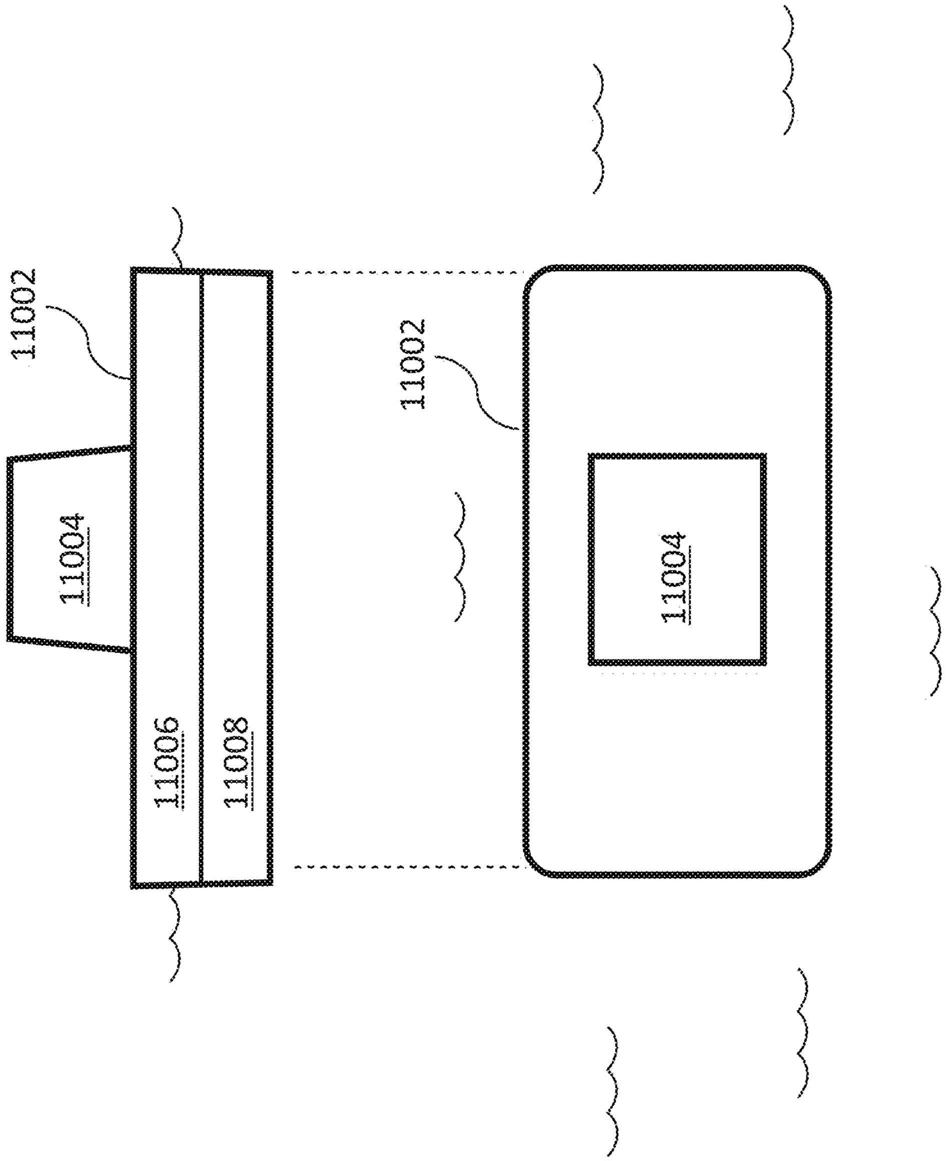
Figure 110B:
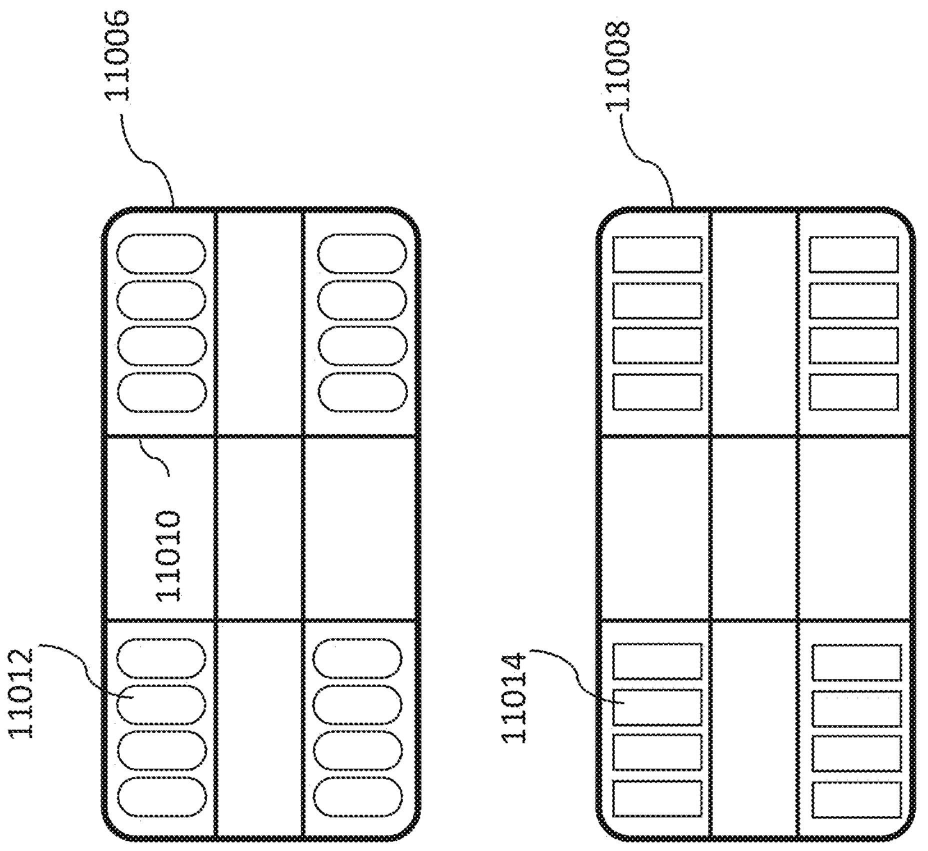
Figure 110C:
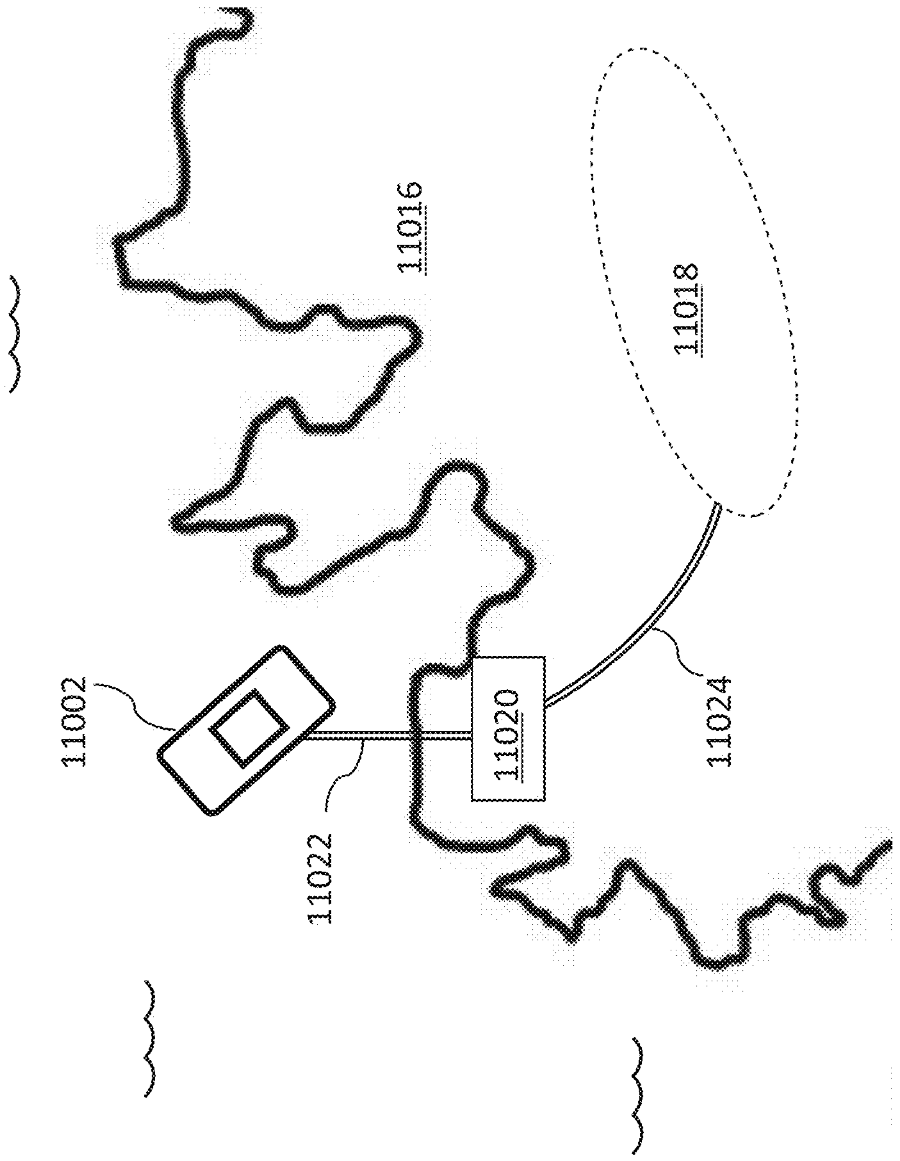
Figure 111A:
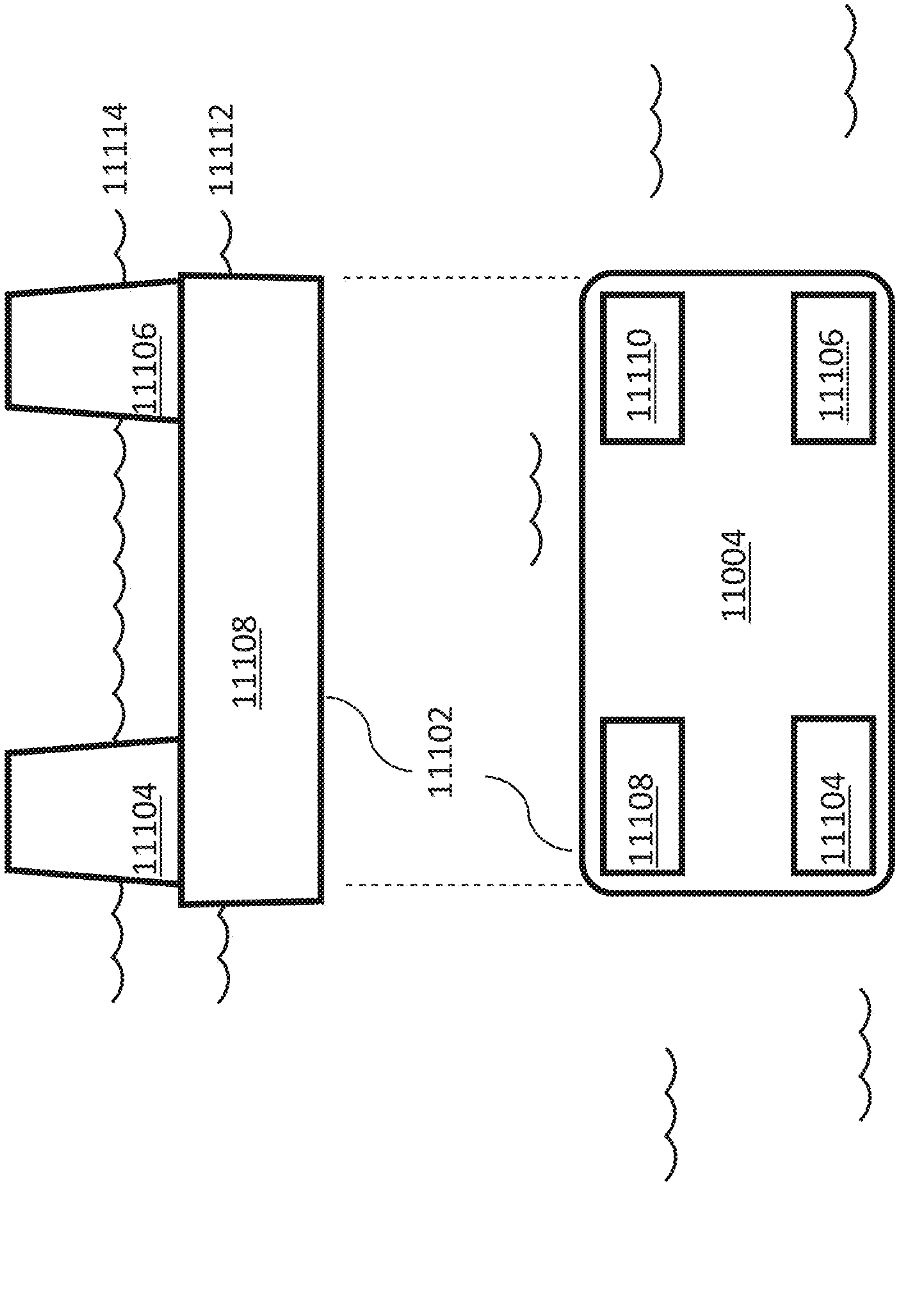
Figure 111B:
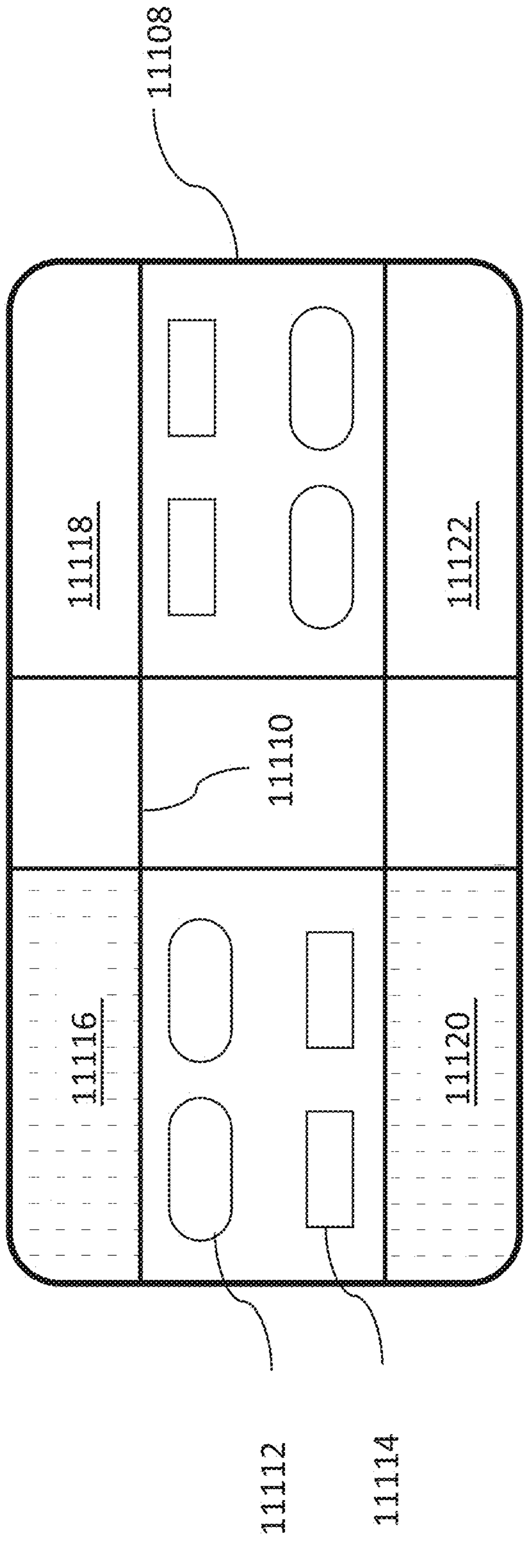
Figure 112A:
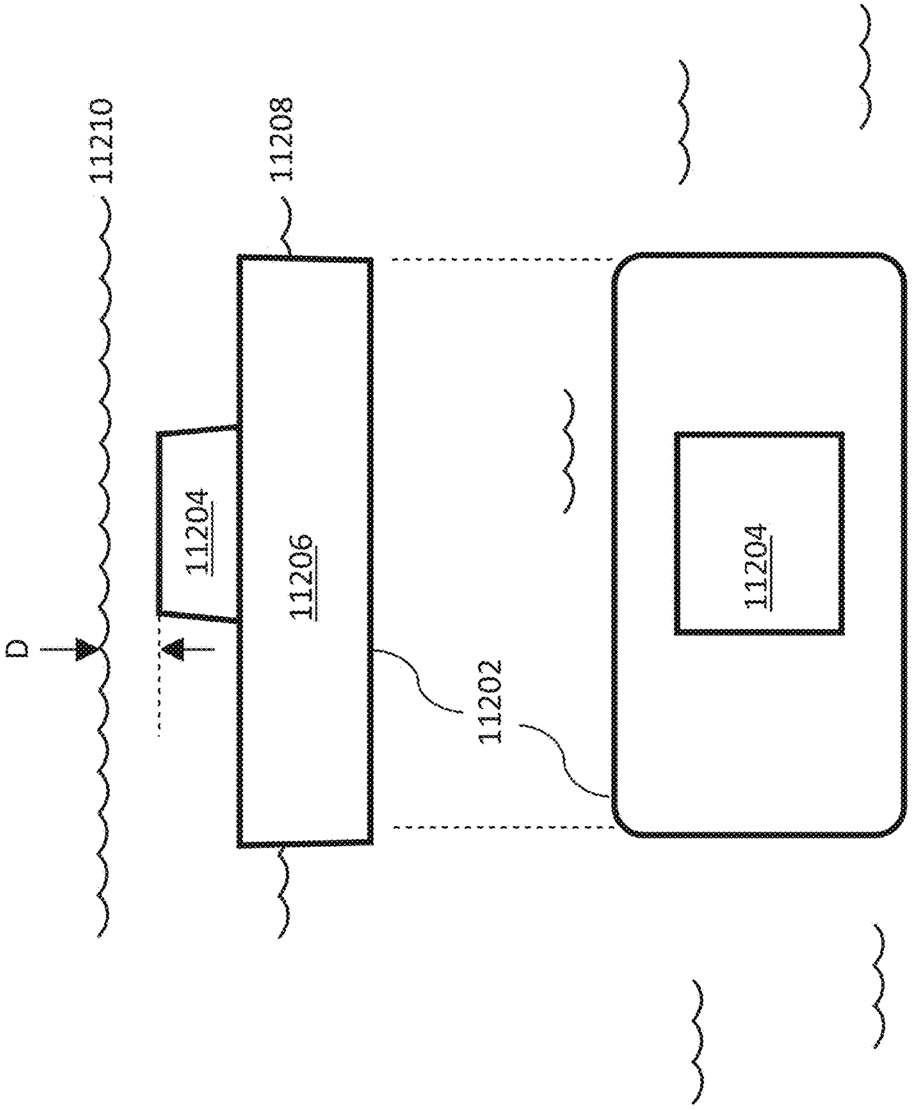
Figure 112B:
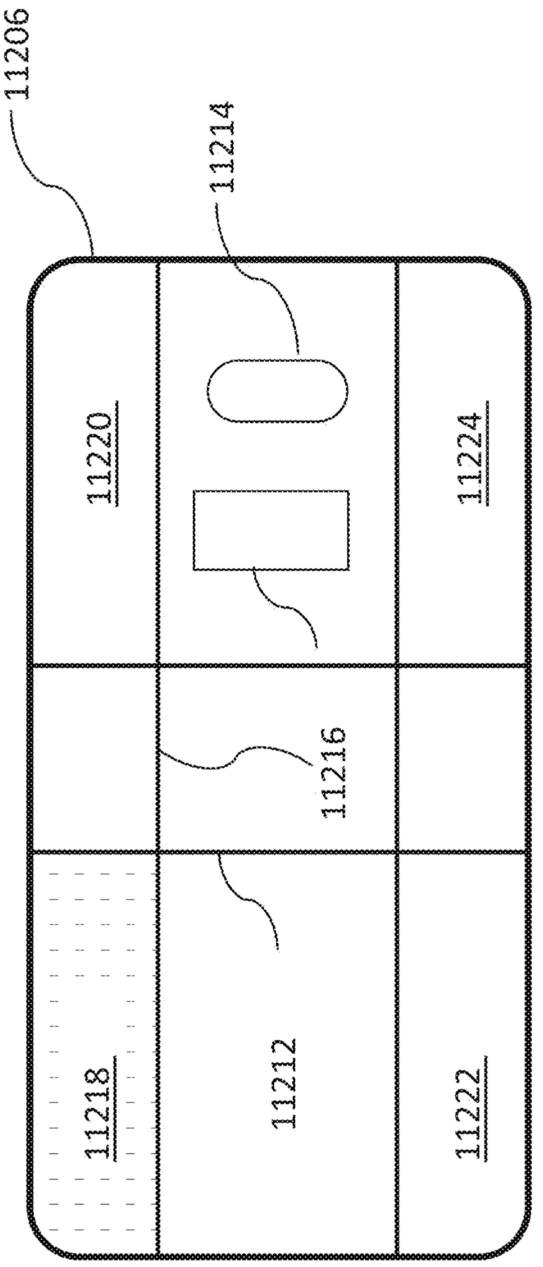
Figure 112C:
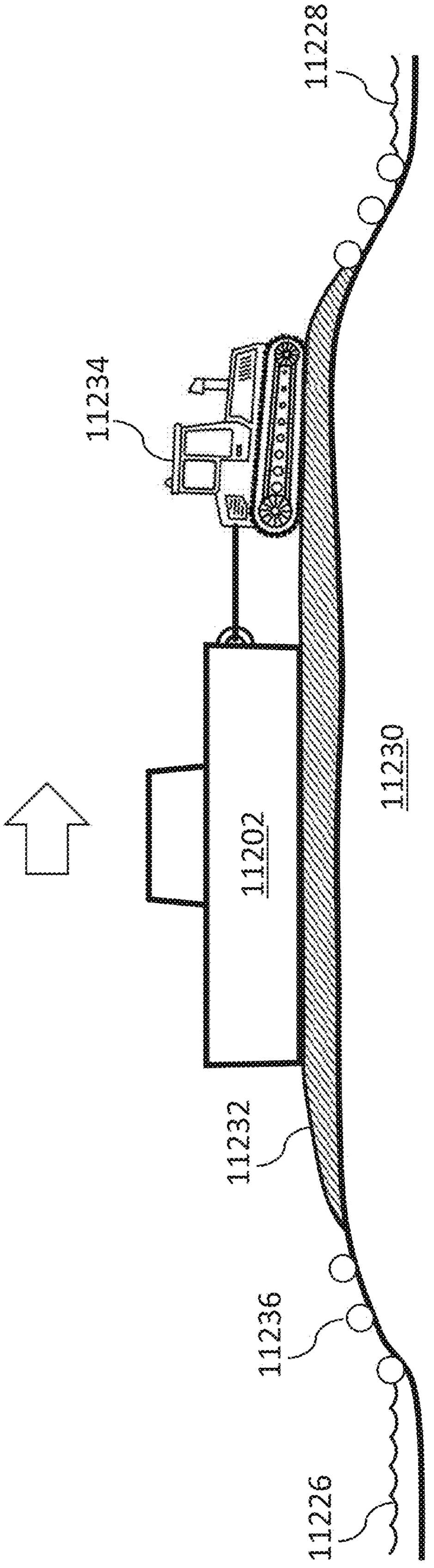
Figure 112D:
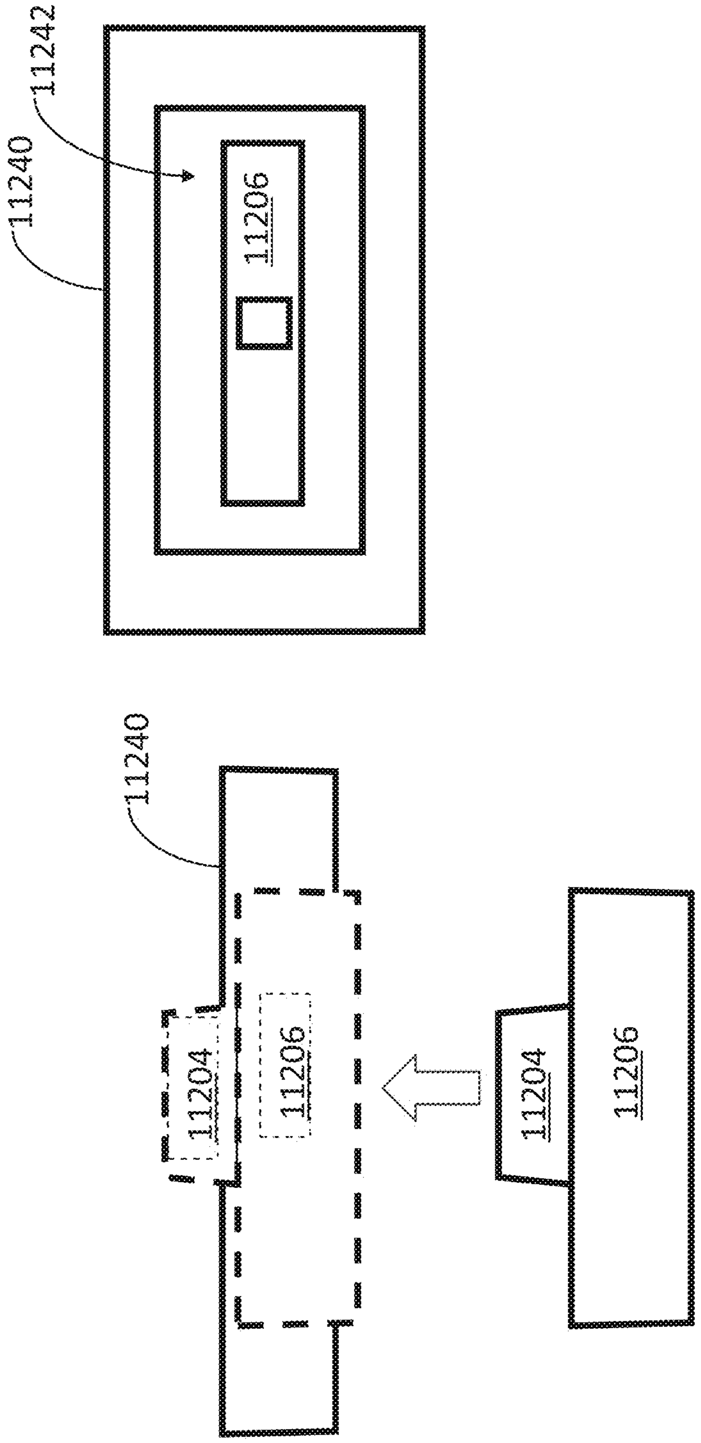
Figure 112E:
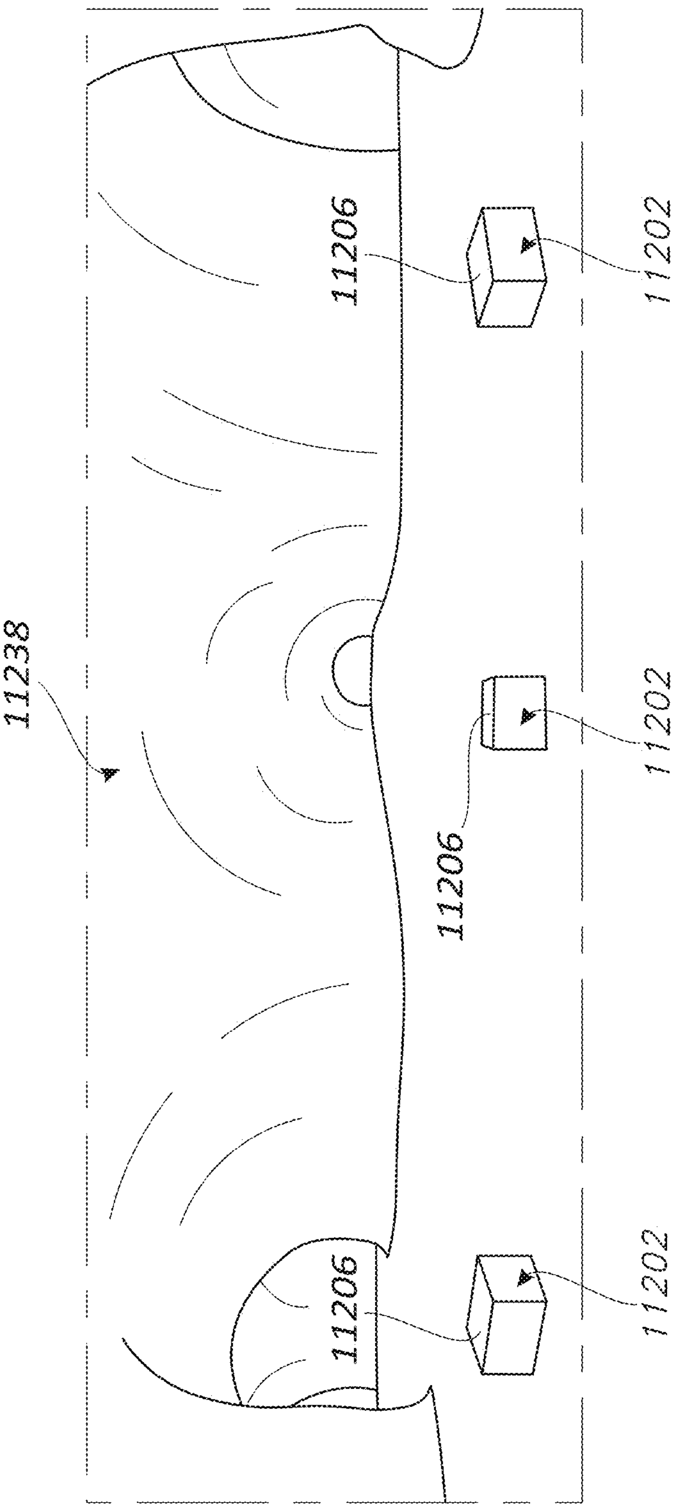
Figure 113A:
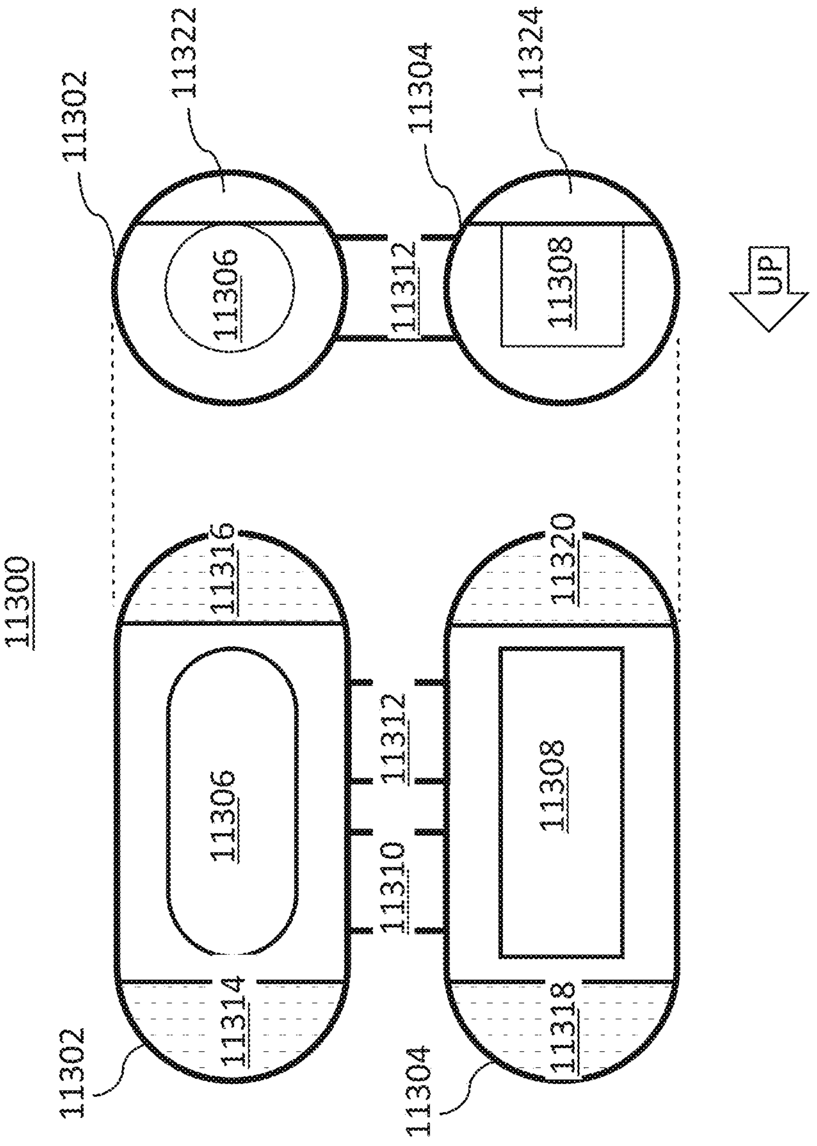
Figure 113B:
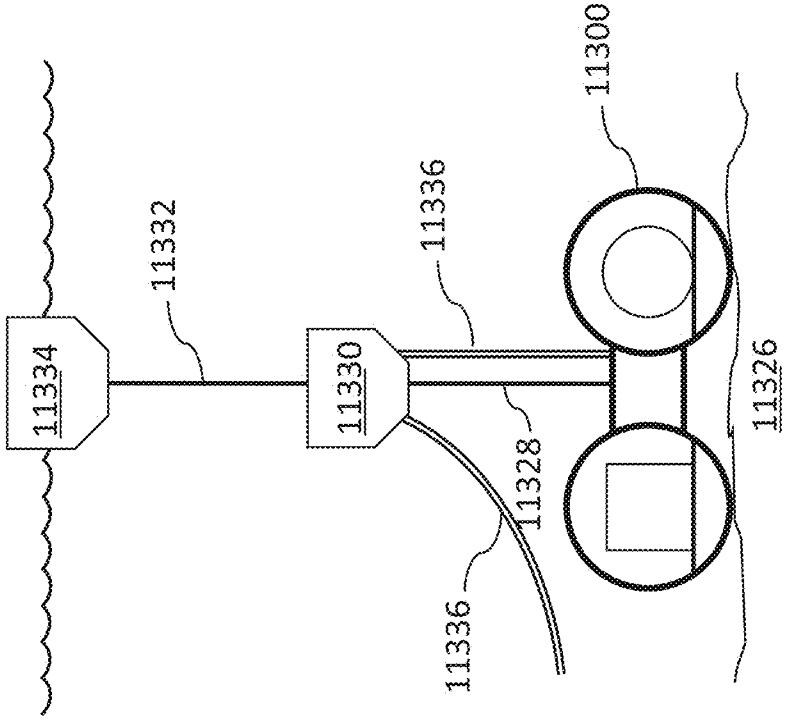
Figure 114:
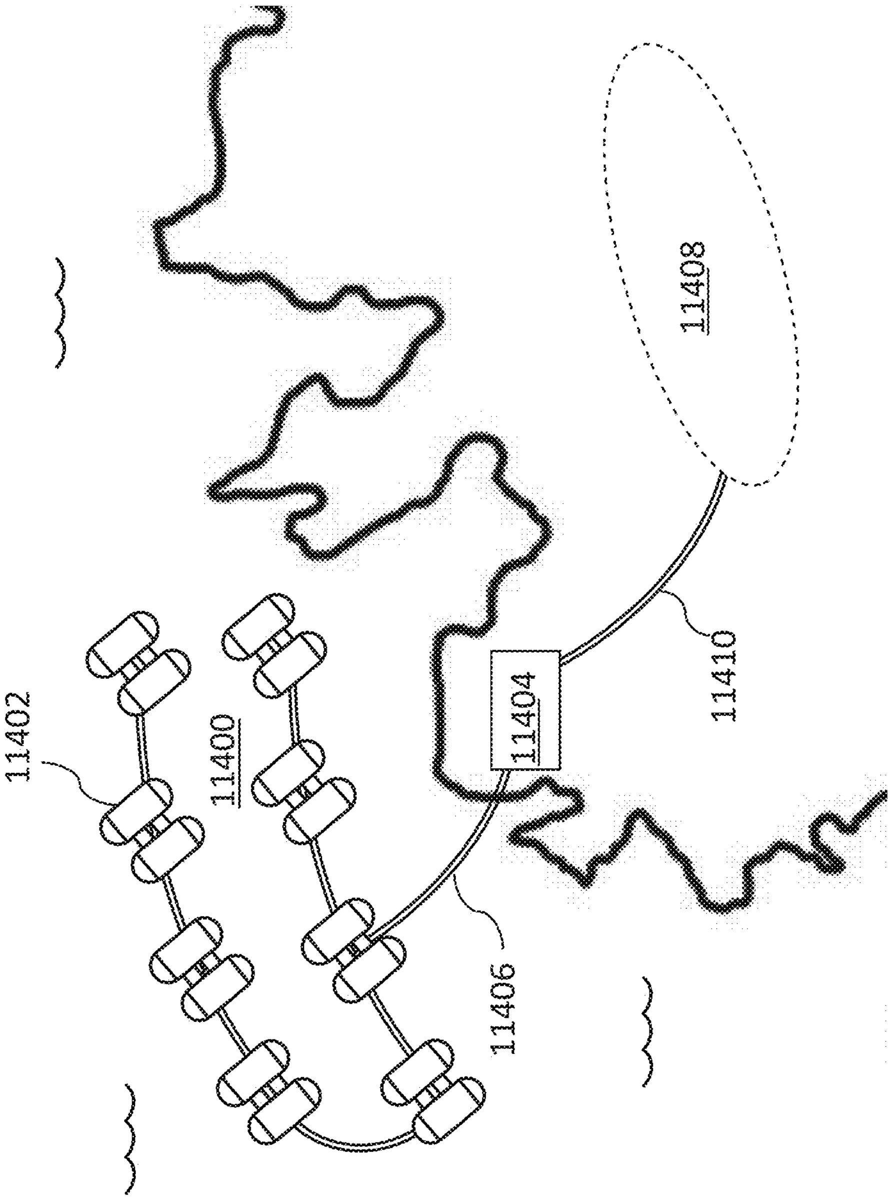
Figure 115:
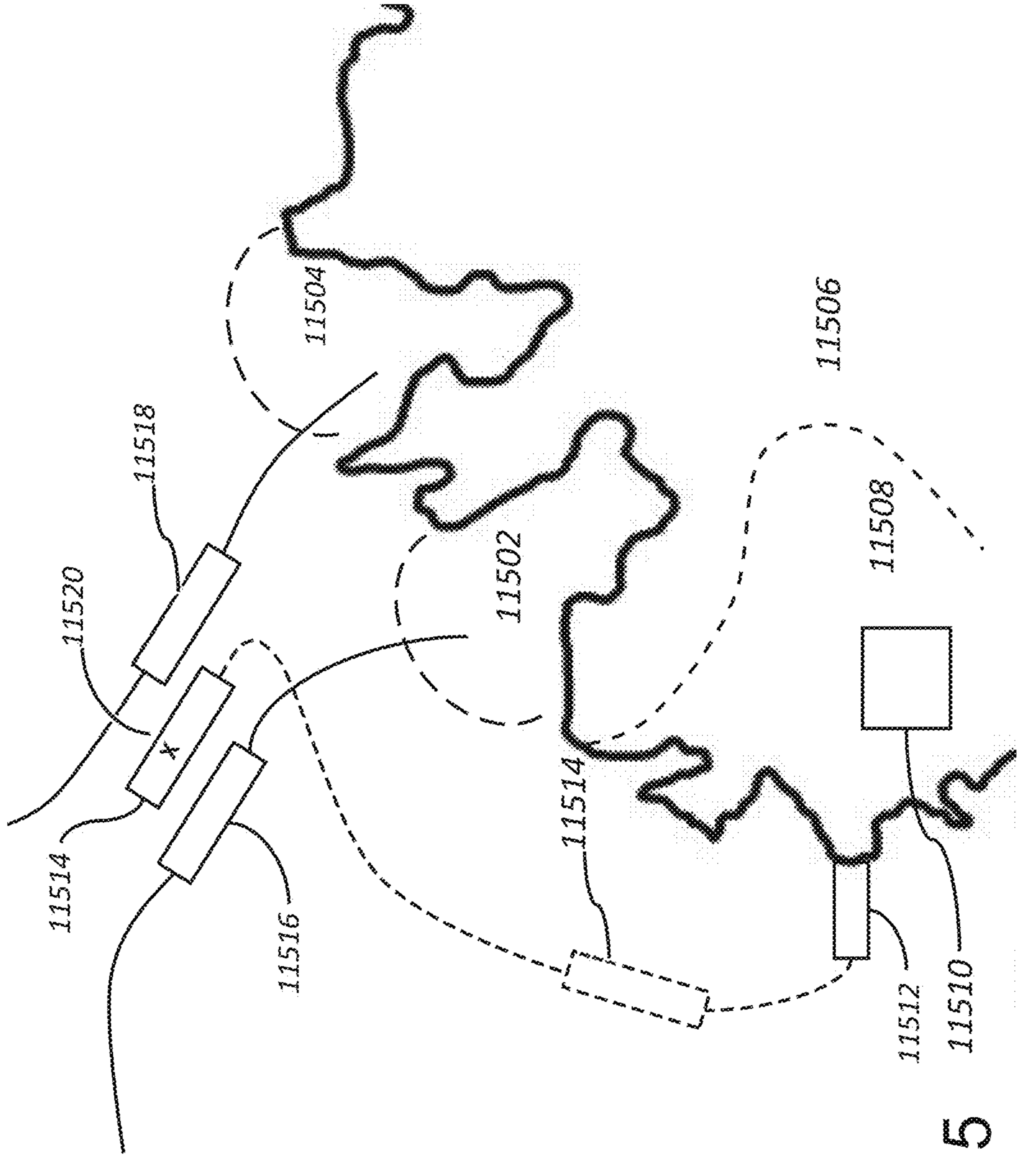
Figure 116:
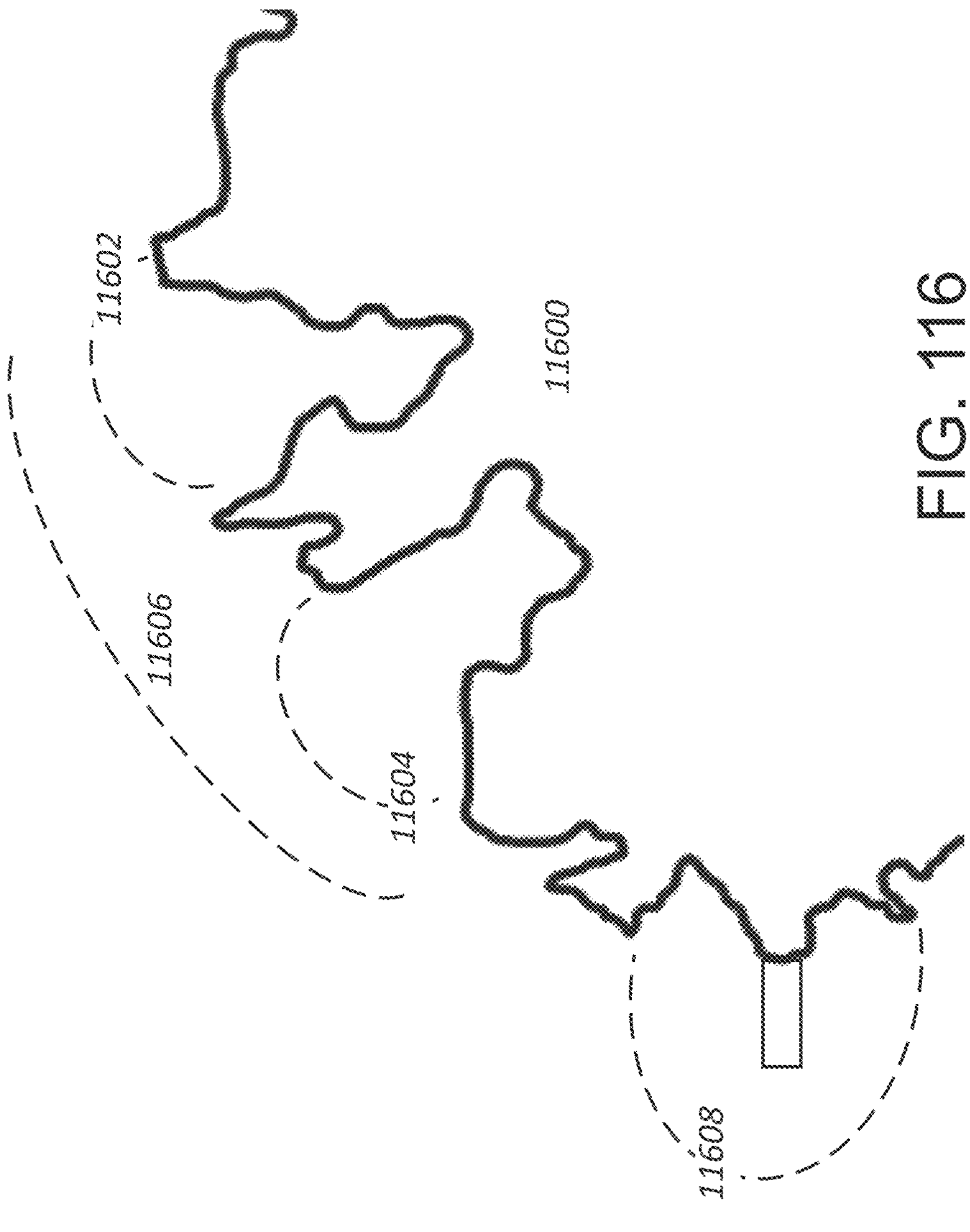
Figure 117:
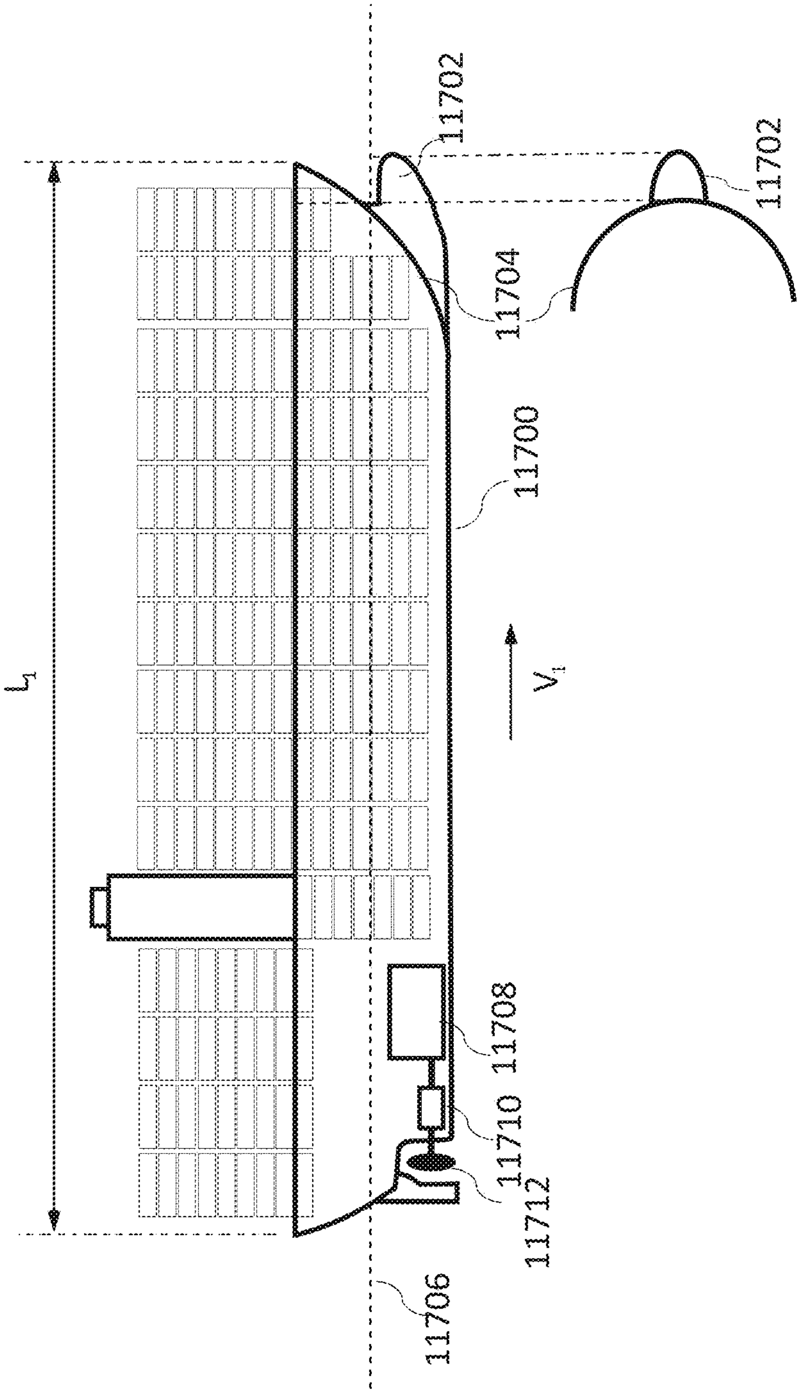
Figure 118:
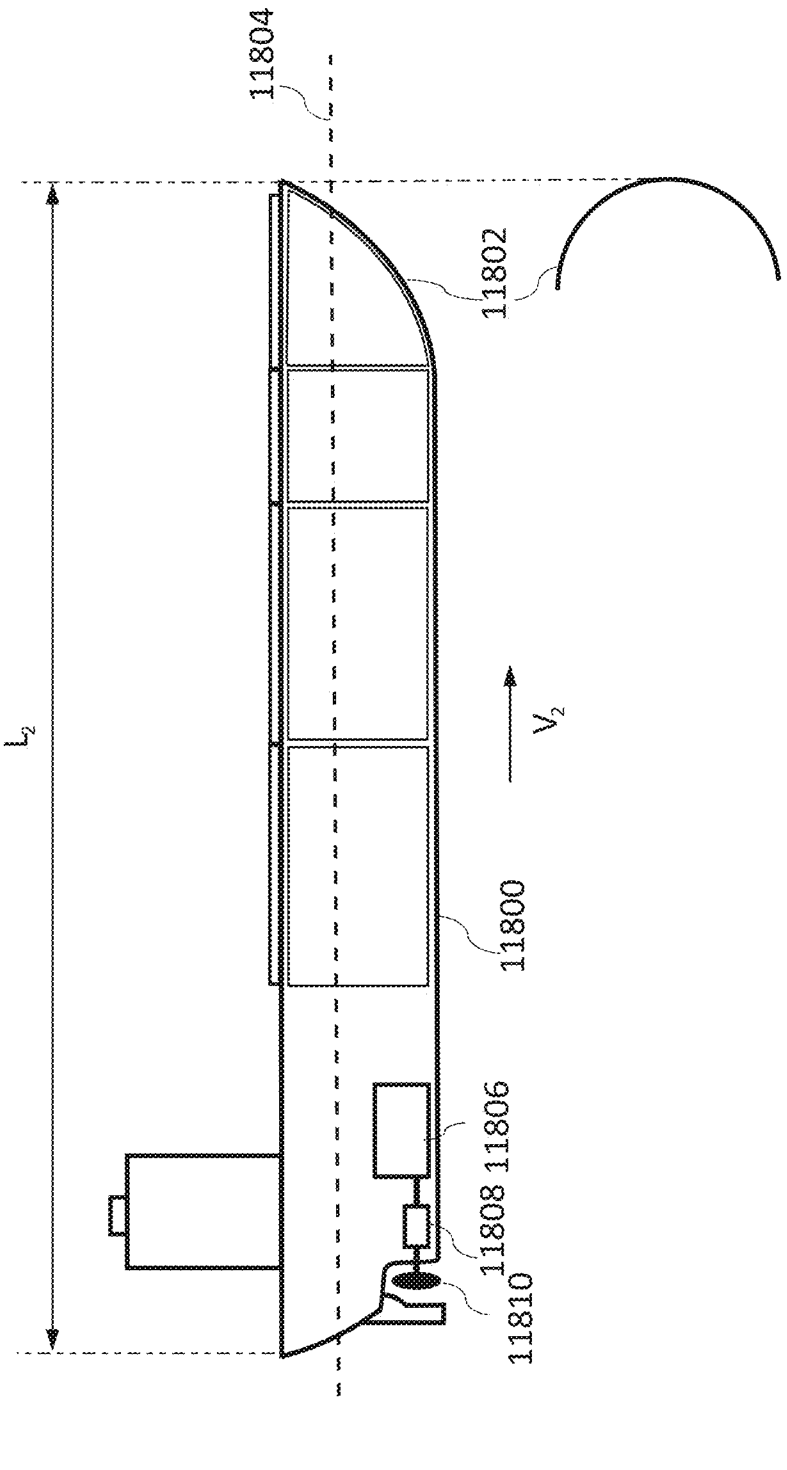
Figure 119:
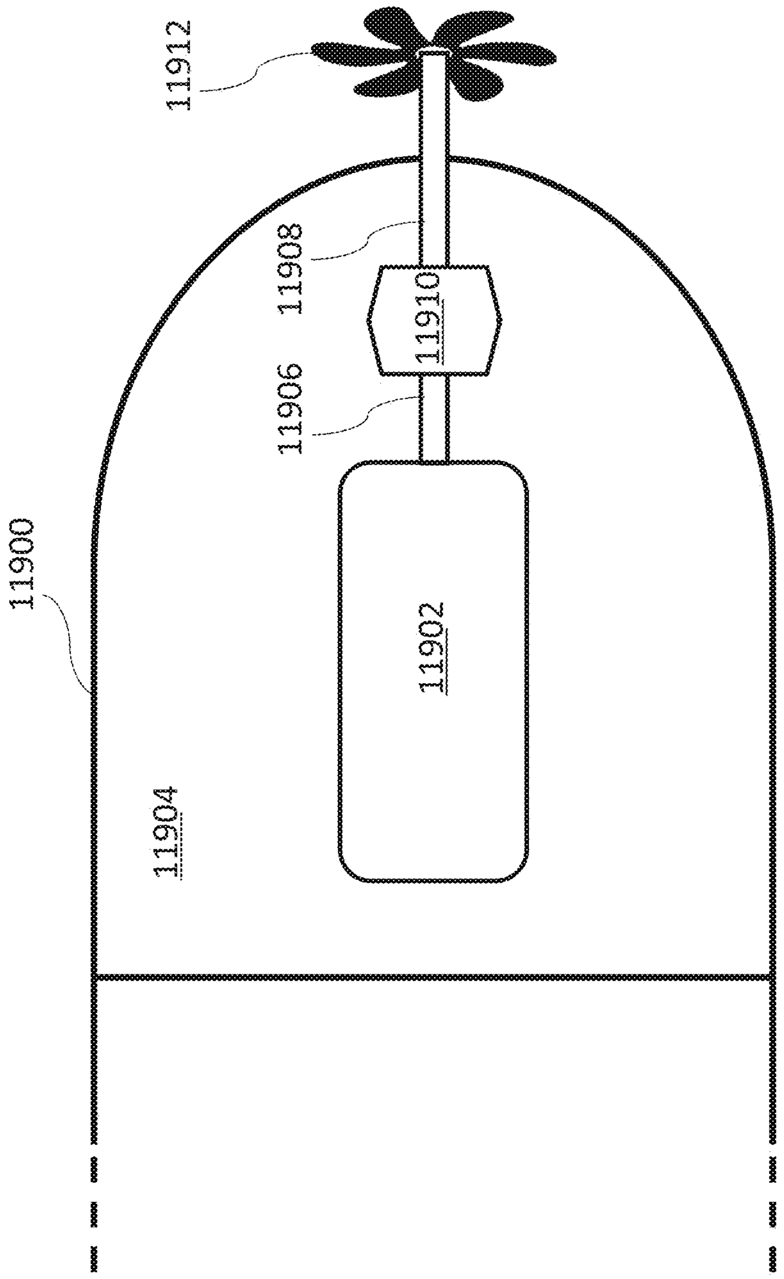
Figure 120A:
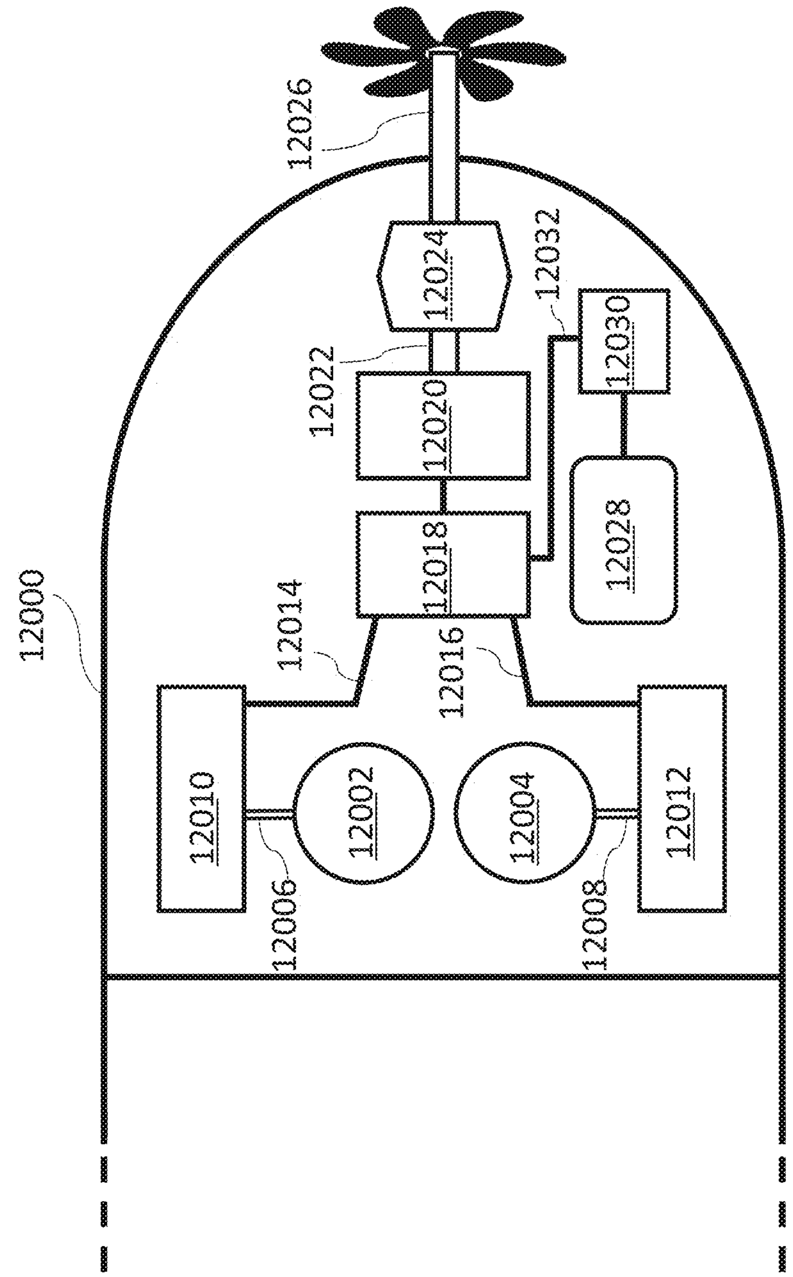
Figure 120B:
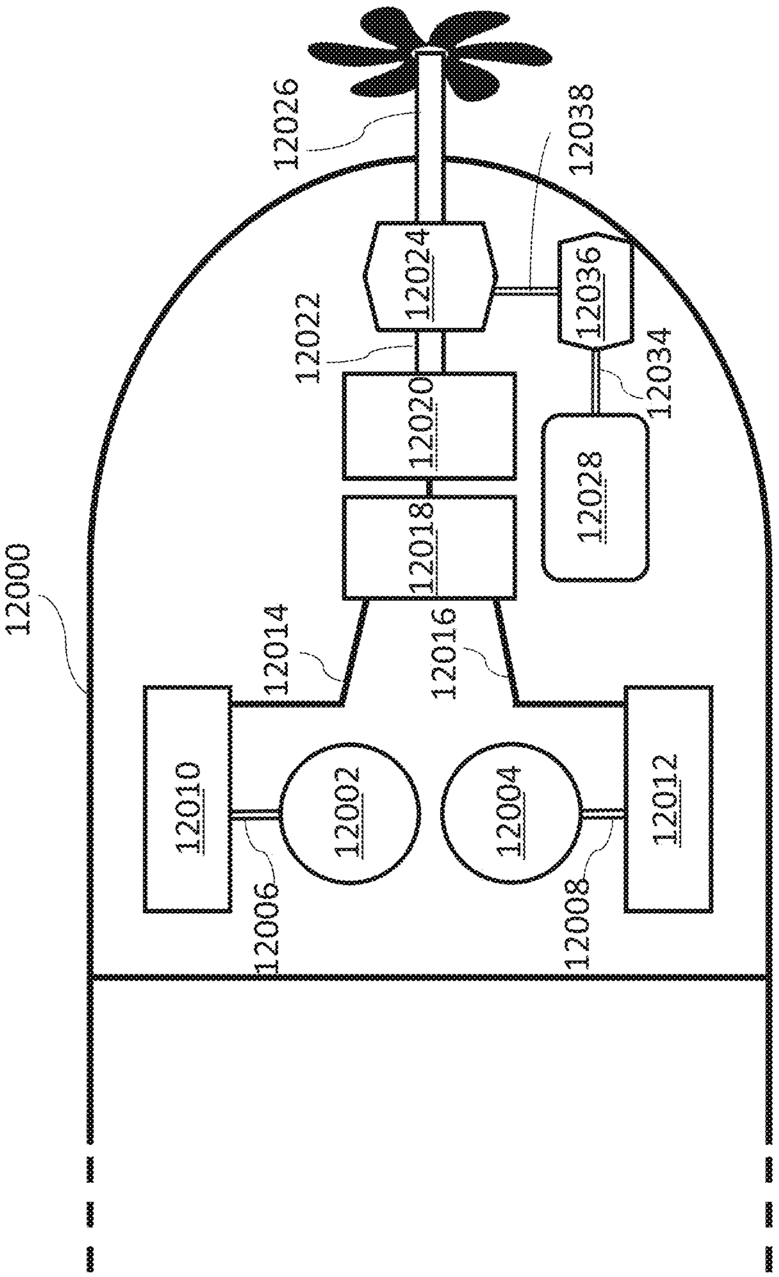
Figure 120C:
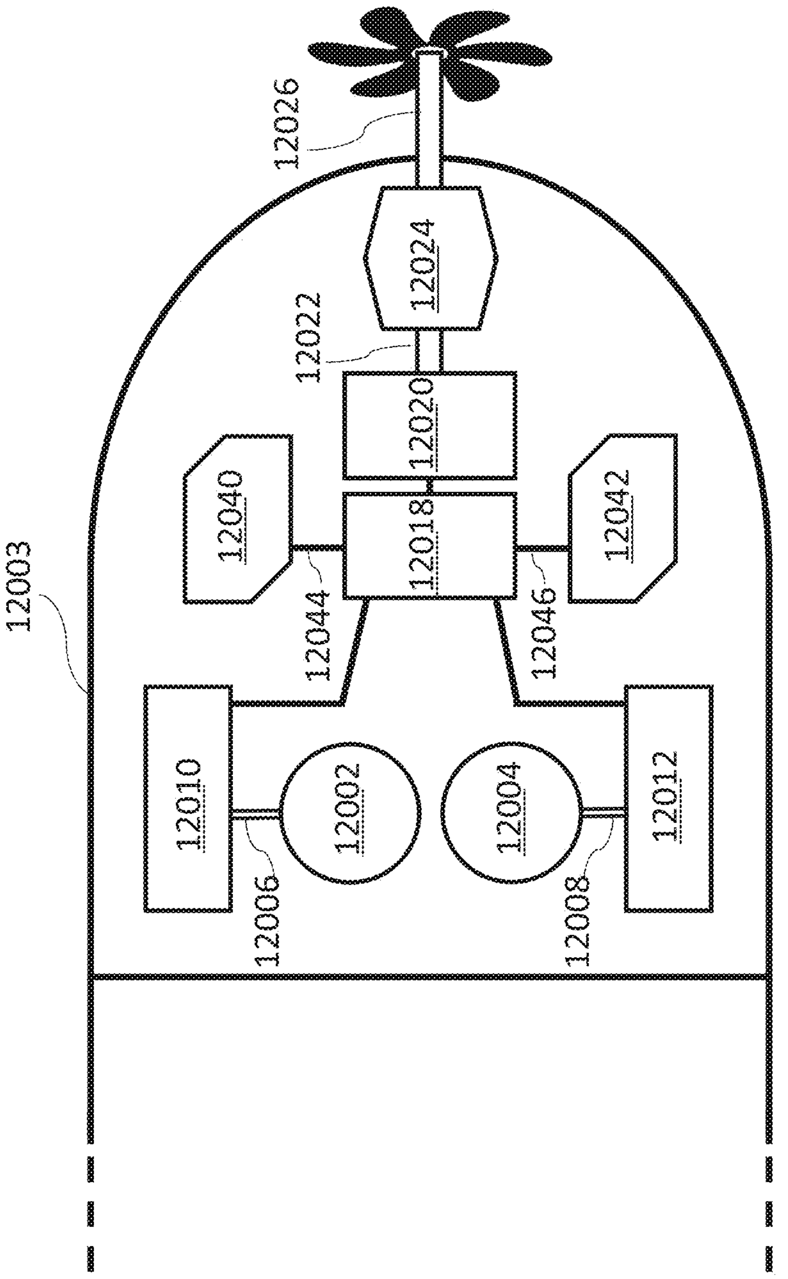
Figure 121:
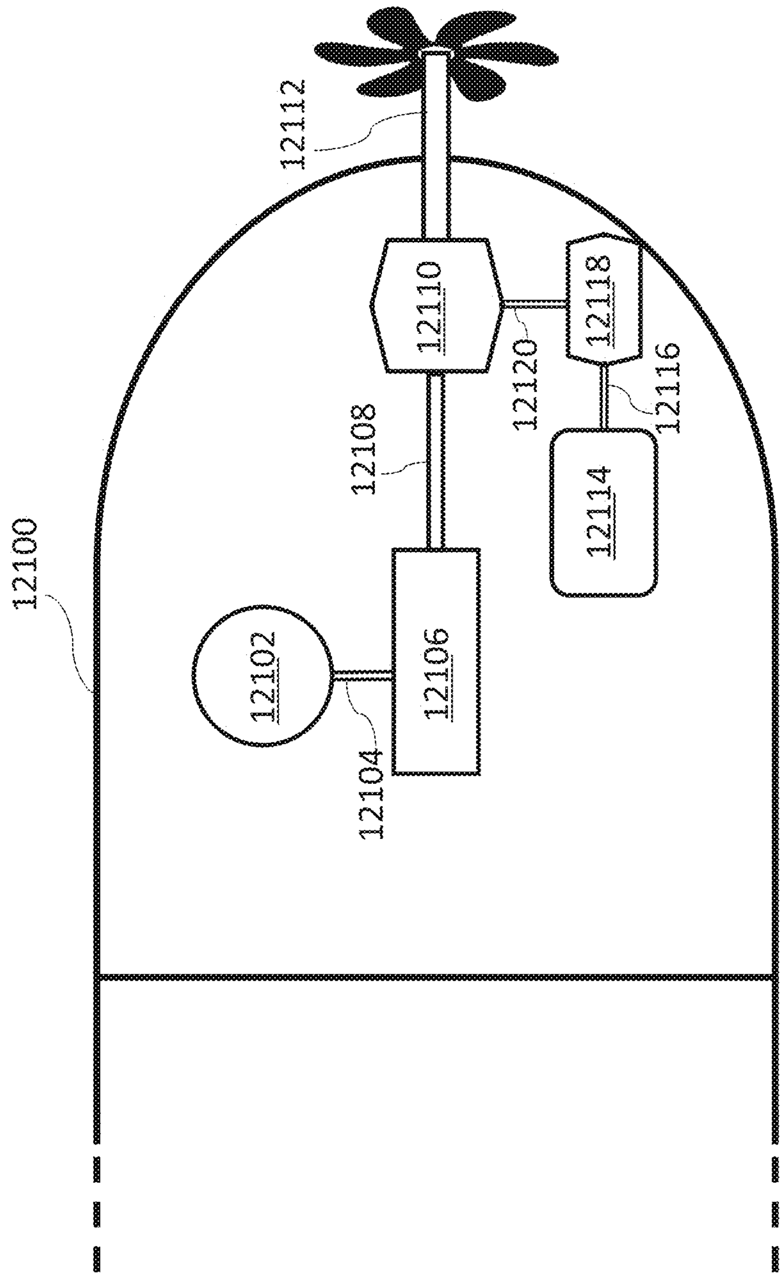
Figure 122:
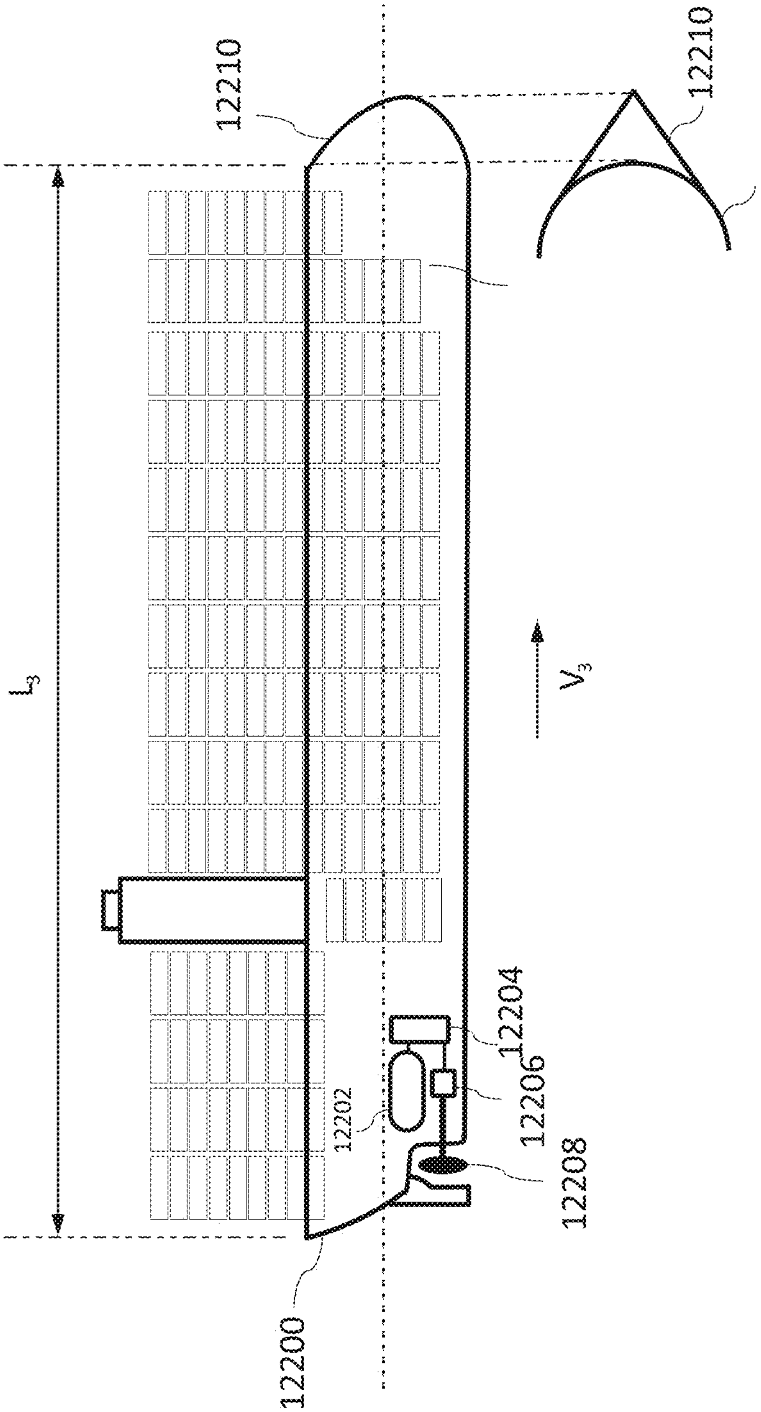
Figure 123:
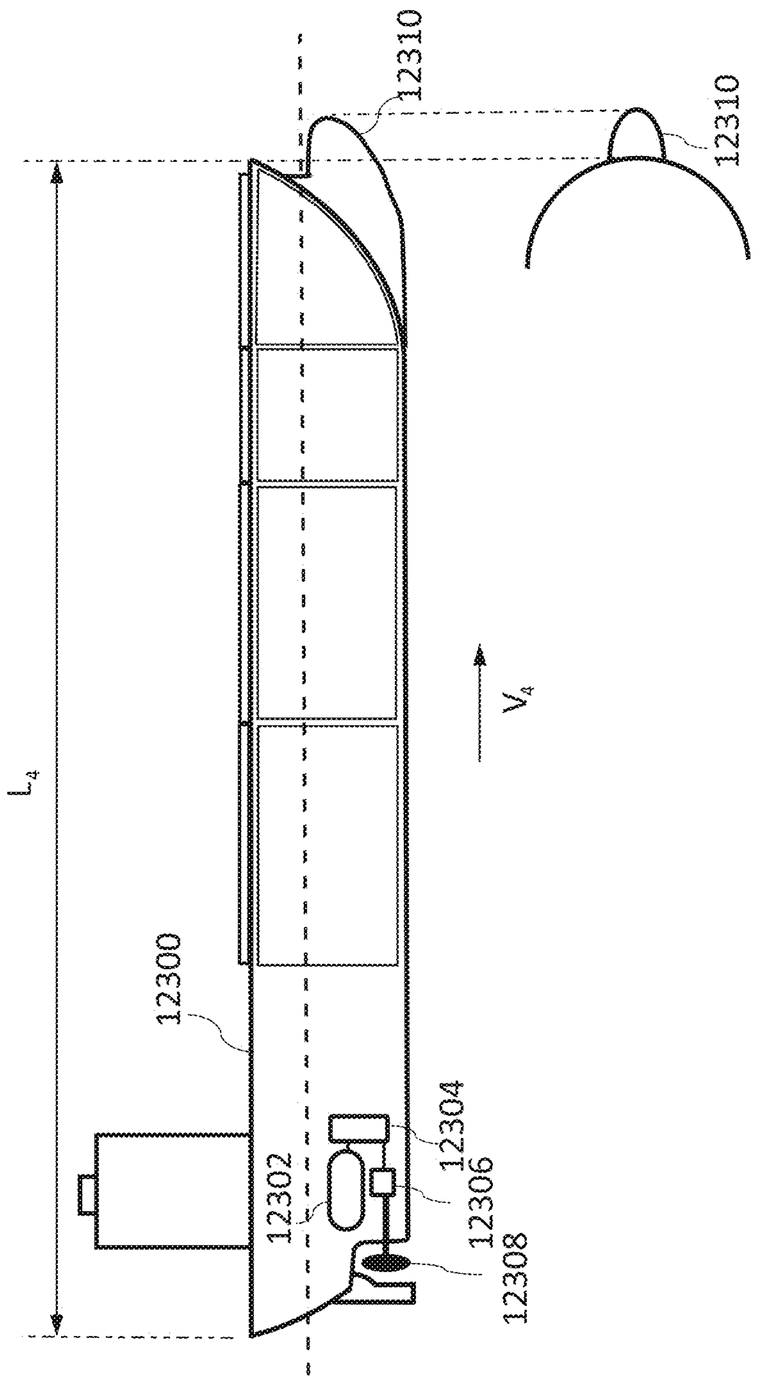
Figure 124A:
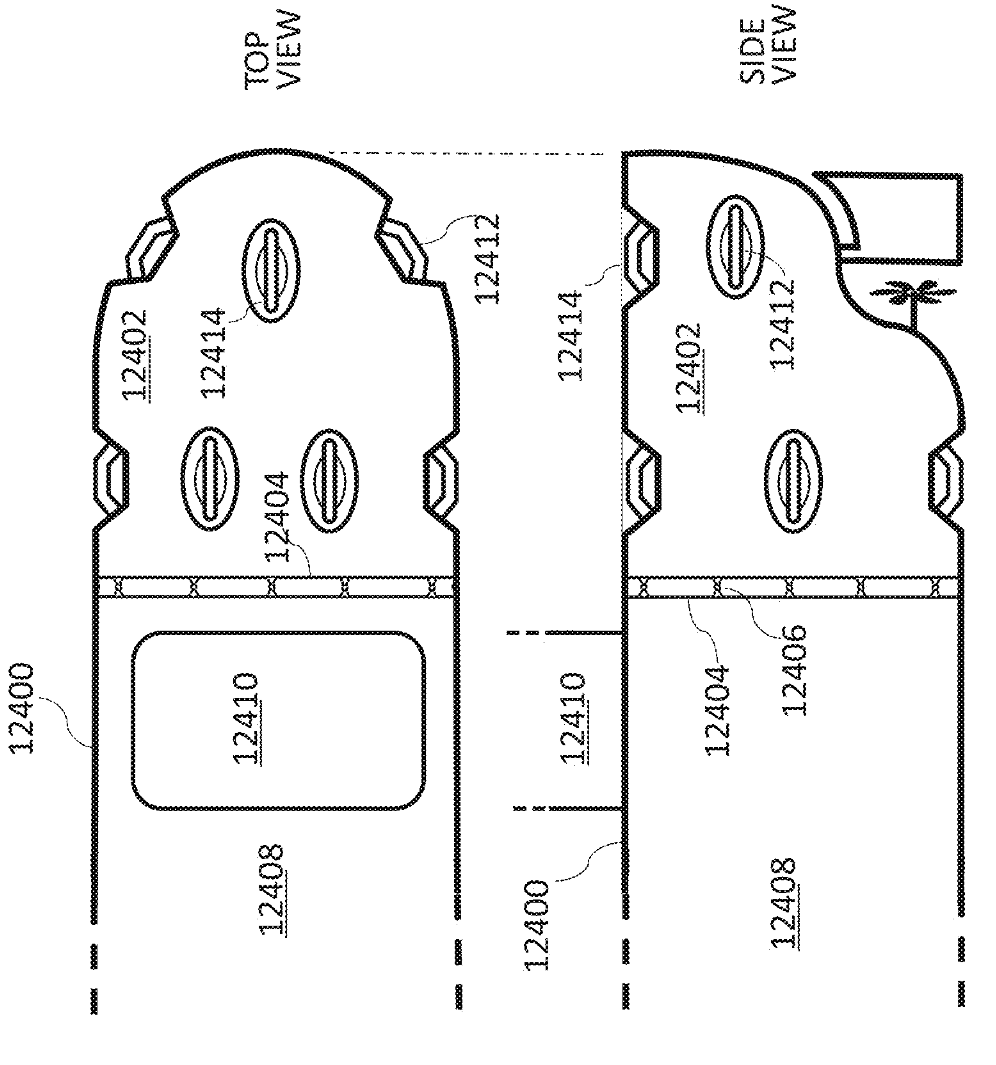
Figure 124B:
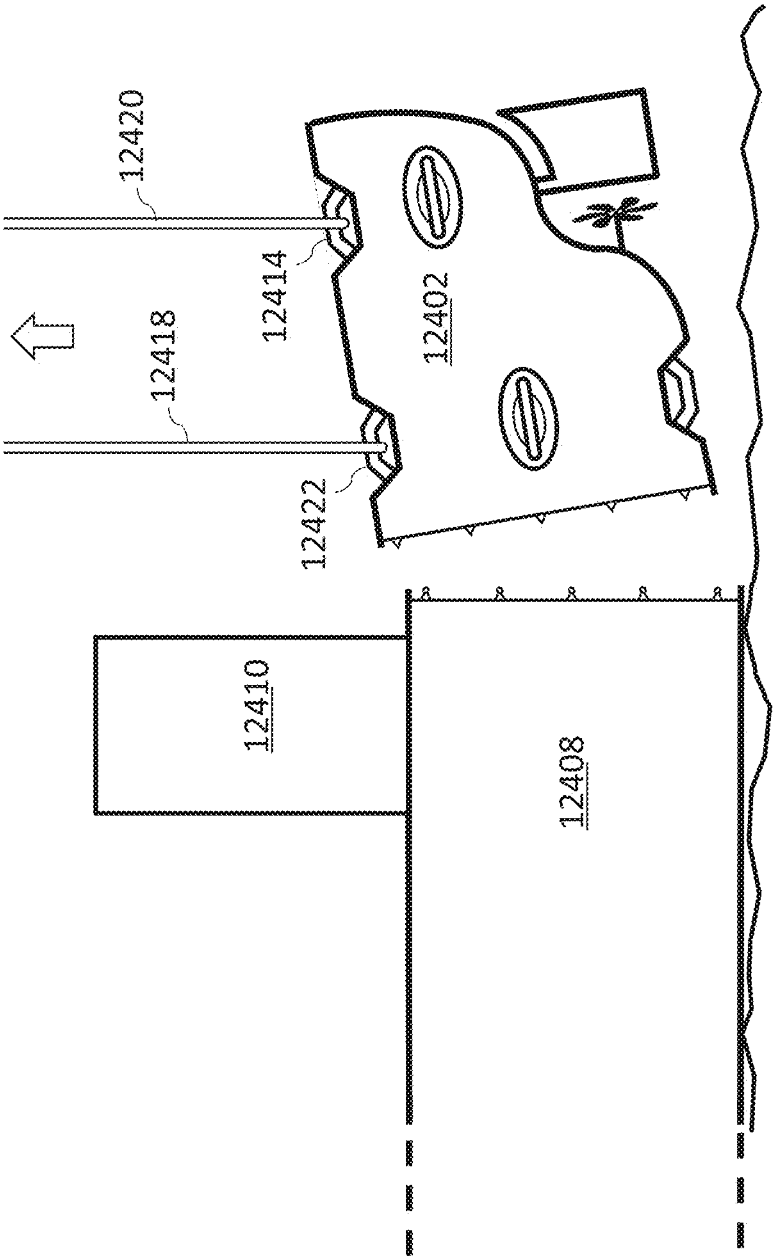
Figure 125A:
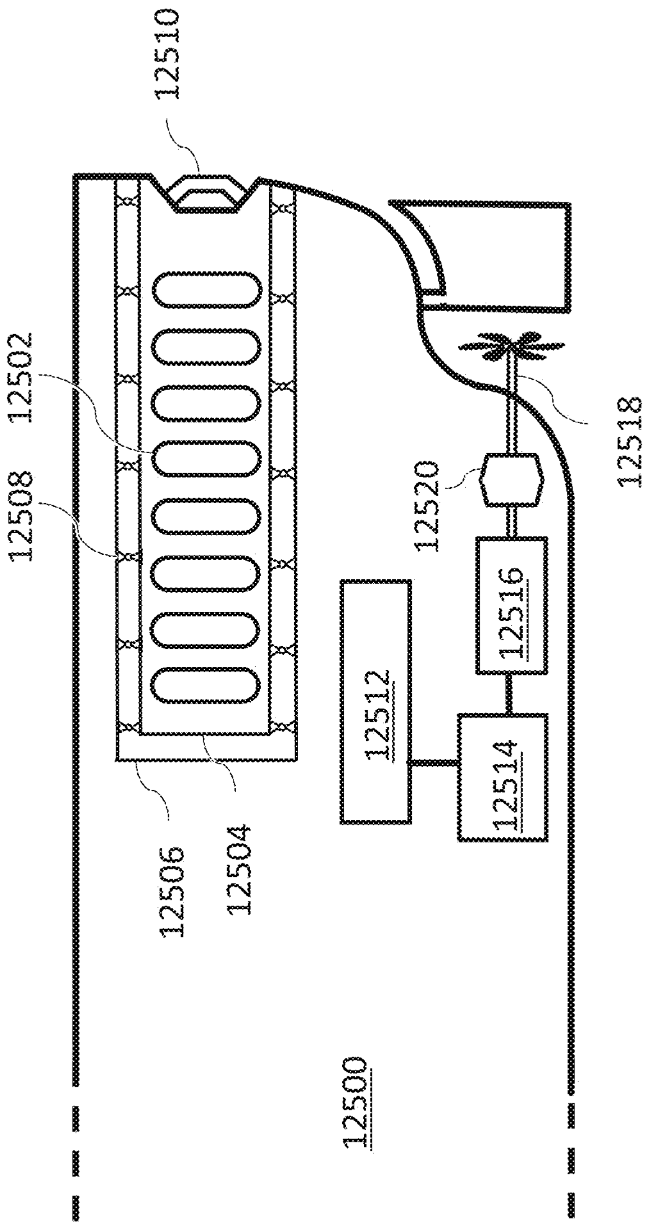
Figure 125B:
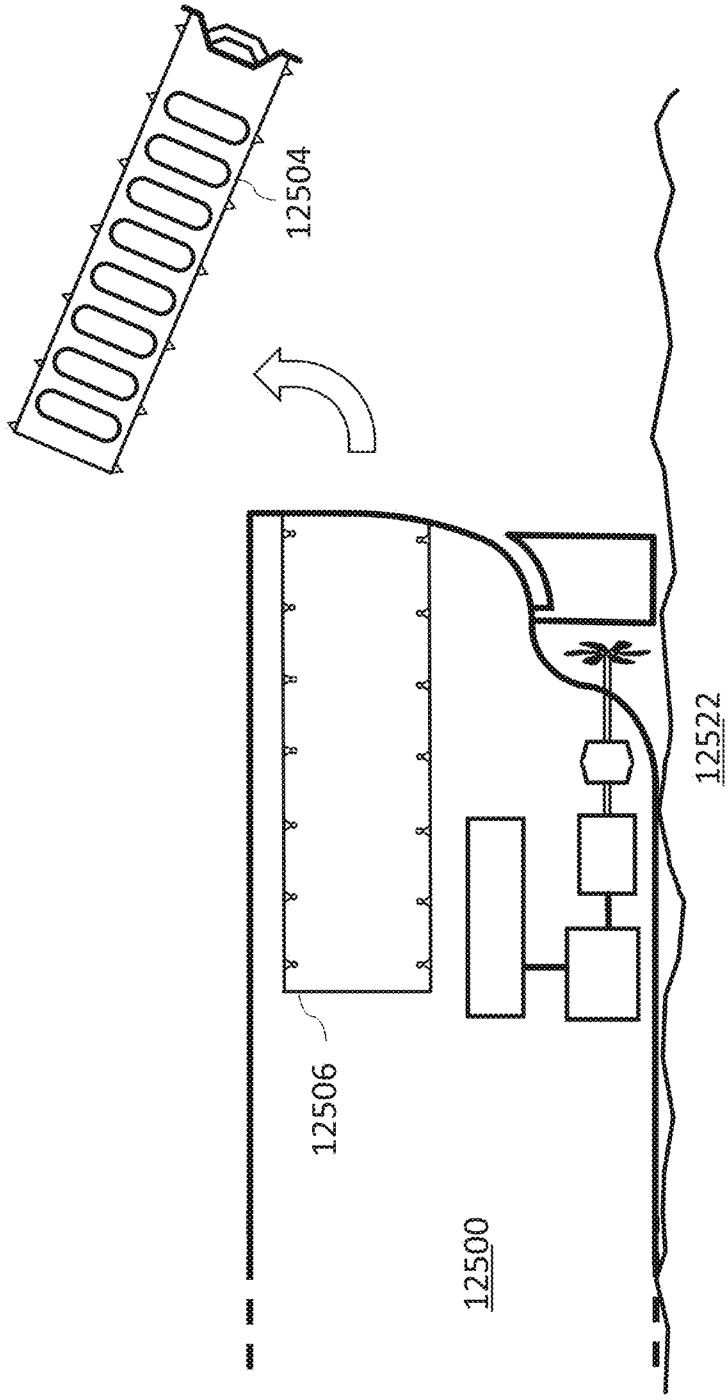
Figure 126:
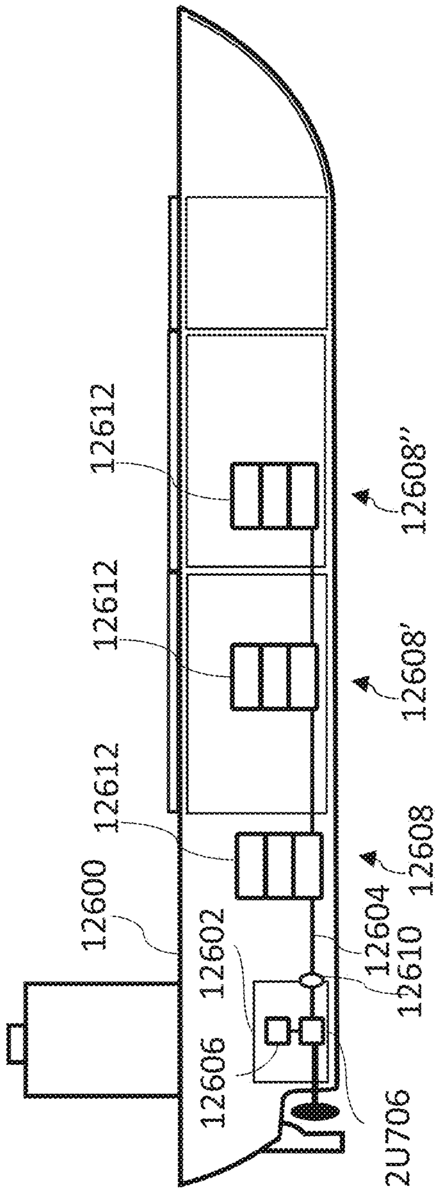
Figure 127A:
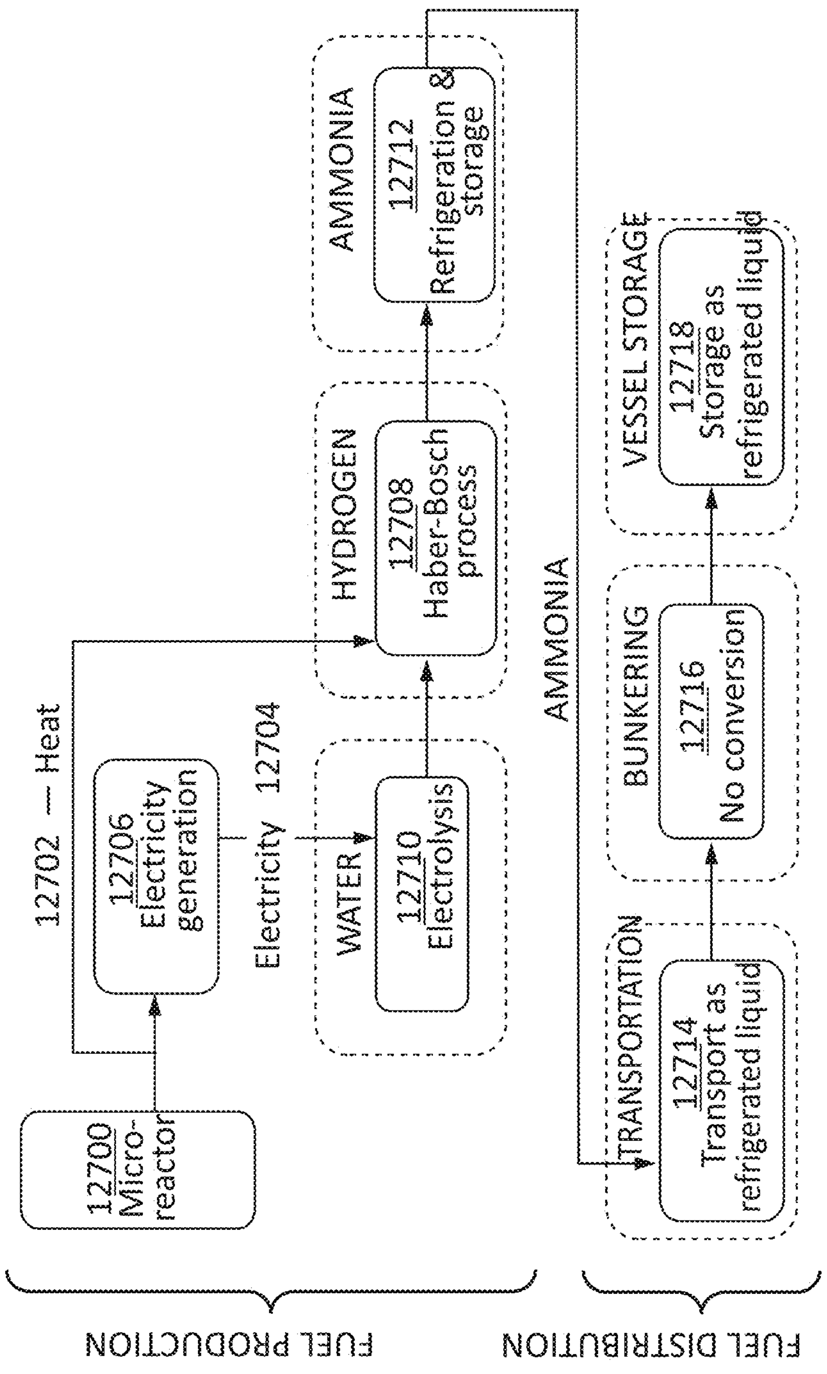
Figure 127B:
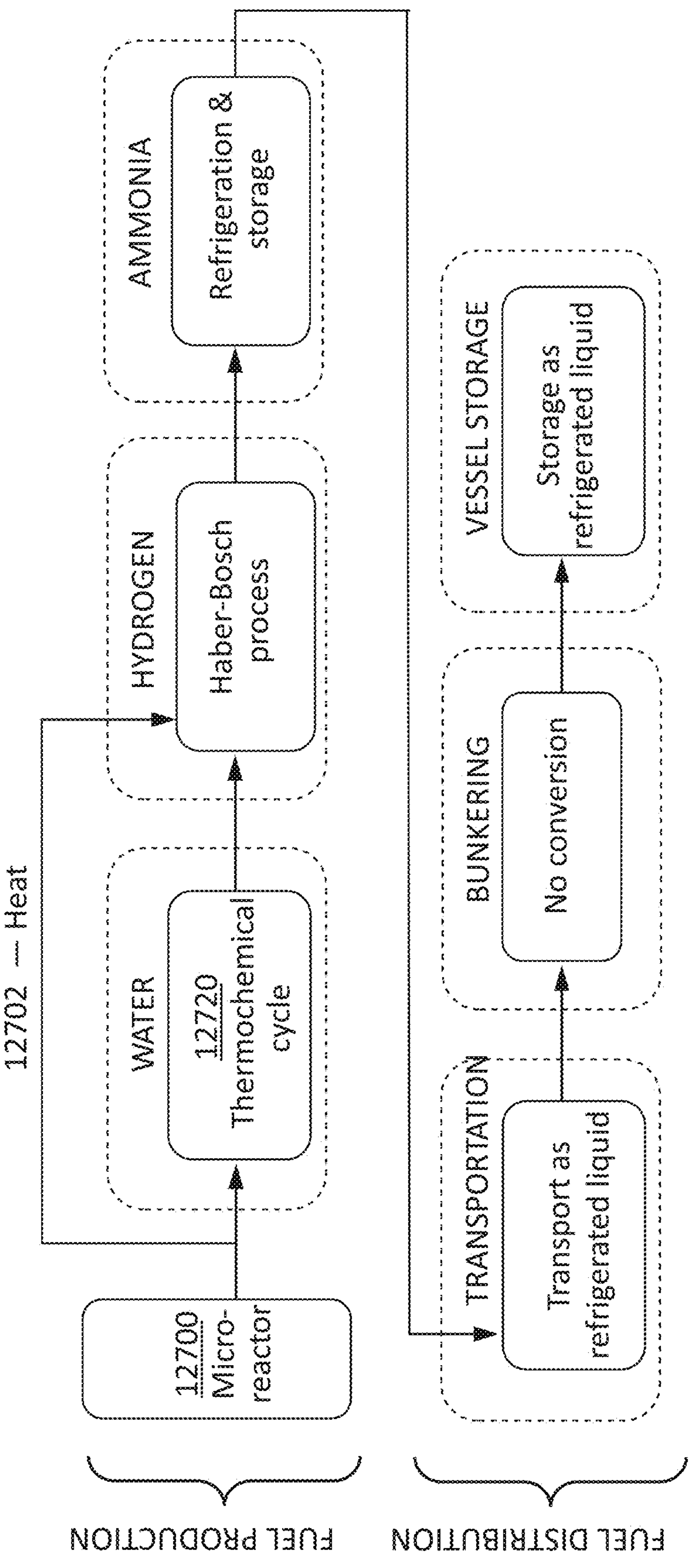
Figure 128:
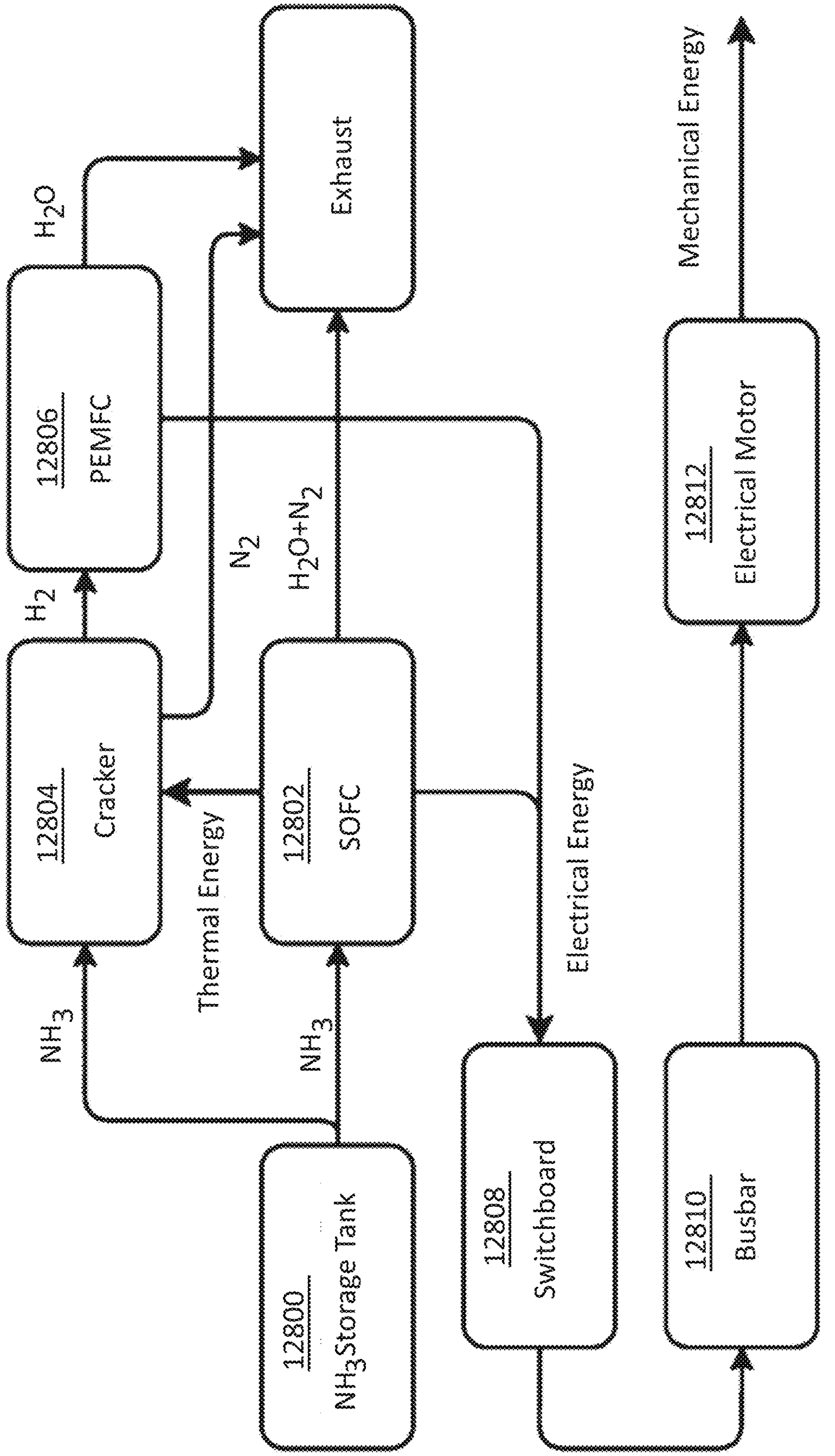
Figure 129:
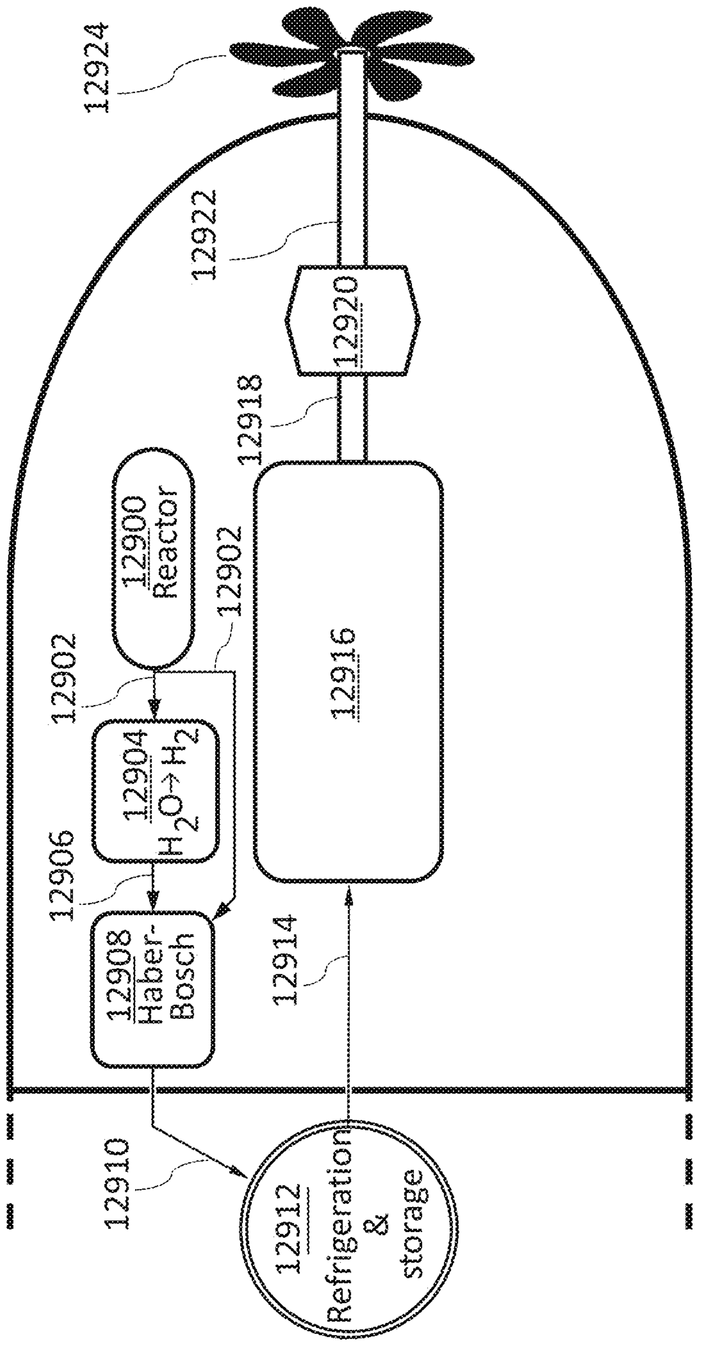
Figure 130:
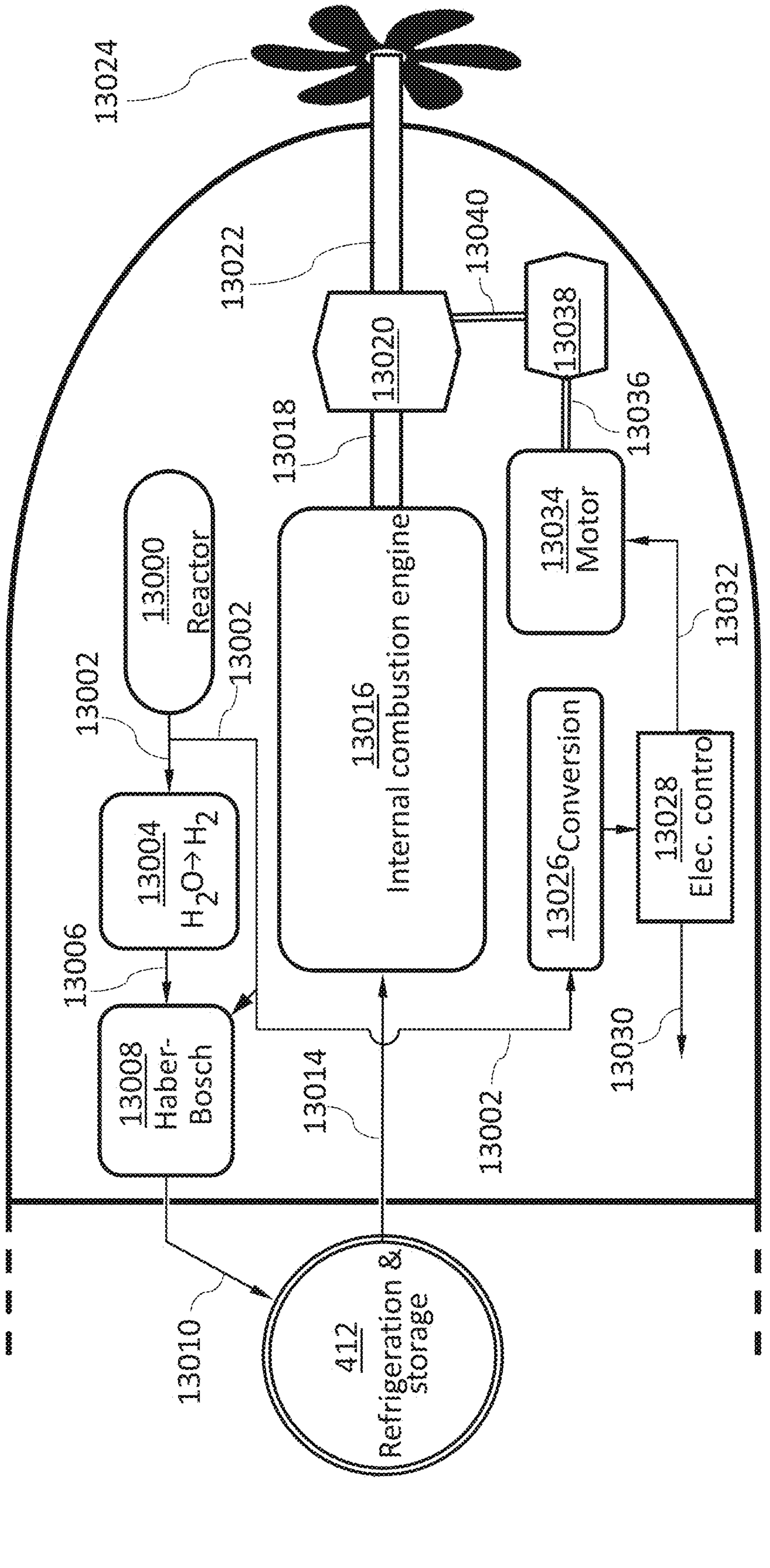
Figure 131:
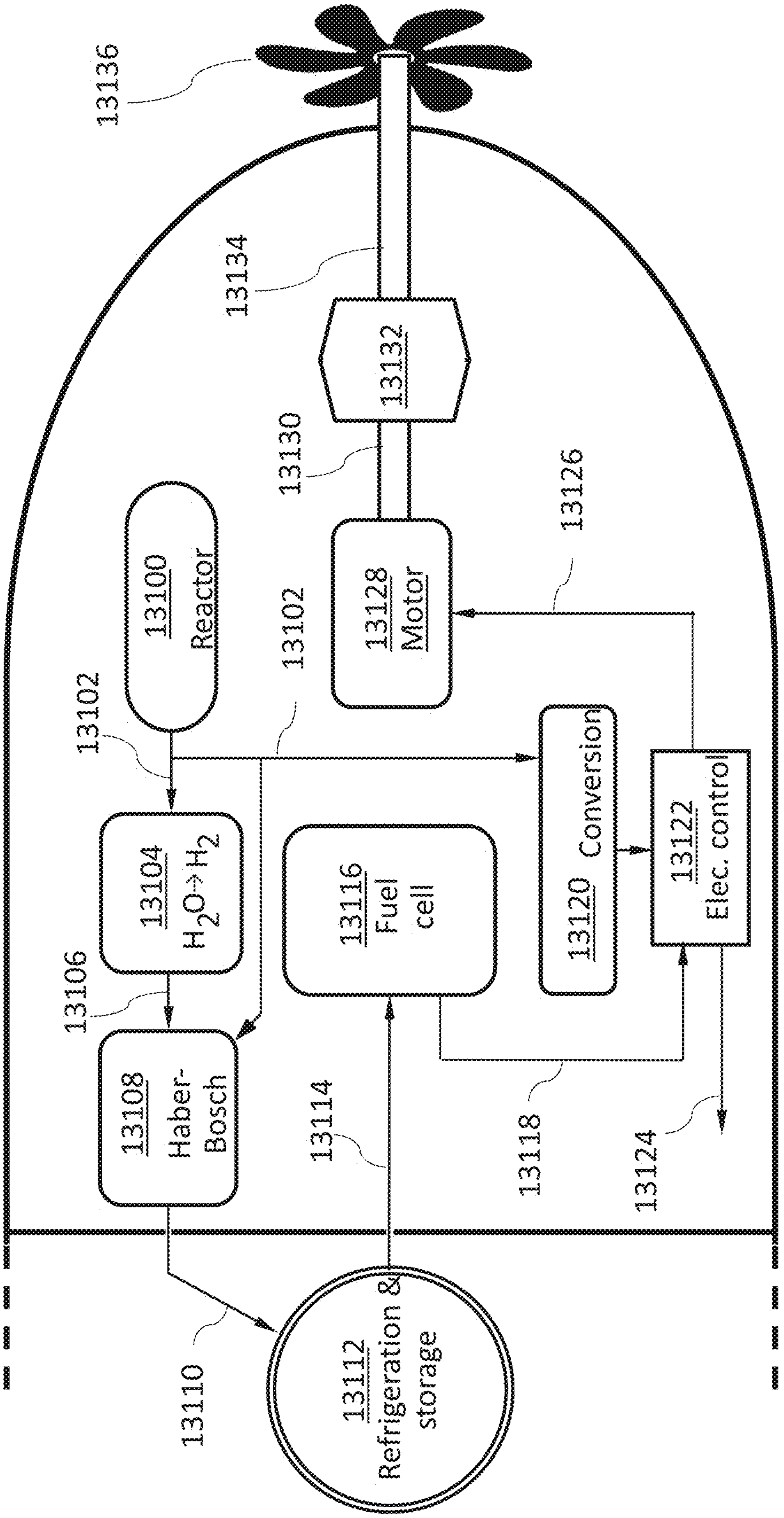
Figure 132A:
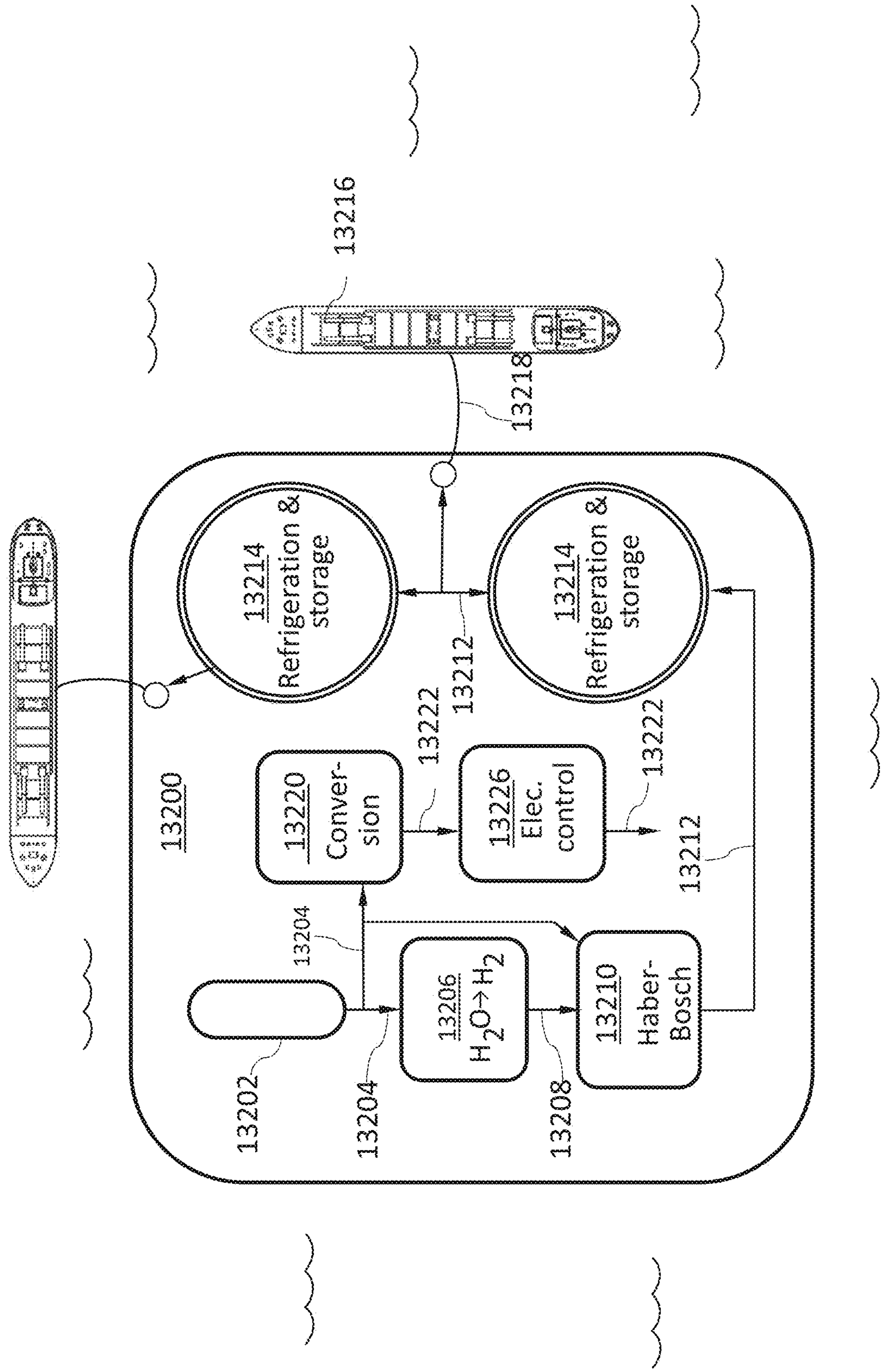
Figure 132B:
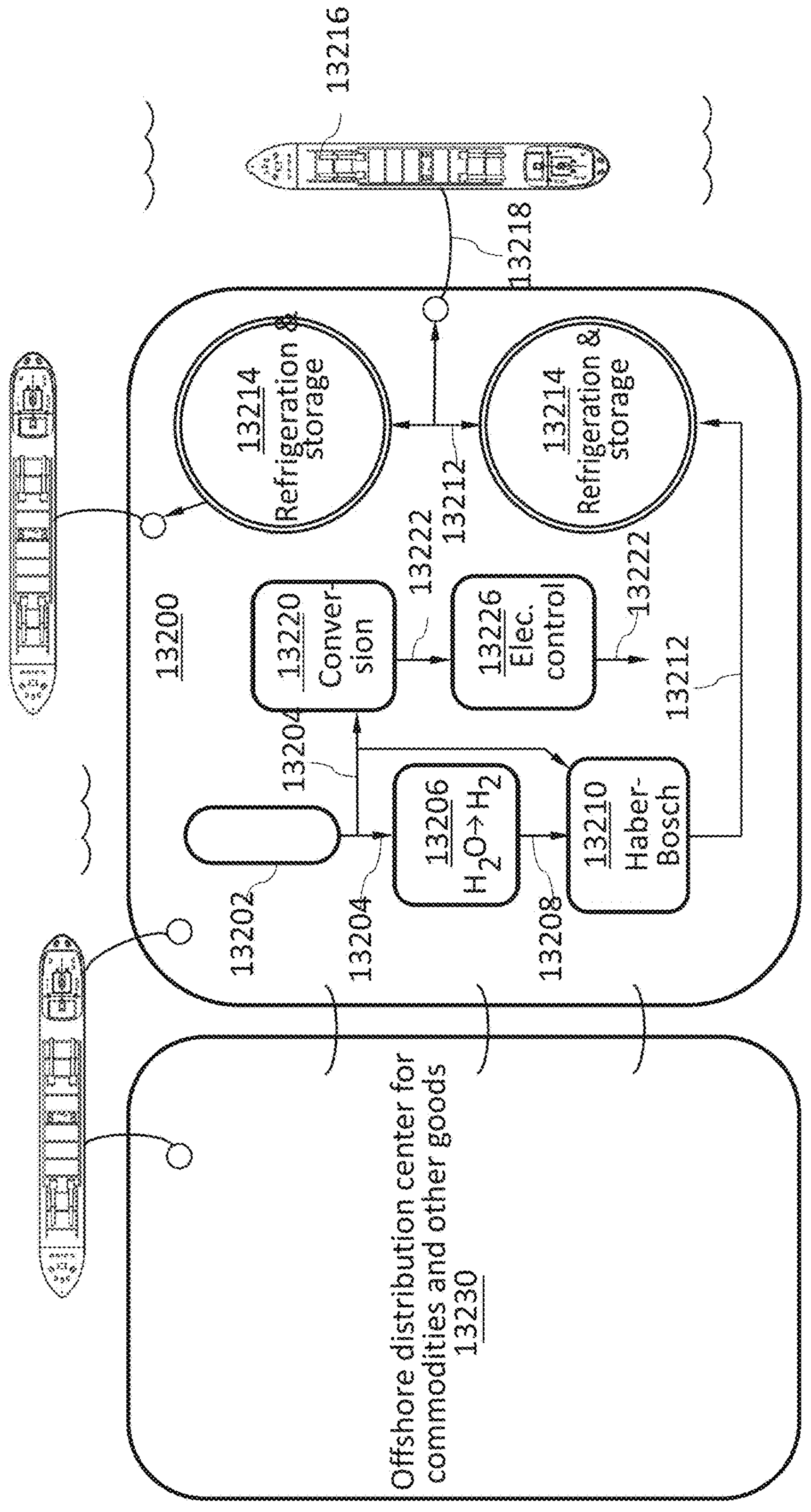
Figure 133:
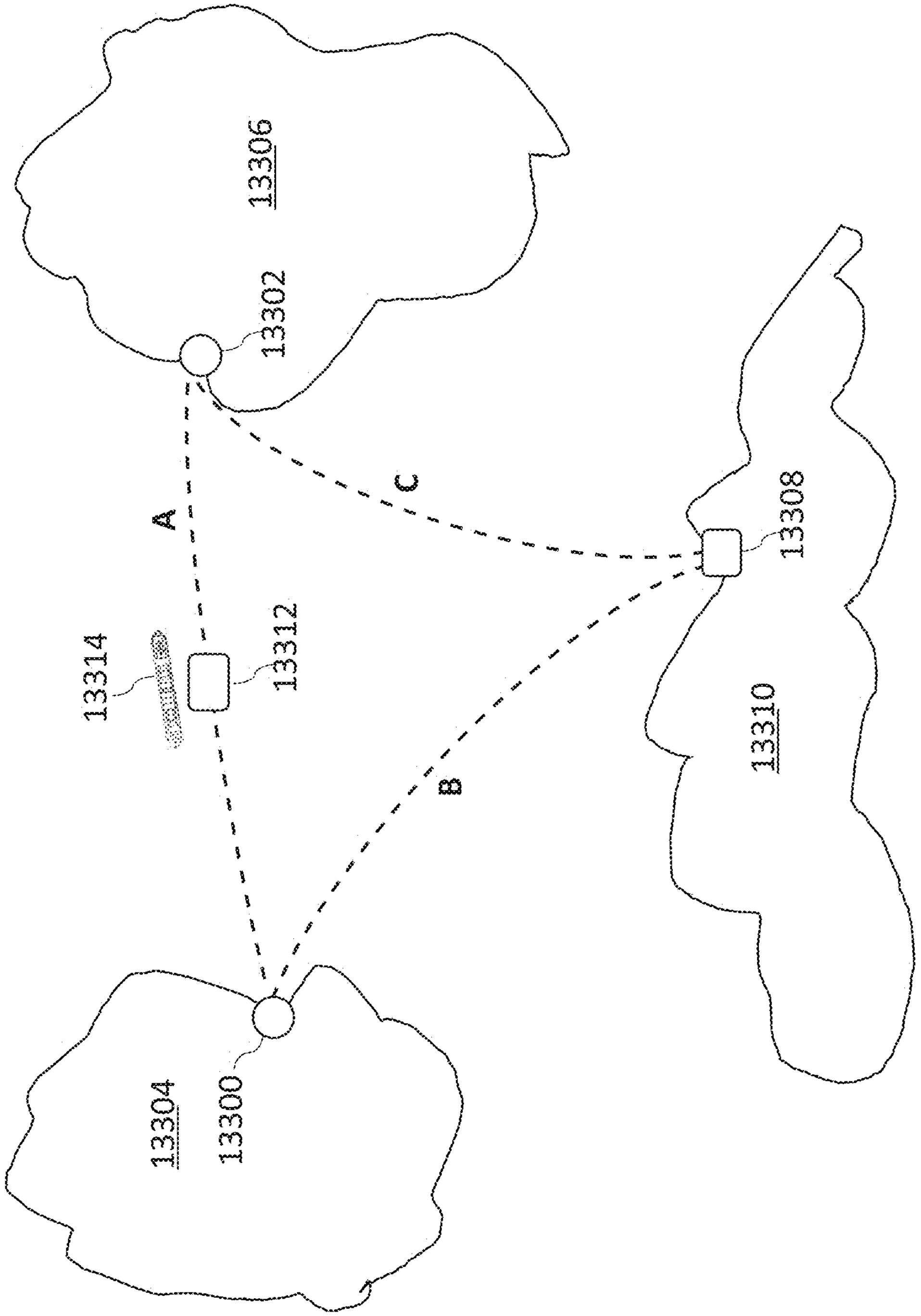
Figure 134:
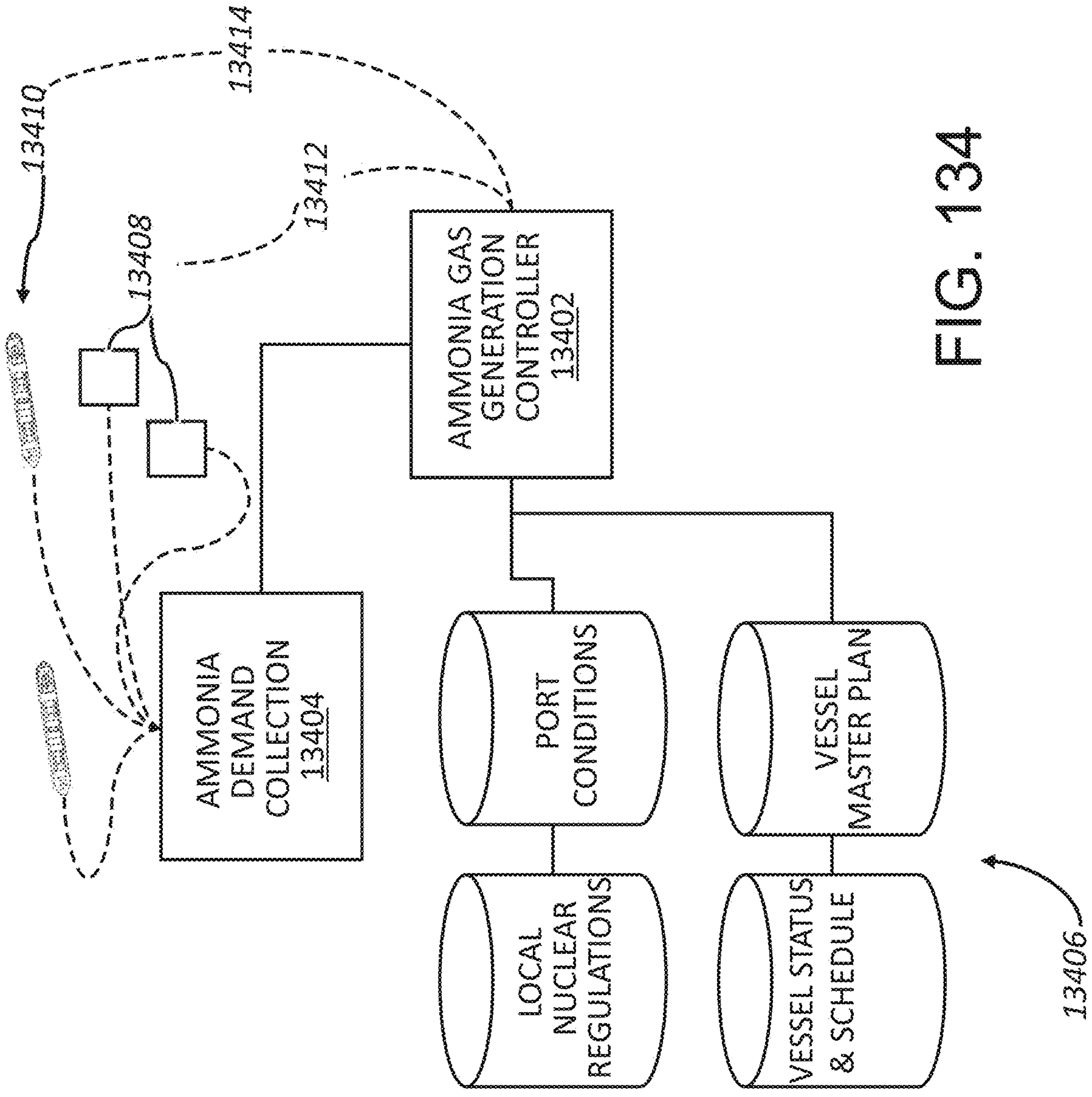
Figure 135:
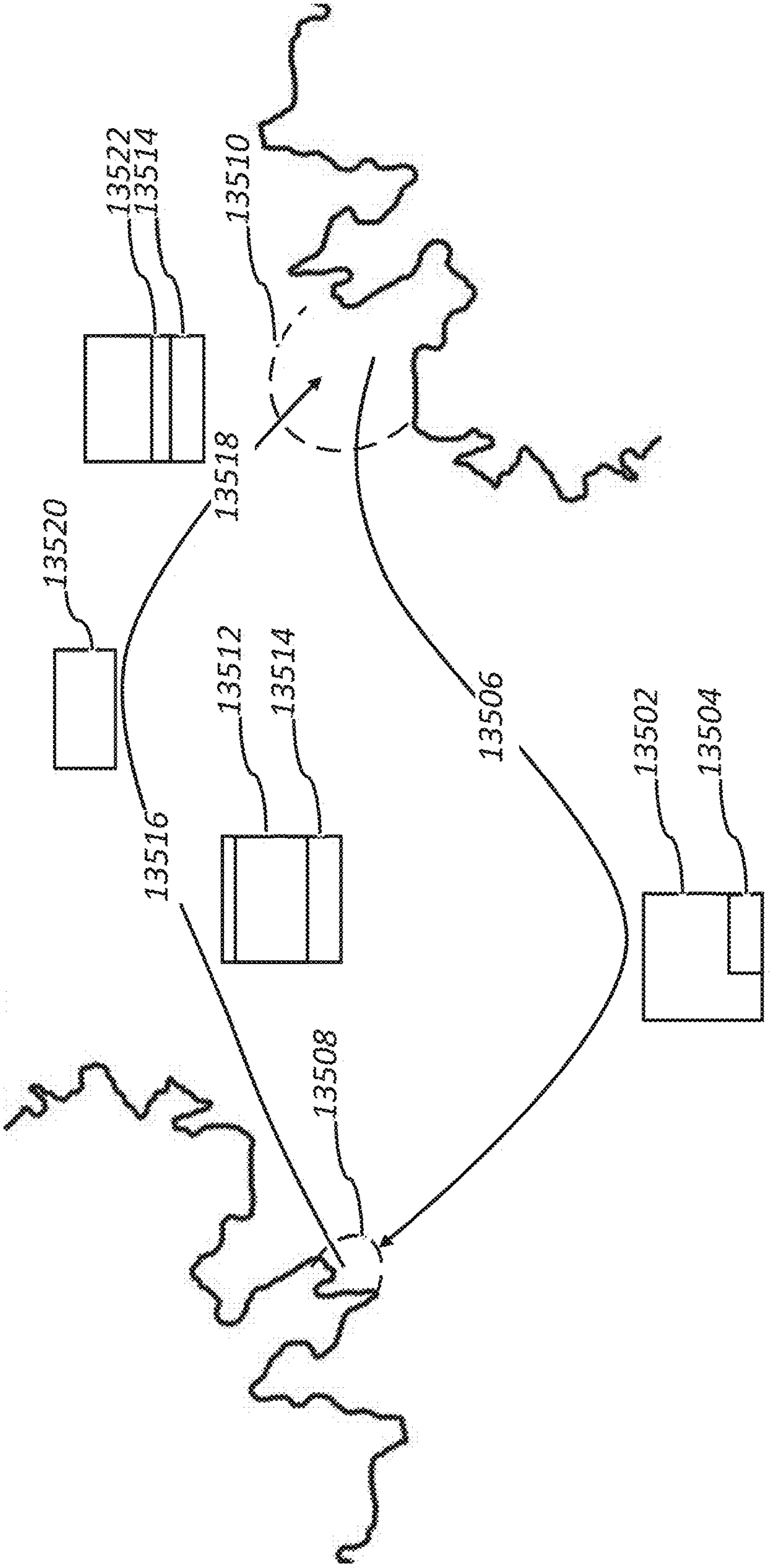
Figure 136:
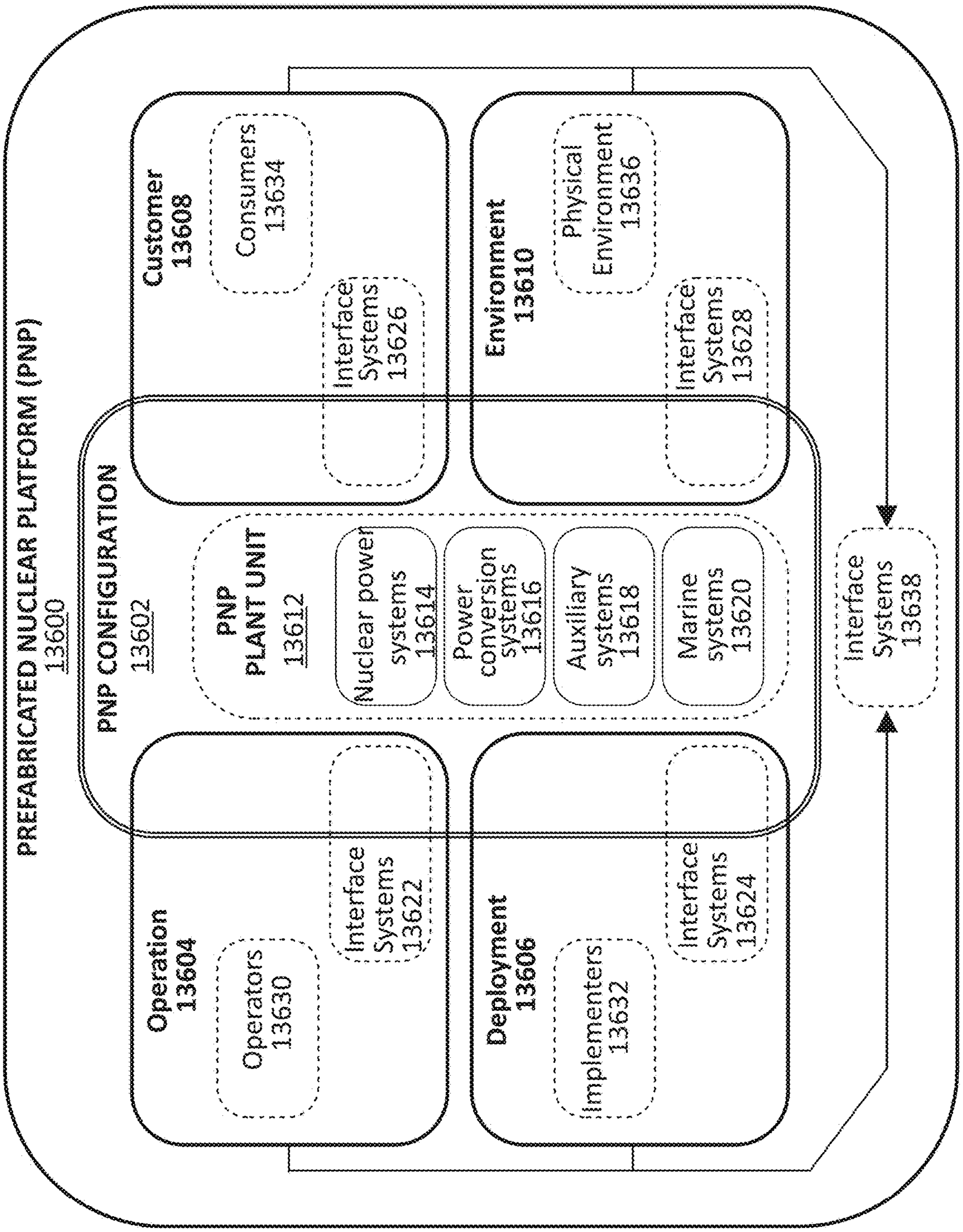
Figure 137:
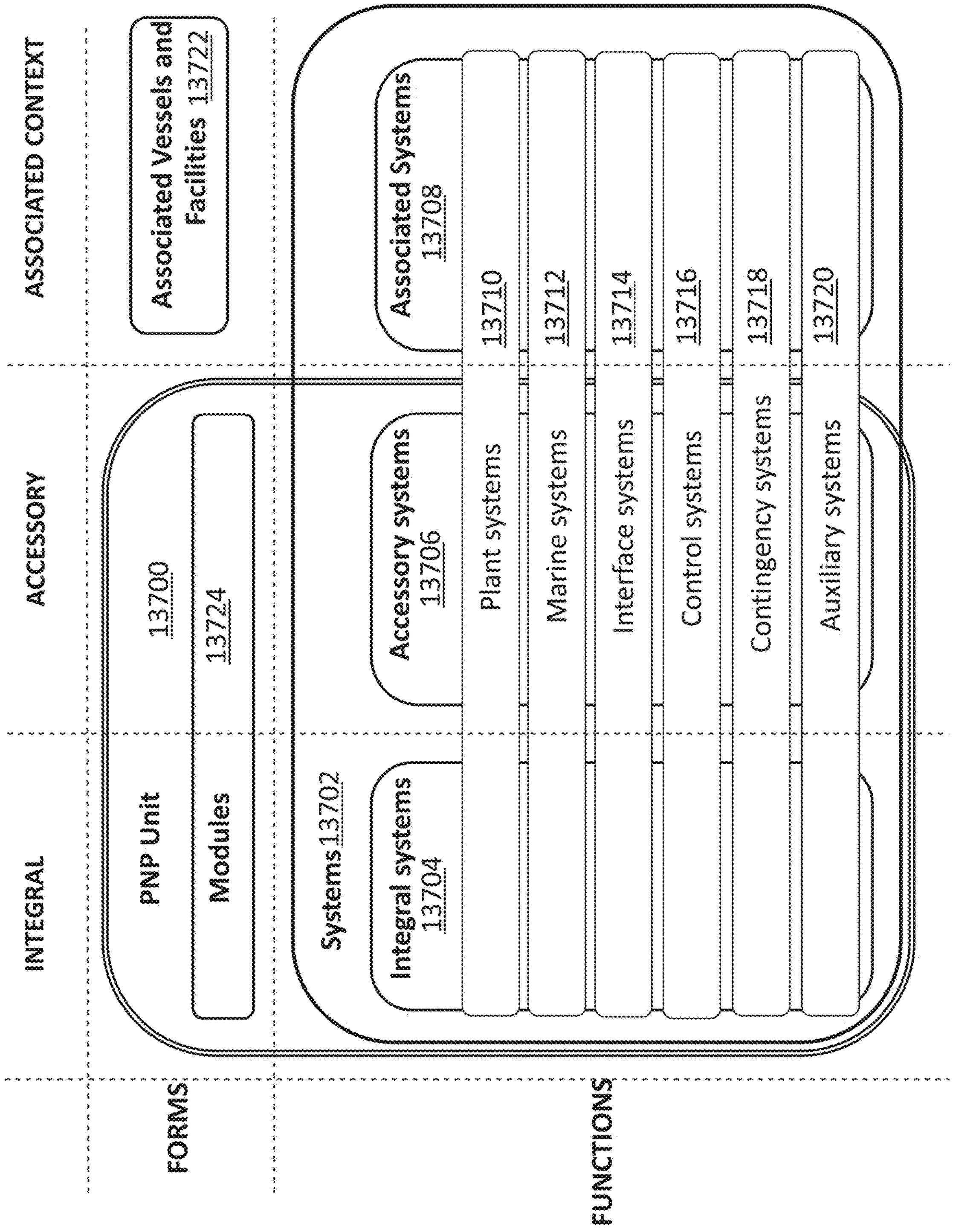
Figure 138:
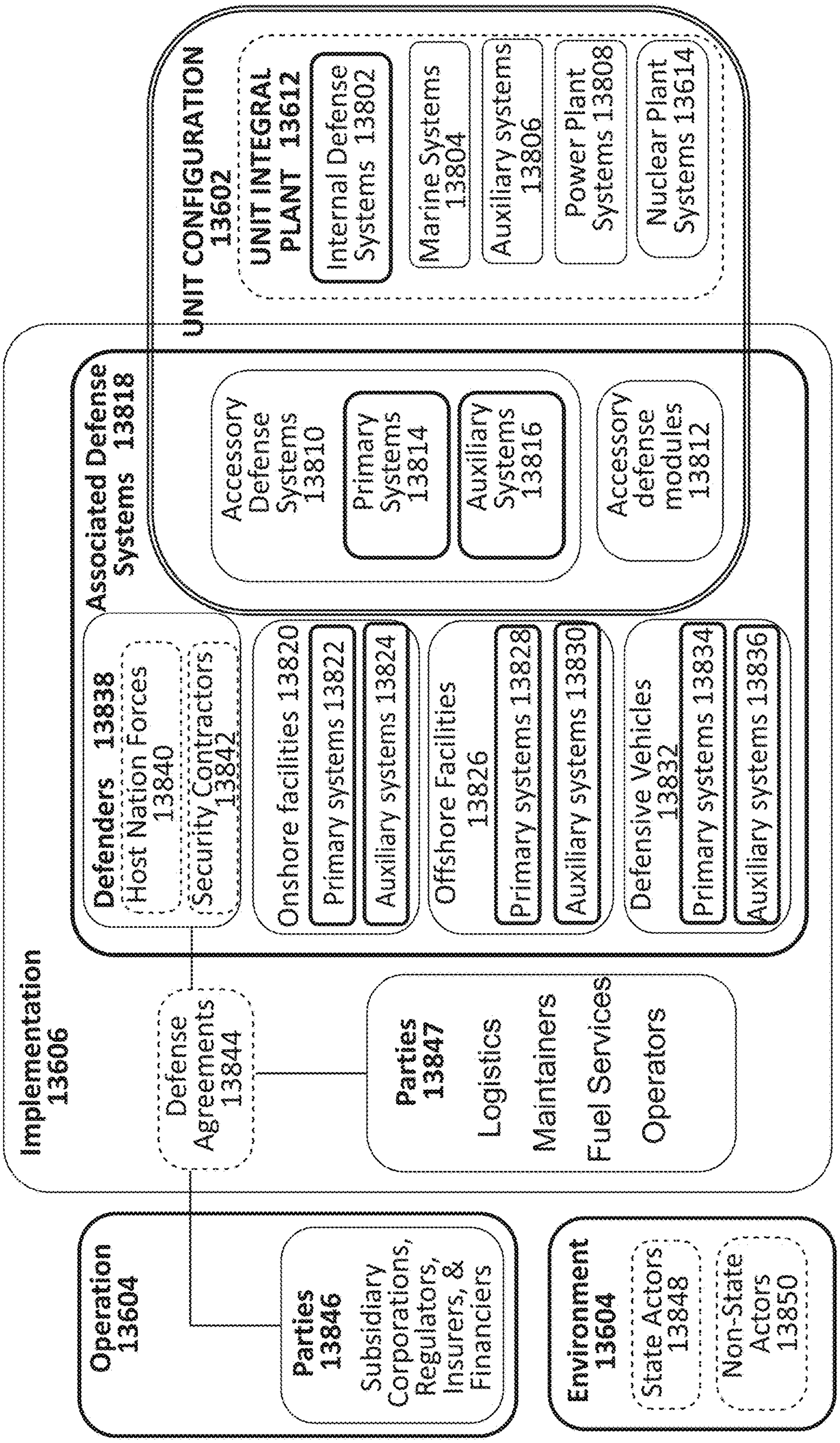
Figure 139:
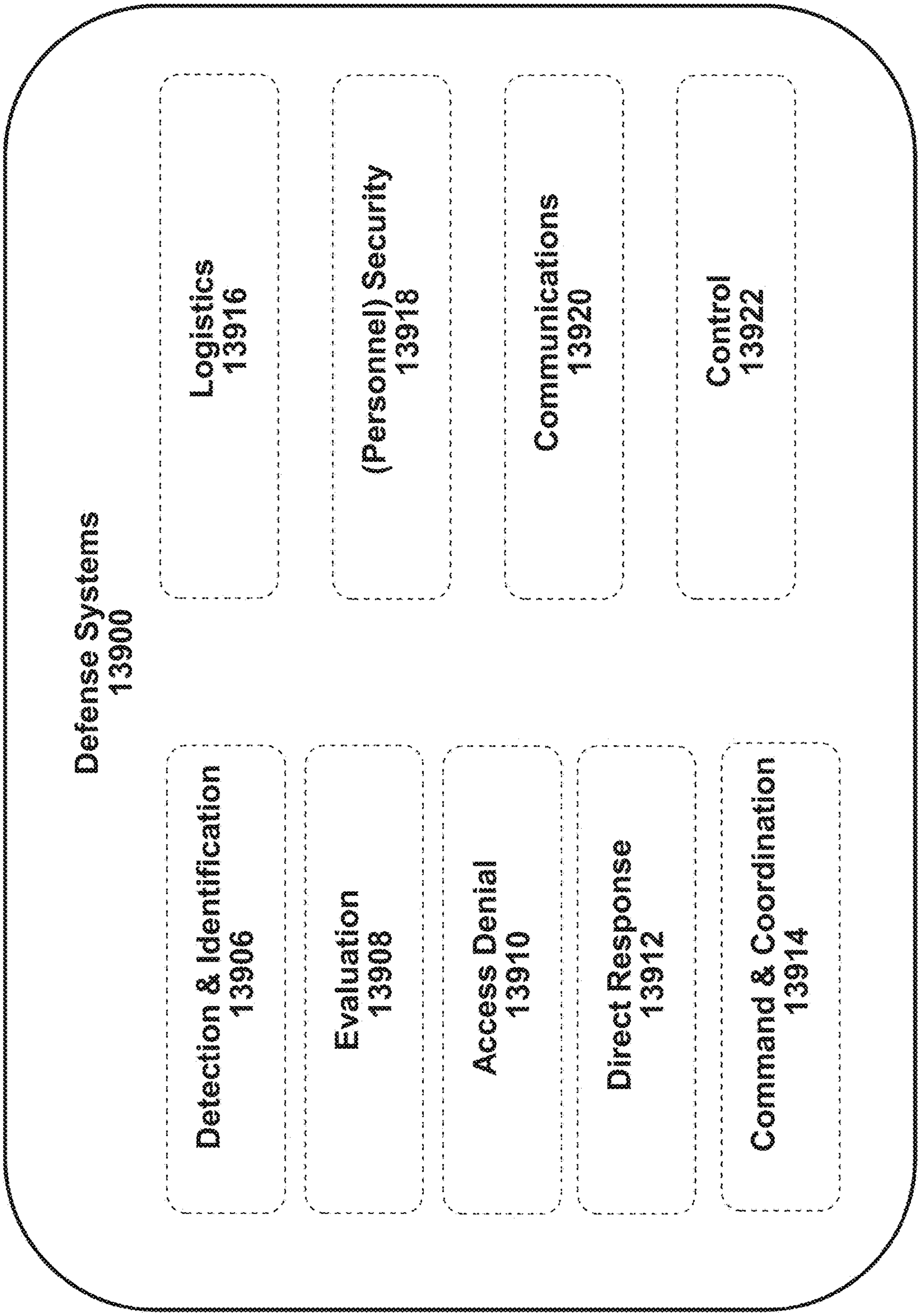
Figure 140:
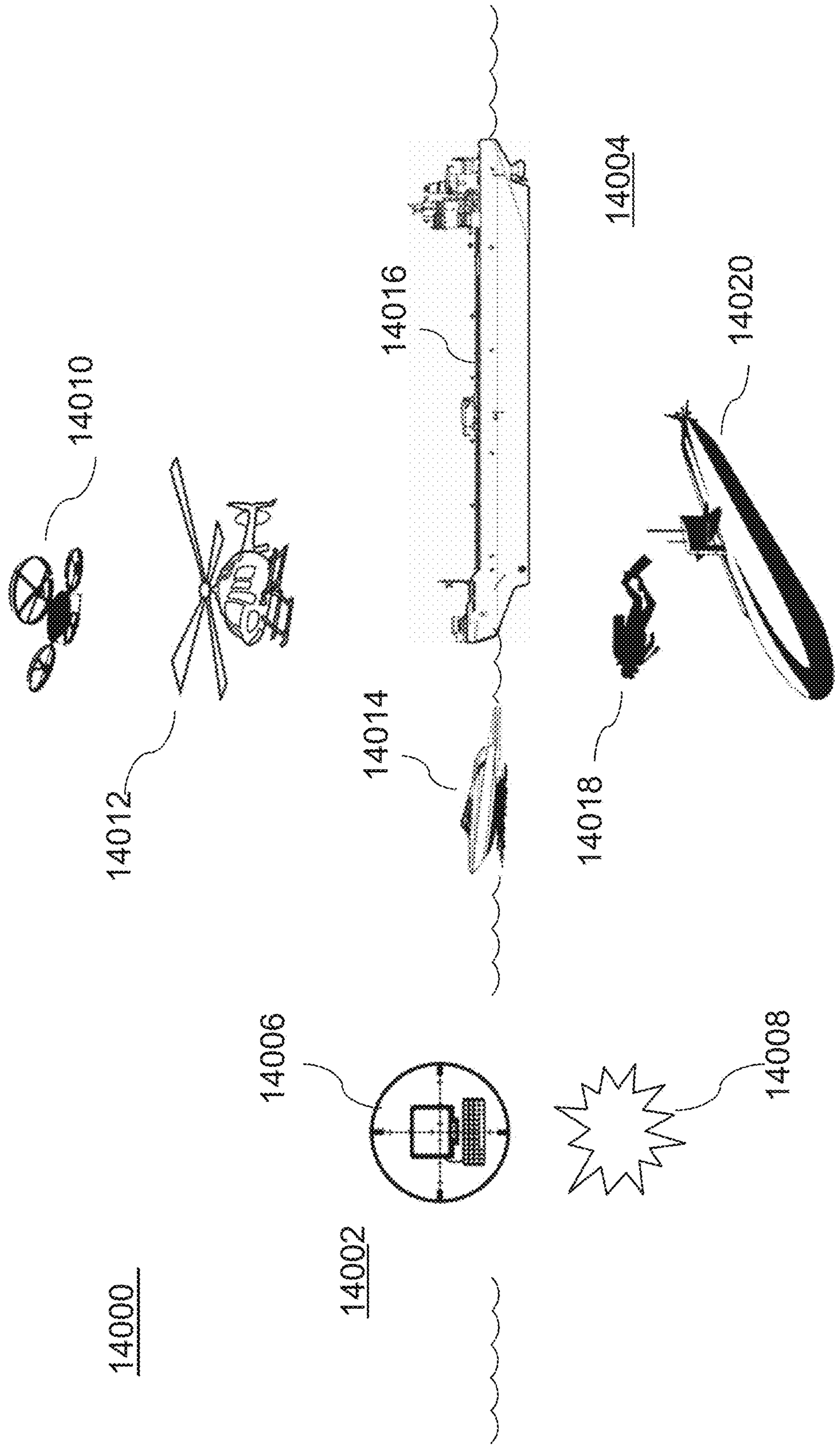
Figure 142:
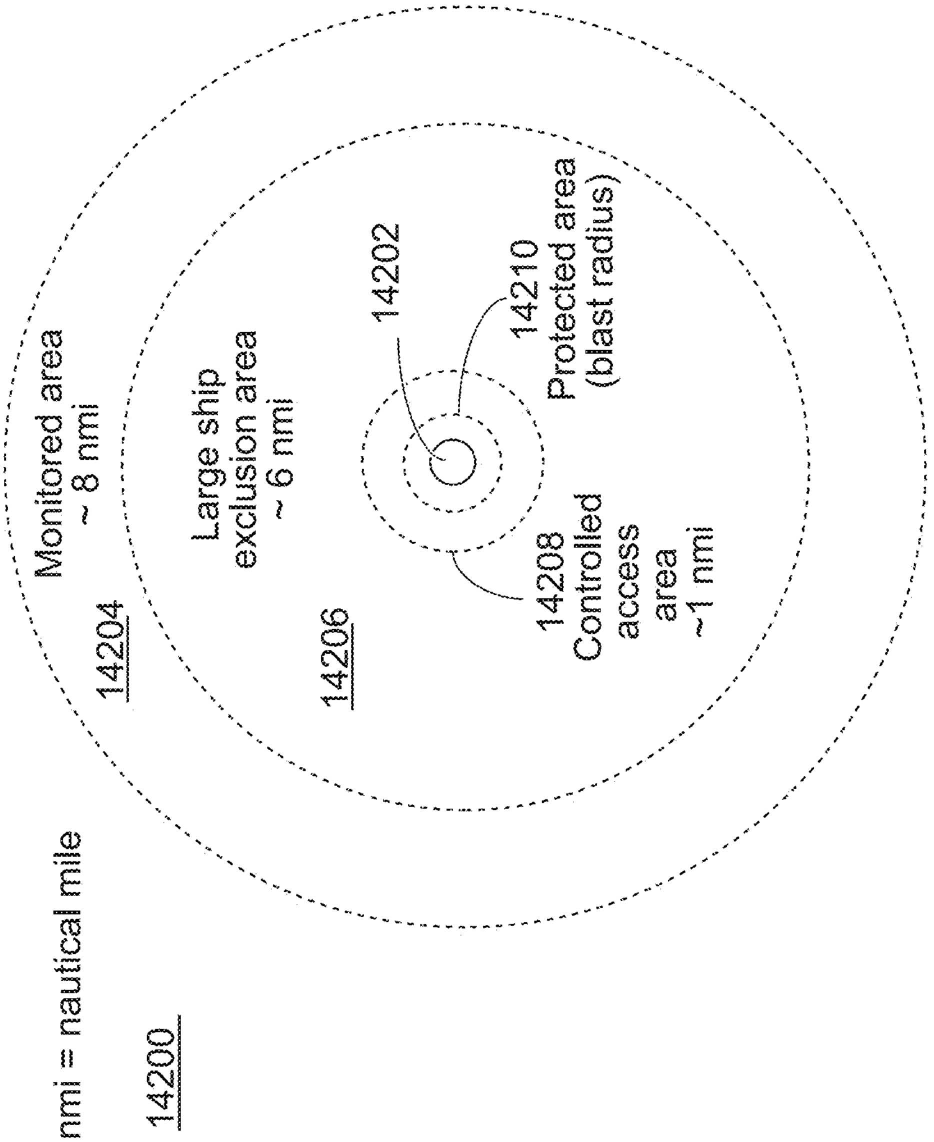
Figure 143:
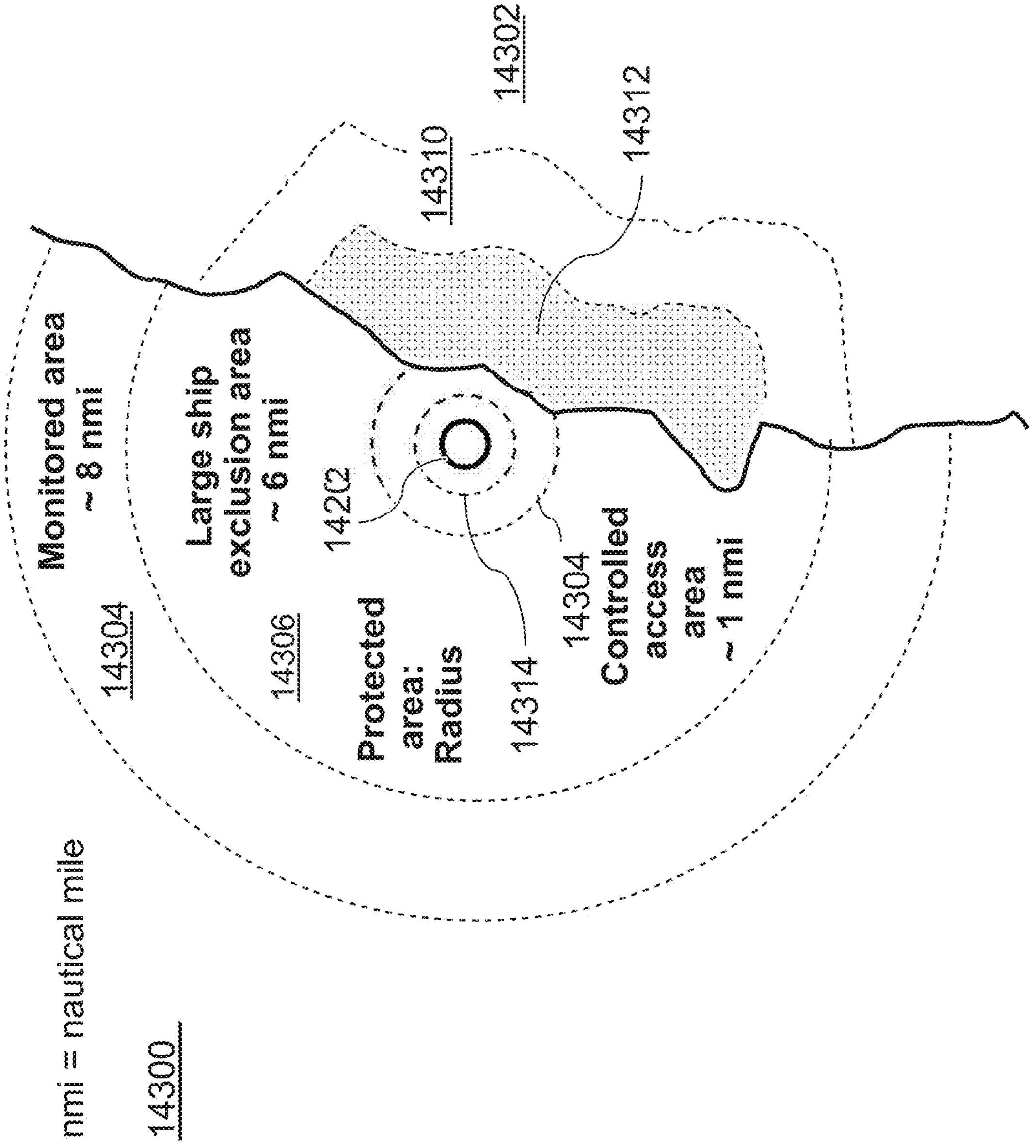
Figure 144:
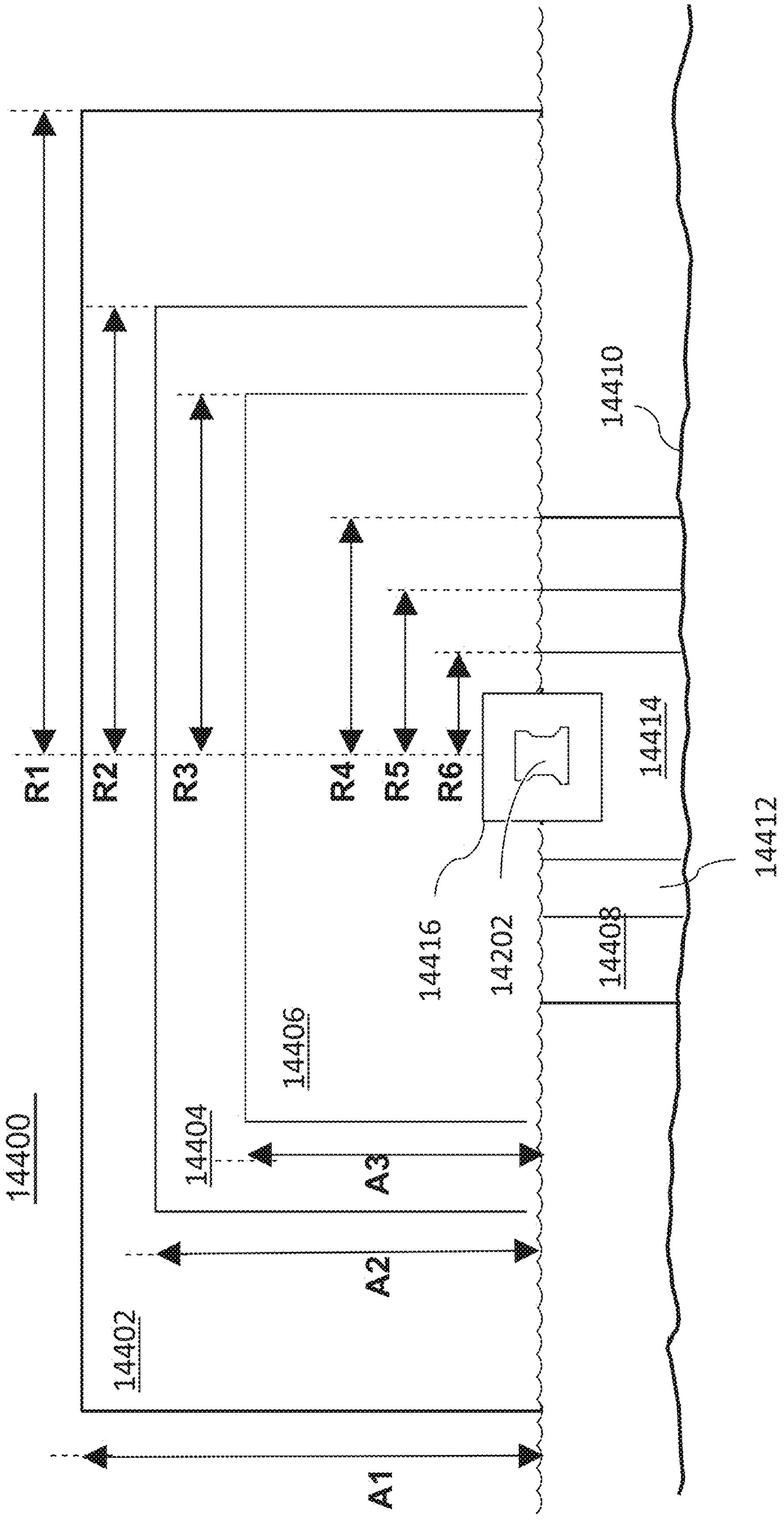
Figure 145:
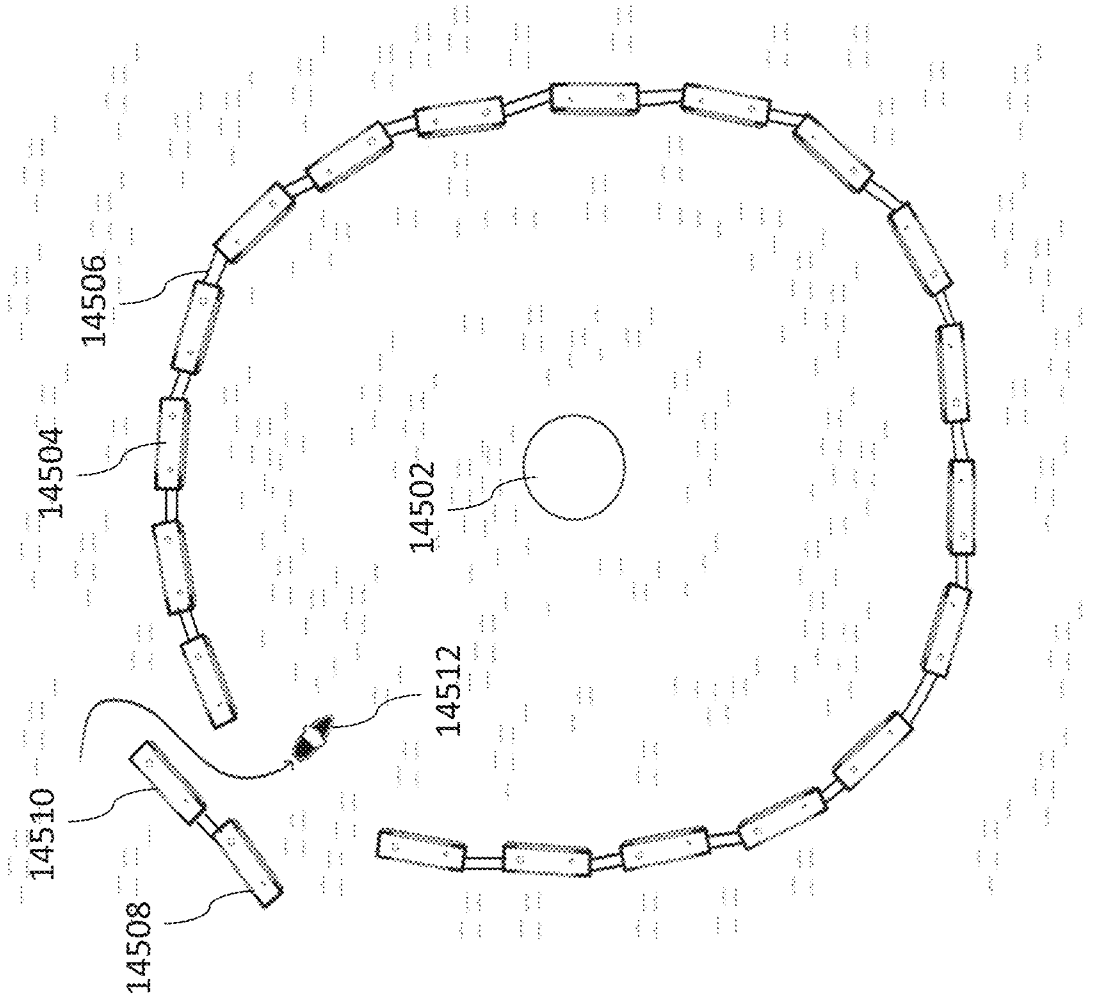
Figure 146:
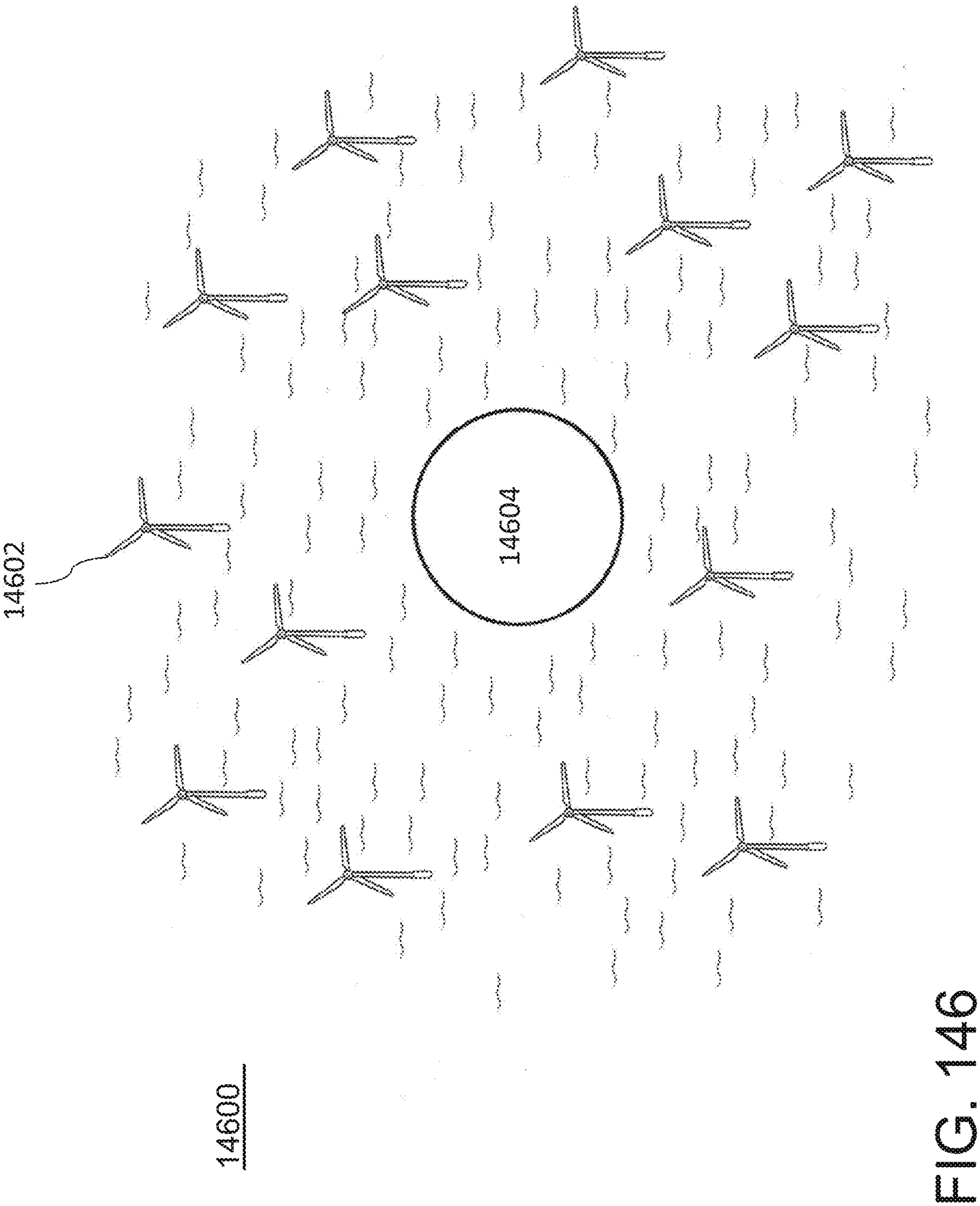
Figure 147:
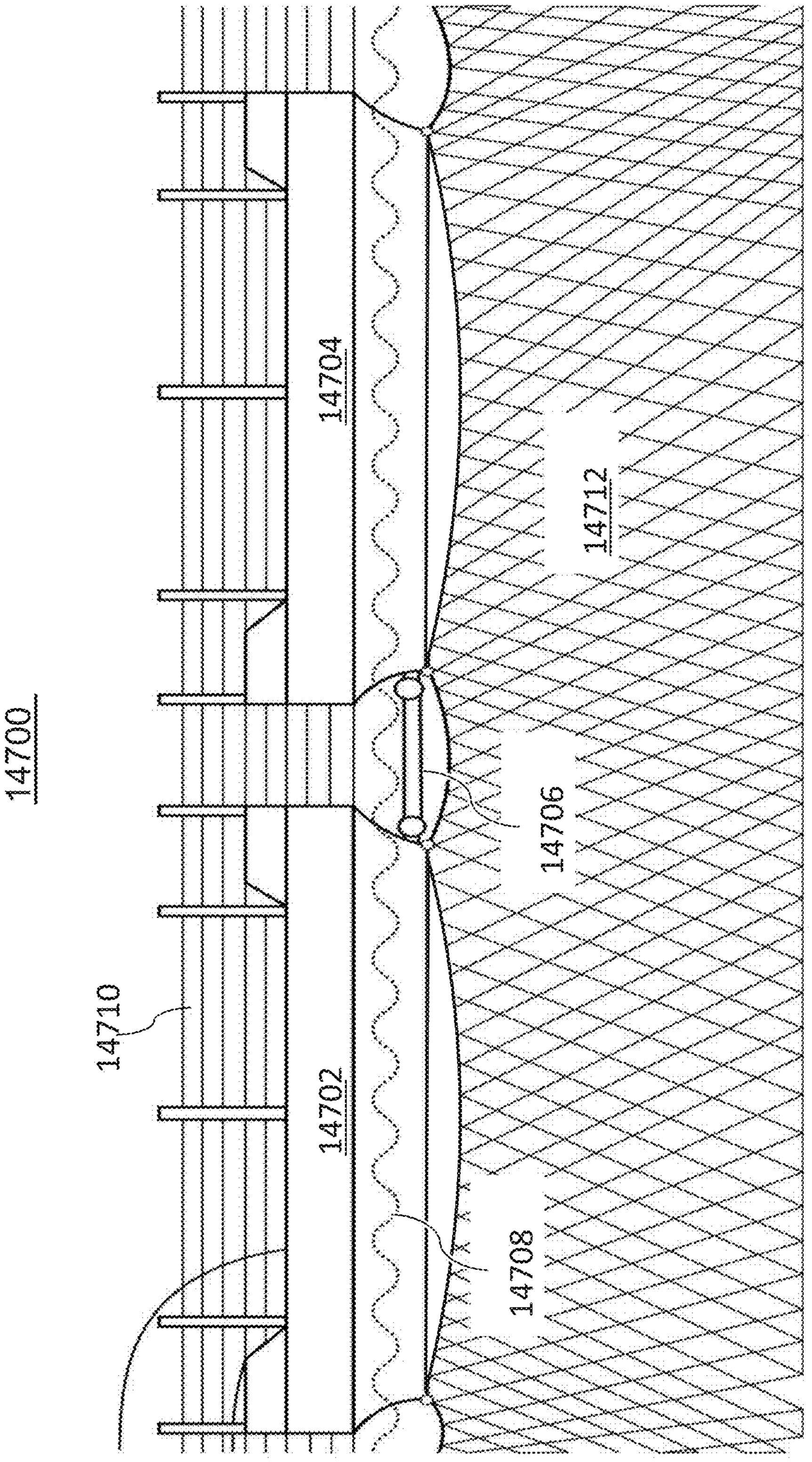
Figure 148:
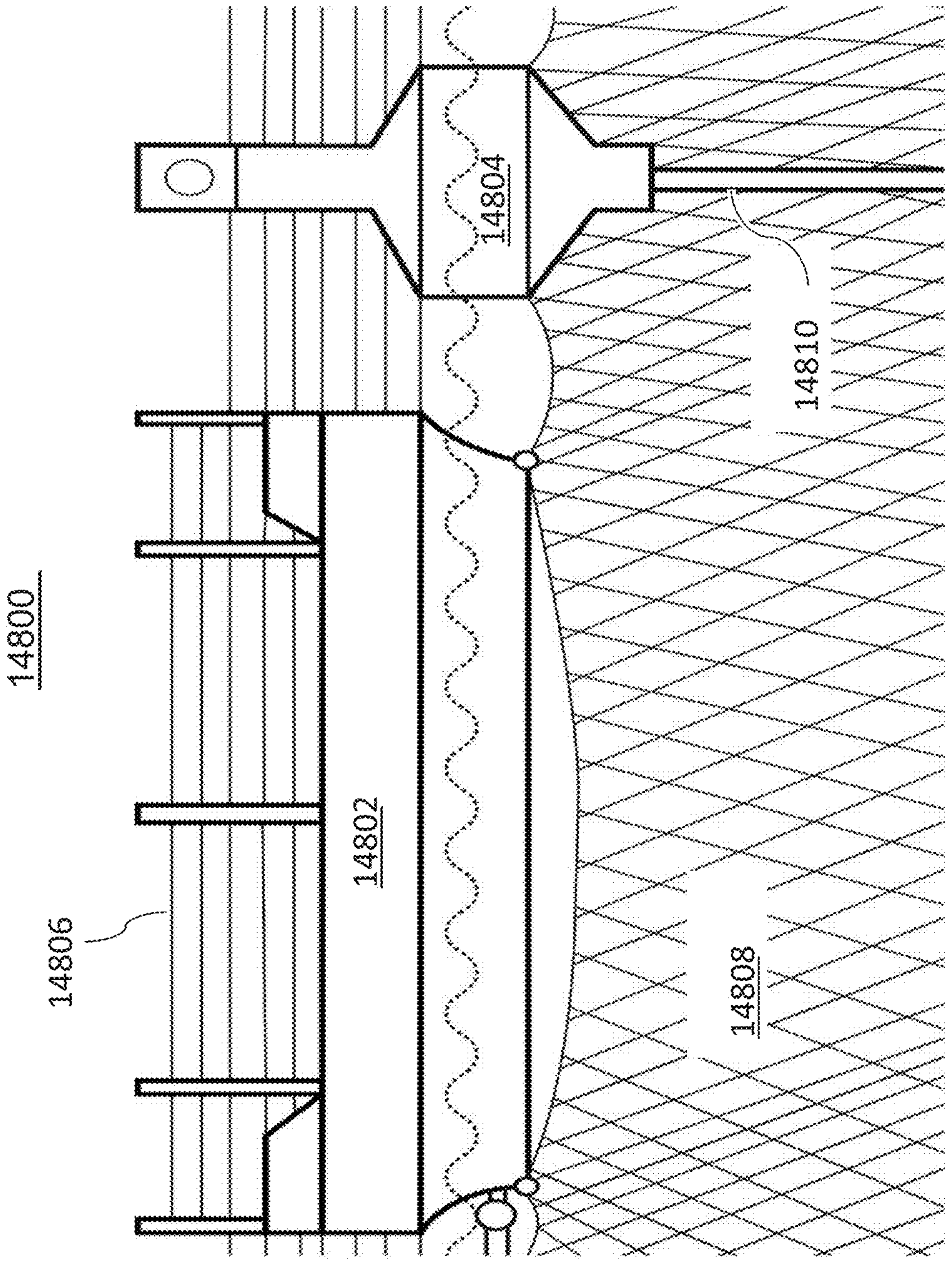
Figure 149:
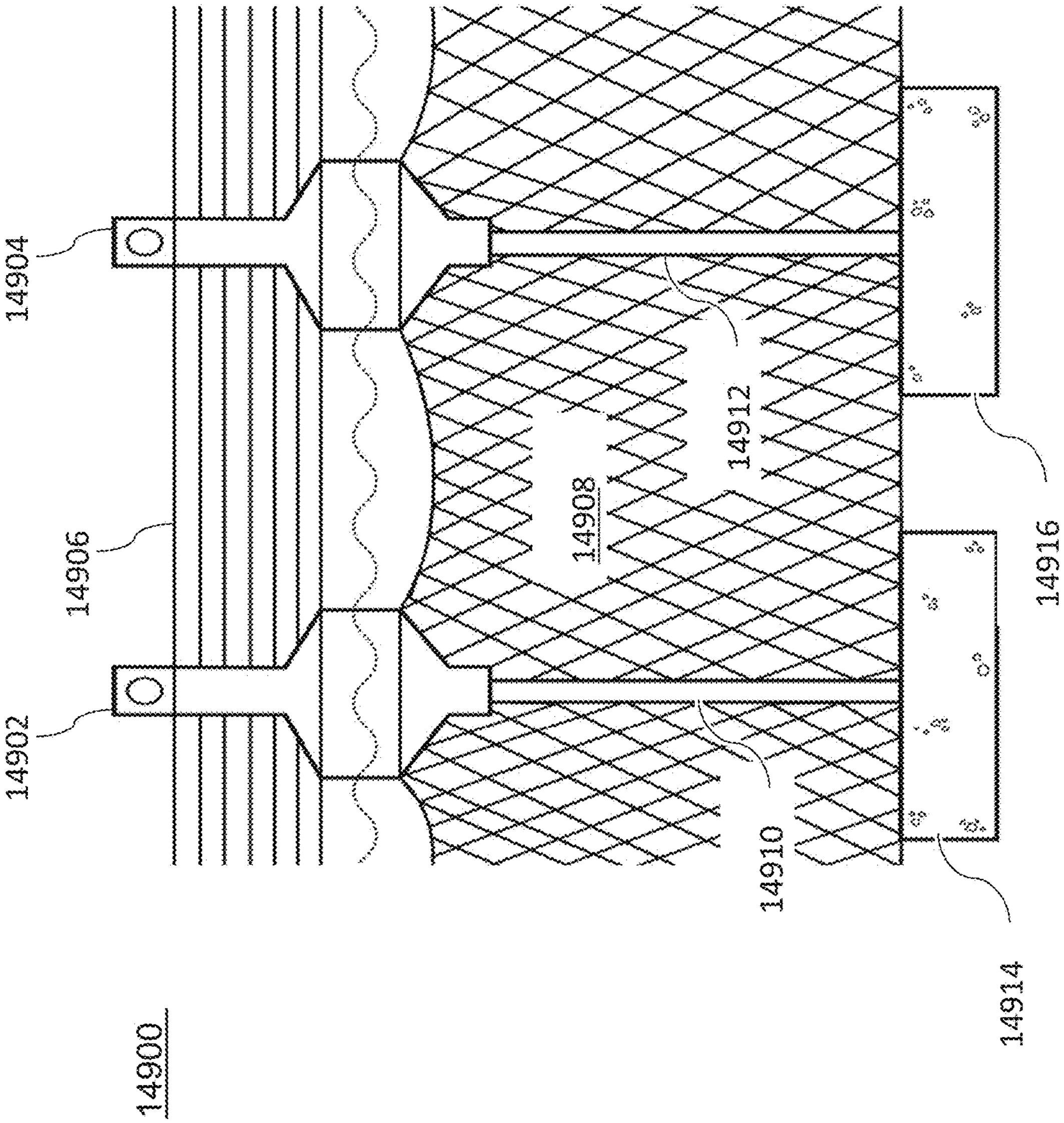
Figure 150:
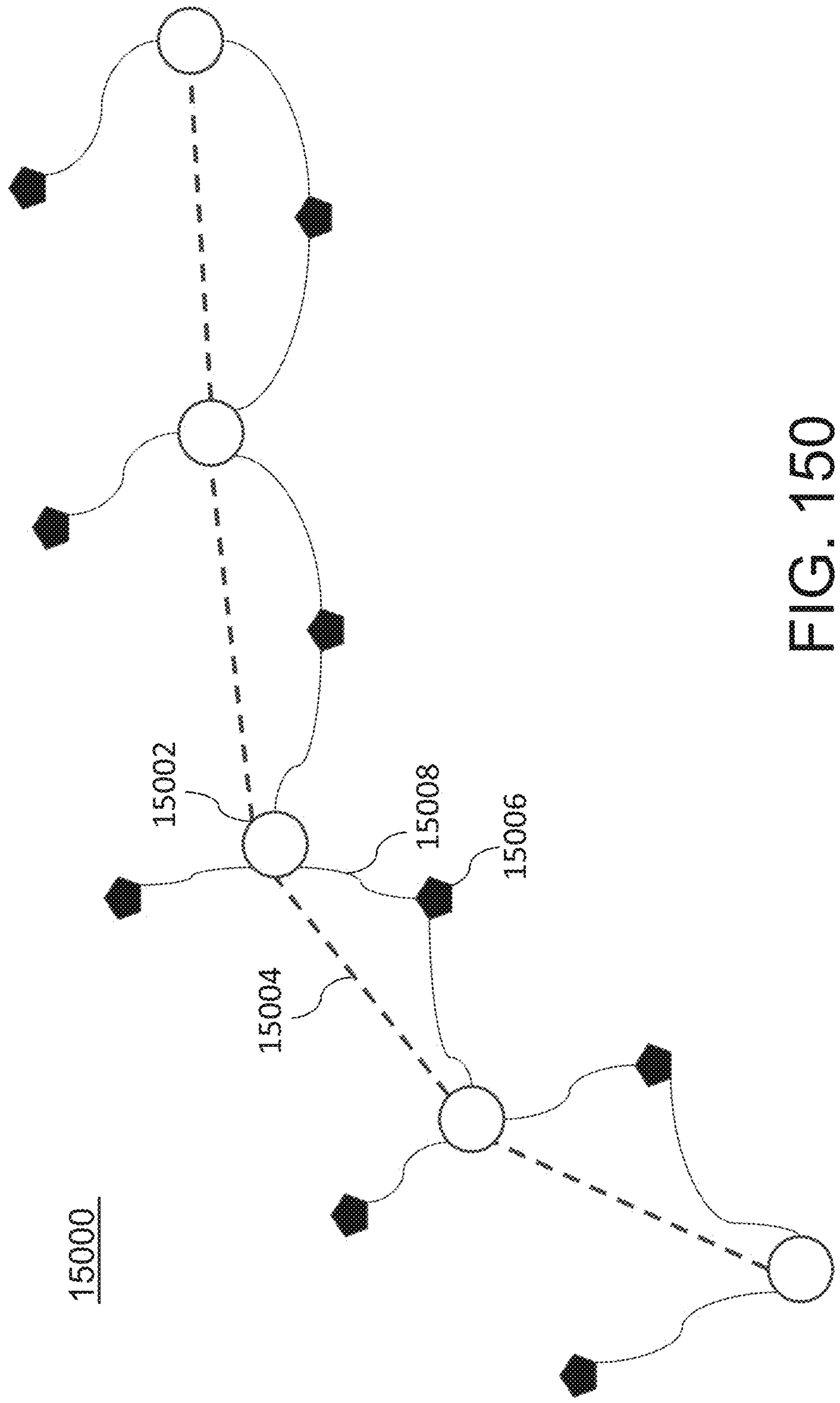
Figure 151:
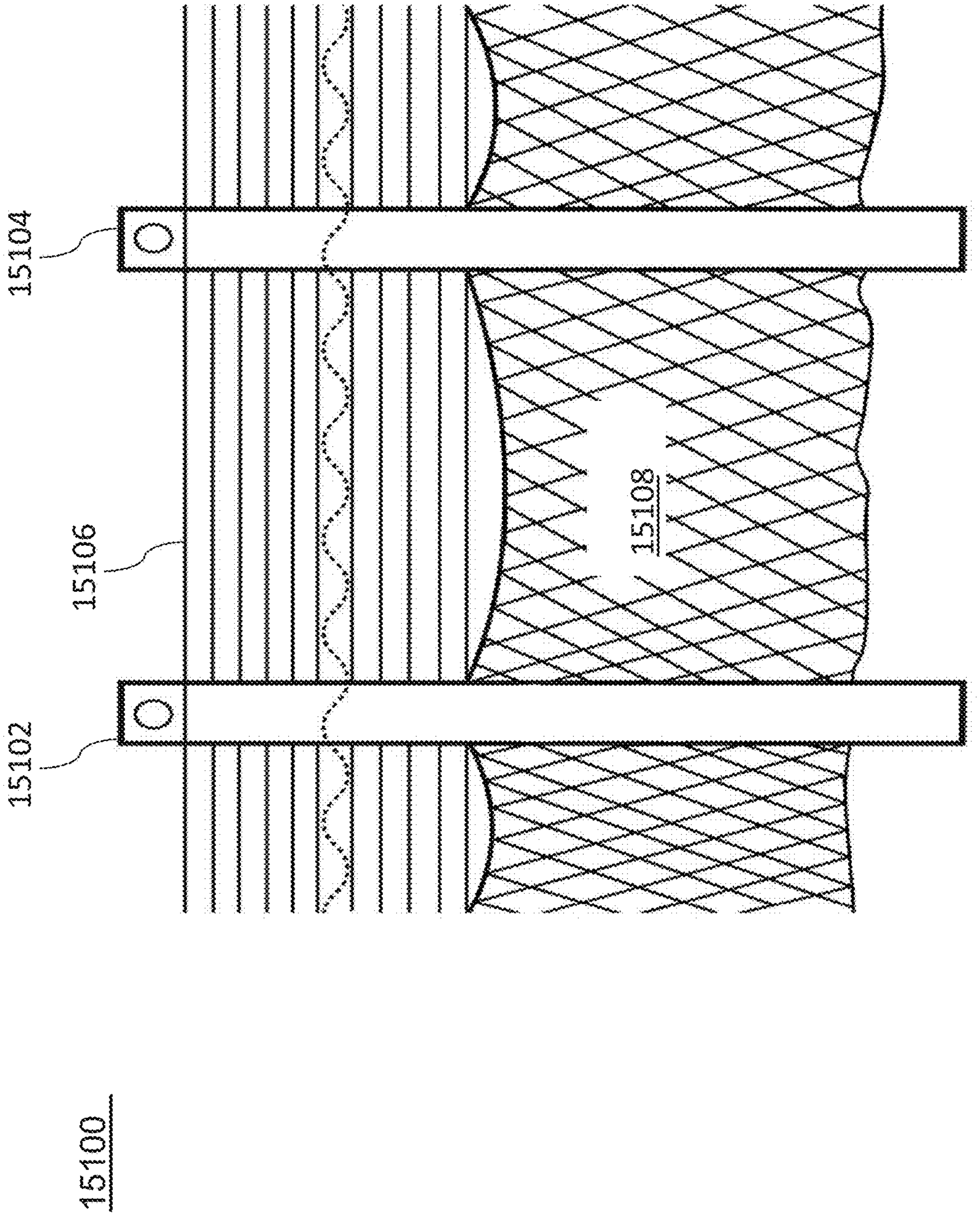
Figure 152:
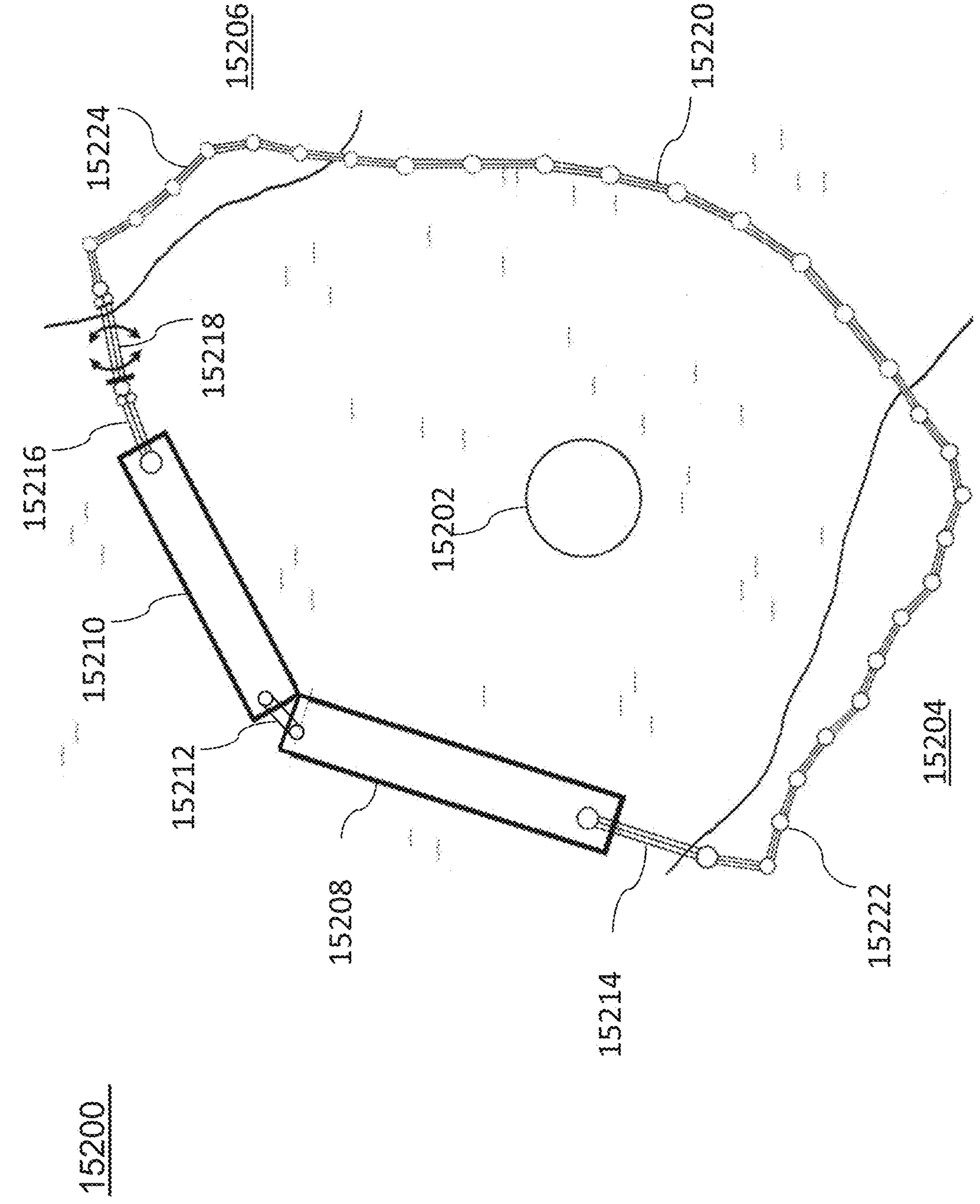
Figure 153:
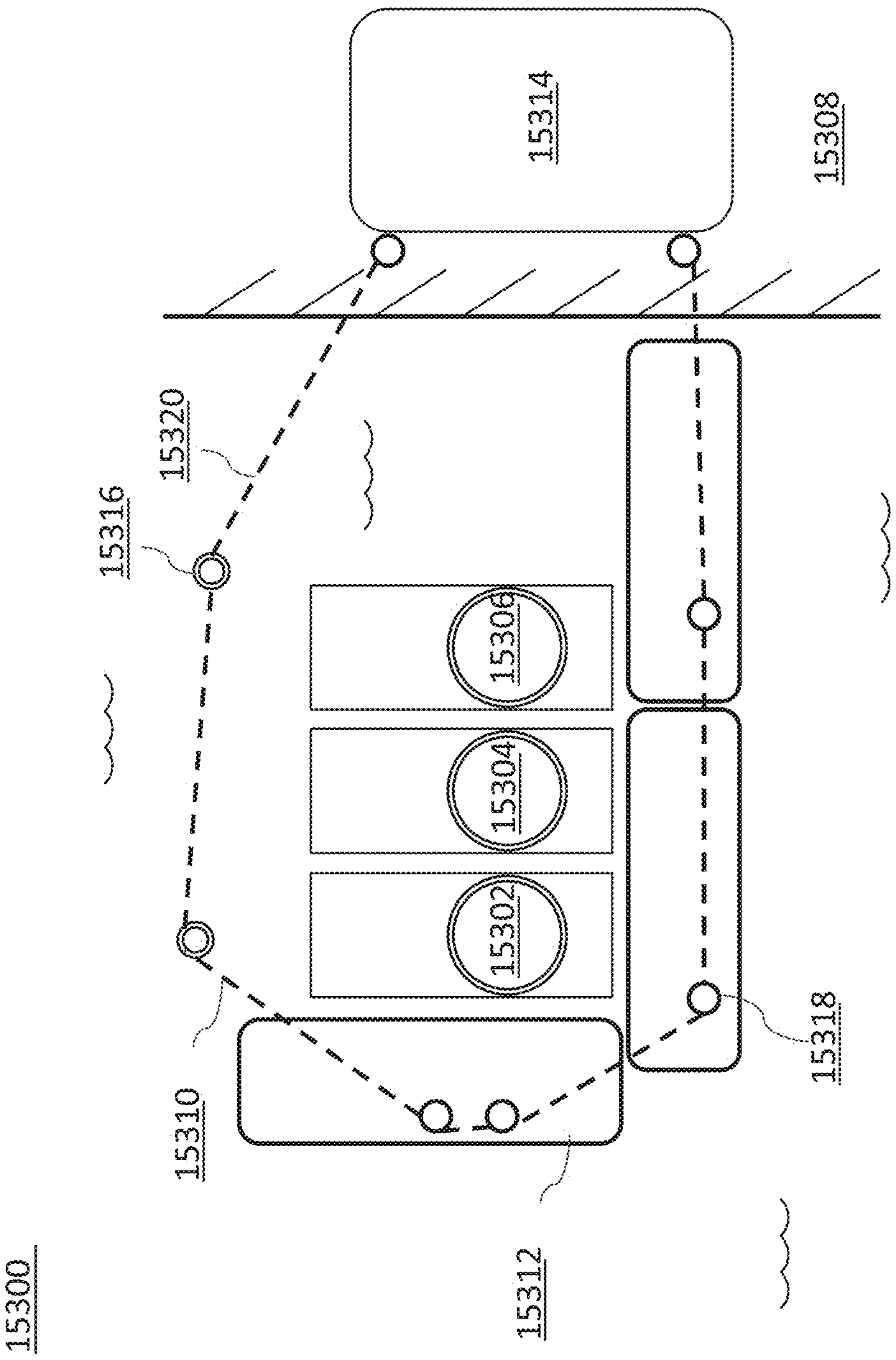
Figure 154:
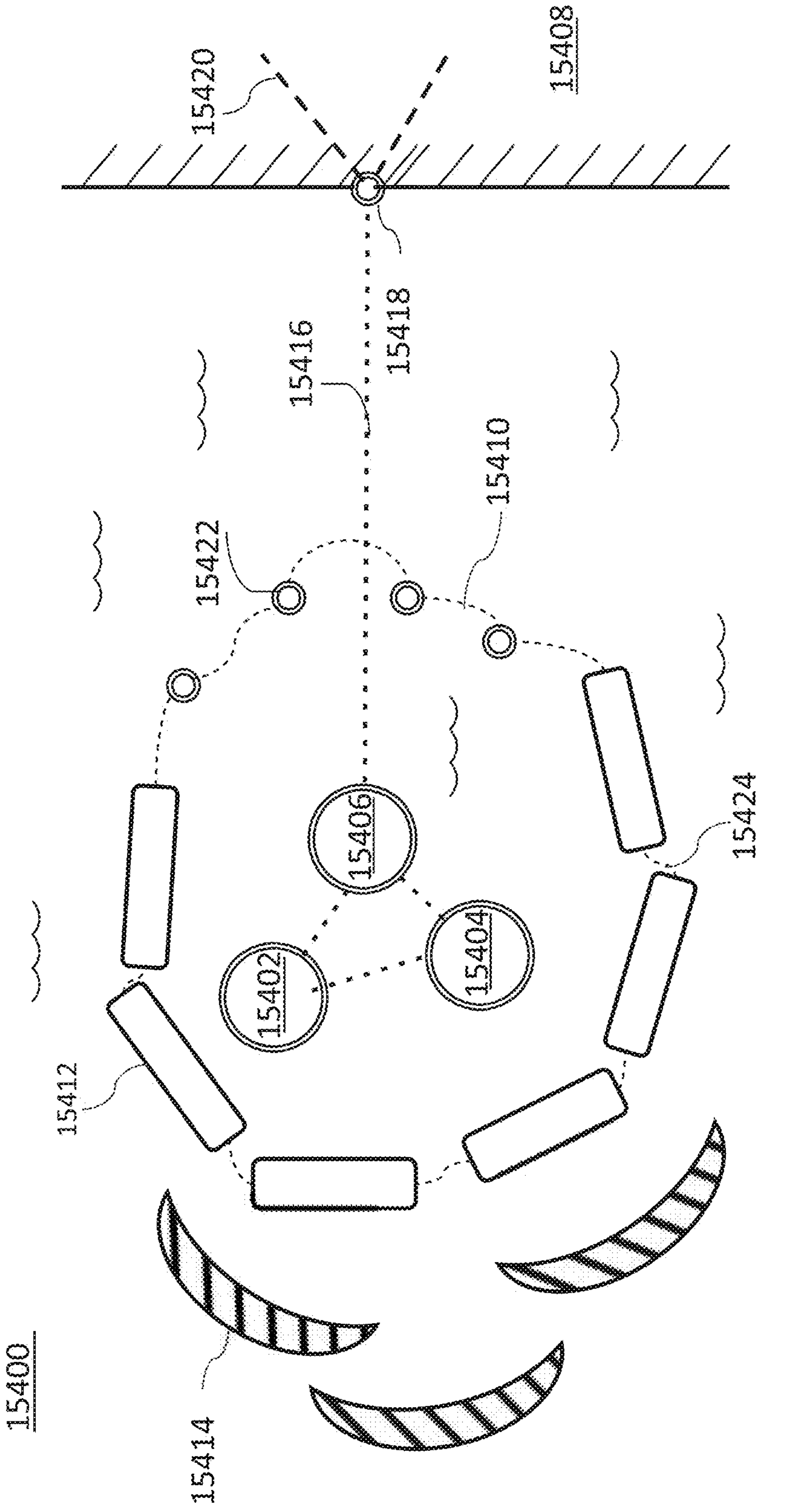
Figure 155:
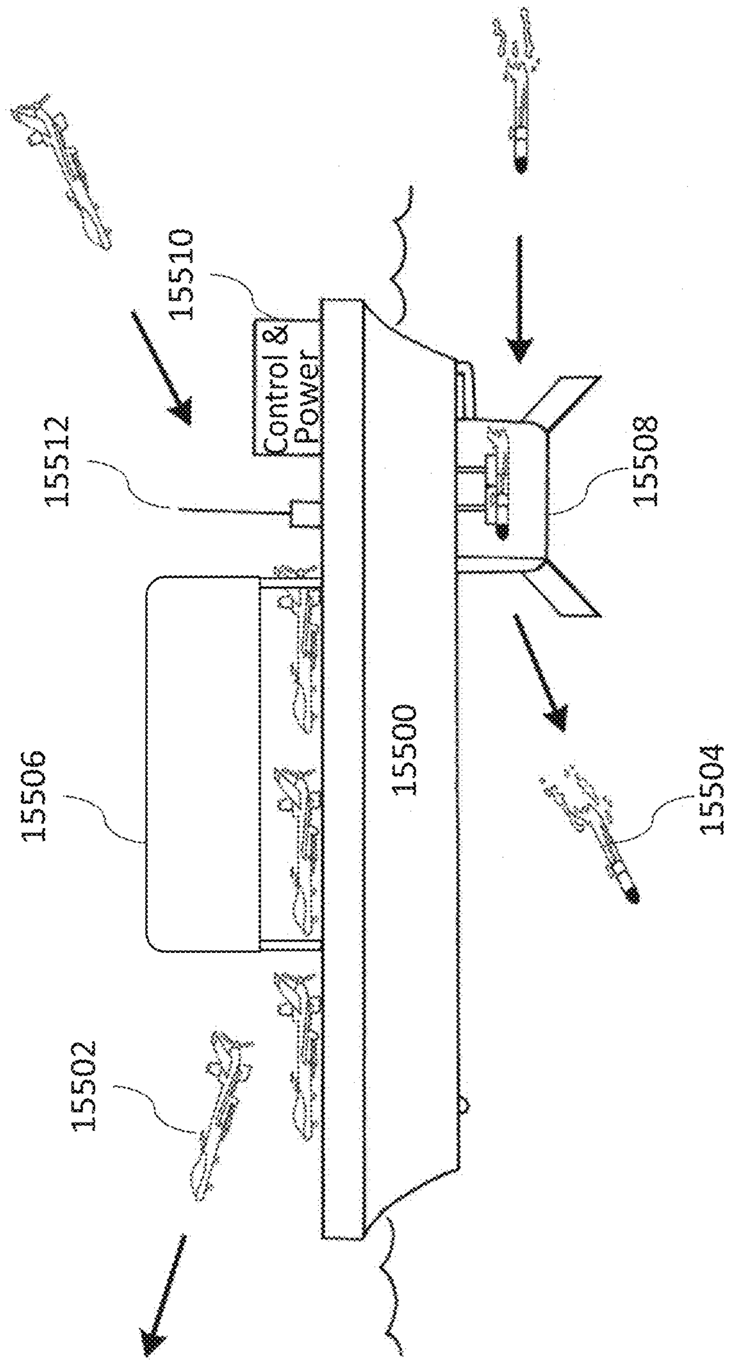
Figure 156:
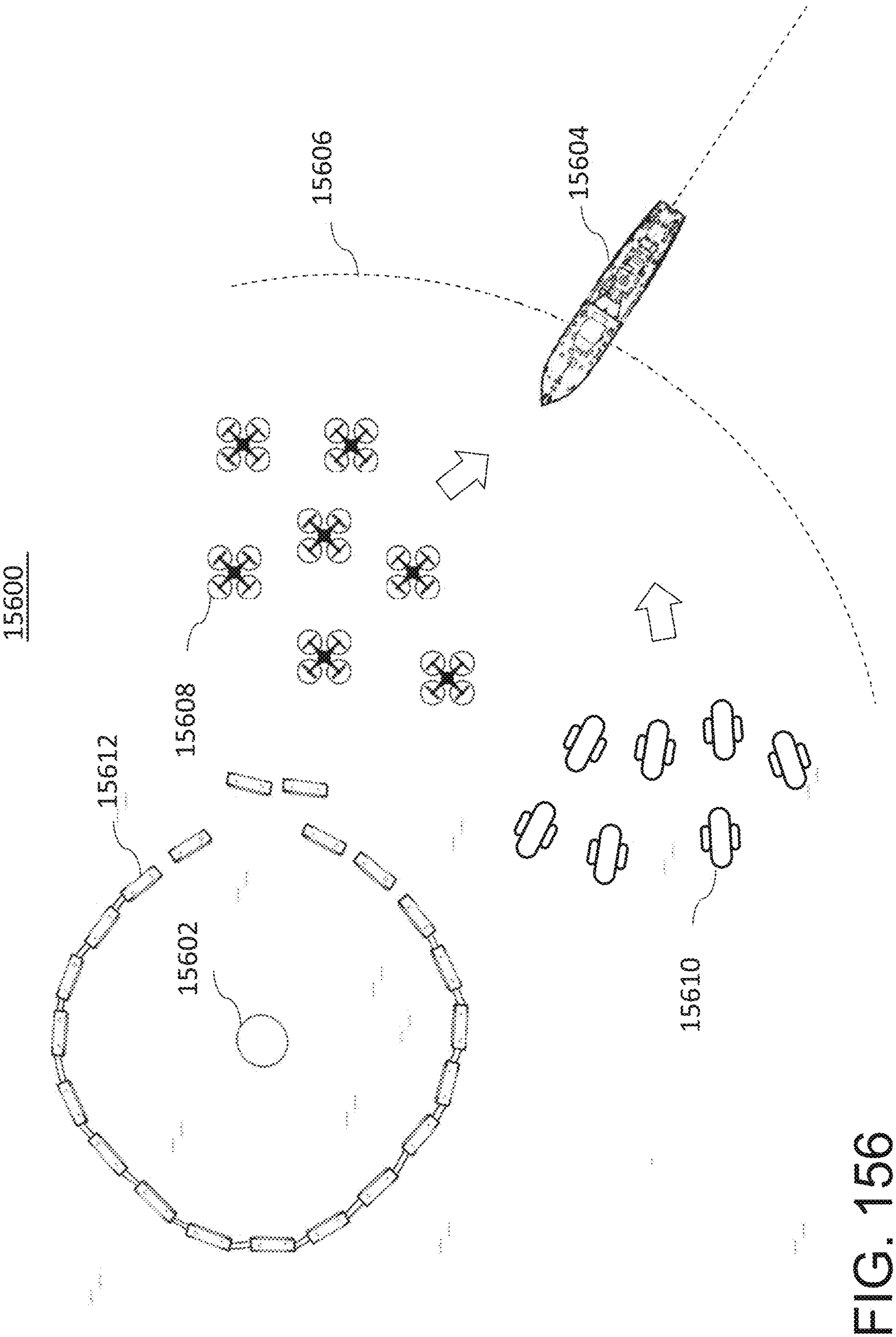
Figure 157:
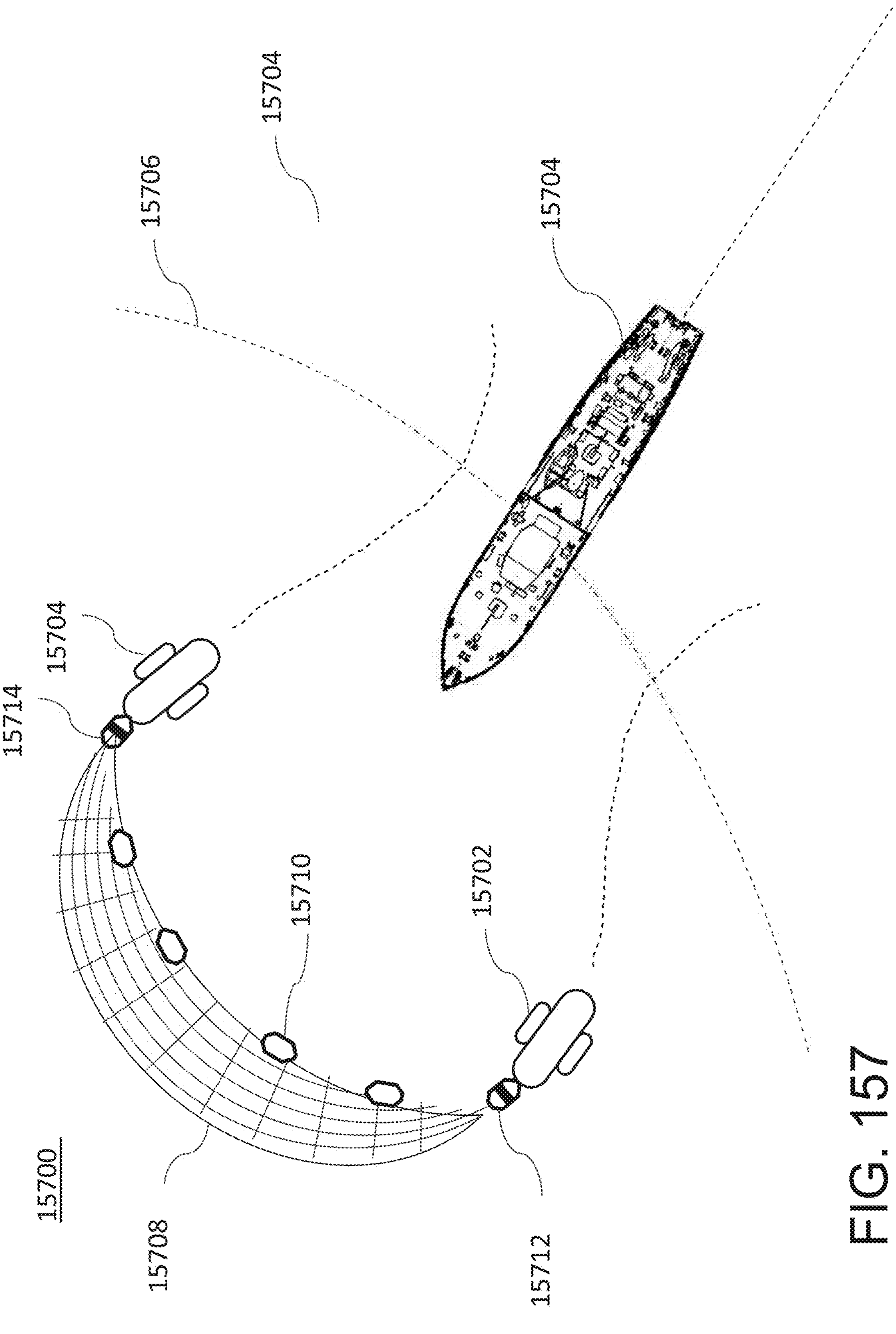
Figure 158:
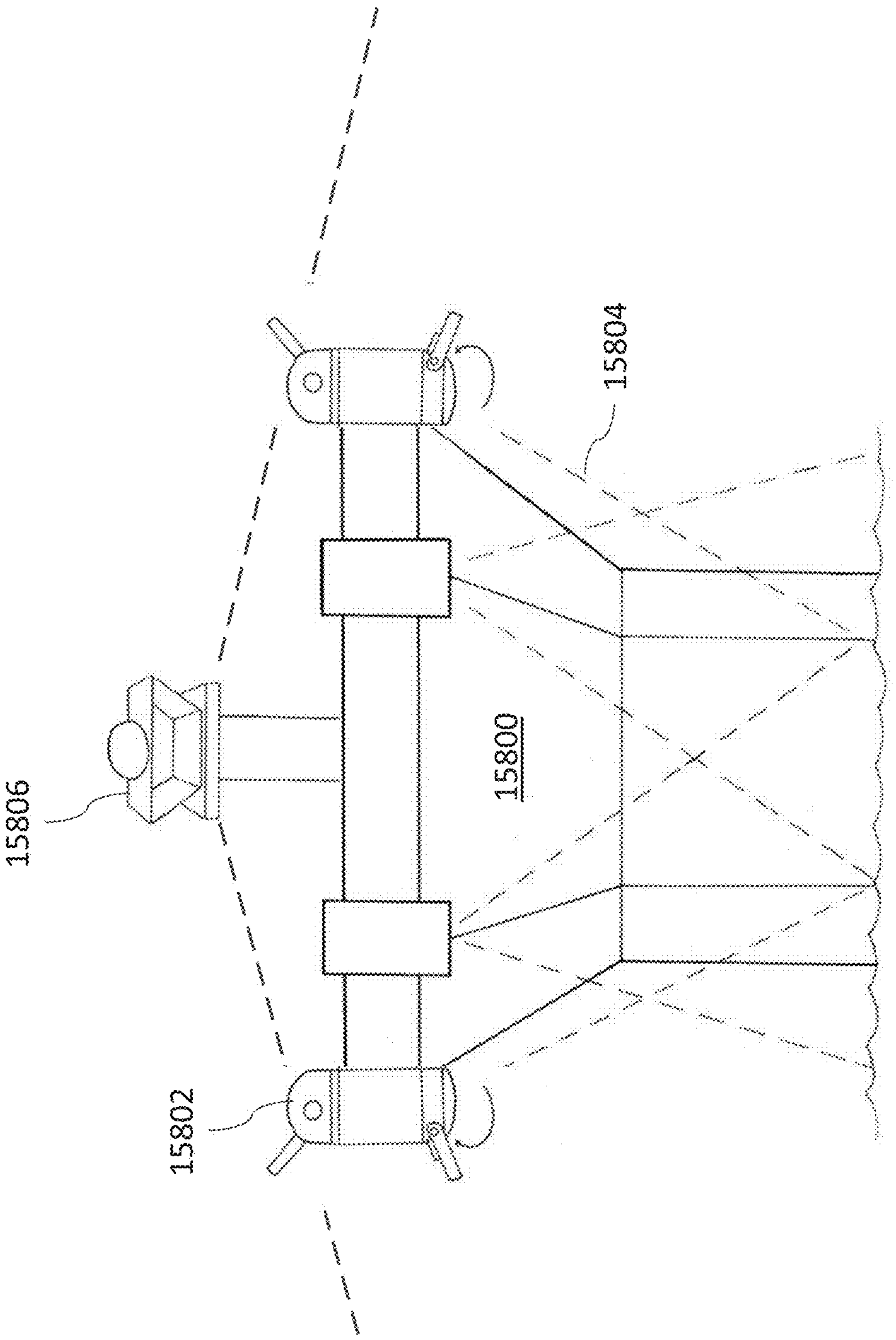
Figure 159:
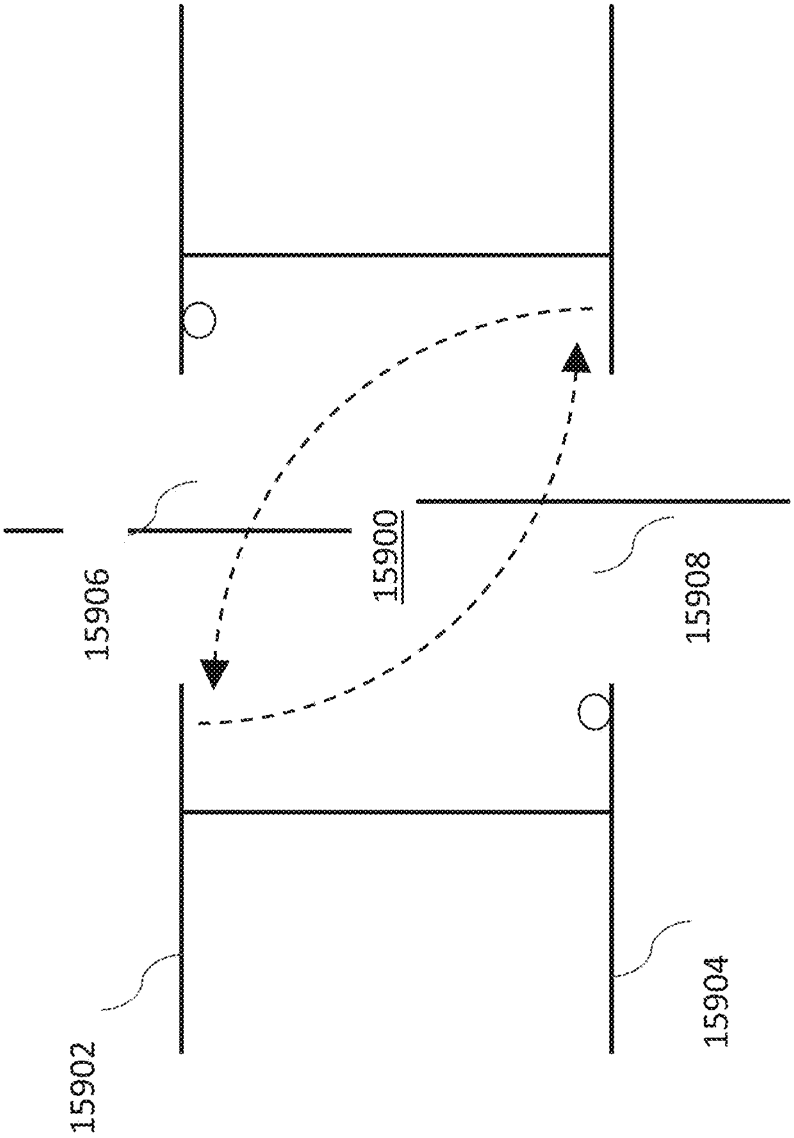
Figure 160:
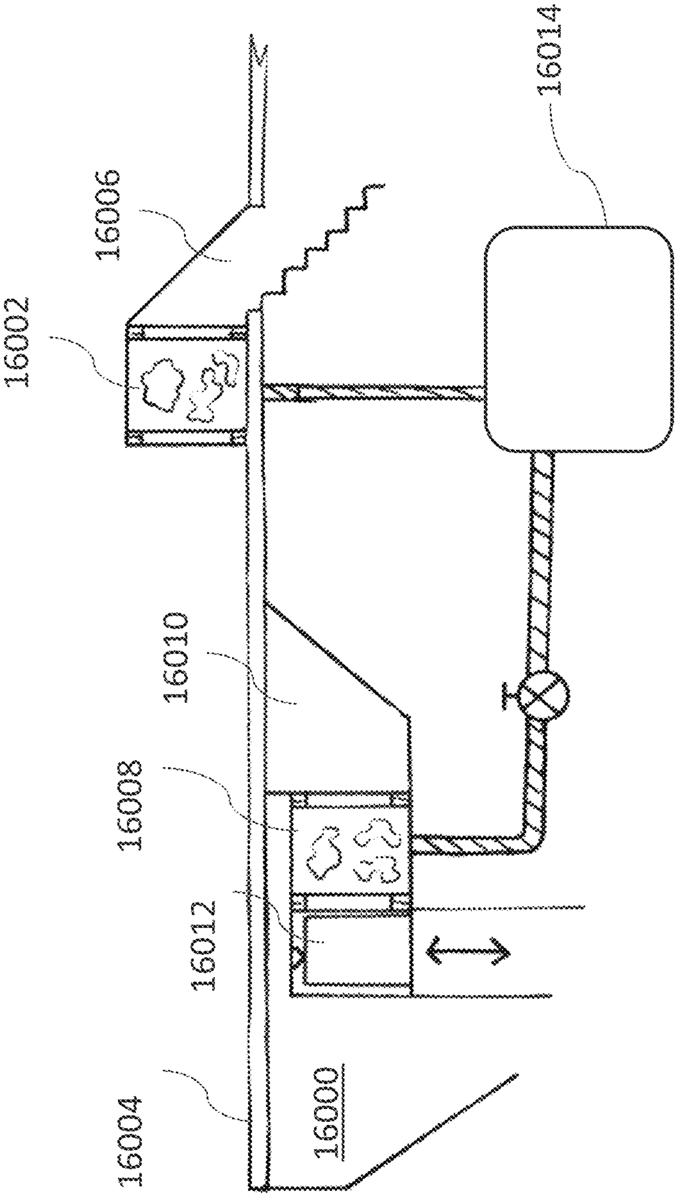
Figure 161:
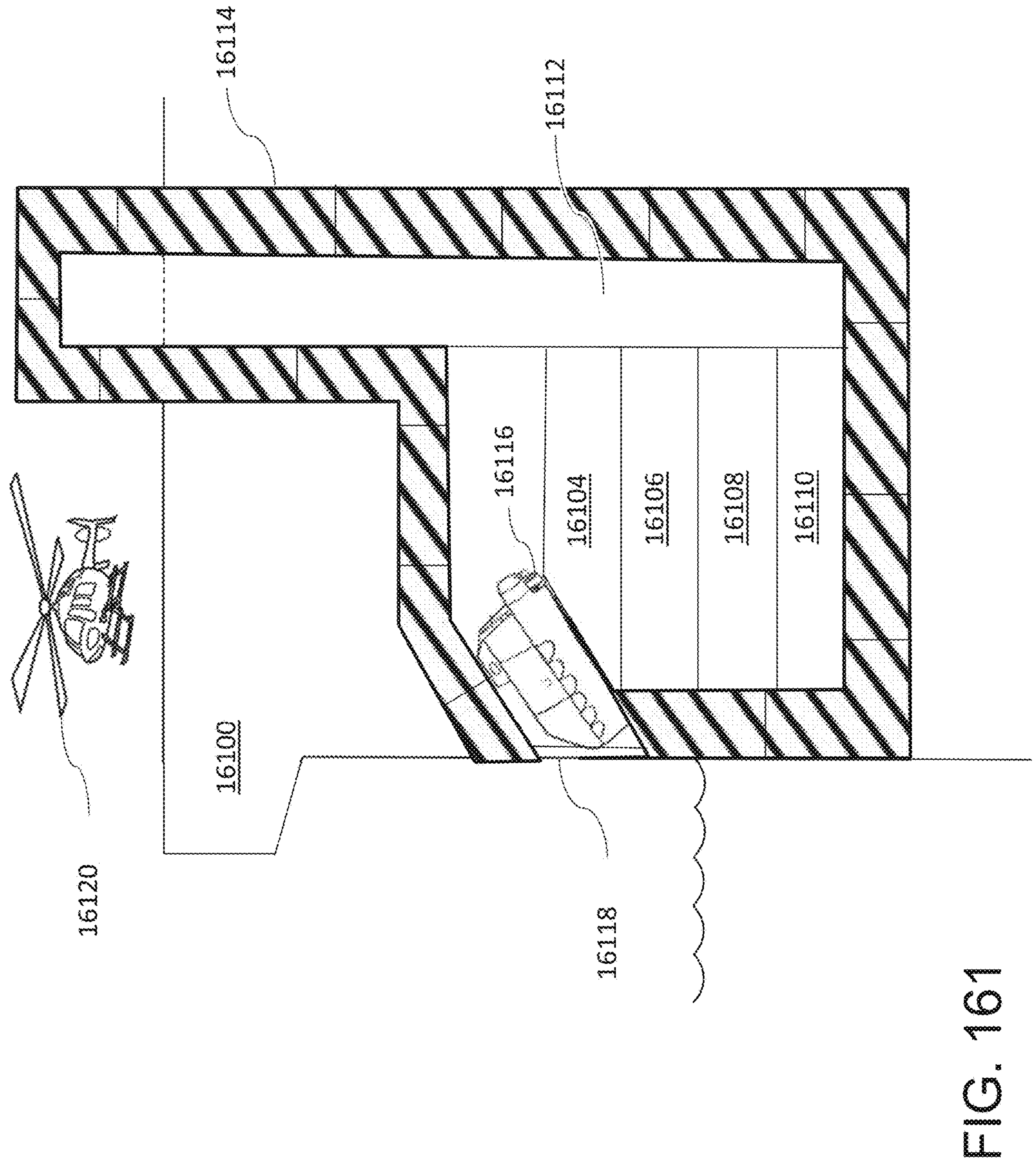
Figure 162:
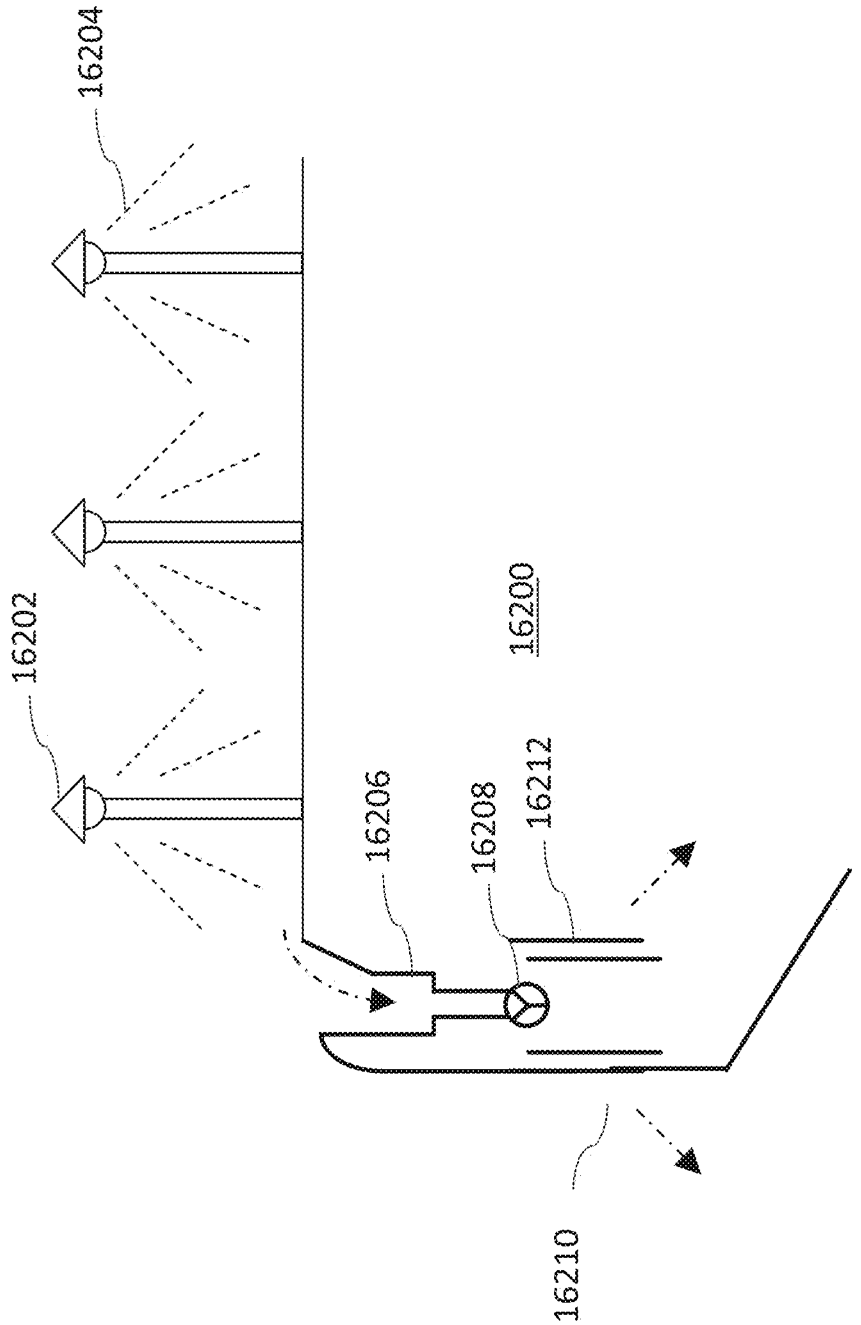
Figure 163A:
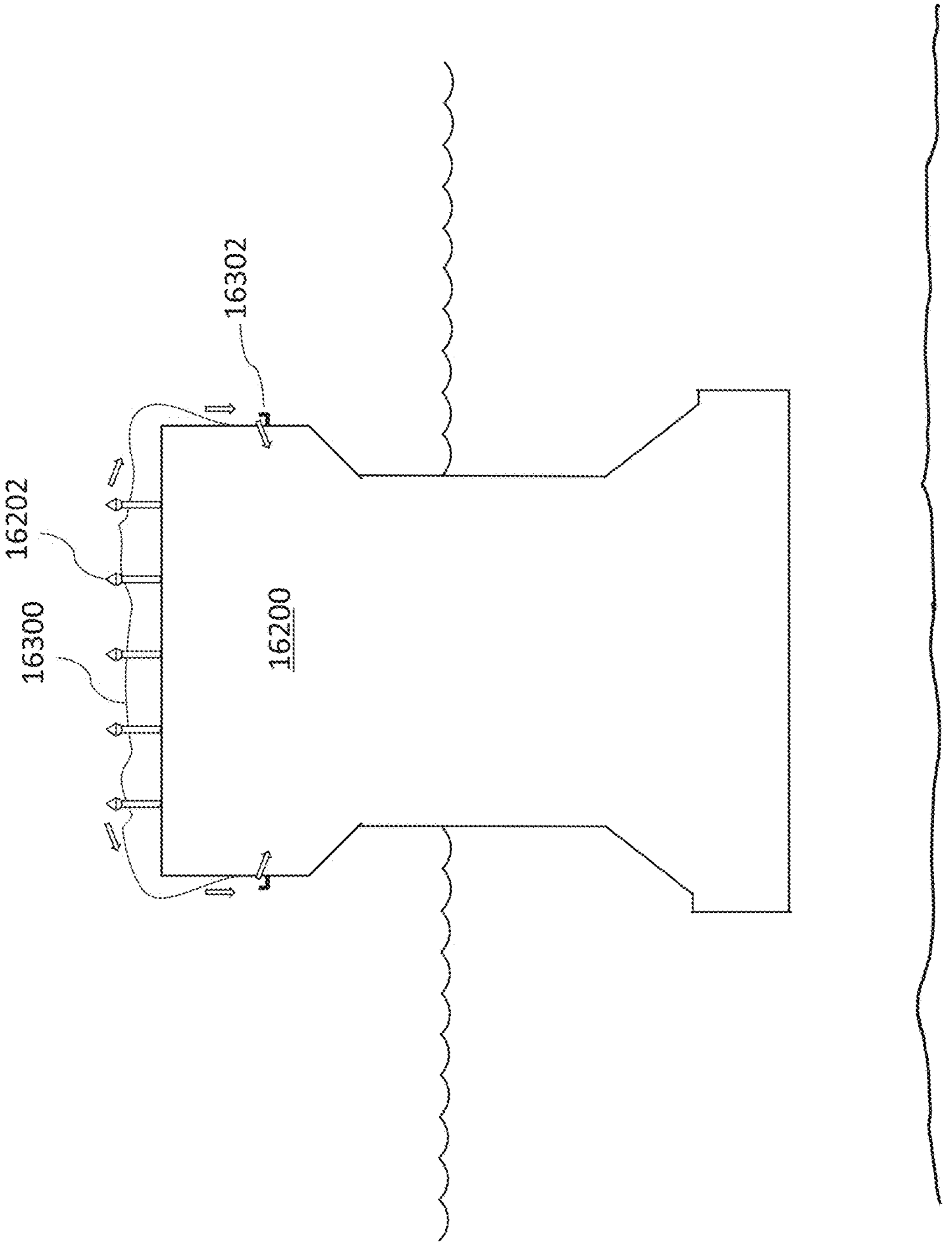
Figure 163B:
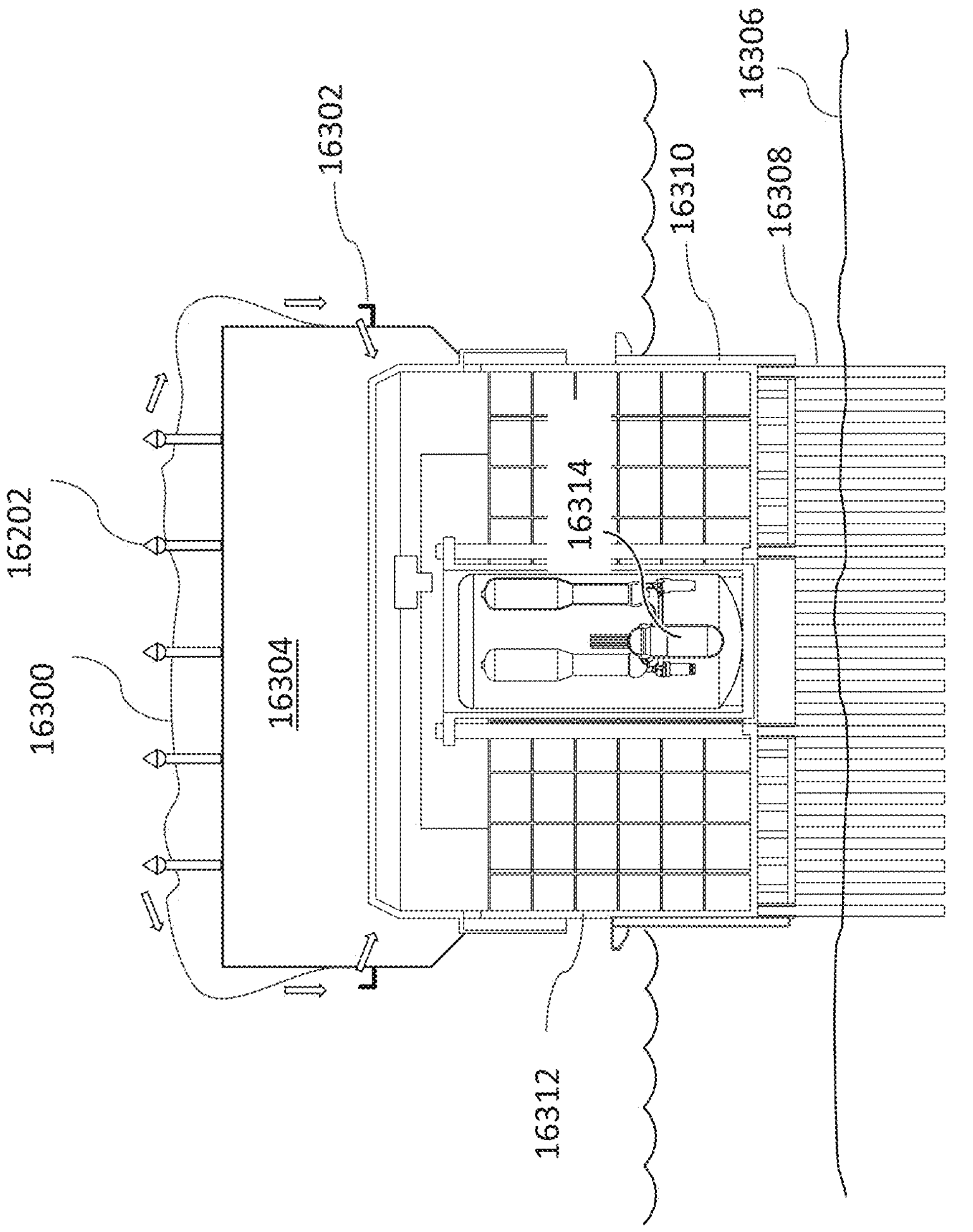
Figure 164:
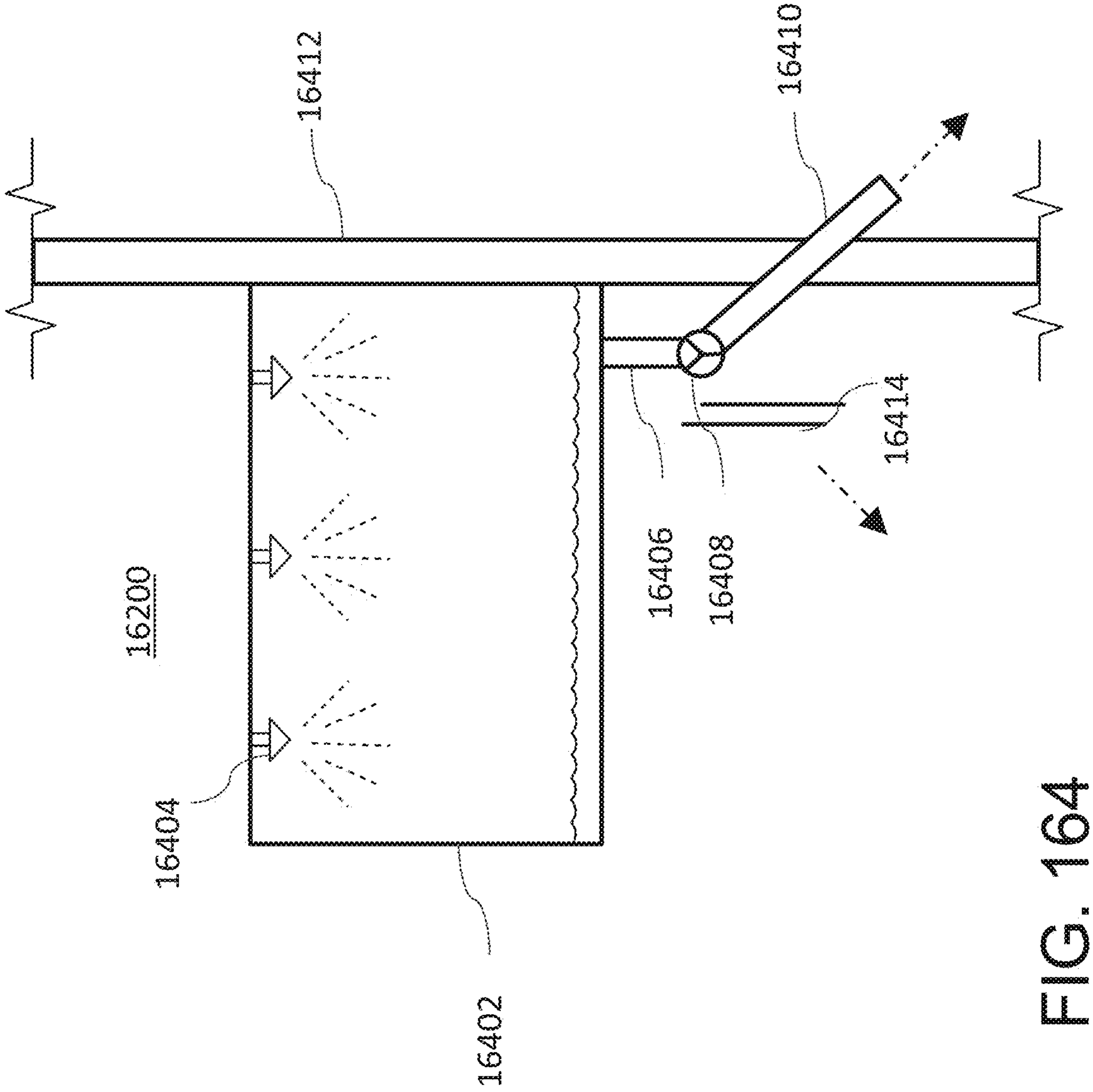
Figure 165:
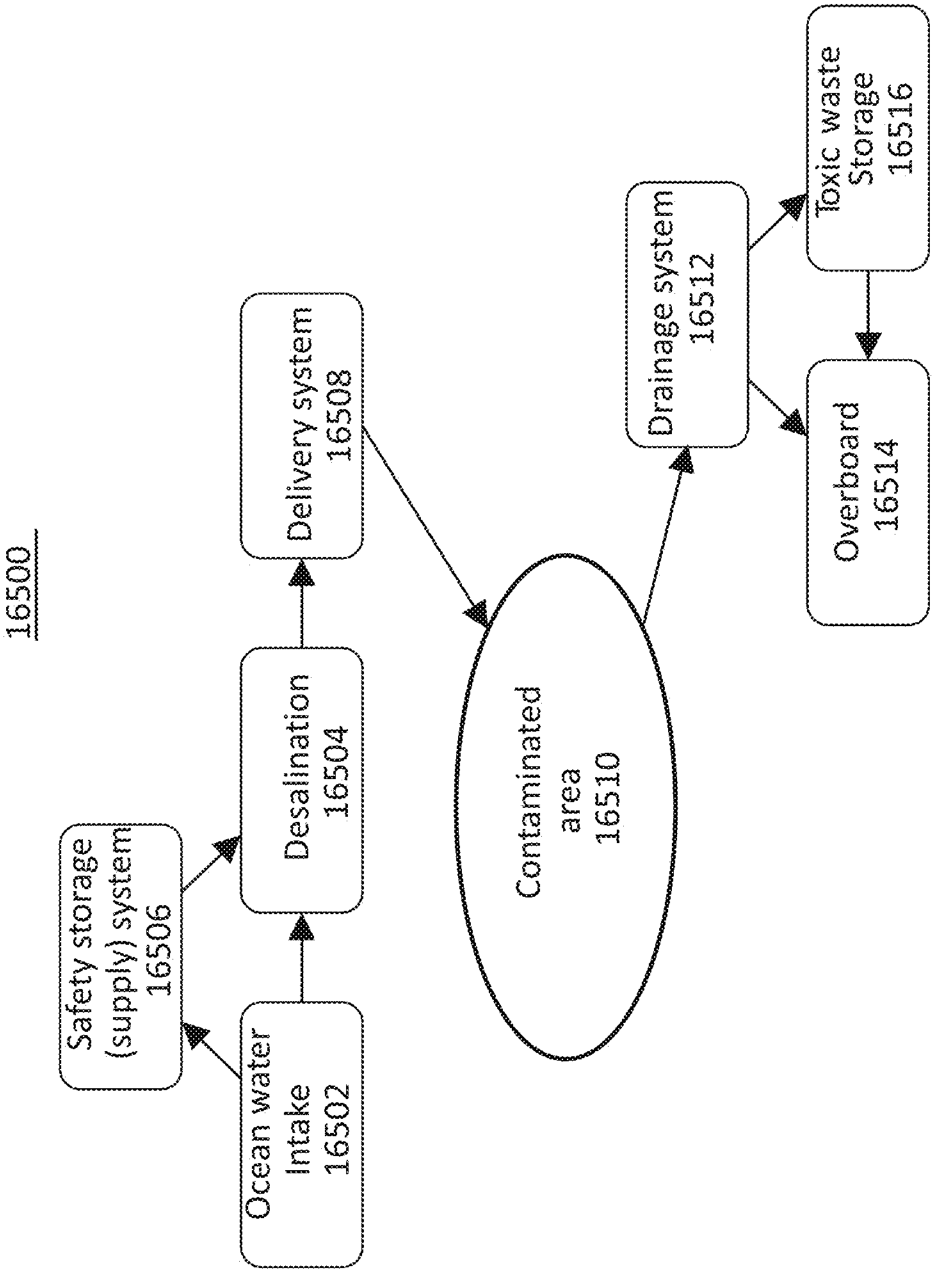
Figure 166:
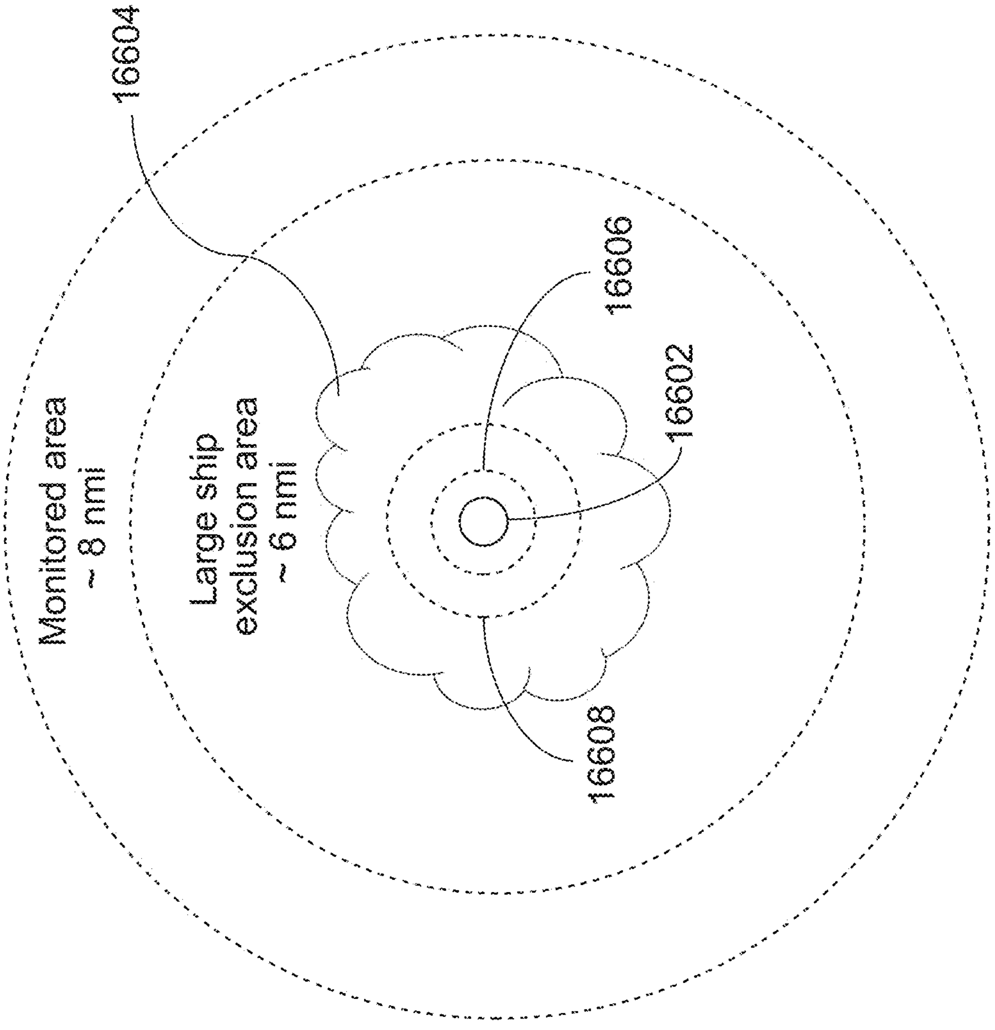
Figure 167:
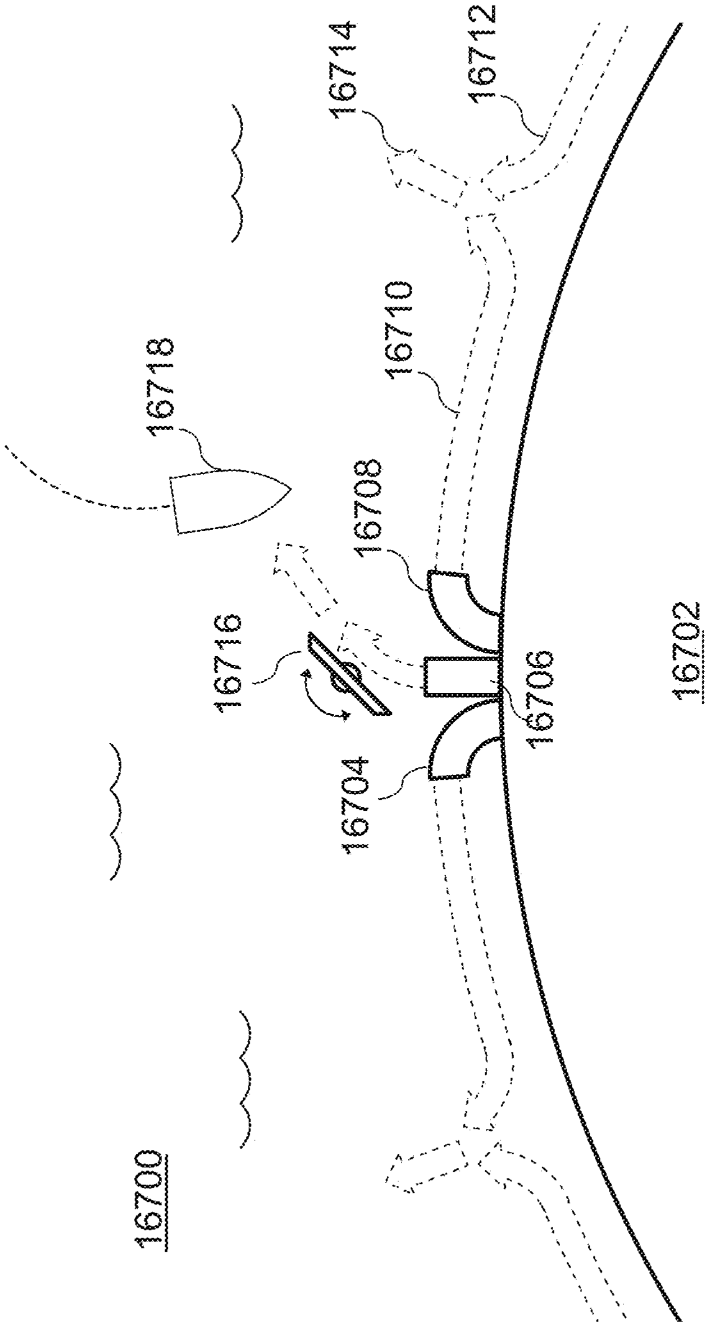
Figure 168:
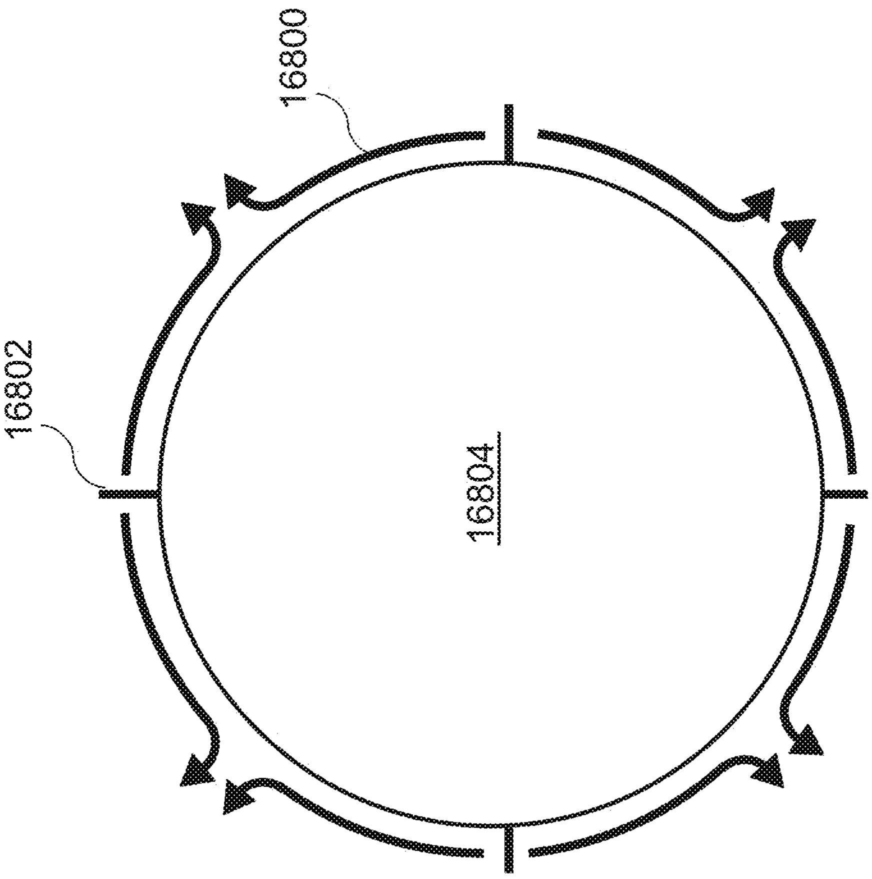
Figure 169:
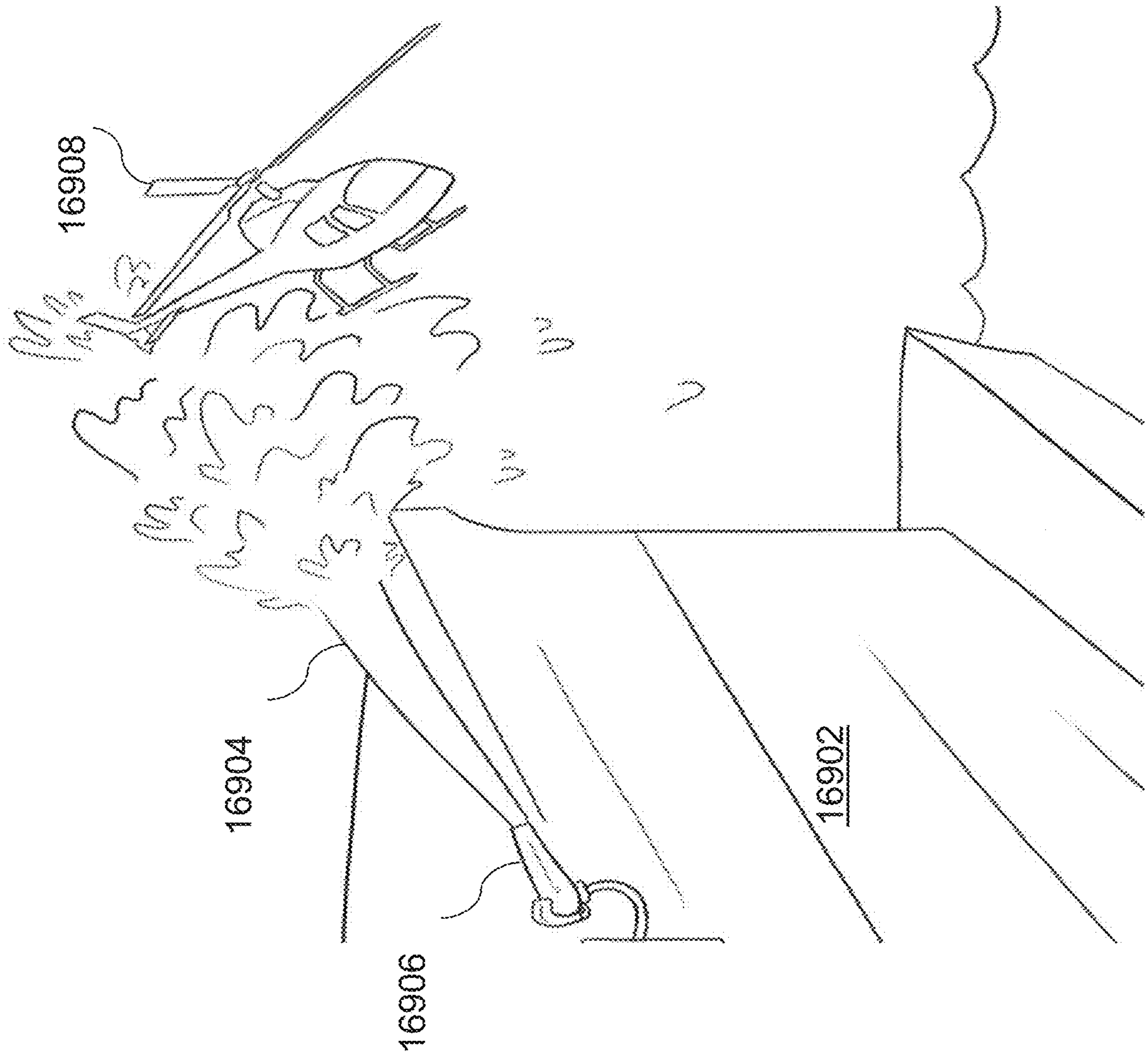
Figure 170:
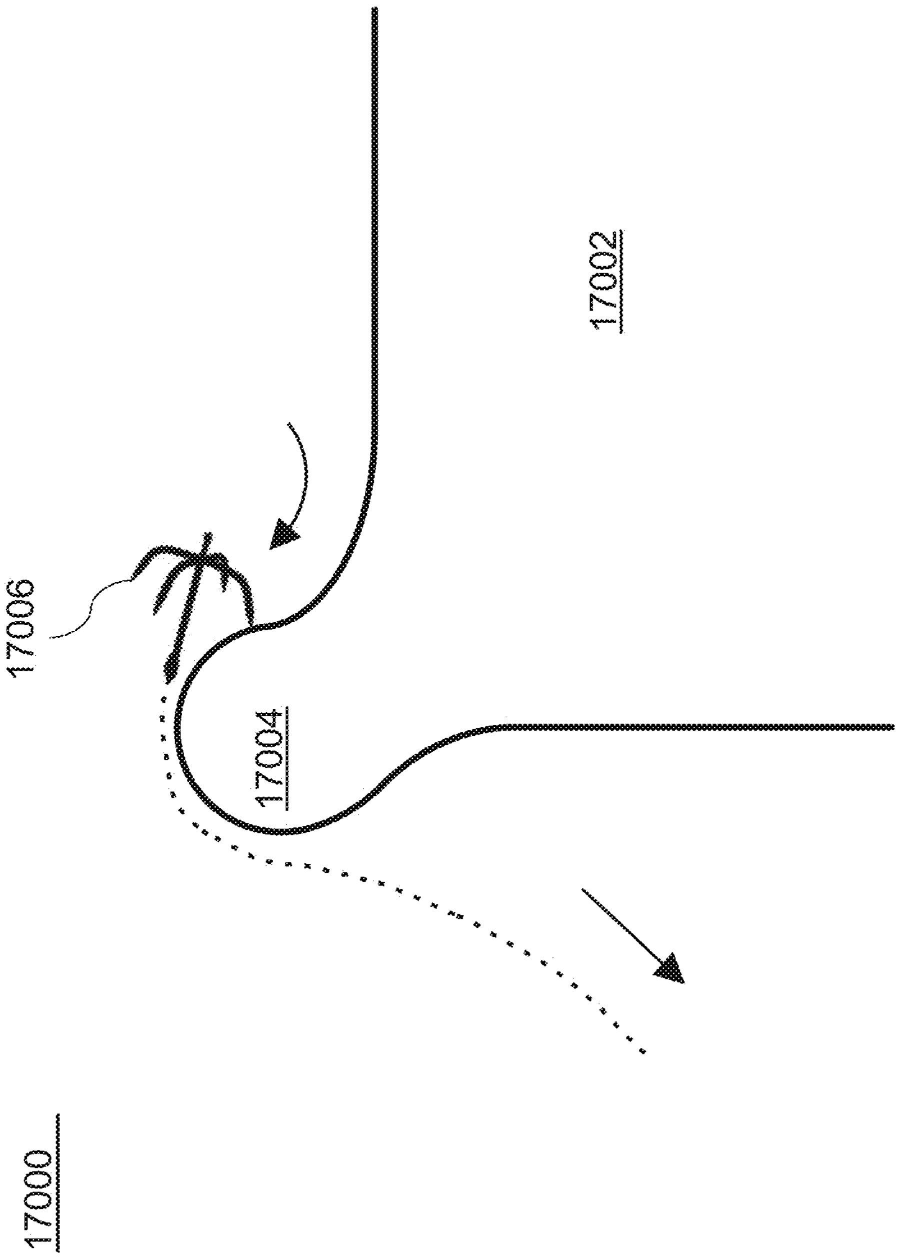
Figure 172:
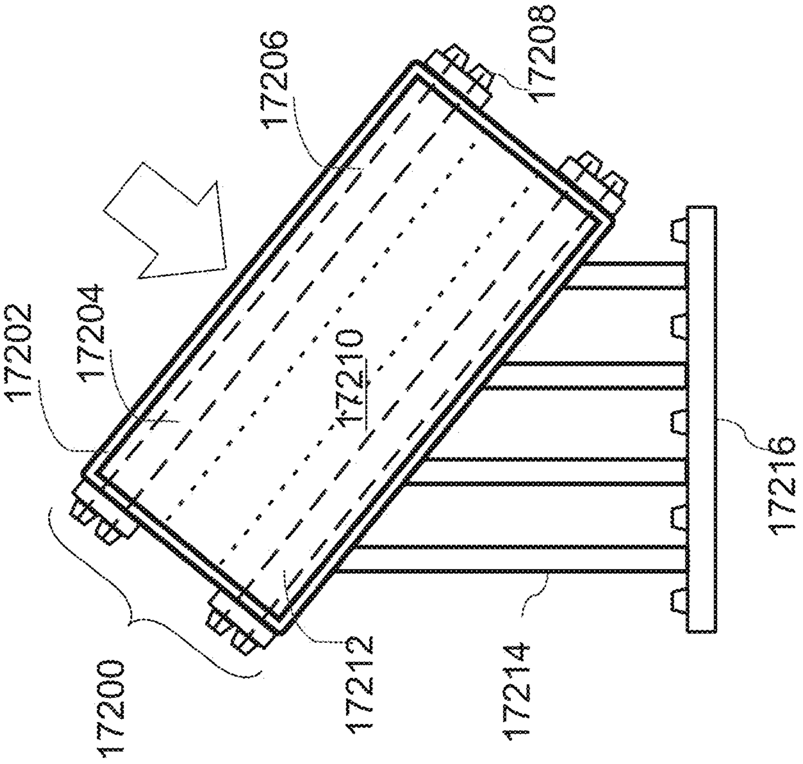
Figure 171:
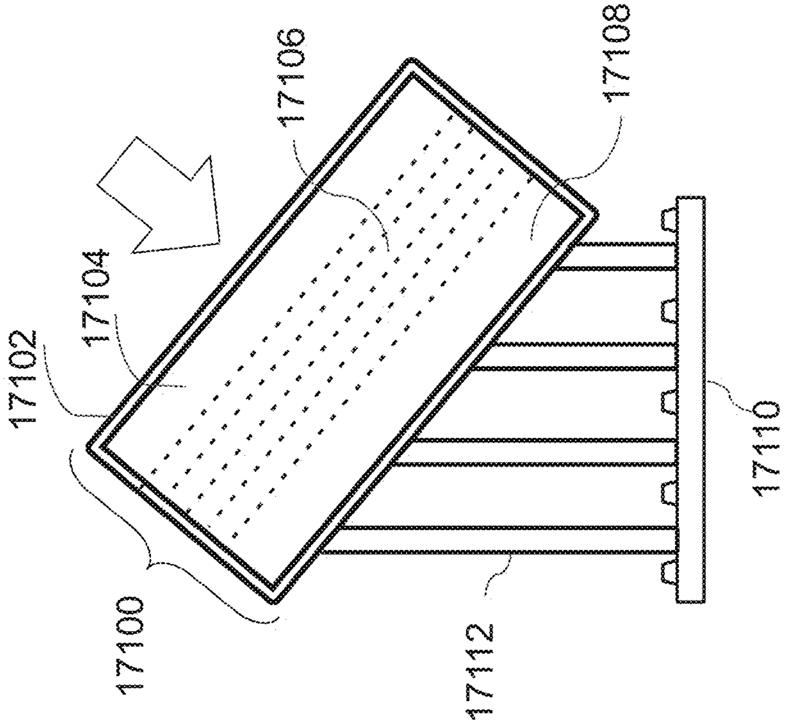
Figure 173:
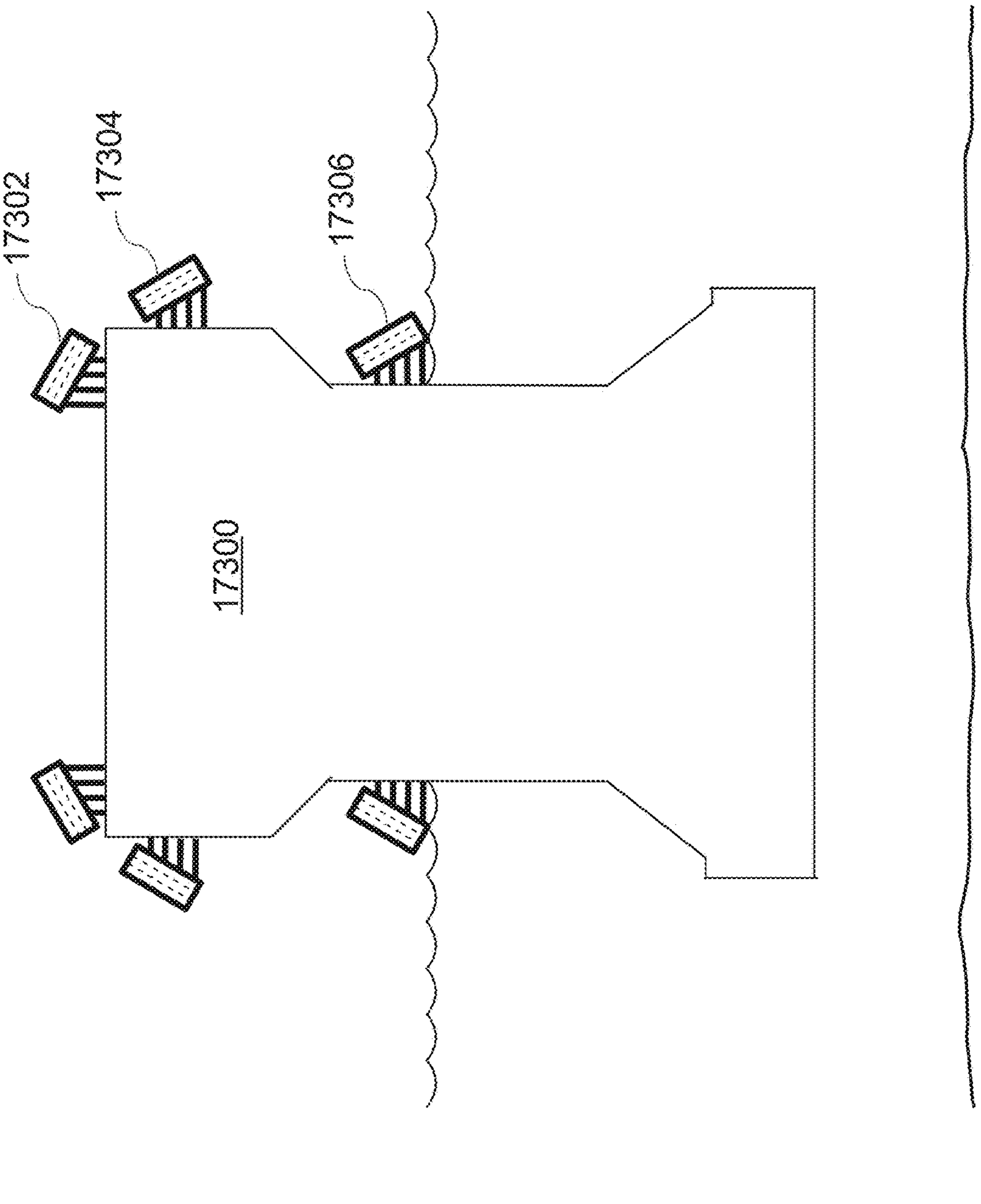
Figure 174:
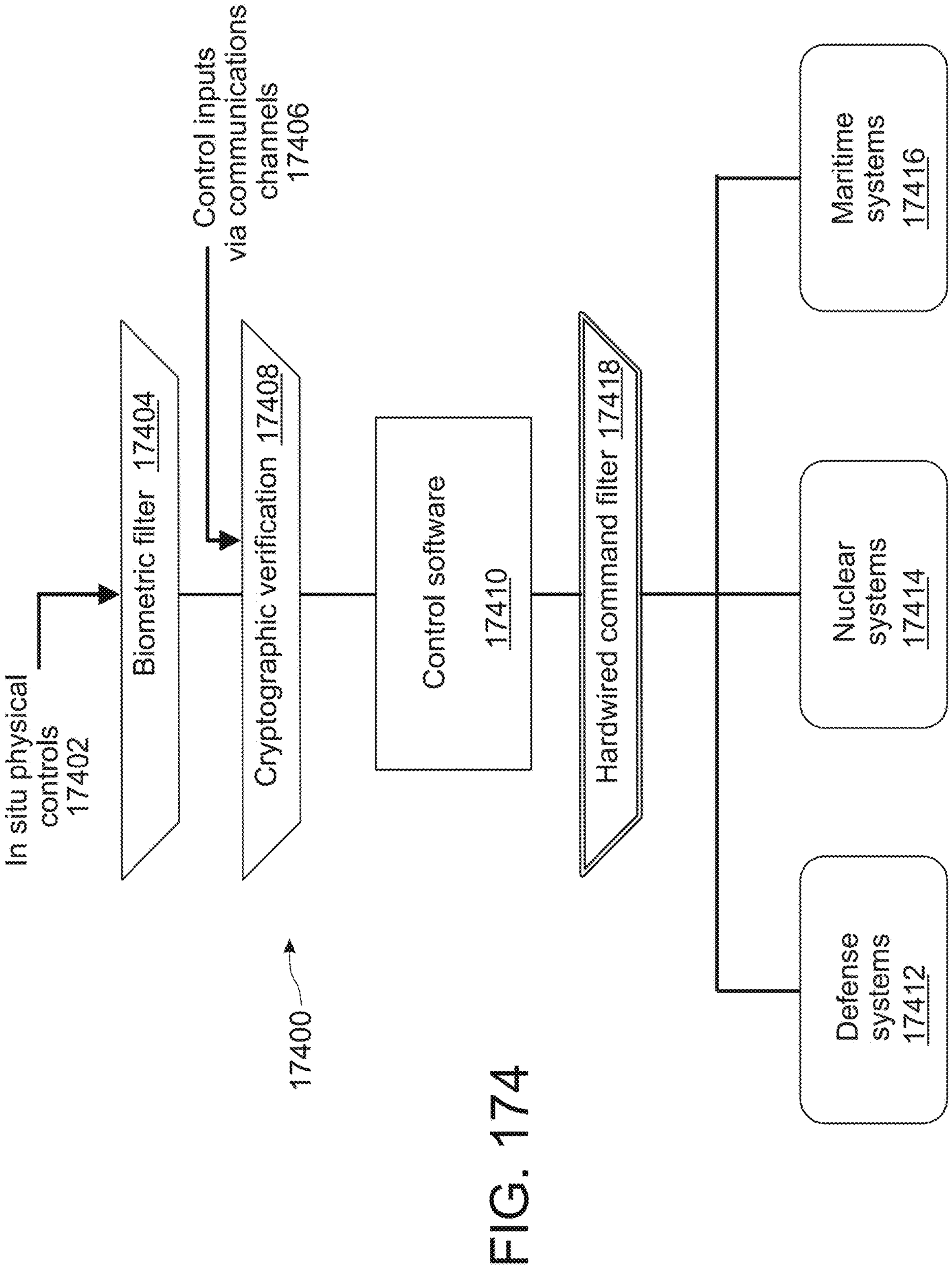
Figure 175:
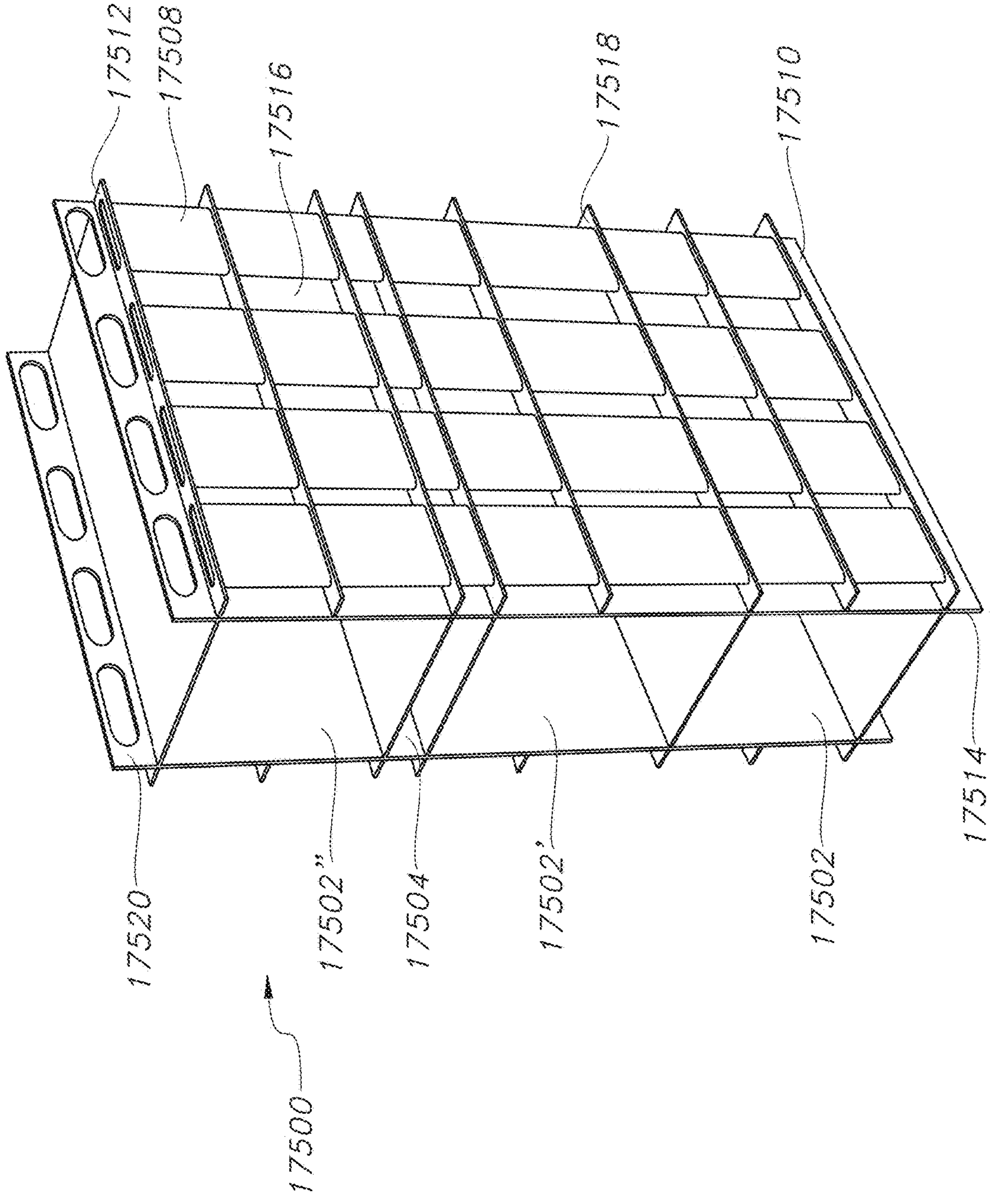
Figure 176:
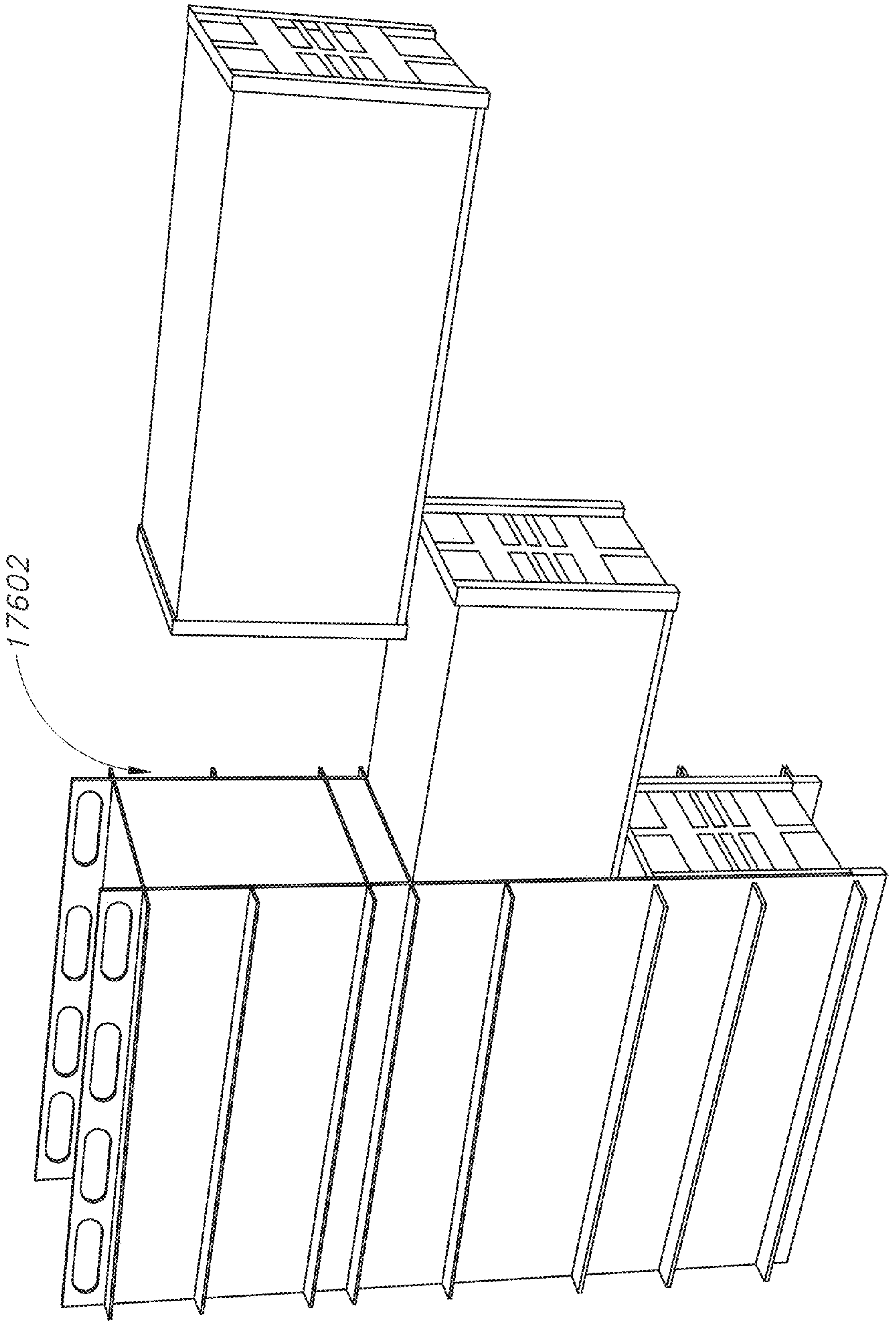
Figure 177:
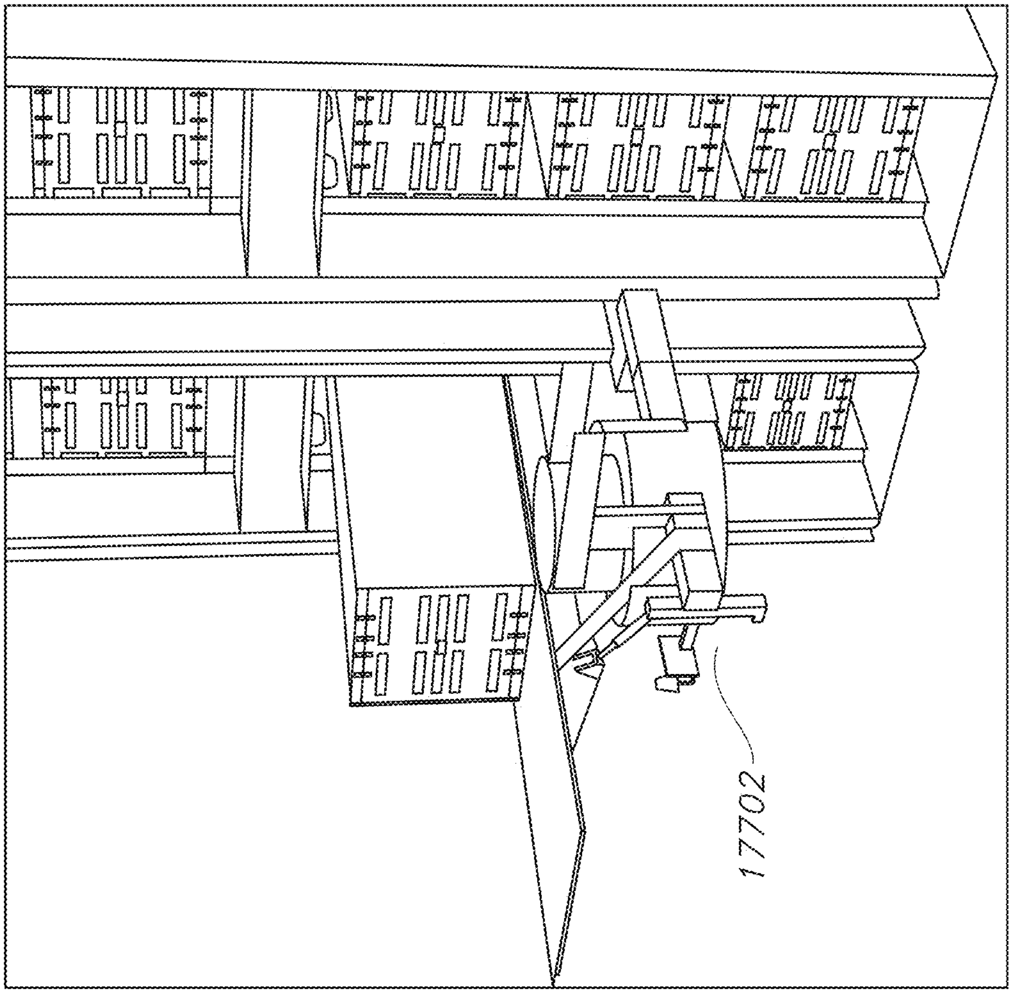
Figure 179:
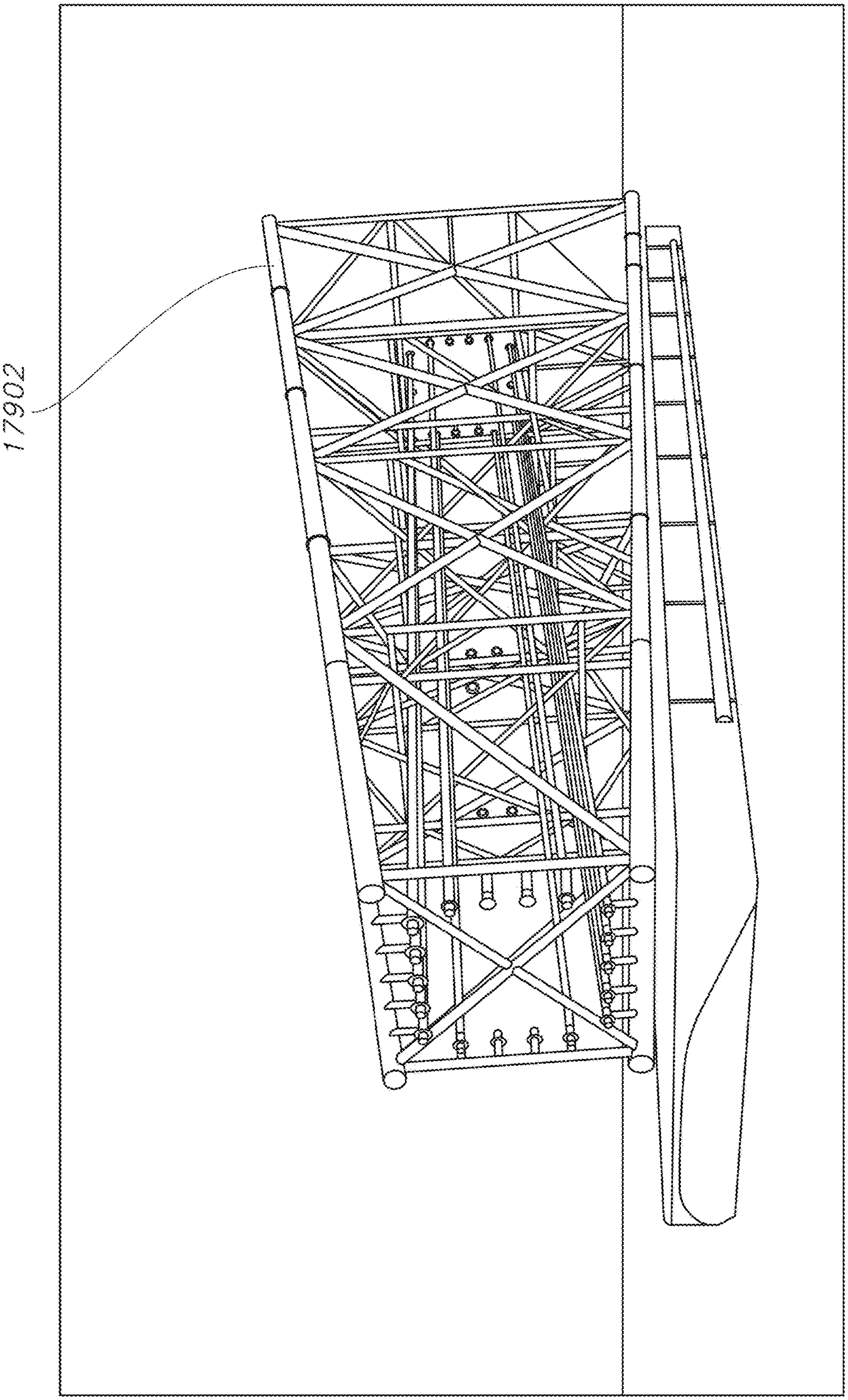
Figure 180A:
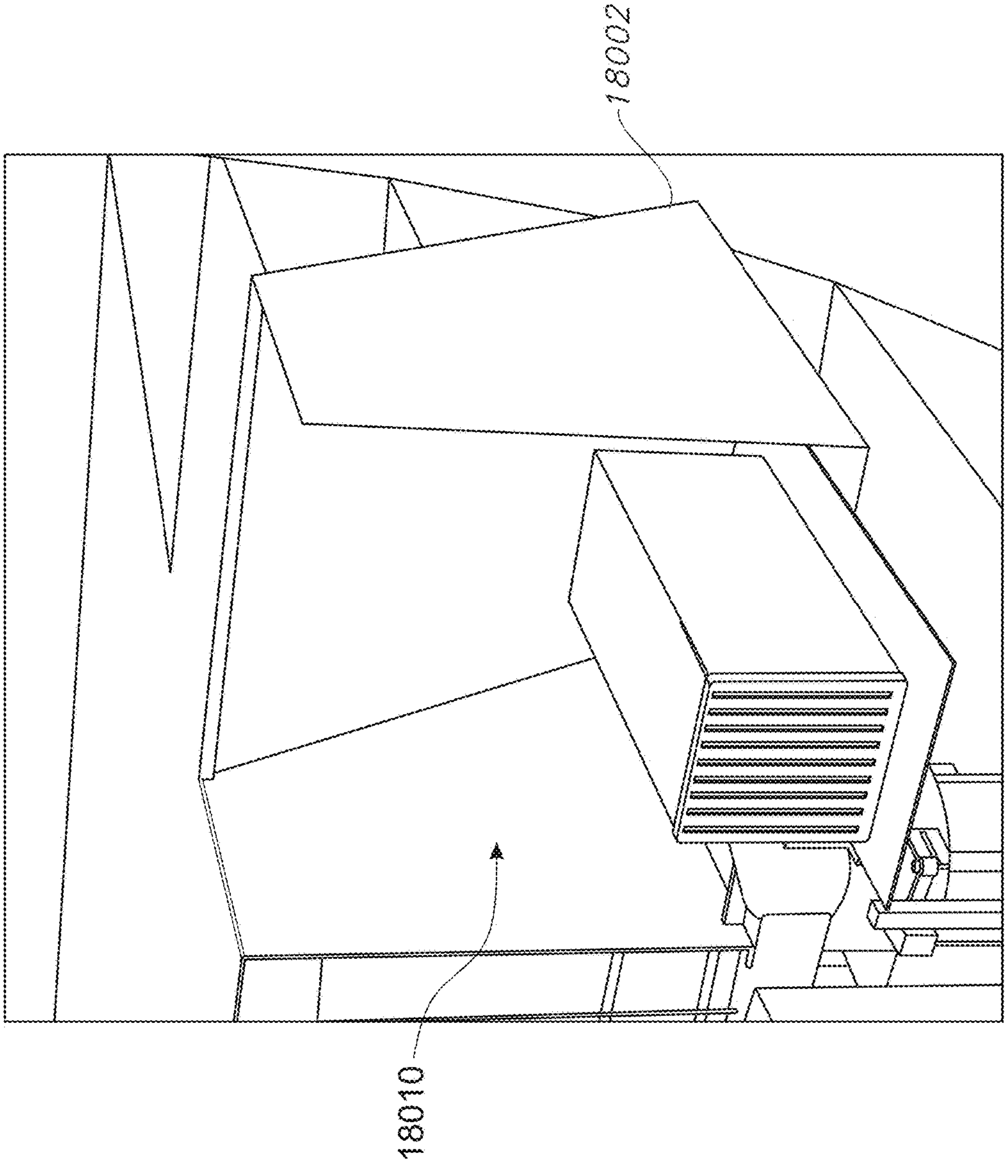
Figure 180B:
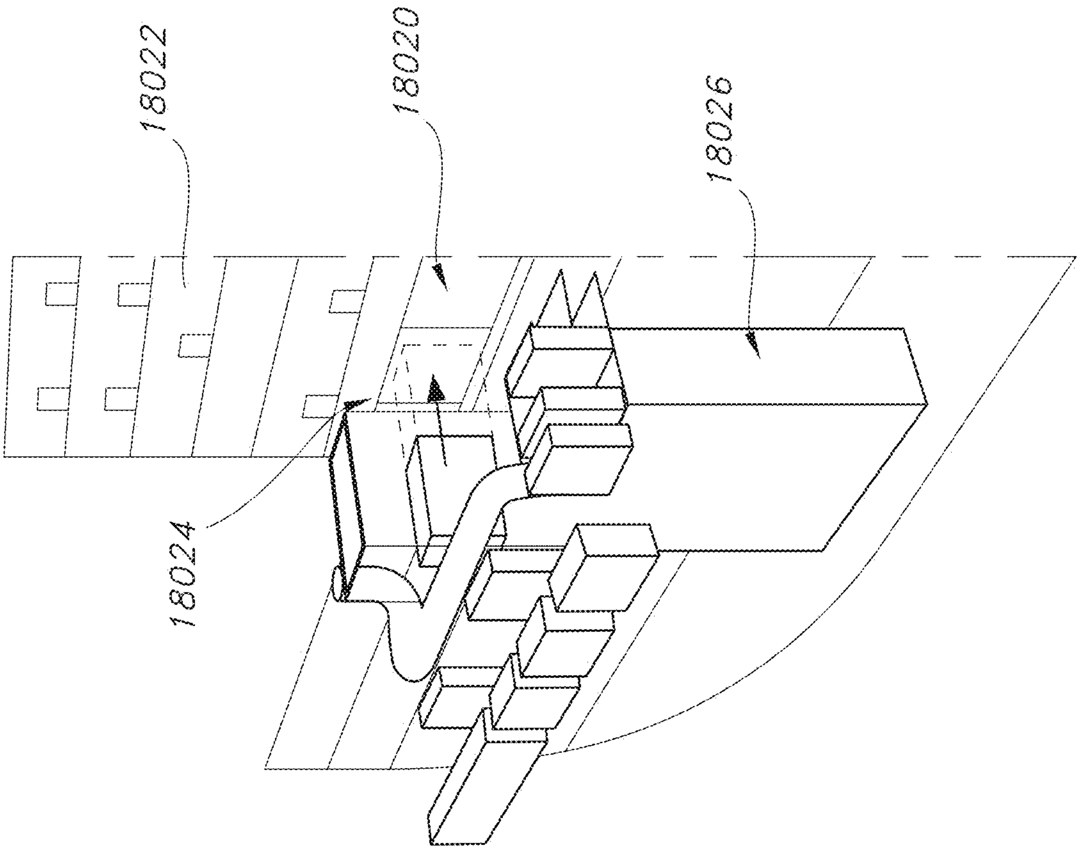
Figure 181A:
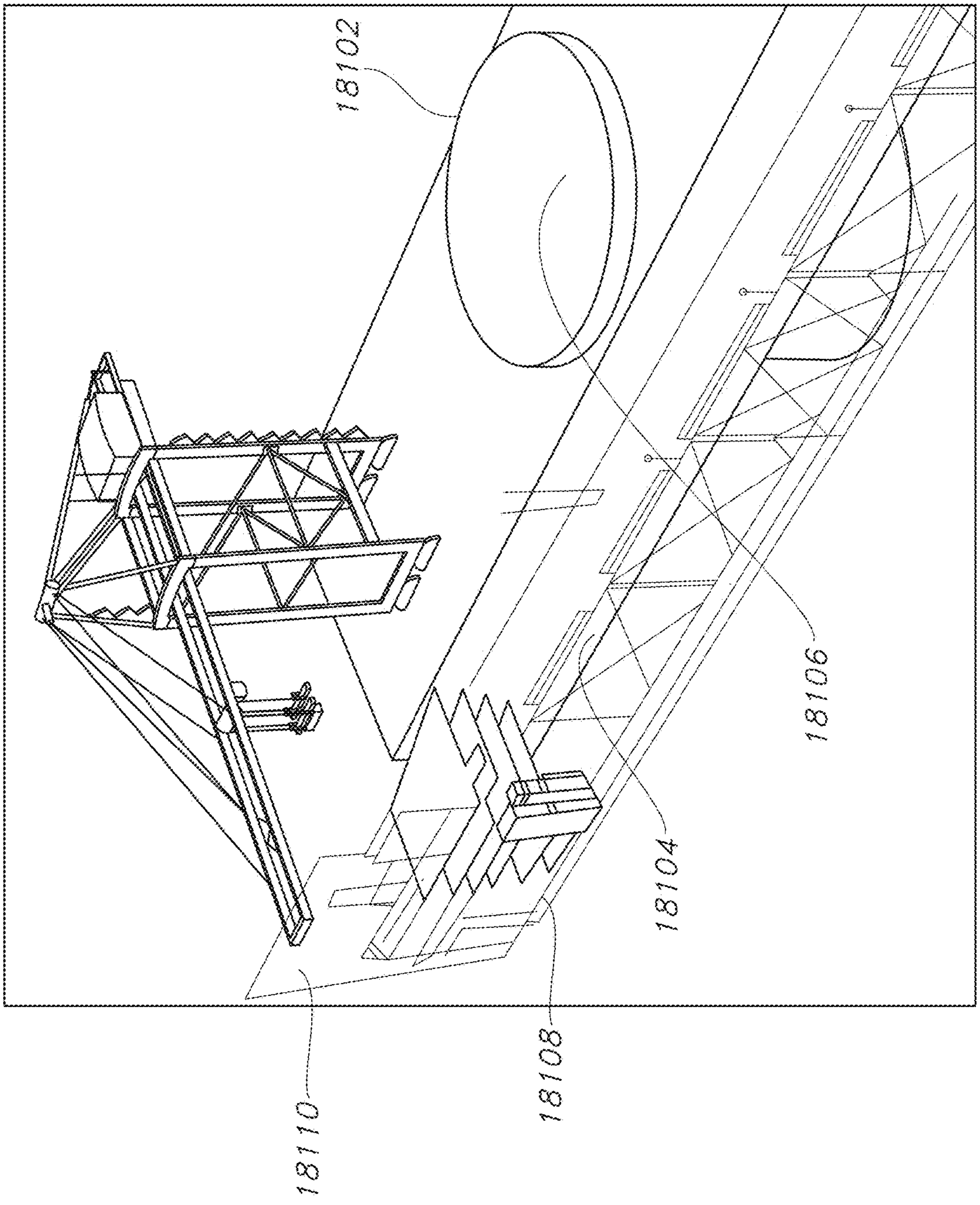
Figure 181B:
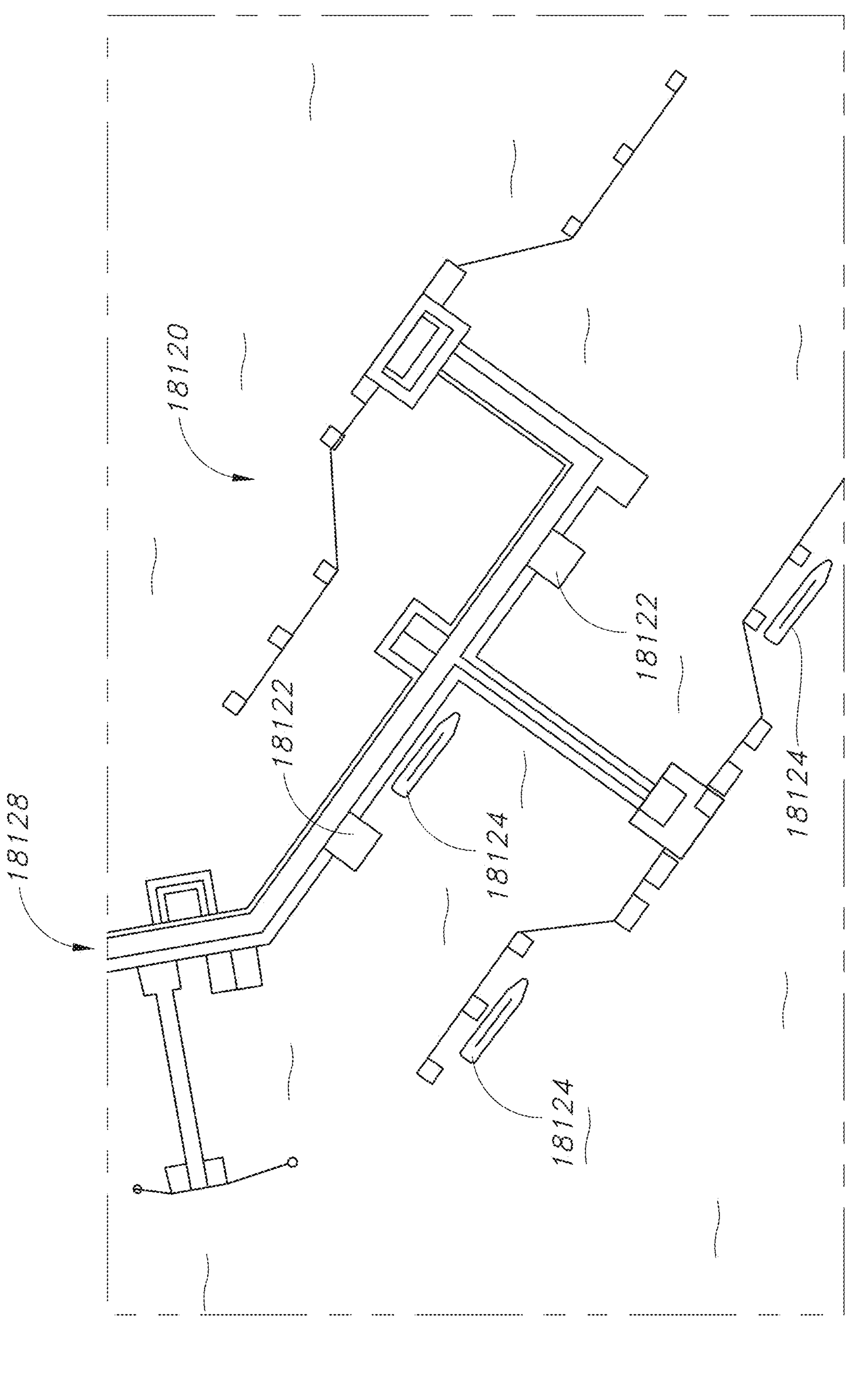
Figure 181C:
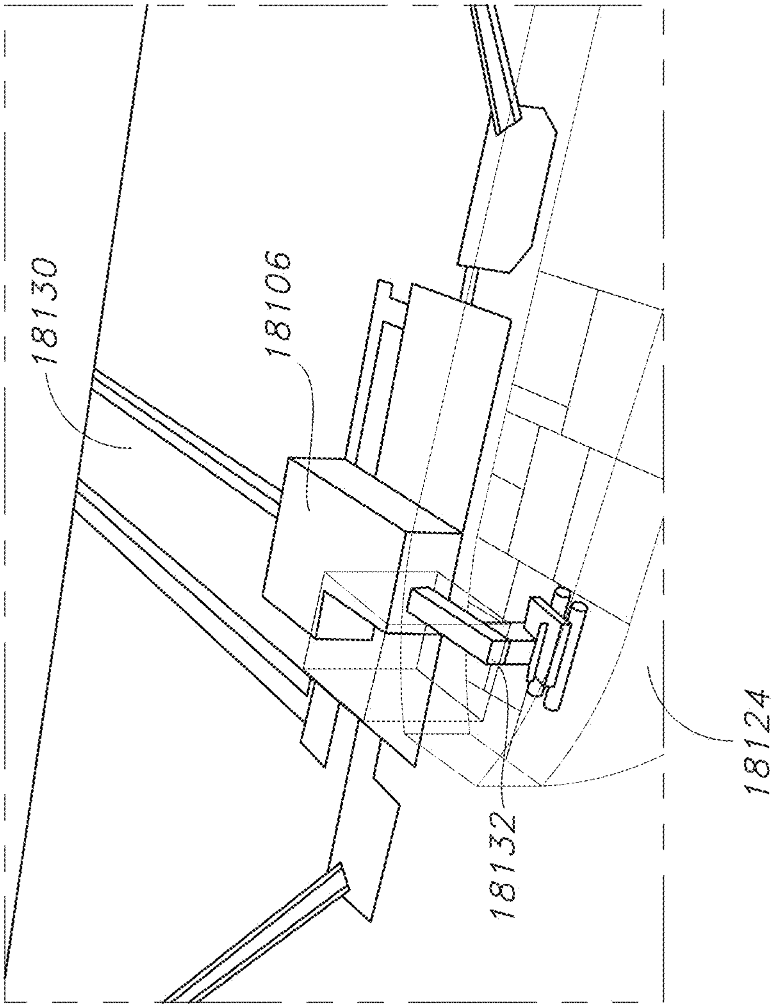
Figure 182:
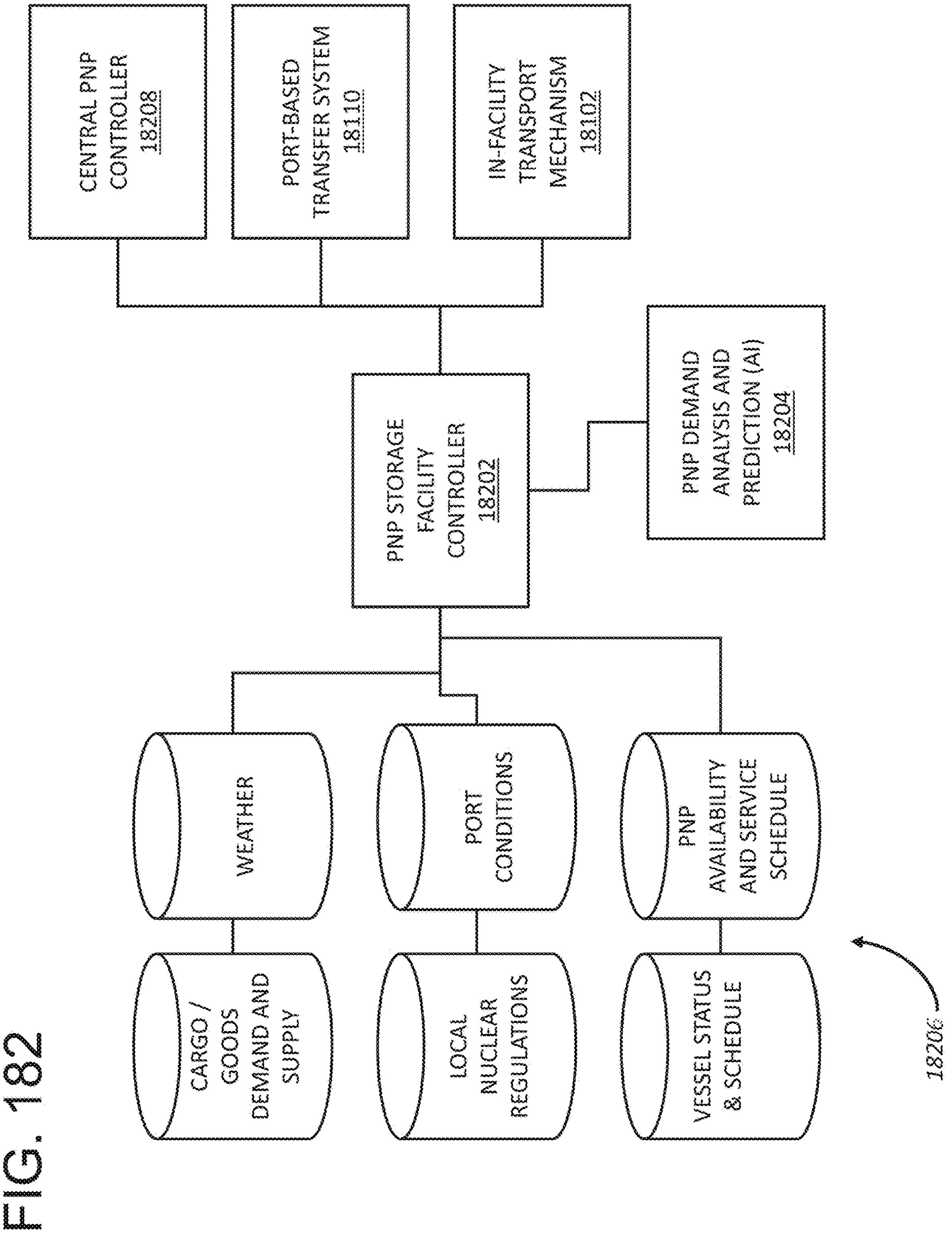
Figure 183:
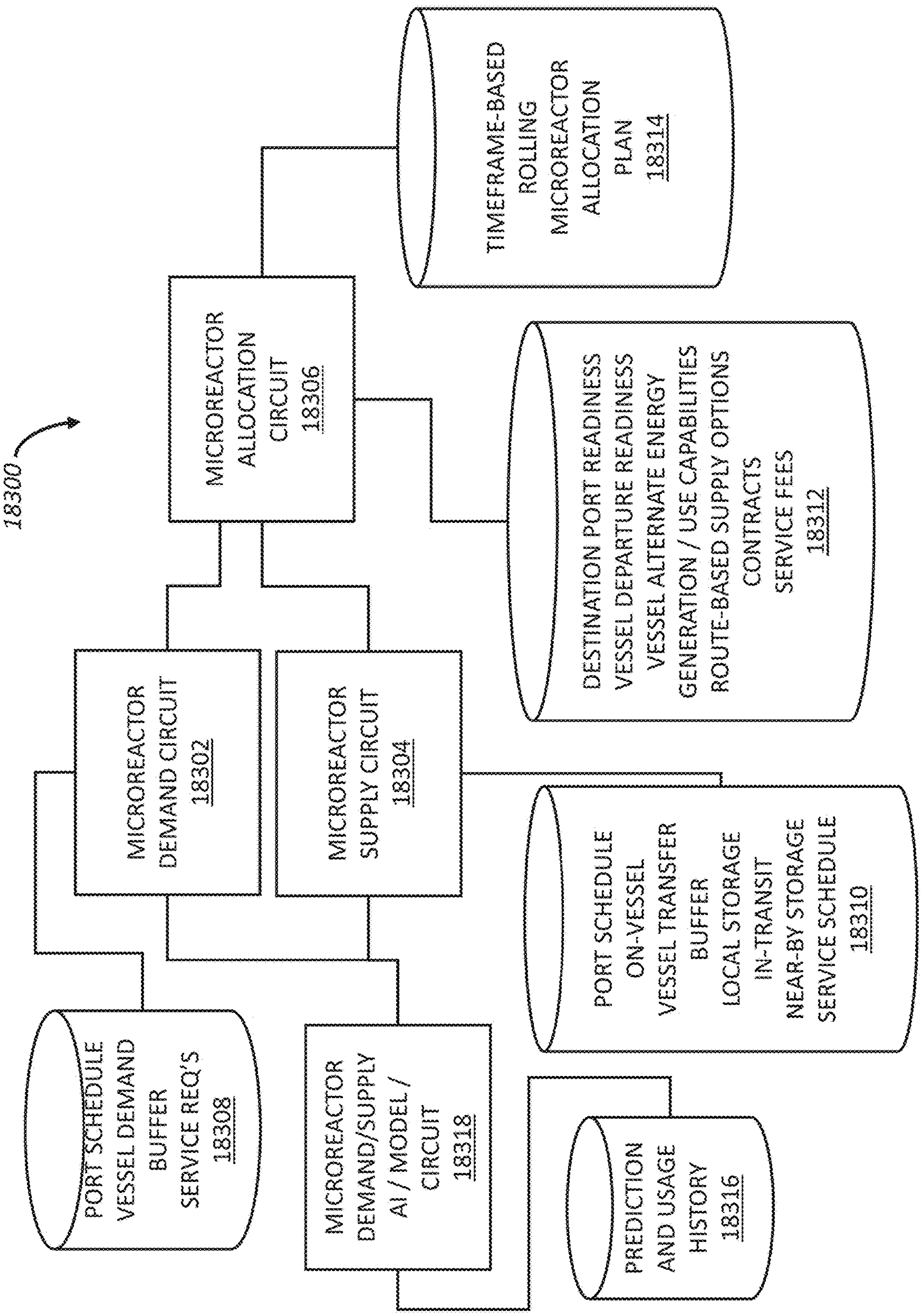
Figure 184B:
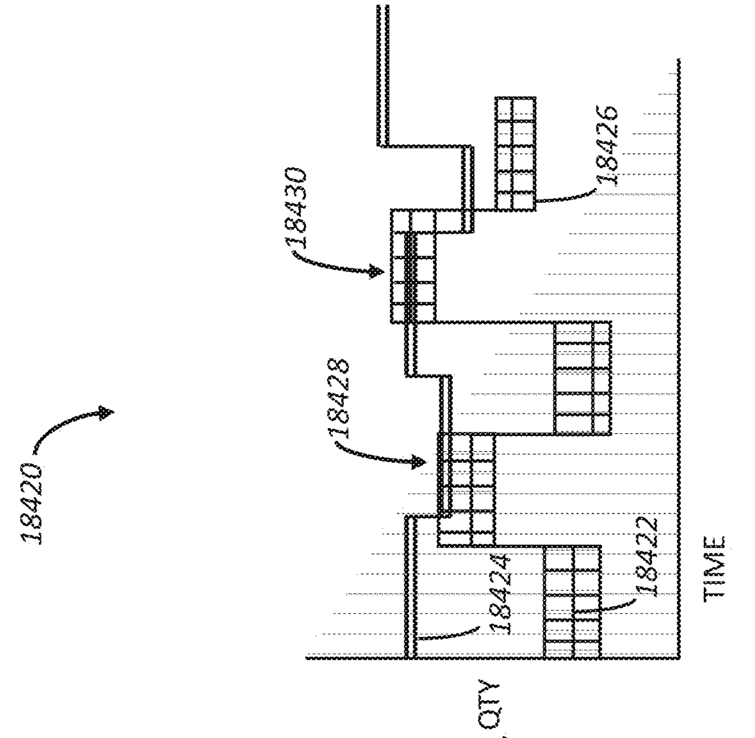
Figure 184A:
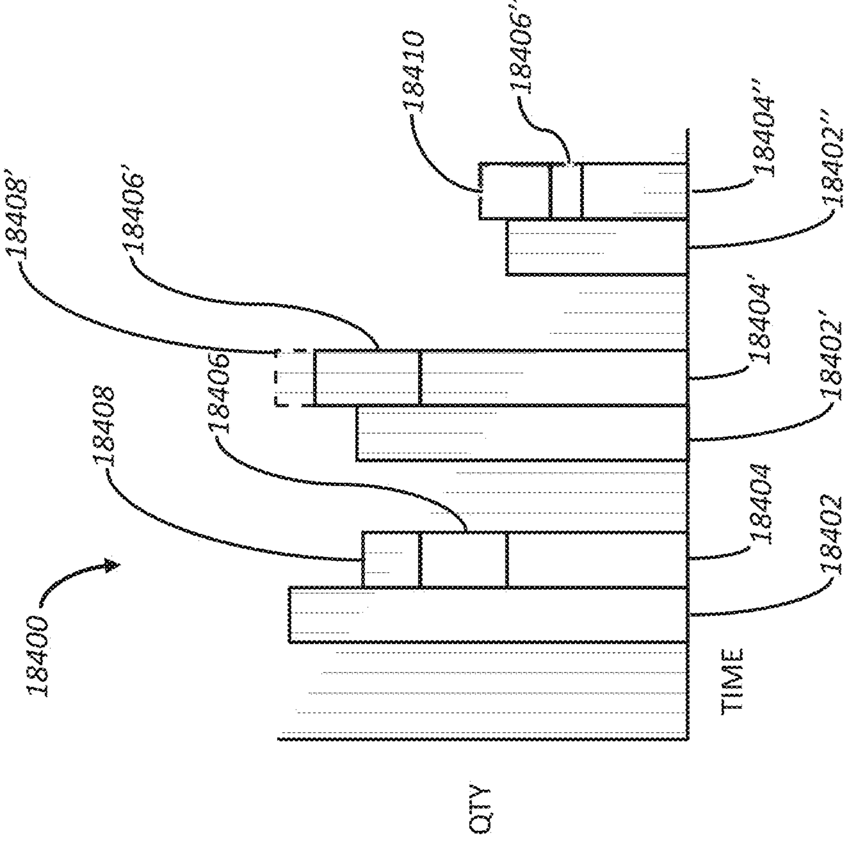
Figure 185B:
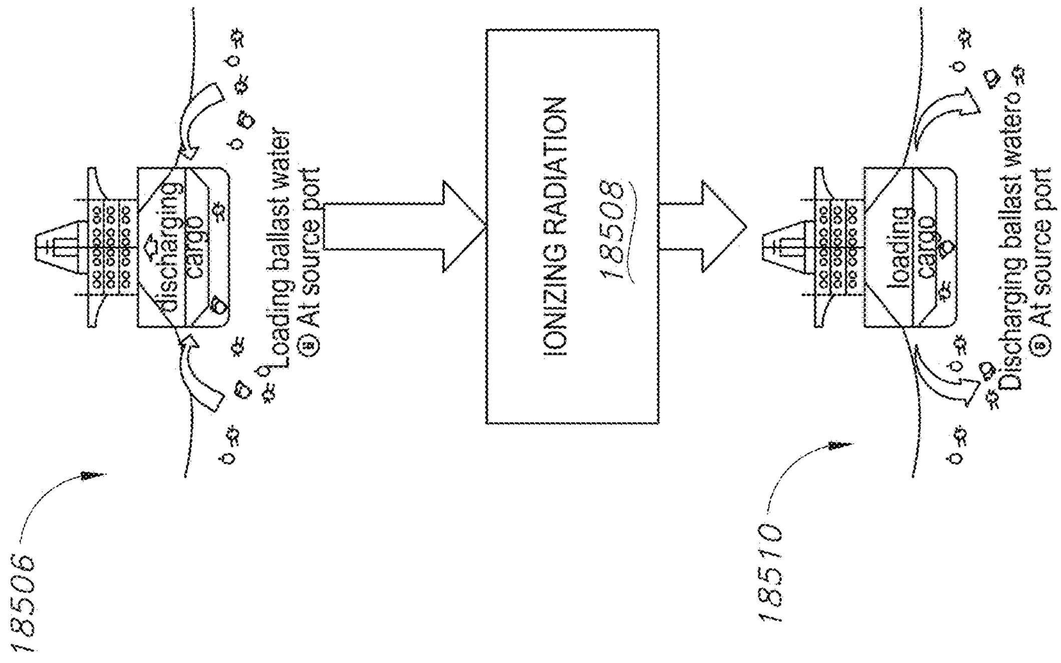
Figure 185A:
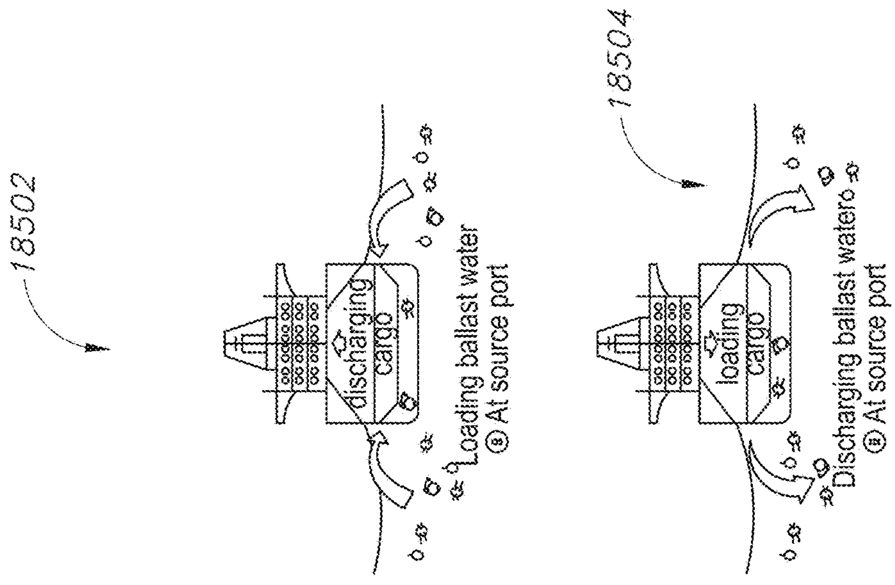
Figure 186:
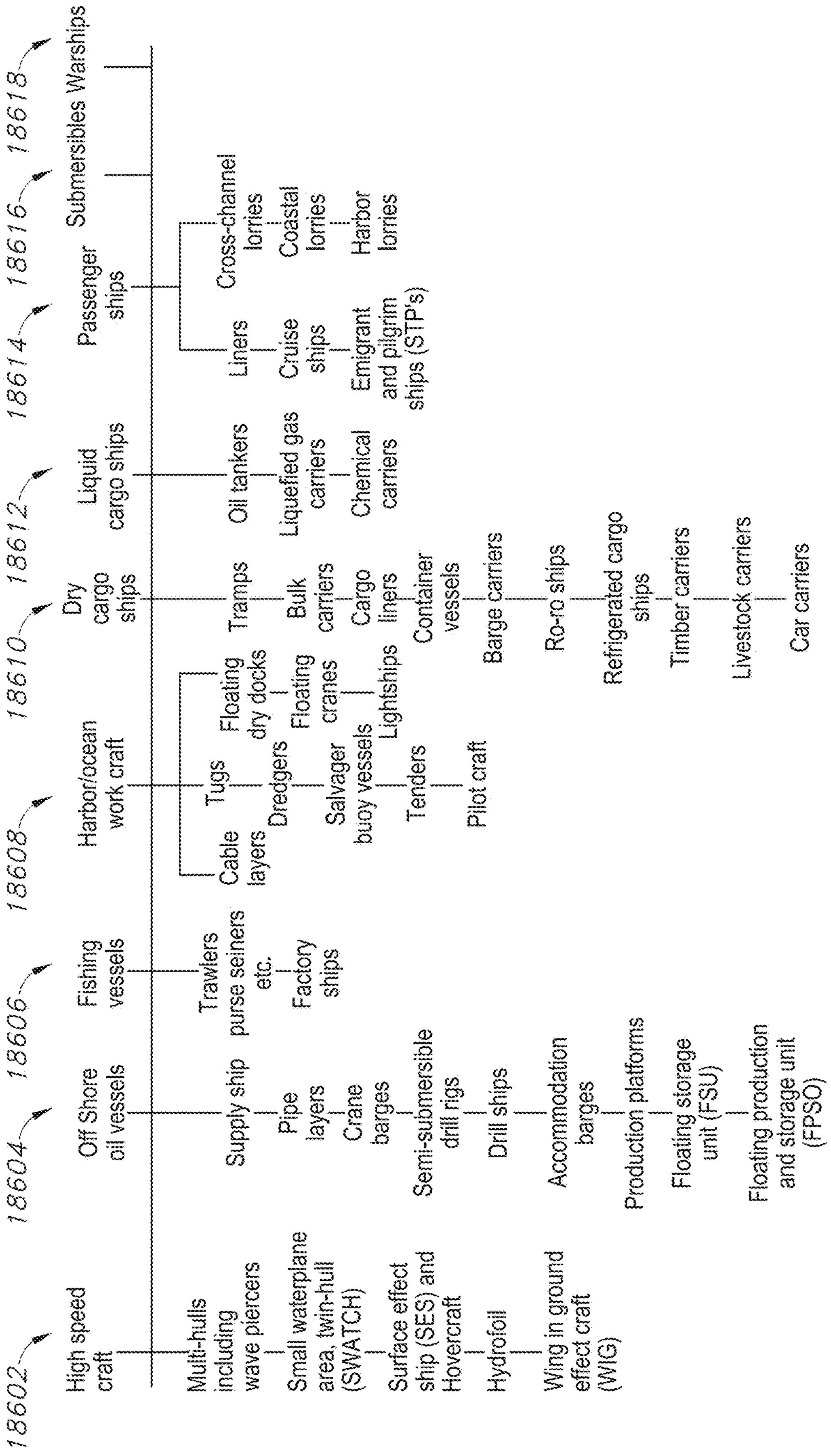

In the following description, various embodiments of the present disclosure are described with reference to the following drawings, in which:

FIG. 1 shows schematically a first stage of the installation procedure, where two rows of aligned pilings in spaced relation are established according to the present disclosure;

FIG. 2 shows schematically a base structure to be supported by the pilings is towed into position between the two, spaced-apart, aligned rows of pilings by a towing vessel according to the present disclosure;

FIG. 3 shows schematically in perspective seen from below embodiments of a base structure according to the present disclosure;

FIG. 4 shows schematically in perspective embodiments of the base structure positioned and supported by the pilings in aligned position on at least both sides of the base structure according to the present disclosure;

FIG. 5 shows schematically in perspective two seabed base structures installed upon seabed base structures according to the present disclosure;

FIG. 6 shows schematically seismic isolation units upon a seabed base structure according to the present disclosure;

FIG. 7 shows schematically removable panels of the side walls of a seabed base structure according to the present disclosure;

FIGS. 8A, 8B, and 8C show schematically and by stages the docking of a floatable aircraft impact shield module in the artificial harbor proffered by a seabed base structure according to the present disclosure;

FIG. 9 shows schematically the operation of a door in the side of an aircraft impact shield module installed upon a seabed base structure according to the present disclosure;

FIG. 10 shows schematically in cross-section portions of a reactor module that is to be installed within an aircraft impact shield module installed upon a seabed base structure according to the present disclosure;

FIG. 11 shows schematically two modules installed upon two seabed base structures according to the present disclosure;

FIG. 12 shows schematically two modules installed upon two seabed base structures and a cooling tower installed upon pilings according to the present disclosure;

FIG. 13 shows schematically in vertical cross-section a nuclear power plant module and a power conversion module according to the present disclosure;

FIG. 14 shows schematically in horizontal cross-section the nuclear power plant module and a power conversion module of FIG. 13;

FIG. 15 shows schematically in side view portions of an SMR of the CAREM type according to the present disclosure;

FIG. 16 shows schematically in top-down view portions of an SMR of the CAREM type according to the present disclosure;

FIG. 17 shows schematically in perspective portions of an SMR of the CAREM type according to the present disclosure;

FIG. 18 shows schematically in vertical cross-section portions of an SMR of the CAREM type installed within a floatable module according to the present disclosure;

FIG. 19 shows schematically in vertical cross-section portions of a floatable module containing SMRs of an integral pressurized water reactor with internal passive coolant circulation (IPW/IPC) type and installed upon a seabed base structure according to the present disclosure;

FIG. 20 shows schematically in horizontal cross-section portions of a floatable module containing SMRs of an IPW/IPC type and installed upon a seabed base structure according to the present disclosure;

FIG. 21 shows schematically in horizontal cross-section portions of a floatable module containing SMRs of the IPW/IPC type as well as turbine-generator units and installed upon a seabed base structure according to the present disclosure;

FIG. 22A shows schematically in side view portions of an SMR of the UK (Rolls Royce) type according to the present disclosure;

FIG. 22B shows schematically in top-down view portions of an SMR of the UK (Rolls Royce) type according to the present disclosure;

FIG. 23 shows schematically in horizontal cross-section portions of a floatable module containing an SMR of the UK type and installed upon a seabed base structure according to the present disclosure;

FIG. 24 shows schematically in horizontal cross-section portions of a floatable module containing an SMR of the SMART type and installed upon a seabed base structure according to the present disclosure;

FIG. 25 shows schematically in horizontal cross-section portions of a floatable module containing an SMR of the mPower type and installed upon a seabed base structure according to the present disclosure;

FIG. 26 shows schematically in perspective two seabed base structures installed upon seabed base structures, one of which includes a central opening according to the present disclosure;

FIGS. 27A, 27B, and 27C show schematically in vertical cross-section portions of a floatable module containing an SMR of the UK type and installed upon a seabed base structure as the SMR is lowered in stages through a central opening in the seabed base structure according to the present disclosure;

FIG. 28 shows schematically in vertical cross-section portions of an SMR of the IPW/IPC type installed below waterline including a central opening in a seabed base structure according to the present disclosure;

FIG. 29 shows schematically in vertical cross-section portions of an SMR of the Integrated Modular Water Reactor type installed below waterline including a central opening in a seabed base structure according to the present disclosure;

FIG. 30 shows schematically two modules installed upon seabed base structures in an artificially dredged channel according to the present disclosure;

FIG. 31 shows schematically four modules installed upon seabed base structures and interconnected by utility bridges according to the present disclosure;

FIG. 32 shows schematically in vertical cross-section the stabilization of an embankment with the anchor-block slope stabilization technique according to the present disclosure;

FIG. 33 shows schematically in vertical cross-section the stabilization of an embankment including bulkheads and piers according to the present disclosure;

FIG. 34 shows schematically in vertical cross-section portions of a module established upon a seabed base structure adjacent to a stabilized embankment according to the present disclosure;

FIG. 35 shows schematically in top-down view a nuclear power module and power conversion module installed within an artificially dredged U-shape channel according to the present disclosure;

FIG. 36A shows schematically in top-down view portions of a coastal power plant including an offshore artificial channel dredged to receive floatable modules according to the present disclosure;

FIG. 36B shows the coastal power plant of FIG. 36A with floatable modules installed upon seabed base structures in the prepared offshore channel;

FIG. 37A shows schematically in top-down view portions of a coastal power plant including an artificial channel dredged in a shoreline to receive floatable nuclear power modules according to the present disclosure;

FIG. 37B shows the coastal power plant of FIG. 37A with two floatable nuclear power modules installed upon seabed base structures in the prepared channel;

FIG. 38 shows a nuclear power station including two modules founded upon seabed base structures and located within an artificial cavern having stabilized walls and ceiling according to the present disclosure;

FIG. 39 is a schematic depiction of relationships among portions of an illustrative deployment or application of a nuclear power plant, such as a Micro-MPS, an SMR-MPS and the like according to the present disclosure;

FIG. 40 is another schematic depiction of relationships among portions of an illustrative deployment or application of a nuclear power plant, such as a Micro-MPS, an SMR-MPS and the like according to the present disclosure;

FIG. 41 is yet another schematic depiction of relationships among portions of an illustrative deployment or application of a nuclear power plant according to the present disclosure;

FIG. 42 shows schematically submerged modular construction of a roadway that can use or be used to deploy submersible reactor modules according to the present disclosure;

FIG. 43 shows schematically a typical submersible module according to the present disclosure;

FIG. 44A shows schematically a first stage in the transport and installation of submersible modules according to the present disclosure according to the present disclosure;

FIG. 44B shows schematically a second stage in the transport and installation of submersible modules according to the present disclosure; according to the present disclosure FIG. 44C shows schematically a third stage in the transport and installation of submersible modules according to the present disclosure according to the present disclosure;

FIG. 44D shows schematically a fourth stage in the transport and installation of submersible modules according to the present disclosure according to the present disclosure;

FIG. 45 shows schematically a method for sinking a module upon prepared pilings according to the present disclosure;

FIG. 46 shows schematically the firming of a module established upon pilings according to the present disclosure;

FIG. 47 shows schematically a method for sinking a module upon a prepared foundation according to the present disclosure;

FIG. 48A shows schematically a stage in the mating of two submerged modules according to the present disclosure;

FIG. 48B shows schematically another stage in the mating of two submerged modules according to the present disclosure;

FIG. 49 shows schematically portions of a power generating station according to illustrative embodiments of the present disclosure;

FIGS. 50A and 50B show schematically portions of a power generating station according to other illustrative embodiments of the present disclosure;

FIGS. 51A and 51B show schematically portions of a floating data center associated with a power generating station according to the present disclosure;

FIGS. 52A and 52B show schematically portions of a data center founded on pilings and associated with a power generating station according to the present disclosure;

FIGS. 53A and 53B show schematically portions of a fulfillment center for unmanned aerial vehicles that are associated with a power generating station according to the present disclosure;

FIG. 54 is a relational block diagram depicting illustrative constituent systems of a marine nuclear plant according to the present disclosure;

FIG. 55 is a schematic depiction of portions of illustrative embodiments of the nuclear power plant systems of FIG. 54;

FIG. 56 is a schematic depiction of portions of an illustrative unit configuration of a marine nuclear plant and an illustrative deployment thereof according to the present disclosure;

FIG. 57 is an overhead-view schematic depiction of portions of a first illustrative offshore nuclear plant system arrangement according to the present disclosure;

FIG. 58 is an overhead-view schematic diagram depicting portions of a second illustrative prefabricated nuclear plant system arrangement according to the present disclosure;

FIG. 59 is an overhead-view schematic diagram depicting portions of a third illustrative prefabricated nuclear plant system arrangement according to the present disclosure;

FIG. 60 is an overhead-view schematic diagram depicting portions of a fourth illustrative prefabricated nuclear plant system arrangement according to the present disclosure;

FIG. 61A schematically depicts illustrative simple prefabricated nuclear plant configuration scenarios according to the present disclosure;

FIG. 61B schematically depicts illustrative compound prefabricated nuclear plant configuration scenarios according to the present disclosure;

FIG. 62 is a schematic depiction of a high-level schema for the modularization of a prefabricated nuclear plant according to the present disclosure;

FIG. 63 is a schematic vertical cross-sectional depiction of prefabricated nuclear plant modules of a floating cylindrical type prefabricated nuclear plant according to the present disclosure;

FIG. 64 is a schematic depiction of an illustrative nuclear fuel cycle according to the present disclosure;

FIG. 65 is a schematic depiction of an illustrative set of fuel services according to the present disclosure;

FIG. 66 is a first schematic depiction of portions of a cooling system according to the present disclosure;

FIG. 67 is a second schematic depiction of portions of a cooling system according to the present disclosure;

FIG. 68 is a third schematic depiction of portions of a cooling system according to the present disclosure;

FIG. 69 is a fourth schematic depiction of portions of a cooling system according to the present disclosure;

FIG. 70A is a schematic, top-down, cross-sectional view of portions of a prefabricated nuclear plant canister magazine spent fuel storage system according to the present disclosure;

FIG. 70B provides two aligned, close-up, schematic, cross-sectional views of portions of an illustrative canister magazine spent fuel storage system according to the present disclosure;

FIG. 71A is a schematic, vertical, cross-sectional view of portions of an illustrative prefabricated nuclear plant spent-fuel tank system according to the present disclosure;

FIG. 71B depicts the system of FIG. 71A in an unlocked state of operation;

FIG. 72A is a schematic, vertical cross-sectional depiction of portions of an illustrative cooled and shielded apparatus according to the present disclosure;

FIG. 72B is a schematic, vertical cross-sectional depiction of portions of the manipulator of FIG. 72A;

FIG. 72C depicts a state of operation of the manipulator of FIG. 72A;

FIG. 73 is a schematic vertical cross-sectional depiction of portions of a prefabricated nuclear plant according to the present disclosure;

FIG. 74 is a schematic cutaway depiction of portions of an illustrative refueling canal system according to the present disclosure;

FIG. 75 is a schematic depiction in top and side views of portions of an illustrative compartmentalized coolant tank according to the present disclosure;

FIG. 76A is a schematic depiction in top and side views of portions of an illustrative spent fuel pool sub-compartment according to the present disclosure;

FIG. 76B is a top view of portions of an illustrative spent fuel pool;

FIG. 76C is a view of a spent fuel pool according to the present disclosure;

FIG. 77 is a schematic vertical cross-sectional depiction of portions of an illustrative spent fuel prefabricated nuclear plant storage system according to the present disclosure;

FIG. 78A and FIG. 78B are schematic vertical cross-sectional depictions of portions of an illustrative spent-fuel prefabricated nuclear plant storage system according to the present disclosure;

FIGS. 79A, 79B, 79C and 79D are schematic cross-sectional views of portions of an illustrative gated fuel assembly transfer valve according to the present disclosure;

FIG. 80 is a schematic depiction of portions of an illustrative core refueling coolant system according to the present disclosure;

FIG. 81 is a first schematic depiction of portions of an illustrative coolant stabilizing system according to the present disclosure;

FIG. 82 is a second schematic depiction of portions of an illustrative coolant stabilizing system according to the present disclosure;

FIG. 83 is a third schematic depiction of portions of an illustrative coolant stabilizing system according to the present disclosure;

FIG. 84 is a fourth schematic depiction of portions of an illustrative coolant stabilizing system according to the present disclosure;

FIG. 85 is a schematic vertical cross-sectional depiction of portions of an illustrative coolant stabilizing system according to the present disclosure;

FIG. 86A schematically depicts an illustrative fuel movement canister or enclosure according to the present disclosure;

FIG. 86B schematically depicts an illustrative fuel movement enclosure according to the present disclosure;

FIG. 87 is a first schematic depiction of portions of an illustrative system for moving fuel assemblies in enclosed volumes according to the present disclosure;

FIG. 88 is a second schematic depiction of portions of an illustrative system for moving fuel assemblies in enclosed volumes according to the present disclosure;

FIG. 89 schematically depicts first portions of an illustrative quick-return prefabricated nuclear plant mechanism according to the present disclosure;

FIG. 90 schematically depicts second portions of an illustrative quick-return prefabricated nuclear plant mechanism according to the present disclosure;

FIG. 91 schematically depicts an illustrative system for providing sustained, adequate cooling to a mobile fuel assembly canister or enclosure according to the present disclosure;

FIG. 92 schematically depicts a first illustrative fuel assembly canister or enclosure according to the present disclosure;

FIG. 93 schematically depicts a second illustrative fuel assembly canister or enclosure according to the present disclosure;

FIG. 94 schematically depicts top and side views of an illustrative fuel assembly canister or enclosure according to the present disclosure;

FIG. 95 is a schematic depiction of a prefabricated nuclear plant including an illustrative fuel assembly storage system that avoids unintended fission in fresh fuel assemblies according to the present disclosure;

FIG. 96 is a schematic depiction of portions of an illustrative fuel-handling system according to the present disclosure;

FIG. 97 is a simplified depiction of portions of an illustrative system for loading fuel assemblies according to the present disclosure;

FIG. 98 is a schematic cross-sectional depiction of portions of an illustrative mechanism for moving an illustrative fuel assembly load through a coolant-filled vertical transfer tube according to the present disclosure;

FIG. 99 is a schematic cross-sectional depiction of portions of an illustrative mechanism for moving an illustrative fuel assembly load through a vertical transfer tube according to the present disclosure;

FIG. 100 is a schematic cross-sectional depiction of portions of an illustrative mechanism for permitting an illustrative fuel assembly load to descend through a vertical transfer tube according to the present disclosure;

FIG. 101 is a schematic depiction of portions of an illustrative prefabricated nuclear plant fuel-handling machine according to the present disclosure;

FIG. 102 is a schematic cross-sectional depiction of portions of an illustrative prefabricated nuclear plant fuel-handling machine according to the present disclosure;

FIG. 103 provides top and side schematic cross-sectional views of portions of an illustrative prefabricated nuclear plant fuel-handling alignment guide according to the present disclosure;

FIG. 104A shows schematically a marine bulk carrier including a heat-pipe-cooled microreactor (HPM) power system according to the present disclosure;

FIG. 104B depicts schematically a bulk carrier vessel including an HPM power system according to the present disclosure;

FIG. 105 depicts schematically a container ship including an HPM power system according to the present disclosure;

FIG. 106 schematically illustrates a Floating Production Storage and Offloading (FPSO) vessel including an HPM power system according to the present disclosure;

FIG. 107 depicts schematically a semi-submersible drilling rig including two HPM power systems according to the present disclosure;

FIG. 108 depicts schematically a power barge including HPM power systems according to the present disclosure;

FIG. 109 schematically depicts a system for converting thermal power output of an HPM into electrical and mechanical power according to the present disclosure;

FIG. 110A shows schematically, in both side and top views, portions of a marine microreactor platform according to the present disclosure;

FIG. 110B shows schematically, in top views, the two decks of the platform of FIG. 110A according to the present disclosure;

FIG. 110C schematically depicts portions of a deployment scenario for the platform of FIG. 110A according to the present disclosure;

FIG. 111A shows schematically, in side and top views, portions of a partially submersible marine microreactor platform according to the present disclosure;

FIG. 111B shows schematically, in top view, the main interior deck of the platform of FIG. 111A according to the present disclosure;

FIG. 112A shows schematically, in side and top views, portions of a fully submersible marine microreactor platform according to the present disclosure;

FIG. 112B shows schematically, in top view, the main interior deck of the platform of FIG. 112A according to the present disclosure;

FIG. 112C schematically depicts the platform of FIG. 112A and FIG. 112B during overland transport according to the present disclosure;

FIG. 112D depicts a table of power demand for large marine vessels under varying cargo loads at different speeds according to the present disclosure;

FIG. 112E schematically depicts the platform secured in natural and/or human-made cave structures according to the present disclosure;

FIG. 113A schematically depicts, in top-down and cross-sectional view, portions of a microreactor platform according to the present disclosure;

FIG. 113B schematically shows, in side view, portions of a platform of FIG. 113A;

FIG. 114 schematically depicts aspects of a marine microreactor farm according to the present disclosure;

FIG. 115 is a schematic depiction of nuclear operation exclusion zones and sea-based microreactor servicing according to the present disclosure;

FIG. 116 is a schematic depiction of nuclear reactor congestion limit zones according to the present disclosure;

FIG. 117 is a schematic depiction of portions of a conventionally powered container ship according to the present disclosure;

FIG. 118 is a schematic depiction of portions of a conventionally powered bulk carrier ship according to the present disclosure according to the present disclosure;

FIG. 119 is a schematic depiction of portions of the power system of a large conventionally powered ship according to the present disclosure;

FIG. 120A is a schematic depiction of portions of a primarily propulsive power system housed within a large maritime vessel according to the present disclosure;

FIG. 120B is a schematic depiction of portions of a large, primarily propulsive hybrid-nuclear power system housed within a large maritime vessel according to the present disclosure;

FIG. 120C is a schematic depiction of portions of a large, primarily propulsive nuclear-power system housed within a large maritime vessel according to the present disclosure;

FIG. 121 is a schematic depiction of portions of a large, primarily propulsive hybrid-nuclear power system housed within a large maritime vessel according to the present disclosure;

FIG. 122 is a schematic depiction, in side view and partial top-down view, of portions of a nuclear-powered container ship according to the present disclosure;

FIG. 123 is a schematic depiction, in side view and partial top-down view, of portions of a nuclear-powered bulk carrier ship according to the present disclosure;

FIG. 124A is a schematic depiction, in partial top-down view and partial side view, of portions of a nuclear-powered ship according to the present disclosure;

FIG. 124B is a schematic depiction of a state of the vessel during an illustrative recovery operation according to the present disclosure;

FIG. 125A is a schematic depiction in side view of portions of a nuclear-powered ship according to the present disclosure;

FIG. 125B is a schematic depiction of a state of the vessel during an illustrative recovery operation according to the present disclosure;

FIG. 126 is a schematic depiction of variable positioning of a nuclear reactor for generating electrical power for propulsion of a vessel according to the present disclosure;

FIG. 127A is a schematic depiction of portions of microreactor-powered pathways or systems for synthesis of ammonia as a maritime energy carrier according to the present disclosure;

FIG. 127B is a schematic depiction of portions of another microreactor-powered pathway or system for synthesis of ammonia as a maritime energy carrier according to the present disclosure;

FIG. 128 is a schematic depiction, according to an illustrative example of the prior art, for the use of $NH_3$ as a propulsive fuel for a vessel according to the present disclosure;

FIG. 129 is a first schematic top-down depiction of portions of a system using nuclear power to produce $NH_3$ on board a vessel as a propulsive fuel according to the present disclosure;

FIG. 130 is a second schematic top-view depiction of portions of the system using nuclear power to produce $NH_3$ on board a vessel as a propulsive fuel according to the present disclosure;

FIG. 131 is a schematic depiction of portions of the system using nuclear power to produce $NH_3$ on board a vessel as a propulsive fuel according to the present disclosure;

FIGS. 132A and 132B are schematic top-down depictions of portions of an offshore bunkering platform with optional associated distribution center according to the present disclosure;

FIG. 133 is a schematic depiction of the use of a platform such as the platform of FIG. 132A and FIG. 132B;

FIG. 134 is a schematic depiction of a system for control of on-vessel ammonia generation according to the present disclosure;

FIG. 135 is a schematic depiction of utilization of on-vessel ammonia storage and generation according to the present disclosure;

FIG. 136 is a relational block diagram depicting constituent systems of an illustrative prefabricated nuclear plant (PNP) and associated systems with which the PNP interacts according to the present disclosure;

FIG. 137 is a schematic depiction of a manner in which forms and functions of a PNP can be categorized according to the present disclosure;

FIG. 138 is a relational block diagram depicting the relationship of defense systems to other systems of a PNP according to the present disclosure;

FIG. 139 is a relational block diagram depicting the relationships between primary and auxiliary defense systems of PNP according to the present disclosure;

FIG. 140 is a visual schematic depiction of categories of threat against a PNP according to the present disclosure;

FIG. 141 is a tabular schematic depiction of categories of threat against a PNP according to the present disclosure;

FIG. 142 is a schematic depiction of exclusion zones around a marine PNP installation according to the present disclosure;

FIG. 143 is a schematic depiction of exclusion zones around a near-shore PNP installation according to the present disclosure;

FIG. 144 is a schematic depiction of aerial and marine exclusion zones around a marine PNP installation according to the present disclosure;

FIG. 145 is a schematic depiction of a PNP defense perimeter including barges according to the present disclosure;

FIG. 146 is a schematic depiction of a PNP defense zone including windmills as illustrative obstacles to intruder navigation according to the present disclosure;

FIG. 147 is a schematic depiction of defensive barges with netting suspended therefrom according to the present disclosure;

FIG. 148 is a schematic depiction of a defensive barge and a buoy with netting suspended therefrom according to the present disclosure;

FIG. 149 is a schematic depiction of defensive buoys with netting suspended therefrom according to the present disclosure;

FIG. 150 is a schematic depiction of a mooring method for defensive buoys and netting according to the present disclosure;

FIG. 151 is a schematic depiction of defensive perimeter posts with netting and fencing suspended therefrom according to the present disclosure;

FIG. 152 is a schematic depiction of a hybrid defense perimeter barrier including barges and fencing according to the present disclosure;

FIG. 153 is a schematic depiction of a near-shore PNP installation with a hybrid defense perimeter according to the present disclosure;

FIG. 154 is a schematic depiction of a marine PNP installation with a hybrid defense perimeter according to the present disclosure;

FIG. 155 is a schematic depiction of a defense barge of a PNP installation capable of housing and deploying aerial and subsurface drones according to the present disclosure;

FIG. 156 is a schematic depiction of surface and aerial drone swarms confronting an intruding vessel according to the present disclosure;

FIG. 157 is a schematic depiction of surface drones seeking to foul the propellers of an intruding vessel according to the present disclosure;

FIG. 158 is a schematic depiction of defensive hardpoints on a PNP according to the present disclosure;

FIG. 159 is a schematic depiction of a pressurizable defensive cofferdam according to the present disclosure;

FIG. 160 is a schematic depiction of PNP interior regions partly secured by pressurizable cofferdams according to the present disclosure;

FIG. 161 is a schematic depiction of a citadel (interior PNP volume wrapped in protective cofferdams) according to the present disclosure;

FIG. 162 is a schematic depiction of a topside countermeasure washdown system according to the present disclosure;

FIGS. 163A and 163B depict aspects of a topside countermeasure washdown system releasing foam according to the present disclosure;

FIG. 164 is a schematic depiction of a countermeasure washdown system for an interior space according to the present disclosure;

FIG. 165 is a schematic depiction of the stages of fluid flow in a generalized countermeasure washdown system according to the present disclosure;

FIG. 166 is a schematic depiction of a protective artificial fogbank in relation to defensive zones of a PNP according to the present disclosure;

FIG. 167 is a schematic depiction of part of a PNP flow barrier defense system according to the present disclosure;

FIG. 168 is a schematic depiction of the overall layout of a PNP flow barrier defense system according to the present disclosure;

FIG. 169 is a schematic depiction of a waterjet PNP defense system in action according to the present disclosure;

FIG. 170 is a schematic depiction of a boarding-resistant cornice of a PNP deck according to the present disclosure;

FIG. 171 is a schematic depiction of a first type of passive reactive armor according to the present disclosure;

FIG. 172 is a schematic depiction of a second type of passive reactive armor according to the present disclosure;

FIG. 173 is a schematic depiction of passive reactor armor deployed on the exterior of a PNP according to the present disclosure;

FIG. 174 is a schematic depiction of an integral cyber-defense system of a PNP according to the present disclosure;

FIG. 175 is a schematic depiction of a microreactor cassette according to the present disclosure;

FIG. 176 is a schematic depiction of loading microreactors into a microreactor cassette according to the present disclosure;

FIG. 177 is a schematic depiction of a hydraulic lift for facilitating microreactor installation and removal from a microreactor cassette according to the present disclosure;

FIGS. 178A, 178B, 178C, and 178D are schematic depictions of structural and shielding features of a microreactor cassette according to the present disclosure;

FIG. 179 is a schematic depiction of a lattice structure for submerged deployment of a microreactor according to the present disclosure;

FIG. 180A and FIG. 180B are schematic depictions of a dock-based microreactor transportation containment system showing generally horizontal insertion according to the present disclosure;

FIGS. 181A, 181B, and 181C are schematic depictions of embodiments of land-based microreactor storage according to the present disclosure;

FIG. 182 is a schematic depiction of a microreactor storage facility control system according to the present disclosure;

FIG. 183 is a schematic depiction of microreactor allocation control system according to the present disclosure;

FIG. 184A and FIG. 184B are schematic depictions of two views of microreactor demand and allocation according to the present disclosure;

FIG. 185A and FIG. 185B are schematic depictions of the impact of nuclear reactor-based ionized radiation on ballast water according to the present disclosure; and FIG. 186 is a schematic depiction of a hierarchical diagram of marine vessel types according to the present disclosure.

DETAILED DESCRIPTION OF THE FIGURES

The present disclosure will now describe several contemplated embodiments. The discussion of specific embodiments is not intended to limit the scope of the present disclosure. To the contrary, the discussion of several embodiments is intended to illustrate the broad scope of the present disclosure. In addition, the present disclosure is intended to encompass variations and equivalents of the embodiments described herein.

Provided herein are systems, methods, devices, components, and the like for rapid establishment of power-generating systems, such as offshore nuclear power platforms. Further, provided herein are systems, methods, devices, components, and the like for deploying power-generating systems, such as coastal and/or underwater power-generating stations. Yet further, provided herein are systems, methods, devices, components, and the like for nuclear fuel handling, such as nuclear fuel handling in a marine manufactured or prefabricated nuclear platform. Still yet further, provided herein are systems, methods, devices, components, and the like for defense of power-generating systems, such as defense of manufactured or prefabricated nuclear plants. Additionally, provided herein are systems, methods, devices, components, and the like for power production, such as marine power production using heat-pipe cooled microreactors. Yet additionally, provided herein are systems, methods, devices, components, and the like for portable power-generating systems, such as portable microreactor platforms for remote enterprises. Still yet additionally, provided herein are systems, methods, devices, components, and the like for production of maritime fuels, such as production of hydrogen and/or ammonia via a small nuclear reactor for maritime fuels. Also, provided herein are systems, methods, devices, components, and the like for propulsion of large vessels, such as propulsion of maritime vessels via small nuclear reactors. References to "offshore" and "marine" as used herein do not suggest proximity to a landmass. These and similar terms used herein merely facilitate distinguishing embodiments from, for example, land-based deployments. Proximity to a landmass is indicated in the description and/figures where it is relevant to the understanding of the embodiments herein. Further applying these and similar terms to a vessel, structure, platform and the like does not convey any requirement that the vessel, structure, platform and the like be buoyant and therefore floating. Therefore, as an example, an offshore vessel may be a floating vessel; a marine vessel may be moored to a structure or seabed and independent of an ability to float unless context of the corresponding embodiments indicate one or the other.

Power generating stations may be installed within or associated with vessels or may be emplaced. Vessels may be configured to be moved with power generating systems (e.g., microreactors in various configurations) remaining fixed to the vessel. Emplacements may be configured to receive the power generating station or reactor indefinitely to provide power to installations or deployments.

In embodiments, vessel installations may be for stationary vessels and/or for mobile vessels. Mobile vessel installations may be configured to use at least a portion of the power harvested from the power generating system to provide propulsive power of the vessel containing the power generating system. For example, one or more power generating systems may be installed within a commercial shipping vessel to provide at least propulsive power to the commercial shipping vessel.

In embodiments, stationary vessel installations may be configured to receive power from the power generating system and provide the received power to connected facilities or equipment. Stationary vessels may further be configured to be stationary during use and include, for example, offshore platforms (e.g., oil rigs), semi-submersible platforms, drilling ships, crane ships, barge platforms, etc. For example, one or more power generating systems may be permanently or semi-permanently installed within a semi-submersible platform to provide operational power to the semi-submersible platform. In embodiments, the power generating system remains secured to the semi-submersible platform when the semi-submersible platform is deballasted (e.g., during movement between locations for deployment). The stationary installation may provide dedicated power to the buildings or grid or may provide supplementary power to the grids or buildings (e.g., provide additional electrical power to an existing grid). In some aspects, the power generating system may be configured to be deployed in multiple stationary installations at subsequent times and may be configured to provide propulsive force to move the power generating system to and from subsequent stationary installations.

References to nuclear reactor fuels and fuel types herein are not meant to be limiting for use by and with small nuclear reactors and the like. While not all fuel types may be suitable for all deployments and configurations described herein. Where such applicability exists, a subset of fuel types may be referenced. However, unless described otherwise, nuclear fuels that are suitable for use with a nuclear reactor should be considered to be included herein. Below are examples of nuclear fuels.

Oxide fuels: For fission reactors, the fuel (typically based on uranium) is usually based on metal oxide; the oxides are used rather than the metals themselves because the oxide melting point is much higher than that of the metal and because it cannot burn, being already in the oxidized state. Examples include: (i) UOX—Uranium Oxide; and (ii) MOX—Mixed Oxide.

Metal fuels: Metal fuels have the advantage of a much higher heat conductivity than oxide fuels but cannot survive equally high temperatures. Metal fuels have a long history of use, stretching from the Clementine reactor in 1946 to many test and research reactors. Metal fuels have the potential for the highest fissile atom density. Metal fuels are normally alloyed, but some metal fuels have been made with pure uranium metal. Uranium alloys that have been used include uranium aluminum, uranium zirconium, uranium silicon, uranium molybdenum, and uranium zirconium hydride (UZrH). Any of the aforementioned fuels can be made with plutonium and other actinides as part of a closed nuclear fuel cycle. Metal fuels have been used in water reactors and liquid metal fast breeder reactors, such as EBR-II. Exemplary metal-based fuels may include (i) TRIGA fuel; (ii) Actinide fuel; (iii) Molten plutonium.

Non-oxide ceramic fuels: Ceramic fuels other than oxides have the advantage of high heat conductivities and melting points, but they are more prone to swelling than oxide fuels and are not understood as well. Examples include (i) Uranium nitride and (ii) Uranium carbide.

Liquid fuels: Liquid fuels are liquids containing dissolved nuclear fuel and have been shown to offer numerous operational advantages compared to traditional solid fuel approaches. Liquid-fuel reactors offer significant safety advantages due to their inherently stable "self-adjusting" reactor dynamics. This provides two major benefits: (1) virtually eliminating the possibility of a run-away reactor meltdown, (2) providing an automatic load-following capability which is well suited to electricity generation and high-temperature industrial heat applications. Another major advantage of the liquid core is its ability to be drained rapidly into a passively safe dump-tank. This advantage was conclusively demonstrated repeatedly as part of a weekly shutdown procedure during the highly successful 4-year Molten Salt Reactor Experiment. Another advantage of the liquid core is its ability to release xenon gas which normally acts as a neutron absorber and causes structural occlusions in solid fuel elements (leading to the early replacement of solid fuel rods with over 98% of the nuclear fuel unburned, including many long-lived actinides). In contrast, Molten Salt Reactors (MSR) are capable of retaining the fuel mixture for significantly extended periods, which not only increases fuel efficiency dramatically but also incinerates the vast majority of its own waste as part of the normal operational characteristics. Examples include (i) Molten salts, and (ii) Aqueous solutions of uranyl salts.

Common physical forms of nuclear fuel: Uranium dioxide ($UO_2$) powder is compacted to cylindrical pellets and sintered at high temperatures to produce ceramic nuclear fuel pellets with a high density and well-defined physical properties and chemical composition. A grinding process is used to achieve a uniform cylindrical geometry with narrow tolerances. Such fuel pellets are then stacked and filled into the metallic tubes. The metal used for the tubes depends on the design of the reactor. Stainless steel was used in the past, but most reactors now use a zirconium alloy which, in addition to being highly corrosion-resistant, has low neutron absorption. The tubes containing the fuel pellets are sealed: these tubes are called fuel rods. The finished fuel rods are grouped into fuel assemblies that are used to build up the core of a power reactor. Cladding is the outer layer of the fuel rods, standing between the coolant and the nuclear fuel. It is made of a corrosion-resistant material with low absorption cross-section for thermal neutrons, usually Zircaloy or steel in modern constructions, or magnesium with a small amount of aluminum and other metals for the now-obsolete Magnox reactors. Cladding prevents radioactive fission fragments from escaping the fuel into the coolant and contaminating it.

Other common forms of nuclear fuel include (i) Pressurized Water Reactor (PWR) fuel, (ii) Boiling Water Reactor (BWR) fuel; and (iii) CANDU fuel.

Less-common fuel forms: Various other nuclear fuel forms find use in specific applications but lack the widespread use of those found in BWRs, PWRs, and CANDU power plants. Many of these fuel forms are only found in research reactors or have military applications and may include Magnox (magnesium non-oxidizing) fuel.

TRISO fuel: Generally, TRISO fuel consists of a fuel kernel composed of UOX (sometimes UC or UCO) in the center (in case of an eVinci™ reactor it is HALEU), coated with multiple layers of three isotropic materials deposited through chemical vapor deposition (FCVD). The four layers are a porous outer layer made of carbon that absorbs fission product recoils, followed by a dense inner layer of protective pyrolytic carbon (PyC), followed by a ceramic layer of SiC to retain fission products at elevated temperatures and to give the TRISO particle more structural integrity, followed by a dense outer layer of PyC. TRISO particles are then encapsulated into cylindrical or spherical graphite pellets. TRISO fuel particles are designed not to crack due to the stresses from processes (such as differential thermal expansion or fission gas pressure) at temperatures up to 1600° C., and therefore can contain the fuel in the worst of accident scenarios in a properly designed reactor.

Two such reactor designs are (i) the prismatic-block gas-cooled reactor (such as the GT-MHR) and (ii) the pebble-bed reactor (PBR). Both of these reactor designs are high temperature gas reactors (HTGRs). These are also the basic reactor designs of very-high-temperature reactors (VHTRs), one of the six classes of reactor designs in the Generation IV initiative that is attempting to reach even higher HTGR outlet temperatures.

TRISO fuel particles were originally developed in the United Kingdom as part of the Dragon reactor project. Currently, TRISO fuel compacts are being used in the experimental reactors, the HTR-10 in China, and the High-temperature engineering test reactor in Japan. Fuels similar to TRISO may include (i) QUADRISO fuel; (ii) RBMK fuel; (iii) CerMet fuel; and (iv) Plate-type fuel.

Sodium-bonded fuel: Sodium-bonded fuel is actively developed and consists of fuel that has liquid sodium in the gap between the fuel slug (or pellet) and the cladding. This fuel type is often used for sodium-cooled liquid metal fast reactors. It has been used in EBR-I, EBR-II, and the FFTF. The fuel slug may be metallic or ceramic. The sodium bonding is used to reduce the temperature of the fuel.

Accident tolerant fuels: Accident tolerant fuels (ATF) are a series of new nuclear fuel concepts, researched in order to improve fuel performance under accident conditions, such as loss-of-coolant accident (LOCA) or reaction-initiated accidents (RIA). These concerns became more prominent after the Fukushima Daiichi nuclear disaster in Japan, in particular regarding light-water reactor (LWR) fuels performance under accident conditions. The aim of the research is to develop nuclear fuels that can tolerate loss of active cooling for a considerably longer period than the existing fuel designs and prevent or delay the release of radionuclides during an accident. This research is focused on reconsidering the design of fuel pellets and cladding, as well as the interactions between the two. ATF's are active R&D projects.

Fusion fuels: Fusion fuels include deuterium (2H) and tritium (3H) as well as helium-3 (3He). In embodiments, marine deployment of fusion reactors could be constructed to be similar to fission type reactors. Many other elements can be fused together, but the larger electrical charge of their nuclei means that much higher temperatures are required. Only the fusion of the lightest elements is seriously considered as a future energy source. Fusion of the lightest atom, 1H hydrogen, as is done in the Sun and other stars, has also not been considered practical on Earth. Although the energy density of fusion fuel is even higher than fission fuel, and fusion reactions sustained for a few minutes have been achieved, utilizing fusion fuel as a net energy source remains only a theoretical possibility as of this writing.

I. Rapid Establishment of Offshore Nuclear Power Platforms Using Pilings

FIGS. 1-41 illustrate some embodiments of methods and systems for the flexible, rapid installation of premanufactured nuclear plants (PNPs), for example, including small modular reactors (SMRs) by using staged pilings to establish one or more base structures upon the sea floor and then affixing one or more modules containing a nuclear reactor or ancillary facilities to the one or more base structures. SMRs may optionally be powered by low-enrichment uranium, such as HALEU, oxide fuels, non-oxide ceramic fuels, liquid fuels, and the like. In embodiments, PNPs may utilize and/or integrate multiple SMRs that use differing fuel types, such as a HALEU SMR and a non-oxide ceramic fuel SMR. As an example, a PNP may utilize a high output SMR (e.g., 170 MWe) as well as a lower output SMR for backup, emergency, or isolated power distribution purposes and the like. Unless context dictates otherwise, the terms "premanufactured nuclear plant" and "prefabricated nuclear plant" may be interchangeable with the term "offshore nuclear plant" (ONP) as used, for example, in PCT Application Ser. No. PCT/US19/23724 (published as WO 2019/183575) claiming the benefit of U.S. Provisional Pat. App. Ser. No. 62/646,614, the entire content of each is hereby incorporated by reference.

A. Installation

1. First Stage—Drive Temporary Pilings into Seabed

FIG. 1 shows schematically a first stage 100 of an installation procedure according to illustrative embodiments of the present disclosure, where two rows of aligned pilings (e.g., pile or piling 104) are arranged, an additional pile or piling 106 being in process of being forced into the seabed 108 with a piling barge 110 with a crane 112 and a pile driving device 114 suspended from the crane 112. It is noted that the term "seabed" as used herein is intended to encompass any bed for any body of water and should not be understood to limit the present disclosure. In embodiments, pilings are of steel or reinforced concrete and are driven to an approximate common depth 116 whose value depends on pile and seafloor physical characteristics and anticipated force loads. During this stage 100, the barge 110 may be moored with conventional seabed anchors and mooring lines. Numbers, sizes, and arrangements of pilings depicted in all figures herein are illustrative only; various embodiments depart from depicted embodiments in these and other respects.

2. Second Stage—Tow Base into Pilings and Install

FIG. 2 shows schematically a second stage 200 of the installation procedure of FIG. 1. In FIG. 2, a base structure 202 is being towed into position between the two rows of aligned temporary pilings 104, 106 by a towing vessel 204 and a pair of towing lines 206. The base structure 202, whose structure shall be further clarified with reference to FIG. 3, is provided with two outwards-projecting cantilevered ledges 208, 208' that extend outwards from the top of the base structure 202 along two parallel top sides thereof, each ledge 208, 208' being configured to rest atop a corresponding row of pilings 104, 106. The ledges 208, 208' are provided with strong points (e.g., strong point 210), each shaped (e.g., as a downward-facing socket) so as to rest securely atop a piling 104, 106 and collectively able to sustain the weight of the base structure 202 as well as other anticipated loads, forces, and bending moments that might impinge on the strong points (arising, e.g., from wave action upon the base structure 202), at least during the installation stage of the base structure 202 until the base structure 202 is more securely piled to the seabed 368. In the state or stage of installation depicted in FIG. 2, the base structure 202 is not yet aligned with the pilings 104, 106 upon which it is intended to rest; moreover, the volumetric displacement of the base structure 202 is such that the ledges 208, 208' and their strong points ride above the tops of the pilings 104, 106, notwithstanding vertical displacements due to wave action during acceptable sea conditions for performing the installation stage 200. Also, various portions of the seabed base structure 202 are provided with buoyancy devices, where such buoyancy mechanisms may be in the form of floodable tanks and compartments. Thus, the seabed base structure 202 may be towed into place above the pilings intended to support it, then ballasted down upon the pilings by, e.g., allowing water to enter buoyancy compartments.

Thereafter, strong points may be affixed securely and reversibly to pilings 104, 106 (e.g., by transverse thole pins) to prevent untoward motion of the base structure 202.

i. Seabed Base Structure Description

The seabed base structure 202 also includes an inwards-projecting beam framework or structure 212, also conceivable as a perforated horizontal platform, and upwards-extending wall structures 214, 214', 214" arranged along three sides of the periphery of the base structure 202. The wall structures 214, 214', 214", together with the beam structure 212 and ledges 208, 208', together constitute the bulk of the seabed base structure 202. The longitudinal and transverse beams of the illustrative beam structure 212 form open rectangular compartments; these compartments may be closed at their lower ends by a nether slab or the compartments may be open downwards. The upper edges of said longitudinal and transverse beams or walls are typically submerged when the seabed base structure 202 is resting atop the pilings, and thus may serve as a supporting, strengthening structure for a module (e.g., a reactor module, such as a micro-MPS, SRM-MPS and the like) that can be docked in the seabed base structure 202, e.g., floated between the upwards-extending wall structures 214, 214', 214" and over the submerged beam structure 212, then ballasted down to rest on the upper surface of the beam structure 212.

ii. Seabed Base Structure Functionality and Piling Connection Points

The seabed base structure 202 is intended to be placed on or just above the seabed 368, supported and affixed by a number of permanent pilings (not shown in FIG. 2) driven through the beam structure 212 as the latter is held in position by the temporary pilings portrayed in FIG. 2. The base structure 202 may rest on the seabed, fixed thereto by said permanent pilings. As clarified in FIG. 3, there are perforations in the beam structure 212 for receipt of permanent pilings, intended to be driven into the seabed. Also, in various embodiments, the upward extending wall structures 214, 214', 214" have perforations or ducts/sleeves that accommodate optional and/or additional pilings. The ducts and accessories for receiving the pilings are described in International Pat. App. PCT/NO2015/050156 (International PCT Pat. App. Publication No. WO 2016/085347), which hereby is incorporated in its entirety by reference.

iii. Seabed Base Structure Description with Temporary and Permanent Pilings

FIG. 3 shows schematically in perspective, as seen from below, the illustrative seabed base structure 202 of FIG. 2. As shown, the lower sides of the cantilevered ledges 208, 208' are provided with strong points (e.g., strong point 302) that are configured, designed and dimensioned to receive the upper ends of the temporary pilings depicted in FIG. 2 which will support the seabed base structure 202 at least until a sufficient number of permanent pilings are provided. For example, strong point 302 is provided with an aperture 304 for accommodating the upper portion of a temporary piling. As also shown in FIG. 3, the upwards projecting walls 214, 214" (wall 214' of FIG. 2 is not visible in the view of FIG. 3) are interconnected by a beam structure 212 whose beams forming upwards open cells without a top or a bottom slab. The beam structure 212 is configured to support a module that may be floated into position and deballasted to rest upon the upper surface of the beam structure 212. Channels or apertures (e.g., aperture 306) are provided in the beams of the beam structure 212 to accommodate permanent pilings. In a typical installation procedure, the piling apertures 306 in the beam structure 212 pass completely through the beam structure 212 and allow permanent pilings to be driven from above, through the beam structure 212, and into the seafloor. In typical embodiments, the number of permanent pilings will be greater than the number of temporary pilings, as the permanent pilings must support not only the weight of the seabed base structure 202 but also that of a module (e.g., reactor module) installed thereupon, and must enable the combined structure to withstand all plausible force loads (from, e.g., hurricane winds, rogue waves, tsunamis) with an acceptable margin of safety. In various embodiments, apertures for permanent pilings are also provided in the cantilevered ledges 208, 208', enabling a greater number of permanent pilings to be employed than could be accommodated by the beam structure 212 alone. Of note, “temporary” pilings are not necessarily removed upon the installation of permanent pilings, but are in some embodiments allowed to remain; they are termed “temporary” herein because the reliance of the seabed base structure upon them for stability is temporary, being superseded for the most part by reliance upon the permanent pilings.

iv. Substage—Permanent Piling Installation

FIG. 4 shows schematically in perspective the seabed base structure 202 of FIG. 2 and FIG. 3 positioned and supported by temporary pilings (e.g., piling 402) that are in an aligned position along at least both sides of the base structure 202. A portion of the water surface 404 is depicted. Permanent pilings may now be installed by driving the pilings vertically through the apertures or ducts of the beam structure 212 down into the seabed sufficient depth for stably supporting the base structure 202 and its future loads. Once driven, pilings may be affixed to the seabed base structure 202 by various mechanisms, e.g., thole pins, notched insteps, or the like. The base structure 202 may thus be permanently fixed to the seabed by permanent pilings while the base structure 202 is stably held in position and supported by the rows of temporary pilings. The number of temporary and permanent pilings used and their position, diameter, and length depend on the weight to be supported and on the seabed soil condition. An advantage of embodiments of the present disclosure is that the seabed base structure 202, constituting a support for one or more floatable modules, such as a reactor module according to the present disclosure, can not only be installed offshore or nearshore but can also be detached from its pilings, floated off them, and be moved to a new location or replaced by another seabed base structure. An additional advantage of a seabed structure is that it provides a landmass-based anchoring for the reactor module. This may facilitate, such as for regulatory purview, recognition of the reactor as a fixed to the land deployment even though it is disposed offshore. This may be similar to onshore near-sea level construction that places a structure, such as a home or office building, on a set of pilings to permit tidal flows there under without impacting the home or office building.

v. Two Base Structures—First with Reactor and Second with Power Conversion Module (e.g., Receives Heat and Converts to Energy)

FIG. 5 shows schematically an illustrative installation 500 including two seabed base structures 502, 504 that have been installed upon a seabed 506 by a number of permanent pilings (e.g., piling 508) driven through the beam structures 510, 512 of the two base structures 502, 504. In an example, the first base structure 510 is intended to accommodate a reactor module and the second base structure is intended to accommodate a power conversion module including turbines and generators. Some features, including strong points and temporary pilings, have been omitted for clarity.

vi. Single Square of Modular Base

FIG. 6 shows schematically portions of an illustrative seabed base structure 600, including the beam structure 602, of illustrative embodiments similar to that of FIG. 2. The base structure 600 is founded upon the seabed with a number of permanent pilings, e.g., piling 604. Moreover, the base structure 602 has been prepared for receipt of a module (e.g., a reactor module) by the installation of a number of architectural seismic isolators (e.g., isolator 606), here represented in simplified schematic form as buttonlike objects. Seismic isolators similar to those already employed in some architectural settings are contemplated. Once a nuclear power module is floated into place above the beam structure 602, it may be ballasted down upon the isolators and affixed thereto. Alternatively, or additionally, seismic isolators may be placed between the upper ends of the pilings and their points of contact with the beam structure 602.

vii. Walls can Include Removable Sheets to Reduce Imparted Forces from Wave Action Prior to Full Installation FIG. 7 shows schematically portions of an illustrative seabed base structure 700, including the beam structure 702, of illustrative embodiments. The base structure 700 is founded upon the seabed by a number of permanent pilings, e.g., piling 704, and includes three upwards projecting walls 706, 708, 710 that together approximate an artificial harbor open on side. In the illustrative structure 700, the walls are of relatively great height and aerial extent; this may enable wind or wave to exert excessive forces upon the structure 700, e.g., prior to installation of permanent pilings and/or prior to installation of one or more modules (e.g., a nuclear power module) upon the beam structure 702, whereupon the one or more modules, by their relatively great mass, will tend to stabilize the installation against environmental forces. To reduce such forces to an acceptable range, the vertical walls 706, 708, 710 are in this example equipped with a number of slotted bays or cutouts (e.g., bay 712) some or all of which are, in an initial state of the structure 700, open to passage of wind and wave. After installation of permanent pilings and/or one or more modules, the slotted cutouts are filled by the insertion from above of fitted sheets (e.g., sheet 714, shown in a state of partial insertion), which then defend the interior of the seabed base structure 700 from the lateral action of wind and wave.

viii. Another Stage—Floating Reactor Module Arrives.

FIG. 8A depicts schematically aspects of a stage in the assembly of illustrative embodiments at 800. In FIG. 8A, only the portions of objects that rise above the waterline are depicted. A floating module (e.g., an aircraft impact protection structure or reactor module) 802 is in the process of being towed or propelled toward the artificial harbor 804 proffered by a seabed base structure 806 that is similar to those shown in FIGS. 8B and 8C and is founded upon the seabed by a number of permanent pilings. The module 802 may be sized and shaped to occupy some or all of the harbor 804 and floats at a level that permits entry into the harbor 804 with at least slight clearance above the upper surface of the beam structure of the seabed base structure 806.

ix. Another Stage—Floating Module Moved Through Open Side of Artificial Harbor

FIG. 8B depicts schematically another stage in the assembly of the illustrative embodiments at 800 of FIG. 8A. In FIG. 8B, the module 802 is in the process of being floated into the harbor 804 proffered by the seabed base structure 806.

3. Third Stage—Module Installed into Artificial Harbor and Ballasted

FIG. 8C depicts schematically a third stage in the assembly of the illustrative embodiments at 800 of FIG. 8A. In FIG. 8C, the module 802 has been fully inserted into the harbor proffered by the seabed base structure 806. In further stages of installation of the module 802, it is ballasted down upon the beam structure of the base structure 806, e.g., by allowing water to enter internal chambers, coming to rest upon seismic isolators or other force-transmitting supports. In another example of ballasting method, the module 802 is ballasted by externally attached pontoons or floats, which may be detached in sections and/or emptied and filled with water by pumps, changing their specific gravity and raising or lowering the module 802 in a controlled manner. Such external ballasting methods are also used, in various embodiments, for raising and lowering seabed base structures.

B. Installed Structures

1. Aircraft-Impact Shield

FIG. 9 depicts schematically portions of an illustrative installation 900 according to embodiments. The installation 900 includes a seabed base structure 902 that is founded upon the seabed with a number of permanent pilings, e.g., piling 904. It also includes a module 906 that has been installed within the seabed base structure 902 as, for example, by a process similar to that illustrated in FIGS. 8A-8C. In the illustrative installation 900, the module 906 is an aircraft impact shield, e.g., a large box of reinforced concrete. In various embodiments, the aircraft impact shield includes concrete, steel, composite materials, rock or earth, ice, solid foam, and various other materials arranged in layers, ribs, blocks, mixtures, or other configurations that enhance the shield's ability to absorb or deflect the effects of impact by an aircraft, missile, projectile, explosion, or other threat to nuclear plant integrity. The module 906 having been installed, a sliding, hinged, or otherwise moveable doorway 908 of the module 906 facing toward the open side of the base structure 902 may be opened, as depicted in FIG. 9. As hinged movement of a massive structure requires massive hinge hardware, in various embodiments, the door or portions thereof are lifted into and out of place by a crane, slid sideways as guided by tracks or grooves, or slid up or down vertically as guided by tracks, towers, or grooves. Also, in various embodiments, the door or portions thereof are omitted. As shall be shown in FIG. 10, an additional floatable module may then be installed within the shield module 906 and the opening closed behind the additional module to complete aircraft-impact coverage. Alternatively, the opening of the module may be wholly or partly closed and opened by the attachment and detachment of a set of panels rather than the operation of a single door panel. Also, additional permanent and/or openable and closeable openings and perforations in any or all of the side surfaces of the rectangular-solid-shaped module 906 are included with various embodiments. Also, in various embodiments, the aircraft impact shield module 906 is shaped otherwise than as depicted in FIG. 9 (e.g., with an arched top), or is delivered to the base structure 902 in two or more floatable portions. These and other variations on the installation 900 and other installations depicted herein, and on the methods of assembly of such installations depicted and discussed, are contemplated and within the scope of the present disclosure.

i. Floatable Reactor Module Installed within the Aircraft-Impact Shield

FIG. 10 shows schematically and in cutaway view portions of an illustrative installation 1000 according to embodiments. The installation 1000 includes a seabed base structure 1002 that is founded upon the seabed with a number of permanent pilings, e.g., piling 1004. It also includes an aircraft impact shield module 1006 that has been installed within the seabed base structure 1002, as depicted in FIG. 9. Also, an opening at an unobstructed end of the base structure 1002 is open in the state depicted in FIG. 10 and a floatable reactor module 1008 is approaching the opening. The reactor module includes an SMR 1010 and additional facilities for the extraction of heat energy from the SMR 1010. The floatable reactor module 1008 is preferably inserted wholly within the aircraft impact shield module 1006, after which the opening by which the reactor module 1008 entered is sealed by a section of the shield. In various embodiments, the interior of the aircraft shield 1006 is partly flooded during an installation of the reactor module 1008, enabling the reactor module 1008 to be floated within the shield 1006 and then ballasted down, after which the entry to the shield 1006 is at least partly blocked and its interior pumped out. Note, given the large mass of a typical reactor module or other modules, the draft of a typical module may be significantly deeper than that depicted or implied by schematic Figures herein.

2. Two-Base-Structure Installation

FIG. 11 schematically depicts portions of an illustrative nuclear power generation station 1100 according to embodiments. The station 1100 includes two seabed base structures 1102, 1104 supporting two modules 1106, 1108, where one module 1106 is a reactor module and the other module 1108 is a power conversion module. Because the modules 1102, 1104 are close to each other, it is straightforward to bridge the gap between them to convey steam from the reactor module 1106 to the power module 1108, condensate and electrical power from the power module 1108 back to the reactor module 1106, and communications, control signals, and human and mechanical traffic in both directions.

i. Cross-Section of Two-Base-Structure Installation

FIG. 13 depicts cross-sectionally and schematically portions of an illustrative nuclear power generating station 1300 that incorporates a version of the emergency cooling method. Station 1300 includes a reactor module 1302 and a power conversion module 1304, each founded upon the seabed 1306 by a seabed base structure 1308, 1310 and a number of permanent pilings (e.g., piling 1312). The two modules 1302, 1304 are close enough to each other so that bridge connections (e.g., bridge connection 1314) can convey steam, condensate, power, and other flows between them. The reactor module 1302 creates high-pressure steam that is conveyed via a bridge connection to the power conversion module 1304, which includes one or more turbines and generators, condensers, coolant pumps for the condensers, and other power-conversion machinery. The reactor module 1302 includes an SMR housed in a reactor pressure vessel 1316; the reactor vessel 1316 is in turn housed within a containment 1318 of the pressure-suppression type (indicated by a heavy black rectangle). That is, the reactor pressure vessel 1316 is surrounded, within the containment 1318, by a dry (air-filled volume) and a wet (water-containing) volume or pressure-suppression pool 1320. In the event of a loss of coolant accident that produce fuel-element damage in the reactor core and high-pressure steam release from the reactor vessel 1316, the released steam encounters the much greater mass of the water of the pool 1320 and is condensed, raising the temperature of the pool but mitigating pressure rise in the containment, with the ultimate goal of preventing environmental release of radioactive material from the reactor. Additional water in tanks (e.g., tank 1322) housed within the containment can be released under gravity feed to supply coolant to the interior of the reactor. In an example, the containment has walls of reinforced concrete 1.2 meters thick with an 8 mm steel inner liner.

ii. Top Down View of Two-Base-Structure Installation

FIG. 14 schematically portrays portions of the system 1300 of FIG. 13 in top-down view (horizontal cross-section). The reactor vessel 1316 is contained, along with pressure-suppression mechanisms, inside the containment vessel 1318. Lines 1314 conducts steam from the reactor vessel 1316 to components in the power conversion module 1304 and condensate in the opposite direction. A pipe detour coupler 1402 provides for acceptable flexure of the high-pressure steam/condensate lines 1314 in case of seismic, weather-driven, or other displacements of the reactor module 1302 or other portions of the system 1300.

3. Cooling Tower Installed on Pilings

FIG. 12 schematically depicts portions of an illustrative nuclear power generation station 1200 according to embodiments. The station 1200 includes two seabed base structures 1202, 1204 supporting two modules 1206, 1208, where one module 1206 is a reactor module and the other 1208 is a power conversion module. The station 1200 also includes a cooling tower 1210 (also referred to generally as a cooling module) that is stationed upon a number of seabed pilings similar to those supporting the modules 1206, 1208. The illustrative cooling tower 1210 could be constructed in situ but is preferably constructed elsewhere and floated to the site of the station 1200. A prefabricated cooling tower 1210 can be transported to a prepared set of pilings and installed upon pilings using a variety of techniques; in an example, a cooling tower 1210 could be floated upon a temporary ring-shaped barge including two C-shaped major sections from its place of manufacture to a position above the pilings, then ballasted down upon the pilings. After ballasting down, the ring-shaped barge would surround the pilings, whereupon its two C-shaped portions could be detached from each other, towed away from the pilings, deballasted for towage, and preferably re-used. Other methods of installation of a cooling tower module 1210 are also contemplated for various embodiments: in another example, a cooling tower is installed atop a floatable rectangular module similar to the reactor and power modules 1206, 1208 and is docked into a seabed base structure using a procedure similar to that depicted in FIGS. 8A, 8B, and 8C.

4. Integral Reactor—Steam Generators within the Reactor Vessel

Mention is now made of an illustrative passive cooling method that is contemplated for a number of embodiments including SMRs. The method is disclosed in U.S. Pat. No. 6,795,518 B1 (hereinafter "U.S. Pat. No. 6,795,518 B1"), "Integral PWR with Diverse Emergency Cooling and Method of Operating Same," the disclosure of which is incorporated herein in its entirety by reference. Herein, an "integral" reactor is one whose steam generators are enclosed in the reactor vessel. In the methodology, passive emergency cooling in response to a loss of coolant accident in a pressurized water reactor having an integral reactor pressure vessel incorporating the steam generators and housed in a small high-pressure containment vessel is provided by circulating cooling water through the steam generators and heat exchangers in an external tank to cool the reactor vessel, limiting the pressure in the containment and preferably lowering the pressure in the reactor vessel below that in the containment to induce coolant flow into the reactor vessel and so keep the reactor core covered with water without the addition of makeup water. Water-containing suppression tanks inside the small high-pressure containment structure limit peak blowdown pressure in the containment. Gravity-fed makeup water can also be supplied from tanks to cool the core. The passive cooling methods of U.S. Pat. No. 6,795,518 B1 can be preferred, but not required, for embodiments of the present disclosure. Integral reactors may utilize low enriched uranium, such as HALEU and the like.

C. SMR Descriptions

Next, a number of Figures depict illustrative embodiments including SMRs of various designs. These Figures illustrate the feasibility of accommodating a wide variety of SMR designs in embodiments of the present disclosure, including designs not yet extant, and are in no way restrictive of the SMRs or other nuclear reactor types or classes contemplated for inclusion in embodiments of the present disclosure.

1. CAREM

Mention is now made of the CAREM (Spanish: Central Argentina de Elementos Modulares) reactor, which is illustrative of a class of SMRs that is contemplated for inclusion in a number of embodiments, e.g., some embodiments incorporating the passive cooling system described with reference to FIG. 13 and FIG. 14. The CAREM reactor is an approximately cylindrical integral SMR with 12 symmetrically arranged steam generators inside the reactor vessel.

i. Side View of CAREM

FIG. 15 is a schematic side-view depiction of portions of an illustrative CAREM reactor 1500 including portions of its passive cooling system, showing the reactor vessel 1502, the weight-bearing mounting skirt 1504, a number of steam circulation lines (e.g., line 1506), a steam manifold 1508 with which at least some of the steam circulation lines are in fluid communication, and steam lines 1510 in fluid communication with a power generation module. In embodiments, coolant condensate lines may return from the power generation module to the 12 steam generators within the reactor vessel 1502.

ii. Top View of CAREM

FIG. 16 is a schematic top-down depiction of portions of the illustrative CAREM reactor 1500 of FIG. 15. Twelve steam lines (e.g., line 1506) are arranged radially around the reactor vessel 1502, corresponding to 12 integral steam generators inside the vessel 1502. Six of the steam lines communicate with a first circular manifold 1602 and the other six lines communicate with a second circular manifold 1604. The manifolds 1602, 1604 communicate via additional lines 1606, 1608 with turbines of a power plant module. In embodiments, coolant condensate lines may return from the power generation module to the 12 steam generators within the reactor vessel 1502.

iii. CAREM with Second Shutdown System

FIG. 17 is a schematic perspective depiction of portions of the illustrative CAREM reactor 1500 of FIG. 15, including portions of an emergency cooling system termed the Second Shutdown System (SSS). In this view, two circular steam manifolds 1602, 1604 are visible. The SSS includes two tanks 1702, 1704 containing borated water, with gravity-feed pipes 1706, 1708 that can supply water to the reactor vessel 1502 without active pumping and pipes 1710, 1712 for return of heated coolant to the tanks 1702, 1704. In embodiments, coolant condensate lines may return from the power generation module to the 12 steam generators within the reactor vessel 1502. A flexure relief bow 1714 communicates with one manifold 1602 via steam pipe 1606 and with the other manifold 1604 via steam pipe 1608. The flexure relief bow 1714 allows for the accommodation of a greater degree of non-damaging lateral movement of the system 1500 or components thereof, relative to other components (e.g., a power generation module), as well as of thermal expansion and contraction. The two pipes 1606, 1608 merge on the distal side of the flexure relief bow 1714 to form a single pipe 1716 in fluid communication with a power generation module. In an example, the two tanks 1702, 1704 of the SSS each contain ~1 m3 of borated water which can be dropped into the reactor pressure vessel 1502 under the action of gravity in less than 35 minutes. The water acts both as a coolant and as a vehicle for boron, typically used to extinguish nuclear chain reactions. Either tank 1702, 1704 suffices to produce complete extinction of the nuclear chain reaction in the reactor.

a. x-Section of CAREM and Shutdown Systems

FIG. 18 depicts in vertical, cross-sectional, schematic form portions of an illustrative nuclear module 1800 including a CAREM-type nuclear reactor 1802 according to embodiments. FIG. 18 particularly highlights illustrative safety features included with the reactor 1802, which are safety systems designed on the basis of simplicity and reliability and are mainly of the passive type, since these do not need any external power or fluid inputs to operate and thus reduce the number of possible failure modes. Illustrative forms of some safety systems included with the module 1800 in various embodiments may include, for example, a first shutdown system (FSS) 1804 (in examples, alternatively referred to as a fast shutdown system), a second shutdown system (SSS) 1806 (in examples, alternatively referred to as a passive shutdown system), pressure relief valves (PRV), a passive decay heat removal system (PHRS) 1810, an emergency injection system (EIS) 1812, a containment system, combinations thereof, and the like.

b. Fast Shutdown System

The fast shutdown system 1804 provides, for example, absorbing elements that can be introduced to the core to produce substantially immediate extinction of the nuclear chain reaction. Each absorbing element within the reactor 1802 may be made of, for example, a set of Ag—In—Cd absorbing rods that move as a single unit. In examples, the FSS has 25 absorbing elements that can be dropped into the core by the action of gravity to produce immediate extinction of the nuclear chain reaction therein.

c. Second Shutdown System

The second shutdown system (SSS) 1806, portions of which have been depicted in FIG. 17, provides, for example, gravity-pressurized emergency boron injection. In examples, when the SSS is triggered, the storage tanks (e.g., two tanks, each with about 1 m3 capacity) release borated water into the pressure vessel of reactor 1802 by the action of gravity, for example, in less than about 35 minutes. Although the SSS is a backup for the FSS, each tank may be able to produce the complete extinction of the reactor without additional elements (e.g., a single tank is able to stop the chain reaction while additional tanks are included to provide a desired level of redundancy). As an example, only one SSS tank is depicted in FIG. 18.

d. Pressure Relief Valves

The pressure relief valves (PRV), e.g., valve 1808, are in fluid communication with the pressure vessel of the reactor 1802 and are actuated in response to sensing a pressure greater than a predetermined threshold. Each pressure relief valve may be, for example, in-line with a pipe of the SSS 1806 that is in fluid communication with the pressure vessel of the reactor 1802. The pressure relief valves 1808 may be constructed to open in an active manner (e.g., electronic actuation), a passive manner (e.g., mechanical actuation in response to predetermined physical conditions), or both active and passive manners. For example, the pressure relief valves 1808 may be commanded to open by a control system, may be actuated in response to a temperature difference between the interior and exterior of the valve surpassing a certain threshold, or under either condition. Each pressure relief valve 1808 may be separately capable of passing sufficient coolant flow and thus pressure relief to protect the mechanical integrity of the reactor 1802 pressure vessel against overpressure arising from, for example, imbalance between power generated in the core and power extracted from the core by the heat-removal system (steam circulation system). The pressure relief valves may remain in the open position until being replaced or manually reset or may automatically return to the closed position upon the pressure falling below the predetermined threshold.

e. Passive Decay Heat Removal

The passive decay heat removal system (PHRS) 1810 is a heat-removal device designed to reduce the pressure on the primary coolant system and to remove radioactive decay heat in response to a loss-of-heat-sink accident by condensing steam from the primary system in emergency condensers. The emergency condensers of the PHRS 1810 are heat exchangers consisting of an arrangement of parallel horizontal U tubes between two common headers. The top header is connected to the steam dome of reactor 1802 and the lower header is connected to the reactor 1802 at a position below the water level (e.g., at the bottom). Features of the PHRS 1810 are described as follows, though not all are separately and particularly depicted in FIG. 18: The condensers are located in a pool filled with cold water inside the containment building and are, in a non-triggered state, cold and filled with water. The inlet valves in the PHRS steam line (from the top of the reactor 1802) are always open, while the outlet valves are normally closed. When the PHRS 1810 is triggered, the outlet valves open automatically. The water drains from the tubes and steam from the primary system enters the tube bundles and condenses on the cold inner surfaces of the PHRS's tubes. The resulting condensate returns to the reactor 1802, closing a natural circulation circuit. During the condensation process, heat is transferred from the condenser tubes to the water of the pool. Evaporated pool water is then condensed in the suppression pool of the containment (to be described further herein).

f. Emergency Injection System

The emergency injection system (EIS), e.g., low-pressure EIS 1812, prevents core exposure in case of a loss-of-coolant accident (LOCA). In response to the LOCA, the primary system is depressurized and, given participation of the passive heat removal system and/or the boron injection system, pressure inside the reactor 1802 goes down to less than 1.5 MPa with the core fully covered. At 1.5 MPa, the low-pressure EIS 1812 comes into operation. The system consists of two borated water tanks connected to the pressure relief valves. In the event of a LOCA, tank pressure of 2.8 MPa produces the breakup of a 1.5 MPa pressure seal, flooding the pressure vessel of the reactor 1802. In examples, the emergency injection system provides 36 hours of protection to the core.

g. Containment System

The containment system is, for example, a pressure-suppression type containment system. The containment system includes, for example, a sealed containment structure 1814 (indicated by heavy black rectangle) surrounding the reactor 1802 that includes both a dry enclosed volume (e.g., an air-filled volume) and a wet enclosed volume (e.g., a water-filled volume). In the illustrated embodiment, the wet enclosed volume is a pressure suppression pool (PSP) 1816, indicated by the stippled area of the illustration. Leaks in the primary system increase pressure within the dry volume. The rise in pressure of the dry volume forces vapor into the PSP 1816. The vapor introduced into the PSP 1816 is condensed to thereby increase the temperature in the PSP 1816. In case of a LOCA with fuel element damage, a high portion of fission products are retained in the PSP 1816, which in an example can be built with 1.2 m thick walls made of reinforced concrete with an 8 mm steel liner.

Any or all of the safety systems disclosed herein, as well as others described herein and the like, are included with various embodiments in association with either CAREM-type SMRs or other types of SMR.

2. NuScale™ SMR

Mention is now made of a NuScale™ SMR, an integral pressurized water reactor with internal passive coolant circulation (IPW/IPC) that is illustrative of a class of SMRs that is contemplated for inclusion in a number of embodiments, e.g., some embodiments incorporating the passive cooling system described with reference to FIG. 13 and FIG. 14. The IPW/IPC reactor is an approximately cylindrical integral SMR.

FIG. 19 depicts in vertical, cross-sectional, schematic form portions of an illustrative nuclear module 1900 including four IPW/IPC-type reactors (two of which are clearly visible in this cross-sectional view, e.g., a first reactor 1902 and a second reactor 1904) according to embodiments. The four SMRs are housed in a reactor module 1906 that is protected by an aircraft impact shield 1908, both modules being supported by a seabed base structure 1910 that is founded upon the seabed 1912 with a number of permanent pilings (e.g., piling 1914). The reactor module 1906, shield 1908, and base structure 1910 can be delivered to the site by flotation and stepwise assembly similar to those described herein. The four SMRs are housed in a flooded reactor hall, pool, or gallery, as shall be made clear with reference to FIG. 20, which communicates with a flooded handling pool 1916 through an opening that can be sealed off by a door 1918. In embodiments, the flooded handling pool 1916 may be in fluid communication with the seawater.

FIG. 20 depicts in horizontal, cross-sectional, schematic form portions of the illustrative nuclear module 1900 of FIG. 19. The four SMRs 1902, 1904, 2002, 2004 are housed in a flooded reactor hall, pool, or gallery 2006 that is divided into single-SMR compartments by bulkheads (e.g., bulkhead 2008) that can be isolated or placed into communication by moveable doors (e.g., door 2010). The reactor hall 2006 can be isolated or placed into communication with a flooded handling pool 1916 by moveable doors 1918. The reactor module 1906 also contains an overhead crane system including a crane of the trolley-crossbeam type, capable of moving the SMRs and components thereof (e.g., pressure vessel heads) about in at least a portion of the flooded reactor hall 2006 and the handling pool 1916. The module 1906 also includes various devices and provisions, e.g., for controlling operations, exchanging fuel and/or SMRs with ships or other outside facilities, moving fuel assemblies internally, laying down and standing up SMRs, extracting fuel from SMRs and inserting fuel into SMRs, and the like. The module 1906 includes a flooded spent-fuel storage area 2012. In various embodiments, the number of SMRs included is greater than or equal to 1. In embodiments, nuclear fuel exchanged, moved, inserted, and the like described herein and above may be High Assay Low Enriched Uranium (HALEU) and the like, such as low enrichment uranium of less than 20% enrichment. In embodiments, the flooded reactor hall 2006 may be in fluid communication or in indirect communication via a closed two loop system utilizing a heat-exchanger with the proximal seawater, thereby providing a potentially limitless thermal sink for dissipating reactor heat.

FIG. 21 depicts in horizontal, cross-sectional, schematic form portions of an illustrative power conversion module 2100 including four IPW/IPC-type SMRs 2102, 2104, 2106, 2108. Provisions included with power conversion module 2100 for a flooded reactor pool, handling pool, waste storage pool, and other devices pertaining to handling SMRs and fuel are similar to those already portrayed and described for nuclear module 1900 of FIG. 19. The illustrative power conversion module 2100, however, in addition to all these features, includes four turbine-generator units 2110, 2112, 2114, 2116, each of which exchanges steam and condensate with one of the four SMRs 2102, 2104, 2106, 2108 via corresponding piped circuits 2118, 2120, 2122, 2124 and generates power. In contrast, the nuclear module 1900 of FIG. 19 exchange steam and condensate with one or more turbine-generator units housed in a separate power module. In various embodiments, a power conversion module includes any number of turbine-generator units greater than or equal to 1.

3. Rolls Royce SMR/UK SMR

Mention is now made of the Rolls Royce or the United Kingdom (UK) SMR, another SMR that is illustrative of a class of SMRs contemplated for inclusion in a number of embodiments, e.g., some embodiments incorporating the passive cooling system described with reference to FIG. 13 and FIG. 14. The UK SMR is a three-loop, close-coupled pressurized water reactor (PWR) providing a power output of 450 MWe from 1200-1350 MWth using industry standard $UO_2$ fuel. Coolant is circulated via three centrifugal reactor coolant pumps to three corresponding vertical u-tube steam generators. The design includes multiple active and passive safety systems, each with substantial internal redundancy.

FIG. 22A depicts schematically in side view portions of a UK SMR 2200. SMR 2200 includes three vertical u-tube steam generators, two of which 2202, 2204 are visible in the view of FIG. 22A. Pressurized hot water is conducted to each steam generator from the reactor pressure vessel 2206 by piping, and cool water is pumped from each steam generator back into the pressure vessel 2206 via additional piping and a dedicated pump: e.g., hot water is conducted from the pressure vessel 2206 via piping 2208 to the steam generator 2204, and cool water is returned to the pressure vessel 2206 via a pump 2210 and piping 2212. Steam from the three steam generators is conducted via piping to one or more turbine-generators to generate electricity. Moreover, a pressurizer 2214 is connected via piping 2216 to the reactor coolant system pipework hot leg. Primary circuit pressure is controlled by use of electrical heaters located at the base of the pressurizer 2214 and spray from a nozzle located at the top of the pressurizer 2214. Steam and water are maintained in equilibrium to provide the necessary overpressure. The pressurizer 2214 is a vertical, cylindrical vessel with top and bottom heads constructed of low alloy steel. The UK SMR 2200 employs surge-induced spray whereby primary coolant passively expands into the spray line causing spray. This provides a simple and safe configuration. The pressurizer 2214 is sized to provide robust and passive fault response for bounding faults, with accidents causing either rapid and significant cooldown or heat-up accommodated. The reactor pressure vessel 2206 is surmounted by a control rod drive mechanism 2218.

The steam generators of UK SMR 2200 are located asymmetrically around the reactor pressure vessel 2206 so that access is provided to support removal and movement of the reactor pressure vessel head and internals to storage locations within the containment boundary in support of refueling operations. The reactor coolant system uses pumped forced flow at power, but is also configured to provide natural circulation flow for passive decay heat removal, by virtue of steam-generator elevation above the reactor pressure vessel 2206, which ensures a robust thermal driving head between the thermal centers of the core and the steam generators.

FIG. 22B depicts the UK SMR 2200 of FIG. 22A from a top-down perspective. Visible are three steam generators 2202, 2204, 2220, the reactor pressure vessel 2206, the control rod drive mechanism 2218, and the pressurizer 2214. The piping 2216 that connects the pressurizer 2214 to the pipework hot leg 2222 is depicted.

FIG. 23 depicts in vertical, cross-sectional, schematic form portions of an illustrative nuclear module 2300 including a single UK SMR 2302 according to embodiments. The SMR is housed in a reactor module 2304 that is protected by an aircraft impact shield 2306, both modules being supported by a seabed base structure 2308 that is founded upon the seabed with a number of permanent pilings (e.g., piling 2310). The SMR 2302 is housed within a sealed containment structure 2312.

4. System Integrated Modular Advanced Reactor (SMART) SMR

Mention is now made of the System Integrated Modular Advanced Reactor (SMART), a small integral PWR with a rated power of 330 MWth or 100 MWe. To enhance safety and reliability, the design configuration has incorporated inherent safety features and passive safety systems. The design aim is to achieve improvement in the economics through system simplification, component modularization, reduction of construction time and high plant availability. By introducing a passive residual heat removal system and an advanced mitigation system for loss of coolant accidents, significant safety enhancement can be expected.

FIG. 24 depicts in vertical, cross-sectional, schematic form portions of an illustrative nuclear module 2400 including a single SMART SMR 2402 according to embodiments. The SMR is housed in a reactor module 2404 that is protected by an aircraft impact shield 2406, both modules being supported by a seabed base structure 2408 that is founded upon the seabed with a number of permanent pilings (e.g., piling 2410). The SMR 2402 is housed within a sealed containment structure 2412 (indicated by heavy black rectangle) that includes both a dry (air-filled) enclosed volume and a wet (water-filled) volume, the latter being the pressure suppression pool 2414 (stippled area).

5. mPower SMR

Mention is now made of the mPower SMR, an integral PWR designed by Generation mPower and its affiliates Babcock & Wilco mPower, Inc. and Bechtel Power Corporation, to generate a nominal output of 180 MWe per module. Aspects of the mPower-type SMR have been disclosed in, for example, U.S. Pat. No. 9,343,187, "Compact nuclear reactor with integral steam generator," the entire disclosure of which is incorporated herein by reference. In a standard plant design, each mPower plant is included of two mPower units, generating a nominal 360 MWe. The design adopts internal steam supply system components, once-through steam generators, pressurizer, in-vessel control rod drive mechanisms, and horizontally mounted canned motor pumps for its primary cooling circuit and passive safety systems. The mPower SMR uses eight internal integrated coolant pumps with external motors to drive primary coolant through the core. The steam generator assemblies are located within the annular space formed by the inner reactor pressure vessel walls and the riser surrounding and extending upward from the core. The control rod drive mechanism design is fully submerged in the primary coolant within the reactor pressure vessel boundary, excluding the possibility of control rod ejections accident scenarios. Reactivity control of the mPower SMR is achieved through the electro-mechanical actuation of control rods only (e.g., no soluble boron).

FIG. 25 depicts in vertical, cross-sectional, schematic form portions of an illustrative nuclear module 2500 including a single mPower SMR 2502 according to embodiments. The SMR is housed in a reactor module 2504 that is protected by an aircraft impact shield 2506, both modules being supported by a seabed base structure 2508 that is founded upon the seabed with a number of permanent pilings (e.g., piling 2510). The SMR 2502 is housed within a sealed containment structure 2512 (indicated by heavy black rectangle) that includes both a dry (air-filled) enclosed volume and a wet (water-filled) volume, the latter being the pressure suppression pool (2514, stippled area in Figure).

6. Sodium Cooled Fast Reactors

Sodium cooled fast reactors include a reactor vessel in which a liquid metal coolant is accommodated, a core disposed substantially at a lower central portion of the reactor vessel in an installed state, a core support structure secured to the reactor vessel for supporting the core, the core support structure dividing an interior of the reactor vessel into a high-pressure plenum below the core and a low-pressure plenum above the high pressure plenum, a circulation pump unit for applying a discharge pressure to the liquid metal coolant and circulating the same, and an intermediate heat exchanger for performing a heat exchanging operation of the coolant in the reactor vessel. The circulation pump unit is composed of an electromagnetic circulation pump provided with a discharge port and a closed gas space, which is filled up with a closed gas, defined above and communicated with the discharge port. The discharge port is also communicated with the high-pressure plenum, wherein the liquid metal coolant above the discharge port flows into the high-pressure plenum by the discharge gas pressure of the gas accumulated in the closed gas space by the actuation of the electromagnetic circulation pump at a time of trip thereof. Sodium cooled fast reactors have been disclosed in the prior art, for example, in U.S. Pat. No. 5,265,136, "SODIUM-COOLED FAST REACTOR"; U.S. Pat. No. 9,093,182 B2, "FAST REACTOR"; and U.S. Pat. No. 5,190,720, "Liquid metal cooled nuclear reactor plant system," the disclosures of all of which are incorporated herein by reference in their entireties.

7. Lead Cooled Fast Rectors

Lead-cooled Fast Reactors (LFRs) feature a fast neutron spectrum, high-temperature operation, and cooling by either molten lead or lead-bismuth eutectic (LBE), both of which support low-pressure operation, have very good thermodynamic properties, and are relatively inert with regard to interaction with air or water. The LFR has excellent materials management capabilities since it operates in the fast-neutron spectrum and uses a closed fuel cycle for efficient conversion of fertile uranium. It can also be used as a burner to consume actinides from spent light water reactor (LWR) fuel and as a burner/breeder with thorium matrices. An important feature of the LFR is the enhanced safety that results from the choice of molten lead as a relatively inert and low-pressure coolant. In terms of sustainability, lead is abundant and hence available, even in case of deployment of a large number of reactors. More importantly, as with other fast systems, fuel sustainability is greatly enhanced by the conversion capabilities of the LFR fuel cycle. Because they incorporate a liquid coolant with a very high margin to boiling and benign interaction with air or water, LFR concepts offer substantial potential in terms of safety, design simplification, proliferation resistance and the resulting economic performance. Molten lead has the advantage of allowing operation of the primary system at atmospheric pressure. Despite the high density of lead, the pressure loss can be kept relatively low (about one bar across the core for a total of about 1.5 bar across the whole primary system) because low neutron energy losses in lead allow for a larger fuel-rods pitch. This provides for significant natural circulation of the primary coolant, which results in a suitable grace time for operation and simplification of control and protection systems. The use of a coolant (lead) that is chemically inert with air and water and operating at atmospheric pressure greatly enhances physical protection.

Corrosion of structural materials in lead is one of the main issues for the design of LFRs; therefore, a large effort has been dedicated to short/medium term corrosion experiments in both stagnant and flowing LBE. Few experiments have been carried out in pure Pb, resulting in a lack of knowledge, particularly on medium/long term corrosion behavior in flowing lead. The use of multilayer metal composite materials on reactor components (e.g., fuel assemblies) to prevent corrosion is being investigated. The use of such materials has been described in, for example, U.S. Pat. App. Publication No. 2017/0159186 A1, "Multilayer composite fuel clad system with high temperature hermeticity and accident tolerance," the entire content of which is incorporated herein by reference. Multilayer metal composites can (a) minimize or prevent buildup of unidentified deposits and hydrogen pickup, which in turn will increase the lifetime, stability, and power density of the fuel, (b) improve hardness to prevent grid-to-rod fretting, which occurs when the spacer grid (a metal piece which separates the fuel rods) and the rods themselves vibrate and wear holes into the metal, and (c) maximize critical heat flux (pertaining to the thermal limit of a phenomenon where a phase change occurs during heating) to improve heat transfer. Another response to the corrosion problem is the use of single-alloy, corrosion-resistant steel for components exposed to liquid lead, as disclosed, for example, in EP3194633A1, "A steel for a lead cooled reactor," the entire content of which is incorporated herein by reference.

8. Heat-Piped Reactors

Heat pipes are often proposed as cooling system components for small fission reactors. For example, heat-pipe-cooled configurations such as SAFE-300™, STAR-C™, configurations by Oklo Inc., and eVinci™ are among reactor concepts that use heat pipes as an integral part of the cooling system. In embodiments, the core is built around a solid monolith with channels for both heat pipes and fuel pellets. Each fuel pin in the core is adjacent to heat pipes for efficiency and redundancy. The large number of in-core heat pipes is intended to increase system reliability and safety. Decay heat also can be removed by the heat pipes with the decay heat exchanger. In embodiments, the core is built around a uranium monolith with channels for both heat pipes and fuel pellets. In embodiments, liquid metal heat pipe technology is mature and robust with a large experimental test database to support implementation of the technology into commercial nuclear applications. Use of the heat pipes in a reactor system addresses some of the most difficult reactor safety issues and reliability concerns present in current Generation II and III (and to some extent, Generation IV concept) commercial nuclear reactors, in particular, loss of primary coolant. Heat pipes operate in a passive mode at relatively low pressures, less than an atmosphere. Each individual heat pipe contains only a small amount of working fluid, which is fully encapsulated in a sealed steel pipe. There is no primary cooling loop, hence no mechanical pumps, valves, or large-diameter primary loop piping typically found in all commercial reactors today. Heat pipes simply transport heat from the in-core evaporator section to the ex-core condenser in continuous isothermal vapor/liquid internal flow. Heat pipes offer distinctive approaches to remove heat from a reactor core. Such techniques have been disclosed in, for example, U.S. Pat. App. Publication No. 2016/0027536 A1, "Mobile heat pipe cooled fast reactor system," the entire content of which is incorporated herein by reference.

High-Temperature Gas Reactors (HTGR)

In embodiments, high temperature gas reactors are good sources of electrical and heat energy. HTGRs may be used to supply high-temperature processes like hydrogen production, coal gasification, or steel production with high temperature process heat. Likewise, HTGRs can be combined with steam cycles, gas turbine processes and the like to produce electrical energy. Some characteristics of HTGRs of interest include wide thermal spectrum, use of helium as a coolant, employs graphite as structural material and moderator, consumes coated particle fuel (e.g., TRISO), high burnup and helium outlet temperature, safety characteristics such as self-acting decay heat removal with limitation of maximal temperature during accidents, and as noted above used in a range of different applications.

The examples of embodiments including specific SMR designs are illustrative. It is emphasized that any nuclear reactor capable of being physically supported by modules delivered by flotation and installed on pilings upon a seabed, artificial or natural, is contemplated and within the scope of the present disclosure.

Many illustrated embodiments include SMRs installed above the waterline upon seabed base structures. Installing SMRs below the waterline is accomplished in some embodiments of the present disclosure and can have certain advantages, as also depicted herein.

D. Seabed Structures w/ Pilings for Underwater Reactor Placement

FIG. 26 depicts schematically portions of two illustrative seabed base structures 2602, 2604 founded upon a seabed by a number of permanent pilings, e.g., piling 2606. The beam structure 2608 of the first base structure 2602 features a central opening 2610 that extends down to the seabed (e.g., there are no pilings or other obstructions beneath the opening 2610). In a typical power generating station of this type, the first base structure 2602 houses a reactor module and the second base structure 2604 houses a power conversion module. As shall be shown below, the opening 2610 in the first seabed structure allows the below-waterline installation of an SMR that is first floated to its installation site in the artificial harbor proffered by the base structure 2602.

Cross-Section of Seabed, Pilings, w/ UK SMR Reactor Below Waterline

FIG. 27A depicts cross-sectionally and schematically portions of an illustrative seabed assembly 2700 that includes a single UK SMR 2702 according to embodiments and that is capable of installing the SMR 2702 below waterline. The SMR is housed in a reactor module 2704 that is protected by an aircraft impact shield 2706, both modules being supported by a seabed base structure 2708 that is founded upon the seabed with a number of permanent pilings (e.g., piling 2710). The seabed base structure 2708 includes a lacuna or central opening 2712 similar to the opening 2610 in FIG. 26. The SMR 2702 is housed within a reactor containment structure 2714 that is in turn housed within an approximately bucket-shaped reactor platform 2716 (crosshatched area). The reactor platform 2716 is upheld by four jack shoes (e.g., jack shoe 2718) which embrace and can be raised and lowered upon four jackets (a.k.a. towers or columns), e.g., jacket 2720. Four jack shoes and four jackets are included in these embodiments but only two of each are depicted in the cross-sectional view of FIG. 27A. The reactor module 2704 also includes an overhead crane 2722 that is capable of moving loads vertically and horizontally within at least a portion of the module 2704, e.g., removing a lid or head 2724 from the containment 2714. Also, the containment 2714 rests, within the reactor platform 2716, upon a reactor support 2726 which may include seismic isolators. The jack shoes of the reactor platform 2714 can be raised or lowered upon the jackets by various mechanical methods of offshore jack-up rigs. A seabed cavity 2728 is prepared to receive some portion of the reactor platform 2714 in its fully jacked-down state, and may include durable (e.g., reinforced concrete) walls and floor.

First Installation Step—Reactor Generally Above Waterline within Movable Structure.

In the state of operation depicted in FIG. 27A, the reactor platform 2716 with its contents is at an initial Up position where the bottom of the reactor platform 2716 is approximately on a level with the upper surface of the seabed base structure 2708. If, for example, the nuclear module 2704 is delivered (complete with major interior components as depicted in FIG. 27A) by flotation to the seabed base structure 2708 as described with reference to FIGS. 8A, 8B, 8C, then the reactor platform 2716 will perforce be in the Up position to enable flotation of the nuclear module 2704 into the artificial harbor proffered by the seabed base structure 2708.

Second Installation Step—Reactor being Lowered Under Waterline Via Jacks

FIG. 27B depicts the seabed assembly 2700 of FIG. 27A in a second station of operation wherein the reactor platform 2716 has been lowered through the opening 2712, e.g., by ratcheting the jack shoes of the platform 2716 down upon the jackets. The platform 2716 is, here, ballasted sufficiently so that it sinks of its own accord into the water.

Third Installation Step—Reactor Installed on Seabed

FIG. 27C depicts in cross-sectional perspective view portions of the seabed assembly of FIG. 27A in a third station of operation wherein the reactor platform 2716 has been lowered through the opening 2718 of FIG. 27A to a lowest position. As depicted, the bottom of the reactor platform 2716 is in fact below seabed grade 2730, that is, the platform 2716 has been lowered into the prepared seafloor cavity 2728 of FIG. 27A. In the position depicted, the reactor 2702 is entirely below the waterline and seabed grade 2730 and is thus shielded by the sea and seabed as well as by the bulk of the nuclear module 2704 and aircraft impact shield 2706. This is advantageous because, in accord with safety regulations, a reactor so shielded typically does not require as massive (and thus as expensive) an aircraft impact shield 2706 as a reactor not so shielded.

Lowered Below Seabed Grade within Foundation

FIG. 28 depicts schematically and in cross-section portions of an illustrative seabed assembly 2800 similar to the seabed assembly 2700 of FIG. 27A but housing an mPower SMR reactor 2802 rather than a UK SMR reactor. The reactor vessel 2804 is depicted in a fully jacked-down state that places it within a prepared foundation 2806 that is below seabed grade 2808. The reactor 2802 itself is, in this illustrative setting, wholly below waterline 2810 and partly below seabed grade 2808, and thus derives impact shielding from its environment.

E. Integrated Modular Water Reactor

Mention is now made of the Integrated Modular Water Reactor (IMR), a medium sized power reactor with a reference output of 1000 MWth and 350 MWe. This integral primary system reactor employs the hybrid heat transport system, which is a natural circulation system under bubbly flow conditions for primary heat transportation, and avoids penetrations in the primary cooling system by adopting the in-vessel control rod drive mechanism. These design features allow the elimination of the emergency core cooling system.

IMR Below Seabed Grade

FIG. 29 depicts schematically and in cross-section portions of an illustrative seabed assembly 2900 similar to the seabed assembly 2700 of FIGS. 27A-27C but housing an IMR-type reactor 2902 rather than a UK SMR-type reactor. The reactor vessel 2904 is depicted in a fully jacked-down state that places it within a prepared foundation 2906 that is below seabed grade 2908. The reactor 2902 itself is, in this illustrative setting, wholly below waterline 2910 and seabed grade 2908, and thus derives impact shielding from its environment.

F. Two Seabed Assemblies in an Artificially Dredged Channel

FIG. 30 depicts schematically and in cross-section portions of an illustrative power generating station 3000 according to embodiments. The station 3000 includes two seabed assemblies 3002, 3004, the first 3002 including a power plant module and the second 3004 including a power conversion module. The assemblies 3002, 3004 are stationed in an artificially dredged channel 3006, e.g., an extension into a shoreline of a natural body of water. The channel 3006 includes a sub-channel 3008 dredged to a deeper depth. The assembly 3002 including a power plant module is stationed in the deeper sub-channel 3008: this has the effect of placing the reactor 3010 entirely below the waterline 3012, enabling the reactor 3010 to derive aircraft impact shielding from its environment and so tending to reduce cost and weight of the aircraft impact shield 3014. In various other embodiments, the functions of the power conversion module here housed in the second seabed assembly 3004 can be performed by a land-based installation adjacent to the channel 3006. Of note, seabed material dredged in the construction of a channel 3006 and/or sub-channel 3008, or earth material from some other source, can be piled upon land adjacent to the channel 3006 to create raised terrestrial barriers and/or used to construct party or wholly submerged in-water barriers in the channel 3006 and/or sub-channel 3008. Terrestrial barriers can confer additional aircraft impact protection and in-water barriers can reduce the security threat posed by deep-draft vessels that might deliberately or inadvertently approach the seabed assemblies 3002, 3004.

G. Daisy Chain of Seabed Structures

FIG. 31 is a schematic depiction of portions of an illustrative power generating station 3100 according to embodiments. The station 3100 includes a first seabed assembly 3102 including a first reactor module, a second seabed assembly 3104 including a first power plant module, a third seabed assembly 3106 including a second reactor module, and a fourth seabed assembly 3108 including a second power plant module. The modules are linked by utility bridges 3110, 3112, and 3114, which enable the conveyance of steam, condensate, power, and other materials or substances between the seabed assemblies. The assemblies are founded upon a seabed with pilings as shown herein in various Figures. The station 3100 illustrates that various embodiments include multiple seabed assemblies performing a variety of functions (not restricted to steam generation and energy conversion).

H. Site Preparation

Mention is now made of geoengineering techniques for site preparation for the installation of power generating stations according to embodiments of the present disclosure. Stable proximate environments of adequate size are required for the safe and durable installation of seabed assemblies according to embodiments. To achieve stability and safety, geoengineering techniques may be employed in modifying natural seabed and shoreline features (e.g., reshaping, stabilizing) or artificial features such as cavern walls or banks of dredged channels. Several relevant techniques are now discussed.

Slope Stabilization

In embodiments, the installation site preparation includes slope stabilization. On soil-covered slopes, soil is constantly moving downslope due to gravity. Movement can be barely evident or devastatingly rapid. Slope angle, water, climate, and slope material contribute to movement. Slope stability is relevant to the slopes earth and rock-fill dams, slopes of other types of embankments, excavated slopes, and natural slopes in soil and soft rock. Slope stability is typically evaluated through the performance of a geology or geotechnical engineering study.

Steep slope angles are often desirable to maximize the level land at the top or bottom of the slope: e.g., the volume of an artificial channel (and thus the effort required to blast and/or dredge the channel) is minimized by steeper, as opposed to more sloping, channel embankments. However, slope stability decreases with increasing slope angle. Moreover, water plays a major role in slope failure, as rivers and waves erode the base of slopes and remove support. Water can also increase the driving force by filling previously empty pore spaces and fractures, adding to the total mass. Increased pore water pressure can also decrease resistance by decreasing the shear strength of the slope material. Chemical weathering slowly weakens slope material, reducing its shear strength and thus reducing resisting forces. Where integrity of an embankment is vital or in areas subject to detrimental hydraulic forces, additional embankment protection is often required. In granular soils, soil improvement could be performed to increase slope stability.

Stabilization can be achieved through slope reinforcement by constructing structural elements (anchors) through the failure plane. Structural elements could consist of conventional piles or drilled shafts, jet grout or soil mi columns, or reinforced rigid inclusions. In general, anchors are slope stabilization and support elements that transfer tension loads using high-strength steel bars or steel strand tendons. For example, the Micropile Slide Stabilization System ($MS^3$) is a slope stability technique that utilizes an array of micropiles sometimes in combination with anchors. The micropiles act in tension and compression to effectively create an integral, stabilized ground reinforcement system to resist sliding forces in the slope. In another example, soil nailing is a slope stabilization or an earth retention technique using grouted tension-resisting steel elements (nails) that can be designed for permanent or temporary support. Soil nails can also be installed in restricted access sites, existing bluffs or retaining wall, and directly beneath existing structures adjacent to excavations. Care should be exercised when applying the system underneath an existing structure since some slope movement occurs before the nails begin resisting the load. Soil nailing has been used for slope remediation and landslide repair, to provide earth retention for excavations for buildings, plants, parking structures, tunnels, deep cuts, and repair existing retaining walls. In a third example, gabions are an earth-retention technique in which gravity retaining walls are formed using rectangular, interconnected, stone-filled wire baskets. Gabion walls have been used to construct temporary or permanent retaining walls and where slope protection or erosion control is required such as channel linings.

1. Illustration of Anchor-Block Slope Stabilization

FIG. 32 depicts schematically in vertical cross-section portions of an illustrative application 3200 of the anchor-block slope stabilization technique, which stabilizes a slope or retaining wall 3202 using anchored reaction blocks (e.g., blocks 3204, 3206, 3208). The block layout pattern is typically in rows across the slope or embankment wall; in FIG. 32, three blocks are shown in a vertical row. Initially, anchors 3210, 3212, 3214 are installed at the planned center of each block location, typically drilled at right angles to the slope to be stabilized (as depicted in FIG. 32). Reaction blocks 3204, 3206, 3208 are either precast or cast-in-place around the heads of the anchors 3210, 3212, 3214. Bearing plates are then installed between the blocks and the heads of the anchors 3210, 3212, 3214 and the latter are tensioned against the blocks. The finished anchored reaction blocks 3204, 3206, 3208 resist the movement of the retained wall 3202.

I. Stabilization of Bulkheads and Piers

Mention is now made of various stabilization techniques that apply particularly to bulkheads and piers, that is, to vertical interfaces between water and solid ground, such as might be included with the site of power generating station according to embodiments.

Ground improvement techniques such as soil mixing and jet grouting can stabilize soft soils by introducing cementitious binder, for planned or remedial work. Vibro replacement stone columns can be constructed behind bulkheads to densify soils to reduce lateral pressures on the bulkhead. Voids behind bulkheads can be filled by jet grouting and cement grouting. Soil loss around pier support piles can be remedied with surgical jet grouting. Tieback anchors can be installed through sheet pile bulkheads to permanent lateral support.

Bulkheads (here referring to vertical dividing walls between water and solid ground) commonly require remediation due to the need to deepen their dredge line (e.g., the height where the seabed surface encounters the bulkhead) to accommodate larger ships or due to deterioration experienced over their service life. Improper bulkhead design may lead to lateral deformation or failure of global or toe stability. Jet grouting erodes the soil with high-velocity fluids and mixes the eroded soil with grout to create in situ cemented geometries of soilcrete (full or partial columns, panels, or bottom seals); it underpins and structurally upgrades existing wharves or bulkheads. Compaction grouting densifies liquefiable soils between sections of bulkhead and anchors. Vibro replacement densifies surrounding liquefiable soils to mitigate lateral spreading. Anchors are steel bars or strands grouted into a predrilled hole to resist lateral and uplift forces; they can be added to increase lateral stability, and existing, corroded anchors can be replaced. Soil mixing stabilizes soils behind bulkheads to greatly reduce earth pressures and provides stable platforms along bulkheads. Cement grouting, also known as slurry grouting, is the injection of flowable particulate grouts into cracks, joints, and/or voids in rock or soil, and creates stabilized, low-permeability masses behind walls to stop soil loss through corroded sheet piles. Secant or tangent piles are columns constructed adjacent (tangent) or overlapping (secant) to form structural or cutoff walls.

1. Illustration of Bulkhead-Restrained Embankment

FIG. 33 depicts schematically and in cross-section portions of an illustrative bulkhead-restrained embankment 3300 of a power generating station site according to embodiments. A body of earth material 3302 extends partly over a natural or artificial (dredged) seafloor 3304, upon which various seabed assemblies may be founded upon pilings, e.g., as depicted herein, and is separated from a sea or other body of water 3306 by a solid panel or bulkhead 3308 that is buttressed by a line of tangent pilings (e.g., piling 3310). The wall formed by the bulkhead 3308 and the tangent pilings is, in this example, stabilized in part by the use of an anchor 3312 embedded in a grout-filled void 3314 in the earth material 3302. Additional techniques, such as soil mixing, are used in various embodiments to create further stability.

The trench remixing and cutting deep wall (TRD) method produces mixed-in-place in-ground walls from in situ soil using a vertical cutter post or ground saw. The post is moved laterally through the ground, mobilizing soil that is mixed with a binding agent and left in place to harden as the saw moves on, forming a continuous vertical barrier. TRD is a relatively quiet, efficient way to construct continuous soil-mi walls from 0.5-1 m thick and up to 55 m long in nearly all subsurface conditions, from soft organics to cobbles and some rock formations. To prepare prodigy's deployment site, TRDs can be used for (1) groundwater cutoff walls, to avert seepage and erosion through levees, dams, and reservoir perimeters, (2) foundation support, to strengthen soft soils beneath structures to increase bearing capacity, (3) pollution control, where a TRD barrier serves as a containment structure for subsurface containments or barriers to protect against migration from off-site sources, e.g., prevent the communication of water layers, water bodies, (4) earth retention support. In the latter application, after construction, soil may be excavated from part of one side of the TRD wall to enable access to the TRD wall (e.g., for anchor installation) or to shape the earth surface for various purposes.

2. Illustration of Seabed Assembly and Bulkhead

FIG. 34 depicts schematically and in cross-section portions of an illustrative power generating station 3400 according to embodiments. A seabed assembly 3402 is founded upon pilings 3404 within a sea or other body of water 3406 that is separated from a mass of earth material 3408 by a solid panel or bulkhead 3410. The bulkhead 3410 is buttressed by grout-firmed anchors 3412. In the mass of earth material is a TRD wall 3414, also buttressed by an anchor structure 3416. Aircraft impact protection for the assembly 3402 is provided by a vertical wall 3418 atop the TRD wall 3414.

J. Illustrating Couplings with Onshore Facilities

FIG. 35 depicts in schematic top-down view portions of an illustrative power generating station 3500 according to embodiments. This Figure introduces elements of illustrative embodiments that couple seabed assemblies installed nearshore, or in artificially created seabed inlets, or otherwise protected artificial settings, with on-shore facilities that include, for example, grids, power conversion (turbine-generator) facilities, administration and security facilities, and other. The environment of station 3500 includes a landmass 3502, water body 3504, and shoreline 3506 (row of angled line segments) that are part of the coastal environment. An artificial channel 3508 is included that is at least during an installation phase of the station 3500 in free liquid communication with the water body 3504. The channel 3508 is deep enough to enable the movement by flotation of seabed base structures and other modules to positions within the channel 3508, where such structures may be founded upon permanent pilings, e.g., in the manner described herein. At least parts of the embankments of the channel 3508 are stabilized by walls of secant pilings 3510. Within the channel 3508 are established seabed assemblies, e.g., a first seabed assembly 3512 including a reactor module, a second seabed assembly 3514 including a power plant module, and a third seabed assembly 3516 including an auxiliary module. In embodiments, the seabed assemblies may be linked by utility bridges to enable exchanges of steam, condensate, electricity, and other utilities; also, the station 3500 may be linked to an electrical grid on the landmass 3502.

K. Physical Mockups

FIGS. 36A-38 are schematic depictions of portions of illustrative embodiments where the physical layout of the embodiments is emphasized, rather than the functional relationships between components.

1. Coastal Station Prepared Prior to Seabed Assemblies

FIG. 36A is a schematic, top-down view of portions of another illustrative coastal power generating station deployment 3600 including some number of SMRs in reactor modules. FIG. 36A depicts the site prior to the arrival of seabed assemblies housing, e.g., a reactor module and an auxiliary module; FIG. 36B depicts the site after installation of seabed assemblies.

i. Power Generating Station Arrangement

The power generating station deployment 3600 includes a landmass 3602, water body 3604, and shoreline 3606 (row of angled line segments) that are part of the coastal environment. The power generating station deployment 3600 also includes a dock 3608. The dock 3608 includes a number of grounded concrete caissons (e.g., caisson 3610) that define a barrier or housing that is closed on the seaward side and open on the shoreward side. In embodiments, caissons can be floated into place and ballasted to ground on a natural or prepared portion of the seafloor. Moreover, the dock 3608 can be constructed in such a way that substantial routine mixing or circulation of water in the dock with water in the surrounding water body 3604 is prevented. Various other embodiments omit caissons, relying instead on the structural stability of seabed assemblies to withstand environmental forces.

a. Approach Channel Left for Installation of Reactor, Caissons Surrounding Site with One Moveable/Floatable Caisson Installed after Reactor Placement, and Description of Connection Points to Onshore Facilities.

A natural or dredged approach channel 3611 constitutes a marine interface for power generating station deployment 3600, being of sufficient breadth and depth to permit delivery of seabed base structures and modules by flotation to a stationing area 3612 optionally floored by a prepared foundation. A relocatable (e.g., floating or easily de-ballasted) caisson 3614 may be moved to constitute part of the dock 3608, closing off the approach channel 3611, e.g., after delivery of seabed base structures and module to the stationing area 3612. Aircraft impact shielding is incorporated in one or more nuclear modules installed upon seabed base structures. A rail transfer system 3618 connects the dock 3608 to an emergency response facility 3650 and a cask yard 3622, and both interface with a security facility 3620 before further transport onshore, enabling controlled exchange of nuclear and other materials (e.g., dry casks of cooled spent nuclear fuel) between the external on-shore facilities and the dock 3608. A tank yard 3624 houses fluids such as purified water for reactor operations and low-level liquid radioactive waste. A power plant (turbine house) 3626 exchanges heat-transfer fluids (e.g., steam, water) with the nuclear module (depicted in FIG. 36B) via a pipe bundle that terminates in a flange 3630 for quick interfacing of with the nuclear module upon installation of the latter. Flows of steam and condensate through the pipe bundle 3628 are controlled by valves, e.g., shutoff valves at each end of the pipe bundle 3628. The pipe bundle 3628 is supported by a pipe bridge and hangers that accommodate thermal expansion and contraction. The power plant 3626 converts to electricity a portion of the thermal energy thus delivered, and this electricity is distributed to a grid or other consumers via a switchyard 3634. Also, liquids are conveyed between the tank yard 3624 and the modules by piping 3636 supported by an additional pipe bridge 3638. Coolant water is collected from the environmental water body 3604 via a coolant intake 3640 from which debris and other harmful objects or materials are excluded by inlet strainers 3642; water from the inlet 3640 is conveyed to the power plant 3626 via inlet piping 3644 and associated pumps. Heated coolant from the power plant 3626 is returned via outlet piping 3646 with watertight integrity provided by isolation valves to the water body 3604 via an outlet 3648 that can be closer to the shore 3606 than the inlet 3640 and far enough from the inlet 3640 to prevent untoward mixing of heated outlet water with cool inlet water. An Emergency Response Facility 3650 acts as a backup control center for the power generating station deployment 3600 and its associated facilities and may also stage other contingency systems, e.g., rail-mounted or other equipment for responding to emergencies. The Emergency Response Facility 3650 ensures that sufficient coolant is delivered from the tank yard 3624 to one or more of the nuclear reactors (e.g., sufficient coolant to support passive convective cooling); also, it enables lower impact protection standards for other control facilities included with the station deployment 3600, since diversification of control points is functionally interchangeable with heightened hardening of a single control point: either diversification or higher hardening can only be disabled by larger or multiple attacks, which are more difficult to mount and therefore less likely to be mounted.

b. Sheltering of Onshore Facilities

The on-shore facilities of the power generating station deployment 3600 are sheltered by a defensive perimeter 3652 that may include various barriers, devices, personnel, drones, and the like to defend the power generating station deployment 3600; additional defensive measures may be included with the power generating station deployment 3600 to defend against aerial and marine threats. Whether or not named or depicted herein, such various defensive arrangements can be included in any embodiments of the present disclosure.

c. View with Platforms Installed

FIG. 36B is a schematic, top-down view of portions of the illustrative power generating station deployment 3600 of FIG. 36A after installation of two seabed assemblies. In the state of construction of deployment 3600 depicted in FIG. 36B, a first seabed assembly 3654 including a nuclear module has been ensconced in the dock 3608 beneath the lengthwise arching portion 3616 of an impact shield. The pipe bundle 3628 and the liquids-transfer pipe 3636 have been connected to modules. The impact-shielded seabed assembly 3654 includes the nuclear plant (e.g., SMR gallery, control room module, fuel storage module, fuel-handling module). SMRs may be installed and removed from the nuclear module via an unshielded auxiliary module 3658; SMRs may arrive and depart via a land route for the directness of access to the unshielded modules 3658, being conveyed locally on the rail system 3618, which is supported by a causeway or bridge 3660, or may arrive and depart via flotation through the channel 3611. The moveable caisson 3614 has, after delivery of the seabed assemblies 3654, 3658, been stationed across the channel 3611, reversibly blockading the assemblies 3654, 3658 within the dock 3608.

d. Benefit—Non-Permanent Placement/Float In, Float Out

An advantage of deployment 3600, as of various other embodiments, some discussed herein, is that all components delivered in a modular fashion may be removed as they were delivered, by flotation, whether for decommissioning at a specialized facility or deployment at a different location, and one or more replacement units may be installed at the power station deployment 3600. Mobility and modularity thus are features of the nuclear power station as a whole: moreover, SMRs may be small enough to be removed from the nuclear module, redeployed, decommissioned remotely, and/or replaced in a manner analogous to the nuclear module itself. Thus, advantages are obtained from modularity and mobility both at the station scale and at the scale of the individual small modular reactor.

e. Terrestrial Powerplant Replaced by Power Conversion Module in Dock; Multiplicity of Elements Of note, various embodiments include features of the power generating station deployment 3600 but depart from it in many ways. For example, the terrestrial power plant 3626 is in some embodiments replaced by a seabed assembly including a power conversion module that is established within the dock 3608. Embodiments include multiple channels, multiple nuclear units, multiple power conversion modules, various terrestrial facilities (or none at all), and so forth. All such variations and combinations are contemplated and within the scope of the present disclosure.

2. Reactor Placed in Channel Dredged into Landmass

FIGS. 37A and 37B are schematic, top-down views of portions of an illustrative power generating station 3700 including some number of SMRs. FIG. 37A depicts the site prior to the arrival of seabed assemblies; FIG. 37B depicts the site after installation of seabed assemblies. The power generating station 3700 includes a landmass 3702, water body 3704, and shoreline 3706 that are part of the coastal environment. The power generating station 3700 also includes a water-filled basin 3708 (e.g., depression cut into the landmass 3702 and in fluid communication with the environmental water body 3704) whose walls are defined and stabilized on at least two sides by rows or barriers of pilings (e.g., barrier 3710). Pilings may be conventionally driven or formed in situ, e.g., of pre-tensioned concrete poured in drilled shafts and/or tubes. Walls of the basin 3708 may be stabilized using any of the methods of geoengineering stabilization discussed herein, or similar methods. The basin 3708 is of sufficient breadth and depth to permit delivery of modules by flotation. A relocatable caisson 3712 may be moved to close off the basin 3708, e.g., after delivery of modules to the basin 3708. Aircraft impact is incorporated in one or more nuclear modules installed upon a seabed base structure. A rail transfer system 3716 connects the area of the basin 3708 to an administration and security facility 3718 onshore, to the emergency response facility 3734, and to a cask yard 3720, enabling controlled exchange of nuclear and other materials (e.g., dry casks of cooled spent nuclear fuel) between the on-shore facilities and the basin 3708. A tank yard 3722 houses fluids such purified water for reactor operations and low-level liquid radioactive waste.

i. Power Plants Configured to Receive Thermal Energy

Two power plants (turbine houses) 3724, 3726 exchange heat-transfer fluids (e.g., steam, condensate) with nuclear modules (depicted in FIG. 37B) via pipe bundles (depicted in FIG. 37B) and convert a portion of the thermal energy thus delivered to electricity that is distributed to a grid or other consumers via switchyards 3728, 3730.

ii. Coolant from Adjacent Body of Water

Coolant water is collected from the environmental water body 3704 via a coolant intake 3732; heated coolant from the power plants 3724, 3726 is returned to the water body 3704 via an outlet 3734 that may be closer to the shoreline 3706 than the inlet 3732 and far enough from the inlet 3732 to prevent untoward mixing of heated outlet water with cool inlet water. Screening and piping for the coolant inlet 3732 and outlet 3734 can be included. An Emergency Response Facility 3738 acts as a backup control center for the power generating station 3700 and its associated facilities, much as the Response Facility 3638 of FIG. 36A functions for power generating station deployment 3600. A support deck 3736 supports interface of the rail transfer system 3714 with the edge of the basin 3708.

iii. Installed Reactor View—Dual Reactors

FIG. 37B is a schematic, top-down view of portions of the illustrative coastal power generating station 3700 of FIG. 37A after installation in the basin 3708 of two seabed assemblies 3742, 3744 including nuclear modules. Two pipes (e.g., pipe 3746) exchange heat-transfer fluids between the nuclear-module seabed assemblies 3742, 3744 and the two power plants 3724, 3726. Liquids are conveyed between the tank yard 3720 and an auxiliary systems module 3750 of the MNP-B 3742 by piping 3752 supported by the support deck 3736. The moveable caisson 3712 has, after delivery of the seabed modules 3742, 3744, been stationed across the basin 3708, reversibly sealing the seabed modules 3742, 3744 into the basin 3708. The rail transfer system 3716 enables exchange of nuclear and other materials (e.g., dry casks of cooled spent nuclear fuel, SMRs) between the onshore facilities and the seabed module 3742; case casks and other loads are exchanged by flotation with the seabed module 3744.

iv. Variability of Part Locations

Of note, various embodiments include features of the power generating station 3700 but depart from it in many ways. For example, the terrestrial power plants 3724, 3726 are in some embodiments replaced by seabed assemblies including power conversion modules that are established within the basin 3708 or similar, nearby basins. Embodiments include multiple basins, multiple nuclear units, multiple power conversion modules, various terrestrial facilities (or none at all), and so forth. All such variations and combinations are contemplated and within the scope of the present disclosure.

3. Reactor Placed within Undercut of Landmass (e.g., Naturally or Artificially Created Cavern within Steep Face of Landmass)

FIG. 38 schematically depicts in vertical cross-section portions of another illustrative power generating station 3800 according to embodiments. Station 3800 is exemplary of a class of embodiments that feature the installation of seabed assemblies in highly defensible, natural or artificial settings such as caverns, fjords, canyons, and the like. A landmass 3802 has a bold coast adjacent to a water body 3804. A cavern 3806, either natural or artificially excavated by techniques familiar in the fields of mining and tunneling, is open to the water body 3804 extends into the landmass 3802. The floor of the cavern 3806 is sufficiently below the level of water body 3804 to enable the delivery by flotation of seabed base structures and other modules to the interior of the cavern 3806, where such structures can be installed upon permanent pilings, e.g., as described and depicted herein. The illustrative power generating station 3800 includes a first seabed assembly 3808 including a nuclear module and a second seabed assembly 3810 including a power plant module. The roof and walls of the cavern 3806 are stabilized by grouted anchors (e.g., anchor 3812) and/or other geoengineering mechanisms. Power generated by the station 3800 is delivered to a grid or other consumer.

i. Variations

Of note, various embodiments include features of the power generating station 3800 but depart from it in many ways. For example, various other embodiments include multiple caverns or basins within a single cavern, multiple nuclear modules, multiple power conversion modules, various terrestrial facilities (or none at all), modules stationed outside one or more caverns as well as within, and so forth. All such variations and combinations are contemplated and within the scope of the present disclosure.

4. Schematics for Processing Facilities and Material Flow

FIGS. 39 and 40 are schematic depictions of portions of facilities included with illustrative power generating stations built according to embodiments of the present disclosure, and of some flows of material and energy between the facilities.

i. Agro-Industrial Complex Supporting Local Population Center

FIG. 39 depicts portions of an illustrative agro-industrial complex 3900 that includes one or more modular seabed-based units and includes, minimally, a seabed assembly unit containing a nuclear module or power conversion module, including without limitation any of a micro-MPS, an SMR-MPS and the like. The complex 3900 is designed to realize advantages of locating various productive facilities and energy-consuming activities in the vicinity of a power generating station 3902 that supports a local population center 3904. The population center 3904 may be an existing conurbation, a temporary city or work camp, a military or research base, an artificial offshore or seabed community, city, or offshore metropolitan area, or one or more combinations thereof.

The nuclear power generating station 3902, in embodiments, includes both a nuclear module and power conversion module, or more than one of either or both; or, a nuclear module founded upon pilings and a terrestrial power conversion module; or a power conversion module founded upon pilings and a terrestrial nuclear power plant; or various combinations of and variations upon such arrangements, all of which are contemplated and within the present disclosure's scope. In embodiments, the nuclear power generating station 3902 produces electrical power, thermal energy, or both. Other facilities depicted in FIG. 39, to be enumerated below, are (1) facilities, denoted by plain rectangles, that receive, stage, or produce inputs of the complex 3900, (2) facilities, denoted by capsule-shaped forms, that are typically involved in the transformation or processing of inputs or internal flows of the complex 3900, and (3) facilities, denoted by bold rhombuses, that receive, stage, or produce outputs of the complex 3900. Various facilities included with the complex 3900 are, in embodiments, modules (e.g., are manufactured and delivered, preferably by flotation, to the location of complex 3900), non-modular (e.g., are constructed on site), or hybridizations of modular facilities with non-modular facilities.

a. What's not Illustrated (Ancillary Components Such as Grids and Defense)

FIG. 39 does not depict systems or facilities (e.g., grids, transportation networks) not included with the complex 3900, nor various aspects of the complex 3900 (e.g., defensive systems), nor some aspects of the local environment of the complex 3900. The latter typically includes both a landmass, herein termed the "terrestrial environment," and a relatively large body of water, e.g., lake, river, or ocean ("marine environment"), from which water is drawn by a seawater intake facility 3906. Moreover, non-nuclear sources of energy (e.g., natural gas generators, solar panels) may be included with the complex 3900. In these examples, the primary source of energy in the complex 3900 is the nuclear power generating station 3902.

b. Receipt of Material Inputs

Some material inputs to the complex 3900 arrive from (1) a secured receiving facility 3908, which handles the arrival of nuclear fuel for the power generating station 3902, (2) a seawater intake facility 3906 drawing from some body of water which, if an ocean, is a source of water as a coolant, of salt water for freshening, and of useful substances in solution (e.g., $CO_2$, salt), (3) a raw industrial materials receiving facility 3910, and (4) a hydrocarbon receiving facility 3912 (e.g., liquefied natural gas terminal or petroleum receiving facility).

c. Material Alteration/Processing

Materials are altered in form, typically in a manner that adds value for export or makes the materials useful to a local population center, in a number of process facilities, including a desalination plant 3914 producing freshwater and brine, an electrolysis plant 3916 producing purified freshwater, $H_2$, $O_2$, and/or other outputs, an industrial process plant 3918, an agricultural or food facility 3920, a manufacturing facility 3922, a petrochemical process plant 3924, a facility for treating agricultural, industrial, and urban wastes 3926, and an emergency accommodation facility 3928.

Material and energy outputs (e.g., products and wastes) of the complex 3900, which may exit the complex 3900 and/or return to other portions thereof, are handled by a dry cask storage facility 3930, an electrical transmission and distribution facility (a.k.a. substation) 3932, a thermal storage and distribution facility 3934, a products storage, distribution, and export facility 3936, a food packaging, storage, and refrigeration facility 3938, a freshwater storage and distribution facility 3940, a fuel storage facility 3941, and an agricultural, industrial, and urban waste treatment facility 3926. Some or all of the plants and facilities disclosed herein (except inherently stationary resources) are, in various embodiments, produced and delivered to the complex 3900 as MP units, realizing advantages including those enumerated herein for MP units. Various embodiments omit one or more of the facilities included with illustrative complex 3900 and include facilities not included with complex 3900.

Some of the energy forms and materials that flow between elements of the complex 3900 include fresh nuclear fuel 3942; cooled spent nuclear fuel 3944; coolant water 3946; electrical power 3948 for transmission to the population center 3904 and all other facilities included with complex 3900; thermal energy 3949 delivered to the thermal storage and distribution facility 3934; heat and/or electrical power 3950 for use by the desalination plant 3914; desalinated water (freshwater) 3952 for use by the electrolysis plant 3916; desalinated water 3954 for use by the industrial process plant 3922; desalinated water 3956 for use by the agricultural or food facility 3920; brine 3958 for use by an industrial process plant 3918; raw industrial materials (e.g., feedstocks) 3960 for use by the industrial process plant 3918; fertilizer 3962 for use by the agricultural facility 3924; industrial products 3964 for handling by the storage and distribution facility 3936; agricultural products 3966 for handling by the food handling facility 3938; hydrocarbons 3968 from the hydrocarbon receiving facility 3912 for processing by the petrochemical plant 3924; petrochemical outputs 3970 (e.g., resins, synthetic fuels) for handling by the storage and distribution facility 3936; petrochemical outputs 3972 for use in the manufacturing facility 3922; electrolysis gases 3960 (e.g., $H_2$, $O_2$) for use by the industrial process plant 3918; manufactured products 3976 for use in the population center 3904; wastes 3978 from the population center 3904 for treatment in the waste treatment facility 3926; processed industrial materials 3980 (e.g., metal, plastics) from the industrial process plant 3918 to the manufacturing facility 3922; organic outputs 3982 from the agricultural or food production facility 3920 to the petrochemical process plant 3924 (e.g., wastes or crop feedstocks for conversion to synthetic fuel); synthetic or processed fuel 3984 from the petrochemical process plant 3924 to the fuel storage facility 3941; and synthetic or processed fuel 3986 from the fuel storage facility 3941 to the population center 3904. Heat 3988 and power 3990 are delivered to the population center 3904. Of note, electricity, thermal energy, freshwater, purified water, fuels, electrolysis gases, and other materials are typically distributed to many facilities included with complex 3900, although only selected transfers are explicitly depicted in FIG. 39. For example, all facilities will receive electricity from the substation 3932, and thermal energy from the thermal storage and distribution facility 3934 may be delivered for district heating, process heat, or the like to various facilities. In another example, "distribution" of products from the product storage, distribution, and export facility 3936 will typically be local (e.g., to other facilities of the complex 3900 and to the population center 3904), e.g., via pipelines or local trucking, while "export" of products will typically entail transfer to relatively remote destinations, e.g., by air, maritime container shipping, or long-haul rail.

In another example, materials to a population center and processes supportive thereof may be extracted from seawater as a byproduct of desalination as performed, for example, by the desalination plant 3914, electrolysis plant 3916, and additional processes. For example, carbonates ($MgCO_3$) can be extracted from seawater and converted to oxides for cement manufacture or refractory materials. Also, sea salts (primarily sodium chloride) or uranium from seawater are a marketable byproduct of desalination, given appropriate quality controls.

In another example, the power generating station 3902 also supplies power to a facility including a data center and/or supercomputing facility 3992 requiring large amount of electricity, where the facility 3992 may be installed offshore, e.g., as a module founded upon the seafloor with a seabed base structure as described herein.

In another example, the power generating station 3902 also supplies power to an offshore or seabed mining facility or operation 3994 requiring large amount of electricity, where the facility 3994 may include modules founded upon the seafloor with a seabed base structure as described herein.

In another example, the power generating station 3902 also supplies power to an offshore ocean cleaning facility or operation 3996 requiring large amounts of electricity for extended periods of time (e.g., several years at least), wherein the facility 3996 may include modules floating or propelled as needed to identify and address areas of ocean contamination, such as aggregate of plastics and the like.

FIG. 40 depicts portions of another illustrative complex 4000 including one or more nuclear and/or power conversion modules including without limitation micro-MPS module(s), SMR-MPS module(s), and the like established by seabed base structures and including, minimally, a nuclear module. Complex 4000 is designed to realize advantages of locating various resource extraction or production facilities and energy-consuming processes related to such extraction in the vicinity of a nuclear power generating station 4002 and one or more extractable natural resources (e.g., coal, gas, or petroleum fields or solid-mineral mines). The nuclear power generating station 4002, in embodiments, includes both a nuclear module and power conversion module, or more than one of either or both; or, a nuclear module founded upon pilings and a terrestrial power conversion module; or a power conversion module founded upon pilings and a terrestrial nuclear power plant; or various combinations of and variations upon such arrangements, all of which are contemplated and within the present disclosure's scope. In embodiments, the power generating station 4002 produces electrical power, thermal energy, or both. Other facilities depicted in FIG. 40, to be enumerated below, are (1) various modular or non-modular facilities, denoted by plain rectangles, which receive, stage, or produce inputs of the complex 4000, (2) facilities, denoted by capsule-shaped forms, that are typically involved in the transformation or processing of inputs or internal flows of the complex 4000, and (3) facilities, denoted by bold rhombuses, that receive, stage, or produce outputs of the complex 4000.

FIG. 40 does not depict systems or facilities (e.g., grids, transportation networks) not included with the complex 4000, nor various aspects of the complex 4000 (e.g., defensive systems), nor some aspects of the local environment of the complex 4000. The latter typically includes both a terrestrial environment and a marine environment. In examples, the primary source of energy in the complex 4000 is the power generating station 4002.

Some material inputs to the complex 4000 arrive from (1) a secured receiving facility 4006, which handles the arrival of nuclear fuel for the power generating station 4002, (2) a seawater intake facility 4004 drawing upon a body of water which is a source of water as a coolant and (if an ocean) of salt water for freshening and of useful substances in solution (e.g., $CO_2$, salt), (3) a fossil fuel resource 4008 (e.g., oil field), and (4) a mineral resource 4010 (e.g., mine).

Materials are altered in form, often in a value-adding manner, in a number of process facilities, including a desalination plant 4012 producing freshwater and brine, an electrolysis plant 4014 producing purified freshwater, $H_2$, $O_2$, and/or other outputs, a resource production facility plant 4016, a petrochemical processing plant 4018, a mineral processing plant 4020, a resource production waste treatment facility 4022, a refining process byproduct treatment facility 4024, an environmental monitoring and remediation facility 4026, a dock and/or site construction support facility 4028, and a deployment crew accommodations and logistics facility 4030.

Material and energy outputs (e.g., products and wastes) of the complex 4000, which may exit the complex 4000 and/or return to other portions thereof, are handled by a dry cask storage facility 4032, an electrical transmission and distribution facility (a.k.a. substation) 4034, a thermal storage and distribution facility 4036, a product storage, distribution, and export facility 4038, and a freshwater storage and distribution facility 4040. Of note, the resource production facility 4016 performs functions supportive of resource extraction from the fossil fuel resource 4008 and the mineral resource 4010; these functions include the refining of hydrocarbons from the fossil fuel resource 4008 and the separation, concentration, and refining or reducing of minerals from the mineral resource 4010. Some or all of the plants and facilities disclosed herein (except inherently stationary resources) are, in various embodiments, produced and delivered to the complex 4000 as modular units established upon seabeds on pilings, realizing advantages including those enumerated herein for modular units. Various embodiments omit one or more of the facilities included with illustrative complex 4000 and/or include facilities not included with complex 4000.

Some of the energy forms and materials that flow between elements of the complex 4000 include fresh nuclear fuel 4042; cooled spent nuclear fuel 4044; coolant water 4046; electrical power 4048 for transmission to other facilities included with complex 4000; thermal energy 4050 delivered to the thermal storage and distribution facility 4036; heat and/or electrical power 4052 for use by the desalination plant 4012; desalinated water (freshwater) 4054 for use by the electrolysis plant 4014; desalinated water 4056 for use by the resource production facility 4016; brine 4058 for use by the electrolysis plant 4014; raw fossil fuel resources 4060 for handling by the resource production facility plant 4016; raw mineral resources 4062 for handling by the resource production facility plant 4016; heated fluids 4064 and/or chemical reactants and/or other outputs of the resource production facility 4016, delivered to the fossil fuel resource 4008 to assist in extraction; heated fluids 4066 and other outputs of from the resource production facility 4016, delivered to the mineral resource 4010 to assist in extraction; electrolysis gases (e.g., $H_2$, $O_2$) for use by the petrochemical processing plant 4018, resource production facility 4016, and mineral resource facility 4020; refined hydrocarbons 4070 from the resource production facility 4016 (derived from the fossil fuel resource 4008) for processing by the petrochemical plant 4018; separated, concentrated, and/or refined or reduced minerals or metals 4072 (derived from the mineral resource 4010) from the resource production facility 4016 for processing by the mineral processing plant 4020; directly useful hydrocarbon or mineral outputs 4074 of the resource production facility 4016, delivered to the production storage, distribution, and export facility 4038; petrochemical outputs 4076 (e.g., resins, synthetic fuels) of the petrochemical processing plant 4018 for handling by the storage, distribution, and export facility 4038; and refined metallic or mineral outputs 4078 for handling by the storage, distribution, and export facility 4038. Of note, electricity, thermal energy, freshwater, purified water, fuels, electrolysis gases, minerals (e.g., carbonate minerals) extracted from brine by the electrolysis plant 4014, and other materials are typically distributed to many of the facilities included with complex 4000, although only selected movements are explicitly depicted in FIG. 40.

In another example, the power generating station 4002 also supplies power to a facility including a data center and/or supercomputing facility 4080 requiring a large amount of electricity, where the facility 4080 may be installed offshore, e.g., as a module founded upon the seafloor on a seabed base structure as described herein.

In another example, the power generating station 4002 also supplies power to a local population center 4082. The population center 4082 may be an existing conurbation, a temporary city or work camp, a military or research base, an artificial offshore or seabed community, city, or offshore metropolitan area, or one or more combinations thereof.

Of note, in embodiments, the storage and distribution facility 4038 enables the export of products from the complex 4000; the secured receiving facility 4006 has safeguards such as secure tracking and reporting to appropriate regulatory authorities as fuel is received, as well as a secure physical fuel-transfer connection to the power generating station 4002; $H_2$ from the electrolysis plant 4014 can also be an input to the petrochemical process plant 4018 (or transfer connection); and other substances may be variously moved between facilities of complex 4000 for various purposes. The resource production waste treatment facility 4022 copes primarily with wastes from extraction from the mineral resource 4010 and the fossil fuel resource 4008. The refining process byproduct treatment facility 4024 copes primarily with wastes of the mineral processing plant 4020 and petrochemical processing plant 4018, enabling (e.g., by various treatments) such wastes to be recycled, neutralized, and/or sequestered. The environmental monitoring and remediation facility 4016 copes primarily with effluents, leaks, and spills from all the facilities of the complex 4000, whether nuclear or nonradioactive, chronic or emergent, and foreseen or unforeseen.

In an example of an energy-intensive industrial process benefiting from proximate access to the heat and electrical output of the power generating station 4002, magnesium carbonate ($MgCO_3$) to magnesium oxide (MgO) and $CO_2$ by the addition of heat, the $CO_2$ being either utilized in a process or persistently sequestered in a hydro-carbon bearing geologic formations enabling enhanced oil recovery or carbon capture-and-storage scheme, e.g., one that pumps supercritical $CO_2$ into a saline aquifer vertically segregated by a low-permeable cap-rock for long-term geologic storage. Such sequestration will be more economically feasible where the energy inputs to magnesite conversion and sequestration are more economically obtained, as in the complex 4000. The MgO thus obtained may be used in the reduction of other metals from ore, e.g., in Kroll processing of titanium or zirconium carried out by the mineral processing plant 4020. In another example, Bayer processing of bauxite to produce aluminum is known as an electricity-intensive process and would benefit by proximity to the power generating station 4002. In another example, process steam from the power generating station 4002 can be used to mobilize high-viscosity fossil fuels (e.g., bitumen) in an unconventional fossil fuel resource 4008 or a conventional reservoir depleted of readily extractable fossil fuel. In another example, magnesium is present as a soluble salt in seawater (~1.3×36-3 kg/liter Mg2+ ions, associated with chloride and sulfate ions), and can be produced as a suitable industrial compound, e.g., magnesia, as a byproduct of the desalination plant 4012.

Numerous other examples can be adduced of energy-intensive processes that would benefit by integration in a complex 4000 or other embodiments, e.g., oxygen liquefaction from air, electric steel and iron production, ferromanganese refinement, and more. All such processes are contemplated.

Various modular units included with complexes 3900 and 4000, including the nuclear power plants, may be located in a littoral, near-shore, or off-shore manner, realizing environmental and social advantages by minimizing disruption of landmass and coastal environments and human settlement patterns. The complexes 3900 and 4000 can, in an example, serve regions that have growing energy, water and transportation fuel needs, but do not wish or cannot afford to develop the massively expensive infrastructure that is required to produce them indigenously. For various embodiments, initial installation of can be rapid, as floatable modules are transported from shipyards to the site, with minimal site preparation required compared to traditional terrestrial power and water projects. If a worldwide fleet of floatable modules is available, production could be initiated within months as compared to years or decades for conventional development approaches. Capacity and capabilities of the complexes 3900 and 4000 or other embodiments can be modified flexibly during the lifetime of the project by adding or subtracting floatable modules. The customer does not have to commit to a 60-80-year project, and the host country does not need to own the infrastructure. In an example of the advantages realizable from such deployments, given a nuclear power source, desalinated water and synthetic fuels production occurs with essentially zero direct $CO_2$ emissions.

Moreover, various industrial and agricultural processes can realize advantages by integration with the nuclear plants in complexes 3900 and 4000, since closer proximity of facilities to the primary energy source and to each other reduces all losses and costs associated with transport of electricity, heat, water, gasses, industrial material, products, and the like. Pipelines, which tend to be expensive and vulnerable, are reduced by proximity to minimal lengths, enabling the more efficient transfer of liquids (e.g., desalinated water for agriculture and other processes) and gasses (e.g., $H_2$, notoriously difficult to contain) and the more economic exploitation of heat (the primary energetic output of a nuclear power plant) in, e.g., industrial, agricultural, production, and fuel extraction processes. Transmission losses for electrical power to points of use are also reduced, and shorter electrical transmission lines connecting the nuclear power plant to various facilities of the complexes 3900 and 4000 are less costly and more reliable than long-haul lines. Security and defense are advantageously realized in complexes 3900 and 4000 by tasking defensive systems (e.g., barriers, surveillance and sensor gear, oversight personnel, response teams, drones) with the security of a relatively unified and restricted area, e.g., that occupied by complexes 3900 and 4000, in contrast to securing a number of disparately located facilities connected by relatively long, costly, and vulnerable pipelines, transport routes, and power lines. Environmental benefits are also realized, e.g., by decreased land consumption for pipelines, power lines, and the like; by the increased feasibility of energy-intensive, environmentally beneficial processes such as manufacture of synthetic fuel from atmospheric carbon, dissolved oceanic carbon, fossil-fuel feedstocks, and/or $H_2$ from electrolysis; by increased feasibility of carbon sequestration from industrial processes and fuel synthesis; and the like.

In an illustrative use case, a coastal industrial enterprise of foreseeably temporary nature (e.g., mining of a finite resource) can realize advantages from the deployment of floatable module units in an agro-industrial complex, as these can be deployed rapidly and economically un-deployed by similar mechanisms at the end of project lifetime, again with potential realization of environmental benefits. These and other advantages are realized by various embodiments. Including of floatable module units by the proposed agro-industrial complex is unique and distinctive from all prior proposals for nuclear-powered complexes, e.g., *Nuclear Energy Centers: Industrial and Agro-Industrial*

*Complexes*, Oak Ridge National Laboratory ORNL-4290, November 1968, the teaching of which is incorporated herein by reference.

ii. Natural Gas Processing Center Powered by PGS

FIG. 41 is a schematic depiction of relationships between portions of an illustrative Power Generating Station-powered natural gas processing facility 4100, illustrative of a class of embodiments in which Power Generating Stations supply power for the extraction and/or processing of fuels. The facility 4100 includes a Power Generating Station (PGS) 4102 that supplies energy 4104 (heat and/or electricity) to a gas treatment process 4106 and a natural gas liquefaction process 4108. In examples, the treatment and liquefaction processes 4106, 4108 are located proximally to a coastal or littoral setting where the PGS 4102 (e.g., a nuclear reactor and the like) can be delivered by flotation, but may be located anywhere to which transmission facilities may effectively deliver the energy 4104 output of the PGS 4102. The gas treatment process 4106 includes, per standard industrial practice, devices or processes for feed gas compression 4110, condensate removal 4112, dehydration/mercury removal 4114, acid gas removal 4116, and lean gas compression 4118. Acid gas 4120 is delivered to a geological sequestration process 4122, which includes an injection compressor. Energy for the geological acid gas sequestration process 4122 may be supplied by the PGS 4102. The gas treatment process 4106 is supplied by a source or feed gas process 4126, e.g., a pipeline or well field, and delivers treated natural gas 4128 to the natural gas liquefaction process 4108. The liquefaction process 4108 includes devices or process for refrigeration 4130, end flash gas compression 4132, and boil off gas compression 4134. The primary outputs of the liquefaction process 4108 are liquefied natural gas (LNG) 4136 and fuel gas 4138.

II. Underwater Installation

FIGS. 42-53B illustrate some embodiments of methods and systems for the flexible, rapid installation of underwater premanufactured power plants (PNPs) upon the sea floor and for enabling unobstructed access to such underwater PNP installations from adjacent land. In embodiments, the PNPs are small modular nuclear reactors (SMRs) that may utilize conventional light water reactor (LWR) fuel and/or other uranium-based fuels, such as HALEU for reaction.

FIG. 42 depicts portions of an illustrative transportation facility 4200 that can include a number of submersible modules (e.g., module 4202) supported upon pilings (e.g., piling 4204) founded upon a seabed 4206 beneath a body of water 4208. The modules are mated end-to-end to form an at least partly air-filled underwater roadway 4210. At its ends, the underwater roadway 4210 communicates with access tunnels 4212, 4214 that ascend to surface access ports 4216, 4218, where surface roadways 4220, 4222 lead to and from the tunnels 4212, 4214. The submersible modules 4202 of the underwater roadway 4210 are often constructed in a temporary floodable, artificial or modified natural harbor near to the site of the transportation facility 4200, floated thereto, sunk upon previously prepared pilings 4204, and mated to each other to produce a secure tube through which move traffic, air, power, and the like. With this structure, submersible reactor modules 4408, 4410 can easily be deployed on known infrastructure or modular components of such a structure can be used to deploy one or more reactor modules.

FIG. 43 depicts portions of an illustrative submersible module 4300. Such a submersible module 4300 is typically on the order of tens of meters tall and scores of meters long. The cross-sectional form of the submersible module 4300 may be rectangular (as depicted), elliptical, circular, or other, and it typically includes a number of internal chambers or volumes (e.g., chamber 4302). Various bulkheads may divide the internal chambers one from another and/or cap the end ward portions of the submersible module 4300 to exclude the sea (e.g., during installation). One, two, or more of the faces or sides of the submersible module 4300 include one or more openings that can be mated to similar openings in other modules or structures. In the illustrative submersible module 4300, a single opening occupies the forward end of the submersible module 4300 and a similar opening occupies the opposite end. It will be appreciated in light of the disclosure that such submersible modules 4300 may be mated, end-to-end, to produce an extended underwater structure.

FIG. 44A schematically depicts portions of one stage of an illustrative method for adding submersible modules 4408, 4410 to an illustrative power generating facility 4400. The submersible modules 4408, 4410 are constructed employing principles similar to those described herein with reference to FIG. 42 and FIG. 43 and, in the completed state of the facility 4400, are submerged beneath a body of water 4402. An artificial or modified natural harbor 4404, separable from the body of water 4402 by a floodgate 4406, contains facilities for pumping the harbor 4404 free of water. In its emptied state, as depicted in FIG. 44A, the harbor 4404 is used as a stage for manufacturing or assembling submersible modules, e.g., a reactor module 4408 and a power conversion module 4410, both resting on the floor of the harbor 4404 in FIG. 44A. The modules 4408, 4410, depicted in side view, are air-filled, and their transverse ends can be sealed against water ingress by openable-closeable bulkheads. In embodiments, interior module components can include SMRs and turbine generators. An access tunnel 4412 provides communication between the seabed installation site of the modules 4408, 4410 and an access port 4414. Pilings capable of supporting the modules 4408, 4410 (e.g., piling 4416) are founded upon the seabed 4418. Only three pilings 4416 are depicted in FIG. 44A, but there is no restriction on the number of pilings 4416 that may be employed. The methods for installing prefabricated modules of a nuclear power generating station upon pilings 4416 that are shown and depicted in PCT App. Ser. No. PCT/US19/23724 (published as WO 2019/183575) claiming the benefit of U.S. Provisional Pat. App. No. 62/646,614, entitled, "SYSTEMS AND METHODS FOR RAPID ESTABLISHMENT OF OFFSHORE NUCLEAR POWER PLATFORMS," the entire disclosure of each is incorporated herein by reference, are among those used in various embodiments of the present disclosure for the installation of prefabricated modules upon a seabed.

FIG. 44B, depicts the facility 4400 of FIG. 44A in a later stage of assembly. In the state depicted in FIG. 44B, water from the body of water 4402 has been permitted to fill the harbor 4404 to a matching depth. The modules 4408, 4410 are depicted floating upon the water 4420 admitted to the harbor 4404. Barges, supportive floats for the modules 4408, 4410, vessels used to guide and otherwise manipulate the modules 4408, 4410, and various other components.

FIG. 44C depicts the facility 4400 of FIG. 44A in a still later stage of assembly. In the state depicted in FIG. 44C, the modules 4408, 4410 have been maneuvered through the opened floodgate 4406 and moved upon the surface of the body of water 4402 to a position above the seabed assembly site.

FIG. 44D depicts the facility 4400 of FIG. 44A in a yet later stage of assembly. In the state depicted in FIG. 44D, the modules 4408, 4410 have been lowered through the body of water 4402 to rest upon the pilings 4416 at the assembly site. Moreover, the modules 4408, 4410 have been mated both with each other and with the underwater opening of the access tunnel 4412. Appropriate bulkheads have been opened and other connections established to enable transfer of power, fluids, air, personnel, various materiel, vehicles, and the like among the modules 4408, 4410 as well as between the underwater portion of the installation 4400 and facilities on the land surface. In the state depicted in FIG. 44D, the basin 4404 has been pumped dry again in preparation for the manufacture of additional modules. In various other embodiments, modules are manufactured at a shipyard rather than in a local, special-purpose harbor 4404; or, are manufactured in a harbor 4404, floated to a shipyard for outfitting, and then floated to the installation site. Various embodiments include any number of modules 4408, 4410 equal to or greater than 1, one or more access tunnels 4412, one or more surface access ports 4414, various ancillary facilities and security measures upon the land surface, or the water surface, or under the water, and various other components. These and many similar variations upon the procedure of FIGS. 44A-44D may be readily imagined without entailing significant inventive novelty, and all such are contemplated and within the scope of the present disclosure.

FIG. 45 depicts, in schematic cross-section, portions of illustrative methods for lowering a prefabricated submersible module 4500 of a power generating facility to the module's final position in the facility. Pilings (e.g., piling 4502) have been previously established upon the seabed 4504 beneath a body of water 4506, preferably in a prepared channel, bed, or depression 4507. The illustrative module 4500 is presumed to have a specific gravity at least slightly greater than one and, thus, to sink unless supported by a barge, floats, or other devices; in various other embodiments, the submersible module 4500 has a specific gravity less than 1 and must therefore either be ballasted (e.g., by filling internal ballast tanks with water) to cause it to sink, or winched into place using pulldown cables, or otherwise caused to descend through the body of water 4506. In FIG. 45, the submersible module 4500 is supported via cables 4508, 4510 from a barge 4512 that includes hulls or floats 4514, 4516 sufficiently buoyant to support both the barge 4512 itself and the submersible module 4500, the latter being at least partly immersed. In a typical installation procedure, the barge 4512 with submersible module 4500 is maneuvered to a position above the pilings, lowered into place, and secured to the pilings 4502. Precision positioning of the module 4500 upon the pilings 4502 may be achieved by various methods, including the use of guidance fenders or computer-controlled guidance cables or submersible tug drones. After the submersible module 4500 has been secured to the pilings 4502, the cables 4508, 4510 are detached from the submersible module 4500 and the barge 4512 is re-used elsewhere.

FIG. 46 depicts the submersible module 4500 of FIG. 45 after the submersible module 4500 has been installed upon the pilings 4502. To stabilize the submersible module 4500 against water currents, ship strikes, earthquake, piling shift, and other forces that may tend to dislodge it from the pilings 4502, the submersible module 4500 is stabilized by an illustrative supportive bed 4600. The supportive bed 4600 may be injected under and around the submersible module 4500 in the form of fluidized sand, concrete, or other able sufficiently substances. Although depicted as lying mostly under the submersible module 4500, the supportive bed 4600 is in various embodiments deepened to partly or completely cover the submersible module 4500. Additionally or alternatively, embankments or coverings of different materials (e.g., crushed rock) be combined to protect and stabilize the submersible module 4500.

FIG. 47 depicts, in schematic cross-section, portions of illustrative methods for lowering a prefabricated submersible module 4500 of a power generating facility to the module's correct position in the facility. A foundation or prepared bed 4700 consisting of concrete, compressed crushed rock, or other sufficiently stable material has been previously established upon the seabed 4504 beneath the body of water 4506 in, for example, a prepared channel, bed, or depression 4702. The barge 4512 of FIG. 45 is again depicted in FIG. 47, here too lowering the submersible module 4500 to its resting position. The submersible module 4500 is affixed to the prepared bed 4700 by bolts, augurs, or other mechanisms. In various embodiments, the submersible module 4500 is further stabilized and protected by the addition of an embankment or covering of one or more materials (sand, concrete, crushed rock, etc.) as discussed herein with reference to FIG. 46. FIG. 47 illustrates that there is no restriction with regard to the mechanisms by which submersible modules 4500 of an underwater nuclear power generating station are, in various embodiments, stabilized and protected upon the seabed 4504.

FIG. 48A depicts, in schematic cross-section, portions of a stage in an illustrative method for mating two illustrative submerged modules 4800, 4802 (e.g., a reactor module and a power conversion module) in a secure manner. The facing ends of the two submerged modules 4800, 4802 are depicted. The submerged modules 4800, 4802 are surrounded by water 4804 at pressure (e.g., pressure such as is produced at tens of meters or more of depth) significantly greater than surface atmospheric pressure. Each submerged module 4800, 4802 includes an air-filled interior space 4806, 4808 at a pressure (e.g., atmospheric pressure) significantly lower than that of the surrounding water 4804. In the state depicted in FIG. 48A, water at ambient pressure fills the intermodular space 4810. The edges of the two submerged modules 4800, 4802 are of matching shape and size and form an uninterrupted annular contact zone when the two submerged modules 4800, 4802 are aligned and brought together, e.g., during the addition of one of the submerged modules 4800, 4802 to an underwater power station as exampled herein. A crushable gasket 4812 is attached to one of the submerged modules (here, module 4802) and interposes itself along the entire annular contact zone between the two submerged modules 4800, 4802. Further, a flexible internal fluid barrier 4814, attached to both of the submerged modules 4800, 4802, runs around the entire annular contact zone. Further, openable or removable bulkheads 4816, 4818 form at least a portion of the facing end walls of the two submerged modules 4800, 4802 and separate the interior air-filled spaces 4806, 4808 of the submerged modules 4800, 4802 from the intermodular space 4810. In the state depicted in FIG. 48A, submerged module 4800 is stationary (affixed to pilings or a foundation, not shown) and the submerged module 4802 is mobile (in the process of installation). In the state depicted, the two submerged modules 4800, 4802 have been approximated so that the crushable gasket 4812 is in contact with the stationary, submerged module 4800 with a force sufficient to form a water-tight seal between the submerged modules 4800, 4802.

FIG. 48B depicts the submerged modules 4800, 4802 of FIG. 48A in a later stage of installation. In the state depicted in FIG. 48B, the water in the intermodular space 4810 has been pumped out with pumps and channels, and air has been introduced into the intermodular space 4810 at a pressure (e.g., atmospheric) significantly lower than that of the surrounding water 4804. As a result, differential hydrostatic pressure on the exterior of the two submerged modules 4800, 4802 forces them together, compressing both the crushable gasket 4812 and the fluid barrier 4814. Since the submerged module 4800 is stationary and the submerged module 4802 is mobile, this closer approximation of the two submerged modules 4800, 4802 has occurred through a shifting of the mobile submerged module 4802 toward the stationary submerged module 4800. In a later stage of the illustrative method, the mobile submerged module 4802 is affixed to pilings or a foundation and the removable bulkheads 4816, 4818 are opened or removed to enable communication between the interior spaces 4806, 4808 of the submerged modules 4800, 4802. Additional modules may be similarly mated to other surfaces of either or both of the submerged modules 4800, 4802. It will be appreciated in light of the disclosure that by such mechanisms, a linear, two-dimensional, or three-dimensional array of submersible modules may be interconnected so as to form a seabed installation that includes power generation and other functions.

FIG. 49 depicts in schematic cross-section portions of an illustrative underwater power-generating installation 4900 according to embodiments. A nuclear power module 4902 is installed into a seabed base structure 4904 that is founded upon a number of pilings 4906 driven into a seabed 4908 beneath a body of water 4910. The methods of installation upon pilings using seabed base structures are described in PCT App. Ser. No. PCT/US19/23724 (published as WO 2019/183575) claiming the benefit of U.S. Provisional Pat. App. No. 62/646,614, identified above, and incorporated by reference herein. In the setting of the installation 4900, the geography of the coast 4912 is steep and rocky. In this case, access to the land-side surface can be advantageously provided with a first, horizontal access tunnel 4914 and a second, vertical or steeply sloping access tunnel 4916. The installation 4900 of FIG. 49 is illustrative of a class of embodiments whose methods of modular installation and arrangements for surface access differ in some respects from those depicted in FIGS. 48A and 48B.

In FIGS. 50A and 50B, portions of an illustrative seabed installation 5000 including power generation facilities are depicted in schematic cross-section and in aligned top-down view. The installation 5000 is stationed upon pilings 5002 founded upon a seabed 5004 beneath a body of water 5006 and includes six modules 5008, 5010, 5012, 5014, 5016, 5018. The module 5010 is a nuclear power module including several SMRs (e.g., SMR 5011), the module 5008 is a power conversion module including turbine-generator equipment 5009, and the other modules perform various other functions, e.g., control, personnel housing, spent-fuel storage, and server farm housing. The modules 5008, 5010, 5012, 5014, 5016, 5018 are interconnected at their adjacent or abutting surfaces so as to create a common intercommunicating interior space: e.g., module 5016 is connected to modules 5010, 5014, and 5018. Removable or closeable bulkheads permit the closure of intercommunicating openings between modules. Also, the two modules 5012, 5018 that are landward (e.g., proximate to the shoreline 5019) are connected to parallel surface access tunnels 5020, 5022 that ascend to surface roadways 5024, 5026 which in turn ascend upon a sloped surface access port 5028. Pipelines, powerlines, rail lines, and other facilities for transporting power, fluids, materiel, and the like to and from the underwater portion of the installation 5000 are also included.

It will be appreciated in light of the disclosure that many variations on the number, disposition, and functions of the elements depicted in the illustrative installations of FIG. 50A and FIG. 50B are contemplated, because they are within the knowledge of those skilled in the art. All such variations are contemplated and within the scope of the present disclosure. In an example, an enclosed (e.g., steel compartment) nuclear power module, such as without limitation an IPW/IPC module may be attached laterally to the tunnel 5028. In the example, steam and condensate return lines may be interfaced with underwater components and the like.

In FIGS. 51A and 51B, portions of an illustrative seabed installation 5100 including power generation facilities are depicted in schematic cross-section and in aligned top-down view. The installation 5100 is stationed upon pilings 5102 founded upon a seabed 5104 beneath a body of water 5106 and includes modules 5108, 5110, 5112, 5114, 5116, 5118. Module 5110 is a nuclear power module including several SMRs (e.g., SMR 5111), module 5108 is a power conversion module including turbine-generator equipment 5109, and the other modules perform various other functions, e.g., control, personnel housing, spent-fuel storage, and server farm housing. The modules 5108, 5110, 5112, 5114, 5116, 5118 are interconnected as for the similar modules of the installation 5000 in FIGS. 51A and 51B. The two landward modules 5112, 5118 are connected to parallel surface access tunnels 5120, 5122 that ascend to surface roadways 5124, 5126 which in turn ascend upon a sloped surface access port 5128. Pipelines, powerlines, rail lines, and other facilities for transporting power, fluids, materiel, and the like to and from the underwater portion of the installation 5100. The system 5100 of FIGS. 10A and 10B also includes an illustrative "server farm barge (super-computing center, data center)" 5130 that includes a service or barge portion 5132 and a bulk computational facility 5134. The bulk computational facility 5132 may store data, perform intensive computations, or perform other computational or communicative tasks requiring a significant amount of energy. Advantages realizable by locating a bulk computational facility on a floating platform in various embodiments include but are not limited to proximity to a non-variable source of electricity, freedom from on-land siting constraints, efficient shipyard production of multiple identical units as opposed to on-site construction of customized on-land facilities, easy relocation of the facility, easy swap-out for an updated facility, immunity to earthquakes, and enhanced security due to the relatively greater difficulty of attack over water.

The barge 5132 is connected by at least one mooring cable 5136 to at least one seabed anchor or mooring 5138 and receives power from the generator module 5108 via a suspended cable 5140. The barge 5132 includes supportive machinery, crew quarters, security measures, backup generators, and other features that support the functioning of the bulk computational facility 5134. Data are exchanged between the data barge 5130 and one or more networks via wireless communications (e.g., microwaves), via high-speed solid-state data links (e.g., optical fibers) routed through portions of the facility 5100 or independently thereof, or via some combination of various communication methods.

Floating bulk computational facilities have been proposed in the prior art (e.g., in U.S. Pat. No. 7,525,207, "WATER-BASED DATA CENTER," whose entire disclosure is incorporated herein by reference), but such disclosures have not featured the provision of power by underwater generating facilities such as those depicted and described herein. Various other embodiments include two or more data barges, data barges configured otherwise than as depicted in FIGS. 10A and 10B, data centers housed in one or more piling-supported underwater modules of the system 5100 (e.g., modules 5114, 5116, 5118), and data centers coexisting with other enterprises housed in the system 5100.

FIGS. 52A and 52B depict portions of an illustrative seabed installation 5200 in schematic side view and aligned top-down view according to embodiments. System 5200 resembles system 5100 except that the data barge 5130 is replaced by a bulk computational facility 5202 that is supported by pilings 5204 and a seabed base structure 5206 according to methods similar to those disclosed in WO 2016/085347 Al and WO 2017/168381 Al, referenced herein. Advantages realizable by an installation such as the installation 5200 are similar to those realizable by installation 5100 of FIGS. 10A and 10B.

FIGS. 53A and 53B depicts portions of an illustrative seabed installation 5300 in schematic cross-section and in aligned top-down view according to embodiments. The installation 5300 includes an illustrative multi-level fulfillment center 5302 for unmanned aerial vehicles (UAVs), e.g., UAV 5304. The fulfillment center 5302 includes ports 5306 through which UAVs 5304 carrying loads (e.g., consumer goods or raw materials) to points of destination may depart and through which UAVs 5304 may return after having delivered their loads. The center 5302 is founded upon pilings 5308 and a seabed base structure 5310 according to methods similar to those disclosed in WO 2016/085347 Al and WO 2017/168381 Al, referenced herein. The center 5302 includes an access hub 5312 stationed within a gap in the pilings array and accessed through an underwater transportation roadway 5314 similar to the underwater roadway 4210 of FIG. 42. Goods and materials are delivered to the fulfillment center 5302 through the roadway 5314 for distribution by the fulfillment center 5302. The center 5302 receives power from the power conversion module 5316. The fulfillment center 5302 resembles that disclosed in U.S. Pat. App. No. 2017/0175413 A1, "MULTI-LEVEL FULFILLMENT CENTER FOR UNMANNED AERIAL VEHICLES," whose entire disclosure is incorporated herein by reference. Advantages realizable by locating a fulfillment center on a floating or piling-founded platform associated with an underwater power generation facility in various embodiments include but are not limited to proximity to a non-variable source of electricity, freedom from on-land siting constraints, efficient shipyard production of multiple identical fulfillment center units as opposed to on-site construction of customized on-land facilities, easy relocation of the fulfillment center, easy swap-out for an updated fulfillment center, immunity to earthquakes, proximity to coastal urban areas, and enhanced security due to the relatively greater difficulty of attack over water.

III. Nuclear Fuel Handling

FIGS. 54-102 illustrate some embodiments of methods, systems, components, and the like for the handling of fresh and spent nuclear fuel assemblies (FAs) and of bodies of water associated with such handling in offshore nuclear power units.

A. Offshore Nuclear Plant

FIG. 54 is a relational block diagram depicting illustrative constituent systems of a marine nuclear plant, also herein termed a Unit, and illustrative associated systems that interact with the Unit and each other. A Unit Deployment 5400 includes a Unit Configuration 5402 and the associated systems with which the Unit Configuration directly interacts via material and non-material mechanisms. In the illustrative Unit Deployment 5400 of FIG. 54, the associated systems with which the Unit Deployment 5400 interacts are Operation 5404, Deployment 5406, Consumers 5408, and Environment 5410. Overlap of the boundaries of associated systems 5404, 5406, 5408, 5410 with the Unit Configuration is shown to indicate that the Configuration 5402 and its associated systems (5404, 5406, 5408, 5410) overlap in practice, and cannot be meaningfully considered in isolation from one another. The Unit Configuration 5402 includes Unit Integral Plant 5412, the primary constituent physical systems of the PNP; the Unit Integral Plant 5412 is a supports the operation of the PNP unit regardless of the particulars of the Unit Deployment 5400. The Unit Configuration 5402 incorporates the Unit Integral Plant into a form factor suitable for a given Unit Deployment 5400. In examples, the Unit Integral Plant 5412 is designed, built, assembled, and maintained as a structure of discrete physical modules, where the sense of "module" shall be clarified with reference to Figures herein. The Unit Integral Plant in turn includes nuclear power plant systems 5414, which produce energy from nuclear fuel and manage nuclear materials such as fuel and waste; power conversion plant systems 5416, by which energy from the nuclear power plant systems 5414 is, typically, converted to electricity; auxiliary plant systems 5418, which support the operation of the individual PNP unit; and marine systems 5420, which enable the PNP to subsist and function in a marine environment.

1. Interface Systems Interconnect the PNP with Externals

The associated systems (5404, 5406, 5408, 5410) interact with the Unit Configuration via Interface Systems 5422, 5424, 5426, 5428. In embodiments, the terms "interface," "interface system," and "interfacing system" may be understood to encompass, except where context indicates otherwise, one or more systems, services, components, processes, or the like that facilitate interaction or interconnection of systems within a PNP or between one or more systems of the PNP with a system that is external to the PNP, or between the PNP and associated systems, or between systems associated with a PNP. Interface Systems may include software interfaces (including user interfaces for humans and machine interfaces, such as application programming interfaces (APIs), data interfaces, network interfaces (including ports, gateways, connectors, bridges, switches, routers, access points, and the like), communications interfaces, fluid interfaces (such as valves, pipes, conduits, hoses and the like), thermal interfaces (such as for enabling movement of heat by radiation, convection or the like), electrical interfaces (such as wires, switches, plugs, connectors and many others), structural interfaces (such as connectors, fasteners, inter-locks, and many others), or legal and fiscal interfaces (contracts, loans, deeds, and many others). Thus, Interface Systems may include both material and non-material systems and methods. For example, the Interface System 5422 for interfacing the Unit Configuration 5402 with Operation 5404 will include legal arrangements (e.g., deeds, contracts); the Interface system 5428 for interfacing the Unit Configuration 5402 with the Environment 5410 will include material arrangements (e.g., tethers, tenders, sensor and warning systems, buoyancy systems).

The Operation 5404 system includes Operators 5430 and Interface Systems 5422; the Deployment system 5406 includes Deployers (e.g., builders, defenders, maintainers) and Interface Systems 5424; the Consumers system includes Consumers 5434 and Interface Systems 5426; and the Environment system includes the natural Physical Environment 5436 and Interface Systems 5428. The physical environment for a PNP may be characterized by various relevant aspects, including topography (such as of the ocean floor or a coastline), seafloor depth, wave height (typical and extraordinary), tides, atmospheric conditions, climate, weather (typical and extraordinary), geology (including seismic and thermal activity and seafloor characteristics), marine conditions (such as marine life, water temperatures, salinity and the like), and many other characteristics. Associated systems may also be included with a Unit Deployment; stakeholders informing the design, manufacture, and operation of a PNP unit may include power consumers, owners, financiers, insurers, regulators, operators, manufacturers, maintainers (such as those providing supplies and logistics), de-commissioners, defense forces (public, private, military, etc.), and others. Moreover, the systems (5404, 5406, 5408, 5410) interact with each other through one or more additional Interface Systems 5438.

2. Nuclear Plant Includes Fuel and Containment Systems

FIG. 55 is a schematic depiction of portions of illustrative embodiments of the nuclear power plant systems 5414 of FIG. 54, which are part of the unit integral plant 5412. The portions of the power plant systems 5414 depicted in FIG. 55 pertain to the handling of FAs within the PNP and include fuel systems 5502 and containment systems 5504. Fuel systems 5502 include systems for (Fuel Assembly) FA receiving and shipping 5505, fuel storage 5506, and general handling (e.g., rotating and translating) 5508 outside the containment. Containment systems 5509 include one or more nuclear reactors 5510 and systems for primary heat transport 5512, in-containment fuel handling 5514, in-containment auxiliary functions 5516, and in-containment contingency functions 5518. Inputs and outputs of the fuel systems 5502 include fresh fuel 5520 and spent fuel 5522 exchanged with non-integral deployment interface systems 5424 of FIG. 54 as well as exchanges of fuel, both fresh and spent, with the in-containment fuel handling system 5514. Heat is also typically exported by the fuel storage system 5506 to the PNP environment. Inputs and outputs of the containment systems 5504 include heat (e.g., heat exported to the power conversion plant systems 5416 of FIG. 54) and other wastes.

3. Deployment and Unit Configuration Details

FIG. 56 is a schematic depiction of portions of an illustrative unit configuration 5402 of FIG. 54 and of an illustrative deployment 5406. In particular, the relationships are depicted of fuel-handling systems and methods that include but are not limited to the systems and methods discussed herein to the schema of FIG. 54. The unit configuration 5402 includes the unit integral plant 5412 of FIG. 54 and auxiliary plant systems 5606. The unit integral plant 5412 includes nuclear power plant systems 5414, which in turn includes integral fuel-service systems 5602 and auxiliary fuel-service systems 5604. The unit configuration 5402 also includes accessory fuel service systems 5608 and accessory fuel service modules 5610. The fuel service systems 5608 in turn include primary systems 5612 and auxiliary systems 5614. The accessory fuel service systems 5608 and modules 5610 are included both by the unit configuration 5402 and by the associated fuel service systems 5616 of the associated deployment 5406. The associated fuel service systems also include onshore facilities 5618 (both primary 5624 and auxiliary 5626), offshore facilities 5620 (both primary 5628 and auxiliary 5630), and transport systems 5622 (both primary 5632 and auxiliary 5634). Examples of onshore facilities include facilities for receiving and holding FAs and reprocessing or disposing of FAs. Watercraft for transporting fresh fuel and dry-casked spent FAs are examples of transport systems 5622.

B. PNP Deployment Coupled to Land Grid

An additional system associated with fuel is operation 5404. In the illustrated embodiment, operation 5404 includes fuel service agreements 5636.

1. Single PNP Deployment Coupled to Land Grid

FIG. 57 is an overhead-view schematic depiction of portions of an illustrative Unit system arrangement 5700 that can include embodiments of the present disclosure. A single PNP unit 5702 is located in a body of water 5704 (e.g., ocean, lake, artificial harbor). In FIG. 57, a power transmission line 5706 conducts electricity and/or thermal energy to and from a body of land 5708 (e.g., island, mainland) or, in some cases, a vessel, platform, or other artificial body. In FIG. 58, the land body 5708 supports an electrical grid 5812 to which the line 5808 connects at a connection facility 5814. All PNPs depicted herein include at least one nuclear reactor with equipment for producing heat and/or electricity therefrom. Also herein, a "power transmission line" may include provisions for the transmission of electrical power, or thermal energy, or both.

2. Multi PNP Deployment Coupled to Land Grid

FIG. 58 is an overhead-view schematic diagram depicting portions of an illustrative PNP system arrangement 5800 including a multiplicity of PNPs 5802, 5804, 5806 that exchange power with a land body 5708 or other power-consuming location via a power transmission line (e.g., line 5808). The PNPs 5802, 5804, 5806 also exchange power with each other via one or more local power transmission lines (e.g., line 5810). The cluster of PNPs interfaces with a grid 5812 at a connection facility 5814 that is associated with a support facility 5816. The support facility 5816 has access to both the body of water 5704 and the land body 5708. In the cluster-style arrangement of FIG. 58, the power lines interconnecting the PNPs and the power line 5808 connecting the PNP cluster to the mainland grid 5812 reduce, relative to the single-unit configuration of FIG. 57, the probability that any PNP will be subject to a loss of external power or that the grid 5812 will lose access to power from the PNPs.

C. PNPs Integrated with Au. Structures on Land

FIG. 59 is an overhead-view schematic diagram depicting portions of an illustrative PNP system arrangement 5900 including two PNPs 5902, 5904 that exchange power with a land body 5708 or other power-consuming location. Each PNP 5902, 5904 has been transported in a floating manner to its service location and the grounded sufficiently near the shore to be integrated with an associated auxiliary structure, e.g., structure 5906 for PNP 5902 and structure 5908 for structure 5904. A shared facility 5910 provides support functions (e.g., control, crew housing, onshore fuel handling, defense, maintenance and supply, other) to the two PNPs 5902, 5904. The auxiliary structures 5906, 5908 exchange power with a grid 5912 via power lines (e.g., line 5914) and a power connection facility 5916.

D. PNP Coupled to Land Grid with Offshore Support Facility

FIG. 60 is an overhead-view schematic diagram depicting portions of an illustrative PNP system arrangement 6000 including a multiplicity of PNPs 6002, 6004, 6006 that exchange power with a land body 5708 or other power-consuming location via a power transmission line (e.g., line 6008). The PNPs 6002, 6004, 6006 also exchange power with each other via one or more local power transmission lines (e.g., line 6010). The cluster of PNPs interfaces with a grid 6012 at a connection facility 6014. An offshore support facility 6016 is located in relatively close proximity to the cluster of PNPs 6002, 6004, 6006. Functions provided by the support facility 6016 can include control, crew housing, offshore fuel handling, defense, maintenance and supply, and other.

E. Simple PNP Configurations

Any of the PNPs of FIGS. 56, 57, 58, and 59 or similar arrangements may be of any of the basic types depicted herein with reference to other Figures, or of other PNP types.

FIGS. 61A and 61B schematically depict aspects of illustrative Unit Configuration scenarios including embodiments of the present disclosure. FIG. 61A depicts three illustrative simple configurations, that is, configurations where the PNP Unit is deployed substantially as a single relocatable unit assembled in a modular manner in a shipyard and floated to its service location. A first simple configuration 6102 is herein denoted the “PNP-B” configuration, where a PNP 6104 is grounded on the seafloor 6106, e.g., by filling its ballast tanks with water after being towed to the site. The PNP-B configuration 6102 is typically suitable for relatively shallow water (for example, approximately 10-30 meters depth). A second simple configuration 6108 is herein denoted the “PNP-E” configuration, where a floating PNP 6110 having a relatively flat, wide, barge-like form factor is anchored to the seafloor 6106 at its service site by tethers, e.g., tether 6112. The PNP-E configuration 6108 is typically suitable for water of moderate depth (for example, approximately 60-100 meters depth). A third simple configuration 6114 is herein denoted the “PNP-C” configuration, where a floating PNP 6116 having a relatively cylindrical form factor is anchored at its service site by tethers, e.g., tether 6118. The PNP-C configuration 6114 is typically suitable for water of greater depth (for example, 100+ meters depth).

1. Complex/Compound Configurations

FIG. 61B depicts four illustrative compound configurations, that is, configurations where the PNP Unit is deployed substantially as two units, at least one of which is a relocatable unit assembled in a modular manner in a shipyard and floated to its service location. In the three compound configurations of FIG. 61B, a nuclear module is combined with an accessory module to realize various advantages (e.g., submersion of a nuclear reactor to realize protection from aircraft or surface-vessel impacts; or, capability of swapping out the nuclear module in order to prevent long down-times during refueling or other maintenance or repairs of nuclear systems).

i. Grounded on Seafloor at Shoreline

A first compound configuration 6118 is herein denoted the “PNP-D” configuration, where a nuclear module 6120 is grounded on the seafloor 6106 at a shoreline, e.g., by filling ballast tanks of the nuclear module 6120 with water after towing the module 6120 to the site. The nuclear module 6120 is interfaced with an accessory unit 6122 and, in examples, may be manufactured in a modular manner at a shipyard, towed to the service location, and hauled ashore. The PNP-D configuration 6118 is typically suitable for relatively shallow water (for example, approximately 0-10 meters depth).

ii. Grounded on Pilings

A second compound configuration 6121 is herein denoted a “PNP-P” configuration, where “-P” refers to the fact that the facility is founded upon the seabed 6106 on a number of pilings (e.g., piling 6125). The PNP-P deployment 6121 includes a seabed base structure, founded upon pilings, that proffers an artificial harbor into which a nuclear power unit has been delivered by flotation. The illustrative PNP-P 6121 includes a modular nuclear reactor 6123 that is positioned below the waterline and supported by the seabed 6106. In various other embodiments, PNP-Ps include different types of modular nuclear reactors than that depicted for PNP-P 6121, more than one modular nuclear reactor, and other structural geometries (e.g., modular nuclear reactors positioned above the waterline). Modular units having various functionalities may be established by such methods, which are described in detail in PCT App. Ser. No. PCT/US19/23724 (published as WO 2019/183575) claiming the benefit of U.S. Provisional Pat. App. Ser. No. 62/646,614, the entirety of each is incorporated herein by reference. In an example, a nuclear reactor unit, a power-generation unit, and a support-functions unit are delivered into separate seabed base structures founded upon pilings and in proximity to each other, then interconnected to establish a nuclear power generating station.

iii. Grounded on Seafloor

A third compound configuration 6124 is herein denoted the “PNP-M” configuration, where a nuclear module 6126 is grounded on the seafloor 6106 and interfaced with an accessory unit 6128, which also may be manufactured in a modular manner at a shipyard and towed to the service location. The PNP-M configuration 6124 is typically suitable for water of moderate depth (for example, approximately 20-60 meters depth).

A fourth compound configuration 6130 is herein denoted the “PNP-S” configuration, where a floating nuclear module 6132 is interfaced with a floating accessory unit 6134, which also may be manufactured in a modular manner at a shipyard and towed to the service location. The floating accessory unit 6134 is anchored to the seafloor 6106 at its service site by tethers, e.g., tether 6136. The PNP-S configuration 6130 is typically suitable for water of greater depth (for example, 100+ meters depth).

It will be appreciated in light of the disclosure that the categories of “simplex” and “compound” PNP configurations, and the particular examples shown herein, are illustrative only, and not restrictive of the range of PNP configurations in various embodiments.

In all examples herein where a floating nuclear power plant is mentioned or depicted, or any portion of a PNP in contact with a sea or other large body of water is mentioned or depicted, similar examples might be adduced that include modular nuclear reactor units and other units supported by seabed base structures according to the methods disclosed in PCT App. Ser. No. PCT/US19/23724 (published as WO 2019/183575) claiming the benefit of U.S. Provisional Pat. App. Ser. No. 62/646,614. These and various other forms of PNP configuration, construction, and stabilization, without restriction, are contemplated and within the scope of the present disclosure.

F. Modular Unit Schema

FIG. 62 is a schematic depiction of an illustrative Unit Modularization 6200, that is, a high-level schema for the modularization of a PNP. Systems included with a PNP are, in embodiments, classified as (1) integral, (2) accessory, or (3) associated. Integral systems are typically part of the PNP, regardless of configuration or deployment scenario. The two integral systems are assigned in this illustrative modularization to corresponding modules, e.g., the Power Conversion Plant Module 6202 and the Nuclear Plant Module 6204. The Power Conversion Plant Module, in turn, includes a Turbine Module 6206 that employs high-pressure steam from the Nuclear Plant Module 6204 to turn one or more turbines and generators, a Condenser Module 6208 that condenses steam from the Turbine Module 6206 for return to the Nuclear Plant Module 6204, and some number of Auxiliary Modules 6210. Accessory systems are systems that are typically included with or that directly interface with a PNP unit depending upon the particular configuration and deployment of the PNP; for example, seafloor tether systems are categorized as accessories because they may be omitted from some embodiments where the PNP is grounded on the seafloor. Associated systems are those that typically interface with one or more Units and are part of the greater context in which a PNP Unit is deployed. For example, power transmission systems conveying power between a PNP and an on-land grid perform an associated function.

G. Primary Vs. Auxiliary Systems

Also herein, primary systems are those performing functions definitive of the purpose of the PNP, e.g., generating steam from nuclear heat or generating electrical power from steam; primary systems are closely aligned with integral systems. Auxiliary systems (typically instantiated in corresponding Auxiliary Modules 6210) are those that typically support the reliable operation of primary systems, e.g., by cooling, lubricating, powering, controlling, and monitoring primary systems, and the like.

H. Containment Module

The Nuclear Plant Module 6204 includes a Containment Module 6212 that contains the nuclear reactor, a Fuel Module 6214 that performs fuel handling and spent-fueling storage functions, and some number of Auxiliary Modules 6216.

I. Accessory Modules

Accessory Modules 6218 are also included with the Unit Modularization; these include modularized systems for handling aspects of interaction with associated systems of operation 6220, deployment 6222, physical environment 6224, and consumers 6226, among others.

J. Unit Modularization Description

In embodiments, unit modularization may be responsive to at least two sets of criteria, requirements, or constraints (collectively referred to simply as "constraints"), which are in aspects peculiar to the marine situation of a PNP and which may occasionally be in tension: (1) internal constraints on form and organization (e.g., it may be inherently advantageous to locate turbines and generators close together, or to have a direct interface between the Containment Module 6212 and the Fuel Module 6214), and (2) external constraints, such as those derived from the PNP's environment (e.g., physical, electrical, operational, fiscal, or the like). In various embodiments, a particular Modularization may be configured to satisfy the criteria herein and others while taking advantage of shipyard assembly and manufacturability.

1. Distinguishing Modules Vs. Systems

Of note, modules and systems are not synonymous. Although in many cases a single system may be implemented in a single module, a system may extend across multiple modules, or a single module may include more than one system, in whole or part. Moreover, in embodiments, modules are combinable and nestable.

2. Example PNP x-Section

FIG. 63 is a schematic vertical cross-sectional depiction of the Block and Megablock modules constituting an illustrative PNP Unit 6300 of the floating cylindrical type defined with reference to FIG. 61A. In embodiments, the term "Block" or "Block module," may be understood to encompass, except where context indicates otherwise, a closed structural form assembled from Panel modules, Skid modules, and components in a factory at a shipyard and then relocated to a drydock for further assembly into the final PNP Unit. The block module may or may not have one or more of its edges acting as the hull of a unit. Also, the term "mega-block module" may be understood to encompass, except where context indicates otherwise, a closed structural form assembled from multiple Block modules, such as joined in a dry-dock. Megablock modules may be suitable for transport between shipyards; which may help distribute the construction work, such as between a variety of shipyards. Toroidal Blocks appear as symmetrically positioned shapes marked with a common indicator number. In FIG. 63, Block boundaries are denoted by dashed lines and Megablock boundaries by solid lines. The PNP 6300 includes an Upper Hull Megablock 6302 and Lower Hull Megablock 6304. The Upper Hull Megablock 6302 includes a Power Conversion System Megablock 6306, a Crew Accommodation Block 6308, an External Access and Security Block 6310, an External Access and Security Block 6312, a Turbine Generator Set Block 6314, a Condenser Block 6316, and an OP (operations) Block 6318. The Lower Hull Megablock 6304 includes a Nuclear Island Megablock 6320, a Ballast Tank Block 6322, a Base Plate Block 6324, a Stability Skirt Block 6326, and two Water Storage Blocks 6328, 6330. The Nuclear Island Megablock 6320 includes a Reactor Containment Block 6332, an Emergency Electrical Block 6334, a Nuclear Fuel Block 6336, a Chemical Volume Control System Block 6338, and a Cooling System Block 6340.

K. Example Nuclear Fuel Cycle

FIG. 64 is a schematic depiction of an illustrative nuclear fuel cycle 6400, including fuel-related processes, manipulations, and transports, that are typical of various nuclear power systems, including systems including embodiments of the present disclosure. Fuel ores (e.g., uranium ores) undergo mining 6402 and refining into metallic form 6404. Refined fuel metal then undergoes enrichment 6406 in order to increase its concentration of more-fissile isotopes. Enriched fuel is used in fuel fabrication 6408, that is, in the manufacture of shaped fuel units (e.g., cylindrical pellets) that are combined and housed in fuel assemblies (FAs) suitable for installation in a reactor core. Fabricated FAs are transported to the vicinity of a reactor where they undergo fuel staging 6410, that is, storage in a system accessible to refueling mechanisms 6412 that can transfer the FAs to a reactor 6414. "Refueling" systems are also used for initial fueling of the reactor 6414.

L. Handling Overview Noting Cooled and Shielded Handling

Notably, all exchanges of material up to this point in the nuclear fuel cycle 6400, from mining 6402 to refining 6404 to enrichment 6406 to FA fabrication 6408 to staging 6410 to the refueling mechanism 6412 typically occur in a non-shielded, non-cooled manner, as the nuclides composing the fresh fuel material have relatively long half-lives and emit radiation and heat at a relatively low rate. After exposure to neutron flux in the core of a reactor 6414, however, the nuclide composition of the fuel material changes, and the fuel becomes intensely radioactive and hot. The heat emitted by a used or "spent" FA can be sufficient to melt the FA itself, potentially leading to environmental release of radioactive nuclides. Therefore, after an FA has participated in nuclear chain reactions in the reactor 6414, it is not typically extracted from the reactor 6414 or subsequently moved, whether within a given facility or between facilities, without being both continuously cooled and often shielded as well. FA cooling is typically provided by immersion of a hot FA in water, which transfers heat from the hot FA to the environment by convection, conduction, and phase changes (such as boiling and condensation of material that is in thermal contact with the FA). In FIG. 64, transfers and transports that are cooled and shielded are denoted by solid arrows, while those that are neither cooled nor shielded are denoted by dashed arrows.

M. Spent FA Handling

When a spent FA is removed from the reactor 6414 by the refueling mechanism 6412, it is moved immediately via a cooled (e.g., submerged) transfer procedure to cooled storage, e.g., either in-containment storage 6416 or a spent fuel storage pool 6418. In typical practice, a spent FA is kept in spent fuel storage pool 6418 for a number of years (e.g., 5 years) to allow its nuclide composition to change and its radiation and heat output to decline correspondingly. When it is deemed practical to handle the FA, it is enclosed in a cooled transfer canister 1220 for movement to a facility where the FA may undergo casking 6422, that is, placement in a heavy container typically consisting of reinforced concrete. When filled with spent FAs, a cask is sealed and moved to temporary dry storage 6424 ("dry" because the FA heat output is now low enough that the cask need not contain water or other liquids) and thence, ideally, to final disposal, such as in deep subsurface geological storage 6426. Alternatively, after canistering 6420 an FA may be transported to a facility for reprocessing 6428, that is, for the separation of useful nuclides from unwanted nuclides. Extracted nuclides may be employed in the production of reactor fuel (e.g., returned to the enrichment step 6406) or of nuclear weapons. Unwanted nuclides from reprocessing are directed, for example, to near surface disposal 6430 or deep subsurface geologic storage 6426.

N. Transfer and Storage of Fuel Assemblies and Refueling

The systems and methods disclosed herein pertain, in various embodiments, to transfers and storage of FAs within a PNP, and particularly to transfers between the reactor 6414 and refueling mechanisms 6412, between the refueling mechanisms 6412 and in-containment storage 6416 or spent fuel pool storage 6418, from storage to canistering 6420, and from canistering 6420 to casking 6422. Transfers of FAs and the management of water associated with FA cooling and transport and of heat produced by FAs during storage and transport are enabled with various advantages by embodiments of the present disclosure.

O. Fuel Services

FIG. 65 is a schematic depiction of an illustrative set of fuel services 6500 provided by systems and methods both integral to and associated with a PNP in various embodiments. The fuel services 6500 include those provided both by primary systems 6502 and auxiliary systems 6504. Primary systems 6502 include those enabling transfer 6506, transport 6508, storage 6510, and processing 6512 of FAs; auxiliary systems 6504 include those enabling cooling of FAs 6514, control of FA-handling systems 6516, security 6518, monitoring 6520, and chemistry filtration 6522 of water associated with fuel handling. In general, for a PNP as distinct from a typical terrestrial plant, any given auxiliary system can provide functions for any given primary system or for more than one primary system, enabling various economies (e.g., of space). The fuel services 6500 of FIG. 65 are provided by the associated fuel service systems 5616, accessory fuel service systems 5608, and integral fuel service systems 5602 of FIG. 56. The systems and methods of this disclosure pertain particularly, though not necessarily exclusively, to the integral fuel service systems 5602 of FIG. 56, that is, to the handling of fresh and spent fuel and of associated bodies of water and flows of heat within a PNP.

P. Spent Fuel Pool Cooling Systems

Cooling systems are critical in nuclear plant design. The purpose of a spent fuel pool cooling system is to prevent heat damage to FAs held in the pool. That is, the system must prevent the FAs from reaching a predetermined unsafe or damaging temperature at all times, including and after all plausible accident scenarios (e.g., a total station power blackout). Since this is such a critical purpose, it is desirable for the spent fuel pool cooling system to operate passively (e.g., without an external AC power source), indefinitely (e.g., with an effectively inexhaustible ultimate heat sink and supply of intermediate coolant), and durably (e.g., with resistance to breakage, degradation, or external interference). Herein, the body of water serving as the ultimate heat sink is referred to as the "ocean," but there is no restriction to any particular form of water body. Also, where coolant fluids are herein referred to as "water," no restriction to $H_2O$ is intended.

Q. External Water Body Heat Sink for Cooling Fuel Pools

Disclosed herein are methods and systems that can be deployed either alone or in various combinations to function as a system for cooling fuel pools and other heat-generating PNP components using an external body of water as the ultimate heat sink. Four categories of systems according to embodiments of the present disclosure are shown in FIGS. 66-69. The present disclosure offers a passive system of rejecting heat indefinitely from a PNP without any intervention from plant operators or active powering of pumps or other devices. Although rejection of heat from a spent fuel pool is primarily depicted and discussed herein, rejection of heat from any and all sources within a PNP is contemplated and within the scope of the present disclosure.

R. Cooling System Embodiments

FIG. 66 is a schematic depiction of portions of a cooling system 6600 according to an illustrative embodiment. A PNP spent fuel pool compartment 6602 is located between a containment structure 6604 and the outer hull 6606 of the PNP. The pool compartment 6602 contains a body of water 6608 and, typically, some number of spent FAs 6610. A pipe 6612 or multiplicity of pipes conveys a flow of intermediate coolant fluid, which is not in fluid communication with the water 6608 within the pool compartment 6602, through a loop that passes through the interior of the pool compartment 6602, through the hull 6606, and through the ocean 6614. A first heat exchanger 6616 that is internal to the pool compartment 6602 transfers heat 6618 from the FAs 6610 to the coolant in the intermediate loop, and a second heat exchanger 6620 that is external to the pool compartment 6602 transfers heat 6622 from the intermediate loop to the ocean 6614. The heat exchangers 6616, 6620 are at different elevations; moreover, loop fluid that has passed through the external heat exchanger 6620 will be cooler and therefore have higher density, even without a phase change (e.g., for water that remains liquid throughout the intermediate loop), than loop fluid that is passing through or has recently passed through the interior heat exchanger 6616. The coolant fluid will therefore circulate, driven by convection, around the intermediate loop without the assistance of pumps, conveying heat from the pool compartment 6602 to the ocean 6614.

In embodiments, the system may be configured such that convective circulation will occur even if the system is inverted (e.g., if the PNP capsizes). Provision of multiple loops with different orientations can assure continued circulation in any PNP orientation (e.g., in conditions of tilting or listing that diminish the driving impact of gravitation between the heat exchangers of any one intermediate loop).

Various other embodiments resembling that depicted in FIG. 66 incorporate the following variations. First, in various embodiments resembling that depicted in FIG. 66, a working fluid is employed in the intermediate loop that changes phase at a desired operational temperature and pressure, enabling the intermediate loop to operate passively (without pumps) with a very small gravitational driving head (e.g., elevation difference between the two heat exchangers) due to the large difference in density between the two phases of the working fluid. In embodiments, a phase-changing fluid also enables the intermediate loop to be tuned to begin operating at a particular temperature threshold. At temperatures below the threshold, the loop does not extract significant heat from the spent fuel pool, which may be extracted by one or more systems such as an actively pumped system. As temperatures rise above this threshold, the working fluid changes to a lower density phase (boils); pressure in the loop increases and the vapor-phase coolant rapidly (via buoyancy) travels to the heat exchanger 6620 immersed in the ocean 6614, where it cools and condenses back to its original phase. In embodiments, the condensing heat exchanger 6620 is located above the boiling heat exchanger 6616. In embodiments, such a design may be configured to employ multiple channels (e.g., two, as in a thermosiphon) between the heat exchangers 6616, 6620 for the working fluid to pass through or a single channel (as is the case for a traditional heat pipe).

In embodiments, the heat exchanger 6616 inside the spent fuel pool compartment 6602 may be located near the highest elevation inside the compartment 6602, e.g., in a gas-filled portion of the compartment 6602, so that it condenses the steam that accumulates there. The spent fuel pool compartment 6602 may be configured such that this condensing water runs back into the body of water 6608 within the compartment 6602, such as to maintain a water level above the fuel assemblies 6610. In embodiments, water is used as the working fluid of the heat-exchange loop. In embodiments, a water-ammonia mixture (such as the working fluid used in a Kalina cycle) is used to export heat through the heat-exchange loop. In yet other embodiments, other fluids are employed with properties favorable to heat-exchange by a loop having one end immersed in an effectively ultimate heat sink (e.g., ocean) and the other in a spent-fuel pool. In various embodiments, the heat-rejection portion 6620 of the heat-exchange loop includes surfaces resistant to biofouling, e.g., alloys of copper or titanium.

In embodiments, a manual actuation valve (normally closed) and passive actuation valve (normally open) act in parallel to initiate flow through the heat-exchange loop 6612. The passive valve is actuated by a variety of initiating events that could lead to the heating of the spent fuel pool including, but not limited to, loss of offsite power causing a solenoid valve to open or altered gas pressure in the fuel pool compartment 6602 causing a relief valve to open.

FIG. 67 is a schematic depiction of portions of a cooling system 6700 according to an illustrative embodiment. These illustrative embodiments use an array of thermally conductive pipes or channels through which water from the external body of water flows to exchange and transfer heat from the spent fuel pool to the external body of water. In FIG. 67, a PNP spent fuel pool compartment 6702 is located between a containment structure 6704 and the outer hull 6706 of the PNP. The pool compartment 6702 contains a body of water 6708 and, typically, some number of spent FAs 6710. A network or multiplicity of pipes may form channels 6712 conveys a flow of piped water, which is not in fluid communication with the water 6708 within the pool compartment 6702, through a loop or loops that pass within the thermally conductive walls of the compartment 6702, through the hull 6706, and to the ocean 6714. Pool water 6708 transfers heat from the FAs 6710 to the walls of the compartment 6702, which in turn convey them to heat exchangers (e.g., heat exchanger 6716) within the walls of the compartment 6702. Ocean water is admitted to the pipe network channels 6712 through an intake 6718 and exhausted to the ocean 6714 through an outlet 6720. The inlet 6718 and outlet 6720 are at different elevations; moreover, water that has passed through the heat exchangers will be hotter and therefore have lower density, even without a phase change, than water entering the inlet 6718. Ocean water will therefore spontaneously convect through the pipe network channels 6712 without the assistance of pumps, conveying heat from the compartment 6702 to the ocean 6714. Convective circulation will occur even if the system is inverted (e.g., if the OP capsizes).

Various other embodiments resembling that depicted in FIG. 67 incorporate the following variations. First, an air/steam outlet may be provided to prevent air bubbles from forming inside the channels 6712. In embodiments, check valves may be located on the outlet 6720 to the channels to control the flow of water when the system is first started. In embodiments, the channels 6712 may be machined into the outside of the steel spent fuel pool walls. In embodiments, the channels 6712 may be welded onto the outside of the spent fuel pool. In embodiments, the channels 6712 may be thermally adhered to the outside of the spent fuel pool. In embodiments, the channels 6712 may pass through the inside of the spent fuel pool 6702 along the pool walls.

In embodiments, a manual actuation valve (normally closed) and passive actuation valve in parallel may be provided to initiate flow through the channels 6712. The passive valve may be actuated by a variety of initiating events that would lead to the heating of the spent fuel pool 6702, including, but not limited to, loss of offsite power.

FIG. 68 is a schematic depiction of portions of a cooling system 6800 according to an illustrative embodiment. These illustrative embodiments use water from the ocean to directly fill the spent fuel pool in cases where the water level inside the spent fuel pool has nearly boiled off, e.g., been reduced to the point where it covers the tops of the FAs either shallowly or not at all. In FIG. 68, a PNP spent fuel pool compartment 6802 is located between a containment structure 6804 and the outer hull 6806 of the PNP. The pool compartment 6802 contains a body of water 6808 and, typically, some number of spent FAs 6810. Provisions for removing heat from the spent fuel compartment 6802. An inlet 6812 permits entry of water from the ocean 6814 through pipe 6816 that passes through the hull 6806 and into the interior of the spent fuel compartment 6802 via a valve 6818. The valve 6818 remains closed as long as water levels within the pool compartment 6802 are within an acceptable depth range. In embodiments, a sensor (e.g., a float sensor 6820) may communicate by a control line 6822 (such as with a passive hydraulic or pressure-activated connection) with the valve 6818. If the sensor 6820 detects that the level of pool water 6808 has fallen below a certain threshold, the valve 6818 opens, allowing ocean water to augment the water inside the pool compartment 6802. FIG. 68 depicts a state of operation in which ocean water is being admitted to the pool compartment 6802.

Various other embodiments resembling that depicted in FIG. 68 incorporate the following variations. In embodiments, the valve 6818 in the ingress path of the external water may include a check valve, so that once the water enters the spent fuel pool compartment 6802 it cannot exit via that same path.

In embodiments, two parallel paths may be provided for ingress of external water: one path with a manual valve that is normally closed (so that water can be let into the pool manually) and a second path with a manual valve that is normally open in series with a passively actuated valve that is normally closed but opens when the water level of the spent fuel pool drops below a specified level. In the latter path, the normally open manual valve allows the operator to manually shut off flow regardless of the state of the passively actuated valve.

FIG. 69 is a schematic depiction of portions of a cooling system 6900 according to an illustrative embodiment. These embodiments include a watertight compartment enclosing the spent fuel pool functioning as a heat pipe to expel heat to the external body of water and maintain an inventory of coolant in the spent fuel pool. As water in the pool boils off from the decay heat of the spent FAs, steam travels up towards the cooled ceiling of the compartment, condenses, and then rains and/or flows as liquid water back into the pool to keep the FAs fully submerged. The ceiling is cooled by spontaneous circulation of ocean water passing over it in sheets, passing over or through it via channels, or located above it en masse (e.g., in a volume open to or interfacing with the ocean). The geometry of the ceiling and walls of the spent fuel compartment may be shaped so as to encourage the condensed liquid water to quickly flow back into the pool towards the spent FAs and so as to induce rapid heat transfer between the spent fuel pool and the cooling water. In FIG. 69, a PNP spent fuel pool compartment 6902 is located between a containment structure 6904 and the outer hull 6906 of the PNP. The pool compartment 6902 contains a body of water 6908 and, typically, some number of spent FAs 6910. A network or multiplicity of pipe network 6912 conveys a flow of water, which is not in fluid communication with the water 6908 within the pool compartment 6902, through a loop or loops that pass within the thermally conductive ceiling of the compartment 6902, through the hull 6906, and to the ocean 6914. Pool water 6908 is boiled by heat from the FAs 6910; steam rises and condenses upon the ceiling of the compartment 6902, heating the ceiling, which conveys the heat to circulating ocean water in the pipe network 6912 via heat exchangers (e.g., heat exchanger 6916) within the ceiling. Heat exchange may also be accomplished by direct conduction to the pipe network 6912, without the assistance of discrete heat exchangers. Ocean water is admitted to the pipe network 6912 through an intake 6918 and exhausted to the ocean 6914 through an outlet 677. The inlet 6918 and outlet 6920 are at different elevations; moreover, water that has passed through the ceiling of the compartment 6902 will be hotter and therefore have lower density, even without a phase change, than water entering the inlet 6918. Ocean water will therefore spontaneously convect through the pipe network 6912 without the assistance of pumps, conveying heat from the compartment 6902 to the ocean 6914. Condensed water 6922 will rain and/or flow back to the main body of water 6908 in the fuel pool compartment 6902, maintaining an approximately constant water level.

S. Canister Magazine Spent Fuel Storage

The following figures pertain to a fuel storage system, according to embodiments, that avoids the need of a separate long-term spent fuel storage pool by using a smaller, in-containment fuel pool to temporarily cool FAs before transferring them through a tube to a storage canister. These canisters are kept on a rack or magazine in a flooded tank or chamber in the PNP, which may be located, in embodiments, near the outer hull of the PNP that can be removed at the end of platform life. The free water surface associated with spent fuel is thus minimized by such a system, which is advantageous in a floating PNP. Also, during decommissioning of a PNP, removal of spent fuel is facilitated by canistering of the FAs.

FIG. 70A is a schematic, top-down, cross-sectional view of portions of a PNP canister magazine spent fuel storage system 7000 according to an illustrative embodiment. A short-term spent fuel holding pool compartment 7002 is located within a containment structure 7004. A canister magazine 7006 is located between the containment structure 7004 and the outer hull 7008 of the PNP. Individual FAs (e.g., FA 7010) are removed from the temporary holding pool compartment 7002, rotated to a horizontal position, and passed through the walls of the containment structure 7004 and of the magazine 7006 via a water-filled tube 7012. Provisions are made for keeping FAs immersed in water during all stages of such handling. In the magazine 7006, FAs are loaded into steel canisters, e.g., canister 7014. In embodiments, FIG. 70A depicts each canister 7014 as holding a single FA, but canisters 7014 may, in some examples, hold more than one FA. The magazine 7006 contains both loaded canisters (e.g., canister 7014) and empty canisters (e.g., canister 7016). Provisions are made for extracting individual canisters from the magazine 7006, as needed. Canisters are registered or aligned with the transfer tube 7012 by moving them on a conveyor belt or equivalent system. Although a single layer of canisters, one rank deep, is portrayed in FIG. 70A, in various embodiments, canisters are multiply layered and ranked. Both canisters and the space around them in the magazine 7006 are filled with water. Heat is removed from the magazine 7006 to the environment (e.g., ocean) by various mechanisms, systems and methods disclosed herein.

FIG. 70B provides two aligned, close-up, schematic, cross-sectional views of portions of the illustrative canister magazine spent fuel storage system 7000 of FIG. 70A. The lower portion of FIG. 70B is a closer view of the view of FIG. 70A, and the upper portion of FIG. 70B is a vertical cross-sectional view of the same mechanism. Depicted in greater detail in FIG. 70B than in FIG. 70A is the fuel pool compartment 7002, the transfer tube 7012, the water-filled canister magazine 7006, a filled canister 7014, an empty canister 7016, and a horizontally positioned FA 7010. Vertically positioned FAs (e.g., FA 7018) and a conveyor mechanism 7020 within the magazine 7006 are also depicted in FIG. 70B. Mechanisms for laying down an FA, keeping an FA submerged at all times, moving an FA through the transfer tube 7012, loading an FA into a canister, sealing a canister, registering an empty canister, and performing related tasks. For example, the transfer tube 7012 can be arranged to terminate under the waterline in the fuel pool compartment 7002. A lay-down machine similar to that found in land-located nuclear plants can, in this example, be used to lay down FAs under water in the compartment 7002 and introduce them to a mechanism for transfer through the tube 7012.

T. Access Controlled Passively Cooled Spent Fuel Tank

Because hot spent FAs are highly radioactive and toxic, and depriving them of cooling can result in significant environmental releases of radioactivity, it is desirable to make human access to spent FAs inherently difficult. Further, it is desirable to mitigate free-surface effects that can arise in open pool spent-fuel storage systems in a floating PNP rocked by waves. Embodiments of the present disclosure address these needs by providing a completely flooded tank for spent fuel storage. In embodiments, such embodiments may be provided with a selectively floodable airlock for transferring spent fuel into and out of the storage tank. The decay heat generated by the spent fuel may be passively transferred to seawater from the storage tank through natural thermal conduction to tank walls or other heat sinks, and thence, such as by convection, ultimately to the environment (e.g., ocean).

FIG. 71A is a schematic, vertical, cross-sectional view of portions of an illustrative PNP spent-fuel tank system 7100. The system 7100 includes a spent fuel tank 7102 that contains a number of vertically oriented spent FAs (e.g., FA 7104). A number of hatches (e.g., hatch 7106) are positioned in the ceiling of the tank 7102, which is filled with water 7108. In this embodiment, each hatch 7106 is built to open downward, into the interior of the tank 7102; however, in alternative embodiments, hatches that open upward, or both upward and downward, may be provided. A standpipe 7110 is in fluid communication with the interior of the tank 7102 via a pipe 7112 by which the tank 7102 is also in fluid communication with a heat exchanger 7114, which transfers heat to the environment (e.g., ocean). Circulation through the heat exchanger 7114 and tank 7102 may be either driven by pumps or may circulate by passive convection. The standpipe 7110 is partly filled with water 7116. Water may be pumped into, or withdrawn from, the standpipe 7110 via a makeup pipe 7118. Water returns from the heat exchanger 7114 to the tank 7102 via a second pipe 7120. In various embodiments, separate paths of fluid communication are provided for the standpipe 7110 and the tank 7102.

The system 7100 further includes a fuel-handling mechanism 7122 capable of lifting an FA vertically. The fuel-handling mechanism 7122 is housed inside an airlock 7124. The fuel-handling mechanism 7122 and its airlock 7124 can be both vertically and horizontally translated; within limits, vertical translation of the fuel-handling mechanism 7122 and the airlock 7124 are independent. The operation of these two devices shall be further clarified with reference to FIG. 71B.

In the state of operation of the system 7100 depicted in FIG. 71A, e.g., the locked state, the level of water 7116 in the standpipe 7110 is significantly higher than the ceiling of the tank 7102. Thus, as indicated by open arrows (e.g., arrow 7126), there is significant water pressure acting upward on the ceiling of the tank 7102 and on the valves of the hatches. Closing force may also be exerted on the hatch valves by a spring or other mechanisms. Since the valves only open downward, the hydraulic force resisting the opening of each hatch 7106 is approximately proportional to the water pressure at the ceiling of the tank 7102 times the area of the hatch. The tank 7102 is thus, in the locked state of operation depicted, inherently resistant to entry. In embodiments, the airlock 7124 and fuel-handling mechanism 7122 are designed so that their vertical translation mechanisms do not have sufficient strength to force a hatch 7106 open when the system 7100 is locked.

FIG. 71B depicts system 7100 of FIG. 71A in an unlocked state of operation, that is, a state where the level of water 7116 in the standpipe 7110 has been lowered to approximately the level of the ceiling of the tank 7102. In this condition, the upward closing pressure exerted on the hatches by the tank water 7108 is approximately zero.

In the unlocked condition, a fuel-handling machine and airlock can access FAs inside the tank 7102 via one or more of the hatches.

Although, in embodiments, the system 7100 includes only a single airlock and fuel-handling machine, for clarity, FIG. 71B depicts four airlocks 7124, 7128, 7130, 7132 and four fuel-handing machines 7122, 7134, 7136, 7138 accessing four FAs 7104, 7140, 7142, 7144 through four hatches 7146, 7106, 7148, 7150. Each of these ensembles is depicted in a different stage of accessing an FA and removing it from the tank 7102.

Stage 1. Hatch 7146 is closed. The airlock 7124 approaches by being translated downward. Its nether end, shaped to complement the upper surface of the hatch 7146, has not yet made contact therewith.

Stage 2. Hatch 7106 has been forced open by downward translation of the airlock 7128, which has passed therethrough. The sides of the airlock 7128 hold the valves of the hatch 7106 open. Valves (e.g., valve 7152) at the nether end of the airlock 7128 have opened after the nether end of the airlock 7128 passed through the hatch 7106, admitting water into the interior of the airlock 7128.

Stage 3. Fuel handling machine 7136 has been vertically translated through the open airlock 7130 to enable its gripping end 7154 to grasp the FA 7142. Hatch 7148 is similarly held open to hatch 7106 by an airlock.

Stage 4. Fuel handling machine 7138 has been translated upward into the airlock 7132, drawing with it the FA 7144, and the airlock 7132 has also been translated upward, though not yet sufficiently to allow self-closure of hatch 7150. The valves of airlock 7132 having been closed while the airlock 7132 was still approximately at the depth shown in FIG. 71B for airlock 7130, and the airlock 7132 contains trapped water sufficient to cover the captured FA 7144.

Stage 5. It will be appreciated in light of the disclosure that withdrawing airlock 7132 entirely from the opening of hatch 7150 will permit hatch 7150 to close. When all airlocks have been withdrawn and all hatches are closed, the water 7116 in the standpipe 7110 can be raised and the system 7100 returned to the Locked condition. After airlock closure around a captured FA, the airlock is free to ascend and deliver the FA to further handling mechanisms regardless of whether or not the system 7100 is locked or unlocked.

U. Cooled and Shielded Fuel Assembly Manipulator

Movement of hot FAs within a PNP will occasionally be necessary, e.g., during refueling, when spent FAs must be removed from the reactor core. Handling and movement of FAs fully and continuously submerged in large pools of water is the norm in terrestrial nuclear plants, but can be disadvantageous in a PNP, particular a floating PNP, where free surface effects are of concern. Embodiments of the present disclosure provide for the manipulation and movement of spent FAs, such as FAs that are contained in canisters. In embodiments, a cooling system is provided for cooling the FAs during manipulation and movement.

FIG. 72A is a schematic, vertical cross-sectional depiction of portions of an illustrative cooled and shielded apparatus 7200 including a fuel handling machine of a PNP, herein referred to in some cases as an "FA manipulator," according to embodiments. The vertically oriented manipulator 7200 includes a tubular case 7202; an FA gripper 7204 mounted on a shaft 7206 that can, within a limited range, be translated vertically independently of the manipulator case 7200, such as through a gasketed feed-through 7208; a steam relief valve 7210; a water makeup line 7212 that is in fluid communication with the interior of the case 7202 and through which water may enter and/or leave the case 7202; hoist rings (e.g., ring 7214); and heat-dissipation fins 7216. The manipulator 7200 also includes openable valves 7218 at its nether end (e.g., clamshell doors) that are capable of sealing the interior of the case 7202 and containing pressurized fluids therein. Each valve 7218 turns upon a hinge 7220. For each valve 7218, a cable 7222 enters the interior of the case 7202 through a gasketed feedthrough 7224, runs over a pulley 7226, and attaches to the valve 7218. Retraction of the cable 7222 causes the valve 7218 to rise. Opening the valves opens the nether end of the manipulator 7200. The valves are weighted so that they close gravitationally when the control cables are relaxed; in various embodiments, a spring-powered, hydraulic, or other closure mechanism can be additionally provided.

Lifting cables are attached to the hoist rings 7214. The manipulator 7200 can be vertically translated by shortening its lifting cables and horizontally translated by horizontally translating the attachment point of its lifting cables. In some states of operation, as shall be made clear with reference to FIG. 72B and FIG. 72C, the manipulator 7200 contains an FA suspended from the gripper 7204 and is filled partly or wholly with water, enabling an FA to be moved within a PNP in a cooled manner. Moreover, the walls and valves of the manipulator 7200 are, in embodiments, shielded, to reduce irradiation of objects approached by the manipulator 7200 while transporting a hot FA.

FIG. 72B is a schematic, vertical cross-sectional depiction of portions of the manipulator 7200 of FIG. 72A during retrieval of an FA 7228 from a reactor vessel 7230. In the state of operation depicted in FIG. 72B, the top of the reactor vessel 7230 has been removed and the valves (e.g., valve 7220) of the manipulator 7200 have been retracted, opening the nether end of the manipulator 7200, which has been lowered partly into the water 7232 within the reactor vessel 7230. The FA gripper 7204 has been lowered on its shaft 7206 to enable the gripper 7204 to engage with an FA 7228. In subsequent stages of operation, the gripper 7204 can be raised so that the FA 7228 is enclosed in the manipulator 7200 and the valves closed, capturing both the FA and a sufficient quantity of water to keep the FA immersed within the manipulator 7200.

FIG. 72C depicts a state of operation of the manipulator 7200 in which an FA 7228 and a quantity of water 7232 have been captured and the valves at the nether end of the manipulator 7200 have been closed, trapping the FA 7228 and the water 7232. Additional water is being added through the water makeup line 7212. Heat generated by the FA can escape from the manipulator 7200 by one or more of radiation from the sides of the case 7202 and the radiator fins 7216, release of gas through the steam relief valve 7210, or circulation of water through the interior of the manipulator 7200 via the makeup line 7212, which may contain parallel conduits for bidirectional flow.

The manipulator 7200 in the state of operation of FIG. 72C can be translated vertically and/or horizontally to any desired location in the PNP, where it can be immersed in water and the capture process reversed, such as to deliver the FA to another fuel-handling subsystem, to a storage location, or the like. Advantageously, the liquid free surface within the manipulator 7200 is minimal; further, the water 7232 in the manipulator 7200 may be in fluid communication with other bodies of water in the PNP such as via the makeup line 7212, through which flow may be managed by the narrowness of the line 7212 and by valves.

V. Precluding or Mitigating the Free Surface Effect of Inventories of Water Related to Spent Fuel Removal or Reactor Cooling Embodiments of this disclosure address the need in a PNP, particularly a floating PNP, to remove spent FAs from the core and perform critical safety-related core cooling functions while keeping the platform protected from large free surface effects. The traditional refueling strategy of a terrestrial light water reactor would, if transposed directly to a PNP, entail risk for potentially destabilizing free surface effect or large, rapid relocation of mass in an offshore platform. Likewise, the traditional strategy of maintaining large open pools of coolant in a containment structure to serve passive core-cooling functions would, if transposed directly to a PNP, constitute another high-risk source of a potentially destabilizing free surface effect. Therefore, various embodiments of systems and architectures are provided for transferring spent fuel assemblies and maintaining liquid coolant inventories while avoiding or mitigating large, rapid, or resonant mass transfers that could compromise the stability of the platform.

FIG. 73 is a schematic vertical cross-sectional depiction of portions of a PNP 7300 according to illustrative embodiments of the present disclosure, in which volumes of water in the PNP are arranged so that the PNP remains stable even if water routing systems fail. In the illustrative embodiment, every volume of liquid with a free surface open to a cofferdam or compartment, the containment volume, or connected by a fluid routing to another volume of water is sufficiently small in total volume so as to be incapable of applying a destabilizing moment to the PNP relative to the platform's metacenter if the total mass of each volume of liquid were to be redistributed due to contingency or failure of systems used to place the volumes in fluid communication. Moreover, the total number of discrete water volumes connected by potential flow paths, and their total mass, is such that even if all the discrete water volumes were to relocate through flow paths upon failure of flow control, the resulting moment on the PNP would not be destabilizing. FIG. 73 depicts a number of cofferdams (e.g., cofferdams 7302, 7304), all of which are capable of containing water. A flow path 7306 between a higher cofferdam 7302 and a lower cofferdam 7304 is depicted. In example, the higher cofferdam 7302 is a refueling makeup water reservoir and the lower cofferdam 7304 is a refueling chamber within a reactor containment included with the PNP 7300. If water 7308 is present in the higher cofferdam 7302, it may flow by gravity through the flow path 7306 to the lower cofferdam 7304. While in the higher, centrally located cofferdam 7302 the water 7308 exerts no moment around the metacenter "M" of the PNP 7300; upon moving to the lower cofferdam 7304, the water 7310 does exert such a moment. While any nonsymmetrical rearrangement of mass within a floating vessel must alter the vessel's orientation to some degree, the positions and masses of water bodies in the PNP 7300, and the interconnections between them, include in various embodiments a system such that no possible rearrangement or movement thereof, gravitational, pumped, or resonant, even in combination with any other possible rearrangement of moveable materials aboard the PNP (e.g., fuel, vehicles, ballast), causes the PNP to list or oscillate beyond an acceptable safety threshold. In an example, a multiplicity of water-filled cofferdams constituting a first set A, arranged around the perimeter of the PNP 7300, is severally connected to a multiplicity of similar but empty cofferdams constituting a second set B. Each of the set B cofferdams is on the far side of the metacenter M from the set B cofferdam's connected partner in set A. By elementary mechanics, the maximum shift in the center of gravity of the PNP 7300 achievable in such a counterpoised system by moving water from any subset of cofferdams in set A to any subset of cofferdams in set B is less than that which would be achievable if all the set A cofferdams were on one side of the metacenter M and all the set B cofferdams were on the other side. Indeed, given complete symmetry of the moment arms of the set A and set B cofferdams around the metacenter M, transferring all water from set A to set B would not shift the PNP's center of gravity at all. The number of specific PNP cofferdam shapes, locations, sizes, and interconnections that can meet the stated stability criteria is clearly without limit; however, all such configurations are contemplated and within the scope of the present disclosure.

FIG. 74 is a schematic cutaway depiction of portions of an illustrative refueling canal system 7400 including a number of adjacent, coolant-filled compartments according to embodiments. Adjacent compartments have tall lock doors through which vertically oriented FAs can pass. The doors are equipped with interlock mechanisms such that every compartment remains sealed and full of coolant except for the 1 or 2 compartments in which a spent FA is resident, or through which a spent FA is passing, at any given moment. In FIG. 74, the canal system 7400 includes an overhead crane (refueling machine) 7402 that is capable of raising and lowering an FA 7404, e.g., to remove the FA 7404 from a reactor vessel 7406, and a number of compartments 7408, 7410, 7412, 7414 that are filled largely or wholly with water. Four compartments are depicted in FIG. 74, but various embodiments include any number of compartments greater than zero. Each compartment is topped by an openable lid, e.g., lid 7416 (closed) and lid 7418 (open). Each compartment communicates with two of its neighbors via two openable doors shaped and sized to admit the passage of an FA 7404; e.g., compartment 7410 communicates with compartment 7408 via a first door 7420 and with compartment 7412 via a second door 7422. To move an FA 7404 from one compartment to the next, two lids and a single door are opened, the FA 7404 is translated through the open door, the lid of the first compartment is closed, and the door is closed: e.g., to move the FA 7404 from compartment 7410 to compartment 7412, lids 7418 and 7424 are opened, door 7422 is opened, the FA is translated through the door 7422 by the refueling machine 7402, lid 7418 is closed, and the door 7422 is closed. Passage of an FA or other load through a canal 7400 of any length or number of compartments can be achieved by repeating such manipulations. In various embodiments, an interlock mechanism enforces the rule that a lid cannot open if both its neighbors are already open and/or if two lids anywhere along the canal are already open. The compartmentalized and interlocked design of the refueling canal 7400 assures that free surface effect is minimized, most of the water in the canal 7400 being contained inside sealed compartments at all times.

FIG. 75 is a schematic depiction in top and side views of portions of an illustrative compartmentalized coolant tank 7500 of a PNP according to embodiments of the present disclosure. These illustrative embodiments include an arc-shaped, compartmentalized in-containment refueling water storage tank 7500 with radial dividers defining compartments 7502, 7504, 7506, 7508. In embodiments, an arc-shaped reservoir may be deployed due to the usually cylindrical form of a containment. Coolant flow between the tank's compartments 7502, 7504, 7506, 7508 is controlled by a set of valves 7510, 7512, 7514. Each valve offers fluid communication between two compartments, passively opening when there is a pressure differential between the two compartments above a certain value for a certain duration of time. Thus, continued withdrawal of coolant from any one chamber will eventually enable withdrawal of coolant from all the chambers. The time duration threshold for valve activation is set to be longer than any natural period of sloshing for a given overall tank geometry and coolant type. The number of compartments and valves differs in various embodiments, as does the overall shape of the tank 7500 and of the compartments; various embodiments include horizontal dividers as well as, or instead of, vertical dividers.

FIG. 76A is a schematic depiction in top and side views of portions of an illustrative spent fuel pool sub-compartment 7600 of a PNP according to embodiments of the present disclosure. These illustrative embodiments include a spent fuel pool sub-compartment bounded by tall grid-like walls that prevent large transverse flow of coolant between adjacent compartments. The sub-compartment walls or dividers (e.g., divider 7602) extend from the floor 7604 of the spent fuel pool to the free surface 7606 of the coolant. The dividers also have vertically oriented openable doors in the upper portion of each dividing plane (e.g., door 7610) that enable FAs (e.g., FA 7612) to be moved between into and out of each compartment. The dividers and doors are perforated by holes 7614 near the bottom and top of the sub-compartment 7600, enabling coolant to flow in and out of the sub-compartment 7600 in a constrained manner, e.g., as driven by convection. In embodiments, walls may be shared between adjacent sub-compartments, as depicted in FIG. 76B, and doors may be omitted from dividers that are not adjacent to another sub-compartment.

FIG. 76B is a top view of portions of an illustrative spent fuel pool 7616 including nine sub-compartments similar to the sub-compartment 7600 depicted in FIG. 76A. An outer wall 7618 confines the coolant inventory of the fuel pool 7616. Open arrows indicate examples of coolant flow 7620 between a body of water 7622 surrounding the nine sub-compartments and of coolant flow 7624 between adjacent compartments. FIG. 76B also depicts movement of an FA 7626 from a first compartment 7628 to a second compartment 7630 through an opened door 7632.

FIG. 76C is a view of a spent fuel pool 7634 similar to the pool 7616 depicted in FIG. 76B but including 16 sub-compartments including an outer wall of the pool 7634.

FIG. 77 is a schematic vertical cross-sectional depiction of portions of an illustrative spent-fuel PNP storage system 7700 according to embodiments. The system 7700 includes a spent fuel tank 7702 (e.g., a compartment serving the same function as a spent fuel pool but with its volume entirely filled with coolant) connected to a refueling canal (transfer tube) 7704. The refueling cavity 7706 and reactor 7708 are inside a containment 7710 and the spent-fuel tank is outside. The spent-fuel tank 7702 is positioned sufficiently far below the floor of a refueling cavity 7706, with respect to the vertical axis of the PNP, so that for a given angle theta of the refueling canal 7704, tip or list of the PNP below some design threshold does not cause the coolant in the spent fuel tank to rise above the point of connection of the canal 7704 to the refueling cavity 7706 relative to the direction of gravity. The elevation difference 7712 between the tank 7702 and the cavity 7706 is also great enough to prevent the coolant in the tank 7702 from passing substantially into the refueling cavity 7706 by impetus, e.g., when subjected to wave-induced pitching, within a certain design threshold. FIG. 77 depicts the movement of an FA 7714 through the canal 7704, and the storage of some number of FAs 7716 within the spent fuel tank 7702.

FIG. 78A is a schematic vertical cross-sectional depiction of portions of an illustrative spent-fuel PNP storage system 7800 according to embodiments. The system 7800 includes a compartmentalized water-lock connection (e.g., water-filled refueling canal or transfer tube) 7802 between a refueling cavity 7804 within a containment 7806 and a spent fuel pool 7808. The transfer tube 7802 provides an intermediate volume of water that is only in fluid communication with either the refueling cavity water 7810 or the spent fuel pool water 7812 at any given time during transfer of an FA 7814 from the refueling cavity 7804 to the spent fuel pool 7808 or in the opposite direction. For example, in passing an FA 7814 from the refueling cavity 7804 into the transfer tube 7802, the first door 7816 is opened. A mechanical interlock mechanism assures that the first door 7816 can only open if the second door 7818 is shut and likewise that the second door 7818 can only open if the first door 7816 is shut, preventing free flow of water between the spent fuel pool 7808 and the refueling cavity 7804. The FA 7814 is then passed by a conveyor mechanism into the transfer tube 7802, whereupon the first door 7816 is closed. At some time during the residence of the FA 7814 in the transfer tube 7802, the second door 7818 is opened. This state of operation is depicted in FIG. 78B. The conveyor mechanism then transfers the FA 7814 into the spent fuel pool 7808, where a standup machine and fuel-handling machine add the FA 7814 to a set of other FAs 7820. The process is reversed to extract an FA from the spent fuel pool 7808. The water lock system just described clearly precludes or mitigates free surface effect by limiting the amount of coolant and mass that can be exchanged between these two watertight sectors of the PNP (e.g., the fuel pool 7808 and the refueling cavity 7804) at any given time.

Figures 79A, 79B, 79C, 79D:
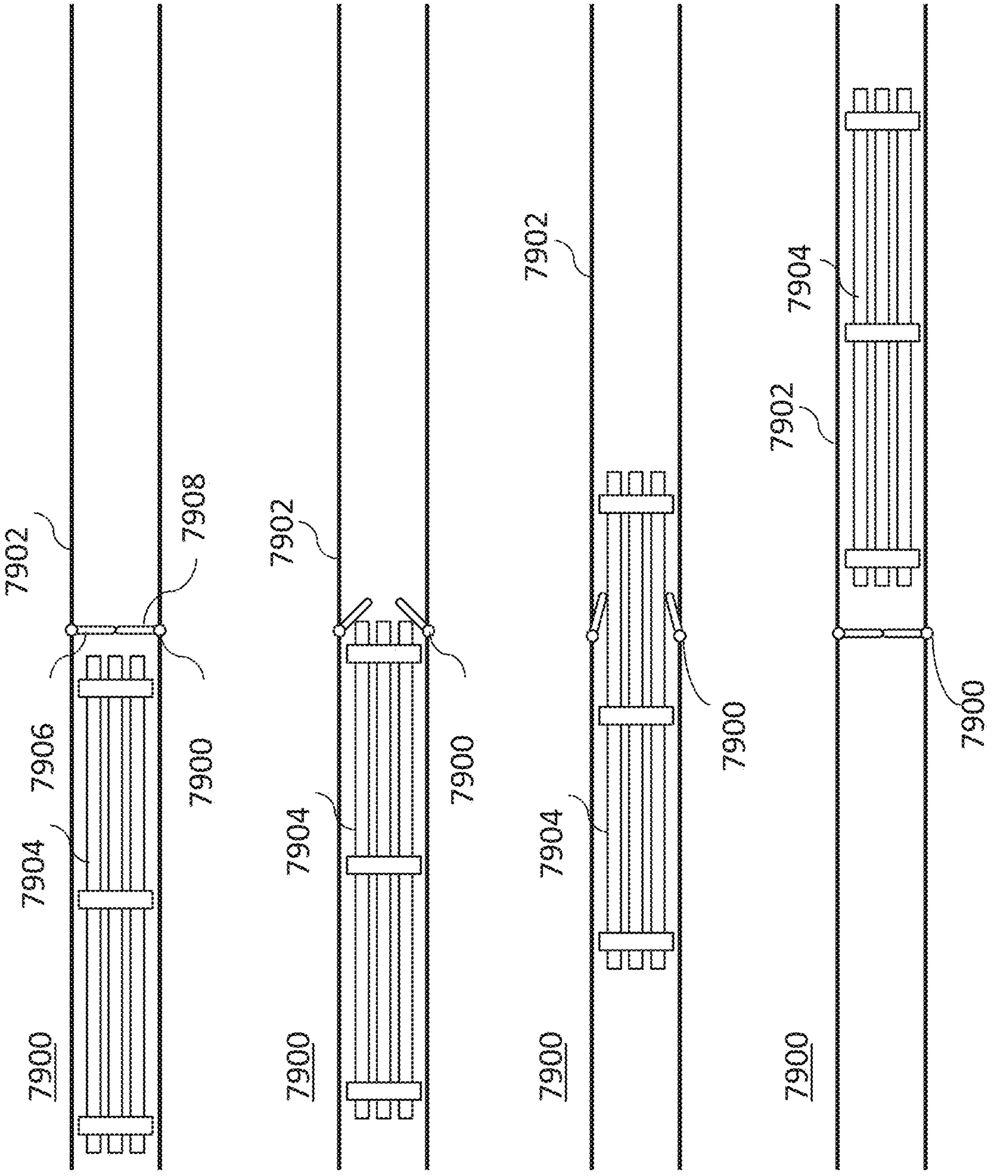

FIGS. 79A-79D are schematic cross-sectional views of portions of an illustrative gated FA transfer valve 7900 located within a transfer tube 7902 of a PNP according to embodiments of the present disclosure. The transfer valve 7900 allows an FA to pass in either direction but limits the amount of coolant that can pass through the transfer tube 7902 during passage of the FA 7904, thus mitigating free surface effect between any bodies of coolant that are in fluid communication through the tube 7902. The valve 7900 includes two or more hinged flaps 7906, 7908 that substantially or entire block passage of liquid through the tube 7902. The flaps 7906, 7908 are capable of rotation in either direction, enabling the valve 7900 to open. The opening thus created is closely similar in size and shape to the cross-sectional shape of the FA 7904. In embodiments, the flaps 7906, 7908 may be latched together by a mechanism that keeps the valve 7900 closed unless impinged upon, from either side of the valve 7900, by an FA 7904. When an FA 7904 does impinge upon the closed valve 7900, the latch is disengaged and the flaps 7906, 7908 are free to rotate when pushed by the FA 7904. A restorative mechanism (e.g., springs) may exerts a closing force on the flaps 7906, 7908 whenever they are displaced from their closed position. FIG. 79A depicts a state of operation before the FA 7904 has impinged on the valve 7900; FIG. 79B depicts a state of operation when the FA 7904, moved by a conveyor mechanism, has unlatched the flaps 7906, 7908 and forced them to partially open; FIG. 79C depicts a state of operation when the FA 7904 has forced the flaps 7906, 7908 fully open and is passing through the opening thus created; and FIG. 79D depicts a state of operation when the FA 7904 has passed entirely through the valve 7900 and the flaps 7906, 7908 have been restored to a closed and latched condition. Latching prevents coolant flow through the valve 7900 up to some design threshold of pressure difference across the valve 7900; the fitting of the valve 7900 around the FA 7904 limits passage of coolant with and around the FA 7904 during the passage of the FA 7904 through the valve 7900. In an example, one or more valves similar to valve 7900 are located in an FA transfer tube connecting a refueling cavity to a spent fuel pool (e.g., the transfer tubes depicted in FIG. 77 and FIG. 78A). In various embodiments, the valve 7900 is located at the beginning or end of a transfer tube, rather than in a midwise location, as in FIGS. 79A-79D; also, while the transfer tube 7902 of FIGS. 79A-79D is depicted as fitting the FA 7904 closely, in various embodiments the valve 7900 may fit the FA 7904 closely while the transfer tube 7902 does not. Also, the number of flaps in various embodiments may be one or any greater number. Also, the flaps need not be rigid, as implicitly depicted in FIGS. 79A-79D. Also, the flaps may be provided with a powered opening and/or closing mechanism, and may be activatable by a control system, not only by an impinging FA.

FIG. 80 is a schematic depiction of portions of an illustrative core refueling coolant system 8000 of a PNP according to embodiments of the present disclosure. In system 8000, the entire core refueling operation is carried out in a single or multiple closed volumes of coolant (e.g., volumes 8002, 8004, 8006) that are either filled to the top (e.g., function as tanks rather than as open-surface pools) or covered by roofs or coverings 8008, 8010, 8012 that are adjustable in height and that prevent large redistributions of coolant within or between the covered volumes 8002, 8004, 8006. In an example, a reactor cavity, refueling canal, and spent fuel pool are all sealed and full (or nearly full) of coolant. This configuration prevents any large redistribution of coolant mass in the platform while enabling continuous immersion in coolant of spent FAs.

FIG. 81 is a schematic depiction of portions of an illustrative coolant stabilizing system 8100 of a PNP according to embodiments of the present disclosure. The system 8100 includes baffles (e.g., baffle 8102) immersed in a coolant pool or tank 8104 to impede the movement of coolant throughout the volume. The baffles 8102 are perforated by openings (e.g., opening 8106) to allow coolant to move throughout the volume without resonating or building too much momentum, e.g., when the PNP is moved by wave action. Free surface effect in such a coolant body is mitigated. In various embodiments the baffles are spaced and/or perforated so as to provide openings specifically designed to allow FAs to be moved through the volume, whether vertically (space 8108) or endwise (opening 8110).

FIG. 82 is a schematic depiction of portions of an illustrative coolant stabilizing system 8200 of a PNP according to embodiments of the present disclosure. System 8200 includes a coolant pool 8202 and a membrane, fabric, or highly articulate metal surface restraint 8204 that contacts and envelops the free surface of the coolant contained within the pool 8202 in order to effectively enclose and/or dampen the surface dynamics of the coolant's free surface, e.g., waves induced by the impact of wave motion, winds, or other impacts on the PNP. The surface restraint 8204 may be retractable. In the illustrative system 8200 of FIG. 82, the surface restraint 8204 includes a pair of flexible metal shutters 8206, 8208 that can be retracted to enable a pipe 8210, fuel-handling machine, or other devices to access the interior of the pool 8202. Free surface effect in such a coolant body is mitigated.

FIG. 83 is a schematic depiction of portions of an illustrative coolant stabilizing system 8300 of a PNP according to embodiments of the present disclosure. System 8300 includes a coolant pool 8302 and flat horizontal surfaces or shelving 8304 approximately parallel to and overhanging the perimeter of the free surface of the coolant in the pool 8302. The shelving 8304 caps or interrupts waves reflecting off the vertical side walls of the pool 8302, e.g., waves induced by wave motion of the PNP. Free surface effect in such a coolant body is mitigated.

FIG. 84 is a schematic depiction of portions of an illustrative coolant stabilizing system 8400 of a PNP according to embodiments of the present disclosure. System 8400 includes a coolant pool 8402 whose walls have irregular, e.g., many-sided, shapes to prevent resonant sloshing with the PNP platform's period of tilt or heave. In FIG. 84 the irregular walls are depicted as vertical and planar, but in various embodiments the walls are non-planar. Free surface effect, particularly resonant wave motion, in such a coolant body is mitigated.

FIG. 85 is a schematic vertical cross-sectional depiction of portions of an illustrative coolant stabilizing system 8500 of a PNP according to embodiments of the present disclosure. System 8500 includes a tank (e.g., spent fuel pool or refueling makeup water reservoir) 8502 having a primary chamber 8504 and a smaller, secondary chamber 8506. The two chambers are partly divided by a barrier 8508, which includes a vertical lower portion 8510 and a tilted upper portion or weir 8512. Further, the two chambers 8504, 8506 are in fluid communication through a makeup pipe 8514. When waves are induced (e.g., by wave motion of the PNP) in the primary chamber 8504 that are of sufficient amplitude, water will ride up the weir 8512 and spill over into the secondary chamber 8506. Waves induced in the secondary chamber 8506 will tend to be confined thereto, since the smaller mass and dimensions of the water in the secondary chamber will constrain wave development; further, the overhanging weir 8512 will tend to confine waves within the secondary chamber 8506. By elementary hydrostatics, a quantity of water equal to any which crosses over into the secondary chamber 8506 will return via the makeup pipe 8514 to the primary chamber 8504, maintaining an approximately equal surface height in the two chambers. In effect, the tank 8502 constitutes a nonlinear system that constrains the development of larger waves. In various embodiments, the weir 8512 is mounted on a hinge 8516 that is adjustable in angle via a mechanism, or on a sprung hinge that tends to return the weir 8512 to a certain angle. Also, in various embodiments, the hinge spring angle and/or resistance are adjustable and/or the fixed divider 8510 can be raised or lowered in order to adjust the height of the weir 8512. Such adjustability enables the resonant properties of the tank 8502 to be altered, e.g., in response to changing ocean wave excitation spectra and directionality. In embodiments, adjustment may be provided by an electro-mechanical system, such as under control of a processor, which may occur automatically (such as according to a model, algorithm, or the like that provides automated adjustment in response to conditions, such as detected ocean wave conditions, predicted conditions, or the like) or under user control, such as via a user interface that allows a user to set the angle, resistance or other parameter of the system to optimize the properties of the tank 8502. Free surface effect in such a coolant body is mitigated.

FIGS. 86A-94 pertain to devices for moving spent FAs in a canister or enclosed volume by moving the enclosed volume within a PNP, as opposed to moving the FA within a continuous volume of coolant as is traditionally done for moving spent fuel assemblies in a terrestrial nuclear power plant. The fully enclosed volume, whether fully filled with coolant or not, ensures that spent FAs within are adequately cooled while the enclosure moves the FAs to a new location inside the ONBP.

FIG. 86A schematically depicts an illustrative fuel movement canister or enclosure 8600 with the ability to transport a single spent FA 8602 according to embodiments of the present disclosure. The enclosure 8600 is in various embodiments thermally self-sufficient, that is, radiates sufficient heat to its environment (through, e.g., fins, vanes, a portable heat exchanger, or the like) that no coolant flow through the enclosure is required for thermal stability. In the illustrative embodiments depicted in FIG. 86A, the enclosure 8600 is fed coolant through an intake pipe 8604. The coolant is removed via an outlet pipe 8606. The enclosure 8600 may be attached to the pipes 8604, 8606 only while stationary, and disconnected while in motion: or, the pipes 8604, 8606 may be connected to an umbilical or sliding-connection system that enables them to supply the enclosure with coolant flow throughout some allowed transport space. In the illustrative embodiments depicted in FIG. 86A, the pipes 8604, 8606 are connected to a flexible umbilical arrangement that enables the enclosure 8600 to translate along a conveyor mechanism 8608.

FIG. 86B schematically depicts an illustrative fuel movement enclosure 8610 with the ability to transport four spent FAs, e.g., FA 8612, according to embodiments of the present disclosure. Like the single-FA enclosure 8600 of FIG. 86A, the four-FA enclosure of FIG. 86B is supplied by a mobile cooling pipes 8604, 8606 and capable of translation along a conveyor mechanism 8608. One FA and four FAs are illustrative enclosure capacities only; FA enclosures in various embodiments have capacity for conveying a single FA or any greater number.

FIG. 87 is a schematic depiction of portions of an illustrative system 8700 for moving FAs in enclosed volumes according to embodiments of the present disclosure. The system 8700 loads one or more spent FAs (e.g., FA 8702) inside a mobile FA enclosure 8704 under water within a refueling cavity 8706. Movement of the FA 8702 within the refueling cavity 8706 and placement within the enclosure 8704 is accomplished by a refueling machine 8708. The system 8700 raises the FA enclosure 8704 above the coolant level of the refueling cavity 8706 (e.g., by the refueling machine 8708 or a hydraulic lift 8710). An FA extracted from the refueling cavity 8706 (e.g., FA 8712) is then transported horizontally (e.g., by a conveyor mechanism 8714) to another part of the PNP, e.g., to a vertical transport system such as will be discussed with reference to several figures herein.

FIG. 88 is a schematic depiction of portions of an illustrative system 8800 for moving FAs in enclosed volumes according to embodiments of the present disclosure. Rather than moving a mobile FA enclosure vertically out of a refueling cavity using a crane or lift, followed by horizontal movement on a conveyor mechanism, as shown in FIG. 87, the system 8800 performs both vertical and horizontal movements of FAs (e.g., FAs 8802, 8804) by an articulated arm or crane 8806.

FIG. 89 and FIG. 90 pertain to systems and methods having the ability to quickly return any spent FA that is in transit in a mobile enclosure (e.g., the mobile enclosure depicted in FIG. 88A) to a large pool or volume of coolant during any scenario in which the device moving the mobile enclosure loses power. This failsafe feature may be necessary if the enclosure requires active cooling systems to keep the enclosed spent FAs sufficiently cool. For quick-return systems to be effective, moreover, the FA fuel assembly enclosure must be able to passively expel heat at an adequate rate when immersed in coolant.

FIG. 89 schematically depicts portions of an illustrative quick-return PNP mechanism 8900, according to embodiments of the present disclosure, including an inclined track 8902 along which a mobile FA enclosure 8904 rolls back to the location of a pool 8906 of coolant if the conveyor mechanism moving the enclosure 8904 or the system cooling the enclosure loses power. Upon being braked to a standstill, for example, by an unpowered mechanism at the end of the track 8902, the enclosure 8904 is automatically (e.g., without human intervention or power) lowered by a hydraulic lift 8908 into the coolant pool 8906 for sustained passive cooling. The coolant pool 8906, in turn, has mechanisms (e.g., those described elsewhere herein) for passively rejecting heat to the outside environment indefinitely without the need for onsite or offsite power.

FIG. 90 schematically depicts portions of an illustrative quick-return PNP mechanism 9000, according to embodiments of the present disclosure, including an inclined rail 9002 along which a crane 9004 carrying a mobile FA enclosure 9006 slides back to a location above a pool 9008 of coolant if the mechanism moving the crane 9004 and enclosure 9006, or the system cooling the enclosure 9006, loses power. Upon being braked to a standstill by an unpowered mechanism when the crane 9004 reaches a point above the pool 9008, the enclosure 9006 is automatically (e.g., without human intervention or power) lowered by the crane 9004 into the coolant pool 9008 for sustained passive cooling. In examples, the lowering of the enclosure 9006 is braked in an automatic, non-powered manner so that the enclosure 9006 does not impact the floor of the coolant pool 9008.

FIG. 91 schematically depicts an illustrative system 9100 for providing sustained, adequate cooling to a mobile FA canister or enclosure 9102 according to embodiments of the present disclosure. System 9100 includes a coolant umbilical cord 9104 that enables a bidirectional flow of coolant between the enclosure 9102 and a heat exchanger 9106 immersed in the ocean 9108, outside the PNP hull 9110. The umbilical cord 9104 provides a flexible coolant loop that adjusts its shape as the enclosure moves about within the PNP (e.g., between the reactor vessel and the spent fuel pool). This coolant loop may be either actively pumped or powered by convection. For the loop to operate by convection, it is necessary that there be a height differential with respect to gravity for the inlets and outlets of both the heat exchanger 9106 and the umbilical connections to the enclosure 9102, as depicted in FIG. 91.

FIG. 92 schematically depicts an illustrative FA canister or enclosure 9200 according to embodiments of the present disclosure. Enclosure 9200 includes a hollow main cylinder 9202 containing a hot FA 9204 and a quantity of coolant 9206 sufficient to immerse the FA 9204. The enclosure 9200 also includes some number of hollow condensation tubes, e.g., tube 9208, whose upper ends are sealed and whose lower ends are in fluid communication with the interior of the main cylinder 9202. Moreover, a number of heat radiation fins 9210 are affixed to the condensation tubes. As the hot FA 9204 boils coolant 9206, steam is created above the liquid portion of the coolant 9206 and rises into the condensation tubes, as indicated by open arrows (e.g., arrow 9212). Steam condenses in the condensation tubes and runs back down into the interior of the main cylinder 9202, as indicated in FIG. 92 by droplets (e.g., droplet 9214). The whole FA enclosure 9200 thus acts as a heat pipe to transport heat away from the FA 9204 and deliver it to the ambient environment of the enclosure 9200.

FIG. 93 schematically depicts an illustrative FA canister or enclosure 9300 according to embodiments of the present disclosure. Enclosure 9300 includes a hollow main cylinder 9302 containing a hot FA 9304 and a quantity of coolant 9306 sufficient to immerse the FA 9204. The enclosure 9300 also includes a number of horizontally oriented, air-cooled heat radiation fins 9308 affixed along the length of the main cylinder 9302. The fins 9308 are cooled by passive circulation of air. The exterior of the FA enclosure 9300 thus acts as a radiator to transport heat away from the FA 9304 and deliver it to the ambient environment of the enclosure 9300. Many arrangements of fins or vanes other than that depicted in the figure would serve the purpose in various embodiments, as will be clear to a person familiar with radiator engineering; all such are contemplated and within the scope of the present disclosure.

FIG. 94 schematically depicts top and side views of an illustrative FA canister or enclosure 9400 according to embodiments of the present disclosure. Enclosure 9400 includes a hollow main cylinder 9402 containing a hot FA 9404 and a quantity of coolant 9406 sufficient to immerse the FA 9404. The enclosure 9400 also includes a number of vertically oriented, air-cooled heat radiation fins 9408 affixed along the length of the main cylinder 9402. The fins 9408 are cooled by passive circulation of air and/or by vertical airflow, such as driven by fans, e.g., electric fan 9410. Air flow along the fins 9408 is indicated by open arrows, e.g., arrow 9412. The exterior of the FA enclosure 9400 thus acts as a radiator to transport heat away from the FA 9404 and deliver it to the ambient environment of the enclosure 9400.

Staging of Fresh Fuel for a PNP

Fresh fuel FAs do not normally represent a direct hazard: they are only mildly radioactive and do not radiate significant heat. However, if immersed in a liquid (e.g., water) that acts as a neutron flux moderator, fresh FAs can participate in an accelerated nuclear chain reaction and become hot and radioactive (as they do in a reactor core). Therefore, it is desirable that fresh FAs do not become immersed in water that can act as a neutron moderator. Onboard a PNP that is itself immersed in water, may provide for a need for facilitating avoidance of fresh fuel FA immersion.

Embodiments of the present disclosure facilitate avoidance of fresh fuel FA immersion. In particular, FIG. 95 is a schematic depiction of a PNP 9500 including an illustrative FA storage system that avoids unintended fission in fresh FAs. The illustrative system includes a waterproof chamber 9502 in which a number of fresh FAs 9504 are stored. The chamber 9502 provides a first line of defense against entry by water from the environment of the PNP or from volumes of water stored or flowing aboard the PNP; however, it is possible that the chamber 9502 could be breached or that access hatches could be inadvertently opened. Therefore, a quantity 9506 of a dry "poisoning" agent (e.g., a block of an appropriate salt, such as a dry boron salt) is built into the interior of the fresh FA storage chamber 9502. The poisoning agent, when dissolved in water, reduces the neutron-moderating efficacy of the water. Thus, if water does enter the chamber 9502, the dry poisoning agent will prevent significant fission from occurring in the fresh FAs 9504. Since it is possible that the chamber 9502 will, in an accident scenario, be repeatedly filled and emptied of water, removing the original dose of poisoning agent, in embodiments, a number of poisoning-agent units are installed in the chamber 9502. One of units (the primary unit) is open at all times and is operative the first time the chamber 9502 is invaded by water. The additional N units are in containers equipped with water exposure locks that open the container after a certain number of exposures to water followed by exposures to air. The first of the additional N units open after 1 such exposure cycle, the second after 2 such cycles, and so forth. Poisoning is thus assured for N+1 flooding cycles. Additionally or alternatively, a slow-release mechanism can continue to release poisoning agent into water within the chamber 9502 as long as the water is present, mitigating the probability that water circulating through the chamber 9502 will dilute the poisoning agent to inefficacy during an accident scenario.

W. Vertical Transport of Spent Fuel Assemblies in a PNP

Fuel assemblies in a PNP must proceed through a series of storage and movement stages. After manufacture, fresh fuel must be transported to the PNP and staged for refueling. In refueling, FAs are placed into a reactor core. After an operational time, FAs are removed from the reactor core, stored in a cooled pool, and ultimately transferred off the PNP to long-term dry storage or reprocessing facilities. In contrast to terrestrial plants, where vertical movements of FAs are few in number and modest in scope, FAs in a PNP will typically travel relatively large vertical distances both within the PNP and during transfer to and from vessels. FAs will, between horizontal and vertical movements within the PNP, reside in various platform structures in various numbers and for varying amounts of time, depending on the design and operation of the PNP. For example, spent FAs may be stored in pool racks, canisters, and casks progressively as they age.

Typically, spent FAs on a PNP will go through some combination of one or more of the following steps after removal from the reactor: storage in a temporary in-containment storage pool; loading into canisters or mobile FA enclosures in the storage pool after an initial decay interval; movement up a lift access structure, whether as single assemblies or as loaded canisters; arrival at a staging area near the top deck of the platform; and finally, transfer to a transport ship that brings the canisters to a dock form whence they will be taken to a facility for casking or reprocessing.

Advantageous arrangements that address needs for vertical movement of FAs in a PNP must ensure that lifting mechanism failure modes are acceptable. In embodiments, FAs, whether as individual assemblies or canisters, may be lifted by hoist, worm gear, elevator, hydraulic lift, crane, buoyancy, magnetic lift, or other mechanisms along a vertical access tube with appropriate measures taken to safely lock the moving load into place or limit falling velocity upon failure of power or any other aspect or component enabling the movement mechanism. Features included with embodiments include flooding the lift access with water and having appropriate water locks at each end to retain water in tube during transport. Approximate sizing of a fluid-filled column or tube to the objects transported there within will tend to slow falling objects hydraulically if a failure of lifting system occurs.

FIGS. 96-103 pertain to systems and methods for vertical movement of FAs within a PNP that are included with embodiments of the present disclosure.

FIG. 96 is a schematic depiction of portions of an illustrative fuel-handling system of a PNP 9600 according to embodiments. In embodiments, a fuel-exchange facility 9602 receives fresh FAs via a transfer mechanism from a surface delivery vessel. The receiving facility 9602 delivers fresh FAs 9604 to a fresh-fuel storage chamber 9606, which may include provisions for suppressing unwanted fission, e.g., as depicted in FIG. 95. A fresh-fuel vertical transfer tube 9608 transfers fresh FAs (e.g., by gravity) from the storage chamber 9606 to a fresh-fuel elevator 9610 within the containment 9612. The fresh-fuel elevator 9610 receives FAs and orients the FAs vertically before lowering them into the primary fuel-handling pool 9614 where they are loaded into the reactor 9616 by a fuel-handling machine. Spent FAs extracted from the reactor 9616 are delivered to an acute angle laydown/standup machine 9618 submerged within the containment, which can rotate FAs to any angle for passage through the spent fuel vertical transfer tube 9620. The coolant-filled spent fuel vertical transfer tube 9620 conveys each spent FA to the coolant-filled spent fuel storage module (a.k.a. spent fuel storage tank, a.k.a. spent fuel storage pool) 9622, where spent FAs 9624 are stored. A second acute angle laydown/standup machine 9626 handles FA orientation upon receipt within the storage pool 9622. A coolant-filled spent fuel vertical removal transfer tube 9628 moves spent FAs that have cooled sufficiently for removal from the PNP 9600 from the spent fuel pool 9622 to the fuel-exchange facility 9602. Various embodiments include alternative or additional arrangements for storing dry-casked FAs aboard the PNP 9600.

FIG. 97 is a simplified depiction of portions of an illustrative system 9700 for loading FAs (e.g., FA 9702) into a spent-fuel vertical transport tube 9704 in a PNP according to embodiments of the present disclosure. The system 9700 includes a temporary storage and cooling pool 9706 (only two walls of which are depicted, for clarity) in which reside a number of spent FAs. The pool 9706 is mostly or entirely filled with water and is equipped with systems for the rejection of heat to an external heat sink (e.g., the ocean). The pool 9706 may be located inside a reactor containment or between a containment and outer hull of the PNP. The system 9700 also includes a fuel-handling machine 9708 capable of movement along three orthogonal axes and a load-unload chamber 9710 at the base of the vertical transport tube 9704 (only a nether portion of which is depicted). The load-unload chamber 9710 includes an opening sized for the admission of an FA or of a canister containing an FA or more than one FA, as well a sliding shell door 9712 that can be rotated into place to cover the opening. Both the load-unload chamber 9710 and the transport tube 9704 are filled with coolant. A lock valve 9714 (depicted in FIG. 97 as a simple disk) is closed when the chamber door 9712 is open, separating the loading chamber 9710 from the upper portion of the transport tube 9704 to prevent the tube head from raising the water level in the pool 9706. In embodiments, a mechanical interlock prevents the lock valve 9714 and the chamber door 9712 from being open simultaneously. The nether end of the transport tube 9704, approximately coincident with the floor of the pool 9706, is closed.

The load-unload chamber 9710 contains a load carrier 9716, upon or within which the FA or FA canister is placed for transport. A suitable mechanism may install or remove a load carrier 9716 in the load-unload chamber 9710, as needed. In FIG. 97 the load carrier 9716 is depicted as a simple supportive disk; in various embodiments, the load carrier 9716 includes a frame, hander, net, rack, bucket, grip, pincer and/or capsule, fitting the load carrier 9710, into which an FA or FA canister is loaded. In various embodiments, a load carrier 9716 also typically includes arrangements for securing its load, communicating wirelessly with a control system (e.g., for telemetric reporting of load status, platform position, and other data), and mechanisms providing unpowered, automatic self-braking (e.g., by lateral shoes, wedges, or the like) in the event that free fall through the transport tube commences.

In a typical sequence of operations of system 9700, one or more FAs have been stored in the temporary pool 9706 until their radioactivity and heat output have declined to levels which the transport tube 9704 and other downstream FA-handling systems have been designed to accommodate. The fuel-handling machine 9708 picks up an FA 9702 and transports it through the coolant in the pool 9706 to the loading chamber 9710, where the FA 9702 is placed upon the load carrier 9716. The chamber door 9712 is then rotated and locked in a closed position and the lock valve 9714 is opened. The load carrier 9716 with its associated FA, together designated a "load," now has access to an open, water-filled path within the vertical access tube 9704 and is raised therethrough. One or more of worm gears, a cable hoist, water pressure, and other mechanisms are employed to raise the load through the vertical transport tube to a receiving system at a higher level in the PNP. In embodiments, the receiving system resembles the system 9700, except that it includes the upper rather than the nether end of the transport tube 9704 and the lock valve is below rather than above the load-unload chamber; in such case, unloading of a load by the receiving system is accomplished by essentially reversing the loading process described for system 9700. In other embodiments, the receiving system may consist simply of a fuel-handling machine capable of reaching down into the open upper end of the transfer tube, grasping a load, and lifting it out.

In various embodiments, the walls of the transport tube 9704 include provisions for cooling and/or shielding (e.g., a water sheath) and/or the tube 9704 is surrounded by a larger body of water. Also, in various embodiments, checkpoint lock valves similar to lock valve 9714 are located at intervals throughout the length of the vertical transport tube 9704, opening and closing in sequence to allow passage of load carriers while constraining coolant flow through the transport tube 9704. Various embodiments include provisions for provisioning the transport tube 9704 with coolant (e.g., by recirculating coolant from the top of the tube to the bottom). Coolant may pass around or through a moving load or be circulated from one end of the tube to the other to accommodate a moving load, or both. Moreover, although the transport tube 9704 is depicted in FIG. 97 as orthogonally vertical, a transport tube in various embodiments need not be so throughout its length but may turn through any angle. Turns may be enabled by allowing slack space between load carriers and in the walls of the tube 9704, either along the whole tube length or in selected turning zones; or by making load carriers suitably flexible; or by other mechanisms.

FIG. 98 is a schematic cross-sectional depiction of portions of an illustrative mechanism for moving an illustrative FA load 9800 through a coolant-filled vertical transfer tube. An FA 9802 is capped by two end pieces, an upper end piece 9804 and a nether end piece 9806. Both end pieces 9804, 9806 serve as spacers to position the FA 9802 within the vertical transfer tube 9808. Two coolant-filled side tubes 9810, 9812 are positioned lengthwise along the transfer tube 9808 and connected thereto so that the lumens of the three tubes communicate. The nether end piece 9806 includes teeth or projections (e.g., projection 9814). Each projection extends horizontally from the end piece 9806 into the lumen of a side tube: e.g., projection 9814 extends into the lumen of side tube 9812. Each side tube contains a worm gear (e.g., worm gear 9816). The end piece projections mesh with the worm gears: e.g., projection 9814 meshes with worm gear 9816. As the worm gears in the side tubes are rotated, the projections are translated along the gear and the load including the FA 9802 and end pieces 9804, 9806 is lifted or lowered through the vertical transfer tube 9808. In embodiments, components are sized and so that either worm gear alone is capable of safely lowering or raising the load.

FIG. 99 is a schematic cross-sectional depiction of portions of an illustrative mechanism for moving an illustrative FA load 9900 through a vertical transfer tube. An FA 9902 is capped by or affixed to two end pieces, an upper end piece 9904 and a nether end piece 9906. Both end pieces 9904, 9906 serve as spacers to position the FA 9902 within the vertical transfer tube 9908. Each end piece also includes one or more cable connection points (e.g., cable connection point 9910) which is attached to a cable (e.g., cable 9912). As the cables are drawn up or down with respect to the tube 9908, the load 9900 is correspondingly raised or lowered. In case of cable failure, fluid-driven safety flaps 9914 deploy to assure braking of the load and prevent free fall. The safety flaps may either engage with the inner walls of the transfer tube 9908 to halt FA motion or may serve as hydraulic resistance breaks to assure a slow fall.

FIG. 100 is a schematic cross-sectional depiction of portions of an illustrative mechanism for permitting an illustrative FA load 10000 to descend through a vertical transfer tube. An FA 10002 is capped by or affixed to two end pieces, an upper end piece 10004 and a nether end piece 10006. Both end pieces 10004, 10006 serve as spacers to position the FA 10002 within the vertical transfer tube 10008. Each end piece is sized and perforated to allow coolant to pass from one side of the end piece to the other in a resistive manner. The hydraulic resistance of the end pieces is gauged to permit the load 10000 to descend through the vertical transfer tube 10008 at a desired pace.

X. Improved Refueling Machine and Methods for a PNP

The proper operation of a PNP refueling machine inside the containment and of a spent fuel handling machine in the spent fuel storage area can be adversely impacted by any tilting of the PNP platform, such as caused by wave action, wind action, or other causes. Since these refueling machines typically use a telescoping mast or column to reach the tops of FAs that are ~25 feet below a water surface, tilt will result in lateral forces being applied to the extended mast. These forces can cause the mast to deflect or bend, especially when lifting or lowering an FA or other heavy item. Another problem is that the FA will hang vertically from the end of the mast, making it even more difficult to properly align the bottom of the FA correctly for insertion into a core matrix and to keep the FA properly aligned while it is actually being inserted into or withdrawn from the core matrix, without excessive contact and rubbing or scraping of the neighboring fuel assemblies. Moreover, wave action may introduce pendulum-like oscillations in a long mast suspending an FA.

Various embodiments of the present disclosure include improved in-containment refueling machines and the spent fuel handling machines and improved controls for such machines to prevent excessive horizontal forces from being applied to their telescoping masts, to allow these machines to accurately connect and disconnect from FAs, to keep the connected FA aligned with the core's vertical axis while an FA is being withdrawn from or inserted into the core, and to enable proper alignment during other fuel handling operations.

FIG. 101 is a schematic depiction of portions of an illustrative PNP fuel-handling machine 10100 according to embodiments of the present disclosure. Herein, the terms “fuel-handling machine” and “refueling machine” are used interchangeably to signify any machine capable of grasping, lifting, and moving an FA. The machine 10100 includes a telescoping fuel-handling mast 10102 having a gripping head 10104 that is capable of retrieving an FA (e.g., FA 10106) that is located, for example, in a reactor pressure vessel 10108. To prevent significant horizontal forces caused by any listing of the PNP being applied to the mast, the mast is connected at its top end with a socket-and-ball type attachment 10110 so that the mast 10102 can rotate freely at its attachment point and will always stay aligned in a true vertical alignment due to gravity. In the state of operation depicted in FIG. 101, the PNP lists at an angle phi; thus, the mast 10102, aligned with gravity, hangs at an angle with respect to the vertical axis 10112 of the PNP and its major components, including the reactor pressure vessel 10108. The fuel handling machine hoist 10114 can be translated along a bridge 10116 that can in turn be translated orthogonally to its own length along runways, in the manner typical of overhead cranes.

To enable the fuel handling machine 10100 to properly position itself such that the bottom end of the extended mast 10102 properly engages with the top end of the FA 10106 in preparation for lifting, or so that the bottom end of an FA is properly positioned directly above the empty location in a core matrix or storage rack in preparation for assembly re-insertion, the fuel-handling machine positioning control is modified to account for the platform or ship tilt. In an example, if the PNP platform is tilted one degree to the left in the plane of the bridge 10116, the extended mast 10102 (~41 feet long) will, if the attachment point of the mast 10102 is aligned with the FA 10106 parallel to the vertical axis of the PNP, hang ~8.6 inches to the left of its intended position (the head of the FA 10106). Therefore, the machine positioning control, based on measured tilt, adjusts the hoist position by L=8.6 inches to the right so that the gripping head 10104 of the vertically hanging mast 10102 is properly positioned. This requires that system 10100 include tilt-measuring instrumentation. In various embodiments, the machine positioning control actively measures tilt of the PNP and repositions the hoist 10114 as the tilt of the PNP changes, such that the mast or the lower end of the FA is kept in position even as the platform/ship tilts from side to side and/or end to end, such as due to wave motion. Using a control algorithm such as a reflecting application of control theory, movements of the bridge 10116 and hoist 10114 can be controlled, such as by taking inputs that indicate the dynamic behavior of the platform (such as rocking in response to periodic wave motion), and the system can compensate for not only static list of the PNP but for dynamic movement (e.g., rocking) of the PNP. Additionally or alternatively, to bridge and hoist movements, devices included with the hoist 10114 can apply torques to the ball joint 10110 to enable compensation for static or dynamic list, such as induced by wave motion.

In embodiments, to assure that FAs in a tilted or rocking PNP are lifted from or lowered (e.g., into a core, fuel transfer carriage, spent-fuel storage racks, or spent-fuel shipping casks) without excessive rubbing or scraping against nearby components, the tilt measuring and positioning compensation control may be interlocked such that fuel insertion (e.g., the final 14 feet into the core matrix or storage rack) and the removal (e.g., first 14 feet from the core matrix or storage rack) is permitted while the platform/ship tilt is near zero degrees. Thus, a fuel insertion control system may be provided that is based on measurement of static and/or dynamic tilt of a PNP in which the fuel insertion control system operates.

In embodiments, the fuel handling machine positioning control may be interlocked with a separate and independent local tilt measuring device, such that a global tilt measurement device (such as for the PNP as a whole) and the local tilt measuring device (or multiple such devices) are required to "agree" on a level of tilt, such as before the machine can lift or lower FAs under control of a fuel handling control system. In embodiments, this second, local measuring device may be mounted directly on fuel handling machine or on other structures of or on the PNP. One way to provide this local tilt measurement is to provide a measurement of the position of the free hanging machine mast at the base deck elevation that senses the mast position compared to its zero degree tilt position. The length of the mast (distance from the top of the mast to the machine deck just above the water level) amplifies the horizontal displacement caused by tilt; for example, a one degree tilt causes a sin(1°)×14 ft×12 in/ft=2.9 inch displacement.

FIG. 102 is a schematic cross-sectional depiction of portions of an illustrative PNP fuel-handling machine 10200 according to embodiments of the present disclosure. The machine 10200 includes a telescoping fuel-handling mast 10202 having a gripping head 10204 and suspended from a hoist 10206 that is translatable along a bridge 10208 that can in turn be translated orthogonally to its own length along runways. Machine 10200 also includes a telescoping mast support 10210 that moves with the mast and is strong enough to provide the rigidity needed to support the lateral forces created by gravity acting on the mast 10202, the mast support 10210, and an FA depending from the gripping head 10204. The mast support 10210 includes collars or similar structures (e.g., collar 10212) that confer lateral support upon segments of the telescoping mast 10202 without preventing the axial telescoping motions thereof. The machine 10200 is rigid enough to remain aligned with the vertical axis of the PNP of its major components regardless of PNP tilt within some design range. In various embodiments, an extension of the support 10210 beyond the gripper head 10204 extends support to an FA lifted by the machine 10200, creating an adequately rigid mast-and-FA unit for FA movement.

FIG. 103 provides top and side schematic cross-sectional views of portions of an illustrative PNP fuel-handling alignment guide 10300 according to embodiments of the present disclosure. The fuel-handling guide 10300 includes a grid of beveled openings, e.g., opening 10302, and is positioned near the top of a volume (e.g., reactor pressure vessel 10304) containing FAs (e.g., FA 10306). The gripper head 10308 and shaft 10310 of a fuel-handling machine, having passed through an opening 10302 of the guide 10300, is constrained in its lateral movements by the guide and is thus assisted in aligning with a given FA and prevented from damaging adjacent components by unexpected movements of the PNP, within a certain design amplitude range. In various embodiments, guide fingers may be included with the mast or by a mast support structure extend beyond the gripper head 10308 and pre-engaged with openings in the guide 10300 before mast insertion through the guide, increasing stability and accuracy of engagement.

The grid openings of the fuel-handling guide 10300 are depicted in FIG. 103 as square but in various embodiments are circular or otherwise shaped. A guide having only four openings is depicted, but guides having any number of openings are contemplated. A single-level guide is depicted, but guides having multiple levels (e.g., stacked guides to enforce alignment along the stacking axis) are contemplated.

In embodiments, a NuScale power module or other reactor modules can be integrated into a marine power plant could by utilizing a marine structure similar to the Goliat FPSO. In examples, the insertion of the reactor module, the assembly, as well as the reactor refueling and maintenance operations can be similar to terrestrial protocols. Specific to the NuScale reactor operations, the reactors power modules are deployed below the water-plane area within the marine structure, allowing the use of an unlimited heat sink. Specifically, the lower part of a cylindrical FPSO may enclose a waterpool similar in fashion as the NuScale terrestrial power plant or others may require it. In examples, individual NuScale reactor modules can be delivered either as a whole or as individual parts and integrated into the structure after deployment. By way of these examples, a platform internal 'upender' machine can assemble and vertically align the reactor. The structure further allows the integration of NuScale's refueling equipment as well as a spent fuel pool.

In embodiments, a NuScale Power Module or other reactor modules can be integrated into a marine power plant. The insertion of the reactor module, the assembly, as well as the reactor refueling and maintenance operations can be equivalent to terrestrial protocols. Specific to the NuScale reactor operations, the reactors power modules are deployed below the water-plane area within the marine structure, allowing the use of an unlimited heat sink. In embodiments, operation of two NuScale reactor modules, in some examples, can include flanging areas to perform refueling operations. A polar crane or any other lifting/hoisting device may be utilized to lift reactor into the reactor bay (for normal operation/power generation) and out for refueling and maintenance purposes. Spent fuel may be temporarily stored within the structure in an industry common spent fuel pool. Generally, the structure can house a single or multiple power modules (up to twelve) and is a turn-key-power plant, meaning that all components which are (in a terrestrial setting) located in separate buildings, are integrated (vertically in this case) into one single structure. The geometry of the structure may not be limited to be cylindrical in nature. Elongated barge systems, similar to the Russian Akademik Lomonosov, may also be suitable for integration and operation of NuScale's power modules.

In embodiments, a structure supported by piles can incorporate the NuScale power modules or other reactor modules can be located lateral to the platform. In some examples, lateral to the platform includes protruding generally orthogonally from underneath the boat to a lower depth and in some examples like a keel arrangement. By way of these examples, the reactor power modules can be enclosed in a hardened steel structure and submerged below water plane area during normal operation. Decay heat removal systems (such as NuScale's terrestrial concepts) allow heat rejection into the unlimited heat sink, the surrounding body of water. As illustrated, there is no refueling equipment on-board the vessel, requiring a service vessel, a specifically dedicated marine vessel to meet structure at deployment site to perform refueling operations. In embodiments, a marine vessel can ben specifically dedicated to refuel NuScale power modules or other applicable modules with dedicated or shared fleet infrastructure. By way of these examples, the refueling vessel can have all refueling equipment and maintenance systems required to perform the safe refueling of the integral pressurized water reactor onboard the vessel, such as the NuScale power module. As such, the internal layout is equivalent to NuScale's terrestrial refueling layout and the refueling protocols are consistent with terrestrial operations. The refueling vessel would dock at a structure which does not have refueling capability on-board. After reactors are safely shut down, the nuclear reactor power module is transferred from the platform to the refueling vessel and docked underneath. This procedure has the potential to avoid any complicated lifting processes.

IV. Heat-Piped Microreactor

FIG. 104A shows schematically a marine bulk carrier vessel 10400 including a heat-pipe-cooled microreactor (HPM) power system 10402. The HPM power system 10402 includes a heat pipe cooled reactor 10404, e.g., an eVinci™ micro reactor from Westinghouse Electric Company LLC, and a power conversion system 10406 (e.g., a Brayton cycle). The heat pipe cooled reactor 10404 may utilize non-military enriched uranium, such as HALEU and the like. Thermal energy from the HPM 10404 is converted by the power conversion system 10406 into mechanical energy to propel the vessel 10400 with a propeller 10410. Various embodiments of the present disclosure integrate any of the state-of-the-art power-conversion systems used in marine vessels or installations, including but not limited to connecting the output shaft of a turbine to a gearbox 10408 to reduce rotation speed of the shaft connected to the vessel's propeller 10410. Another form of drive system may include turbines that turn an electrical generator, whose electric output is used to drive one or more electric motors that in turn drive the propeller 10410. The illustrative bulk carrier vessel 10400 includes several compartments (e.g., compartment 10412) which contain bulk material 10414. The illustrative vessel power system 10406 includes a single HPM 10404 and a single power conversion system 10406, but power systems including more than one HPM and/or more than one power conversion system, and/or ancillary or backup power generators such as diesel generators, are contemplated and within the scope of the present disclosure.

FIG. 104B depicts schematically a bulk carrier vessel 10416 similar to the vessel 10400 depicted in FIG. 104A and including an HPM power system 10402 according to illustrative embodiments. Electric and/or thermal power (e.g., process heat up to 10900° C.) generated by the HPM power system 10402 in excess of that needed to propel the ship and power its various systems is, in this illustrative embodiment, used en route to process materials in an on-board processing facility 10418. Although energy available at onshore processing facilities may be cheaper per kWh than that provided at sea by an HPM system 10402 (or, in another example, by a HPM system dedicated to the processing facility 10418), en route processing eliminates the delay in material delivery flow entailed by onshore processing; this is advantageous whenever the additional energy cost of en route processing is offset by more rapid material flow. In this example, raw material 10420 from a first compartment 10422 is drawn into the processing facility 10416, processed, and delivered in a processed form 10426 to a second compartment 10424. In similar illustrative embodiments, a movable divider may be employed between the compartment 10422 containing raw material 10420 and the compartment containing processed material 10426, this divider being moved to increase as required the size of the compartment 10424 receiving processed material 10426 and decrease that of the compartment 10422 providing raw material 10420, so that no significant portion of the ship's volume need be empty at any point in processing. Possible en route material transformation processes include the pelletizing copper or iron ore into a form suitable for smelting. In various other embodiments, processing may include manufacture of device components, chemical transformations, and any other transformative processes capable of being performed economically en route.

FIG. 105 depicts schematically a container ship 10500 including an HPM power system 10402 according to illustrative embodiments. The ship 10500 carries a large number of containers, e.g., container 10502.

FIG. 106 schematically illustrates a Floating Production Storage and Offloading (FPSO) vessel 10600 including an HPM power system 10402 according to illustrative embodiments. Power from the HPM power system 10402 may be used for vessel propulsion and other systems and/or for hydro-carbon extraction, on-site processing, and handling. The FPSO vessel 10600 is associated with a tanker-offloading buoy 10602. Anchoring lines are for the vessel 10600 and buoy 10602. Fluid outputs from subsea wells (e.g., mixtures of oil, water, and natural gas) that produced by subsea wells are transported to the FPSO via subsea pipeline, flexible risers, etc. 10604 (depicted as thick black lines in FIG. 106). After extraction of fuels to be retained by the FPSO, well outputs can be redirected to the original reservoir via injection lines 10606, which serves to both dispose of these wastes and maintain reservoir pressure for fuel recovery.

FIG. 107 depicts schematically a semi-submersible drilling rig 10700 including two HPM power systems 10702, 10704 according to illustrative embodiments.

FIG. 108 depicts schematically a power barge 10800 including six HPM power systems 10802, 10804, 10806, 10808, 10810, 10812 according to illustrative embodiments. The barge 10800 may be moored, grounded, mounted on pilings, or otherwise stationed or maintained at given location, out to sea or ear a shore, where a relatively large amount of power is required, e.g., for a settlement or mining operation. In embodiments, the barge 10800 includes an electrical system for combining the electrical power outputs of the HPM systems, and the bulk electrical power thus produced can be transferred to a load or consumer via power lines running from the barge 10800 to the load or consumer. Given the modularity of the HPM power systems, a given power barge similar to barge 10800 may be equipped with a greater or lesser number of HPM power systems, depending on the power requirements of the served location.

It will be appreciated in light of the disclosure that various embodiments of the present disclosure include vessels of all types and classes, including submersibles, that are at or above the minimum size capable of housing a single HPM power system. Such shipping classes include not only the illustrative bulk and container vessels and FPSOs depicted in FIGS. 1, 2, and 3, but heavy-lift and construction vessels, liquid natural gas tankers and other tankers transporting hydrocarbon fuels or other fluids, and other classes. Also included are various classes of deep-sea, near-shore, and submerged platform installations, including but not limited to FPSOs, sea-floor mining and processing facilities, near-shore and/or offshore deployed warehouses and distribution centers, and near-shore and/or offshore deployed supercomputing centers and server farms.

Various advantages accrue from various embodiments and applications of the disclosure. These include, but are not limited to, the following:

Mobility. For stationary marine installations such as drill rigs, the small size of HPMs allows them to be delivered to the site and swapped in for aging units.

Simplicity. Because an HPM is essentially a sealed unit requiring no management of internal mechanics, reaction rate, or the like, minimal personnel with technical qualifications lower than those required for, say, the operation of light water reactors, such as a pressurized water reactor (PWR) or a boiling water reactor (BWR) are required. This provides cost savings compared to other forms of marine nuclear power.

Reliability. Because an HPM is simple, its reliability is high. The overall reliability of an HPM power system will be primarily constrained by its power-conversion system; however, a range of highly mature, reliable technologies are available for power conversion.

Refueling for Vessels. The refueling interval for a typical HPM may be anywhere from 1 to 10 years, and may be dependent, at least in part on the type of fuel used, the enrichment level and the like. In some instances, the refueling interval can be dependent on the type of fuel used and its enrichment level. A fleet of HPM-powered mobile vessels need not refuel at scattered facilities, therefore, as it travels about the world, but can be serviced at a central location. In embodiments, aging HPMs are swapped out for fresh, ready-to-go units, minimizing vessel layover time.

Refueling for Installations. Refueling will also be at long intervals for stationary installations, such as fixed location platforms and the like. While not an exhaustive list of refueling approaches, the following list of four flexible, optional approaches for refueling an HPM-powered barge and or a marine deployed offshore nuclear power plant provide guidance to possible refueling approaches:

(1) On-site refueling with on-board refueling equipment. Requires designing a site to include refueling, lifting and handling equipment and facilities proximal to or within the installation site;

(2) On-site refueling with refueling equipment transported to site. Fueling performed at installation site with e.g., a dedicated refueling vessel. Allows multiple installations to individually be serviced with single refueling vessel;

(3) Transport of swapped-out reactor modules (with a dedicated reactor transport vessel) to a refueling facility such as on-shore facility for refueling, a dedicated offshore refueling facility. Swap-out allows little downtime, if any at the deployment site while supporting, without limitation use of a single, central facility to service multiple deployment sites. In embodiments, a dedicated reactor transport vessel may also be configured to refuel swapped out reactors, such as during transport to a next site where, optionally the refueled reactor could be swapped out with a reactor in need of refueling at the next stop; and (4) Transport of entire reactor plant (e.g., power barge of FIG. 108) to and from a dedicated refueling and maintenance facility, such as an on-shore or shoreline-based facility. This option supports deployments that are not modular in nature and therefore avoids the need to separate reactor modules from structures at site.

FIG. 109 schematically depicts a system 10900 for converting thermal power output of an HPM into electrical and mechanical power according to illustrative embodiments. In this illustrative embodiment, the system 10900 includes a recompression closed Brayton cycle (RCBC) that uses supercritical carbon dioxide (s-$CO_2$) as its working heat-transfer fluid, rather than steam. s-$CO_2$ systems can be built compactly, making them suitable for marine applications, where space is always at a premium compared to onshore applications. Furthermore, an s-$CO_2$ system has significantly higher conversion efficiency than a standard steam Rankine cycle of comparable size. In general, increased cycle efficiency delivers greater mechanical power output for the same thermal input, regardless of the thermal source (e.g., natural gas, nuclear, solar, or coal); where fuel costs are a significant portion of overall costs (e.g., coal and natural gas fired plants), the benefit is reduced fuel costs. Where capital investments are high (e.g., nuclear and concentrating solar power), the benefit is increased power output for a given initial investment. In marine applications, an RCBC offers both higher mechanical power output for a given HPM thermal output and smaller total system size than rival power-conversion approaches.

The illustrative HPM power system 10900 includes an HPM 10902, a heat exchanger 10904, a secondary coolant loop 10906 (solid line), a tertiary coolant loop 10908 (dot-dash line), a high-temperature (HT) turbine 10910, a gearbox 10912, an electric generator 10914. The output of the generator 10914 supplies the general electric power needs of a vessel or installation as well as those of an electrical propulsion system 10916. The system 10900 also includes an HT recuperator 10918, a cooler 10920, an electric motor 10922, and a compressor 10924 for the secondary loop 10908 powered by the motor 10922.

V. Remote Enterprise Applications

FIG. 110A shows schematically, in both side and top views, portions of a marine microreactor platform 11002 according to illustrative embodiments. The barge or platform 11002, as in various other embodiments, may be dry-and/or wet-towed and/or self-propelled and includes a utility superstructure 11004 and two major interior decks 11006, 11008. It will be appreciated in light of the disclosure that two decks are illustrative only, and that various embodiments include any number of interior decks equal to or greater than one. The superstructure 11004 may or may not include crew housing, auxiliary power (e.g., diesel generators), communications and navigation gear, and the like. In general, platform 11002 includes all equipment required for safe traversal of open seas, and has a relatively shallow draft which enables it to be maneuvered and/or stationed in a range of relatively shallow coastal, river, and lake waters.

FIG. 110B shows schematically, in top views, the two decks 11006, 11008 of the platform 11002 of FIG. 110A. Both decks 11006, 11008 are divided into a number of compartments by bulkheads (e.g., bulkhead 11010). Four of the compartments on the upper deck 11006 contain (or could contain) four microreactors apiece (e.g., microreactor 11012), a total of 16 microreactors. Each microreactor can produce, in this example, enough heat for 2 MW of electricity generation (although greater amounts are possible), for a total output of at least 32 MWe for the platform 11002 as a whole. In an example, each microreactor can be a heat-pipe-cooled eVinci™ microreactor from Westinghouse Electric Company LLC and each powerhouse (power conversion system) includes, e.g., a Brayton cycle. In embodiments, all microreactors included with a given platform in various embodiments are of similar or identical type; however, mixing of reactor designs is feasible. Moreover, the placement in FIG. 110B of reactors on the deck above the power-house deck is illustrative only. Also, microreactors and powerhouses need not in all cases be housed on separate decks or segregated to reactor-only and powerhouse only decks. Additionally, microreactors may utilize a range of nuclear fuel including, without limitation both military-enriched and non-military enriched uranium, such as civil reactor fuel comparable to HALEU and the like.

The four compartments of the lower deck 11008 that are directly beneath the reactor compartments of the upper deck 11006 contain discrete powerhouses (e.g., powerhouse 11014), each of which may be in fluid communication with the microreactor above it in order to receive heat from the microreactor and to return cooler fluid (e.g., steam) to the microreactor in a closed loop. Each powerhouse contains machinery (e.g., a turbo-generator) for converting thermal to electrical power, as well as switch gear, transformers, and other devices needed for the production of useful alternating-current power having a standard frequency and amplitude. Additional switchgear is included with the platform 11002 in order to synchronize, combine, and regulate the outputs of the 16 powerhouses into a single power output of the platform 11002. The top deck of the platform 11002 is hardened (e.g., by reinforced concrete) to meet standards for protection of the microreactors from aircraft impact and similar hazards.

There is no requirement that all compartments or areas capable of holding microreactors and/or powerhouses, whether in the illustrative case of FIG. 110B or in various other embodiments, actually hold a microreactor and/or powerhouse at any given time. The carrying capacity of platform 11002, or of any other platform capable of accommodating one or more microreactor systems, merely places an upper limit on the number of microreactor systems actually installed. As microreactor systems may be configured variously, while it is possible to incorporate a 2 MWe capable reactor and power conversion within a standard twenty-foot equivalent unit (TEU) container, doing so may be based on a range of factors related to the reactor design and the like. Therefore, there is no requirement for the methods and systems herein that a reactor plus power conversion be limited in size and/or be containerized into a single TEU.

Microreactors are designed to require no active cooling in order to maintain a safe core temperature: they are physically incapable of melting down, even if entirely neglected. However, when turned On, microreactors do produce heat energy, the majority of which, for basic thermodynamic reasons, cannot be turned into electricity. Therefore, in a microreactor platform it will be desirable to ultimately export non-converted heat to the environment in order to maintain an interior platform temperature that does not ordinarily exceed human comfort limits and in no circumstance challenges the safe operation of the platform. Persons familiar with heat transport in power systems will know that it is straightforward to reject heat from a power-generating system to the environment (e.g., through a heat exchanger) using a variety of mechanisms, including passive (non-pump-driven) mechanism. Marine siting of a microreactor platform is advantageous in that heat rejection to a body of water is particularly efficient thanks to the high heat capacity and thermal conductivity of water compared to those of air and to the reliably low or moderate temperatures of most large bodies of water. It will be appreciated in light of the disclosure that the thermal management mechanisms for a mobile microreactor platform can be readily incorporated in various forms.

When the platform 11002 is traveling, its microreactors and powerhouses are inactive and the platform 11002 does not deliver power to any external system. When the platform 11002 has reached its place of deployment, it is anchored in position or ballasted to rest upon a shallow bottom and its power output is conveyed to a power-consuming system (e.g., nearby vessel, drill rig, onshore community, onshore mining operation, natural resources processing facilities) by at least one transmission line. The at least one transmission line is laid on the floor of the body of water in which the platform 11002 floats, or is supported on the surface of the water by a series of buoys, or is slung or bridged directly from the platform 11002 to a nearby quay or breakwater and there connected to further mechanisms of power transmission, conversion, and distribution (e.g., a local grid). In various embodiments similar to this illustrative embodiment, between 1 and 16 power transmission lines connect the powerhouses of the platform 11002 to the electrical system of a power consumer.

Refueling of deployed microreactor platforms (or replacement of platforms in need of refueling) can occur according to a number of schemes, including but not limited to the following:

(1) The platform is fully outfitted, including fueled microreactors, and is transported to its deployment site as a turnkey unit. Once one or more of the reactors of the platform need to be refueled, one can (a) transport the entire platform back to a centralized refueling/service facility, (b) extract the reactors from the platform, replace them with freshly fueled reactors, and transport the reactors in need of refueling to a centralized or regional site for refueling or decommissioning, (c) refuel the reactors aboard the platform in situ, or (d) refuel the reactors aboard a special refueling platform which travels to the deployment site and performs refueling in situ.

(2) The delivered platform is fully outfitted except that there are no reactors aboard. The platform is transported to its service site, whereupon fully fueled reactors are delivered by land, sea, or air and installed therein. When refueling is required, possible methods are as described above at (1).

(3) The delivered platform is fully outfitted except that there are no reactors aboard. The platform is transported to its service site, whereupon unfueled reactors are delivered and installed therein. Fueling (and, later, refueling) is both performed in situ, either aboard the platform itself or aboard a special refueling platform that travels to the site.

In an illustrative deployment cycle at (1), the platform 11002 is first prepared at a central or regional service facility, such preparation including the fueling of its microreactors. The platform 11002 is then moved to the vicinity of a remote enterprise. The form of movement is dependent on the construction of the platform 11002, such as self-propelled, or externally propelled and the like. There it is anchored and power connections are made to the enterprise's electrical system. The microreactors and powerhouses are activated and power is supplied to the remote enterprise for a period of time. When the microreactors' fuel loads approach the end of their lifespan, individual microreactors are removed one by one through the upper deck of the platform 11002 and replaced by freshly fueled microreactors delivered by ship. The ship delivers the old microreactors to a distant facility for refueling or decommissioning (refueling method (b) at (1) above). Fresh microreactors can be delivered either singly or more than one at a time, depending on the capacity and other characteristics of the delivery ship (e.g., its draft compared to the depth of the water where the platform 11002 is stationed). If only one microreactor at a time is disconnected for replacement, the power output of the platform 11002 is reduced by only ~1/16 (6.25%) during the replacement process, a distinctive advantage of some embodiments that arises from using a multiplicity of modular microreactors. Similarly, individual microreactors needing repairs that cannot be performed on-site can be replaced at any time without gravely reducing the power output of the platform 11002. (2) An entire fresh microreactor platform can be delivered to the site to supply power, and the old one towed or driven to a refurbishment facility.

FIG. 110C schematically depicts portions of a deployment scenario for the platform 11002 according to an illustrative embodiment. The platform 11002 is anchored off the coast of a landmass 11016 whereon is located a remote enterprise 11018 (e.g., a natural resources extraction and/or processing facility). The body of water in which the platform 11002 floats can be a sea, navigable river, or lake; the platform 11002 can be anchored in open water or ensconced for protection in a natural embayment, modified embayment, artificial bay, breakwater, or the like. The enterprise 11018 is "remote" in the sense that the cost of an overland or undersea grid-connected power line is prohibitive, mandating local power generation. Power is conveyed from the platform 11002 to an onshore connection facility or electrical house 11020 by a first power cable or cable bundle 11022 and thence to the enterprise 11018 by a second cable or bundle 11024.

When the platform 11002 is no longer needed by the remote enterprise 11018 (e.g., the mine is played out), the platform 11002 can be disconnected and moved to another service location or to a service facility for refurbishing or decommissioning. In various embodiments, removal of nuclear components can occur either by removal of the entire platform containing them or via separate transport. The only on-site infrastructure associated with the platform 11002 that requires removal and cleanup are the power cable(s) 11022, 11024 and the connection facility 11020. The complexity and sensitivity of installing, running, and eventually removing the platform 11002 compares favorably to that of installing, frequently refueling, and eventually removing conventional diesel generators and their associated fuel-delivery and -storage facilities (e.g., large tanks), which also carry a risk of toxic leakage or uncontrolled combustion during their whole service life. While operating, the platform 11002 requires no conventional fuel deliveries, its microreactors need only be replaced or refueled at multi-year intervals, and it emits no air or other pollution.

The illustrative deployment scenario of FIG. 110C could also accommodate various other platform designs according to embodiments of the present disclosure including other illustrative embodiments shown and described herein.

FIG. 111A shows schematically, in side and top views, portions of a partially submersible marine microreactor platform 11102 according to illustrative embodiments. The barge or platform 11102 may be towed and/or self-propelled and includes four utility superstructures 11104, 11106, 11108, 11110 and a single major interior deck 11108. The superstructures 11104, 11106, 11108, 11110 include crew housing, auxiliary power (e.g., diesel generators), communications and optionally navigation gear, and the like. In general, platform 11102 includes all equipment required for safe traversal of open seas and has a relatively shallow draft which enables it to be maneuvered and/or stationed in a range of relatively shallow coastal, river, and lake waters.

Moreover, platform 11102 is designed to operate at least two levels of immersion, indicated in FIG. 111A by two waterlines 11112 and 11114. The first waterline 11112 corresponds to a first, mobile operating mode of the platform 11102. In this first mode, the platform 11102 is afloat and seaworthy. The second waterline 11114 corresponds to a second, grounded mode of operation of the platform 11102. In this mode, the platform 11102 is ballasted so that its hull is grounded on the floor of the body of water where the platform 11102 is stationed and only the upper portions of the superstructures 11104, 11106, 11108, 11110 are above the waterline 11114. Although indicated by a single scalloped line in FIG. 111A, the waterline 11114 does not have a fixed, exact height: its height is determined firstly by the average depth of the water in which the platform 11102 is grounded and secondly by any tidal or other variations in the water depth at the site. The design of platform 11102 permits a range of average heights of the grounded waterline 11114, i.e., the platform 11102 can be grounded in a range of water depths with a superimposed range of depth variations due to tide, flood, storm surge, or other causes.

An advantage realized by the partial submersion of the platform 11102 is the protective effect of the water covering the portion of the platform 11102 in which the microreactors are housed. In embodiments, the depth of this water is sufficient to provide significant shielding against aircraft strikes and similar hazards. Immersion shielding reduces or eliminates the need for armoring the top and sides of the platform 11102 and/or adds an additional layer of protection to such armoring.

FIG. 111B shows schematically, in top view, the main interior deck 11108 of the platform 11102 of FIG. 111A. The deck 11108 is divided into a number of compartments by a bulkheads (e.g., bulkhead 11110). Two of the compartments contain two microreactors apiece (e.g., microreactor 11112), for a total of 4 microreactors. Each microreactor, in this example, is similar to those described with reference to FIG. 110B. The two compartments that contain the microreactors also contain discrete powerhouses (e.g., powerhouse 11114), similar to those described with reference to FIG. 110B. In embodiments, additional switchgear is included with the platform 11102 in order to synchronize, combine, and regulate the outputs of the four powerhouses into a single power output of the platform 11102. Also, the platform 11102 includes four ballasting compartments 11116, 11118, 11120, 11122 that can be filled with a ballasting material or air (and/or another gas) as desired. Possible ballasting materials include but are not limited to water, non-water liquids, slurries, and finely divided solids such as granular lead; the latter could also be used for radioactive shielding purposes, e.g., within bulkheads. When the ballasting compartments 11116, 11118, 11120, 11122 are filled with ballast, the platform 11102 ballasts itself down until it may or may not ground. In this semi-submerged mode, access to the reactor deck 11108 is through the superstructures 11104, 11106, 11108, 11110. To return the platform 11102 to a floating, seaworthy mode, whether to swap out microreactors or perform refueling, to remove the platform 11102 entirely, or for some other purpose, ballast in the ballasting compartments 11116, 11118, 11120, 11122 is replaced with air.

Considerations pertaining to deployment, installation, power lines, refueling, removal, and advantages over the prior art are similar for platform 11102 to those discussed herein for platform 11002 of FIG. 110A, FIG. 110B, and FIG. 110C.

FIG. 112A shows schematically, in side and top views, portions of a fully submersible marine microreactor platform 11202 according to illustrative embodiments. The barge or platform 11202 may be towed and/or self-propelled and includes a utility superstructure 11204 and a single major interior deck 11206. The superstructure 11204 includes crew housing, auxiliary power (e.g., diesel generators), communications and navigation gear, and the like. In general, platform 11202 includes all equipment required for safe traversal of open seas and has a relatively shallow draft which enables it to be maneuvered and/or stationed in a range of relatively shallow coastal, river, and lake waters.

Moreover, platform 11202 is designed to operate at two levels of immersion, indicated in FIG. 112A by two waterlines 11208 and 11210. The first waterline 11208 corresponds to a first, mobile operating mode of the platform 11202. In this first mode, the platform 11202 is afloat and seaworthy. Preferably (and feasibly, because platform 11202 contains only a single microreactor), the platform 11202 when afloat has a relatively very shallow draft, and is, therefore, suitable for transport up smaller waterways (e.g., smaller rivers) than are the heavier platforms of various other embodiments. In various other embodiments, platforms include more than one microreactor.

The second waterline 11210 corresponds to a second, fully submerged-and-grounded mode of operation of the platform 11202. In this mode, the platform 11202 is ballasted so that its hull is either (a) submerged but not grounded or (b) grounded on the floor of the body of water where the platform 11202 is stationed and even the uppermost portion of the superstructure 11204 is approximately at a depth D below the waterline 11210. In embodiments, the platform may be ballasted but also slightly positive buoyant, optionally being held in place with tension legs or the like. Although indicated by a single scalloped line in FIG. 112A, the waterline 11210 does not have a fixed, exact height: the depth D is determined firstly by the average depth of the water in which the platform 11202 is grounded and secondly by any tidal or other variations in the water depth at the site. The design of platform 11202 permits a range of average depths D, i.e., the platform 11202 can be grounded in a range of water depths with a superimposed range of depth variations due to tide, flood, storm surge, or other causes.

An advantage realized by the partial submersion of the platform 11202 is the protective effect of the water covering the entire platform 11202 in which the microreactors are housed, whose effects are similar to those described with reference to FIG. 112A. An advantage realized by dry-land final deployment of the platform 11202 is minimal need for transmission lines. The platform 11202, like various other embodiments, thus constitutes a high flexible terrestrial/marine platform capable being deployed or re-deployed in a very wide array of geographic circumstances without the need for additional or supportive infrastructure on site (e.g., fuel tankage).

FIG. 112B shows schematically, in top view, the main interior deck 11206 of the platform 11202 of FIG. 112A. The deck 11206 is divided into a number of compartments by a bulkheads (e.g., bulkhead 11212). One of the compartments contains a microreactor 11214. The microreactor in this example is similar to those described with reference to FIG. 110B. The compartment that contains the microreactor 11214 also contains a powerhouse 11216, similar to those described with reference to FIG. 110A and FIG. 110B. Additional switchgear is included with the platform 11202 as described with reference to platform 11002 of FIG. 110B. Also, the platform 11202 includes four ballasting compartments 11218, 11220, 11222, 11224 that can be filled with ballast or air as desired to sink or raise the platform 11202 as described with reference to platform 11102 of FIG. 111A and FIG. 111B.

Considerations pertaining to deployment, installation, operation, power lines, removal, refueling, raising and lowering, and advantages over the prior art are similar for platform 11202 as for platform 11002 of FIG. 110A, FIG. 110B, and FIG. 110C and platform 11102 of FIG. 111A and FIG. 111B as discussed herein. A distinctive advantage of platform 11202 is that it is entirely shielded from aircraft strikes and similar hazards by water of at least depth D. Of note, accessing the interior of the platform 11202 when it is submerged requires one or more of (a) passage through an airlock, (b) mating of an upper portion of the platform 11202 to a vertical access riser, (c) raising the platform 11202 so that at least its superstructure 11204 protrudes above the water, or (d) some other access method. A fully submerged platform is, in various embodiments, either fully autonomous during normal operation or operates with a small onboard staff. Also of note, access to a normally submerged platform can be achieved by de-ballasting the platform so that it rises to the surface for inspection, repair, refueling, or other purposes.

The platform 11202, given its relatively small mass compared to multi-microreactor platforms, can in some embodiments be transported overland from a coastal delivery point to a service site, either on land or in another body of water. Overland transport can occur by a variety of mechanisms, e.g., on a specialized sled or self-propelled vehicle, or on rollers, or by dragging or pushing the platform 11202 over a prepared slideway or a natural surface (e.g., snow, ice, sand, tundra). This flexibility is characteristic not only of the illustrative platform 11202 but of various other embodiments of the present disclosure.

FIG. 112C schematically depicts the platform 11202 of FIG. 112A and FIG. 112B during overland transport between two bodies of water according to an illustrative embodiment. In the illustrative case of FIG. 112C, the platform 11202 is being dragged from a first body of water 11226 to a second body of water 11228 over a landmass 11230. The landmass 11230 is covered at least in part by snow 11232 and the platform 11202 is being dragged by one or more haulers 11234. Additionally or alternatively, to dragging over snow or ice, wetted sand or other materials may be used to reduce friction and guard the hull of the platform 11202 from mechanical damage during overland dragging.

Rollers (e.g., roller 11236) are in this case used, as depicted, to transit the platform 11202 from the first body of water 11226 to the snow 11232 over then intertidal zone, and then again to transit the platform 11202 from the snow 11232 to the second body of water 11228. Rollers may be used for crossing any snow-free interval of ground, e.g., by moving free rollers from the back of the platform 11202 to the front as the platform 11202 moves forward. Having reached the second body of water 11228, the platform 11202 may be deployed therein, either as a floating unit or partially or wholly submerged unit, or else transported thereover to a destination or to some additional phase of its journey (e.g., to another overland crossing).

In another deployment alternative applicable to platform 11202 or various other embodiments, a microreactor platform can be hauled any distance, as for example by the method of FIG. 112C, to an inland deployment site inland for deployment. Access to the platform 11202 and the installation and maintenance of power connections are simplified by on-land deployment.

If platform 11202 or a similar platform is to be moved overland by dragging or pushing, whether over a surface material or on rollers, it will likely require a reinforced hull. If a sled or self-propelled crawler is used to move the platform, reinforcement may be unnecessary.

Refueling a submersible nuclear reactor platform may involve utilization of a docking refueling vessel. Such embodiments are depicted in FIG. 112D. In examples, the platform 11202 can be installed on the seabed and in natural and/or human-made cave structures as depicted in FIG.

112E. A submerged or submersible reactor module, unit or platform may require refueling. A refueling vessel as generally described herein may be adapted to accommodate receiving a submersible nuclear reactor system through a docking port that facilitates refueling without requiring the nuclear reactor to be removed from the water and transported over land as depicted in FIG. 112C. An adapted refueling vessel 11240 may be constructed with a refueling docking port 11242 into which a reactor system 11206 may be positioned, such as by increasing its buoyancy to effect raising the system 11206 into the docking port 11242. In embodiments, a docking port 11242 may comprise a rapid transfer lock to avoid seawater contamination of the nuclear water of the reactor.

FIG. 112C depicts the transport of a turnkey platform 11202, but the illustrative transport method of FIG. 112C could also be applied to the discrete components of a modular platform: e.g., the powerhouse and microreactor could be moved separately. It will be appreciated in light of the disclosure that all transportation methods applicable to platforms in various embodiments, including airlift (by, e.g., a heavy transport helicopter) are applicable both to turnkey and modular systems.

In sum, FIG. 112C briefly indicates the very great flexibility of various embodiments with respect to water transport, overland transport, and turnkey-vs.-modular delivery. It will be appreciated in light of the disclosure that as a result of this flexibility, it is not practical to enumerate all possible delivery methods and scenarios; all, however, are contemplated and within the scope of the present disclosure. In embodiments, deployment may include delivery by hovercraft. Hovercraft delivery may support delivery where land-based transport is not suitable, such as over tundra, desert, creeks, shallow rivers, swamps, everglades, and the like. In embodiments, a deployment location, or access thereto may be by a water way that is not sufficiently deep for a conventional marine transport vessel. A hovercraft could overcome this challenge and transport either an entire barge (e.g., an entire power station) to the site, and or transport individual modules which can then be assembled at site, for example. A hovercraft may also provide access to regions during winter when water ways freeze. In embodiments, the hovercraft delivery vehicle may be powered by a microreactor. Yet further, hovercrafts may be configured for specific roles, such as reactor delivery, reactor retrieval, cleanup, fuel delivery, and the like.

FIG. 113A schematically depicts, in top-down and cross-sectional view, portions of a microreactor platform 11300 according to illustrative embodiments. The platform 11300 is intended to be completely submerged when deployed in a manner that is grounded and covered by a depth of water great enough to rule out collision with any surface vessel. The advantages of complete submersion at such depth include thorough shielding against aircraft strikes and similar threats and immunity from collisions with or attacks by surface ships.

The platform 11300 includes two pods 11302, 11304. The first pod 11302 houses a microreactor 11306 and the second pod 11304 houses a powerhouse 11308. Fluids (e.g., steam) are exchanged between the microreactor 11306 and the powerhouse 11308, and the two pods 11302, 11304 are stably mechanically joined, through two tubes 11310, 11312. The pods 11302, 11304 also include end-cap ballast chambers 11314, 11316, 11318, 11320 that can be filled with water to decrease the buoyancy of the platform 11300 and filled with air to increase its buoyancy. Within the pods 11302, 11304, support structures 11322, 11324 uphold and stabilize the microreactor 11306 and powerhouse 11308. In embodiments, the interiors of the pods 11302, 11304 are filled with a pressurized gas (e.g., air or, in case of autonomous operation, with nitrogen to restrict fire development) when the unit is submerged.

In embodiments, the platform 11300 is either towed on the surface to its deployment site and then sunk by filling its ballast compartments, or is carried on a cargo ship and lowered by a crane through the water to its resting place.

FIG. 113B schematically shows, in side view, portions of a platform 11300 of FIG. 113A as deployed. The platform 11300 rests on the bottom 11326. In embodiments, a buoy cable 11328 possibly with multiple tether attachments to the platform 11300 can rise from the platform 11300 to a submerged float 11330. A second buoy cable 11332 (or continuation of buoy cable 11328) continues upward to a surface float 11334. In embodiments, the surface float 11334, among its other functions, marks the location of the platform 11300 and simplifies its retrieval: buoy cables 11328, 11332 are strong enough so that the platform 11300 can, with its ballast tanks adjusted to produce slightly negative buoyancy, be raised and lowered thereby.

A power output cable 11336 (indicated by a double line), supported by the buoy cable 11328, rises from the platform 11300 to the submerged float 11330. The float 11330 serves partly to elevate the power cable 11336 in order to prevent it being pinned by or entangled with the platform 11300. In embodiments, the float 11330 contains a quick-disconnect mechanism that safely severs power cable 11336 in the event of cable tension exceeding a threshold value (e.g., in the event of cable entanglement with a moving vessel). From the submerged float 11330, the power cable 11336 depends to the sea floor and runs thereon to land; or, it ascends from the float 11330 to a further connection point, whether on land or at the surface of the water.

In embodiments, the floats 11332, 11334 include communications electronics (e.g., to support telemetry and command-and-control wireless links) and batteries or alternative generators (e.g., solar cells, fuel cells) so that their active functions can continue if the platform 11300 is not producing power; in normal operation, all power can be derived from the platform 11300. In embodiments, because radio communications through salt water are not generally practical, high-speed data communications between the platform 11300 and remote monitors or operators (e.g., at the site of the remote enterprise) may or may not be enabled by a hardwire link between the platform 11300 and the surface float 11334, the float 11334 bearing an antenna and being in wireless communication with remote operators. Additionally or alternatively, wired communications between the platform 11300 and some above-water point are sustained by data cables paired with the power cable 11336 and/or separately run to shore. Of note, similar buoy-and-radio or line-to-shore arrangements can be used for telemetry and control of the platform 11202 of FIG. 112A and FIG. 112B when it is completely submerged. In general, various embodiments include arrangements for remote monitoring and control.

As will be clear to persons familiar with submarine installations, the float, cable, and other arrangements can in various embodiments all vary widely from the arrangement shown in FIG. 113B. There is no restriction to any aspect of the mechanical arrangements of deployment or the form of the submerged platform as shown in FIG. 113A and FIG. 113B.

FIG. 114 schematically depicts aspects of a marine microreactor farm 11400 and its context according to an illustrative embodiment. The illustrative microreactor farm 11400 includes eight submerged microreactor platforms similar to platform 11300 of FIG. 113A and FIG. 113B. Power is conveyed from the platforms of the microreactor farm 11400 (e.g., platform 11402) to an onshore connection facility or electrical house 11404 by a first power cable or cable bundle 11406 and thence to the enterprise 11408 by a second cable or bundle 11410. The number of microreactors shown in FIG. 114 is illustrative only; there is no limit on the number of microreactors in a microreactor farm.

The power output of a microreactor farm such as microreactor farm 11400 is limited only by the number of microreactor platforms incorporated. An advantage of the microreactor farm over other facilities that could supply an equal amount of power, e.g., a single large, conventional nuclear power plant, is that one or a few microreactors can be taken offline for refueling or repair without greatly reducing the overall power output of the microreactor farm. Another advantage is that the total power output of a microreactor farm can be incremented or decremented at will, by adding or removing microreactors, to match any long-term growth or shrinkage in the power demand of the enterprise or community being served.

According to various embodiments, some or all platforms of a microreactor farm may be floating, or partly submerged, or entirely submerged in ordinary operation; there is no restriction to complete submergence, as depicted in FIG. 114.

In embodiments, the marine microreactor farm may further be combined with marine deployed IT facilities, e.g., such as subsea datacenters. An example of a subsea datacenter enterprise is the Microsoft Natick project. In embodiments, the marine microreactor farm may further be combined with marine deployed IT facilities such as subsea datacenters deployed above the waterplane area, e.g., on a floating vessel.

It will be appreciated in light of the disclosure that the numbers, sizes, power ratings, and arrangements of microreactors, powerhouses, decks, superstructures, and other features of all illustrative embodiments discussed herein are nonrestrictive.

Various advantages accrue from various embodiments and applications of the present disclosure. These include, but are not limited to, the following:

Mobility. The small size of microreactors allows them to be delivered via integration in an appropriate platform to a remote enterprise site and to be swapped in individually for units needing refueling or repair.

Flexibility. The small size and self-contained nature of microreactors allows them to be delivered in platform-integrated multiples whose output is closely sized to the power requirements of a given remote enterprise.

Simplicity. Because a microreactor is typically a sealed unit requiring no management of internal mechanics, reaction rate, or the like, few or no on-site personnel are required for operation.

Safety. Microreactors cannot melt down, catch fire, explode, or leak large quantities of toxic fluids.

Compactness. Because microreactor energy density is high compared to prior-art alternatives, the footprint of a microreactor platform is relatively small for a given power output. This increases the range of viable siting options for many remote enterprises.

Reliability. Because a microreactor is simple, its reliability is high. The overall reliability of a microreactor power platform will be primary constrained by its power-conversion system; however, a range of highly mature, reliable technologies are available for power conversion.

Refueling. The refueling interval for a typical microreactor is on the order of up to 10 years. A microreactor platform nearing the end of its fuel lifetime can be replaced in situ by a fresh platform and moved to a central location for servicing; or, fresh microreactors can be swapped in one by one at the service location.

A. Swapping Microreactors at Sea

In embodiments, microreactors, including without limitations microreactors utilizing an MRC may be constructed uniformly for direct or near-direct interchange, such as swapping out reactors for service or other reasons. This direct interchange construction enables a range of service scenarios for microreactors deployed on vessels, ocean-based structures and the like. In embodiments, a microreactor enclosure may be constructed to be compatible with existing dockyard transport systems (e.g., standard container sizes and at least a portion of standard container features) so that the movement of microreactors can be performed without requiring special handling equipment. Such a transport system compatible microreactor enclosure may obfuscate details of the microreactor itself, instead presenting a consistent size and shape with various interfaces. In embodiments, a microreactor using non-military enriched uranium (e.g., HALEU and the like) may be configured in a first enclosure that may be interchangeable using the methods and systems described herein with a microreactor using different types of nuclear fuel, including but not limited to oxide fuels, metallic fuels, non-oxide ceramic fuels, liquid fuels, and/or military-grade fuels. An exemplary service scenario includes removal/replacement/deployment of microreactors and/or MRCs when a vessel is brought into port for cargo loading/unloading. This scenario extends to any type of vessel-based microreactor removal/replacement/deployment, not just for service purposes. The modular nature of microreactors, when combined with the MRC, may support, among other things, vessel-journey-specific dynamic power plant configuration as noted herein.

An additional microreactor service scenario supported herein may address jurisdictional restrictions on nuclear reactor operation and/or transport, such as proximity to busy dock operations and the like. This scenario also addresses situations where land-based microreactor servicing is limited or not existent, such as in a jurisdiction that does not have nuclear reactor service facilities and/or transport infrastructure, and the like. Other constraints that make in-port microreactor removal/replacement/deployment impractical may also benefit from this service scenario. Utilizing some of the installation and on-vessel transport features described herein, such as may be described in association with the MRC, (e.g., exemplarily depicted in FIG. 177 and the like), microreactors can be moved to location(s) that are externally accessible, such as a top deck, side loading portal, and the like. This movement can be part of a reactor service protocol that can be performed while a vessel is outside of a nuclear exclusion zone. Generally, a reactor service protocol may be based on proximity to a microreactor service facility, such as a vessel, platform and the like. Based on satisfying aspect of the protocol (e.g., vessel is secured to a service vessel and the like), vessel-based cranes and/or other transportation mechanisms (vehicles, trailers and the like) may be used to move the microreactors off the vessel, such as to a nearby microreactor service-type vessel, platform and the like. If needed, a replacement microreactor may be transported onto the vessel using the same or similar transportation mechanisms. For time efficiency, a first transport mechanism (e.g., crane) may be used to remove a reactor from the vessel while a second transport mechanism (e.g., aircraft) may be used to deliver a reactor to the vessel. The microreactor service-type vessel may provide a range of services, including transport of microreactors, fueling and maintenance of microreactors, safe capture of spent nuclear fuel from microreactors moved off a vessel and the like.

Yet another service scenario enabled by modular, substantially directly interchangeable microreactors involves microreactor service for ocean-based structures (e.g., oil rigs and the like). All materials, supplies, and personnel for such a structure are transported to the structure by air, by sea or some combination (e.g., personnel may be flown to the structure, whereas material may come by sea). With the advancement of microreactors, this now can include the power plant for the structure, exemplarily a microreactor-based power plant can be transported, such as via microreactor service-type vessel and/or aircraft to/from the structure, optionally using conventional cargo transport mechanisms.

FIG. 115 depicts a scenario where micro reactor service and/or operation is not permitted and/or not available in a first jurisdiction 11506. Additionally, nuclear operation restriction may be designated by established nuclear operation exclusion zones 11502 and 11504 around seaports of this jurisdiction where vessels may operate. Within these zones nuclear reactor power plants must at least be disabled so that, for example, nuclear reactor breakdown risk is minimized. An alternate jurisdiction 11508 may provide nuclear power plant (e.g., microreactor and the like) storage, service, and/or refueling and may include a port 11512 and a service/storage facility 11510. The scenario of FIG. 115 depicts microreactor service (e.g., swap out and the like) being performed proximal to at least one route for vessels traveling to/from nuclear exclusion region ports 11502 and 11504 in the jurisdiction 11506. A microreactor service-type vessel 11514 may operate between a port 11512 in jurisdiction 11508 and a designated service point 11520 proximal to one or more vessel routes to/from jurisdiction 11506. In embodiments, replacement microreactors may be retrieved from service/storage facility 11508 and transported to the designated service point 11520 by the service-type vessel 11514. Vessels powered by microreactors, such as vessel 11516 and 11518 may dwell at the designated service point 11520 on routes to/from the exclusion zones whereat microreactor service (e.g., swapping and the like) may be performed. In embodiments, swapping microreactors at sea, such as between microreactor powered vessels may be performed with motion compensating cranes and/or gangways that may be deployed on either or both vessels. Temporarily seafloor-connected cranes, such as those known to be used when constructing offshore wind farms may also be used.

In addition to complete exclusion of nuclear operated vessels in proximity to a seaport, limits on the number of vessels operating under nuclear power, such as by using one or more microreactors and the like, may be defined in a nuclear-powered vessel congestion policy. Such a policy may be based on standards for nuclear failure exposure safety zones and the like. Such a policy may also be based on vessel collision statistics and conditions, so as, for example, to mitigate the likelihood of a vessel-to-vessel collision and the like. Other factors that may impact congestion constraints for vessels may include individual vessel capabilities for avoiding collision. In embodiments, vessels may be configured with not only collision avoidance features, such as automated navigation, vision systems, LIDAR, radar, night vision and the like, but through networking techniques and optionally through regional or centralized control of vessels, information about vessel location, trajectory, route, timing, payload, nuclear power factors, and the like may be shared among vessels and governing bodies for jurisdictions impacted by and/or imposing congestion policies and the like. This information sharing may lead to computer controlled congestion region entry regulation, such as allowing vessels that meet certain congestion control standards to be permitted entry. Likewise, scheduling of access to congestion zones may be enhanced through such information sharing. In embodiments, negotiation among vessels needing access to a congestion zone may rely on such information, such as by automating activation of secondary power systems, vessel routing proximal to a congestion zone, and the like.

Such a policy may be affected by local concerns, such as local political and legal rules and regulations. In embodiments, operational control of nuclear-powered vessels, whether it be individual vessel operation (autonomous and/or semi-autonomous), multi-vessel control, on-vessel human control, remote control, and the like may require factoring in congestion limits.

Referring to FIG. 116, a depiction of nuclear reactor-powered vessel exclusion and congestion zoning is presented. For a given jurisdiction 11600, nuclear-powered vessels may be excluded from operating under nuclear power in certain ports, such as ports in exclusion zones 11604 and 11602. Optionally, exclusion zones 11604 and/or 11602 may differentiate exclusion based on nuclear fuel type. A vessel that employs military-grade enriched uranium may be excluded from operating in an exclusion zone. Whereas that same zone may permit operation of vessels being powered by, for example, microreactor embodiments described herein, such as those that utilize non-military enriched uranium (e.g., HALEU) and/or advanced composition uranium (e.g., TRISO) and the like. Vessels operating in these zones must be operating under other than nuclear power or must be tugged if no alternate source of power is available. In embodiments, vessels without an alternate power generation capability may be configured with an external, tow along power generation platform, such as a turbine electricity producing barge that may be mechanically and electrically connected to the vessel while outside the exclusion zone. As such, the turbine electricity producing barge may provide electricity to the vessel to operate its electrical motors (typically powered by its on-board microreactors and the like). In embodiments, an electricity producing system, such as an ammonia powered turbine and the like may be lifted onto the deck of such a vessel, energized, and connected to the vessel electrical system for producing electricity while the vessel is within an exclusion zone.

In addition to or in place of nuclear energy producing exclusion zones (e.g., zone 11602 and 11604), a nuclear energy congestion zone may be established. Generally, such a zone may demark a geographic region within which a limited number of vessels and/or reactors (e.g., for vessels with multiple reactors) can operate concurrently. Exclusion zone 11606 in FIG. 116 indicates a region outside of exclusion zones 11602 and 11604 in which a quantity of operating nuclear reactors, such as microreactors and the like may dwell. Such a zone may be manually designated and controlled. However, nuclear vessel operation in a congestion zone, such as zone 11606 may be automatically controlled based on detectable presence of the vessels and/or their reactors. One example may include requiring all vessels approaching this congestion zone 11606 report to a centralized control authority, automatically, the type and quantity of nuclear reactors operating onboard. Another example may include each nuclear reactor determining its location relative to the congestion zone and based on an indication of a count of vessels within the zone and a nuclear power plant congestion limit for the zone 11606, control its operation so that the congestion limit is not exceeded. A vessel nuclear reactor control circuit may receive a signal indicative of the number of activated nuclear reactors the vessel is permitted to bring into the zone 11606. If the number of nuclear reactors operating on the vessel exceeds the number permitted, the control circuit may adapt power output from one or more nuclear reactors, such as reducing output power below 100% (e.g., limit power output temporarily to 20%), disabling one or more nuclear reactors, optionally energizing alternate power generation source(s), such as a gas-based turbine, and the like. In embodiments, vessels approaching and present in the congestion zone 11606 may communicate with each other, and/or optionally with a centralized congestion zone negotiation facility to determine which vessel(s) and which reactor(s) on which vessels are to be disabled. This determination may be based on a range of factors including, without limitation, prioritization, hierarchy, market value, nuclear reactor operation credits available and the like. In an example, a vessel control system and/or operator approaching a congestion zone may offer to other vessels within or proximal to the zone, nuclear congestion allocation credits in exchange for disabling one or more on-board reactors. In another example, a central congestion negotiation facility may set a value for each operating nuclear reactor in a congestion zone that must be paid (e.g., in the form of accrued congestion allocation credits and the like) to operate the vessel under nuclear power in the congestion zone. In yet another example, a vessel operating within the congestion zone may set a value (e.g., a number of congestion zone allocation credits) that it is willing to accept to turn off one or more of its nuclear reactors. These and other market-based schemes for managing nuclear reactor operation in congestion zones, such as zone 11606 are contemplated by the inventors and included herein. Also, depicted in FIG. 116 is a nuclear power vessel congestion zone 11608 that may exist without a further exclusion zone so that vessels may operate under nuclear power while docking and the like within the congestion zone, while observing any congestion limits of the zone 11608.

VI. Vessel Propulsion

FIG. 117 is a schematic depiction of portions of a conventionally powered container ship 11700 according to one form of the prior art. The container ship 11700 has length L1 and a bulbous bow 11702 that extends from a bow having, overall, a rounded cross-section 11704 and is slightly below the laden waterline 11706. The length L1 and bulbous bow 11702 of the ship 11700 and are designed to enable the ship 11700 to cruise most profitably—given constraints on both fuel consumption and shipping speed—at a velocity of approximately V1. For this illustrative container ship, L1=300 m and a "normal" steaming speed would be V1=20 knots (10.2 m/s) or higher. For this length and speed, fuel consumption is not at minimum, since the Froude number is well above the critical threshold of F*=0.16:

$$F = \frac{v}{\sqrt{gL}} = \frac{10.2 \text{ m/s}}{\sqrt{(9.8 \text{ m/s}^2)\times(11900 \text{ m})}} = 0.18$$

The container ship 11700 is powered primarily by a large, slow-speed diesel engine 11708, whose shaft communicates through a reduction gear 11710 with a propeller 11712.

FIG. 118 is a schematic depiction of portions of a conventionally powered bulk carrier ship 11800 according to one form of the prior art. The bulk carrier ship 11800 has length $L_2$ and a rounded bow 11802, and a laden waterline 11804. A bulk carrier typically cruises the length $L_2$ of the ship 11800, and its rounded bow 22, are designed to enable the ship 11800 to cruise most profitably—given the constraints both of fuel efficiency and shipping speed—at a velocity of approximately $V_2$. For an illustrative large bulk carrier ship 11800, $L_2$=650 m and $V_2$=14 knots (7.2 m/s). For this ship length and speed, fuel consumption is low, since the Froude number for this condition is ~0.09, well below the critical value of F*=0.16:

$$F = \frac{v}{\sqrt{gL}} = \frac{7.2 \text{ m/s}}{\sqrt{(9.8 \text{ m/s}^2)\times(12250 \text{ m})}} = 0.09.$$

A ship of length $L_2$=650 m can cruise at up to 18.24 kn (9.37 m/s) without exceeding the critical Froude number F*=0.16, above which wave resistance becomes significant and fuel consumption increases more rapidly. However, bulk carriers, because of the low charter rate on their cargo, are sailed profitably at speeds well below those which would cause their Froude number to approach F*=0.16. Low speed dictates the absence of a bulbous bow on such vessels; at low speed, a bulbous bow tends to confer a net increase in drag.

Similar to the container ship 11700 of FIG. 117, bulk carrier ship 11800 is powered primarily by a large, slow-speed diesel engine 11806, whose shaft communicates through a reduction gear 11808 with a propeller 11810.

FIG. 119 is a schematic depiction of portions of the power system of a large conventionally powered ship 11900 (stern section only depicted) according to one form of the prior art. A large (e.g., 20 MW) fuel-burning engine 11902 is housed within an engine room 11904. In commercial practice, the engine 11902 is most often a large slow-speed diesel engine such as a MAN B&W S80ME-S. The engine 11902 turns a crankshaft shaft 11906 which interfaces with a propeller drive shaft 11908 through a reduction gear system 11910, causing a screw or propeller 11912 to turn. Large marine vessels typically include additional power sources or conversion systems, such as one or more auxiliary power units (engines), batteries, and electrical generators powered by the main engine 11902 and/or by other engines. In an example, a ship may be powered primarily by components such as those depicted in FIG. 119 when cruising in international waters, but by a smaller, natural-gas-powered auxiliary engine when the ship is in a coastal zone where pollutive emissions are regulated. Nuclear powered propulsion may facilitate higher speeds due to the higher energy output possible within a size constraint comparable to or smaller than a conventional combustion engine as noted above.

FIG. 120A is a schematic depiction of portions of a primarily propulsive power system housed within a large maritime vessel 12000 (stern section only depicted) according to illustrative embodiments. The drawing depicts some major components pertaining to the generation of primary power for propulsion and omits other components (e.g., fuel tanks, batteries). The vessel 12000 is powered by a hybrid-nuclear power system, which herein denotes a combination of nuclear power and one or more additional sources of power, e.g., a conventional (combustion) engine. The power system of the ship 12000 includes two modular reactors 12002, 12004, (e.g., microreactors and the like) each of which produces primary energy in the form of heat, which is exchanged through pipe loops 12006, 12008 with power conversion units 12010, 12012 that convert heat to mechanical work and mechanical work to electrical power. In a typical power conversion unit, heat is used to produce steam, which drives a turbine or other heat engine, which drives a conventional electrical generator; however, all forms of heat-to-electric conversion are contemplated. The electrical power output of the conversion units 12010, 12012 is conveyed by cabling 12014, 12016 to an energy management system 12018. The energy management system 12018 supplies power to an electric motor 12020 whose shaft 12022 interfaces through a gear system 12024 with the propeller shaft 12026. Moreover, a conventional engine 12028 drives an electrical generator 12030 which supplies power via cabling 12032 to the energy management system 12018 and ultimately to the propeller shaft 12026.

Various embodiments include batteries that are charged by, and can feed power to, the energy management system 12018, and an electric motor in line with the propeller shaft 12026. The batteries can be charged either by the nuclear reactors 12002, 12004 or by the conventional motor 12028. If the ship 12000 must maneuver without the benefit of nuclear power (e.g., in a regulated coastal zone where the nuclear reactors 12002, 12004 must be turned off), power from batteries and/or the conventional engine 12028 can run the in-line electric motor and turn the propeller shaft 12026.

In embodiments, a single conventional engine 12028 and two nuclear reactors may be constructed as power conversion units 12010, 12012 are depicted in FIG. 120A, but there is no restriction to one conventional engine or type of conventional engine or fuel, or to only one or two nuclear reactors, or to reactors of a single type. All nuclear and non-nuclear power-generating systems, and numbers of and combinations of such systems, are contemplated.

The hybrid power system of ship 12000 offers several advantages over the prior art. One advantage pertains to the Energy Efficiency Design Index (EEDI) for new ships, a legally binding climate-change standard of the IMO that promotes the use of more energy-efficient (less polluting) equipment and engines. The EEDI standard was mandated by the adoption of amendments to MARPOL Anne VI (resolution MEPC.11803x(62)) in 2011. EEDI specifies maximum $CO_2$ emissions per capacity mile (e.g., per ton-mile), varying with ship type and size. Since Jan. 1, 2013, following an initial two-year phase zero, some new ships—including all large commercial vessels propelled by fuel oil—have to meet the EEDI threshold for their type. The threshold is decreased incrementally every five years.

EEDI can be expressed or approximated by a number of formulae that vary in complexity, but in essence specifies an upper limit on grams of $CO_2$ emitted per tonne-mile. It is therefore not, despite its name, a standard for energetic efficiency but a standard for $CO_2$ emissions. For example, an oil-burning ship might attain a low EEDI by capturing some or all of its carbon output, but capture would consume energy and therefore decrease the overall efficiency with which the ship used fuel for propulsion. In another example, a fuel-burning ship's EEDI can be reduced (within limits) by slowing the ship, reducing emissions per tonne mile. In yet another example, a ship's EEDI at a given speed can be reduced (e.g., compared to what its EEDI would be using 100% fuel-oil power) by powering the ship partly or wholly with a lower-carbon source, such as wind, natural gas, or nuclear power.

If the power that a vessel having a hybrid-nuclear power system (e.g., ship 12000 of FIG. 120A) derives from fuel-combusting $P_F$ is a fraction λ (0≤λ≤1) of the vessel's total power $P_{total}$, and the power the vessel derives from nuclear power is $P_N$, then $P_{total}=\lambda P_F+(1-\lambda)P_N$. In general, a vessel's EEDI for a given $P_{total}$ (e.g., at a given speed) is directly proportional to $P_F$. Therefore, assuming comparable lading and other relevant conditions, a ship with a hybrid-nuclear power system will have a lower EEDI at any given speed then the same vessel powered entirely by combusting a fuel. A ship powered entirely by nuclear power will have an EEDI of zero. Thus, reduced EEDI is a realized by various embodiments of the present disclosure whenever the nuclear portion of a hybrid-nuclear power system is supplying significant fraction of ship's power.

Moreover, wherever power for long-distance steaming is wholly or partly (i.e., except for a fixed quantity of conventionally generated power) derived from the nuclear portion of a hybrid-nuclear power system, vessel speed and pollutive emissions are independent of each other: Up to the ship's maximum viable operating speed, no more $CO_2$ or other pollution is emitted at any one speed than at any other. Emissions-related constraints on speed become irrelevant.

Moreover, financial constraints on vessel operation and design tend to be altered by the use of a hybrid-nuclear power system. For non-military vessels, profit is the usual goal of operation: and in cargo transport, profit is the net difference between what a shipper is paid to transport the cargo and all costs of doing so, including insurance, financing, salaries, maintenance, fuel, and many other terms. A full accounting of costs would be complex, but if only income and expense terms affected by vessel velocity are considered, a few relatively simple relationships hold (approximately and over a limited a range of velocities), as follows.

(1) Income I for a cargo-carrying vessel is proportional to velocity: the faster a ship goes, the more cargo it delivers, on average, in a given period of time. This can be seen by considering that a ship which completes n cargo-carrying voyages carrying C tons of cargo per voyage at a charter rate of θ $/ton earns a gross income of $I_g$=n C θ dollars. The number of voyages n made in a given sailing time t, assuming voyages of equal length $L_v$ and constant sailing velocity V, is total distance sailed divided by voyage length:

$$n=\frac{tV}{L_v}$$

Thus, average gross income for a vessel in time t is $$I_g=\frac{tV}{L_v}\times C\theta$$

The average rate (derivative with respect to time) of income, which an owner or operator generally wishes to maximize, is thus proportional to V:

$$\frac{dI_g}{dt} = \frac{V}{L_v}C\theta \text{ or}$$

$$\frac{dI_g}{dt} = aV$$

where a=C θ $L_v$ is a constant.

(2) The second velocity-dependent economic term to be considered is the cost of power for propulsion. Due to the effects of viscous drag and wave resistance, for a vessel traveling at a velocity that makes its Froude number F less than or equal to the critical value F*=0.16, propulsive power is proportional to the cube of velocity: $P_{total} \propto V^3$. If it assumed that primary power is directly proportional to velocity—e.g., that to increase power output at the propeller shaft by 10% it is necessary to increase oil consumption by 10%—and that primary power cost is directly proportional to power output, then the rate of spending $P_\$$ for primary power is also proportional to the cube of velocity: i.e., $P_\$=bV^3$, where b is some constant.

The net rate of earning, therefore, insofar as this depends on vessel velocity V (i.e., disregarding all expenses that do not depend on ship velocity), herein termed "baseline profit" $I_B$, is given by $$I_B = I_g - P_\$ = aV - bV^3$$

To find the velocity V* that maximizes $I_B$, one differentiates the foregoing equation with respect to V, sets $dI_B/d_V$ equal to zero, and solves for V:

$$V^* = \left(\frac{a}{3b}\right)^{1/2}$$

Below V*, baseline profit $I_B$ increases with velocity, dominated by linearly increasing income $I_g$; above V*, baseline profit $I_B$ decreases sharply, dominated by rising power costs $P_\$$ that are proportional to $V^3$.

It can be shown by calculations similar to the foregoing that for a vessel with a hybrid-nuclear power system in which the dimensionless ratio μ of the cost of nuclear energy $f_N$ ($/kWh) to the cost of fossil-fuel energy $f_F$ ($/kWh) is given by $$\mu = \frac{f_F}{f_N}, \mu < 1,$$

the least costly speed (for Froude number at or below F*=0.16) is $$V_H^* = \left(\frac{a}{3\mu b}\right)^{1/2}.$$

$$\text{For } \mu < 1, V_H^* > V^*.$$

That is, the velocity that maximizes baseline profit $I_B$ for a nuclear-hybrid vessel, where nuclear power costs less than conventional fuel power per kWh, is greater than that which maximizes $I_B$ for a conventionally powered vessel. The smaller μ is, the higher the optimal speed. Therefore, the lower the cost of a vessel's nuclear power in terms of $/kWh, the faster that vessel should be designed to sail.

Moreover, at velocities above V* that produce a Froude number $0.16<F<0.18$, it can be shown that baseline profit includes a loss term proportional to the fourth power of velocity:

$$I_B = I_g - C = aV - bV^3 - cV^4,$$

where c is some constant. Therefore, exceeding V* is only compatible with maximizing profit where the gross income term $I_g$ is relatively high, the cost of power is relatively low, or both. It is notable that at any given speed, baseline income $I_B$ can be increased by decreasing the coefficients b and c, which depend partly on vessel design. In general, a vessel that encounters less viscous friction and/or wave resistance at a given speed will return higher $I_B$ than an otherwise comparable vessel at the same speed. Illustrative changes in vessel design that decrease resistance are discussed herein with reference to FIG. 122 and FIG. 123.

Microreactors are typically designed to run on a fuel load without refueling or other major service for some number of years, e.g., 5 to 10 years. At or near the end of this time, the microreactor must be refueled or replaced. In an illustrative operating procedure, the reactors 12002, 12004 of FIG. 120A supply power from the time of their installation until five years have passed. The vessel 12000 makes a scheduled service stop at a port equipped to extract the reactors 12002, 12004 and deliver them to a facility or network of facilities where they are either decommissioned or refueled, maintained and refurbished, and their partially spent fuel is reprocessed and/or sequestered. Further in embodiments, other common reasons for vehicle maintenance, such as hull cleaning may be coordinated with refueling of an on-board nuclear reactor. Unlike with conventional fuel-based vessel propulsion systems, refueling can be deferred by several years, so that multiple services that need to be performed on the vehicle can be consolidated based on an earliest need for one of the services; refueling is a needed service that no longer dominates port access and usage schedules. Embodiments of microreactors described herein may utilize non-military grade uranium fuel, such as oxide HALEU-like fuel with an enrichment of less than 20%, metal fuels, non-oxide ceramic fuels, as well as liquid fuels. Meanwhile, fresh, newly fueled reactors are installed in the vessel 12000 and it is free to operate without further refueling for another 5 years. The architecture of the vessel 12000 includes provisions, e.g., a removable upper section, that facilitate access to the portion of the ship containing the microreactors. It is an advantage of various embodiments that vessels need no refueling between reactor replacement events. It is also an advantage of various embodiments that less space is required within nuclear or hybrid-nuclear powered vessels for the storage of fuel. It is yet another advantage of various embodiments that spills of fuel due to collisions, leaks, and other mishaps are either constrained in possible scale by the carriage of a much smaller volume of liquid fuels, or are even rendered essentially impossible by the robust nature of the reactor's internal vessel and its other rigorous provisions for containment of its radioactive materials.

FIG. 120B is a schematic depiction of portions of a large, primarily propulsive hybrid-nuclear power system housed within a large maritime vessel 12001 (stern section only depicted) according to illustrative embodiments. The power system of FIG. 120B is similar to that of FIG. 120A, except that the conventional engine 12028 does not produce electrical power but transmits power through a shaft 12034 with an ancillary gear system 12036, which in turn communicates by a second shaft 12038 with the primary gear system 12024.

FIG. 120C is a schematic depiction of portions of a large, primarily propulsive nuclear-power system housed within a large maritime vessel 12003 (stern section only depicted) according to illustrative embodiments. The power system of FIG. 120C is similar in some respects to those of FIGS. 120A and 120B, except that no conventional engine contributes to the primary propulsion of the vessel 12003. Instead, battery banks 12040, 12042 communicate with the electrical control system 12018 via cabling 12044, 12046. The battery banks 12040, 12042 are charged by the electrical control system 12018 while the nuclear reactors 12002, 12004 are operating: when the reactors 12002, 12004 must be turned off (e.g., as required in some coastal zones), the batteries 12040, 12042 supply power to the propulsive system. The power system of FIG. 120C includes additional components such as conventional motors, which support cold start, maneuvering, and the like. The primary propulsive arrangements of vessel 12003, for example, can be non-electrical.

FIG. 121 is a schematic depiction of portions of a large, primarily propulsive hybrid-nuclear power system housed within a large maritime vessel 12100 (stern section only depicted) according to illustrative embodiments. The power system of the ship 12100 includes a modular nuclear reactor 12102, which produces primary energy in the form of heat, which it exchanges through a pipe loops 12104 with a power conversion units 12106 that produces mechanical power, that is, drives a rotating shaft 12108. The shaft 12108 interfaces with a primary reduction gear system 12110 that in turn drives the propeller shaft 12112. A conventional engine 12114 drives a shaft 12116 that interfaces with an ancillary reduction gear system 12118, and the ancillary gear system 12118 communicates by a second shaft 12120 with the primary gear system 12110. The power system of FIG. 121 includes additional components including batteries and electric motors, which support cold start, maneuvering, and the like, but the primary propulsive arrangements of vessel 12100 are non-electrical.

FIG. 120A, FIG. 120B, and FIG. 121 illustrate that power systems including diverse combinations of conventional motors and engines of various types, numbers, and sizes; and of nuclear reactors of various types, numbers, and sizes; and of various forms of energy (heat, mechanical work, and electricity), are contemplated and within the scope of the present disclosure. It will be appreciated in light of the disclosure that any number of such combinations and variations might be described; only a few are illustrated, but all are contemplated. All embodiments, however, include at least one small, modular source of nuclear power that contributes power at least some of the time to propulsion. There is no restriction to displacement vessels or modes of operation; other vessels types and modes of operation, including submarine, surface (e.g., planing), and hydrofoil vessels or air-lubricated vessels or other modes of operation are also contemplated. Also, there is no restriction to the number and type of propellers for propulsion: paddle wheels, water jets, and other methods of applying power to propel vessels are also contemplated.

Hybrid-nuclear propulsion or entirely nuclear-powered primary (cruising) propulsion enables advantageous operational and structural changes for large maritime vessels in various embodiments. In the illustrative case of entirely nuclear-powered primary propulsion, constraints on ship speed that pertain to pollutive emissions, which in the prior art leads frequently to the use of slower steaming speeds than vessels are capable of, are completely obviated. In the illustrative case of hybrid-nuclear powered primary propulsion, constraints pertaining to pollutive emissions are relaxed, though not necessarily completely obviated. Where nuclear energy is less costly per kWh than conventional fuel energy, faster steaming will also tend to be economical compared to propulsion by conventional fuel alone. In general, therefore, vessels propelled in part or whole by nuclear power will be capable of profitably and legally steaming at significantly faster speeds than conventionally powered vessels. Practical limits on vessel speed will still, however, be imposed by the power-law nature of wave resistance.

FIG. 122 is a schematic depiction, in side view and partial top-down view, of portions of a nuclear-powered container ship 12200 according to an illustrative embodiment. The ship 12200 is comparable in cargo capacity to the container ship 11700 of FIG. 117, but includes a nuclear power system that includes a reactor 12202, power conversion system 12204, electric motor 12206, and propeller 12208. The ship 12200, as well as the ship 12300 of FIG. 123, exemplifies changes in vessel architecture that enable faster cruising speed in various embodiments of the present disclosure, which remove or loosen constraints arising from pollutive emissions and/or fuel costs. A nuclear power system enables the container ship 12200 to cruise profitably and legally (e.g., without violation of EEDI regulations) at higher speed than ship 11700 of FIG. 117; i.e., the conventional ship 11700 cruises optimally at velocity $V_1$, while the nuclear-powered ship 12200 cruises optimally at a velocity $V_3$, where $V_3>V_1$. Higher cruising speed, together with the increased need to minimize wave resistance, entails two major architectural changes from ship 11700 to ship 12200

(1) Length. According to the relationship $$F = \frac{v}{\sqrt{gL}},$$

the Froude number F can be kept constant (or its growth mitigated) for faster velocity v by increasing length L. Thus, to moderate the Froude number of ship 12200 at increased speed $V_3$, the length $L_3$ of ship 12200 is greater than the length $L_1$ of ship 11700 of FIG. 117.

2) Bow. The actual wave resistance encountered by a vessel is not determined by the Froude number alone, but by viscous and wave resistances that depend on ship characteristics. Also, vessel length L cannot in practice be arbitrarily increased, because canals and ports impose hard limits on vessel length: e.g., a ship meeting the New Panema standard, and so able to pass through the Panama Canal, is restricted to a maximum length of 366 m (1,201 ft). Therefore, design changes alternative or additional to increased length may be needed to enable economical faster sailing. The ship 12200 combines increased length $L_3$ with a sharp, inverted bow 12210 (in this example, similar to an Ulstein X-Bow), which at speed $V_3$ reduces wave resistance more than would the bulbous bow of vessel 11700 of FIG. 117. In various other embodiments, other bow designs appropriate for higher speed are incorporated, e.g., a bow. The ship 12200 may be new built or may be retrofitted from a with nuclear power and a sharp bow. The ship 12200, and various other embodiments, can also include friction-reducing hull coatings, air lubrication systems, and other measure to reduce viscous friction.

In embodiments, the nuclear propulsion systems described herein utilizing heat pipe microreactors can be shown to provide a simple design; modularity; long refueling intervals; autonomous operations; scalability in small net power output increments; gravity-independent orientation; and inherent safety whereby the possibility of meltdown is entirely eliminated. It can be shown that heat pipe microreactors can be the most viable nuclear reactor for safe vessel propulsion. Furthermore, the physical size and weight of heat pipe microreactors and simplistic fuel handling procedures, can permit enterprises to replace conventional propulsion system with nuclear-powered engines, without the need to redesign vessels' outer hulls. In many instances, the entire speed range of various enterprises could be accomplished by integrating multiple heat pipe microreactors with power delivered via a long-term Power Purchase Agreement (PPA)-type model over the vessel lifetime from a nuclear owner/operator. In doing so, the enterprise can be shown to limit exposure to liability for the handling of nuclear assets and potentially shield the enterprise from fuel price volatility. In turn, such an offering permits for predictable, favorable, long-term business planning.

In PPA-type arrangement examples, a nuclear owner/operator may provide full nuclear oversight for the reactor integration, operation, refueling and decommissioning, standardization and simplification of reactor integration/retrieval practices, as well as logistical handling.

In embodiments, the methods and systems of the present disclosure can include a microreactor Cassette (MRC) containment envelope which would be structurally separated inside the vessel engine room to contain the nuclear reactors and power conversion equipment, while the reactors are in operation. In these examples, the MRC is designed and manufactured to nuclear-qualified codes and standards, and can be shown to: 1) provide adequate shielding for the vessel, crew, internal equipment, materials, cargo and the environment (air and water), from exposure to radioactive materials; 2) provide adequate cooling for maximal nuclear safety, and additional safeguards against thermal pollution to the environment (air and water), including protecting the crew, internal equipment, materials, and cargo from exposure to high levels of thermal emissions; and 3) provide a secure and well-contained enclosure for the reactor, to protect the nuclear asset in the event of collision, sinking, hostile penetration or piracy. Furthermore, the MRC would, in embodiments, provide a uniformed electric interface to other infrastructure within the vessel; allow for weight-balanced/symmetrical integration of the reactors along the centerline of the vessel; simplify logistics, including reactor integration, as well as reactor retrieval for refueling; and also reduce the amount of required physical inter-faces between the nuclear reactor and the vessel. In embodiments, the MRC would remain as a sealed "black box" at all times, and be accessible only by the trained nuclear operator on board, to reduce interactions between the crew and the nuclear reactor, and limit liabilities for the enterprise. In embodiments, the MRC was purposefully deployed to be customizable to contain any type of heat pipe microreactor, licensed for civil power generation. Using the Westinghouse eVinci brand as the reactor design basis, in examples, it can be shown that integrating heat pipe microreactors into the assets of various enterprises with the MRC is technically and economically feasible. By way of these examples, exemplary vessels can be shown to achieve higher speeds and more round trips per year, eliminating refueling detours; and up to 18 kN, no modifications would be required to the vessel's outer hull. It will also be appreciated in light of the disclosure that integrating an upscaled (on the order of 4 MWe) version of a heat pipe microreactor such as eVinci branded units, would affect economics favorably.

In examples, vessels in the general size of about one thousand feet and 400,000 ton capacity such as the world's largest Very Large Ore Carrier (VLOC), Very Large Crude Carrier (VLCC), or Ultra Large Crude Carrier (ULCC) vessels can include or be retrofit with the propulsion and electrical systems powered by the heat pipe microreactor systems disclosed herein. By way of these examples, current space in such vessels powered by liquified natural gas (LNG) could have applicable tanks removed and the MRC can be integrated into (and later retrieved from and reinserted into) the aft section of the vessel. An economically optimized design can look to ensure where possible that the most cost-competitive systems and components would be selected for use. In such installations, the platform can be deployed to provide one or more of the following and various combinations thereof. In embodiments, the MRC can be contained by internals in the aft of the vessel including floor and top containment bulkheads, reactor support systems, reactor enclosure (providing containment for the MRC), and systems for reactor integration and retrieval. In embodiments, reactor integration/retrieval systems within the MRC, including reactor exit from vessel and transfer of the reactor from vessel to port. In embodiments, the MRC includes reactor integration into the reactor operating bay and radioactive protection towards the centrally located reactor integration/retrieval systems. In embodiments, the MRC includes human access points for MRC internal reactor interface systems connections. In embodiments, the MRC includes applicable shielding requirements, shielding materials, needed dimensions, and required thicknesses for applicable scenarios. In embodiments, the MRC includes further predetermined system for routing of electric power cables, data cables, and routing of airflow, ducting and ventilation. In embodiments, the MRC includes the purposeful arrangement of crew equipment including protective, medical and life-saving equipment, and sanitary areas (as far as what would be required for nuclear propulsion). In embodiments, the MRC includes a routing system for cooling water. In some examples, water cooling, either instead of or in addition to air cooling, can be deployed in support of the MRCs. In embodiments, the MRC systems can deploy reactor transfer and interfacing systems within the vessel. In embodiments, the MRC systems can deploy in-vessel engine room human service access points, and in-vessel human radiation protection systems. In embodiments, the MRC systems can deploy hybrid propulsion system components and the MRC systems can deploy systems to balance electrical load and thermal load with air and/or water cooling. In these examples, conventionally-installed power generating capacity, i.e., diesel generators (or other power sources, if applicable) required onboard, can be integrated with the MRC platform and into the general engine room arrangements where the MRC is the containment envelope for a single or multiple heat pipe microreactors and the reactor power conversion equipment. Multiple MRCs could be bundled to generate electrical power up to 100 MWe. Once the MRC is integrated, the reactors can generate baseload power, while low power output diesel generators or gas turbines can serve as back-up power. As such, these vessels can be manufactured and outfitted with the MRC and needed nuclear components and equipment in a shipyard, and once commissioned, can be propelled by up to 100% nuclear power, sailing both in international waters, as well as in sovereign jurisdictions.

In many embodiments, the compact size, and black box, self-contained nature of the MRC makes feasible the integration of the nuclear engine into many vessels, as well as reactor operation and logistical handling. In these examples, power range is up to 100 MWe but various applications can be fine-tuned for certain enterprise needs such as power range around 30 MWe. In these examples, the physical size and weight of the MRC with nuclear components enclosed can be shown to be comparable to those of the conventional propulsion machinery at equivalent net power output ranges find current vessels. As such, integration of the MRC can be shown to only require minimal modifications to the stern section and only within the engine room, while continuing to avoid any need to modify the outer hull. In doing, the MRC allows many enterprises to easily convert their vessels to a carbon-free, steady baseload nuclear propulsion system without undergoing a new vessel design effort.

FIG. 123 is a schematic depiction, in side view and partial top-down view, of portions of a nuclear-powered bulk carrier ship 12300 according to an illustrative embodiment. The ship 12300 is comparable in cargo capacity to the bulk carrier ship 11800 of FIG. 118, but includes a nuclear power system that includes a reactor 12302, power conversion system 12304, electric motor 12306, and propeller 12308. The ship 12300 exemplifies changes in vessel architecture that enable faster cruising speed in various embodiments of the present disclosure, which remove or loosen constraints arising from pollutive emissions and/or fuel costs. A nuclear power system enables the bulk carrier 12300 to cruise profitably and legally at higher speed than ship 11800 of FIG. 118; i.e., the conventional bulk carrier ship 11800 cruises optimally at velocity $V_2$, while the nuclear-powered ship 12300 cruises optimally at a velocity $V_4$, where $V_4 > V_2$. As in the case of container ship 12200 of FIG. 122, higher cruising speed, together with the increased need to minimize wave resistance, entails two major architectural changes from ship 11800 to ship 12300

(1) Length. To moderate the Froude number of ship 12300 at increased speed $V_4$, the length $L_4$ of ship 12300 is greater than the length $L_2$ of ship 11800 of FIG. 118.

(2) Bow. The ship 12300 combines increased length $L_4$ with a bulbous bow 12310, which at speed $V_4$ reduces wave resistance more than would the rounded bow of the ship 11800 of FIG. 118. In various other embodiments, other bow designs appropriate for higher speed are incorporated, e.g., a bow. The ship 12300 may be new built or may be retrofitted from a with nuclear power and a bulbous bow. The ship 12300, and various other embodiments, can also include friction-reducing hull coatings, air lubrication systems, and other measure to reduce viscous friction.

FIG. 124A is a schematic depiction, in partial top-down view and partial side view, of portions of a nuclear-powered ship 12400 according to an illustrative embodiment. It is desirable that the nuclear reactor (or more than one reactor) aboard a nuclear-powered or hybrid-nuclear powered ship be recoverable from the ship after it has sunk. In general, whether a sunken vessel can be raised in one piece depends on whether the vessel is structurally intact, its disposition (upright, overturned, etc.), whether it was heavily laden when it sank (e.g., with a bulk cargo such as coal), and the depth of water where it sank, among other factors: it is thus not always feasible to raise a ship in its entirety. It is therefore desirable that provisions be made for raising a portion of the vessel that contains its nuclear reactor or reactors. The vessel 12400 includes with illustrative provisions for separating and raising a portion 12402 (herein termed "the breakaway") of the vessel 12400, where the breakaway 12402 contains the one or more nuclear reactors aboard the vessel 12400. In particular, the vessel 12400 includes a designed breakage plane or tear plane 12404 which enables the vessel 12400 to break into two sections when subjected to certain shear and/or torque forces greater than those which the vessel 12400 would normally be designed to withstand: that is, the breakage plane 12404 does not make the vessel 12400 structurally weaker than it would be if conventionally designed. In this illustrative case, the breakage plane 12404 is just aft of the house or superstructure 12410 and includes a set of tear points, e.g., tear point 12406, that normally transmit force loads between the breakaway 12402 and the remainder 12408 of the vessel 12400. Moreover, the breakaway 12402 includes a number of recessed hoist rings, e.g., hoist rings 12412, 12414, that are disposed upon the hull of the breakaway 12402 in such a way that at least one hoist ring is exposed regardless of the orientation of the vessel 12400 (e.g., upright, on its side) when lying on a surface. The hoist rings are of sufficient strength, and integrated sufficiently with the structure of the breakaway 12402, that the breakaway 12402 can be separated from the remainder 12408 by applying sufficient force to at least one hoist ring. Other separation techniques may include use of demolition agents (explosive and or non-explosive) activated at breakaway points. In an example, this demolition agent (or the like) may be present on board the vessel at all times, and in the rare event of vessel sinking, agent is activated so the stern is forced to 'break way'. Once broken away, the stern may remain afloat if sufficiently buoyant. However, if the stern doesn't remain afloat, recovering it from the seabed can be simplified due to it being separated from the main hull. Recovery could be performed by cranes disposed above the stern. In embodiments, maintaining buoyancy may be achieved by automatically inflated air-bags. In embodiments, recovery may be aided by air bags attached to the sunken stern or lifting mechanisms attached thereto. An alternative approach for breakaway and recovery may include a non-explosive demolition agent distributed to the sunken hull and filled into the bulk head release points via a non-explosive agent injection port that when permitted to linger, would cause the breakaway points to separate, allowing the stern to be separated from the hull. The entire operation of non-explosive agent distribution and stern recovery could be performed by a lifting mechanism adapted with an agent delivery system. While a few exemplary breakaway examples are described, these are not meant to be limiting. In embodiments, other separation techniques may be applied including, without limitation critical heat flux (CHF) metal separation actions and the like.

FIG. 124B is a schematic depiction of a state of the vessel 12400 during an illustrative recovery operation. The vessel 12400 has sunk and is resting on the sea floor 12416. In this example, the vessel 12400 is loaded with cargo and too heavy to lift as a unit. Lifting cables 12418, 12420 have been secured (e.g., robotically) to two hoist rings 12414, 12422. Sufficient lifting force has been applied to the cables 12418, 12420 to cause the tear points and other structural attachments (e.g., external hull) on the breakage plane 12404 to break, separating the breakaway 12402 from the remainder 12408 and enabling the breakaway 12402 to be lifted. The nuclear reactor or reactors in the breakaway 12402 are thus recovered.

FIG. 125A is a schematic depiction in side view of portions of a nuclear-powered ship 12500 according to an illustrative embodiment, exemplifying an alternative arrangement for recovering nuclear reactors from a submerged vessel without recovering the vessel as a unit. The vessel 12400 is includes eight microreactors (e.g., microreactor 12502) housed within a structure, herein termed "the plug" 12504, which includes a portion of the external hull and can be separated from the vessel 12500. The plug 12504 has innate positive buoyancy. It is housed within a chamber or structure herein termed "the jack" (12506). The plug 12504 and jack 12506 are structurally connected by a number of tear points (e.g., tear point 12508). Also, the plug 12504 includes at least one external hoist ring 12510. The reactors housed within the plug 12504 are connected via fluid heat-transfer loops with a power unit or set of power units 12512, which delivers electrical power to an electrical control system 12514, which powers an electrical motor 12516, which turns a propeller shaft 12518 through a gear system 12520. Heat-transfer loops, electrical cables, and other structures that bridge the gap between the plug 12504 and jack 12506 are designed, as are the break points that structurally couple the plug 12504 and jack 12506, to break or tear when subjected to sufficient shear, such shear being by design significantly greater than any that can be experienced during non-catastrophic operation of the vessel 12500.

FIG. 125B is a schematic depiction of a state of the vessel 12500 during an illustrative recovery operation. The vessel 12500 has sunk and is resting on the sea floor 12522. Sufficient force has been applied to the hoist ring 12510 to separate the plug 12504 from the jack 12506, enabling the plug 12504 to exit the jack 12506 and begin to rise to the surface, either by to its own buoyancy or as lifted by cable. The nuclear reactor or reactors in the plug 12504 are thus recovered. In various other illustrative embodiments, the plug 12504 is not necessarily extracted by applying force to the hoist ring 12510; rather, a mechanism included with the vessel 12500 (e.g., compressed gas, generated gas, springs) ejects the plug 12504 automatically when the vessel 12500 sinks below a predetermined depth. In the latter example, upon separation from the vessel 12500, the plug 12504 ascends buoyantly to the surface, deploys navigational safety markers, and wirelessly signals its location.

It will be appreciated in light of the disclosure that many other methods and systems can be devised for separating a portion of a sunken or distressed ship that contains nuclear reactors, enabling recovery of the reactors whether the ship as a whole is recoverable or not. These include methods which enable the extraction of reactors individually from a ship, rather than as part of a breakaway or plug. All such methods and systems are contemplated and within the scope of the present disclosure.

It will be appreciated in light of the disclosure from the illustrative systems of the Figures that a diversity of energy-intensive industrial, computational, and other enterprises may be advantageously co-located, either by flotation or founded upon the seabed on staged pilings or using other techniques, with underwater generating facilities according to various embodiments. All such embodiments are contemplated and within the scope of the present disclosure.

A. Remotely Located Power System

In embodiments, a nuclear-powered vessel may be configured with an electric motor that may provide primary propulsion power for the vessel. The electric motor may be powered from a microreactor, such as an HPM and the like that may integrate a reactor and power conversion to produce electricity. A source of electrical power in the vessel may be located proximal to the electric motor or may be located elsewhere and connected through a conventional high power electrical cable. This may enable location of the electrical power generation for the vessel (e.g., a microreactor) remote from the electric motor. Without a requirement that the electricity generating system be collocated with the electric motor, location of, for example, a microreactor may be determined by other factors, such as accessibility for installation, service, or replacement, allocation of portions of a cargo hold for large cargo items, ballasting requirements for an upcoming shipping route, anticipated location of a port-based structure for accessing the microreactor, general safety and other factors.

FIG. 126 depicts embodiments of a microreactor powered vessel with variable positioning of one or more micro reactors and/or microreactor cassettes (MRCs) as determined by the one or more vessel-impacting factors for reactor placement described herein. A base configuration for the vessel 12600 in FIG. 126 may include an engine room 12602 containing an electric motor 12606 for driving a propulsion shaft/propeller and a backup motor 12606, such as an ammonia gas turbine and the like. The engine room 12602 may include one or more electrical hook-ups 12610 to which the motor 12606 may be connected for receiving electrical power. The extent of the engine room 12602 may be based on propulsion engine equipment size and service accessibility needs rather than on electrical generation equipment size and the like. This may result in a smaller engine room 12602 than conventionally required.

Engine room electrical hookup 12610 may be connected to an electrical power supply line 12604 that extends from the engine room 12602 to an on-vessel electrical power generating system, such as a microreactor and the like. In embodiments, a microreactor or a plurality of microreactors disposed in a microreactor cassette 12612 may comprise the electrical power generation system for the vessel. Location of this cassette 12612 may be based on a range of factors, described herein, that may determine positioning the power generation system proximally 12608 to the engine room 12602 (e.g., the cargo compartments are reserved for use during transport, such as on an out-bound leg of a vessel route). The power system may be positioned in a compartment that facilitates more efficient access to the microreactor for off-vessel movement. The power system may be moved, such as through the use of cargo lifting cranes and the like from the first position 12608 to a second position 12608' for satisfying a second leg of a route and the like. The power system may also be disposed in an alternate portion 12608" of the vessel, e.g., for a substantially empty return route to ensure proper ballasting and weight distribution for unloaded and/or lightly loaded vessels. The electrical conduit 12604 may be constructed to facilitate safe, efficient connection between the microreactor cassette 12612 and the engine room 12602, for a range of installation locations on the vessel. Further, because the nuclear-based power generation systems described herein may utilize low enriched uranium (e.g., HALEU and the like) anti-contamination measures may be separated from the vessel and assumed by the nuclear reactor enclosure, such as an MRC and the like described herein. Use of non-military enriched uranium with the microreactors and other nuclear power generation systems described herein may further simplify vessel power generation system positioning due to the reduced nuclear contamination risks associated therewith.

In addition to positioning an entire electrical energy generating system variably in a vessel, when multiple systems are in use, one or more of the systems can be disposed distal from another. This may be beneficial for weight distribution and the like. In an example, a vessel that is powered by three microreactors may be configured for a portion of a route with the first of the three reactors disposed at location 12608, a second may be disposed at location 12608' and a third may be disposed at location 12608"; thereby distributing the weight of the three reactors across a plurality of portions of the vessel.

In embodiments, vessels may be configured without a backup source of power generation (e.g., a single microreactor, or a cassette with multiple inter-operated reactors without a viable backup or without an alternate power generation source, such as turbine and the like). When such a vessel encounters power plant trouble or other conditions that necessitate shutting down the reactor, the vessel conventionally would need to be tugged to a safe harbor. However, rather than sending one or more manually operated tugs to retrieve the power-less vessel, a self-powered, self-propelled, autonomous (and/or human operation assisted) nuclear power generation vessel may be dispatched to the disabled vessel. Such an autonomous nuclear power generation vessel may engage with the disabled vessel to provide electricity for powering the vessel, including the propulsion system and the like. One or more such autonomous nuclear power generation vessels may be positioned at points along various routes or disposed at seaports and respond to calls for assistance from vessels with disabled nuclear power systems. The autonomous nuclear power generation vessel may alternatively be configured without a propulsion system. In such a scenario, the power generation vessel (e.g., effectively a nuclear power plant barge) may be towed to the disabled vessel and engaged therewith for providing power to the disabled vessel that may tow the barge using the power provided by the barge to energize the propulsion system of the otherwise disabled vessel.

VII. Ammonia Production

FIG. 127A is a schematic depiction of portions of microreactor-powered pathway or system for synthesis of ammonia as a maritime energy carrier according to illustrative embodiments. The pathway includes two main phases, fuel production and fuel distribution. Fuel production begins with the generation by a microreactor 12700 of heat (e.g., 2 MWth at 750° C.). This heat is partly converted to electricity 12704 by a power conversion system 12706 (e.g., a steam turbine and generator) and is partly utilized as process heat for a Haber-Bosch process 12708 that combines $H_2$ and atmospheric $N_2$ to produce ammonia ($NH_3$). The $H_2$ for the Haber-Bosch process is produced by an electrolysis system 12710 which cracks water to produce $H_2$ and $O_2$. Ammonia from the Haber-Bosch process step is stored (e.g., as anhydrous ammonia at −33° C., 1 atm) in a refrigerated, pressurized tanking facility 12712. Electricity from the power conversion system 12706 is used to power refrigeration for ammonia storage. Fuel distribution begins with transfer or transportation 12714 of $NH_3$ from its original storage facility 12712. Transportation may be by pipeline, tanker truck, tanker vessel, or any other standard method for transporting liquid in bulk. The $NH_3$ is delivered to a bunkering facility 12716, e.g., at a major port. Additionally or alternatively, the original storage facility 12712 can itself be a bunkering facility. From the bunkering facility 12716, ammonia is transferred to the fuel tanks 12718 of one or more maritime vessels, e.g., container ships or bulk carriers, there to serve either as a primary or complementary source of low-carbon energy.

A single microreactor 12700 is depicted in FIG. 127A, but it will be appreciated in light of the disclosure that any number of microreactors greater than one are also contemplated. Indeed, an advantage of various embodiments is that microreactors innately permit the modular or incremental addition (or subtraction) of power in relatively small units, e.g., several megawatts, to scale power supply with overall installation capacity, whether the latter is fixed or changing over time. Additionally, microreactors may be configured for civil deployment and therefore may operate with low enrichment uranium, such as HALEU-type fuels with enrichments below 20%.

FIG. 127B is a schematic depiction of portions of another microreactor-powered pathway or system for synthesis of ammonia as a maritime energy carrier according to illustrative embodiments. The system of FIG. 127B is similar to that of FIG. 127A, only $H_2$ is not produced by an electrolysis system but by a thermochemical cycle powered by heat directly from the microreactor 12700. Many different thermochemical cycles are capable of producing $H_2$ such as the US Department of Energy states ("Nuclear Hydrogen R&D Plan," DOE, March 2004) that thermochemical cycles produce hydrogen through a series of chemical reactions where the net result is the production of hydrogen and oxygen from water at much lower temperatures than direct thermal decomposition. Energy is supplied as heat in the temperature range necessary to drive the endothermic reactions, generally 750 to 1,000 degrees or higher. All process chemicals in the system are fully recycled. The advantages of thermochemical cycles are generally considered to be high projected efficiencies, on the order of 50% or more (compared to ~25% for electrolysis), and attractive scaling characteristics for large-scale applications. Doubling the energetic efficiency of hydrogen manufacture using process heat from a nuclear power source decreases complexity and increases cost-effectiveness of the nuclear power source: for a given quantity of fuel energy output, a system such as that of FIG. 127B will require about half as much nuclear power (e.g., a smaller microreactor, or a smaller cluster of microreactors) than the system of FIG. 127A.

The system of FIG. 127B will still consume some electricity, e.g., for pumps, infrastructure, and refrigeration. Electricity may be obtained from a power-conversion system driven by heat from the microreactor 12700, or from a grid, or from one or more microreactors partly or wholly dedicated to generating electricity, or batteries, or alternative or complementary mechanisms (e.g., solar and/or wind power firmed by storage). Engineering economics and factors such as location (e.g., far offshore vs. near a developed port) will in practice dictate the electricity source or sources used for a system such as that of FIG. 127B. There is no restriction to using (or not using) heat from the microreactor 12700 that drives the ammonia synthesis process to generate electricity for use in the system of FIG. 127B or in other embodiments.

It will also be clear that the systems of FIG. 127A and FIG. 127B can be readily adapted for carriage aboard a vessel, e.g., by omitting transportation and bunkering or considering these steps as internal to the vessel. In such illustrative embodiments, produced ammonia may be simply stored on board for delivery to a customer (e.g., another vessel, or a bunkering facility, or a land-based power plant). Additionally or alternatively, ammonia produced on board a vessel can be used by the vessel as a primary or supplementary fuel. In embodiments, the methods and systems described herein for producing and/or controlling production of ammonia may be used to produce and control the production of hydrogen, optionally as part of the ammonia production process. Hydrogen ($H_2$) forms a base for ammonia, and itself represents a valuable natural resource for energy generation. Therefore, the methods and systems for ammonia generation, use, distribution, storage, and the like could further include hydrogen as a supplemental produced good.

FIG. 128 is a schematic depiction, according to an illustrative example of the prior art, for the use of $NH_3$ as a propulsive fuel for a vessel. $NH_3$ can be stored in a tank 12800 (in an example, the storage facility 12712 of FIG. 127A). $NH_3$ is fed to a solid oxide fuel cell (SOFC) 12802 and to a cracker 12804. The SOFC produces electrical energy directly from the $NH_3$ as well as $H_2O$ and Na as harmless exhaust products. The waste heat output of the SOFC is directed to the cracker 12804, which uses it to produce $H_2$ and $N_2$ (the latter as an exhaust product). The $H_2$ from the cracker is fed to a proton exchange membrane fuel cell (PEMFC) 12806, which produces electrical energy and $H_2O$ (the latter as an exhaust product). Electrical energy from the SOFC and PEMFC is directed to a switchboard or electrical control system 12808, from whence it is conducted via busbar 12810 to an electric motor 12812 that produces rotary mechanical energy to drive a shaft and propeller. Electricity from the PEMFC and/or SOFC can be used to supply various needs of the system and vessel infrastructure including pumps, refrigeration, lighting, and the like. Typically, batteries will be charged from the switchboard 12808 to supply power for cold start of the SOFC 12802, cracker 12804, and SOFC 12806.

It will be appreciated in light of the disclosure that many other systems and methods for using $NH_3$ as a maritime fuel are possible according to the prior art, including burning $NH_3$ in an internal combustion engine. Various embodiments of the present disclosure include the system of FIG. 128, or a version thereof, while various other embodiments include other systems for extracting energy from $NH_3$ for propulsion and other purposes. There is no restriction to the use of any particular method of extracting energy from $NH_3$ or applying that energy to vessel propulsion.

FIG. 129 is a schematic top-down depiction of portions of a system using nuclear power to produce $NH_3$ on board a vessel as a propulsive fuel according to illustrative embodiments. On the stern portion of the vessel is depicted. A microreactor 12900 produces heat that 12902 that is drives a thermochemical reactor 12904 which produces $H_2$ 12906 from $H_2O$. In FIG. 129, the heat-exchange mechanism that transfers heat from the microreactor 12900 to the thermochemical reactor 12904 is signified as an arrow but in practice will typically include a secondary fluid loop, a heat exchanger, pumps, and other components. The $H_2$ 12906 is supplied to a Haber-Bosch process 12908 along with heat 12902 from the microreactor 12900. Ammonia 12910 from the Haber-Bosch process is conveyed to a refrigerated and/or pressurized storage tank (or tanks) 12912. As needed, ammonia 12914 from the tanked supply is conveyed to an internal combustion engine 12916 (e.g., a low-speed two-stroke marine diesel engine) whose shaft 12918 interfaces with a reduction gear system 12920 which in turn turns a propeller shaft 12922 and propeller 12924. An electrical power system, in various embodiments, includes electrical power generated by a second internal combustion engine that burns ammonia and/or another fuel, by one or fuel cells reacting ammonia and/or hydrogen derived from ammonia, by a power-conversion system utilizing heat from the microreactor 12900, or by other systems. All such variations are contemplated. Also, there is no restriction to the use of a thermochemical reactor 12904 for producing $H_2$; other methods, e.g., electrolysis, are also contemplated, in this and other embodiments. Also, various embodiments that omit the onboard nuclear microreactor 12900 and ammonia-manufacturing systems 12906, 12908 are contemplated: the ammonia tanked aboard an ammonia-powered vessel may be manufactured aboard another vessel using power from microreactors, or aboard an offshore platform or in a land-based facility using power from microreactors, as disclosed herein.

FIG. 130 is a schematic top-view depiction of portions of another system using nuclear power to produce $NH_3$ on board a vessel as a propulsive fuel according to illustrative embodiments. A microreactor 13000 produces heat that 13002 that is drives a thermochemical reactor 13004 which produces $H_2$ 13006 from $H_2O$. In FIG. 130, as in FIG. 129, the heat-exchange mechanism that transfers heat from the microreactor 13000 to the thermochemical reactor 13004 is signified, for example, as an arrow. The $H_2$ 13006 is supplied to a Haber-Bosch process 13008 along with heat 13002 from the microreactor 13000. Ammonia 13010 from the Haber-Bosch process is conveyed to a refrigerated and/or pressurized storage tank (or tanks) 13012. As needed, ammonia 13014 from the tanked supply is conveyed to an internal combustion engine 13016 (e.g., a low-speed two-stroke marine diesel engine) whose shaft 13018 interfaces with a reduction gear system 13020 which in turn turns a propeller shaft 13022 and propeller 13024. Electrical power is generated by a power-conversion system 13026 utilizing heat 13002 from the microreactor 13000. Electrical power from the conversion system 13026 is conveyed to an electrical control system 13028. Some power 13030 is conveyed from the electrical control system 13028 to a number of loads, including batteries which can also supply power to the electrical control system 13028. Other power 13032 is conveyed from the electrical control system 13028 to an electric motor 13034, whose shaft 13036 interfaces with a reduction gear system 13038 which in turn interfaces with the primary gear system 13020. Thus, the ship may be maneuvered using electrical power from the conversion system 13026 or from batteries, without using the internal combustion engine 13016. Additionally or alternatively, ammonia from storage 13012 can be reacted in one or more fuel cells, or burned in one or more additional internal-combustion engines, to produce electrical and/or mechanical power to supply electrical loads of the vessel. All such variations are contemplated.

FIG. 131 is a schematic depiction of portions of another system using nuclear power to produce $NH_3$ on board a vessel as a propulsive fuel according to illustrative embodiment. A microreactor 13100 produces heat that 13102 that is drives a thermochemical reactor 13104 which produces $H_2$ 13106 from $H_2O$. In FIG. 131, as in FIG. 129 and FIG. 130, the heat-exchange mechanism that transfers heat from the microreactor 13100 to the thermochemical reactor 13104 is signified, for example, as an arrow. The $H_2$ 13106 is supplied to a Haber-Bosch process 13108 along with heat 13102 from the microreactor 13100. Ammonia 13110 from the Haber-Bosch process is conveyed to a refrigerated and/or pressurized storage tank (or tanks) 13112. As needed, ammonia 13114 from the tanked supply is conveyed to a fuel-cell system 13116 which produces electricity 13118. The fuel-cell system 13116 may contain one or more fuel cells of one or more types: in an example, it resembles the fuel-cell system of FIG. 128. Electrical power is also generated by a power-conversion system 13120 utilizing heat 13102 from the microreactor 13100. Electrical power from the fuel-cell system 13116 and the conversion system 13120 is conveyed to an electrical control system 13122. Some power 13124 is conveyed from the electrical control system 13122 to a number of loads, including batteries which can also supply power to the electrical control system 13122. Other power 13126 is conveyed from the electrical control system 13122 to an electric motor 13128, whose shaft 13130 interfaces with a reduction gear system 13132 which in turn turns a propeller shaft 13134 and propeller 13136.

The use of nuclear microreactors as a source of primary or supplemental energy for vessels using ammonia as an energy carrier, as in the illustrative embodiments FIG. 129, FIG. 130, and FIG. 131 and in various other embodiments, offers several advantages over the prior art. One advantage pertains to the Energy Efficiency Design Index (EEDI) for new ships, a legally binding climate-change standard of the IMO that promotes the use of more energy-efficient (less polluting) equipment and engines. The EEDI standard was mandated by the adoption of amendments to MARPOL Anne VI (resolution MEPC.12803x(62)) in 2011. EEDI specifies maximum $CO_2$ emissions per capacity mile (e.g., per ton-mile), varying with ship type and size. Since Jan. 1, 2013, following an initial two-year phase zero, some new ships—including all large commercial vessels propelled by fuel oil—have to meet the EEDI threshold for their type. The threshold is decreased is incrementally every five years.

EEDI can be expressed or approximated by a number of formulae that vary in complexity, but in essence specifies an upper limit on grams of $CO_2$ emitted per tonne-mile. For example, a fuel-burning ship's EEDI can be reduced (within limits) by slowing the ship, reducing emissions per tonne mile. In another example, a ship's EEDI at a given speed can be reduced (e.g., compared to what its EEDI would be using 100% fuel-oil power) by powering the ship partly or wholly with a lower-carbon source, such as wind, natural gas, or nuclear power.

Herein, a vessel is said to have a hybrid-nuclear power system if the ship derives part of its power from a conventional source (e.g., diesel fuel) and part from a nuclear source, for example using a nuclear-ammonia system such as that depicted in FIG. 129, FIG. 130, or FIG. 131 or as included with various other embodiments. If the power PF that a hybrid-nuclear vessel derives from combusting fossil fuel is a fraction λ (0≤λ≤1) of the vessel's total power Ptotal, and the power the vessel derives from nuclear power (through a traditional power-conversion system, via ammonia as an energy carrier, or both) is PN, then $P_{total}=\lambda P_F+(1-\lambda)P_N$. In general, a vessel's EEDI for a given Ptotal (e.g., at a given speed) is directly proportional to PF. Therefore, assuming comparable lading and other relevant conditions, a ship with a hybrid-nuclear power system will have a lower EEDI at any given speed then the same vessel powered entirely by combusting a fuel. A ship powered entirely by nuclear power will have an EEDI of zero. Thus, reduced EEDI is a realized by various embodiments of the present disclosure whenever the nuclear portion of a hybrid-nuclear power system is supplying significant fraction of ship's power.

Moreover, wherever power for long-distance steaming is wholly or partly (i.e., except for a fixed quantity of conventionally generated power) derived from the nuclear portion of a hybrid-nuclear power system, vessel speed and pollutive emissions can be independent of each other: That is, if the conventional portion of a ship's power supply is fixed, then up to the ship's maximum viable operating speed, no more $CO_2$ or other pollution is emitted at any one speed than at any other. Emissions-related constraints on speed become irrelevant.

Other advantages arise from the relaxation by various embodiments on vessel refueling constraints. Microreactors are typically designed to run on a fuel load without refueling or other major service for some number of years, e.g., 5 years. At or near the end of this time, the microreactor must be refueled and maintained or replaced. In an illustrative operating procedure, the microreactor 12900 of FIG. 129 supplies power from the time of its installation until 5 years have passed. The vessel including the system then makes a scheduled service stop at a port equipped to extract the microreactor 12900, or rendezvouses at sea with a vessel or platform equipped to do so, and delivers it to a facility or network of facilities where it is either decommissioned or refueled and its partially spent fuel is reprocessed and/or sequestered, e.g., geologically sequestered. Meanwhile, a fresh, newly fueled reactor is installed in the vessel and it is free to operate without further refueling for another 5 years. The architecture of the vessel includes provisions, e.g., a removable upper section, that facilitate access to the portion of the ship containing the microreactor. It is thus an advantage of various embodiments that vessels need no refueling between reactor replacement events.

Other advantages arise from the effect of embodiments on relaxing operational constraints. E.g., in all the illustrative embodiments of FIG. 129, FIG. 130, and FIG. 131, ammonia manufactured and stored on aboard the vessel is not inherently restricted to use aboard the vessel. A vessel including one of these illustrative embodiments, or one of a number of other possible embodiments, may produce more ammonia than it requires for its own use. In an example, the vessel is a tanker or bulk carrier making a return journey after delivering cargo. It is common for such a vessel making such a journey to be ballasted with seawater and to carry no profitable cargo: all costs associated with its return journey and with the effective idleness of the vessel are thus overhead, and to minimize them, such a vessel on such a journey typically steams at higher speed. However, in this class of examples, a tanker or bulk carrier includes a microreactor-powered system for manufacturing ammonia. Moreover, the microreactor-powered system is sized to produce more power than is needed to propel and otherwise serve the needs of the vessel. Thus, on its otherwise profitless return journey, the vessel can manufacture and store a surplus of ammonia. The amount of ammonia produced on such a journey is constrained by available surplus power from the microreactor system, throughput of the ammonia-production system, ammonia consumption aboard ship during the journey, the duration of the journey, and tank space. In embodiments, tankage is sized to allow production of ammonia at a steady maximal rate during the whole voyage. Ammonia thus produced can either be delivered to a bunkering facility at the port of arrival, or transferred to other ships at the port of arrival, or transferred to other ships at sea or to other recipients. Transfer to consumers while at sea would not only allow the production of more ammonia aboard a producer ship than its tankage would otherwise permit, but would allow receiver ships to journey farther without visiting a bunkering facility than would otherwise be feasible. Also, the power capacity of a microreactor-powered ship can be adjusted upward or downward in units of (typically) several megawatts by installing or removing microreactors therefrom. Also, a vessel engaged in producing ammonia on its return journey might, depending on the details of its particular operational economics, be profitably operated at a lower speed than a vessel merely returning for a new cargo, and this may allow energy capacity savings that can be profitably diverted to the further production of ammonia. It will be appreciated in light of the disclosure that these and other opportunities for increased operational efficiency, not only of individual vessels, but of fleets of vessels, are offered by various embodiments.

It will be appreciated in light of the disclosure that a ship including a microreactor-powered system for manufacturing ammonia may be designed and operated primarily as a mobile oceangoing ammonia maker and deliverer, not only fueling itself but rendezvousing with other ships (e.g., along frequented routes) and transferring fuel to them. Ammonia can also be delivered to facilities such as fossil-fuel extraction platforms, offshore mining operations, sea-floor mining operations, and similar remotely located consumers of large amounts of energy. Because microreactors typically run for 5 or more years on a single fuel load, an ammonia-factory vessel could remain at sea for years without detouring to a port except for maintenance, meanwhile obtaining supplies and rotating crew via vessels other facilities with which it rendezvouses and to some of which it transfers fuel.

Moreover, there is no restriction to ordinary mobile vessels. FIGS. 132A and 132B are schematic top-down depictions of portions of an offshore bunkering platform 13200 including a microreactor-powered system for manufacturing ammonia according to an illustrative embodiment. The embodiments of FIG. 132B further include an offshore distribution center 13230 for commodities and other goods. The platform 13200 may be a fixed platform standing on the sea floor, an anchored floating platform, a mobile floating platform that usually maintains a fixed position at sea by active propulsion and can be occasionally towed or self-propelled to a new location, or a littoral installation. The platform 13200 includes a microreactor set 13202 including one or more microreactors that produce heat 13204 that drives a thermochemical reactor set 13206 that produces $H_2$ 13208 from $H_2O$. Along with heat 13204 from the microreactor set 13202, the $H_2$ 13208 is supplied to a Haber-Bosch process 13210. Ammonia 13212 from the Haber-Bosch process is conveyed to refrigerated and/or pressurized storage tankage 13214 for bunkering. Vessels (e.g., vessel 13216) in need of fuel, or tasked to transfer ammonia in bulk from the platform 13200 to some destination, obtain ammonia 13212 from the tanks 13214 via fueling lines 13218. Heat 13204 from the microreactor set 13202 is also directed to an energy conversion system 13220 that produces electricity 13222 which is directed to an electrical control system 13226 and then to various loads aboard the preference, as for example batteries, pumps, lighting, chillers, and the like. The platform 13200 will typically include many systems and structures such as seawater purification gear, crew quarters, emergency gear, propulsion and stabilization systems, telecommunications systems, helicopter reception and refueling facilities, etc.

In another illustrative embodiment, a fossil-fuel extraction platform includes a microreactor-powered ammonia production system similar to that depicted in FIGS. 132A and B. It will be appreciated in light of the disclosure that a microreactor-powered ammonia production system according to various embodiments can be associated with any maritime facility, vessel, platform, or installation. The bunkering platform 13200 may be combined with one or more offshore distribution-type centers 13230, such as for facilitating distribution of goods, commodities, and the like via vessel 13216. Electricity, heat, ammonia and other sources of energy supplied by and/or accessible by the bunkering platform 13200 may be supplied to the distribution center 13230 for operation of distribution and/or goods and commodity storage and handling functions, including without limitation vessel 13016 loading and unloading and the like.

FIG. 133 is a schematic depiction of the use of a platform such as platform 13200 of FIG. 132 to achieve certain operational advantages according to an illustrative embodiment. In this simplified example, vessels normally ply a back-and-forth route (Route A) between two ports 13300, 13302 located on different landmasses 13304, 13306. When in need of fuel, however, ships must visit a bunkering facility 13308 on a third landmass 13310. Ships must therefore detour from route A, taking a route including paths B and C (Route B+C). Such detours are, in fact, made by thousands of vessels according to the present practices of the global shipping industry. However, if an offshore microreactor-powered, ammonia-manufacturing bunkering platform 13312 (e.g., one similar to that of FIG. 132) is stationed along Route A, a vessel 13314 can refuel mid-journey along Route A, obviating a journey along Route B+C. Although in this simple example it would be equally effective to locate the microreactor-powered bunkering platform 13312 at either end of Route A, given the far more complex routing realities of global shipping, it is advantageous that the platform can be located at any point in international waters, e.g., a point serving multiple routes that intersect or approximately intersect at that point, or that minimizes detours for additional routes, or that can be changed to adapt to changing shipping patterns. Moreover, many ports forbid the operation of nuclear reactors in their vicinity, whereas the platform 13312 can be located in international waters. These and other operational advantages arising from the embodiments herein will be clear to a person familiar with the art of transportation management optimization.

Moreover, the energetic production capacity of a platform 13200, or other platforms and vessels according to various embodiments, can be adjusted upward or downward according to need, within limits, by adding or removing modular microreactors. There is therefore no need for significant amounts of capacity to sit idle when demand is low, as there would be, for example, if a unit such as platform 13200 were powered by a single, large nuclear reactor or by some other single, large power source. As is known, conventionally propelled vessels require significant storage (tank) capacity for bunker fuel for conventional engines. In embodiments, a significant amount of space frees up when integrating a nuclear power source from areas where bunker fuel was stored in previous designs. In that, various instrumentation and control systems as well as other equipment may be accommodated in that space. In some examples, alignment of the Conex-II systems does not need to be in immediate proximity to the MRC.

A. Ammonia Generation Based on External Factors

Vessel-based ammonia generation may be influenced by external factors, such as external demand for ammonia from other vessels. In embodiments, a vessel-based ammonia production system may generate and store ammonia for use by another vessel. The generation of ammonia may be controlled by a combination of on-vessel control logic and external, such as centralized or distributed, control logic that assesses and anticipates ammonia demand for vessels, ocean-based platforms, and the like. As an example, a vessel that is constructed and capable of producing and/or storing ammonia (e.g., a microreactor-powered vessel) travelling along a route that brings the vessel proximal to an ocean-based platform or another vessel and the like that uses ammonia as a source of energy may have its ammonia generation system controlled at least in part to generate ammonia for transfer to the proximal platform or vessel. Control of the ammonia production may be based on an anticipated time to transfer (e.g., how many hours/days until the ammonia producing vessel is in position to transfer its generated ammonia), a demand for nuclear-based energy for use by the ammonia producing vessel for operations other than ammonia production, an amount of stored ammonia on the ammonia producing vessel, an overall ammonia storage capacity of the vessel, an anticipated/predicted demand for ammonia by the ammonia producing vessel, and the like. In an example, an ammonia generation and consumption capable vessel may be transporting bulk material to a first destination port. Regulations at the first destination port may require disabling all nuclear reactors onboard the vessel prior to entering the first port. Therefore, the vessel will need to have available sufficient ammonia to power the vessel while in the first port. This ammonia demand for use in association with the first port is estimated and added to a total on-vessel ammonia production plan. The on-vessel ammonia production control system receives a request for ammonia delivery for an ocean-based platform disposed proximal to a route for the vessel from the first port to a second port. The request may be generated by an ammonia production control system that facilitates ammonia production and delivery throughout a set of vessel routes and the like. The amount of ammonia requested is processed along with vessel energy demands (e.g., nuclear and/or ammonia) to determine a portion of the requested ammonia delivery to be provided by the vessel (ammonia delivery commitment amount). When the vessel departs the first port it can resume production of ammonia by activating its nuclear power systems. The vessel energy production and demand management system may work collaboratively with a navigation system and delivery schedule facility to determine when to start generating the ammonia delivery commitment. Because energy diverted to ammonia production cannot be used for other vessel energy demands, such as propulsion, an impact on delivery schedule (e.g., arrival time at the ocean-based platform and arrival at the second port) is calculated and adjustments to energy production are made. As an example, if the time to reaching the ocean-based platform for ammonia delivery is X hours from departing the first port, sufficient nuclear energy may be diverted from use in propulsion to generate the committed ammonia amount in less than X hours. To make up for any slow down along the route from the first port to the ammonia delivery location resulting from diverting nuclear energy from vessel propulsion, the vessel may be operated at a higher speed during the remainder of the route to the second port than would otherwise have been necessary if the ammonia delivery commitment were not required.

Because the ammonia delivery commitment amount may not be sufficient to meet the ammonia delivery request for the ocean-based platform, an additional ammonia producing vessel may be contacted to fulfill the remainder of the request.

In another example of off-vessel consumption of on-vessel produced ammonia, a second vessel travelling to the first port may be unable to divert energy from its nuclear power system for ammonia production. This may happen if the second vessel does not have ammonia generating capabilities; if the second vessel's ammonia generating capabilities are not working; if the second vessel must devote substantially all energy from its nuclear power system for propulsion; and the like. A first vessel may generate ammonia and engage the second vessel prior to it entering the first port to transfer ammonia to the second vessel for use as a power source while operating in the first port.

Exemplary embodiments of a system for facilitating ammonia gas generation for sharing among vessels and other ammonia consumers are depicted in FIG. 134. An ammonia gas generation controller platform 13402 may be constructed to receive inputs from a plurality of data sources 13406 including without limitation vessel master plan(s) for one or more vessels, vessel(s) status and/or schedule, such as vessel and power plant service and the like, nuclear reactor regulations for a plurality of ports, at least a portion of which are accessible by the vessel(s), conditions at a plurality of port(s), e.g., availability of micro reactor services, and the like. The ammonia gas generation controller platform 13402 may communicate with an ammonia demand collection circuit 13404 that may communicate ammonia demand-related information electronically with a plurality of vessels 13410 and a plurality of ocean-based facilities 13408. The ammonia demand collection circuit 13404 may process ammonia demand and/or request data received from the vessels 13410 and/or from the structures 13408, optionally aggregating and adapting the received data based on a set of demand allocation criteria and the like. The optionally processed ammonia demand and/or request data may be forwarded to the controller 13402 where it may be further processed to, for example, produce an ammonia production and delivery plan, portions of which may be communicated to some vessels 13410 and to some structures 13408. As an example, a production plan 13414 for generating ammonia by the vessels to meet the demand may include allocating the demand across production capabilities of some vessels. This portion of the plan may be communicated so that ammonia generation capabilities of the vessels 13410 may integrate the allocated portion of their ammonia production and/or storage capacity to meet the allocated demand. Likewise, a plan 13412 for meeting the demand for ammonia by structures 13412 and/or vessels 13410 may be communicated. Routes for vessels that have been assigned to produce ammonia to meet a portion of the demand may be automatically changed to include collocating the ammonia supply (e.g., stored on a vessel) and the ammonia consumer (e.g., an ocean-based oil rig) for the purposes of transferring ammonia there between. In embodiments, ammonia storage systems may be constructed so that the entire ammonia storage system can be transferred (e.g., by conventional cargo transfer systems) from the generation vessel to an ammonia consuming structure. Optionally, an ammonia transfer vessel, itself not necessarily capable of producing ammonia from nuclear energy, may receive stored ammonia from an ammonia producing vessel for delivery to an off-route destination.

FIG. 135 depicts routes for a vessel and allocation of ammonia storage capacity for the vessel throughout a set of routes between seaports. An ammonia generation-capable microreactor powered vessel may be constructed with ammonia storage facility 13502. A portion 13504 of the storage facility 13502 may be allocated for ammonia gas to be consumed by the vessel when it operates in nuclear exclusion zone 13508. Operation of the vehicle between nuclear exclusion zone 13510 and exclusion zone 13508 may be powered by an on-board microreactor, such as an HPM and the like described herein. In an example, the allocated ammonia portion 13504 may be generated along the route 13506 from the first port in exclusion zone 13510 to a second port in exclusion zone 13508. In the example of FIG. 135, the vessel may receive instructions to produce ammonia gas for delivery to ammonia gas consumer 13520, which may be a stationary structure, vessel, land port and the like, when the vessel is proximal to nuclear exclusion zone 13508. The portion to produce for delivery may be represented by ammonia storage portion 13512. This portion may be determined by an allocation function that identifies a portion to be reserved for operation of the vessel upon return to the first port which is inside nuclear exclusion zone 13510. Substantially the remainder of the ammonia storage facility 13502 may be allocated for delivery. Another factor that comes into play when determining the amount of ammonia storage for delivery to be committed by the vessel is an estimate of nuclear power that can be diverted to generate ammonia once nuclear power is activated after the vessel leaves exclusion zone 13508. Factors to consider also include vessel energy demand required to safely and timely navigate from the second port to the gas consumer 13520 and further on to the first port along route 13518. Yet other factors include an estimate of ammonia required for safe operation within exclusion zone 13510. Additionally, the rate of ammonia generation and the amount of time along route 13516 between when ammonia generation can commence (e.g., after leaving exclusion zone 13508) and arrival at gas consumer 13520 also impacts an amount of ammonia to commit for delivery to consumer 13520. With these factors taken into consideration, a vessel ammonia generation plan is established that dictates a commitment allocation of ammonia portion 13512 and a reserve amount 13514. After delivery of the committed ammonia to gas consumer 13520, the vessel may produce an additional amount of ammonia along the route 13518, such as an additional reserve 13522 beyond the amount reserved 13514 for use while within exclusion zone 13510. However, if ensuring that the vessel arrives at the first port prevents diversion of nuclear power for ammonia production, little or no additional ammonia may be generated.

Besides Ammonia, fuel cells present alternative power generation opportunities onboard the vessel, e.g., in combination with a nuclear propulsion system. In embodiments, electricity or process heat generated by nuclear reactors may be used to generate hydrogen ($H_2$) via electrolysis or thermolysis and stored onboard the vessel. If conditions require additional power and/or require nuclear power sources to be in shutdown mode, electricity may be generated via a single or in parallel running fuel cells, e.g., Proton-Exchange Membrane Fuel Cells (PEMFC). It will be appreciated in light of the disclosure that the storage of $H_2$ in large amounts on board a vessel may require highly specialized $H_2$ storage tanks given the well-known difficulties of containing $H_2$ which in turn may lead to unfavorable economics.

To avoid the potential economic downside of the PEMFC, in some examples, Direct Borohydride Fuel Cells (DBFC) can be used and run on sodium borohydride (NaBH4), an inorganic solid compound. In the presence of a metal catalyst, sodium borohydride releases hydrogen. Sodium borohydride (NaBH4) hydrolysis can be shown to be an efficient way to store $H_2$ because of its low toxicity, controllable hydrogen generation process, and high hydrogen capacity. In embodiments, the hydrogen can be generated in a fuel cell system by catalytic decomposition of the aqueous borohydride solution.

$$NaBH_4+2H_2O \rightarrow NaBO_2+4H_2(\Delta H<0)$$

If favorable and alternatively of using $H_2$ in fuel cells, hydrogen gas turbines may, in embodiments, be used to generate electricity. In embodiments, there are several ways to successfully regenerate $NaBH_4$ from sodium metaborate ($NaBO_2$). Depending on the amount of reactor access heat/thermal energy available onboard the vessel as well as depending on process efficiency, sodium borohydride may be regenerated, for example, by annealing magnesium hydrate ($MgH_2$) together with the dehydrated byproduct sodium metaborate ($NaBO_2$) at ~550° C. Sodium borohydride may also be regenerated, for example, by sourcing hydrogen from the hydrolysis byproduct by ball milling $Mg_2Si$ (reducing agent) and $NaBO_2 \cdot 4H_2O$ mixtures at room temperature (within an inert gas environment, e.g., Argon) whereby the renewable hydrogen in the coordinated water in $NaBO_2 \cdot 4H_2O$ acts as the sole hydrogen source and transforms to hydrogen—in NaBH during the ball milling.

VIII. Defense of Nuclear Systems

FIGS. 136-174 illustrate some embodiments of methods, systems, components, and the like for responding to multifaceted threats to a marine PNP unit.

FIG. 136 is a relational block diagram depicting illustrative constituent systems of a prefabricated nuclear plant (PNP), also herein termed a Unit, and illustrative associated systems that interact with the Unit and each other. A Unit Deployment 13600 includes a Unit Configuration 13602 and the associated systems with which the Unit Configuration directly interacts via material and non-material mechanisms. In the illustrative Unit Deployment 13600 of FIG. 136, the associated systems with which the Unit Deployment 13600 interacts are Operation 13604, Deployment 13606, Consumers 13608, and Environment 13610. Overlap of the boundaries of associated systems 13604, 13606, 13608, 13610 with the Unit Configuration is shown to indicate that the Configuration 13602 and its associated systems 13604, 13606, 13608, 13610 overlap in practice, and cannot be meaningfully considered in isolation from one another. The Unit Configuration 13602 includes Unit Integral Plant 13612, the primary constituent physical systems of the PNP; the Unit Integral Plant 13612 is a supports the operation of the PNP unit regardless of the particulars of the Unit Deployment 13600. The Unit Configuration 13602 incorporates the Unit Integral Plant into a form factor suitable for a given Unit Deployment 13600 scenario. In embodiments, the Unit Integral Plant 13612 is designed, built, assembled, and maintained as a structure of discrete physical modules, where the sense of "module" shall be clarified with reference to Figures herein. The Unit Integral Plant in turn includes nuclear power plant systems 13614, which produce energy from nuclear fuel and manage nuclear materials such as fuel and waste; power conversion plant systems 13616, by which energy from the nuclear power plant systems 13614 is, typically, converted to electricity; auxiliary plant systems 13618, which support the operation of the individual PNP unit; and marine systems 13620, which enable the PNP to subsist and function in a marine environment.

The associated systems 13604, 13606, 13608, 13610 interact with the Unit Configuration via Interface Systems 13622, 13624, 13626, 13628. In embodiments, the terms "interface," "interface system," and "interfacing system" may be understood to encompass, except where context indicates otherwise, one or more systems, services, components, processes, or the like that facilitate interaction or interconnection of systems within a PNP or between one or more systems of the PNP with a system that is external to the PNP, or between the PNP and associated systems, or between systems associated with a PNP. Interface Systems may include software interfaces (including user interfaces for humans and machine interfaces, such as application programming interfaces (APIs), data interfaces, network interfaces (including ports, gateways, connectors, bridges, switches, routers, access points, and the like), communications interfaces, fluid interfaces (such as valves, pipes, conduits, hoses and the like), thermal interfaces (such as for enabling movement of heat by radiation, convection or the like), electrical interfaces (such as wires, switches, plugs, connectors and many others), structural interfaces (such as connectors, fasteners, inter-locks, and many others), or legal and fiscal interfaces (contracts, loans, deeds, and many others). Thus, Interface Systems may include both material and non-material systems and methods. For example, the Interface System 13622 for interfacing the Unit Configuration 13602 with Operation 13604 will include legal arrangements (e.g., deeds, contracts); the Interface system 13628 for interfacing the Unit Configuration 13602 with the Environment 13610 will include material arrangements (e.g., tethers, tenders, sensor and warning systems, buoyancy systems).

The Operation system 13604 includes Operators 13630 and Interface Systems 13622; the Deployment system 13606 includes Implementers 13632 (e.g., builders, defenders, maintainers) and Interface Systems 13624; the Consumers system includes Consumers 13634 and Interface Systems 13626; and the Environment system includes the natural Physical Environment 13636 and Interface Systems 13628. The physical environment for a PNP may be characterized by various relevant aspects, including topography (such as of the ocean floor or a coastline), seafloor depth, wave height (typical and extraordinary), tides, atmospheric conditions, climate, weather (typical and extraordinary), geology (including seismic and thermal activity and seafloor characteristics), marine conditions (such as marine life, water temperatures, salinity and the like), and many other characteristics. Associated systems may also be included with a unit deployment; stakeholders informing the design, manufacture, and operation of a PNP unit may include power consumers, owners, financiers, insurers, regulators, operators, manufacturers, maintainers (such as those providing supplies and logistics), de-commissioners, defense forces (public, private, military, etc.), and others. Moreover, the systems 13604, 13606, 13608, 13610 interact with each other through one or more additional Interface Systems 13638.

FIG. 137 is a schematic depiction of an illustrative manner in which some of the Functions of a PNP can in various embodiments be assigned to physical Forms, and of the relationships of the Functions and Forms so assigned to Integral, Accessory, and Associated categories. In various embodiments, a PNP Unit 13700 (double outline) includes one or more functional Systems 13702, which may include one or more Integral Systems 13704, Accessory Systems 13706, and Associated Systems ("systems associated with PNP unit fleet") 13708. In general, Integral and Accessory Systems are physically included with the PNP Unit 13700, while Associated Systems are not. In embodiments, the term "Accessory System" may be understood to encompass, except where context indicates otherwise, a secondary, supplementary or supporting system to help facilitate a function.

The Systems 13702 may include one or more Plant Systems 13710. In embodiments, the terms "plant system" or "nuclear plant system" may be understood to encompass, except where context indicates otherwise, a system involved in the operation of a nuclear reactor, the transport of heat, the conversion and transmission of power, and the support of the normal operations of the aforementioned.

In embodiments, PNP Systems 13702 may include one or more Marine Systems 13712. In embodiments, the term "marine system" may be understood to encompass, except where context indicates otherwise, a system associated with the function of the unit as a marine vessel, including navigation, stability, structural integrity, and accommodation of crew.

In embodiments, PNP Systems 13702 may include one or more Interface Systems 13714. Interface systems 13714 may include software interfaces (including user interfaces for humans and machine interfaces, such as application programming interfaces, data interfaces, network interfaces (including ports, gateways, connectors, bridges, switches, routers, access points, and the like), communications interfaces, fluid interfaces (such as valves, pipes, conduits, hoses and the like), thermal interfaces (such as for enabling movement of heat by radiation, convection or the like), electrical interfaces (such as wires, switches, plugs, connectors and many others), structural interfaces (such as connectors, fasteners, inter-locks, and many others), and others.

In embodiments, PNP Systems 13702 may include one or more Control Systems 13716. In embodiments, the term "control system" may be understood to encompass, except where context indicates otherwise, a system of devices or set of devices (including enabled by various hardware, software, electrical, data, and communications systems, that manages, commands, directs or regulates the behavior of other device(s) or system(s) to achieve desired results. Control systems may include various combinations of local and remote control systems, human-operated control systems, machine-based control systems, feedback-based control systems, feed-forward control systems, autonomous control systems, and others.

In embodiments, PNP Systems 13702 may include one or more Contingency Systems 13718. In embodiments, the terms "contingency system" or "emergency system" may be understood to encompass, except where context indicates otherwise, a system on or interfacing with a PNP that prevents, mitigates, or assists in recovery from accidents, which may include design-basis accidents (accidents that may occur within the normal operating activities of the PNP) and beyond-design-basis accidents and events, including both human initiated events (terrorism or attacks), significant failure of PNP facilities, environmental events (weather, seismic activity, and the like) and "acts of God."

In embodiments, PNP Systems 13702 may include one or more Auxiliary Systems 13720. In embodiments, the term "auxiliary system" may be understood to encompass, except where context indicates otherwise, a system which, when included in or interfacing with a PNP unit, tailors the unit to operating in different deployment scenarios and/or that provides or enables an accessory function for the PNP (such as a function occurring episodically like maintenance, refueling or repair that may involve moving items around the PNP). Accessories may be related to the plant functions, marine functions, and contingency functions, among others. For example, an accessory marine system could improve the stability of the foundation of a seafloor mounted PNP or act as a breakwater depending on local wave conditions. An accessory plant system could provide an interface for transport of power/utility products or might use process heat to manufacture value-added industrial products local to the unit. An accessory system like a crane might be used to move units around during refueling or maintenance operations. These and many other accessory systems are encompassed herein.

In embodiments, a PNP system may include one or more Associated Systems 13708. In embodiments, the term "associated system" may be understood to encompass, except where context indicates otherwise, a system interfacing with a single unit or a fleet of PNP units which performs a function related to the design, configuration, awareness, defense, operation, manufacturing, assembly, and/or decommissioning of PNP units. In embodiments, this may include a system that performs a function that is not necessarily core to the operation of the PNP but that may involve interaction with a PNP, such as a weather prediction system, a tsunami or extreme-wave warning system, a smart grid system, an agricultural or industrial production system that uses power from the PNP, a desalination system, and many others.

In embodiments, a PNP system may also include Associated Vessels and Facilities 13722 that are associated with the system but are not inextricable physical portions of it, e.g., tenders, crew transports, fuel transports, vehicles of defensive forces, supply depots, on-shore grid substations, and many more.

As also indicated in FIG. 137, both the Integral and Accessory components of a PNP Unit 13700, and the portions of various Systems physically included with a PNP Unit 13700, are, in various embodiments, designed, constructed, and assembled as "modules" 13724, also herein termed "structural modules." Herein, a module is a standardized, discrete part, component, or structural unit that can be used to construct a more complex structure, with assembly typically occurring in a shipyard. Modules included with various embodiments are derived from categories used in shipbuilding, and include, among other units, Skids, Panels, Blocks, and Megablocks. These terms shall be clarified with reference to Figures herein. Systems (e.g., Marine Systems 13712) may be substantially confined to single modules, or distributed across multiple modules; the terms "system" and "module" are thus not interchangeable.

FIG. 138 is a schematic depiction of portions of an illustrative unit configuration 13602 of FIG. 136 and of an illustrative deployment 13606. In particular, relationships are depicted of defensive systems and methods that include but are not limited to the systems and methods discussed herein with reference to the schema of FIG. 136. The unit configuration 13602 includes the unit integral plant 13612 of FIG. 136; the unit integral plant 13612 includes internal defense systems 13802, marine systems 13804, auxiliary systems 13806, power conversion/generation plant systems 13808, and nuclear plant systems 13614. The unit configuration 13602 also includes accessory defense systems 13810 and accessory defense modules 13812. The accessory defense systems 13810 in turn include primary systems 13814 and auxiliary systems 13816. The accessory defense systems 13810 and modules 13812 are included both by the unit configuration 13602 and by the associated defense systems 13818 of the associated deployment 13606. The associated defense systems 13818 include onshore facilities 13820 (both primary 13822 and auxiliary 13824), offshore facilities 13826 (both primary 13828 and auxiliary 13830), defensive vehicular systems 13832 (both primary 13834 and auxiliary 13836) associated with one or more PNP units, and the accessory defense systems 13810. The accessory defense systems 13810 are modularized to be incorporated in a PNP in its deployment scenario and defense systems included with the unit integral plant 13612. Accessory defense systems 13810 help other associated defense systems 13818 interface with PNP units. Examples of primary onshore facilities 13820 included with the associated defense systems 13818 include security personnel housing, radars, perimeter detection devices, and facilities for servicing drones; examples of primary offshore defense facilities 13828 include barges, breakwaters, buoys, and fencing. Host-nation military aircraft and watercraft and PNP-stationed drones are examples of primary defensive vehicular systems 13832.

The associated defense systems 13818 also include defenders 13838. Defenders 13838 include organized groups of persons, with all their equipment and physical plant, that in any manner defend PNP units and parties servicing them. Defenders 13838 defend against both violent threats such as force attacks and against cyberattack, blackmail, bribery, and other non-force attacks. Defenders 13838 include host-nation military and police forces 13840 and security contractors 13842. Defense agreements 13844 govern relationships and responsibilities between defenders 13838, operation parties 13846 (e.g., subsidiary corporations, regulators, insurers, financers) and deployment parties 13847 (e.g., those performing logistics, maintenance, fuel services, operations, and other services pertaining to PNP units). Defenders 13838 use defense systems whose functions including detection, identification, evaluation, and response. Local or onboard defenders will preferentially delay attacker access to the unit integral plant 13612 until a response can be coordinated with external defense forces (e.g., host military forces 13840), as opposed to continually maintaining the capability to deal with large threats onboard a PNP. Automation of primary defense systems 13814, 13822, 13828, 13834 is a high priority, as will reduce staffing requirements for security on PNP units—a key economic advantage for offshore operations, where personnel costs are very high compared to terrestrial operations.

All defensive activity takes place in a threat environment 13610 that includes state actors 13848 and non-state actors 13850. Of note, not all threats are necessarily deliberate: for example, out-of-control vessels or aircraft, oil spills, and software errors may be as threatening as deliberately guided craft, chemical attacks, or cyberattacks. Herein, discussions of deliberate or malicious attack should be interpreted as including accidental or inadvertent threats, even where the latter are not specified.

FIG. 139 is a schematic block diagram of defense systems 13900 for one or more PNP units, classified as primary systems 13902 and auxiliary systems 13904. Defense systems 13900 are used by defenders to defend PNP units and associated entities, as determined by the defense agreements 13844 of FIG. 138. The primary defense systems 13902 perform functions that secure zones in and around a PNP unit: among the primary defense systems 13902 are systems for threat detection and identification 13906, threat evaluation 13908, denial of access to the PNP and other facilities 13910, direct response 13912 to threats, and command and coordination of defense 13914. The auxiliary defense systems 13904 ensure proper provision of materiel and personnel to the primary defense systems 13902: among the auxiliary defense systems 13904 are systems for logistics support 13916, personnel security 13918 (e.g., making sure that persons aboard a PNP are qualified to be there, internal surveillance systems, other internally directed defensive measures for human-mediated threats), communications 13920, and control and information technology 13922.

A. Multi-Faceted Threat Response

Embodiments include process elements for a threat response system that addresses external threats originating in three spatial zones (e.g., air, surface, subsurface), internal threats and sabotage, and cyber threats. This multi-faceted approach to secure and defend a PNP includes the following stages or aspects:

1) Threat detection and identification. This includes the detection of approaching agent and the identification of whether the agent is a threat to PNP.
2) Threat evaluation and determination of local response. The PNP threat response system establishes a tiered level of scaled response depending on the nature of the detected agent or agents.
3) On-platform and/or local response. Includes mechanisms to prevent an intruder with or without potential help by an adversary insider from gaining access to the PNP, including cyberaccess.
4) External response. Comprises external forces and mechanisms that come to the assistance of the plant security forces and mechanisms to prevent intruder force access to the PNP and/or to gain control of the PNP and its fissionable material.

FIG. 140 is a schematic depiction of a three-zone threat environment 14000 or threat taxonomy to which various embodiments respond defensively in a multi-faceted manner. A PNP 14002 is stationed in a body of water 14004 and subject to general categories of internal and external threat. Internal threat possibilities include cyberattack 14006 and sabotage 14008. Sabotage 14008 may be carried out by internal agents (e.g., corrupted PNP staff), external agents (e.g., persons planting explosives in materiel delivered to the PNP), or attackers that have surreptitiously boarded the PNP 14002. External force threat possibilities include air threats (e.g., aerial drones 14010, aircraft 14012), surface threats (e.g., small surface vessels 14014, large surface vessels 14016), subsurface threats (e.g., divers 14018, and large submarines 14020). Additional aerial threat possibilities include but are not limited to chemical clouds, missiles, balloons, and aircraft ranging in size from parachutes and ultralight aircraft to commercial jetliners and military aircraft. Appropriate defensive countermeasures will tend to vary with speed and size of attacking aircraft. Additional surface threat possibilities include but are not limited to chemical slicks, buoys, and marine surface drones. Small surface craft 14014 tend to represent a distinct threat type from large surface craft 14016, as the former are speedy and agile while the latter may carry extremely large masses of explosives and/or large numbers of attacking personnel into the vicinity of the PNP 14002. Additional subsurface threat possibilities include but are not limited to mini-subs, torpedoes, and bottom crawlers. Attacking personnel, having gained access to the PNP, can potentially cause harm in various ways, including explosions, killing, hostage-taking, deliberately destructive operation of PNP nuclear or other system, and the like. Attacking personnel can gain access to the PNP 14002 by stealth, force, or ruse. Ruses (e.g., claims of authorization or distress) may be combined with other forms of attack. Projectiles or missiles may be directed at the PNP 14002 from nearby landmasses. Moreover, this threat taxonomy is illustrative and partial, not exhaustive.

FIG. 141 is an illustrative table that partially specifies responding defense authorities of a PNP defense system by threat category and mechanism. In general, mechanical, electronic, and structural security features integral to and associated with a PNP, along with PNP security personnel, are tasked with stopping, deterring, or at least delaying or slowing all types of violent attack most likely to be available to non-state actors, including air attacks using light drones and aircraft, chemical attacks, surface attacks using non-military aircraft, and subsurface attacks using divers, mini-subs, and other relatively small-scale devices. Host nation military and police forces are in general tasked with ultimate response to all threat categories and with all aspects of response to extreme or high-intensity threats such as those posed by military aircraft, surface craft, and subsurface craft and by hijacked commercial aircraft. Onboard PNP systems and personnel are entirely responsible for responding to onboard threats, including sabotage, personnel corruption or collusion, cyberattack, and the like.

FIGS. 142-144 depict aspects of illustrative zonal defense schemes for a PNP faced by the threat taxonomy described with reference to FIGS. 140 and 141. In general, the overall geometry and functional details of systems and methods for defending a PNP according to embodiments of the present disclosure will vary according to the geography of the PNP's deployment site, e.g., the PNP's proximity to land, the shape of any proximate coasts or landmasses, and water depths in the vicinity of the PNP.

FIG. 142 is a schematic top-view depiction of portions of an illustrative zonal defense schema 14200 for physical surface threats only against a PNP 14202 stationed 8 or more nautical miles from any landmass. For a PNP so stationed, the entire surface area of concern to defenses is a water surface, so defense zones may be circular in shape and centered on the PNP 14202. A first zone is the monitored area 14204, which extends to a radius of ~8 nautical miles (nmi) from the PNP 14202. The entire monitored area 14204 is surveilled by radar. Circular areas of smaller radii nested within the monitored area 14204 may also surveilled by other sensing modalities, including sonar and visual systems. Radars and other gear for surveillance of the monitored area 14204 may be based on the PNP or on buoys, vessels, drones, artificial breakwaters, or other bases.

Within the monitored area 14204 is nested a large-ship exclusion area 14206, which extends to a radius of ~6 nmi from the PNP 14202. The large-ship exclusion area 14206 is sized to protect the PNP from excessive blast effects from an explosion such as might be produced by the largest possible explosive cargo transportable by existing vessels.

Within the large-ship exclusion area 14206 is nested a controlled access area 14208 having a radius of ~1 nmi. Only authorized vessels, regardless of size, are permitted within the controlled access area. Finally, a protected area 14210 of radius <1 nmi is centered on the PNP 14202. Active defense systems based on the PNP 14202 operate primarily within the protected area 14210. The protected area 14210 may also be bounded, in part or whole, by barrier defenses such as will be described with reference to Figures below.

Primary defense systems for detection and identification 13906 (FIG. 139), as well as primary systems for threat evaluation 13908 and command and coordination 13914, operate throughout the entire monitored area 14204 at all times. Access denial 13910 and direct response 13912 for large vessels entering the large-ship exclusion area 14206 of FIG. 142 are provided by host nation military forces. Access denial 13910 and direct response 13912 for any size or type of vessels entering the controlled-access area 14208 or protected area 14210 are provided by both host nation military forces and PNP security forces and features, both integral and associated. Threats that make contact with the PNP are stopped, deterred, or impeded by PNP security forces and integral defense features.

FIG. 143 is a schematic top-view depiction of portions of an illustrative zonal defense schema 14300 for physical surface threats only against a PNP 14202 stationed less than one nautical mile from a landmass 14302. For a PNP so stationed, only a portion of the surface area of concern to defenses is a water surface. In embodiments, surface defense zones overlying water may be circular in shape and centered on the PNP 14202; defense zones over land may be shaped to the topography and other features of the landmass (e.g., development and settlement patterns), hills). A monitored area 14304, large-ship exclusion area 14306, and controlled access area 14308 are centered on the PNP 14202 and defined over water as described with reference to FIG. 142. On land, a monitored area 14310, possibly irregular in shape, may be surveilled by radar and by other modalities as well (e.g., visual methods). Within the monitored area is an approach exclusion area 14312 from which all non-authorized persons and vehicles are excluded at all times. Finally, a protected area 14314 is centered on the PNP as for the open-water case shown in FIG. 142, within which area active defense systems based on the PNP 14202 primarily operate and which is may be bounded, in part or whole, by defensive barriers. Additional zones of overland defense and/or zones variously adapted or indifferent to geography and terrain, are also contemplated. Typically, defensive system geometry and operational parameters are adjusted to accommodate the context of each particular PNP deployment.

FIG. 144 is a schematic side-view depiction of portions of an illustrative zonal defense schema 14400 for aerial and subsurface physical threats only against a PNP 14202 stationed 8 or more nautical miles from any landmass. For a PNP so stationed, aerial and subsurface defense zones may be approximately cylindrical in shape and centered on the PNP 14202. A first aerial zone is the monitored volume 14402, of height A1 and radius R1 centered on the PNP 14202. The entire monitored volume 14402 is surveilled by radar. Some or all of the monitored volume 14402 may be surveilled by other sensing modalities, such as visual systems. Radars and other gear for surveillance of the monitored volume 14402 may be based on the PNP or on buoys, vessels, drones, artificial breakwaters, satellites, aircraft, or other bases. A second aerial zone is the large-aircraft exclusion zone 14404, of height A2 and radius R2. A third aerial zone is the aerial protected area 14406, of height A3 and radius R3, from which all unauthorized aircraft are excluded at all times.

A first subsurface zone is the monitored volume 14408, of radius R4 centered on the PNP 14202 and extending from the water surface to the sea floor 14410. The entire monitored subsurface volume 14408 is surveilled by sonar. Some or all of the monitored subsurface volume 14408 may also be surveilled by other sensing modalities, such as visual systems. A second subsurface zone is the subsurface-vessel exclusion zone 14412, of radius R5. A third subsurface zone is the subsurface protected area 14414, of radius R6, from which all unauthorized divers and subsurface craft are excluded at all times. Finally, a protected volume 14416 is defined around the PNP both above and below the water surface. Active defense systems based on the PNP 14202 operate primarily within the protected volume 14416.

Although FIGS. 142-144 depict defensive zones for single PNPs, it will be appreciated in light of the disclosure that similar zonal schemas can be appropriately devised for installations including multiple PNPs.

B. Multi-Purpose Defensive Barges for a PNP

The need for establishing and maintaining a protected area or No Entry Zone around a PNP may be served by positioning floating and/or semi-floating barges or pontoons around the periphery of the protected area. Thus, embodiments of the present disclosure include a physical floating barrier system partly or wholly circumferential to a PNP that protects the unit from collision and/or any other marine vessel induced damage. The floating barrier system may include any floating object, including barges and/or pontoons made of steel, composite, and/or concrete. Segments of the barrier system may be moored, e.g., to the seabed, each other, pylons, the PNP, or a landmass. Herein, all such floating objects are termed "barges." In various embodiments, partial filling of individual floating segments with liquid and/or solid substances enhances overall collision resistance by increasing inertia and absorbing collision energy. Storage room within components of a floating barrier is used in some embodiments to store PNP-related substances, devices, or materiel: for example, floating barriers can store drinking water, low-level radioactive liquid waste, or noxious or hazardous liquid collected during mitigation of a deliberate or accidental surface spill or after defensive washdown of PNP decks by a liquid repellent. Additionally or alternatively, floating barriers can house drones, surveillance equipment, and other devices pertaining to defense of a PNP.

FIG. 145 is a schematic top-down depiction of an illustrative defensive barge perimeter system 14500 for a PNP 14502 according to embodiments of the present disclosure. A number of barges (e.g., barge 14504) are positioned in a manner that circumscribes the PNP 14502. The PNP 14502 is, in this illustrative case, based far enough from any landmass that complete encirclement of the PNP 14502 by the barges is appropriate: in general, the location and number of barges of such a defensive system is varied according to the topographical graphical of the PNP site.

In embodiments, individual barges may be moored, e.g., by mooring cables attached to bottom anchors. Depending on the amount of positional play permitted to each barge by its mooring, the geometry of the barge barrier system 14500 will vary slightly but insignificantly over time, depending on wind, currents, and waves. Also, barges may also be linked one to the next (e.g., by cables or jointed or gimbaled rods, e.g., linkage 14506) to constrain their relative positions and assure that the distances between individual barges remain within certain limits. Either the linkages between barges constitute a barrier or impediment to passage of vessels through the spaces between barges, or the distances between barges maintained by the linkages do not allow approaching marine vessels/boats to pass through the barrier without losing speed and inertia. In various embodiments one or more gateway barges (e.g., barges 14508, 14510 in FIG. 145) are positioned so as to allow craft below a certain size threshold (e.g., vessel 14512) to approach the PNP 14502, but only by making an S-curve or detour at low speed, mitigating the threat of deliberate or accidental collision with the PNP 14502. Gateway barges 14508, 14510 may be either permanently positioned outside of a gap in the barge barrier, or may be temporarily shifted out of the barrier to form such a gap, or may be temporarily shifted, on occasion, into the gap (e.g., if unauthorized approach is detected by the defense system).

FIG. 146 is a schematic top-down depiction of an illustrative adjunct system 14600 to a PNP barge perimeter system such as the system 14500 of FIG. 145 according to embodiments of the present disclosure. In the adjunct system 14600, which is typically located inside a protected area defined by a barrier such as barrier system 14500 of FIG. 145, pylon-mounted wind turbine towers (e.g., turbine 14602) are disposed at intervals in the vicinity of a PNP 14604. The turbine towers present a barrier to very large vessels and impede the rapid progress of relatively small vessels in the vicinity of the PNP 14604, increasing PNP security. Moreover, large modern turbines with maximum blade-sweep heights on the order of 200 meters also present a defensive obstacle to aerial approach by winged aircraft, which must either dive at a steep angle to strike the PNP 14604 (with corresponding loss of fine control) or attempt lower-angle approach through a wall of moving turbine blades. Moreover, underwater netting or cabling is, in some embodiments, supported between turbine towers to impede subsurface approach. In various other embodiments, some or all wind turbines are omitted in favor of pylons that can impede attack and provide other functions. Pylons deploying barrage balloons, kites, and other impediments to aerial navigation rather than supporting wind turbines are also included with various embodiments.

FIG. 147 is a schematic side-view of portions of an illustrative barge barrier 14700 similar to that depicted in FIG. 145. The barrier segment depicted includes two barges 14702, 14704 that are joined by a jointed or gimbaled rod 14706. The barges 14702, 14704 may be secured by mooring lines. The water surface 14708 is indicated by a wavy dashed line. Above the surface, fencing 14710 is strung along the tops of (and between) the barges 14702, 14704, presenting an impediment to attackers who might attempt to board the barges 14702, 14704 and continue progress toward a PNP on the far side of the barrier, e.g., by swimming or by hauling lightweight craft over the barge barrier. Herein, fencings depicted may be of a single or multiple types, electrified, capable of sensing contact, and otherwise combined with security devices and features. Below the water surface 14708, netting 14712 is strung from the barges 14702, 14704. The netting 14712 may be strong enough to stop or impede the progress of swimmers and small subsurface vessels or devices and to resist rapid cutting. Where water depth permits, the netting 14712 may be deployed, in some embodiments, to be extensive enough to make contact with the sea floor even at high tide. In embodiments, the nether edge of the netting 14712 is anchored to the sea floor to prevent underwater attackers from simply lifting its edge and passing beneath.

C. Fence and Hybrid Barge-Fence Barriers for a PNP

The embodiments in this disclosure address the need of barrier systems including fences, including hybrid barge/fence barrier systems, to defend a PNP in shallower waters. In embodiments, the functionality of the hybrid physical barrier system may be maintained with only low maintenance during its lifetime. Disclosed are embodiments that physically separate a protected area and a controlled access area around a PNP. The barrier system may be suitable for a variety of purposes; the novelty resides in the flexible arrangement and deployment of the barge and/or fence system around a PNP. Aerial defenses, in contrast, will be radially symmetric around most PNP installations, since only unusually dramatic topography (e.g., nearby mountains) will significantly modify the airspace threat picture of its own accord.

FIG. 148 is a schematic side-view of portions of an illustrative hybrid barge-fence barrier 14800. The barrier segment depicted includes a barges 14802 and a buoy 14804. In embodiments, the barge 14802 may be secured by mooring lines. Typically, the barge 14802 will be joined to one or more additional barges, continuing the barrier 14800 into deeper water, while the buoy 14804 will be joined to a series of one or more additional buoys, continuing the barrier 14800 into shallower water. Above the surface, fencing 14806 is strung along the top of the barge 14802, while below the water surface, netting 14808 similar to that depicted in FIG. 147 is strung from the barge 14802 and buoy 14804 and between additional barges and buoys. The buoy 14804 is moored by a buoy line 14810. In general, buoys are suitable for barrier maintenance in shallower waters whose depth tends to exclude vessels large enough to require blockade by a massive barge. Fencing runs between adjacent buoys may include spacing rods or members to prevent fence slacking as buoys drift together; Additionally or alternatively, fence tensioning or the method of buoy anchoring depicted in FIG. 150 may be employed to stabilize buoy positions and control slacking due to lateral buoy drift.

FIG. 149 is a schematic side-view of portions of an illustrative hybrid barge-fence barrier 14900. The barrier segment depicted includes buoys 14902, 14904 which support fencing 14906 above the waterline and netting 14908 below it. The buoys 14902, 14904 are moored to the sea floor by lines 14910, 14912 and anchors 14914, 14916. The lines 14910, 14912 are preferably of an elastic material and/or are tensioned on reels (e.g., a reel within each buoy) in a manner that can accommodate height variations of the waterline caused by tides and waves while keeping a sufficient portion of the fencing 14906 above water at all times. As for the fencing depicted in FIG. 149, fence slacking due to lateral buoy movement may be mitigated by rigid spacers and/or fence tensioning and/or the mooring technique depicted in FIG. 150. One end of the fencing 14900 preferably interfaces, at a critical water depth, with a barge that continues the defensive barrier into deeper water, e.g., as depicted in FIG. 148. The other end of the fencing 14900 preferably interfaces either with another barge or with a land-based fence or fencing terminus.

FIG. 150 is a schematic top-down view of portions of an illustrative hybrid barge-fence barrier 15000. The barrier segment depicted includes a number of buoys (e.g., 15002) which support fencing 15004 above the waterline and netting below it. Each buoy is moored to multiple anchors (e.g., anchor 15006) by one or more mooring lines (e.g., line 15008). The mooring lines may be elastic, reel-tensioned, catenary, or otherwise tensioned to further constrain buoy lateral movement and thus mitigate fencing slacking. The segment of the barrier 15000 depicted in FIG. 150 preferably interfaces at one end with a barge that continues the defense barrier into deeper water and at the other with either another barge or with a land-based fence or fencing terminus.

FIG. 151 is a schematic side view of portions of an illustrative fence barrier 15100. The barrier segment depicted includes approximately rigid piles or stanchions 15102, 15104 which support fencing 15106 above and below the waterline and netting 15108 below it. The stanchions 15102, 15104 are driven into the sea floor and are preferably anchored by pilings. The fencing 15106 is positioned vertically so that at high tide a sufficient height of fencing remains exposed to air to assure adequate function. Like the segment of barrier depicted in FIG. 150, that depicted in FIG. 151 is preferably a portion of a larger barrier system including barges. As shall be shown and discussed further herein, barrier systems including components other than or additional to fences and barges are contemplated.

FIG. 152 is a schematic overhead depiction of aspects of an illustrative hybrid defensive barrier system 15200 for an illustrative near-shore PNP installation including a PNP 15202. The illustrative system 15200 exemplifies the customization of a barrier system, as in various embodiments, to site geography and other installation characteristics. The PNP 15202 is located in a channel between two landmasses 15204, 15206 that deepens out to sea in one direction (leftward in drawing) and becomes shallower in the other (rightward in drawing), e.g., debouches into a bay. The barrier system 15200 must thus address threats from a deep-water direction, a shallow-water direction, and two landward directions while enabling access to the PNP 15202 from at least the deep-water direction (preferably from all directions). The barrier system 15200 defines a protected zone around the PNP 15202 and includes two barges 15208, 15210 anchored at the channel inlet and connected to each other by a jointed or gimbaled rod 15212. The shoreward ends of the barges 15208, 15210 are connected to shallow water fencing sections 15214, 15216 similar to the system 15100 of FIG. 151. Fencing may also be extended over the barges 15208, 15210. One shoreward fence 15216 includes a gate 15218 that can be opened to allow passage of relatively small authorized vessels through a channel (openability indicated by double-headed arrows). Additionally or alternatively, one or both of the barges 15208, 15210 can be temporarily rotated to allow passage of relatively large authorized vessels. Another shallow-water fencing segment 15220 defends the PNP 15202 against non-aerial approach from the shallow end of the channel. Also, two overland fencing segments 15222, 15224 restrict overland access to the vicinity of the PNP 15202. The defensive barrier of FIG. 152 is preferably combined with various other defensive measures.

FIG. 153 is a schematic overhead depiction of aspects of an illustrative hybrid defensive barrier system 15300 for an illustrative near-shore PNP installation including three PNPs 15302, 15304, 15306. The PNPs 15302, 15304, 15306 are relatively close to (e.g., within a kilometer of) a landmass 15308. A protected area around the PNPs 15302, 15304, 15306 is at least partly enclosed by at least three barrier components: (1) a fence 15310 of sufficient density, height, and strength to impede persons and at least small watercraft, (2) three large grounded blocks, piers, or moles (e.g., block 15312), preferably touching or nearly touching end-to-end, and (3) an at least partly hardened access facility 15314 located on the landmass 15308. Buoys or stanchions (e.g., buoy 15316) support the fencing 15310 over a water portion of the defended border, while posts (e.g., post 15318) support the fencing 15310 over the block portion of the border. Underwater netting is preferably slung below all water portions of the fence 15310, and at least one fence segment (e.g., segment 15320) is gated to admit passage of authorized vessels to and from the PNPs 15302, 15304, 15306. In the illustrative barrier system of FIG. 153, the blocks provide hard defense against both surface and subsurface approaches while the fenced water portion of the barrier is removable or openable to enable PNPs to added to or removed from the area within the barrier and to enable vessels to come and go from the PNPs.

FIG. 154 is a schematic overhead depiction of aspects of an illustrative composite defensive barrier system 15400 for an illustrative near-shore PNP installation including three PNPs 15402, 15404, 15406. The PNPs 15402, 15404, 15406 are relatively close to (e.g., within several kilometers of) a landmass 15408, but are in deeper water than that presumed for system 15300 of FIG. 153. A protected area around the PNPs 15402, 15404, 15406 is at least partly enclosed by at least three barrier components: (1) a fence 15410 of sufficient density, height, and strength to impede persons and at least small watercraft, (2) six barges (e.g., barge 15412), and (3) three artificial breakwaters (e.g., breakwater 15414). The PNPs 15402, 15404, 15406 communicate electrically through a line 15416 with a power exchange point 15418 on the shore of a landmass 15408 that interfaces with a grid 15420. Buoys or piers (e.g., buoy 15422) support the fencing 15410 over a water portion of the defended border. In embodiments, underwater netting may be slung below all water portions of the fence 15410. In embodiments, additional fence segments (e.g., segment 15424) may run between and over the barges. In the illustrative barrier system 15400 of FIG. 154, the breakwaters and barges provide hard non-aerial defense against approaches from deeper water while the fenced portion of the barrier provides non-aerial defense for threats approaching from landward.

FIGS. 145-154 exemplify barrier systems included with illustrative PNP installations according to embodiments of the present disclosure. The barrier systems depicted are primarily directed to obstructing or impeding access by surface and subsurface threats, but barriers (e.g., barrage balloons) directed partly or wholly to aerial threats are also contemplated and within the scope of the present disclosure. Multilayered barrier systems (e.g., fences within fences) are also contemplated. Combinations of stationary or quasi-stationary barrier systems with active or mobile barriers are also contemplated.

FIG. 155 is a schematic depiction of portions of an illustrative defensive perimeter barge 15500 that performs defensive functions additional to direct blockade. The barge 15500 serves as a platform for landing and launch aerial drones (e.g., drone 15502) and subsurface drones (e.g., drone 15504). The barge 15500 also supplies auxiliary functions that support the defensive drones (e.g., shelters 15506, 15508, charging/fueling 15510, and communications 15512). In examples, surface drones can also be deployed from the barge 15500. The interior of the barge 15500 is also employed for storage of liquids, gasses, or materiel in various embodiments. Security forces (e.g., security contractors 1692 of FIG. 138) are stationed on the barge 15500 in various embodiments. Stationing of active defense forces, both robotic and human, on portions of the defensive barrier is advantageous in that (1) the forces are more dispersed than if concentrated aboard the PNP, therefore more difficult for an attacker to neutralize, and (2) the forces are stationed closer to approaching threats than forces concentrated aboard the PNP.

Drone Defensive Systems for a PNP

The embodiments in this disclosure address the need for active, mobile components of a PNP defensive system to stop, delay, or deter mobile attackers. In embodiments, drones are employed to provide active, mobile defense. Drones included with embodiments include aerial, surface, overland, and subsurface vehicles that are directed autonomously, remotely, or both. Swarm or collective behavioral control algorithms deployed in the fields of artificial intelligence and robotics are employed, in some embodiments, to direct drone activities individually, in swarms or groups, or in hierarchically nested groups of groups. The primary goal of all such direction is the defense of a PNP and the personnel associated therewith. It is desirable that attacking or apparently attacking persons or machines be harmed to the minimum degree that is compatible with defending the PNP, its associated systems, and its personnel.

FIG. 156 is a schematic overhead depiction of an illustrative drone-swarm defensive system 15600 deployed outside the protected zone of a PNP 15602. The drones are depicted in an early stage of response to an approaching apparent threat, e.g., a surface vessel 15604 that has crossed a marked perimeter line 15606. A swarm of aerial drones (e.g., aerial drone 15608) and a swarm of surface vessel drones (e.g., surface drone 15610) have been dispatched to meet the approacher 15604 with a calibrated range of portable responses, as described below. In embodiments, the drones are stationed in a distributed manner upon barges defining a protected area around the PNP 15602 (e.g., barge 15612), and are dispatched toward an approaching threat from one or more barges closest to the approacher. The number and type of drones dispatched preferably depends on information about the character of the approacher derived from surveillance systems (e.g., radar and imaging buoys stationed near the perimeter line 15606). Drones are advantageous in comparison to human-piloted craft, in this application, in that they are expendable, less costly and therefore potentially more numerous, subject to real-time computer-controlled coordination, and in some cases more maneuverable; however, interception of approachers by human-guided craft is also contemplated.

In various embodiments, a threat response ladder is envisaged whereby automated systems, Additionally or alternatively, with direction by human overseers and in cooperation with on-site human responders, respond in an escalating way to apparent or possible threats as they approach the PNP. An illustrative series of escalations is as follows: (1) Authorization status of all craft within a monitoring radius of a PNP installation is monitored by one of the wireless encrypted methods known to persons familiar with the art of encrypted communication. (2) A defensive zone outer perimeter is defined within the monitoring radius. Marker buoys, navigation lights, warning beacons, and other standard methods of directing air and water vehicular traffic away from sensitive sites are deployed to deflect traffic around some or all of the outermost defensive zone perimeter. (3) A vehicle (e.g., surface vessel 15604) that passes the outermost warning line without confirmed authorization is presumed to be a possible threat. Since accidental trespass is a possibility, response to the possible threat begins with lowest-impact measures. Thus, first, direct communication by standard mechanisms (e.g., marine VHF mobile band) is attempted with the possible threat. For craft meeting site-dependent dynamic criteria (e.g., heading, speed), drones are dispatched to limit interception time to a specified minimum, should interception prove necessary. Drones may be aerial, surface, subsurface, overland, amphibious, or all of the above. (4) If communication is not established by standard mechanisms, intercepting drones are tasked with attempting nonstandard communications: e.g., one or more drones may hail a vessel using loudspeakers, display directional signals and warning lights, form up as shaped, lighted swarms to indicate directional symbols or other symbols, or land upon a vessel's deck to act as point relays for one-way or two-way audiovisual communications with personnel. (5) If communications are not successful in altering an approacher's behavior within a set time and other parameters that will in general depend on the range, speed, and nature of the approacher, minimal interventions are attempted while standard and nonstandard communications efforts continue. In a series of examples, drones deploy impediments such as tangle ropes (using, e.g., a version of the BCB International Buccaneer Ship-Borne Shore Launcher, which lays a propeller-entangling line across the bow of a threatening vessel); specially equipped drones occlude or foul combustion-air intakes or feed them with combustible gasses (e.g., propane) or noncombustible gasses (e.g., $CO_2$) that cause engines to fail; water intakes are fed with fouler pellets that release entangling lines once they have passed intake gratings; a drone swarm makes coordinated direct contact with a vessel to apply a thrust vector that significantly opposes or diverts the vessel's progress; drone swarms, adapting their behavior intelligently to shifting winds and other conditions, release smoke that hinders visual navigation; drones release electromagnetic pulses that disable electrical equipment; drones release chaff or deploy radar reflectors that confound navigational radar; and drones employ nonlethal weapons against personnel such as tear gas, noise generators, and other measures known in the field of security engineering. The number of possible nonlethal interventions is large, as will be clear to persons familiar with the field of security engineering. Defending drones may act autonomously under the guidance of a centralized or distributed artificial intelligence, possibly modified by real-time human direction. Drones may act individually or as swarm members, their roles changing over time; drones of different physical types may cooperate with each other; entire swarms may act as cooperating entities. (6) When certain site- and threat-specific criteria are met with high certainty, increasingly hazardous and ultimately lethal mechanisms may be employed to stop an approaching apparent threat. Drones can deliver shaped charges, floating mines, gunfire, or other measures to halt the imminent approach of a threatening vessel. In various embodiments, dedicated PNP defensive systems employ no lethal methods, which remain entirely in the control of host-nation military and police forces.

FIG. 157 depicts an illustrative low-impact defense measure 15700 deployed by two drones 15702 dispatched from a defensive barge against an unauthorized propeller-driven vessel 15704 that has crossed a security perimeter 15706. A tangler dragnet 15708 or dragline, supported at or near the water surface by alignment buoys (e.g., buoy 15710) and attached to the drones by quick-disconnect buoys 15712, 15714, is maneuvered across the path of the oncoming vessel 15704. As the vessel 15704 passes over the tangler dragnet 15708, it is likely that the dragnet 15708 will become entangled with the propeller(s) of the vessel 15704. To this end, the drones 15702 will be steered intelligently to maintain tension on the dragnet 15708. If the vessel 15704 passes completely over the dragnet 15708 without entanglement, the drones 15702 reverse course and attempt entanglement from aft of the vessel 15704. The alignment buoys (e.g., buoy 15710) contain small explosive charges that can be detonated, automatically or remotely, when they are entangled with or proximate to the propellers to propulsively disable the vessel 15704.

In general, at each escalation level, any technical measure that can be deployed by a single drone of a given size and type, or by two or more cooperating drones, may be employed by drone swarm defenses, e.g., those depicted in FIG. 156. Drones will be more likely to self-sacrifice as the estimate of threat rises (e.g., as minimal time-to-contact decreases.

D. Defensive Hardpoints for a PNP

The embodiments of this disclosure address the need of integrated defensive hardpoints on a PNP to defend against surface and air originated threats. In particular, threats that are not deterred by barrier defenses, drone defenses, and other distributed defenses must be dealt with as they approach or make contact with a PNP. PNP design features, including defensive hardpoints, increase PNP defensibility in various embodiments. Embodiments include deck designs and hardpoint locations which provide a full visual 360° free view around the platform, allowing defenders to track and combat threats approaching the PNP by air and/or by sea. Defensive hardpoints may be human, autonomously operated, or both. Hardpoints may be supported with radar and/or other sensor technology to detect, identify, evaluate, and counter threats. Hardpoints may have implemented and automated targeting systems and/or may receive target information with the awareness required to respond to the highest priority threat.

FIG. 158 schematically depicts portions of an illustrative PNP 15800 including integrated defensive hardpoints according to embodiments. A number of hardpoints, e.g., hardpoint 15802, are arrayed around the upper perimeter of the PNP 15800. The upper portion of the PNP 15800 is beetling or overhung and the hardpoints further project from the PNP's perimeter so that clear lines of sight (designated by dashed lines, e.g., line of sight 15804) are obtained from the nether point of each hardpoint to points on the sides of the PNP 15800, including the waterline. Preferably the hardpoints are numbered and positioned so that at least two hardpoints have a clear line of sight to every point on the side of the PNP 15800 and along its waterline, so that disabling a single hardpoint does not create a blind spot. Hardpoints perform an observational role and may be equipped with a variety of technical measures for deterring or repelling various attacking activities (e.g., attempted boarding). Such security measures may include, for example, water cannon, noise cannon, nonlethal electromagnetic weapons, and many other devices. Hardpoints may be remote-controlled, inhabited, autonomous, or some combination thereof. In embodiments, a centralized hardpoint or control tower 15806 is positioned on the upper surface of the PNP in a manner that provides it with complete overview of the PNP's upper surface, the perimeter, and the hardpoints.

E. Access Control Cofferdams

Embodiments of this present disclosure address the need to distribute cofferdams (fluid-fillable chambers on a PNP in a manner that denies or delays access to various parts of the PNP by intruders and/or any non-authorized personnel. The novelty of the usage of cofferdams is to secure system and/or platform critical sectors from attackers that have gained access to the surface or interior of the PNP. Once activated, access control cofferdams may secure deck access points as well as the system critical interior of a PNP including the control room, safety rooms, and sanitary facilities as well as an emergency path to reach self-propelled lifeboats.

FIG. 159 is a top-down, cross-sectional, schematic depiction of portions of an illustrative defensive cofferdam 15900 according to embodiments. The cofferdam 15900 is part of a barrier or wall that can be interior to a PNP or part of its outer hull. The continuations of the barrier or wall on either side or both sides of the cofferdam 15900 may be additional cofferdams or of another nature. The cofferdam 15900 includes two parallel walls 15902, 15904 through which two inward-swinging doors 15906, 15908 can provide passage if both doors are opened. In an unsecured state, the cofferdam 15900 is air-filled at a pressure approximately equal to that found on either exterior side of the cofferdam 15900 and the doors 15906, 15908 can open without obstruction. In a secured state, the cofferdam 15900 is filled with water and the pressure differential between the outer air and the interior water places a strong net closing force on both doors 15906, 15908. The cofferdam 15900 thus provides a reversible hardened security barrier between one of its sides and the other. In embodiments, a water supply communicates with the interior of the cofferdam 15900 through piping that can supply, up to some design rate, any losses of water from the cofferdam 15900 and that pressurizes the interior of the cofferdam 15900. Cutting through any portion of the cofferdam 15900 when it is in a secured state will thus release a jet of water through the opening, and through passage will continue to be deterred. In general, the higher the relative pressure of the water within the cofferdam 15900 compared to the exterior air, and the more copious the makeup supply for the pressurized water, the more effective a barrier the cofferdam 15900 will present. Alternatively, the cofferdam 15900 may be pressurized with any fluid or fluids (e.g., steam, air, noxious gasses, noxious or medicated liquids, or the like) that places sufficient closing force upon the doors 15906, 15908 to make the doors un-openable by ordinary mechanisms and that, preferably, deters entry by attackers if released.

Cofferdams such as cofferdam 15900 of FIG. 159, or differing from cofferdam 15900 in various details of design but functioning as a reversibly hardenable barrier in a similar manner, can be positioned throughout the interior of a PNP so as to increase security in the event or danger of a threat interior to the PNP (e.g., boarding by persons or robots).

FIG. 160 is a schematic, cross-sectional depiction of portions of an illustrative PNP 16000 including cofferdams for reversible hardening of access to critical areas. A first cofferdam 16002 (seen in endwise cross-section) is interposed between the deck 16004 of the PNP 16000 and a stairwell 16006 descending therefrom. A second cofferdam 16008 (also seen in endwise cross-section) is interposed between a passageway 16010 and an elevator 16012. The cofferdams 16002, 16008 can be secured by pressurization with steam from a stem generation system 16014. The cofferdams 16002, 16008, as depicted, secure against approach from a single direction only: however, cofferdams in various embodiments enwrap or encircle critical areas, hardening them against access from a wider range of directions or, potentially, from all directions. Cofferdam sections not provided with doorways are also contemplated.

FIG. 161 is a schematic, cross-sectional depiction of portions of an illustrative PNP 16100 including cofferdams for reversible hardening of access to critical areas. The PNP 16100 includes a citadel or keep 16102, that is, an especially defensible portion of the PNP that includes modules and systems for critical function such as reactor control 16104, medical care 16106, crew quarters 16108, a safe room 16110, a vertical transport capability 16112 (e.g., elevator and stairwell), and an escape route, and to which personnel would withdraw during an attack. A cofferdam blanket 16114 enwraps the citadel 16102; in typical practice, crew of a PNP thought to be under attack would first withdraw to the citadel 16102, after which the cofferdams including the cofferdam blanket 16114 would be pressurized. An escape vessel 16116 with an armored nose-plate 16118 that normally acts as a portion of the outer hull of the PNP 16100 provides failsafe, unpowered crew egress through an opening in the cofferdam blanket 16114 and mechanisms of subsequent escape from the vicinity of the PNP 16100; alternatively, the escape vessel 16116 can be isolated from the exterior of the PNP 16100 by a cofferdam section that can be manually depressurized from within the citadel 16102, using a failsafe, unpowered mechanism. The cofferdam blanket 16114 provides a hardened barrier around most or all of the surface of the citadel 16102, impeding attack from within the PNP 16100 as well as from exterior threats (e.g., an aircraft 16120 landing on the upper deck).

F. Countermeasure Washdown System

This disclosure addresses the need of a countermeasure washdown system for a PNP to recover from a containment failure or chemical, biological and/or radiological warfare.

FIG. 162 schematically depicts a portion of a PNP 16200 and portions of an illustrative countermeasure washdown system including spray towers (e.g., tower 16202) capable of projecting a foam or liquid spray 16204 upon most or all of the upper deck of the PNP 16200. The towers are fed by a piping system supplied by seawater and/or a specially formulated washdown solution from tanks located on the PNP 16200. In case of contamination of the deck of the PNP 16200 by biological, chemical, or radiological agents, the towers spray liquid over the deck. Crowning of the deck assures that even when the PNP is level, the sprayed liquid with entrained contaminants will flow to sumps set into the deck, e.g., peripheral sump channel 16206. Liquid collected in sumps can be diverted by valves (e.g., valve 16208) either overboard (via pipe 16210) or to a storage tank (not shown; via pipe 16210). Foaming agents with catalyzers, chelating agents, fire retardants, or the like can be added to the washdown fluid to increase decontamination efficiency, improve the operation of filters in the drainage system, and accomplish other purposes. The system enables PNP crew to avoid contact with contaminants during attack and/or cleanup while preventing concentrated contamination in the ocean immediately around the PNP 16200 after attacks or containment failures. Additionally, when PNPs as described herein are constructed for operation with low enrichment uranium, such as HALEU-like fuel with enrichment levels generally below 20%, containment failures may present lower risk to PNP crew in general. In embodiments, the countermeasure washdown system doubles as a fire suppression system. In embodiments, the countermeasure washdown system serves, additionally or alternatively its contaminant-removal function, as an antipersonnel or anti-robot system and/or as a camouflage system. Human or robot boarders may be impeded or disabled by sufficiently high-pressure and/or copious liquid output from the spray towers. In embodiments, a human operator or an artificial intelligence directs a concentrated portion of the spray output from one or more towers so as to impede or damage boarders. Also in various embodiments, the countermeasure spraydown system includes a capability to spray diverse fluids, foams, fogs, smokes, and gasses simultaneously and/or sequentially from one or more spray towers; thus, in a series of examples, (1) the spraydown system blankets part or all of the deck with a fluid chosen or tailor-mixed to respond to a specific threat type (e.g., fire, toxic chemical, radiological contaminant), (2) the spraydown system first blankets the deck with one type of fluid, then with a second type to remove the first, and (3) the spraydown system first covers the deck with foam, then breaks down the foam with a suppressant spray, then washes away the resulting liquid with desalinated water.

FIG. 163A schematically depicts portions of an illustrative PNP 16200 including an illustrative countermeasure washdown system similar to that of FIG. 162. Washdown towers (e.g., tower 16202) are depicted in the process of flooding the upper deck of PNP 16200 with foam 16300. The foam 16300 accumulates to a significant depth (e.g., ~3 meters) and may perform one or more functions while resident on the deck, e.g., fire suppression, contaminant removal, visual concealment of the deck from approaching attackers, local blinding of human or robot boarders, and delivery of irritating or incapacitating agents to human or robot boarders. After spilling over the edge of the deck of the PNP 16200, the foam 16300 tends to flow down the outer hull, where it is partly or wholly recovered by a collection gutter 16302.

FIG. 163B schematically depicts portions of an illustrative PNP 16304 including an illustrative countermeasure washdown system similar to that of FIG. 163A. Washdown towers (e.g., tower 16202) are depicted in the process of flooding the upper deck of PNP 16304 with foam 16300. After spilling over the edge of the deck of the PNP 16304, the foam 16300 tends to flow down the outer hull, where it is partly or wholly recovered by a collection gutter 16302. The PNP 16304 of FIG. 163B differs from the floating PNP 16200 of FIG. 163A in a number of respects; e.g., the PNP 16304 is established upon the seabed 16306 on a number of pilings (e.g., piling 16308). The pilings support a seabed base structure 16310 that proffers an artificial harbor into which a nuclear power unit 16312 can be installed by flotation. The nuclear power unit 16312 includes a modular nuclear reactor 16314. Various embodiments include other forms of multi-part, flotation-delivered, piling-supported PNPs including different types and numbers of modular reactors or other types of nuclear reactor. PNPs in various embodiments may also include groupings of multiple floating, piling-supported, or otherwise stationed or supported structures, e.g., structures arranged in groups where each structure performs a distinct functions pertinent to power generation, including steam generation, power generation from steam, security, fuel handling, and the like. In all Figures herein that depict nuclear power plants, including FIG. 163B, the forms and types of PNP depicted are illustrative only, and no restriction on PNP forms and types is intended.

FIG. 164 is a schematic depiction of portions of a PNP 16200 including an illustrative countermeasure washdown system located in a portion of an interior module rather than on the top deck of the PNP 16200 (as in FIGS. 162 and 163). The PNP 16200 includes a chamber or room 16402 that is served by sprayers or sprinkler heads (e.g., sprinkler 16404). The sprinklers are fed by a piping system supplied by seawater and/or a specially formulated washdown solution from tanks located on the PNP 16200. Fluid from the sprinklers exits the chamber via a sump 16406, whence it is directed by a valve 16408 to (1) piping 16410 that passes through the PNP hull 16412 to the exterior of the PNP 16200 or (2) piping 16414 that conducts the fluid to recovery tanks.

FIG. 165 is a schematic depiction of the architecture of portions of an illustrative countermeasure washdown system 16500 included with a PNP. Water is acquired via an ocean water intake 16502 and directed to a desalination system 16504 either directly or via a storage system 16506. Desalinated water is then directed to a delivery system 16508. The delivery system 16508 includes water conditioning subsystems (e.g., systems to add various agents to the water, filter the water, cool or heat the water, or the like) and delivery subsystems (e.g., pumps, piping, spray towers). The delivery system 16508 delivers conditioned fluid to at least one contaminated or threatened area 16510. Fluid is removed from the contaminated area 16510 by a drainage system 16512, which may route the fluid either to an overboard vent 16514 or to a waste storage system 16516, whence the fluid may also be routed to the overboard vent 16514.

G. External Deck Access Prevention Systems for a PNP

This disclosure addresses the need of an exterior fouling system for a PNP to prevent intruders from getting access to the platform. In embodiments, a variety of access prevention mechanisms seek to impede any non-authorized personnel or devices approaching the platform.

FIG. 166 is a schematic depiction of portions of an illustrative PNP installation including an illustrative fog-screen fouling system 16600. Herein, a "fog" is a cloud of aerosolized liquid, a cloud of solid smoke particles, or a mixture of liquid and solid particles. In the system 16600, fog generators arranged upon the upper deck of the PNP 16602 (e.g., as in the countermeasure washdown system of FIG. 162), or around the perimeter of the deck of the PNP 16602, or around the PNP 16602 on booms, barges, buoys, drones, or other mounts, produce an obscuring fog bank 16604 that conceals at least the PNP 16602 and preferably the entire protected area 16606 and/or controlled access area 16608 centered on the PNP 16602. The activity of fog generators may be directed by a human operator or artificial intelligence to adjust fog generation to wind conditions.

FIG. 167 is a schematic top-down depiction of portions of an illustrative flow barrier system 16700 that impedes surface access to the hull of a PNP 16702. The flow barrier system 16700 includes pressurized-water outlets (e.g., outlets 16704, 16706, 16708) located at or just below the waterline of the PNP 16702. A first type of outlet (e.g., outlets 16704, 16708) direct pressurized water flows (e.g., flow 16710) along the hull waterline. Because of the Coandă effect (the tendency of a fluid jet to stay attached to a convex surface), the flows from this first type of outlet will tend, for some distance, to hug the PNP hull. Outlets generating hull-hugging flows are spaced around the PNP waterline closely enough that each flow (e.g., flow 16710), before it can detach significantly from the PNP hull, is met by a countervailing hull-hugging flow (e.g., flow 16712); upon meeting, the two flows tend to combine into a joint outward flow (e.g., flow 16714). In embodiments, every hull-hugging flow around the PNP waterline is met by a countervailing flow of approximately equal velocity and volume so that approximately zero net radial forces is exerted on the PNP 16703 by the flow barrier. Such a balanced arrangement is depicted illustratively in an overhead schematic view in FIG. 168, where countervailing hull-hugging flows (e.g., flow 16800) originating from outlet stations (e.g., station 16802) surround a PNP 16804.

Reference is again made to FIG. 167. Any swimmer, surface drone, or small craft attempting to approach the hull waterline will tend to be diverted or swept aside by the hull-hugging flows or combined outflows. However, this is not true of the points where paired, back-to-back outlets (e.g., outlets 16704, 16706) are located. Thus, the illustrative embodiments of FIG. 167 includes a second type of outlet, e.g., outlet 16706. The output of outlet 16706 is directed outward from the PNP waterline toward a rotatable, controllable flow plate 16716 which can be mounted on an underwater boom. The flow impinging on the flow plate 16716 is diverted accordingly. The flow plate 16716 can be oriented by a human operator or an artificial intelligence to direct the output of outlet 16706 toward any approaching surface or near-surface threat, e.g., a small vessel 16718. Such a directable flow constitutes a point defense for the outlets generating the flow-barrier system 16700. In various embodiments, the flow barrier may be extended below the waterline by additional outlets at depth.

FIG. 169 schematically depicts portions of another illustrative exterior fouling system 16900 of a PNP 16902. In system 16900, a high-pressure water jet 16904 is directed from a steerable nozzle 16906 against an approaching aircraft 16908. Steering of the nozzle 16904 is by a human operator or artificial intelligence. In various embodiments, jets or pulses of water are directed against threats of various types in addition to aerial threats, e.g., boarders, surface vessels. In embodiments, jets are stationed upon the PNP 16902 at stations closely spaced enough to provide complete coverage of at least the PNP upper deck perimeter.

FIG. 170 schematically depicts portions of another illustrative exterior fouling system 17000 of a PNP 17002. In system 17000, the upper deck of the PNP 17002 is bounded or edged by a cornice 17004 that is rounded and free of catchpoints upon which a grappling hook 17006 or similar device can find purchase. Moreover, the upper deck of the PNP 17002 is, for most or all of its area and/or within a significant distance of the cornice 17004, similarly smooth and free of catchpoints. Boarding of the PNP is rendered more difficult by system 17000.

H. Reactive Armor for Vector Defense of a PNP

In embodiments, exterior fouling systems of a PNP include structural reactive armor. Herein, "reactive armor" denotes a plate-like material or device that, when impacted by a projectile, reacts in a way that liberates stored energy to repel the projectile or mitigate its impact. Explosive reactive armor, herein termed "active" reactive armor, used in many military applications; herein, discussion focuses on "passive" reactive armor, defined as reactive armor that, when triggered, liberates only elastically stored energy, not chemical explosive energy. Both active and passive reactive armor are contemplated and within the scope of the present disclosure. Passive reactive armor tends to be effective against a narrower range of challenge forces, but has the advantages of lower cost, of not necessarily being exhausted by a single impact, and of greater safety.

Herein two preferred types of structural passive reactive armor (PRA) are described. FIG. 171 depicts in schematic cross-section an illustrative form of a first type of PRA. The PRA plate 17100 is oriented to be effective against a projectile coming more or less from the upper right quadrant (open arrow). The PRA plate 17100 includes a passivated outer layer 17102, an outer hard layer 17104 (e.g., a layer of a hard steel such as Brinell, ZDP-189), a central layer 17106 including a compressible multilayer laminate of hard and elastic materials (e.g., steel for the hard material and rubber, plastic, or carbon fiber for the elastic material), and an inner hard layer 17108 (e.g., a layer of a hard steel). The plate 17100 is mounted (e.g., to a PNP) by a baseplate 17110 and a number of stout supports (e.g., support 17112). An initial phase of impact of a projectile or explosive shock wave delivers kinetic energy to the laminate layer 17106 via the outer hard layer 17104, compressing the laminate layer 17106. The elastic modulus of the laminate layer 17106 is high enough so that the laminate layer 17106 is capable of absorbing much or all of the kinetic energy of a projectile of plausible mass. Re-expansion of the layer 17106 commences while the projectile is still deforming and/or penetrating the hard layer 17104, delivering a counterforce to the projectile and tending to decelerate the projectile. Expansive force will tend to be exerted by the compressed laminate layer 17106 symmetrically on the front hard layer 17104 and back hard layer 17108, but the latter is positionally constrained by the mounting hardware, which communicates with the relatively very large mass of the PNP, so momentum is preferentially imparted outward (e.g., counter to initial direction of projectile motion). This counterforce is delivered until the elastic energy stored in the laminate layer 17106 is spent, the projectile is repelled, or the laminate layer 17106 is penetrated by the projectile. In essence, the design idea is to cause the projectile to bounce elastically off the plate 17100. PRA plate 17100 will have partially accomplished its protective purpose even if penetrated by a projectile if the projectile delivers significantly less energy to objects in the region behind the plate 17100 (e.g., the deck of a PNP).

FIG. 172 depicts in schematic cross-section an illustrative form of a second type of PRA. The PRA plate 17200 is oriented to be effective against a projectile coming approximately from the upper right quadrant (open arrow). The PRA plate 17200 includes a passivated outer layer 17202, an outer layer 17204 of steel-fiber-reinforced high performance concrete with steel fibers running between edge-mounted tensioning plates (e.g., steel fiber 17206, tensioning plate 17208), a middle layer 17210 of fiber-reinforced engineered cementitious composite, and a back layer 17212 similar to front layer 17204. Plate 17200 is mounted on supports (e.g., support 17214) and a baseplate 17216 similar to those of FIG. 171. The operative principles of plate 17200 are similar to those of plate 17100 of FIG. 171, except that the rigid front and back plates of plate 17100 are here, in effect, replaced by reinforced concrete. It will be appreciated in light of the disclosure that the forms and dimensions of the plates 17100 and 17200, as well as the form and type of their supports and internal structures, are illustrative only.

FIG. 173 depicts in schematic cross-section an illustrative PNP 17300 including PRA plates disposed in a plurality of distinct defensive zones. A Missile Shield or first ring 17302 of PRA plates confers resistance to aerial attacks, a Localized Shield or second ring 17304 of PRA plates hardens the outer hull of the PNP 17300 to protect above-waterline critical systems (e.g., containment, control room, diesel fuel storage), and a Splash Zone Shield 17306 of PRA plates confers resistance to surficial attacks (e.g., speedboats). In embodiments, other zones of PRA plates are included with the PNP 17300, e.g., PRA plate zones below waterline.

I. Cyberdefense of a PNP

This disclosure addresses the need of a cyberdefense system for a PNP to prevent intruders from gaining access to computerized control systems, either to directly disrupt operations or to assist a physical attack. In embodiments, a variety of access prevention mechanisms impede, or block cyberattack.

FIG. 174 is a schematic block diagram of aspects of an illustrative cyberdefense system 17400 integral to a PNP. Access to in situ physical controls 17402 is guarded by a biometric filter 17404 (e.g., fingerprint and retinal scanner) that refuses all access to non-recognized or non-authorized persons. Physical users that pass biometric verification 17404, as well as all control inputs arriving through communications channels 17406 (e.g., from offsite controllers), must pass a cryptographic verification filter 17408 (e.g., password verification and/or more rigorous authorization verification cybersecurity techniques). Local or remote controllers that pass the filters 17404, 17408 are granted access to the control software 17410, which can issue commands to the control mechanisms of PNP defense systems 17412, nuclear system 17414, maritime systems 17416, and other systems. However, all commands issued by the control software are filtered by a hardwired command filter 17418. The command filter 17418 is a computational device that algorithmically compares all commands from the control software 17410 to a set of internally stored criteria and, potentially, data inputs from sensors or telemetry associated with controlled systems (e.g., nuclear systems 17414) and the PNP environment. The command filter prevents self-destructive commands from being issued to the controlled systems, e.g., maritime system commands that would cause the PNP to capsize or nuclear system commands that would cause the reactor core to melt. The command filter 17418 is proof against real-time cyberattack because its program is preferably stored in read-only memory (e.g., PROM or EPROM chips) and can only be altered by physical swap-out of the chips. In embodiments, moreover, quantum and/or conventional cryptographic techniques are used at most or all steps of data transfer symbolized by black lines in FIG. 174 in order to assure integrity of data transfer by detecting tampering and interception, if any.

It will be appreciated in light of the disclosure from the illustrative systems of the Figures that a diversity of energy-intensive industrial, computational, and other enterprises may be advantageously co-located, either by flotation or founded upon the seabed on staged pilings or using other techniques, with underwater generating facilities according to various embodiments. All such embodiments are contemplated and within the scope of the present disclosure.

The detailed description herein is illustrative of various embodiments of the present disclosure. Various modifications and additions can be made without departing from the spirit and scope of this present disclosure. Each of the various embodiments described above may be combined with other embodiments in order to provide multiple features. Any of the abovementioned embodiments can be deployed on a floating or grounded nuclear plant platform located in a natural body of water or along a natural or man-made coastline. Platform types of various embodiments include but are not limited to a semisubmersible, a spar-type, a Sevan-type or cylindrical hull type, a ship hull, a barge, or a buoy-type. Grounded platforms types may include but are not limited to a jack-up rig, a gravity platform, or a beached floating hull. Furthermore, while the foregoing describes a number of separate embodiments of the apparatus and method of the present disclosure, what has been described herein is merely illustrative of the application of the principles of the present disclosure. Accordingly, this description is meant to be taken only by way of example, and not to limit the scope of this present disclosure.

IX. Microreactor Cassettes

In embodiments, deployment of a microreactor to a vessel may involve preparation of a portion of the vessel, such as an engine room or similar compartment to provide accessibility, dispositioning, operating, safety and security support for the microreactor. While safe transport, use, and servicing of a microreactor may indicate an importance of providing this support, doing so for each marine vessel each time a microreactor is installed or removed presents substantive challenges to the shipping industry at least in terms of time at a port. As an example, a microreactor may preferably be encased in physical shielding to prevent or at least mitigate impact of external events on the microreactor. Arranging and deploying such shielding at microreactor deployment time while a vessel is at a port can be expensive and time consuming. With the advent of microreactors, some of which may be classified as modular microreactors that may optionally utilize non-military enriched uranium (e.g., low enriched uranium oxide fuels or HALEU and the like), non-oxide ceramic fuels, liquid fuels and the like, vessels may be required to be outfitted with several modular microreactors to provide sufficient power for full operation of the vessel propulsion and other energy consuming systems. Therefore, even just the physical shielding of each modular microreactor may be cost and time prohibitive.

Support needs for modular microreactors may include access to a source of cooling, such as thermally conductive fluid (e.g., water, oil, and the like), forced or conductive air pathways, or a combination of these. A microreactor may further require structural support for transport to/from the vessel, within the vessel, and at deployment within the vessel. A microreactor may also require accessibility, such as to provide interfaces between the microreactor and the vessel for, among other things distributing power to vessel components, such as a propulsion system, power distribution grid, and the like.

In embodiments, as noted herein operation of a vessel may require access to power output from a plurality of microreactors, such as modular microreactors and/or microreactors and the like. Therefore, functions, such as safely merging energy produced from multiple microreactors to provide reliable power for vessel operations also comes into play when considering use of microreactors as a primary source of propulsion power for vessels.

In embodiments, a modular microreactor support system may be constructed to provide a wide range of support features typically required by microreactors. Such a modular microreactor support system, referred to herein as a MicroReactor Cassette (MRC) may be constructed to facilitate economical and efficient deployment and removal of a small plurality of microreactors for use, in an example, with ocean vessels and the like. By providing deployment, operational, and safety features supportive of modular microreactors, an MRC enables standardized deployment and use of microreactors on ocean vessels and the like. Such an MRC can further facilitate safe land and/or air-based transport of microreactors, operation and the like, such as for servicing, inter-vessel transfer, inventory and the like. An MRC may provide for bundling of multiple microreactors into a single, secure, transportable enclosure; enhance nuclear safety and anti-proliferation security by providing containment layers; efficiently integrate and remove reactors during regular activities, such as refueling and the like; provide for disaster protection of enclosed microreactors, such as a total sinking of a vessel on which the MRC is deployed, and the like.

Referring to FIG. 175, embodiments of a modular microreactor deployment support system (herein MRC) 17500 are depicted. While an exemplary vertically oriented, three-tier MRC is depicted in FIG. 175, other configurations that may include support for more or fewer microreactors can be constructed and are contemplated herein. As an example, an MRC may be constructed with only two microreactor compartments; however, those two compartments may be side-by-side. The MRC 17500 is constructed to compartmentalize microreactor support while providing common support to each of the microreactors deployed with the MRC. A first microreactor compartment 17502 may be constructed as a lowermost compartment of a vertical tier of microreactor compartments including a middle microreactor compartment 17502' and an upper microreactor compartment 17502". Each compartment 17502 may be constructed to provide stabile anchoring of a microreactor disposed therein to facilitate safe mobility of the MRC 17500. Each compartment 17502 may further provide physical isolation from each other compartment 17502' and 17502". Each compartment 17502 may further provide radiation, physical and thermal shielding to at least a portion of the surfaces of a deployed microreactor. Thermal shielding may include, among other things, an air gap 17504 between microreactor compartments and between MRCS 17506 that may be beneficial when an MRC is deployed and/or when multiple MRCS are deployed side-by-side and the like. The MRC 17500 may include vertical air plenum 17508 that may facilitate convection-based and/or forced air cooling. In the embodiments of the MRC 17500, the air plenum 17508 allow air to flow vertically along at least two sides of the microreactor compartments. The vertical air plenum 17508 may provide a convection air inlet at a lower extent 17510 and a convection air outlet at an upper extent 17512. While the embodiments of FIG. 175 includes four vertical air flow plenum 17508, configures with fewer or more air flow plenums are possible and to be included herein. Additionally, the air flow plenum 17508 may be constructed with or without one or more open sides 17516 to take advantage of convection or other air flow present in proximity to the MRC. The lower extent 17510 convection air inlet may be constructed by raising the compartments with MRC base standoffs 17514 off of a support surface, such as a vessel engine room floor, compartment floor, deck, or the like. The base standoffs 17514 may further provide an air gap below the lowermost compartment 17502. Anchoring features, such as for attaching the MRC 17500 to a support surface may be constructed into these standoffs 17514. While the description here references vertical air flow plenum 17508, based on deployment, the medium within these plenum 17508 may be a fluid, such as seawater and the like for, as an example, an under-water or below-water vessel compartment deployment.

The MRC 17500 may further include structural supports 17518 intended to strengthen the construction of the MRC while providing a degree of flexibility to allow for material differences, such as differences in thermal expansion and the like. The exemplary MRC 17500 further includes upper standoffs 17520 that facilitate ensuring at least some air gap above the uppermost compartment 17502". Similarly to the lower standoffs, the upper standoffs 17520 may include anchoring features and the like.

The MRC 17500 is constructed to further facilitate rapid administration of cooling, such as by forcing seawater or other high thermal transfer media around one or more of the compartments 17502. In embodiments, when properly configured in a floodable vessel compartment, rapidly flooding the vessel compartment will promote fluid flow along the sides, tops and bottoms of the compartment(s); thereby increasing the safety of a microreactor that is subject to a thermal event or other malfunction that results in excessive heating thereof. As an example, of rapid cooling, as water, for example, enters the vessel compartment, or is otherwise directed at, for example, the vertical air plenum 17508, the cooling medium can readily flow in any desired direction, such as vertically upward for a compartment that is flooding and the like. While the MRC 17500 provides physical separation of the microreactors from each other and from nearby elements (e.g., other MRCs, vessel compartment dividers and the like), it is constructed with safety, which includes cooling as a key feature. Yet further the MRC may be constructed to permit cooling media (air, water, etc.) to flow within the compartment(s); thereby increasing the heat sinking effect of the cooling media. In embodiments, the air plenums 17508 may be adapted to support active cooling, such as being configured as heat exchangers, and/or being configured with supplemental heat exchanging capabilities and the like. Although depicted in FIG. 175 as an open-ended structure, as will be described herein, additional structural elements may be added or constructed into the MRC for enhancing support of microreactor safety and the like.

In embodiments, each compartment 17502 may be constructed to provide support for one or more microreactor modules, such as a nuclear module, a power conversion module, an HVAC module, a command and control module, and the like. One or more of these modules may be disposed within a microreactor enclosure or may be installed into a compartment 17502 as physically distinct modules. In embodiments, modules such as HVAC may be configured into or with an MRC to provide cooling services to each of the microreactors in the MRC. In an example, an upper compartment 17502" may be configured with an HVAC module, a command and control module, and the like that may be shared among two microreactors disposed in the middle compartment 17502' and the lower compartment 17502. Various combinations of reactors, modules, reactor and fuel types (e.g., non-military enriched uranium-powered reactors) and the like may be supported by the construction of the MRC 17500 so that each deployment may be adapted as needed or desired.

FIG. 176 depicts an MRC 17500 receiving one or more microreactors. While the MRC may stack the microreactors vertically, each microreactor may be installed into an individual compartment horizontally, such as through a loading edge 17602 of the MRC 17500. In the exemplary embodiments of FIG. 176, each microreactor may be slid and/or rolled into place with a corresponding MRC compartment 17502. Horizontal positioning may be facilitated by a hoist, crane, or other system, such as a hydraulic powered platform 17702 as depicted in FIG. 177 that can move in three axes of motion and optionally rotate to align the microreactor with an open compartment.

Figure 178B:
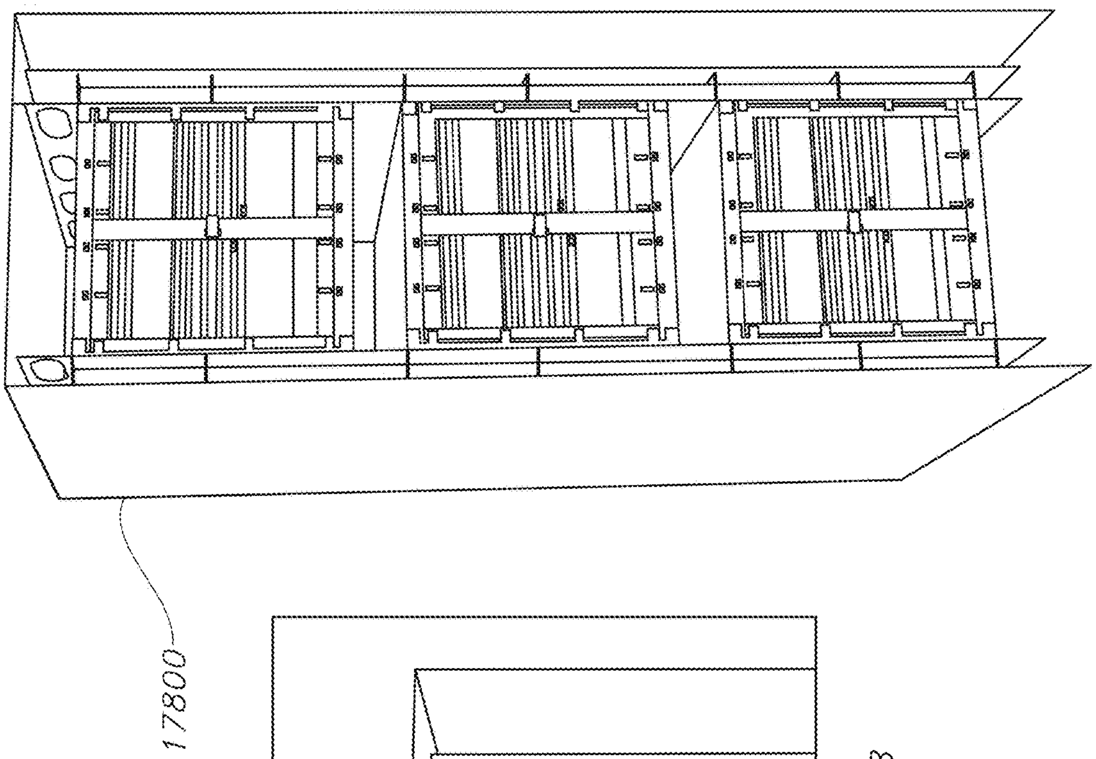
Figure 178A:
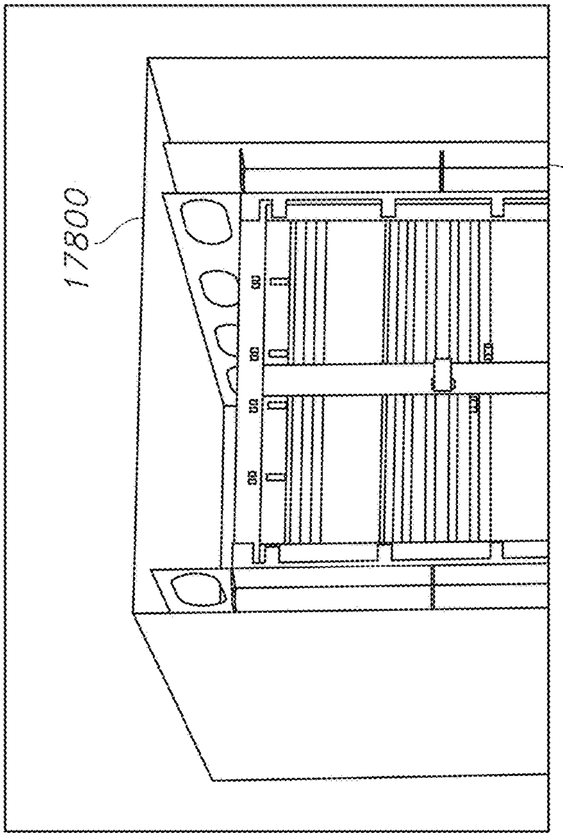

While the MRC 17500 of FIG. 175 provides features, such as shielding, microreactor isolation and the like, additional constructions of the MRC may include encapsulation 17800 of at least the cooling plenums as depicted in FIG. 178A and FIG. 178B. This encapsulation may provide protection of the cooling and other features of the MRC, such as protecting the air flow plenums 17508 and the like. Likewise, this encapsulation 17800 may increase the robustness of an MRC to microreactor failure, externally generated disturbances, and the like.

FIG. 178A and FIG. 178B represent a different depiction of the MRC whereby microreactors are vertically aligned within the cassette envelope. At the center of the Cassette, a centralized lifting system may allow integration/retrieval of reactors. Once reactor is placed, Cassette allows the immediate connection to cooling systems (with sufficient redundancy) and electric/system connections (connecting the reactor with power conversion systems which may be located in immediate proximity to the cassette or in a very different location of the vessel). The supply/retrieval of ambient air may be managed to separate systems, e.g., to operate an open air Brayton cycle, while the air flow may then be divided (or sourced) to supply each individual reactor and a centralized elevator. The many depictions and illustrative embodiments show the 'black-box' type nature of the microreactor cassette vertically confined with a hatch through which reactors may be lifted through.

Figure 178C:
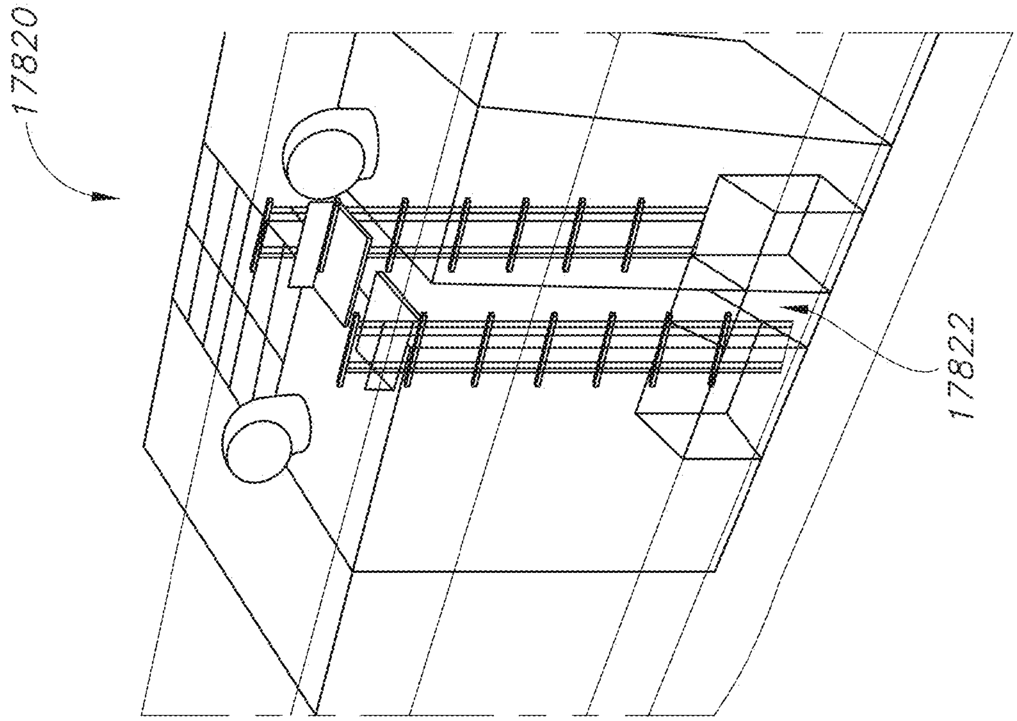
Figure 178D:
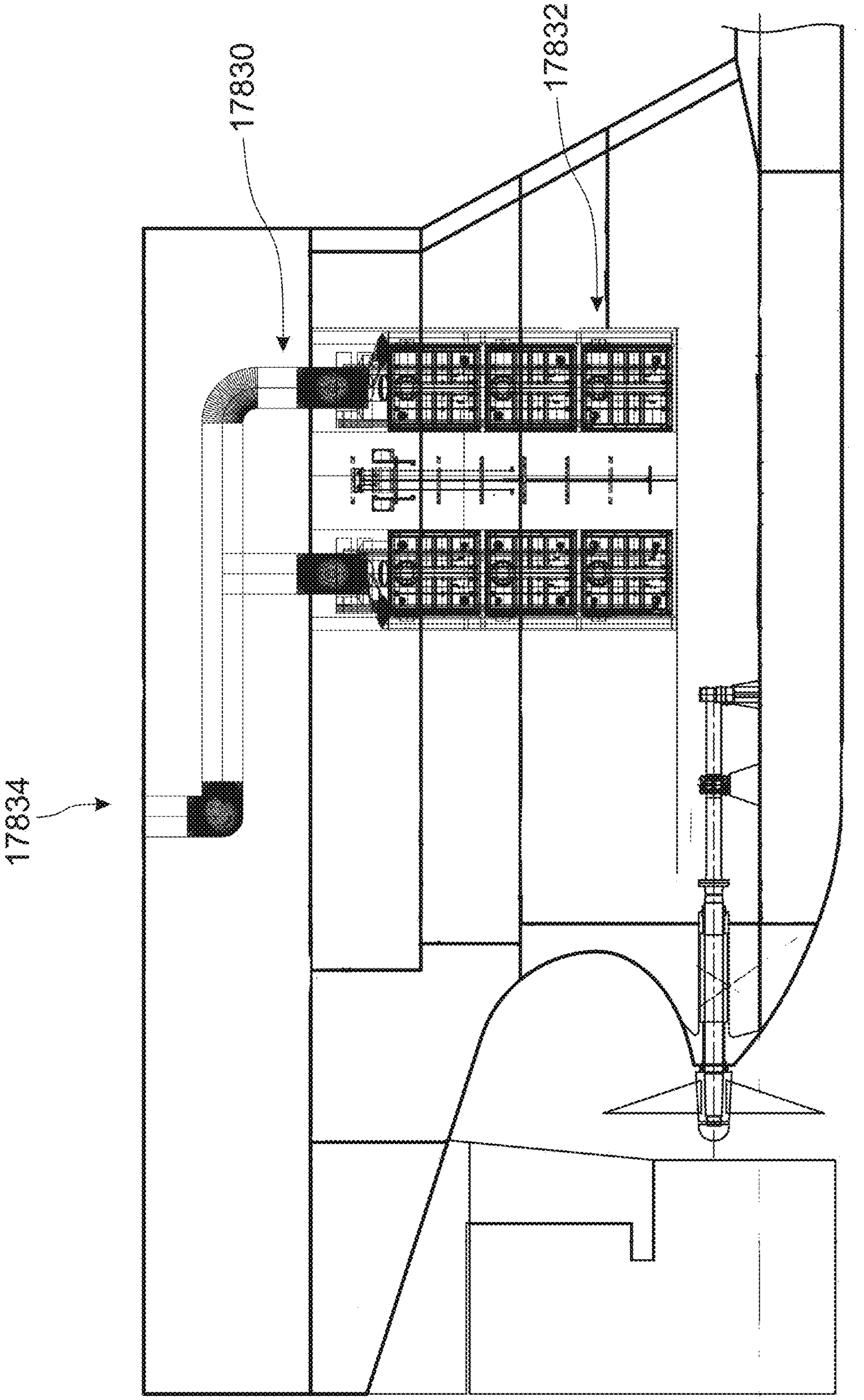

FIG. 178C and FIG. 178D represent yet another depiction of the Cassette illustrating the air-ducts into which reactors connect as well as the electronic connections. All electronic connections can be collected in a centralized cable-tray and from here, cables can then be routed to the location where electronic equipment is located). The air ducting can connect to the the centralized air supply.

For reference herein, the option utilizing a closed Brayton cycle may generally be possible too (working medium recirculates in the loop and the gas expelled from the turbine is reintroduced into the compressor). Power conversion efficiency may further be increased by utilizing a Brayton cycle by thermally coupling to components forming a bottoming Organic Rankine Cycle.

As depicted in FIG. 178B, a Cassette containing six microreactor units, in embodiments, is aligned symmetrically along the centerline of a vessel (in this depiction in the stern section of the vessel). Inside the Cassette containment envelope, three reactors are aligned vertically on each side of a central hydraulic elevator system which facilitates integration and retrieval of individual reactors. Two major air inlets/outlets connect the Cassette to the vessel exterior, to supply adequate airflow (and cooling) for the open-air Brayton cycle. The Cassette itself may be equipped with monitoring sensor technology while also each microreactor itself may be equipped with sensor and monitoring technology guaranteeing safe and continuous operation while allowing remote oversight/control.

As depicted in FIG. 178C and FIG. 178D, the Cassette can, in embodiments, use air cooling in an open-air cycle, at 17820 in FIG. 178C, as well as a closed-loop system, where the thermal energy will be rejected directly into the surrounding body of water, at 17830 at FIG. 178D. To provide adequate reactor cooling, both, open air cooling, as well as a closed loop cooling system can be deployed. For a closed loop system in FIG. 178D, for example, the working fluid within the power conversion system would be routed through a heat-exchanger, and the heat may ultimately be rejected into the surrounding water.

FIG. 178C depicts embodiments of an MRC at 17820 containing the microreactors that are vertically aligned at 17822. In general, the MRC is not limited to this form factor; as any number of vertically and/or horizontally aligned reactor arrangements may be deployed and be equally suitable. In these examples, the MRC is a fully sealed containment enclosing all nuclear, radioactive components and systems. The centralized reactor elevator may enable reactor insertion and retrieval into the Cassette. Once reactor is inserted into the designated reactor bay (place where the reactor is located during operation), the reactor connects either fully automatically or semi-automatically (e.g., requiring human support) via a plug-and-play system or easy dock and latching system. In embodiments, an MRC internally powered (e.g., supported via an independent power system) instrumentation and control system performs reactor systems check to verify reactors safety and reactor systems health. In these examples, MRC can connect to the platform supports contact or automated system and can connect to each MRC to an internal service network or other connectable networks or cloud facilities. The service network can read out device performance data and searches for any potential errors, failure modes in the system. Such check can be automatically performed and data can be transmitted to a centralized monitoring and control facility. In embodiments, this procedure may be part of the regular commissioning procedure. In embodiments, integrated and standardized connections can be required for the reactor to generate power under safe and normal operating conditions to ensure all connections, such instrumentation and control, cooling connections, monitoring, redundant and backup systems connections and the like, are properly connected. This approach can permit a highly standardized and optimized reactor insertion/retrieval processes; and such standardization and optimization can be shown to reduce failure rate and minimize potential mistakes in implementation and use.

FIG. 178D is a schematic depiction of an MRC containing the microreactors within a VLOC or VLCC type vessel engine room. In embodiments, the MRC outer wall can define the nuclear island boundary at 17832 illustrates the. In embodiments, a deck-level allows the insertion and retrieval of microreactors at 17830 from the MRC and can horizontally transport the reactors to the reactor exit room. In embodiments, closed air reactor cooling ducts at 17834 provide cooling for the MRC. In these examples, cooling water can exchange heat with ambient water in sealed in systems. In these examples, cooling water can exchange heat with already installed liquid cooling system configured for heat rejection from conventional internal combustion engines including reciprocating engines and turbomachinery. In other embodiments, variations of closed loop systems can also supply such cooling capacity and not such significant air ducting. It will be appreciated in light of the disclosure that the size and weight of modular microreactors is comparable with conventionally used two stroke engines while all the instrumentation and controls, switchboard and reactor support and auxiliary systems may be located in the newly available vessel tank space because on-board fuel storage of fuel for conventional engines may not be required in its entirety anymore. In some examples, the expected available space in such a conversion will depend to a certain degree on the nuclear/hybrid ratio of engine power in the implementation put to sea.

In these examples, the microreactors can be located within the MRC are connected to reactor instrumentation and control, reactor power electronics, etc. and the output electric energy is fed into the main switchboard for vessel wide distribution. During voyage, naturally, the majority of the generated electric energy will be consumed by either a single electromotor that may drive the propeller shaft directly or by multiple electromotors that may power a gearbox, which then drives the propeller shaft. In these examples, a single or multiple propeller can be used. In case of a hybrid system examples, electricity generation can be accomplished with a steam-turbine fueled by conventional or low carbon fuels, which, in turn, generates power for an electro-motor rather than some more direct system. Components of exemplary systems can include one or more micro-reactors in the Cassette, CONEX II equipment or other suitable instrumentation and control systems, a main switchboard, a distribution transformer, auxiliary loads, a frequency converter, one or more electromotors, one or more optional secondary power sources (e.g., steam-turbine), gearbox in direct-drive-type systems and one or more propulsion propellers.

Possible Advantage: The requirement of guaranteeing access to open air for cooling at all times could be a challenge. A closed loop system utilizing (multi-loop) heat exchangers and rejecting the heat in the surrounding marine environment could therefore have significant benefits.

Deployment and off-vessel transport of an MRC typically equipped with one or more microreactors may be aided by deployment structures, such as a submersible lattice structure (jacket) 17902 depicted in FIG. 179. An MRC, such as MRC 17500 optionally encapsulated may be disposed within the lattice structure 17902, transported, such as on (or installed on) a floating platform, optionally connected with a power distribution system of a target deployment structure (e.g., a power generation barge, ocean-based platform and the like) and submerged. It will be appreciated in light of the disclosure that the Cassette and microreactors disclosed herein can be used to power various platform types. Moreover, the Cassette and microreactors disclosed herein can be used to power ship like drilling vessels, floating production storage and offloading (FPSO) units, and all other semi-stationary marine vessels. In these many examples, the MRC may be integrated on-board replacing (in whole or in part) the conventional power systems. In embodiments, the Cassette and microreactors disclosed herein can be used to power semi-submersibles, either with or without its own propulsion system, and dynamic positioning systems. In embodiments, the Cassette and microreactors disclosed herein can be used to power ultra-deepwater with dual activity and deepwater and midwater semi-submersibles where these types of rigs are suitable to operate in any manner of cold, windy, high seas environments.

MRC can be integrated as part of the superstructure, above the water plane area. Reactors within the MRC can be 'swapped' (replaced) via a dedicated vessel to perform such operations.

In embodiments, off-vessel transport may be subject to regulatory and other safety-focused guidelines that may impact how a microreactor and/or an MRC (empty or at least partially populated with microreactors) may be transported off-vessel. FIG. 180A depicts a containment structure 18002 that may, in embodiments, be used for off-vessel transport and may provide shielding, cooling, and the like as a hedge against possible nuclear-based damage or injury to proximal workers and the like at 18010. FIG. 180A and FIG. 180B depict, in embodiments, a dock-based microreactor transportation containment system showing generally horizontal insertion, at 18020. The MRC depicted for insertion into a vessel 18022 has reactor containment in an area used to stage loading and unloading during insertion and removal through a horizontal portal 18024 of the vessel 18022. Movement and near-term storage of modules as the modules are deployed in and out of vessels, can occur in in the staging area at 18026. The horizontal reactor transfer is configured so that the reactor import/export room on the vessel 18022 is configured to move one or more reactors on and off the vessel through the hatch usually formed in the stern section of the vessel 18022. In this configuration, individual modules can be horizontally transited on and off the vessel. Local lifting can be accomplished with scissor lifts or other local hydraulic components. In these examples of horizontal loading and unloading, the cost and logistics of overhead cranes can be avoided in most instances.

Marine vessels and structures generally require some form of power generation. Throughout this disclosure non-limiting examples of application of nuclear reactors, such as Micro-MPS, SMR-MPS and others to a wide range of marine vessel and structure types are described. While different types and categories of marine vessel may have varying demands (e.g., some require long term high energy production, such as an oil rig, whereas others may require short term or cyclic energy demand such as a pleasure craft, yet others may require duty cycle-based demand such as a cargo vessel that is sometimes fully laden and others mostly ballasted) each type may be configured to support one or more MRCs. Examples of MRC deployments with various vessel configurations include (i) replacing and/or supplementing a power system of a cargo vessel with one or more MRC, which may be configured flexibly throughout the cargo vessel as described herein; (ii) replacing and/or supplementing a power system of a tanker vessel with one or more MRCs configured for optimal tanker payload utilization which may include, but does not require being disposed proximal to a propulsion system of the tanker; (iii) replacing and/or supplementing a power system of a marine structure with one or more MRCs disposed as needed for powering various functions of the platform without requiring that all MRCs be collocated; (iv) replacing and/or supplementing a power system of other types of vessels (passenger, dedicated purpose (e.g., fishing trawler), special purpose (e.g., ocean cleansing platform), and the like with MRC capacity, quantity, and location being adapted to meet the power demand needs of the vessel. These exemplary MRC embodiments are merely to illustrate some of the diverse deployments supported by the methods and systems for microreactor cassette systems described herein.

X. Land-BASED Microreactor and MRC In-Ground Storage Facility

In embodiments, operation of a system for handling small nuclear reactor (e.g., modular microreactor and the like) for use with vessels, such as a fleet of vessels may benefit from land-based storage of microreactors proximal to docking facilities.

In the event physical decoupling of the 'refueling/maintenance' handling of microreactors is required, a port facility may function exclusively as a hub to insert/retrieve reactors and temporarily store them. Because port facilities, specifically, the construction of a deep-water port are expensive, an onshore marine terminal may be connected via a pier with a vessel docking that can similar to or be incorporated into an LNG terminal, at 18120, in FIG. 181B. In embodiments, the LNG pier 18120 may further the transfer of microreactors, at 18122, between a vessel 18124 and a shore facility 18128. FIG. 181A, FIG. 181B, and FIG. 181C each depict embodiments of (1) a fully shielded pier to allow the transfer from the shore-facility to (2) the pier integrated reactor transfer facility. (3) depicts the reactor vessel-pier transfer gate. Underground storage may be preferred generally for microreactors since nuclear containment may be more readily achieved (or at least nuclear contamination may be more readily mitigated) than with above ground-based microreactor storage. Therefore, a system of microreactor storage is presented that can be deployed underground and that further enables direct access to stored microreactors. Referring to FIG. 181A depicts a cylindrical microreactor/MRC storage facility 18102 bored below ground level proximal to a point of microreactor use, such as a seaport 18104 where nuclear-powered vessels 18108 may receive nuclear power-based systems, such as a microreactor, MRC and the like. In the embodiments of FIG. 181A, a crane system 18110 provides direct transfer between the storage facility 18102 and a vessel 18108. The storage facility 18102 may be constructed to facilitate multi-tiered, radial access to modules (e.g., microreactors, MRCs, and the like) in the storage facility. Each module may be stored in a bay that is radially accessible from a central access point of the facility. The crane 18110, in the example of FIG. 181A may lift a microreactor from a vessel and deposit it on a multidimensional in-facility transport mechanism 18106 within the storage facility 18102 disposed at the central access point. The in-facility transport mechanism 18106 may move vertically until a desired microreactor storage tier is achieved. The in-facility transport mechanism 18106 may adjust a rotation of the deposited microreactor to line up with a storage bay along a radius of the storage facility 18102. The in-facility transport mechanism 18106 may then move the microreactor horizontally along the lined-up radius into the relevant storage bay. Retrieval of a microreactor or the like from the storage facility 18102 may involve similar steps performed substantively in reverse. While a crane 18110 is depicted in FIG. 181A for transporting a microreactor and the like between a vessel 18108 and the storage facility 18102, land-based, or flight-based transport between the vessel and storage facility may be implemented without requiring substantive changes to the storage facility 18102 and/or the in-facility transport mechanism 18106 or the operation thereof.

The storage facility 18102, which may be deployed throughout the embodiments depicted in FIG. 181A, FIG. 181B and FIG. 181C, may include capabilities for delivering other nuclear reactor services, such as refueling, maintenance, testing and the like. The storage facility 18102 may also be partially or fully automated. Operation of the facility 18102 may be based on vessel schedules, bulk material transfer plans, weather patterns, microreactor service requirements, and the like. An exemplary storage facility 18102 control system is depicted in FIG. 181A. A microreactor storage facility controller/server 18202 may receive information at 18206 in FIG. 182 that is descriptive of a range of factors that may impact demand, utilization, and operation of the storage facility 18102. The received information may include, without limitation microreactor availability (e.g., microreactor-specific location, status, and the like) and service schedule requirements, vessel status (e.g., at destination, inbound, outbound, at port, being serviced, and the like), vessel schedule (destination, departure/arrival timing and details, and the like), port conditions (e.g., transport crane status, port capacity vs demand, dock worker status, operator, regulatory personnel on-site, and the like), local nuclear regulations (e.g., reporting, limit on number of microreactors on vessels, in transport, in the storage facility, and the like), weather (e.g., impact on vessel schedules and the like), cargo/goods demand and supply (e.g., timing of material availability at the current port or another port to which a vessel is required, and the like), reactor type and other factors (e.g., power output capacity, nuclear fuel type and age, and the like). The controller 18202 may rely upon a microreactor demand analysis and prediction processing facility (e.g., servers or the like) 18204 that may process the available information, along with historical data, and other business rules to facilitate prediction of microreactor demand, arrival, service, and the like. These predictions may be used by the controller 18202 to control, for example, the in-facility transport mechanism 18106 to access microreactors and/or prepare the facility for storage of additional microreactors and the like. The controller 18202 may also control the port-based transfer system (e.g., a crane or the like) 18110. Additionally, the controller 18202 may be in communication with other port-based or a central controller system 18208 that may coordinate activities among port systems in a region, jurisdiction, continent, or any systems along the accessible vessel routes. In an example, a central microreactor controller 18208 may be informed that there will be a demand for vessels entering a specific port to be ready for rapid long haul transportation of bulk goods from the port due to market conditions for the given bulk material. The central controller may inform the local controller 18202 to configure vessels coming into the port that include the specific port as a near-term destination with additional microreactors thereby increasing their load carrying capacity and operating speed. The local controller 18202 may activate the local port systems to populate additional microreactors or the equivalent (e.g., configured MRCS and the like) onto targeted vessels.

In FIG. 181C, the in-facility transport mechanism 18106 may then move the microreactor horizontally along a facility 18130 to deliver to ship 18124 a horizontally lined delivery, at 18132, right into the ship 18124. By providing the horizontal delivery at 18132 of the microreactors, the platform can avoid the use of cranes, self-leveling cranes, or over-head/lifting up system while relying on relatively less complex systems to horizontally load the microreactors into the ship 18124.

While reactors may be inserted or retrieved from a vessel via a terrestrially installed facility, as depicted in FIG. 181C, the reactor transfer may, in embodiments, also happen between two vessels, e.g., merchant vessel comes alongside reactor support vessel and reactor transfer can happen between those two vessels In these examples, the exchange can happen anywhere on major shipping routes, in international as well as in territorial waters of nuclear propulsion friendly host nations. As such, the reactor support vessel may sail back to a reactor refueling and maintenance facility. In these examples, no terrestrial reactor storage would be required. In case of salvage, reactor retrieval can occur at open sea. In further examples, the reactor support vessel may have the ability to refuel/maintain the reactors on-board the reactor support vessel; that would mean, the reactor support vessel does not need to sail back to a centralized refueling facility but would rather be a 'mobile' refueling facility. After spent fuel cooled down, geologic nuclear waste storage, in embodiments, may happen in depleted and suitable offshore oil and/or gas reservoirs or in other offshore located suitable geologic formations such deep boreholes.

Optimizing Nuclear Reactor Utilization in a Port/Dock for Powering Vessels Disembarking from the Port/Dock In embodiments, methods and systems for managing the use of microreactors for propulsion and other power for vessels may involve sophisticated route planning, resource utilization, jurisdiction-specific factors and the like. A marketplace for accessing the use of microreactors for vessel-based transport of material may evolve to meet propulsion needs, cost management, and regulatory limits associated with operation of nuclear reactors in various jurisdictions. In as much as room for cargo, such as bulk cargo and the like, on a vessel may currently be managed in a marketplace, such as with cargo vessels offering cargo capacity and cargo providers reserving that capacity, microreactors may become an important market-driven resource in that market. In an example, an aggregator of bulk material in a first jurisdiction may work with shipping providers to ensure that properly configured and sized vessel(s) are available at a port in the first jurisdiction contemporaneously with arrival of the bulk material at the port. One aspect of configuration of such a vessel may be its power plant, such as one or more microreactors, optionally configured into micro reactor cassettes. The aggregator and/or the vessel operator (e.g., a fleet of vessels) may coordinate with a microreactor provider to ensure that enough ready-for-use microreactors are available and allocated for use by the designated vessels contemporaneously with the bulk material at the port. The microreactors may be sourced from the vessel(s) themselves having used them for the in-bound journey to pick up the bulk material. The vessel(s) may have been configured at a departure port with the proper number and type of microreactors to meet the planned bulk transport. The microreactors may be sourced from port-local microreactor storage, embodiments of which are described herein. The microreactors may also or in the alternative be sourced from storage or temporary holding locations proximal to the port, such as another port, a land-based microreactor storage/service/refueling facility, an offshore-based microreactor storage/service/refueling facility and the like. Methods and systems for managing a supply of ready for use microreactors throughout a diverse geography of ports, vessel types, and the like across multiple jurisdictions are disclosed herein.

In embodiments, managing a supply of ready-for-use microreactors may factor in a wide range of conditions and information.

In embodiments, managing a supply of ready-for-use microreactors may be applied for a range of scenarios, including, without limitation management across a fleet of vessels, such as a group of vessels owned and/or operated as a fleet. Managing the fleet may involve in-service requests, vessel scheduling, crew scheduling, vessel maintenance, and the like. With the use of modular microreactors, management may further include access to reactors for powering the vessel. A fleet operator/management facility may use a set of vessel propulsion rules, optionally adapted for each different type of vessel in a fleet, to determine, for any given loading, a range of power plant capacity required. Other factors that the fleet management facility may utilize to identify a demand for microreactors across the fleet may include routing (e.g., destination, departure and arrival target dates/times, expected sea conditions, and the like), access to microreactors, initially at the departure and destination ports, but as a secondary consideration, route-based transfer of microreactors (e.g., sea-based transfer), or route-impacting transfer (e.g., a diversion from the main route to a nearby port), vessel configuration for use of nuclear energy, vessel configuration for use of alternate energy, such as ammonia for generating vessel-based electricity, availability of microreactors that include ammonia production, availability of ammonia production systems (e.g., a microreactor cassette configured to support an ammonia production from a plurality of microreactors), and the like.

Another ready-for-use microreactor management scenario may include managing across vessels using a dock, optionally independent of fleet affiliation. In embodiments, demand for microreactors at a port may be determined for a time frame, such as daily, for example, by aggregating microreactor demand for all vessels departing the port in the time frame. Vessel information may be available from a range of sources related to vessel and port operations and scheduling. Supply of microreactors at the port may also be determined for the time frame, such as by aggregating all vessel-based microreactors expected to be in the port, independent of the departure schedule of the vessel on which the microreactors are disposed, with locally stored microreactors and further including available, or expected to be available microreactors from proximal storage centers and any that may be in transit that could be received at the port contemporaneously with the demand (e.g., up to a day or two of the demand departure date).

A system constructed for operating a microreactor service facility is depicted in FIG. 183. The microreactor service system 18300 may be applied to operating a microreactor service at a single port, across a plurality of ports in a jurisdiction or across jurisdictions, or many ports dispersed around the globe. The system may include two primary processing circuits; a microreactor demand processing circuit 18302 and a microreactor supply processing circuit 18304. The demand processing circuit 18302 may receive or access as inputs data 18308 representative of port(s) activity, such as vessel schedules (e.g., departure time, destination, expected cargo, and the like), cargo on/off schedules (e.g., use of dock cranes, dock access and the like), crew schedules (e.g., timing for specialized crew for activities, such as on-boarding a microreactor and the like), jurisdiction-specific working schedules and constraints (e.g., no work after dark, limited hours/days for nuclear reactor transportation, and the like). The demand processing circuit 18302 may further receive or access data representative of vessel microreactor demand at a plurality of ports (e.g., a fleet might have a contract that guarantees a minimum number of microreactors at one or more ports, specific requests, such as ad-hoc requests for microreactors at one or more ports and the like). The demand processing circuit 18302 may further receive or access data representative of microreactor service constraints (e.g., reactors on a vessel scheduled to arrive at a port during a timeframe are scheduled to be serviced contemporaneously or soon after arrival at the port, a vessel may indicate a need for servicing that is not scheduled, and the like). The demand processing circuit 18302 may further receive or access data representative of a quantity of microreactors, including different types and/or status of microreactors to be maintained as a buffer, such as to account for late arrival of vessels from which microreactors may have been planned to be moved to an outgoing vessel, and the like. The microreactor demand processing circuit 18302 may process the received or accessed data inputs with functions that may determine demand, or a range of demand values, for a range of time periods, along with conditions that may impact demand, such as weather, jurisdiction factors, changes in vessel activity, and the like. A data set, which may be indexed for efficient access by a range of attributes, such as timeframe, vessel type, microreactor type, and the like may be generated for use by a microreactor allocation circuit 18306. The data set may further include confidence factors for demand values in a range of values. As an example of confidence factors for demand values, factors that may have a low likelihood of impacting a prediction of microreactor demand may result in demand values that have low confidence (e.g., a strike by crews on a fleet of vessels). Likewise, factors that have a high likelihood of occurring, such as ship departure activity during a storm, may generate demand values that have a high confidence factor.

The microreactor service system 18300, may further include a microreactor supply processing circuit 18304 that may receive and/or access data 18310 representative of microreactor supply at one or more ports. Exemplary data used by the microreactor supply processing circuit 18304 may include port schedule data comparable to port schedule and/or activity available to the microreactor demand processing circuit 18302, on-vessel microreactor census data, vessel transfer data (e.g., microreactors on vessels that, based at least on the vessel schedule, may be moved to another vessel, and the like), microreactor buffer quantities (e.g., a quantity of microreactors retained and not committed ahead of time for use on vessels, and the like), local storage availability of microreactors (e.g., a local storage facility may provide exclusive storage that limits access to some microreactors and/or inclusive storage of microreactors that may be used to meet demand), microreactors that are in-transit to the port, (e.g., such as from a service depot, off-port storage facility, and the like), off-port microreactor storage capacity and availability, microreactor service schedule (e.g., schedule of microreactors completing servicing and/or refueling and the like), and other source of information that may impact microreactor supply processing. The microreactor supply processing circuit 18304 may process this input information with functions that may generate supply scenarios based on variable factors, such as timing of vessel arrival, in-transit microreactor availability, vessel transfer risks (e.g., late arrivals, diversion of a vessel to another port, and the like).

In addition to the microreactor supply and demand processing circuits, a microreactor demand/supply artificial intelligence circuit and/or logical model 18318 that may be based on microreactor usage history 18316, historical prediction of demand and supply, and the like may provide context, processing templates, values for supply and/or demand processing function variables, and the like for use by the microreactor demand processing circuit 18302, the microreactor supply processing circuit 18304 or both. In a microreactor demand/supply model circuit 18318 use example, based at least in part of a usage history 18316, the model circuit 18318 may supply data to the microreactor supply processing circuit for generating a confidence factor of available transfer microreactors. The model circuit 18318 may determine that historically 30% of the time potentially available microreactors for transfer are actually released by inbound vessels, and only 50% of those are accepted by a vessel with a demand for a microreactor. The microreactor supply processing circuit may use these factors to determine a confidence factor for a quantity of potentially available transfer microreactors to be provided to the microreactor allocation circuit 18306.

In embodiments, the microreactor service system 18300 may utilize the microreactor allocation circuit 18306 to generate a microreactor allocation plan 18314. This plan 18314 may be a timeframe-based rolling plan that is updated from time to time, such as when new data sets from either or both of the microreactor demand processing circuit 18302 and the microreactor supply processing circuit 18304, when other factors that determine an allocation plan change, or on a schedule, such as once per day and the like. In embodiments, other information that may impact an allocation plan 18314 may include readiness-related factors 18312 including, without limitation, destination port readiness factors (e.g., is a destination port for a vessel being serviced in a current likely to be ready to receive the vessel as scheduled, and the like), vessel departure readiness (e.g., are there maintenance issues impacting the ship departure, are there supply issues impacting the ship departure, are there other factors, such as weather, shipping lane congestion, socio-political events, finances and the like likely to impact vessel departure readiness), vessel alternate energy use options (e.g., which vessels have backup power generation resources, such as a turbine engine and the like), vessel alternate energy generation options (e.g., can a vessel produce ammonia or another combustible substance for use during the route if needed, and the like), route-based supply options (e.g., can a vessel readily receive a microreactor along the route, such as from a sea-bound microreactor service and/or refueling and/or storage facility and the like), present of outstanding contracts for providing microreactor service and the like, status of and value of service fees (e.g., when demand for microreactors in a port is high, service fees for these reactors may increase or those who pay higher fees may get preferential treatment in the allocation plan.

In embodiments, the microreactor demand/supply model/circuit 18318 may be artificial intelligence-based and may use, among other techniques, machine learning to adapt itself based on feedback, such as usage history 18316 and the like.

In embodiments, FIG. 184A and FIG. 184B depict two visualization of microreactor supply and demand over time. Chart 18400 depicts aggregated demand 18402 and differentiated supply 18404, 18406, 18408, 18410 and the like.

For a first timeframe, microreactor demand 18402 exceeds a combination of microreactor supply sources including on-vessel microreactors 18404, locally stored microreactors 18406, and transfer reactors 18408. For a second timeframe, microreactor demand 18402' is satisfied by microreactor supply that comprises on-vessel supply 18404', and locally available microreactor supply 18406'. Transfer reactor supply 18408' is estimated but is indicated as optional for the second timeframe. For a third timeframe, microreactor demand 18402" is substantively lower than demand during the first and second timeframes. However, supply meets demand through a combination of on-vessel microreactors 18404", locally available microreactors 18406", and in-transit microreactors 18410.

Also depicted in FIG. 184A and FIG. 184B is an alternate time-based representation of micro reactor supply and demand. In the line graph 18420, demand is represented by a primary demand value 18422 for each of a plurality of time periods. For each period, the demand may vary within a range 18426 that may be different for different time periods. The demand range 18426 may be based on variable factors that might impact demand, such as shipping delays, and the like. Also in the line graph 18420, supply may be represented by a supply range 18424 that may bracket a potential range of supply values for each period. The graph 18420 visually indicates potential supply shortage relative to a range of demand values for a period, such as time period 18428 in which the high end of the demand range 18426 may exceed the supply range 18424 and time period 18430 in which the supply range 18424 is approximately comparable to the primary demand value 18422.

Microreactor allocation may be impacted by a wide range of factors including, without limitation class of vessels, class of reactors, activities at ports other than a current port, activities in other jurisdictions, weather and weather events, socio and political events, preventive maintenance schedules, and the like.

In embodiments, an entity in control of the micro-reactor allocation could act as a commodity trader, such as for the supply of electricity. One can envision the entity determining that it is economically favorable to deploy reactors within or proximal to a port (e.g., land deployment) to facilitate selling electricity locally, such as to the port facility instead of placing landed reactors on outbound vessels.

Ballast Water Treatment

Marine vessels generally rely on the use of ballasting techniques to ensure proper buoyancy and balance. Ballast water is generally taken in from the waterway in which the vessel is disposed. When ballast water is no longer needed, such as when loading the vessel at a destination port, it is generally discharged into the local waterway. The point of intake and discharge may be vastly separated physically. Therefore, marine microorganisms, plant life and other small marine life may be moved from one region to another through ballast water. While introducing new organisms into a local body of water may have minimal impact, there are concerns of introducing alien organisms that negatively impact the eco system where the ballast water is discharged.

In embodiments, nuclear powered vessels, such as those described herein may provide a remedy for this potential contamination of foreign eco systems through the use of ionizing radiation for ballast water. An on-board nuclear reactor of almost any size and type contains a radioactive source that may be used as a source of ionizing radiation for ballast water treatment, wastewater treatment and the like. In embodiments, ballast water may be treated using ionizing radiation from an on-board nuclear reactor source as it is taken on-board. In embodiments, on-boarded ballast water may be treated using ionizing radiation from an on-board nuclear reactor source during a voyage. In embodiments, ballast water may be treated using ionizing radiation from an on-board nuclear reactor source during discharge. Treatment approaches may be based on factors such as a rate of intake, discharge, ionization capabilities and the like. While the examples here for ionizing radiation describe applying it using an on-board nuclear reactor radiation source for ballast water, it could similarly be applied to treating other on-board water sources, such as wastewater and the like.

Referring to FIG. 185A and FIG. 185B, exemplary ballast intake and discharge scenarios with and without ionizing radiation are depicted. A vessel without ionizing radiation may intake seawater at a first location 18502 and discharge it untreated at a second location 18504, thereby discharging microorganisms and the like brought into the ballast tanks at location 18502. A vessel with ionizing radiation capabilities may intake ballast water at a first location 18506. The vessel may process the ballast water as described herein an elsewhere using, for example ionizing radiation 18508. The treated ballast water may be discharged at location 18510 without introducing substantially all of the organisms and other potential contaminants found in the water at intake location 18506. TRISO fuel:

In embodiments, microreactors may be powered by conventional nuclear fuel; however, use of high assay low enriched uranium (HALEU), such as Advanced Gas Reactor TRi-structural ISOtropic (TRISO) fuel may provide benefits for operation thereof. In embodiments, Thorium-based reactors may be constructed for compatibility with, among other things, the MicroReactor Cassettes (MRCs) described herein and depicted in the figures filed herewith. In embodiments, TRISO fuel-based reactors may be constructed for compatibility with, among other things, the Small Modular Reactor (SMR) systems described herein, such as those used for marine power (e.g., part of a Marine Power Station (MPS)) and the like. Further, in embodiments, TRISO and/or HALEU-like fuel may be used as a primary nuclear fuel for microreactors for powering vessels, and for use with an MPS and the like. In general, such HALEU-like fuel with enrichment levels ranging from about 5 to 19.75% may be beneficially used by microreactors for use in various embodiments including, without limitation, SMRs, MPSs, MRCs and the like.

Microreactor Powered Marine Vessels and Structures

Referring to FIG. 186, a chart is presented depicting various classes of vessels that may utilize the methods and systems of microreactors and associated structures as described herein. In embodiments, a microreactor powered vessel may be a self-propelled vessel. Vessels that may be adapted for powering by a microreactor and the like (e.g., a micro-MPS, an SRM-MPS, and the like) may include high speed craft 18602, off shore oil vessels 18604, fishing vessels 18606, harbor/ocean work craft 18608, dry cargo ships 18610, liquid cargo ships 18612, passenger ships 18614, submersibles 18616, warships 18618, and other types of vessels. Without limitation, nuclear-powered self-propelled cargo-type vessels may include container vessels, reefer vessels, general dry cargo vessels, bulk carriers and the like. In an example of a cargo-type vessel, a conventionally powered container vessel may require a substantive portion of the vessel's cargo carrying capacity be reserved for fuel. A nuclear-powered container vessel, optionally configured to use the cassette-type nuclear reactors systems described herein may reduce the impact on cargo carrying capacity substantively due to the relatively small size of micro-MPS, SMR-MPS systems and the like.

Tanker-type nuclear-powered self-propelled vessels may include tankers, LNG tankers, LPG tankers, $CO_2$ Tankers and the like; chemical tankers, petroleum tankers and the like. In an example of a tanker-type nuclear powered self-propelled vessel, a bulk gas tanker may be specially designed to carry gas in bulk form including LNG and other types of gasses. The specialty design does not lend itself well to making use of vessel space that must be reserved for conventional fuels. Therefore, substantive capacity of the vessel is lost to fuel storage. Micro-MPS and related nuclear reactors, such as those described herein, provide the propulsion power needed while taking up substantively less space than conventional propulsion systems. Therefore, even greater gas carrying capacity can be designed for a comparable vessel size when nuclear powered propulsion is employed.

Other miscellaneous-type nuclear-powered self-propelled vessels may include offshore structures, passenger vessels, cruise vessels, high speed craft, yachts, pleasure crafts, fishing vessels, military/law enforcement/security vessels, auxiliary vessels, and others. Other types of vessels that may be nuclear power self-propelled may be found in a range of vessels including, without limitation dry bulk carriers, gas bulk carriers, tankers, container vessels, vehicle transport vessels, transport vessels, offshore heavy lift vessels, offshore construction vessels, such as pipe laying vessels, mining vessels and the like. Regarding fishing vessels, the benefits of nuclear powering such vessels may include bringing marine farming and food preparation actions directly to the food source, so that any level of preparation, packaging, unit sizing, and the like may be possible, allowing products output from such a facility to be prepared for an end user, such as food service industries, commercial kitchens, institutional consumers, and personal consumption.

In embodiments, marine structures for which the methods and systems of microreactors, Micro-MPS, SMR-MPS, MRCs and the like are suitable may include: self-standing structures, such as gravity-based structures with a solid connection to a seabed, such a concrete pilings (e.g., for large structures), steel pilings (e.g., for smaller structures), jack-up pilings (e.g., for use in high wind environments and the like. Other structures that may be adapted to make use of a microreactor and the like include self-propelled structures with jack-up pilings. Yet other structures include tension leg platforms that combine a floating platform with cable-based seabed mounting. Still yet other structures that may advantageously be adapted for use with the microreactor methods and systems described herein include, without limitation, floating structures with self-stabilizing propulsion systems, and the like. Nearly any form and shape of marine structure that consumes power either directly, as in the floating self-stabilizing platform, or as a consequence of hosting operations that require power, such as floating storage facilities, logistics facilities, dredging facilities and the like may have its energy needs provided by an on-board microreactor-type power generating system.

Microreactor Types

In embodiments, microreactors deployed, operated, and used as described herein may include a wide range of types including without limitation Los Alamos/NASA-based derivative reactors, generation 4 type modern fuel reactors, small nuclear battery-type reactors such as heat-pipe cooled reactors, TRISO fuel-based reactors, lead cooled reactors, HALEU-based uranium reactors, Holos, and the like. In an example, a Holos power conversion system is formed from off-the-shelf components, such as components utilized by aviation jet engines and gas turbines that are commercially available and operational worldwide. Such a power conversion system may operate as a stand-alone electric generating facility, optionally at sites with no power grid infrastructure while offering scalable power rating with high-resolution load following capabilities for meeting, for example, local electric demands. Configurations can be airlifted and timely deployed to supply emergency electricity and process-heat to disaster areas and to inaccessible remote locations. A core of this type of power conversion system is formed by coupling multiple subcritical power modules comprised within International Standards Organization transport containers. Cooling of nuclear fuel solely relies on environmental air with passive decay heat removal during shutdown. A fuel cycle for this class of power conversion system may be configured to provide from 3 to 20 Effective Full Power Years. Fuel cycle is dependent on, for example, the enrichment with the fuel segregated within replaceable reinforced fuel cartridges sealed at all times from factory to repository. Closed-loop Brayton power conversion components form the primary thermodynamic cycle thermally coupled to a bottoming waste heat recovery Rankine power cycle operating with organic fluids. At the end of the fuel cycle, the fuel cartridges fit within licensed transport canisters for long-term storage with reduced thermal loading and decommissioning cost. The component size may contribute substantively to enabling cost-effective mass production, quality assurance, safety performance validation and factory certification. It may also be shown to substantially reduce costs, testing and licensing time.

Application Environments:

In embodiments, the microreactor-based methods and systems variously described herein and depicted in the figures filed herewith may be deployed in a wide range of environments including, without limitation: on-grid residential and industrial power; edge-of-grid and off-grid residential and industrial power; offshore industries, e.g., oil, gas, sea-water and seafloor mining; chemical processing, recycling facilities; mining exploration, mineral extraction, mineral and metallurgical processing; ocean cleaning—collecting, processing, reclaiming precious metals, and refining; supplemental power to existing grid infrastructure or clean energy microgrids; baseload replacement power for fossil fuels; IT server farms and supercomputers; disaster relief, e.g., hurricanes, wildfires, earthquakes, health pandemics; commercial shipping and maritime vessels; offshore open ocean aquaculture; offshore multi-level fulfillment/logistics warehousing center; unmanned aerial vehicles to/from shore; portable, long duration self-powered, 3-D printing (e.g., large structures printed during vessel movement for point-of-use finishing, such as concrete and the like); locals that cannot support land-based structures, such as extreme north/south near the poles, proximal to tundra and permafrost regions, offshore open ocean aquaculture, offshore food-processing facilities; ship-to-port grid electricity supply, such as when a docked microreactor-based vessel connects to the local grid and supplies (e.g., sells) electricity produced by the on-board microreactor to the local electric supplier, and the like.

Computer, Networking and Machine Embodiments

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other type of processor. The processor may be or may include a signal processor, digital processor, data processor, embedded processor, microprocessor or any variant such as a co-processor (math co-processor, graphic co-processor, communication co-processor, video co-processor, AI co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, network-attached storage, server-based storage, and the like.

A processor may include one or more cores that may enhance speed and performance of a multiprocessor. In embodiments, the process may be a dual core processor, quad core processors, other chip-level multiprocessor and the like that combine two or more independent cores (sometimes called a die).

The methods and systems described herein may be deployed in part or in whole through a machine that executes computer software on a server, client, firewall, gateway, hub, router, switch, infrastructure-as-a-service, platform-as-a-service, or other such computer and/or networking hardware or system. The software may be associated with a server that may include a file server, print server, domain server, internet server, intranet server, cloud server, infrastructure-as-a-service server, platform-as-a-service server, web server, and other variants such as secondary server, host server, distributed server, failover server, backup server, server farm, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network with multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 5G, LTE, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, network-attached storage, network storage, NVME-accessible storage, PCIE connected storage, distributed storage, blockchains, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable code using a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices, artificial intelligence, computing devices, networking equipment, servers, routers and the like. Furthermore, the elements depicted in the flow chart and block diagrams or any other logical component may be implemented on a machine capable of executing program instructions. Thus, while the drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions. Computer software may employ virtualization, virtual machines, containers, dock facilities, portainers, and other capabilities.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the examples herein, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "with," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. The term "set" may include a set with a single member. No language in the specification should be construed as indicating any non-claimed element as essential to the practice of the disclosure.

While the written description herein enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference as if fully set forth herein.

At least some aspects of the present disclosure will now be described with reference to the following numbered exemplary clauses.

For example, the present invention may encompass an underwater nuclear power unit, including an access tunnel accessible by an access port; a plurality of submersible modules, each having a first end and a second end, wherein a first end of a first one of the plurality of submersible modules connects to a second end of a second one of the plurality of submersible modules; a crushable gasket extending between the first end and the second end; and a fluid barrier extending between the first end and the second end. The crushable gasket and the fluid barrier establish a watertight seal between the first one of the plurality of submersible modules and the second one of the submersible modules. One of the plurality of submersible modules is adapted to receive the nuclear power unit.

In another embodiment, the present invention may provide a nuclear power unit including a containment vessel adapted to receive nuclear fuel therein; a support structure disposable between the containment vessel and a ground surface; a plurality of pilings disposed in the ground surface, wherein the support structure is disposed atop the plurality of pilings; and a spent fuel storage disposed within the containment vessel for receiving spent fuel; and a fuel handier for moving spent fuel to and from the spent fuel storage.

Still further, the nuclear power unit may be configured so that the nuclear power unit is disposable offshore.

In one contemplated embodiment, the present invention provides for a defense system for a marine deployed nuclear power unit that includes a Prefabricated Nuclear Plant (PNP) adapted to receive nuclear fuel therein; a first defense area encompassing the PNP, wherein the first defense area is defined as a first circle with a first radius of approximately eight nautical miles; a second defense area encompassing the PNP, wherein the second defense area is defined as a second circle with a second radius of approximately six nautical miles; a third defense area encompassing the PNP, wherein the third defense area is defined as a third circle with a third radius of approximately one nautical mile; a fourth defense area encompassing the PNP, wherein the fourth defense area is defined as a fourth circle with a fourth radius of less than one nautical mile; a first active defense deterrence deployable in an air space above at least one of the first defense area, the second defense area, the third defense area, and the fourth defense area; and a second active defense deterrence deployable on a surface of a body of water with at least one of the first defense area, the second defense area, the third defense area, and the fourth defense area; and the third active defense deterrence deployable below the surface of the body of water within at least one of the first defense area, the second defense area, the third defense area, and the fourth defense area.

It is also contemplated that the present invention provides a system of microreactor deployment including a plurality of arrayed compartments, each of the plurality of arrayed compartments constructed to receive and securely anchor a modular microreactor enclosure; a plurality of thermal channels disposed to facilitate thermal transfer from a modular microreactor enclosure in one of the arrayed compartments to a heat sink medium; the plurality of thermal channels disposed along at least one vertical surface of the modular microreactor enclosure, wherein the plurality of thermal channels is interconnected to provide redundancy; a plurality of anti-proliferation containment layers disposed between the arrayed compartments, below a lowermost compartment, above an uppermost compartment, and along at least two vertical sides of the arrayed compartments; an encapsulation layer disposed to encapsulate the plurality of arrayed compartments; and vessel compartment anchoring features disposed at least at each of an upper extent and a lower extent of the plurality of arrayed compartments.

In a contemplated embodiment, the heat sink medium is convective air.

In another, the heat sink medium is seawater.

Still further, the heat sink medium may be mechanically forced air.

It is also contemplated that the thermal transfer channels may include a plurality of convection air flow channels disposed to facilitate convective air flow along the at least one vertical surface of the modular microreactor enclosure.

In addition, the system may include an HVAC system disposed in a first of the plurality of arrayed compartments, wherein the HVAC system facilitates thermal regulation of at least one modular microreactor disclosed in a second of the plurality of arrayed compartments.

The system also may be constructed to include an electricity delivery system that facilitates connection among electricity output connectors for a plurality of microreactors disposed in the plurality of arrayed compartments and further connection to a vessel propulsion system.

Separately, the modular microreactor enclosure may be a twenty-foot equivalent (TEU) cargo container.

Next, the present invention contemplates an installation, including a plurality of pilings securable to a bed under a surface of a body of water; a base structure disposed atop the plurality of pilings; a module disposable on the base structure, wherein the module comprises a nuclear reactor and is positioned and securable on the base structure after being floated on the surface of the body of water over the base structure; a lacuna defined within the base structure and the plurality of pilings, permitting the nuclear reactor to be lowered partially or fully into the body of water, below the surface, the plurality of pilings serving as a physical barrier from hazards threatening the nuclear reactor; and a jacket surrounding the nuclear reactor; and a plurality of jacks supporting the jacket within the module, wherein the plurality of jacks lowers the jacket into the lacuna and raise the jacket out of the lacuna.

The installation may be of a nuclear reactor to a plurality of pilings securable to a bed under a surface of a body of water. If so, the installation may include a base structure disposed atop said plurality of pilings; a module disposable on the base structure, wherein the module comprises said nuclear reactor and is positioned and securable on the base structure after being floated on said surface of said body of water over the base structure; a lacuna defined within the base structure and the plurality of pilings, permitting said nuclear reactor to be lowered partially or fully into said body of water, below said surface, said plurality of pilings serving as a physical barrier from hazards threatening the nuclear reactor; and a jacket surrounding said nuclear reactor; and a plurality of jacks supporting the jacket within the module, wherein the plurality of jacks is configured to lower the jacket into the lacuna and raise the jacket out of the lacuna.

The present invention also provides for an installation including A plurality of pilings securable to a bed under a surface of a body of water; a base structure disposed atop the plurality of pilings; and a module disposable on the base structure. The module is positioned and securable on the base structure after being floated on the surface of the body of water over the base structure.

In another contemplated embodiment of the installation, the base structure comprises three sides adapted to extend above the surface of the body of water, thereby establishing an artificial harbor.

Still further, the installation may be constructed to include an external structure disposable on the base structure, adapted to encase the module therein.

The external structure may be an aircraft impact protection structure.

In this contemplated embodiment, the aircraft impact protection structure may have a door adapted to permit the module to be inserted into the aircraft impact protection structure through the door.

It is contemplated that an installation according to the present invention also may include a plurality of seismic isolators disposed on top of the base structure, between the base structure and at least the module.

The module may include a reactor module.

The reactor module may be a nuclear reactor.

It is contemplated that the installation also may have a lacuna defined within the base structure and the plurality of pilings, permitting the nuclear reactor to be lowered partially or fully into the body of water, below the surface, the plurality of pilings serving as a physical barrier from hazards threatening the nuclear reactor.

In addition, the installation may include a jacket surrounding the nuclear reactor; and a plurality of jacks supporting the jacket within the module, wherein the plurality of jacks lowers the jacket into the lacuna and raise the jacket out of the lacuna.

The module may be a power conversion module.

The installation also might have a generator disposed in the power conversion module.

The modules of the installation may include a cooling module.

A cooling module is contemplated to include a cooling tower.

The present invention is contemplated to encompass one or more equivalents and variations of the embodiments described herein. Moreover, as should be apparent to those skilled in the art, features from one embodiment may be employed on other embodiments without departing from the scope of the present invention.

What is claimed is:

1. A marine nuclear power installation, comprising:

a first plurality of pilings securable to a bed under a surface of a body of water;

a buoyant, first base structure, wherein the first base structure is adapted to be floated across the surface of the body of water into position and deballasted atop the first plurality of pilings, wherein the first base structure comprises:

at least three walls;

a first cantilevered ledge disposed along a first wall of the at least three walls; and a second cantilevered ledge disposed along a second wall of the at least three walls, wherein the first plurality of pilings support the first base structure at the first cantilevered ledge and the second cantilevered ledge;

a buoyant nuclear reactor module, wherein the nuclear reactor module is adapted to be floated across the surface of the body of water into position and deballasted onto the first base structure and wherein the nuclear reactor module is adapted to contain a nuclear reactor therein;

a plurality of seismic isolators disposed atop the first base structure, wherein the seismic isolators are disposed between the first base structure and the nuclear reactor module to dampen the transmission of vibrations from the first base structure to the nuclear reactor module; and a lacuna disposed beneath the first base structure and between the first plurality of pilings, wherein the lacuna is surrounded at least in part by the first plurality of pilings, and wherein the nuclear reactor is configured to be lowered from the first base structure into the lacuna through an opening defined within the first base structure, wherein the at least three walls form an artificial harbor to receive the nuclear reactor module therein.

2. The marine nuclear power installation of claim 1, further comprising an aircraft impact protection structure adapted to be floated across the surface of the body of water into position and deballasted onto the first base structure, wherein the aircraft impact protection structure is adapted to receive the nuclear reactor module therein, and wherein the aircraft impact protection structure is adapted to withstand a force of an impact from an aircraft impingent thereon.

3. The marine nuclear power installation of claim 2, wherein the aircraft impact protection structure comprises a door adapted to permit the nuclear reactor module to be inserted into the aircraft impact protection structure through the door.

4. The marine nuclear power installation of claim 1, further comprising:

a jacket surrounding the nuclear reactor; and a plurality of jacks;

wherein the plurality of jacks is configured to support the jacket, and wherein the plurality of jacks is configured to lower the jacket and the nuclear reactor into the lacuna and raise the jacket and the nuclear reactor out of the lacuna.

5. The marine nuclear power installation of claim 1, further comprising:

a power conversion module.

6. The marine nuclear power installation of claim 5, further comprising:

a generator disposed in the power conversion module, wherein the generator generates electricity.

7. The marine nuclear power installation of claim 1, further comprising:

a cooling module.

8. The marine nuclear power installation of claim 7, wherein the cooling module comprises a cooling tower.

9. The marine nuclear power installation of claim 1, further comprising:

a sealed containment structure surrounding the nuclear reactor, wherein the sealed containment structure is disposed within the nuclear reactor module.

10. The marine nuclear power installation of claim 1, further comprising:

removable sheets disposable in the at least three walls to reduce forces imparted on the at least three walls from wave action.

11. The marine nuclear power installation of claim 1, further comprising:

a second plurality of pilings securable to the bed under the surface of the body of water;

a buoyant, second base structure, wherein the second base structure is adapted to be floated across the surface of the body of water into position and deballasted atop the second plurality of pilings; and a buoyant power conversion module, wherein the power conversion module is adapted to be floated across the surface of the body of water into position and deballasted onto the second base structure and wherein the power conversion module is adapted to contain a generator therein.

12. The marine nuclear power installation of claim 11, further comprising:

a bridge connecting the nuclear reactor module to the power conversion module.

* * * * *